US012547300B2

United States Patent

(12) United States Patent
Chen et al.

(10) Patent No.: US 12,547,300 B2
(45) Date of Patent: Feb. 10, 2026

(54) USER INTERFACES RELATED TO TIME

(71) Applicant: Apple Inc., Cupertino, CA (US)

(72) Inventors: Kevin W. Chen, Cupertino, CA (US); Giovanni M. Agnoli, San Mateo, CA (US); Edward Chao, Palo Alto, CA (US); Devon P. Endicott, Sunnyvale, CA (US); Aurelio Guzman, San Jose, CA (US); David A. Schimon, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/382,248

(22) Filed: Oct. 20, 2023

(65) Prior Publication Data

US 2024/0045578 A1 Feb. 8, 2024

Related U.S. Application Data

(63) Continuation of application No. 17/738,940, filed on May 6, 2022, now Pat. No. 11,921,992.

(Continued)

(51) Int. Cl.

*G06F 3/0484* (2022.01)
*G06F 3/0482* (2013.01)

(Continued)

(52) U.S. Cl.

CPC .......... *G06F 3/0484* (2013.01); *G06F 3/0482* (2013.01); *G06F 40/109* (2020.01);

(Continued)

(58) Field of Classification Search

CPC .... G06F 3/0484; G06F 40/109; G06F 3/0482; G06T 11/60; G06T 13/00; G06T 2200/24

See application file for complete search history.

(56) References Cited

U.S. PATENT DOCUMENTS

| | | | |
|---|---|---|---|
| 872,200 A | 11/1907 | Rowe | |
| 3,148,500 A | 9/1964 | Thomas | |

(Continued)

FOREIGN PATENT DOCUMENTS

| | | |
|---|---|---|
| AU | 2005256796 A1 | 1/2006 |
| AU | 2012200569 A1 | 2/2012 |

(Continued)

OTHER PUBLICATIONS

Intention to Grant received for European Patent Application No. 19724997.2, mailed on Jul. 25, 2024, 9 pages.

(Continued)

*Primary Examiner* — Stephen S Hong
*Assistant Examiner* — Darrin Hope
(74) *Attorney, Agent, or Firm* — DLA Piper LLP (US)

(57) ABSTRACT

The present disclosure generally relates to methods and user interfaces for managing watch face user interfaces. In some embodiments, methods and user interfaces for managing watch faces based on depth data of a previously captured media item are described. In some embodiments, methods and user interfaces for managing clock faces based on geographic data are described. In some embodiments, methods and user interfaces for managing clock faces based on state information of a computer system are described. In some embodiments, methods and user interfaces related to the management of time are described. In some embodiments, methods and user interfaces for editing user interfaces based on depth data of a previously captured media item are described.

36 Claims, 76 Drawing Sheets

Related U.S. Application Data

(60) Provisional application No. 63/197,447, filed on Jun. 6, 2021, provisional application No. 63/188,801, filed on May 14, 2021.

(51) Int. Cl.
*G06F 40/109* (2020.01)
*G06T 11/60* (2006.01)
*G06T 13/00* (2011.01)

(52) U.S. Cl.
CPC .............. *G06T 11/60* (2013.01); *G06T 13/00* (2013.01); *G06T 2200/24* (2013.01)

(56) References Cited

U.S. PATENT DOCUMENTS

| | | | |
|---|---|---|---|
| 3,586,261 | A | 6/1971 | Paine et al. |
| 3,633,354 | A | 1/1972 | Stemmler |
| 4,174,606 | A | 11/1979 | Masuda et al. |
| 4,205,628 | A | 6/1980 | Null |
| 4,355,380 | A | 10/1982 | Huguenin et al. |
| 4,516,207 | A | 5/1985 | Moriyama et al. |
| 4,597,674 | A | 7/1986 | Thompson, III |
| 4,847,819 | A | 7/1989 | Hong |
| 4,945,521 | A | 7/1990 | Klaus |
| 5,124,959 | A | 6/1992 | Yamazaki et al. |
| 5,208,790 | A | 5/1993 | Sato et al. |
| 5,220,541 | A | 6/1993 | Vuilleumier |
| 5,383,165 | A | 1/1995 | Vaucher |
| 5,455,808 | A | 10/1995 | Grupp et al. |
| 5,487,054 | A | 1/1996 | Capps et al. |
| 5,500,835 | A | 3/1996 | Born |
| 5,508,979 | A | 4/1996 | Eisenegger |
| 5,659,693 | A | 8/1997 | Hansen et al. |
| 5,802,208 | A | 9/1998 | Podilchuk et al. |
| 5,825,353 | A | 10/1998 | Will |
| 5,845,257 | A | 12/1998 | Fu et al. |
| 5,870,683 | A | 2/1999 | Wells et al. |
| 5,892,519 | A | 4/1999 | Hirai et al. |
| 5,986,655 | A | 11/1999 | Chiu et al. |
| 5,999,195 | A | 12/1999 | Santangeli |
| 6,043,818 | A | 3/2000 | Nakano et al. |
| 6,076,928 | A | 6/2000 | Fateh et al. |
| 6,084,598 | A | 7/2000 | Chekerylla |
| 6,128,012 | A | 10/2000 | Seidensticker et al. |
| 6,160,767 | A | 12/2000 | Ho |
| 6,212,548 | B1 | 4/2001 | Desimone et al. |
| 6,256,129 | B1 | 7/2001 | Kim et al. |
| 6,279,018 | B1 | 8/2001 | Kudrolli et al. |
| 6,297,795 | B1 | 10/2001 | Kato et al. |
| 6,353,449 | B1 | 3/2002 | Gregg et al. |
| 6,359,839 | B1 | 3/2002 | Schenk et al. |
| 6,418,394 | B1 | 7/2002 | Puolakanaho et al. |
| 6,441,824 | B2 | 8/2002 | Hertzfeld et al. |
| 6,449,219 | B1 | 9/2002 | Hepp et al. |
| 6,452,597 | B1 | 9/2002 | Goldberg et al. |
| 6,477,117 | B1 | 11/2002 | Narayanaswami et al. |
| 6,496,780 | B1 | 12/2002 | Harris et al. |
| 6,525,997 | B1 | 2/2003 | Narayanaswami et al. |
| 6,539,243 | B1 | 3/2003 | Kimura et al. |
| 6,539,343 | B2 | 3/2003 | Zhao et al. |
| 6,549,218 | B1 | 4/2003 | Gershony et al. |
| 6,556,222 | B1 | 4/2003 | Narayanaswami |
| 6,690,623 | B1 | 2/2004 | Maano |
| 6,728,533 | B2 | 4/2004 | Ishii et al. |
| 6,806,893 | B1 | 10/2004 | Kolawa et al. |
| 6,809,724 | B1 | 10/2004 | Shiraishi et al. |
| 6,871,076 | B2 | 3/2005 | Samn et al. |
| 6,993,489 | B1 | 1/2006 | Miglautsch |
| 7,036,025 | B2 | 4/2006 | Hunter |
| 7,113,809 | B2 | 9/2006 | Noesgaard et al. |
| 7,203,380 | B2 | 4/2007 | Chiu et al. |
| 7,257,254 | B2 | 8/2007 | Tunney et al. |
| 7,302,650 | B1 | 11/2007 | Allyn et al. |
| 7,378,954 | B2 | 5/2008 | Wendt et al. |
| 7,479,949 | B2 | 1/2009 | Jobs et al. |
| 7,515,509 | B2 | 4/2009 | Klein et al. |
| 7,515,903 | B1 | 4/2009 | Cast |
| 7,593,755 | B2 | 9/2009 | Colando et al. |
| 7,619,615 | B1 | 11/2009 | Donoghue et al. |
| 7,637,204 | B2 | 12/2009 | Sumser et al. |
| 7,664,638 | B2 | 2/2010 | Cooper et al. |
| 7,716,057 | B2 | 5/2010 | Horvitz |
| 7,751,285 | B1 | 7/2010 | Cain et al. |
| 7,773,460 | B2 | 8/2010 | Holt |
| 7,843,769 | B2 | 11/2010 | Ishida et al. |
| 7,898,542 | B1 | 3/2011 | Yu et al. |
| 7,907,476 | B2 | 3/2011 | Lee |
| 8,041,968 | B2 | 10/2011 | Tupman |
| 8,046,617 | B2 | 10/2011 | Fleck et al. |
| 8,059,491 | B1 | 11/2011 | Hennings-Kampa |
| D661,612 | S | 6/2012 | Hsu et al. |
| 8,238,876 | B2 | 8/2012 | Teng et al. |
| 8,245,143 | B2 | 8/2012 | Yach et al. |
| 8,364,855 | B2 | 1/2013 | James et al. |
| 8,405,663 | B2 | 3/2013 | Wikkerink et al. |
| 8,462,997 | B2 | 6/2013 | Soldan et al. |
| 8,510,217 | B1 | 8/2013 | Serowatka |
| 8,528,828 | B2 | 9/2013 | Fleischer et al. |
| 8,595,649 | B2 | 11/2013 | Sherrard et al. |
| 8,635,475 | B2 | 1/2014 | Lin et al. |
| 8,725,842 | B1 | 5/2014 | Al-Nasser |
| 8,768,648 | B2 | 7/2014 | Panther et al. |
| 8,775,844 | B1 | 7/2014 | Peterson |
| 8,847,903 | B2 | 9/2014 | Stokes et al. |
| 8,854,925 | B1 | 10/2014 | Lee et al. |
| 8,924,894 | B1 | 12/2014 | Yaksick et al. |
| 8,938,394 | B1 | 1/2015 | Faaborg et al. |
| 8,948,819 | B2 | 2/2015 | Yun et al. |
| 8,959,360 | B1 | 2/2015 | Barra |
| 8,963,894 | B2 | 2/2015 | Klassen et al. |
| 9,070,092 | B2 | 6/2015 | Shieh et al. |
| 9,082,314 | B2 | 7/2015 | Tsai |
| 9,092,912 | B1 | 7/2015 | Walden |
| 9,117,242 | B1 | 8/2015 | Ellis et al. |
| 9,123,272 | B1 | 9/2015 | Baldwin et al. |
| 9,141,270 | B1 | 9/2015 | Stuart et al. |
| 9,152,211 | B2 | 10/2015 | Gunn et al. |
| 9,152,212 | B2 | 10/2015 | Gunn |
| 9,171,268 | B1 | 10/2015 | Penilla et al. |
| 9,173,052 | B2 | 10/2015 | Hauser et al. |
| 9,189,778 | B1 | 11/2015 | Sh. Al-Rashidi |
| 9,197,738 | B2 | 11/2015 | Peev et al. |
| 9,237,855 | B2 | 1/2016 | Hong et al. |
| 9,239,605 | B1 | 1/2016 | Nanda et al. |
| 9,259,615 | B2 | 2/2016 | Weast et al. |
| 9,292,310 | B2 | 3/2016 | Chaudhri et al. |
| 9,299,099 | B1 | 3/2016 | Jayaram |
| 9,369,537 | B1 | 6/2016 | Mathew et al. |
| 9,377,762 | B2 | 6/2016 | Hoobler et al. |
| 9,436,269 | B2 | 9/2016 | Yang |
| 9,448,685 | B1 | 9/2016 | Somin et al. |
| 9,457,425 | B2 | 10/2016 | Kocienda et al. |
| 9,459,781 | B2 | 10/2016 | Kocienda et al. |
| 9,542,070 | B2 | 1/2017 | Xu et al. |
| 9,557,806 | B2 | 1/2017 | VÄYrynen |
| 9,568,891 | B2 | 2/2017 | Adams et al. |
| 9,582,165 | B2 | 2/2017 | Wilson et al. |
| 9,594,354 | B1 | 3/2017 | Kahn et al. |
| 9,600,178 | B2 | 3/2017 | Yun et al. |
| 9,606,695 | B2 | 3/2017 | Matas |
| 9,607,418 | B1 | 3/2017 | Hemminger |
| 9,625,987 | B1 | 4/2017 | Lapenna et al. |
| 9,638,730 | B2 | 5/2017 | Umamoto |
| 9,753,436 | B2 | 9/2017 | Ely et al. |
| 9,756,172 | B2 | 9/2017 | Piemonte et al. |
| 9,760,871 | B1 | 9/2017 | Pourfallah et al. |
| 9,794,397 | B2 | 10/2017 | Min et al. |
| 9,839,363 | B2 | 12/2017 | Albert |
| 9,939,872 | B2 | 4/2018 | Graham et al. |
| 10,019,599 | B1 | 7/2018 | Moran et al. |
| 10,062,133 | B1 | 8/2018 | Mishra et al. |
| 10,268,432 | B2 | 4/2019 | Kyung |
| 10,282,078 | B2 | 5/2019 | Choi |

(56) References Cited

U.S. PATENT DOCUMENTS 10,304,347 B2 5/2019 Wilson et al.
10,317,977 B2 6/2019 Yang
10,354,175 B1 7/2019 Vittimberga et al.
10,356,070 B2 7/2019 Cha et al.
10,459,887 B1 10/2019 Dvortsov et al.
10,489,508 B2 11/2019 Zhai et al.
10,620,590 B1 4/2020 Guzman et al.
10,643,246 B1 5/2020 Suprasadachandran Pillai
10,684,592 B2 6/2020 Chang et al.
10,721,711 B2 7/2020 Kirov et al.
10,761,702 B2 9/2020 Block et al.
10,788,797 B1 9/2020 Guzman et al.
10,807,005 B2 10/2020 Dugan et al.
10,817,981 B1 10/2020 Belkin
10,852,905 B1 12/2020 Guzman et al.
10,878,782 B1 12/2020 Guzman et al.
10,908,559 B1 2/2021 Guzman et al.
10,936,345 B1 3/2021 Guzman et al.
11,009,833 B2 5/2021 Essery
11,023,090 B2 6/2021 Xu et al.
11,050,873 B2 6/2021 Kim et al.
11,055,593 B1 7/2021 Sherif et al.
11,061,372 B1 7/2021 Chen et al.
11,113,875 B1 9/2021 Monaghan et al.
11,435,887 B1 9/2022 Mirho et al.
11,488,195 B1 11/2022 Jacoby et al.
11,694,590 B2 7/2023 Connor et al.
11,847,949 B2 12/2023 Huang et al.
2001/0043514 A1 11/2001 Kita et al.
2002/0054066 A1 5/2002 Kikinis et al.
2002/0054157 A1 5/2002 Hayashi et al.
2002/0054541 A1 5/2002 Hall
2002/0059623 A1 5/2002 Rodriguez et al.
2002/0081976 A1 6/2002 Fujisawa et al.
2002/0098857 A1 7/2002 Ishii
2002/0099452 A1 7/2002 Kawai
2002/0131331 A1 9/2002 Molander
2003/0002391 A1 1/2003 Biggs
2003/0027621 A1 2/2003 Libby et al.
2003/0067497 A1 4/2003 Pichon
2003/0107603 A1 6/2003 Clapper
2003/0135769 A1 7/2003 Loughran
2003/0140309 A1 7/2003 Saito et al.
2003/0157983 A1 8/2003 Kobayashi et al.
2003/0164847 A1 9/2003 Zaima et al.
2003/0169306 A1 9/2003 Makipaa et al.
2003/0214885 A1 11/2003 Powell et al.
2003/0229900 A1 12/2003 Reisman
2004/0001105 A1 1/2004 Chew et al.
2004/0006479 A1 1/2004 Tanaka
2004/0017733 A1 1/2004 Sullivan
2004/0021699 A1 2/2004 Fildebrandt
2004/0027396 A1 2/2004 Lection
2004/0047244 A1 3/2004 Iino et al.
2004/0066710 A1 4/2004 Yuen et al.
2004/0075699 A1 4/2004 Franchi et al.
2004/0075700 A1 4/2004 Liu et al.
2004/0083474 A1 4/2004 McKinlay et al.
2004/0168107 A1 8/2004 Sharp et al.
2004/0181771 A1 9/2004 Anonsen et al.
2004/0192332 A1 9/2004 Samn
2004/0203342 A1 10/2004 Sibecas et al.
2004/0218472 A1 11/2004 Narayanaswami et al.
2004/0225609 A1 11/2004 Greene
2004/0225966 A1 11/2004 Besharat et al.
2004/0243547 A1 12/2004 Chhatrapati et al.
2004/0266491 A1 12/2004 Howard et al.
2005/0041667 A1 2/2005 Miller et al.
2005/0052446 A1 3/2005 Plut
2005/0094492 A1 5/2005 Rosevear et al.
2005/0122543 A1 6/2005 Walker
2005/0124389 A1 6/2005 Yang
2005/0131816 A1 6/2005 Britto et al.
2005/0139852 A1 6/2005 Chen et al.
2005/0156873 A1 7/2005 Walter et al.
2005/0174216 A1 8/2005 Lintell
2005/0188856 A1 9/2005 Sumser et al.
2005/0190653 A1 9/2005 Chen
2005/0195173 A1 9/2005 Mckay
2005/0198319 A1 9/2005 Chan et al.
2005/0200611 A1 9/2005 Goto et al.
2005/0210394 A1 9/2005 Crandall et al.
2005/0219223 A1 10/2005 Kotzin et al.
2005/0240786 A1 10/2005 Ranganathan
2005/0244059 A1 11/2005 Turski
2005/0261031 A1 11/2005 Seo et al.
2005/0278757 A1 12/2005 Grossman et al.
2006/0007785 A1 1/2006 Fernandez et al.
2006/0020904 A1 1/2006 Aaltonen et al.
2006/0035628 A1 2/2006 Miller et al.
2006/0085765 A1 4/2006 Peterson et al.
2006/0087502 A1 4/2006 Karidis et al.
2006/0092770 A1 5/2006 Demas
2006/0123362 A1 6/2006 Keely
2006/0149546 A1 7/2006 Runge et al.
2006/0152487 A1 7/2006 Grunnet-Jepsen et al.
2006/0166708 A1 7/2006 Kim et al.
2006/0214935 A1 9/2006 Boyd et al.
2006/0239640 A1 10/2006 Watanabe et al.
2006/0277469 A1 12/2006 Chaudhri et al.
2007/0004451 A1 1/2007 C. Anderson
2007/0005569 A1 1/2007 Hurst-Hiller et al.
2007/0006096 A1 1/2007 Kim et al.
2007/0021153 A1 1/2007 Novak
2007/0052851 A1 3/2007 Ochs et al.
2007/0055947 A1 3/2007 Ostojic et al.
2007/0057775 A1 3/2007 O'reilly et al.
2007/0094330 A1 4/2007 Russell et al.
2007/0101279 A1 5/2007 Chaudhri et al.
2007/0113181 A1 5/2007 Blattner et al.
2007/0146344 A1 6/2007 Martin et al.
2007/0152979 A1 7/2007 Jobs et al.
2007/0192718 A1 8/2007 Voorhees et al.
2007/0211042 A1 9/2007 Kim et al.
2007/0213955 A1 9/2007 Ishida et al.
2007/0219901 A1 9/2007 Garbow et al.
2007/0226653 A1 9/2007 Moore et al.
2007/0236475 A1 10/2007 Wherry
2007/0239754 A1 10/2007 Schnitman et al.
2007/0250772 A1 10/2007 Milosevski
2007/0261537 A1 11/2007 Eronen et al.
2007/0279190 A1 12/2007 Lugt et al.
2007/0287140 A1 12/2007 Liebowitz
2008/0005599 A1 1/2008 Theocharous et al.
2008/0071885 A1 3/2008 Hardy et al.
2008/0082930 A1 4/2008 Omernick et al.
2008/0095470 A1 4/2008 Chao et al.
2008/0098031 A1 4/2008 Ducharme
2008/0127268 A1 5/2008 Bergeron et al.
2008/0130421 A1 6/2008 Akaiwa et al.
2008/0143729 A1 6/2008 Wyatt et al.
2008/0150959 A1 6/2008 Marui et al.
2008/0151700 A1 6/2008 Inoue et al.
2008/0167834 A1 7/2008 Herz et al.
2008/0168396 A1 7/2008 Matas et al.
2008/0174606 A1 7/2008 Rengarajan et al.
2008/0186808 A1 8/2008 Lee
2008/0192021 A1 8/2008 Lim et al.
2008/0195961 A1 8/2008 Bae et al.
2008/0201438 A1 8/2008 Mandre et al.
2008/0201647 A1 8/2008 Lagerstedt et al.
2008/0215240 A1 9/2008 Howard et al.
2008/0231429 A1 9/2008 Leonard et al.
2008/0246778 A1 10/2008 Ham et al.
2008/0247519 A1 10/2008 Abella et al.
2008/0256466 A1 10/2008 Salvador et al.
2008/0270934 A1 10/2008 Firebaugh et al.
2009/0005011 A1 1/2009 Christie et al.
2009/0005882 A1 1/2009 Boyer et al.
2009/0007017 A1 1/2009 Anzures et al.
2009/0011821 A1 1/2009 Griswold et al.
2009/0012988 A1 1/2009 Brown
2009/0016168 A1 1/2009 Smith
2009/0016492 A1 1/2009 Tsuchiya

(56) References Cited

U.S. PATENT DOCUMENTS

| | | | |
|---|---|---|---|
| 2009/0017800 | A1 | 1/2009 | Middleton |
| 2009/0031239 | A1 | 1/2009 | Coleran et al. |
| 2009/0050687 | A1 | 2/2009 | Kon et al. |
| 2009/0051327 | A1 | 2/2009 | Bohne |
| 2009/0058821 | A1 | 3/2009 | Chaudhri et al. |
| 2009/0059730 | A1 | 3/2009 | Lyons et al. |
| 2009/0068984 | A1 | 3/2009 | Burnett |
| 2009/0070675 | A1 | 3/2009 | Li |
| 2009/0077497 | A1 | 3/2009 | Cho et al. |
| 2009/0119678 | A1 | 5/2009 | Shih et al. |
| 2009/0143114 | A1 | 6/2009 | Vargas et al. |
| 2009/0146962 | A1 | 6/2009 | Ahonen et al. |
| 2009/0158173 | A1 | 6/2009 | Palahnuk et al. |
| 2009/0164923 | A1 | 6/2009 | Ovi |
| 2009/0178007 | A1 | 7/2009 | Matas et al. |
| 2009/0178008 | A1 | 7/2009 | Herz et al. |
| 2009/0183080 | A1 | 7/2009 | Thakkar et al. |
| 2009/0198581 | A1 | 8/2009 | Lidestri |
| 2009/0199130 | A1 | 8/2009 | Tsern et al. |
| 2009/0201297 | A1 | 8/2009 | Johansson |
| 2009/0227296 | A1 | 9/2009 | Kim |
| 2009/0233650 | A1 | 9/2009 | Hosono |
| 2009/0249247 | A1 | 10/2009 | Tseng et al. |
| 2009/0259958 | A1 | 10/2009 | Ban |
| 2009/0262088 | A1 | 10/2009 | Moll-Carrillo et al. |
| 2009/0264116 | A1 | 10/2009 | Thompson |
| 2009/0279392 | A1 | 11/2009 | Scott et al. |
| 2009/0284389 | A1 | 11/2009 | Klassen et al. |
| 2009/0287470 | A1 | 11/2009 | Farnsworth et al. |
| 2009/0300146 | A1 | 12/2009 | Park et al. |
| 2009/0300513 | A1 | 12/2009 | Nims et al. |
| 2009/0300598 | A1 | 12/2009 | Choi |
| 2009/0305732 | A1 | 12/2009 | Marcellino et al. |
| 2009/0312059 | A1 | 12/2009 | Pratt et al. |
| 2009/0319467 | A1 | 12/2009 | Berg et al. |
| 2009/0327886 | A1 | 12/2009 | Whytock et al. |
| 2009/0327897 | A1 | 12/2009 | Serpico et al. |
| 2010/0001980 | A1 | 1/2010 | Kim et al. |
| 2010/0015774 | A1 | 1/2010 | Shimamune et al. |
| 2010/0016771 | A1 | 1/2010 | Jardine et al. |
| 2010/0026640 | A1 | 2/2010 | Kim et al. |
| 2010/0060586 | A1 | 3/2010 | Pisula et al. |
| 2010/0062905 | A1 | 3/2010 | Rottler et al. |
| 2010/0064255 | A1 | 3/2010 | Rottler et al. |
| 2010/0064259 | A1 | 3/2010 | Alexanderovitc et al. |
| 2010/0069035 | A1 | 3/2010 | Johnson |
| 2010/0078472 | A1 | 4/2010 | Lin et al. |
| 2010/0081473 | A1 | 4/2010 | Chatterjee et al. |
| 2010/0085203 | A1 | 4/2010 | Kahn et al. |
| 2010/0088597 | A1 | 4/2010 | Shin et al. |
| 2010/0100841 | A1 | 4/2010 | Shin et al. |
| 2010/0107070 | A1 | 4/2010 | Devineni et al. |
| 2010/0110082 | A1 | 5/2010 | Myrick et al. |
| 2010/0124152 | A1 | 5/2010 | Lee |
| 2010/0146437 | A1 | 6/2010 | Woodcock et al. |
| 2010/0146463 | A1 | 6/2010 | Cho et al. |
| 2010/0149573 | A1 | 6/2010 | Pat et al. |
| 2010/0156833 | A1 | 6/2010 | Kim et al. |
| 2010/0157742 | A1 | 6/2010 | Relyea et al. |
| 2010/0167712 | A1 | 7/2010 | Stallings et al. |
| 2010/0205563 | A1 | 8/2010 | Haapsaari et al. |
| 2010/0217657 | A1 | 8/2010 | Gazdzinski et al. |
| 2010/0217808 | A1 | 8/2010 | Benninger |
| 2010/0218089 | A1 | 8/2010 | Chao et al. |
| 2010/0223563 | A1 | 9/2010 | Green |
| 2010/0225495 | A1 | 9/2010 | Marui |
| 2010/0226213 | A1 | 9/2010 | Drugge |
| 2010/0235726 | A1 | 9/2010 | Ording et al. |
| 2010/0243516 | A1 | 9/2010 | Martin et al. |
| 2010/0248688 | A1 | 9/2010 | Teng et al. |
| 2010/0257469 | A1 | 10/2010 | Kim et al. |
| 2010/0281374 | A1 | 11/2010 | Schulz et al. |
| 2010/0289723 | A1 | 11/2010 | London |
| 2010/0309149 | A1 | 12/2010 | Blumenberg et al. |
| 2011/0000968 | A1 | 1/2011 | Phillips et al. |
| 2011/0003665 | A1 | 1/2011 | Burton et al. |
| 2011/0004835 | A1 | 1/2011 | Yanchar et al. |
| 2011/0007611 | A1 | 1/2011 | Kato et al. |
| 2011/0022294 | A1 | 1/2011 | Apley |
| 2011/0025719 | A1 | 2/2011 | Yanase et al. |
| 2011/0026368 | A1 | 2/2011 | Relyea |
| 2011/0029870 | A1 | 2/2011 | May et al. |
| 2011/0047014 | A1 | 2/2011 | De |
| 2011/0055735 | A1 | 3/2011 | Wood et al. |
| 2011/0061010 | A1 | 3/2011 | Wasko et al. |
| 2011/0070924 | A1 | 3/2011 | Kim et al. |
| 2011/0071818 | A1 | 3/2011 | Jiang |
| 2011/0074807 | A1 | 3/2011 | Inada et al. |
| 2011/0076992 | A1 | 3/2011 | Chou et al. |
| 2011/0078624 | A1 | 3/2011 | Missig et al. |
| 2011/0080411 | A1 | 4/2011 | Wikkerink et al. |
| 2011/0083111 | A1 | 4/2011 | Forutanpour et al. |
| 2011/0098928 | A1 | 4/2011 | Hoffman et al. |
| 2011/0109540 | A1 | 5/2011 | Milne et al. |
| 2011/0115721 | A1 | 5/2011 | Li et al. |
| 2011/0119610 | A1 | 5/2011 | Hackborn et al. |
| 2011/0137776 | A1 | 6/2011 | Goad et al. |
| 2011/0138329 | A1 | 6/2011 | Wells et al. |
| 2011/0151415 | A1 | 6/2011 | Darling et al. |
| 2011/0157046 | A1 | 6/2011 | Lee et al. |
| 2011/0166777 | A1 | 7/2011 | Chavakula |
| 2011/0173221 | A1 | 7/2011 | Ahiakpor et al. |
| 2011/0179126 | A1 | 7/2011 | Wetherell et al. |
| 2011/0179372 | A1 | 7/2011 | Moore et al. |
| 2011/0181521 | A1 | 7/2011 | Reid et al. |
| 2011/0182151 | A1 | 7/2011 | Geyer et al. |
| 2011/0191661 | A1 | 8/2011 | Phillips et al. |
| 2011/0193878 | A1 | 8/2011 | Seo et al. |
| 2011/0197165 | A1 | 8/2011 | Filippov et al. |
| 2011/0202834 | A1 | 8/2011 | Mandryk et al. |
| 2011/0202883 | A1 | 8/2011 | Oh et al. |
| 2011/0205851 | A1 | 8/2011 | Harris |
| 2011/0218765 | A1 | 9/2011 | Rogers et al. |
| 2011/0230986 | A1 | 9/2011 | Lafortune et al. |
| 2011/0234152 | A1 | 9/2011 | Frossen et al. |
| 2011/0237221 | A1 | 9/2011 | Prakash et al. |
| 2011/0248992 | A1 | 10/2011 | Van et al. |
| 2011/0250950 | A1 | 10/2011 | Nonaka |
| 2011/0256848 | A1 | 10/2011 | Bok et al. |
| 2011/0261079 | A1 | 10/2011 | Ingrassia et al. |
| 2011/0275940 | A1 | 11/2011 | Nims et al. |
| 2011/0281342 | A1 | 11/2011 | Porsch et al. |
| 2011/0282697 | A1 | 11/2011 | Fitzgerald et al. |
| 2011/0296324 | A1 | 12/2011 | Goossens et al. |
| 2011/0306421 | A1 | 12/2011 | Nishimoto et al. |
| 2011/0307377 | A1 | 12/2011 | Nelsen et al. |
| 2011/0316858 | A1 | 12/2011 | Shen et al. |
| 2011/0320938 | A1 | 12/2011 | Schorsch et al. |
| 2012/0001922 | A1 | 1/2012 | Escher et al. |
| 2012/0013552 | A1 | 1/2012 | Ahn |
| 2012/0017180 | A1 | 1/2012 | Flik et al. |
| 2012/0028707 | A1 | 2/2012 | Raitt et al. |
| 2012/0036220 | A1 | 2/2012 | Dare et al. |
| 2012/0036433 | A1 | 2/2012 | Zimmer et al. |
| 2012/0047447 | A1 | 2/2012 | Haq |
| 2012/0054651 | A1 | 3/2012 | Tsai |
| 2012/0059787 | A1 | 3/2012 | Brown et al. |
| 2012/0062470 | A1 | 3/2012 | Chang et al. |
| 2012/0077554 | A1 | 3/2012 | Ahn et al. |
| 2012/0078788 | A1 | 3/2012 | Gandhi |
| 2012/0079375 | A1 | 3/2012 | Ogino et al. |
| 2012/0084729 | A1 | 4/2012 | Lin et al. |
| 2012/0092383 | A1 | 4/2012 | Hysek et al. |
| 2012/0095918 | A1 | 4/2012 | Jurss |
| 2012/0110438 | A1 | 5/2012 | Peraza et al. |
| 2012/0110456 | A1 | 5/2012 | Larco et al. |
| 2012/0113762 | A1 | 5/2012 | Frost |
| 2012/0116550 | A1 | 5/2012 | Hoffman et al. |
| 2012/0117507 | A1 | 5/2012 | Tseng et al. |
| 2012/0124499 | A1 | 5/2012 | Tsai et al. |
| 2012/0150327 | A1 | 6/2012 | Altman et al. |
| 2012/0150750 | A1 | 6/2012 | Law et al. |
| 2012/0154156 | A1 | 6/2012 | Kuntzel |
| 2012/0182226 | A1 | 7/2012 | Tuli |

(56) References Cited

U.S. PATENT DOCUMENTS

2012/0197523 A1 8/2012 Kirsch
2012/0197743 A1 8/2012 Grigg et al.
2012/0202187 A1 8/2012 Brinkerhoff, III
2012/0210263 A1 8/2012 Perry et al.
2012/0212495 A1 8/2012 Butcher et al.
2012/0218201 A1 8/2012 Tamas et al.
2012/0231849 A1 9/2012 Yamashita et al.
2012/0243735 A1 9/2012 Wu et al.
2012/0245941 A1 9/2012 Cheyer
2012/0253986 A1 10/2012 Chang
2012/0254804 A1 10/2012 Sheha et al.
2012/0254810 A1 10/2012 Heck et al.
2012/0288139 A1 11/2012 Singhar
2012/0297346 A1 11/2012 Hoffknecht et al.
2012/0304084 A1 11/2012 Kim et al.
2012/0319984 A1 12/2012 Borovsky et al.
2012/0320081 A1 12/2012 Kim et al.
2012/0323933 A1 12/2012 He et al.
2012/0324390 A1 12/2012 Tao et al.
2013/0007665 A1 1/2013 Chaudhri et al.
2013/0019175 A1 1/2013 Kotler et al.
2013/0021236 A1 1/2013 Bender et al.
2013/0024371 A1 1/2013 Hariramani et al.
2013/0027412 A1 1/2013 Roddy
2013/0030892 A1 1/2013 Liu et al.
2013/0044072 A1 2/2013 Kobayashi et al.
2013/0044080 A1 2/2013 Chiang
2013/0050263 A1 2/2013 Khoe et al.
2013/0055147 A1 2/2013 Vasudev et al.
2013/0057566 A1 3/2013 Kriese et al.
2013/0063084 A1 3/2013 Tilvis et al.
2013/0063383 A1 3/2013 Anderssonreimer et al.
2013/0067407 A1 3/2013 Dehmann
2013/0069893 A1 3/2013 Brinda et al.
2013/0076757 A1 3/2013 Pritting
2013/0082965 A1 4/2013 Wada et al.
2013/0091443 A1 4/2013 Park et al.
2013/0107674 A1 5/2013 Gossweiler et al.
2013/0111550 A1 5/2013 Naveh et al.
2013/0111579 A1 5/2013 Newman et al.
2013/0116967 A1 5/2013 Akcasu et al.
2013/0121119 A1 5/2013 Umamoto
2013/0132888 A1 5/2013 Tijssen
2013/0141371 A1 6/2013 Hallford et al.
2013/0143512 A1 6/2013 Hernandez et al.
2013/0147825 A1 6/2013 Martin et al.
2013/0151636 A1 6/2013 Majeti et al.
2013/0157646 A1 6/2013 Ferren et al.
2013/0170324 A1 7/2013 Tu et al.
2013/0185285 A1 7/2013 Shuman et al.
2013/0185813 A1 7/2013 Shim et al.
2013/0191785 A1 7/2013 Wu et al.
2013/0205194 A1 8/2013 Decker et al.
2013/0215044 A1 8/2013 Ahn et al.
2013/0215226 A1 8/2013 Chauvier et al.
2013/0222271 A1 8/2013 Alberth et al.
2013/0225152 A1 8/2013 Matthews et al.
2013/0227705 A1 8/2013 Yoon et al.
2013/0232443 A1 9/2013 Ryu et al.
2013/0234964 A1 9/2013 Kim et al.
2013/0238686 A1 9/2013 O'donoghue et al.
2013/0239060 A1 9/2013 Kang et al.
2013/0239063 A1 9/2013 Ubillos et al.
2013/0246954 A1 9/2013 Gray et al.
2013/0254705 A1 9/2013 Mooring et al.
2013/0305189 A1 11/2013 Kim
2013/0314204 A1 11/2013 Ho et al.
2013/0316763 A1 11/2013 Kader
2013/0318437 A1 11/2013 Jung et al.
2013/0318466 A1 11/2013 Estrada et al.
2013/0322218 A1 12/2013 Burkhardt et al.
2013/0326418 A1 12/2013 Utsuki et al.
2013/0332721 A1 12/2013 Chaudhri et al.
2013/0332856 A1 12/2013 Sanders et al.
2013/0345978 A1 12/2013 Lush et al.
2013/0345980 A1 12/2013 Van Os et al.
2014/0013414 A1 1/2014 Bruck et al.
2014/0013945 A1 1/2014 Tanaka et al.
2014/0020068 A1 1/2014 Desai et al.
2014/0022183 A1 1/2014 Ayoub et al.
2014/0037109 A1 2/2014 Ban
2014/0043367 A1 2/2014 Sakaino et al.
2014/0043547 A1 2/2014 Marhefka
2014/0047389 A1 2/2014 Aarabi
2014/0047525 A1 2/2014 Bonhoff
2014/0052794 A1 2/2014 Tucker et al.
2014/0055495 A1 2/2014 Kim et al.
2014/0059493 A1 2/2014 Kim
2014/0063049 A1 3/2014 Armstrong-muntner
2014/0063186 A2 3/2014 Chauvier et al.
2014/0068755 A1 3/2014 King et al.
2014/0074570 A1 3/2014 Hope et al.
2014/0074675 A1 3/2014 Calman et al.
2014/0080465 A1 3/2014 Cho
2014/0082533 A1 3/2014 Kelley et al.
2014/0086123 A1 3/2014 Deivasigamani et al.
2014/0094224 A1 4/2014 Lozovoy et al.
2014/0101169 A1 4/2014 Kurata et al.
2014/0125620 A1 5/2014 Panther et al.
2014/0126336 A1 5/2014 Goeller et al.
2014/0129959 A1 5/2014 Battles et al.
2014/0135631 A1 5/2014 Brumback et al.
2014/0139454 A1 5/2014 Mistry et al.
2014/0139637 A1 5/2014 Mistry et al.
2014/0143671 A1 5/2014 Kovalick
2014/0143678 A1 5/2014 Mistry et al.
2014/0143737 A1 5/2014 Mistry et al.
2014/0157189 A1 6/2014 Morita
2014/0157321 A1 6/2014 Kurita et al.
2014/0164907 A1 6/2014 Jung et al.
2014/0171132 A1 6/2014 Ziemianska et al.
2014/0173439 A1 6/2014 Gutierrez et al.
2014/0173517 A1 * 6/2014 Chaudhri ............ G06F 3/04883 715/830
2014/0179272 A1 6/2014 Zhang et al.
2014/0189578 A1 7/2014 Shuttleworth et al.
2014/0189584 A1 7/2014 Weng et al.
2014/0195476 A1 7/2014 Sxhmidt
2014/0200691 A1 7/2014 Lee et al.
2014/0201655 A1 7/2014 Mahaffey et al.
2014/0207679 A1 7/2014 Cho
2014/0210708 A1 7/2014 Simmons et al.
2014/0210801 A1 7/2014 Li
2014/0215361 A1 7/2014 Hwang et al.
2014/0229752 A1 8/2014 Lee et al.
2014/0244009 A1 8/2014 Mestas
2014/0244165 A1 8/2014 Bells et al.
2014/0245161 A1 8/2014 Yuen et al.
2014/0245177 A1 8/2014 Maklouf et al.
2014/0250374 A1 9/2014 Ohki et al.
2014/0250391 A1 9/2014 Jong et al.
2014/0253487 A1 9/2014 Bezinge et al.
2014/0258935 A1 9/2014 Nishida et al.
2014/0267303 A1 9/2014 Larkin et al.
2014/0276244 A1 9/2014 Kamyar
2014/0279454 A1 9/2014 Raman et al.
2014/0279474 A1 9/2014 Evans et al.
2014/0279530 A1 9/2014 Douglas et al.
2014/0279543 A1 9/2014 Ruhrig
2014/0282103 A1 9/2014 Jerry
2014/0282153 A1 9/2014 Christiansen et al.
2014/0282207 A1 9/2014 Wouhaybi et al.
2014/0282254 A1 9/2014 Feiereisen et al.
2014/0289660 A1 9/2014 Min
2014/0293755 A1 10/2014 Geiser et al.
2014/0302834 A1 10/2014 Jones
2014/0304664 A1 10/2014 Lee et al.
2014/0310350 A1 10/2014 Borggaard et al.
2014/0310618 A1 10/2014 Venkatesh
2014/0310643 A1 10/2014 Karmanenko et al.
2014/0317543 A1 10/2014 Kim
2014/0325384 A1 10/2014 Kobayashi
2014/0325408 A1 10/2014 Leppanen et al.
2014/0328151 A1 11/2014 Serber

(56) References Cited

U.S. PATENT DOCUMENTS

2014/0331314 A1 11/2014 Fujioka
2014/0342792 A1 11/2014 Markus
2014/0344723 A1 11/2014 Malik et al.
2014/0344820 A1 11/2014 Kumar
2014/0344951 A1 11/2014 Brewer
2014/0347275 A1 11/2014 Jung et al.
2014/0359124 A1 12/2014 Adimatyam et al.
2014/0359456 A1 12/2014 Thiele et al.
2014/0359477 A1 12/2014 Chen
2014/0362093 A1 12/2014 Lorach
2014/0362105 A1 12/2014 Kocienda et al.
2014/0365956 A1 12/2014 Karunamuni et al.
2014/0371887 A1 12/2014 Hoffman et al.
2014/0372920 A1 12/2014 Choi et al.
2014/0379341 A1 12/2014 Seo et al.
2014/0379557 A1 12/2014 Brown
2014/0380229 A1 12/2014 Volodin et al.
2015/0003595 A1 1/2015 Yaghi et al.
2015/0005039 A1 1/2015 Liu et al.
2015/0011204 A1 1/2015 Seo et al.
2015/0015500 A1 1/2015 Lee et al.
2015/0019981 A1 1/2015 Petitt et al.
2015/0019982 A1 1/2015 Petitt et al.
2015/0022438 A1 1/2015 Hong
2015/0026615 A1 1/2015 Choi et al.
2015/0037545 A1 2/2015 Sun
2015/0042571 A1 2/2015 Lombardi et al.
2015/0043046 A1 2/2015 Iwamoto
2015/0044964 A1 2/2015 Khan et al.
2015/0049033 A1 2/2015 Kim et al.
2015/0052461 A1 2/2015 Sullivan et al.
2015/0055197 A1 2/2015 Romanoff et al.
2015/0058651 A1 2/2015 Choi et al.
2015/0061988 A1 3/2015 Galu, Jr.
2015/0062052 A1 3/2015 Bernstein et al.
2015/0062130 A1 3/2015 Ho
2015/0067596 A1 3/2015 Brown et al.
2015/0070378 A1 3/2015 Kriese et al.
2015/0071043 A1 3/2015 Kubota
2015/0073983 A1 3/2015 Bartenstein et al.
2015/0081474 A1 3/2015 Kostka et al.
2015/0082193 A1 3/2015 Wallace et al.
2015/0082446 A1 3/2015 Flowers et al.
2015/0083970 A1 3/2015 Koh et al.
2015/0091903 A1 4/2015 Costello et al.
2015/0100621 A1 4/2015 Pan
2015/0105125 A1 4/2015 Min et al.
2015/0106221 A1 4/2015 Tapley et al.
2015/0106752 A1 4/2015 Yang
2015/0110419 A1 4/2015 Xu et al.
2015/0111558 A1 4/2015 Yang
2015/0112700 A1 4/2015 Sublett et al.
2015/0113468 A1 4/2015 Clark
2015/0117162 A1 4/2015 Tsai et al.
2015/0118657 A1 4/2015 Shrake et al.
2015/0128042 A1 5/2015 Churchill et al.
2015/0128078 A1 5/2015 Oh et al.
2015/0143234 A1 5/2015 Norris, III
2015/0160806 A1 6/2015 Fey et al.
2015/0160812 A1 6/2015 Yuan et al.
2015/0160856 A1 6/2015 Jang et al.
2015/0163210 A1 6/2015 Meyers et al.
2015/0172438 A1 6/2015 Yang
2015/0185703 A1 7/2015 Tanaka
2015/0185995 A1 7/2015 Shoemaker et al.
2015/0193867 A1 7/2015 Del Vecchio et al.
2015/0194137 A1 7/2015 Wyatt
2015/0205509 A1 7/2015 Scriven et al.
2015/0207922 A1 7/2015 Kobayashi et al.
2015/0217163 A1 8/2015 Amis et al.
2015/0220265 A1 8/2015 Takahashi
2015/0220299 A1 8/2015 Kim et al.
2015/0228048 A1 8/2015 Heo et al.
2015/0248235 A1 9/2015 Offenberg et al.
2015/0253736 A1 9/2015 Watterson
2015/0253740 A1 9/2015 Nishijima et al.
2015/0254875 A1 9/2015 Zhang
2015/0261284 A1 9/2015 Lee et al.
2015/0264111 A1 9/2015 Aleksandrov
2015/0277545 A1 10/2015 Flowers et al.
2015/0278814 A1 10/2015 Jaffe
2015/0286372 A1 10/2015 Swindell et al.
2015/0286391 A1 10/2015 Jacobs et al.
2015/0301506 A1 10/2015 Koumaiha
2015/0301608 A1 10/2015 Nagaraju et al.
2015/0302624 A1 10/2015 Burke
2015/0317945 A1 11/2015 Andress et al.
2015/0331589 A1 11/2015 Kawakita
2015/0339261 A1 11/2015 Jha et al.
2015/0339846 A1 11/2015 Holzer et al.
2015/0340025 A1 11/2015 Shima
2015/0341616 A1 11/2015 Siegel et al.
2015/0346694 A1 12/2015 Hoobler et al.
2015/0346824 A1 12/2015 Chen et al.
2015/0348001 A1 12/2015 Van Os et al.
2015/0355830 A1 12/2015 Chaudhri et al.
2015/0365892 A1 12/2015 Ma et al.
2015/0366518 A1 12/2015 Sampson
2015/0370469 A1 12/2015 Leong et al.
2015/0378592 A1 12/2015 Kim
2015/0379476 A1 12/2015 Chaudhri et al.
2016/0004393 A1 1/2016 Faaborg et al.
2016/0004773 A1 1/2016 Jannink et al.
2016/0011768 A1 1/2016 Yim et al.
2016/0019360 A1 1/2016 Pahwa et al.
2016/0022202 A1 1/2016 Peterson et al.
2016/0027420 A1 1/2016 Eronen
2016/0034133 A1 2/2016 Wilson et al.
2016/0034148 A1 2/2016 Wilson et al.
2016/0034152 A1* 2/2016 Wilson .................. G06F 3/0416
715/835
2016/0034166 A1 2/2016 Wilson et al.
2016/0034167 A1 2/2016 Wilson et al.
2016/0041597 A1 2/2016 Graham et al.
2016/0044091 A1 2/2016 Doumet
2016/0044442 A1 2/2016 Pacelli et al.
2016/0048161 A1 2/2016 Carceroni et al.
2016/0048283 A1 2/2016 Yang et al.
2016/0049106 A1 2/2016 Connell et al.
2016/0054710 A1 2/2016 Jo et al.
2016/0054892 A1 2/2016 Kim et al.
2016/0058336 A1 3/2016 Blahnik et al.
2016/0058337 A1 3/2016 Blahnik et al.
2016/0062450 A1 3/2016 Han et al.
2016/0062540 A1 3/2016 Yang et al.
2016/0062541 A1 3/2016 Anzures et al.
2016/0062570 A1 3/2016 Dascola et al.
2016/0062572 A1 3/2016 Yang et al.
2016/0062582 A1 3/2016 Wilson et al.
2016/0062589 A1 3/2016 Wan et al.
2016/0062630 A1 3/2016 Anzures et al.
2016/0073034 A1 3/2016 Mukherjee et al.
2016/0085397 A1 3/2016 Jain
2016/0086150 A1 3/2016 Gomi et al.
2016/0086166 A1 3/2016 Pomeroy et al.
2016/0091867 A1 3/2016 Mansour et al.
2016/0098137 A1 4/2016 Kim et al.
2016/0098882 A1 4/2016 Holdych et al.
2016/0103427 A1 4/2016 Westra et al.
2016/0104159 A1 4/2016 Butterfield et al.
2016/0117670 A1 4/2016 Davis
2016/0134840 A1 5/2016 Mcculloch
2016/0142763 A1 5/2016 Kim et al.
2016/0156574 A1 6/2016 Hum et al.
2016/0165037 A1 6/2016 Youn et al.
2016/0165038 A1 6/2016 Lim et al.
2016/0166197 A1 6/2016 Venkatraman et al.
2016/0170731 A1 6/2016 Maddern et al.
2016/0171481 A1 6/2016 Mcelmurry et al.
2016/0179353 A1 6/2016 Iskander
2016/0180316 A1 6/2016 Wang et al.
2016/0180325 A1 6/2016 Davis et al.
2016/0180568 A1 6/2016 Bullivant et al.
2016/0180578 A1 6/2016 Vegesna

(56) References Cited

U.S. PATENT DOCUMENTS

2016/0187995 A1 6/2016 Rosewall
2016/0188179 A1 6/2016 Roh
2016/0188181 A1 6/2016 Smith
2016/0189328 A1 6/2016 Vranjes et al.
2016/0189717 A1 6/2016 Kannan et al.
2016/0191511 A1 6/2016 Tijerina et al.
2016/0192324 A1 6/2016 Zhang et al.
2016/0205244 A1 7/2016 Dvortsov
2016/0210934 A1 7/2016 Halfman et al.
2016/0217601 A1 7/2016 Tsuda et al.
2016/0225371 A1 8/2016 Agrawal et al.
2016/0259518 A1 9/2016 King et al.
2016/0259656 A1 9/2016 Sumner et al.
2016/0260031 A1 9/2016 Pace et al.
2016/0261675 A1 9/2016 Block et al.
2016/0266548 A1 9/2016 Akiyama
2016/0267447 A1 9/2016 Davis et al.
2016/0277342 A1 9/2016 Shi
2016/0283094 A1 9/2016 Choi
2016/0292663 A1 10/2016 Sagan et al.
2016/0299679 A1 10/2016 Park et al.
2016/0313869 A1 10/2016 Jang et al.
2016/0320756 A1 11/2016 Lee et al.
2016/0327911 A1 11/2016 Eim et al.
2016/0327915 A1 11/2016 Katzer et al.
2016/0332025 A1 11/2016 Repka
2016/0342327 A1 11/2016 Chi et al.
2016/0352667 A1 12/2016 Pickett et al.
2016/0357151 A1 12/2016 Block et al.
2016/0357282 A1 12/2016 Block et al.
2016/0357354 A1 12/2016 Chen et al.
2016/0357386 A1 12/2016 Choi
2016/0357413 A1 12/2016 Block et al.
2016/0358167 A1 12/2016 Van Os et al.
2016/0358311 A1 12/2016 Chen et al.
2016/0364715 A1 12/2016 Cho et al.
2016/0378067 A1 12/2016 Bishop
2016/0378186 A1 12/2016 Kim
2017/0003659 A1 1/2017 Nakanishi
2017/0004484 A1 1/2017 Seol et al.
2017/0004798 A1 1/2017 Park et al.
2017/0011210 A1 1/2017 Cheong et al.
2017/0039535 A1 2/2017 Park et al.
2017/0040001 A1 2/2017 Zhang et al.
2017/0045993 A1 2/2017 Oh et al.
2017/0046024 A1 2/2017 Dascola et al.
2017/0046052 A1 2/2017 Lee et al.
2017/0046111 A1 2/2017 Chu et al.
2017/0046339 A1 2/2017 Bhat et al.
2017/0053542 A1 2/2017 Wilson et al.
2017/0061934 A1 3/2017 Shin
2017/0068407 A1 3/2017 Wilson et al.
2017/0075305 A1 3/2017 Ryu et al.
2017/0075316 A1 3/2017 Berdinis et al.
2017/0082983 A1 3/2017 Katzer et al.
2017/0085887 A1 3/2017 Rosewarne et al.
2017/0090589 A1 3/2017 Sharma et al.
2017/0105081 A1 4/2017 Jin et al.
2017/0109011 A1 4/2017 Jiang
2017/0123498 A1 5/2017 Dillon et al.
2017/0123571 A1 5/2017 Huang et al.
2017/0123640 A1 5/2017 Wilson et al.
2017/0127354 A1 5/2017 Garland et al.
2017/0131886 A1 5/2017 Kim et al.
2017/0134321 A1 5/2017 Ushio et al.
2017/0149795 A1 5/2017 Day, II
2017/0154328 A1 6/2017 Zarakas et al.
2017/0160898 A1 6/2017 Lee et al.
2017/0164292 A1 6/2017 Santamaria et al.
2017/0176950 A1 6/2017 Jung et al.
2017/0180813 A1 6/2017 Kang et al.
2017/0186399 A1 6/2017 Moritani et al.
2017/0193501 A1 7/2017 Cole et al.
2017/0209766 A1 7/2017 Riley et al.
2017/0212648 A1 7/2017 Choi et al.
2017/0228704 A1 8/2017 Zhou et al.
2017/0230236 A1 8/2017 Kim et al.
2017/0236497 A1 8/2017 Huitema et al.
2017/0237692 A1 8/2017 Sheth et al.
2017/0255169 A1 9/2017 Lee et al.
2017/0257426 A1 9/2017 Wilbur et al.
2017/0266494 A1 9/2017 Crankson et al.
2017/0269715 A1 9/2017 Kim et al.
2017/0269792 A1 9/2017 Xu et al.
2017/0277136 A1 9/2017 Minami et al.
2017/0286614 A1 10/2017 Morris et al.
2017/0286913 A1 10/2017 Liu et al.
2017/0287312 A1 10/2017 Schofield et al.
2017/0294174 A1 10/2017 Albadawi et al.
2017/0300013 A1 10/2017 Satou et al.
2017/0322658 A1 11/2017 Lee et al.
2017/0322711 A1 11/2017 Robinson et al.
2017/0325196 A1 11/2017 Cho et al.
2017/0329477 A1 11/2017 Sachidanandam et al.
2017/0337554 A1 11/2017 Mokhasi et al.
2017/0339347 A1 11/2017 Cho et al.
2017/0344526 A1 11/2017 Smith et al.
2017/0354845 A1 12/2017 Williams et al.
2017/0357329 A1 12/2017 Park et al.
2017/0357358 A1 12/2017 Teutschler et al.
2017/0357413 A1 12/2017 Green
2017/0357426 A1* 12/2017 Wilson ................ G06F 3/04845
2017/0357427 A1 12/2017 Wilson et al.
2017/0357443 A1 12/2017 Paek et al.
2017/0357495 A1 12/2017 Crane et al.
2017/0371394 A1 12/2017 Chan et al.
2018/0011450 A1 1/2018 Stackowski
2018/0024619 A1 1/2018 Kasuo et al.
2018/0033311 A1 2/2018 Berggren
2018/0039232 A1 2/2018 Abramov et al.
2018/0052428 A1 2/2018 Abramov
2018/0053169 A1 2/2018 James
2018/0059903 A1 3/2018 Lim et al.
2018/0061308 A1 3/2018 Bae et al.
2018/0067633 A1 3/2018 Wilson et al.
2018/0074462 A1 3/2018 Helder et al.
2018/0081515 A1* 3/2018 Block ..................... G06F 1/163
2018/0088537 A1 3/2018 Murai
2018/0088733 A1 3/2018 Syed et al.
2018/0088797 A1 3/2018 Mcatee et al.
2018/0097925 A1 4/2018 Ryu et al.
2018/0109482 A1 4/2018 Deluca et al.
2018/0113579 A1 4/2018 Johnston et al.
2018/0120927 A1 5/2018 Ma et al.
2018/0121060 A1 5/2018 Jeong et al.
2018/0136810 A1 5/2018 Martin et al.
2018/0143748 A1 5/2018 Ahmed et al.
2018/0150212 A1 5/2018 Chen et al.
2018/0150443 A1 5/2018 Singleton
2018/0157452 A1 6/2018 Nelson et al.
2018/0174550 A1 6/2018 Zhang et al.
2018/0181078 A1 6/2018 Imamura
2018/0181381 A1 6/2018 Michaely et al.
2018/0188925 A1 7/2018 Na et al.
2018/0197170 A1 7/2018 Zhang et al.
2018/0205675 A1 7/2018 Koo et al.
2018/0218359 A1 8/2018 Kim et al.
2018/0240086 A1 8/2018 Sobotka
2018/0246635 A1 8/2018 Baer et al.
2018/0246639 A1 8/2018 Han et al.
2018/0260080 A1 9/2018 Cho
2018/0261183 A1 9/2018 Gou et al.
2018/0275739 A1 9/2018 Minami et al.
2018/0288560 A1 10/2018 Naik et al.
2018/0316783 A1 11/2018 Ye et al.
2018/0321842 A1 11/2018 Lee et al.
2018/0329587 A1 11/2018 Ko et al.
2018/0335927 A1 11/2018 Anzures et al.
2018/0335928 A1 11/2018 Van Os et al.
2018/0336543 A1 11/2018 Van Os et al.
2018/0341389 A1 11/2018 Kim et al.
2018/0343023 A1 11/2018 Park et al.
2018/0348844 A1 12/2018 Lingutla et al.
2018/0352435 A1 12/2018 Donley et al.

(56) References Cited

U.S. PATENT DOCUMENTS

2018/0364648 A1 12/2018 Chi et al.
2018/0366068 A1 12/2018 Liu et al.
2018/0374429 A1 12/2018 Nakamura
2019/0018445 A1 1/2019 Watanabe et al.
2019/0050045 A1 2/2019 Jha et al.
2019/0069244 A1 2/2019 Jeon et al.
2019/0072909 A1 3/2019 Misaki et al.
2019/0079576 A1 3/2019 Liu et al.
2019/0101869 A1 4/2019 Lee et al.
2019/0121300 A1 4/2019 Peterson et al.
2019/0121523 A1 4/2019 Block et al.
2019/0139207 A1 5/2019 Jeong et al.
2019/0163142 A1 5/2019 Chang et al.
2019/0180221 A1 6/2019 Greenberger et al.
2019/0181078 A1 6/2019 Yamamoto et al.
2019/0182749 A1 6/2019 Breaux et al.
2019/0212707 A1 7/2019 Minami et al.
2019/0213037 A1 7/2019 Kim et al.
2019/0235748 A1 8/2019 Seol et al.
2019/0237003 A1 8/2019 Cao et al.
2019/0250813 A1 8/2019 Block et al.
2019/0268771 A1 8/2019 Seo et al.
2019/0279520 A1 9/2019 Wilson et al.
2019/0281154 A1 9/2019 Choi et al.
2019/0302972 A1 10/2019 Kline et al.
2019/0324404 A1 10/2019 Olwal
2019/0324620 A1 10/2019 Gu et al.
2019/0339860 A1* 11/2019 Chen ........................ G06F 3/048
2019/0340348 A1 11/2019 Yu et al.
2019/0349469 A1 11/2019 Skogen et al.
2020/0042311 A1 2/2020 Shin
2020/0050332 A1 2/2020 Yang et al.
2020/0068095 A1 2/2020 Nabetani
2020/0073122 A1 3/2020 Rothkopf et al.
2020/0089302 A1 3/2020 Kim et al.
2020/0110946 A1 4/2020 Kline et al.
2020/0125037 A1 4/2020 Jo et al.
2020/0133206 A1 4/2020 Jo et al.
2020/0143353 A1 5/2020 Van Os et al.
2020/0175485 A1 6/2020 Knock
2020/0228646 A1 7/2020 Hotes et al.
2020/0242228 A1 7/2020 Farraro et al.
2020/0249632 A1 8/2020 Olwal et al.
2020/0264567 A1 8/2020 Ok et al.
2020/0302518 A1 9/2020 Van Os et al.
2020/0319348 A1 10/2020 Oshita et al.
2020/0327862 A1 10/2020 Sinha et al.
2020/0342144 A1 10/2020 Alameh et al.
2020/0348827 A1 11/2020 Wilson et al.
2020/0356063 A1 11/2020 Guzman et al.
2020/0356224 A1 11/2020 Wilson
2020/0356242 A1 11/2020 Wilson et al.
2020/0356252 A1 11/2020 Ko et al.
2020/0356687 A1 11/2020 Salzman et al.
2020/0359204 A1 11/2020 Hawkins et al.
2020/0379413 A1 12/2020 Chen et al.
2020/0408521 A1 12/2020 Lyons et al.
2021/0027269 A1 1/2021 Van Os et al.
2021/0042028 A1 2/2021 Block et al.
2021/0048929 A1 2/2021 Agnoli et al.
2021/0073007 A1 3/2021 Guzman et al.
2021/0132780 A1 5/2021 Kyung
2021/0149694 A1 5/2021 Guzman et al.
2021/0201732 A1 7/2021 Ranjan et al.
2021/0216654 A1 7/2021 Ko et al.
2021/0272092 A1 9/2021 Van Os et al.
2021/0294438 A1 9/2021 Yang et al.
2021/0311619 A1 10/2021 Winnemoeller et al.
2021/0349426 A1 11/2021 Chen et al.
2021/0349427 A1 11/2021 Chen et al.
2021/0349583 A1 11/2021 Guzman et al.
2021/0349611 A1 11/2021 Chen et al.
2021/0349741 A1 11/2021 Guzman et al.
2022/0091567 A1 3/2022 Minami et al.
2022/0157184 A1 5/2022 Wilson et al.
2022/0172200 A1 6/2022 Shen et al.
2022/0184309 A1 6/2022 Rosinko et al.
2022/0198984 A1 6/2022 Connor et al.
2022/0214785 A1 7/2022 Giv
2022/0221964 A1 7/2022 Ko et al.
2022/0229537 A1 7/2022 Chen et al.
2022/0236867 A1 7/2022 Chen et al.
2022/0244782 A1 8/2022 Robert et al.
2022/0245618 A1 8/2022 King et al.
2022/0276780 A1 9/2022 Ko et al.
2022/0342514 A1 10/2022 Chao et al.
2023/0004270 A1 1/2023 Chen et al.
2023/0004406 A1 1/2023 Hu et al.
2023/0008229 A1 1/2023 Chen et al.
2023/0035532 A1 2/2023 Chen et al.
2023/0071987 A1 3/2023 Zeng et al.
2023/0078153 A1 3/2023 Yang et al.
2023/0082876 A1 3/2023 Guzman et al.
2023/0236547 A1 7/2023 Chen et al.
2023/0236549 A1 7/2023 Guzman et al.
2023/0236550 A1 7/2023 Chen et al.
2023/0282146 A1 9/2023 Connor et al.
2023/0325805 A1 10/2023 Van Os et al.
2023/0350564 A1 11/2023 Chen et al.
2024/0053878 A1 2/2024 Wilson et al.
2024/0134664 A1 4/2024 Chen et al.
2024/0231854 A9 7/2024 Chen et al.
2024/0248515 A1 7/2024 Chen et al.
2024/0264721 A1 8/2024 Wilson
2024/0419214 A1 12/2024 Chen et al.
2024/0420109 A1 12/2024 Van Os et al.
2025/0044932 A1 2/2025 Chen et al.
2025/0165134 A1 5/2025 Wilson et al.
2025/0231531 A1 7/2025 Da Silva Valente Soares et al.

FOREIGN PATENT DOCUMENTS

AU 2010249319 A1 6/2012
AU 2015101019 A4 9/2015
AU 2015101639 A4 12/2015
AU 2020239749 A1 11/2021
CA 2356232 A1 3/2002
CA 2781636 A1 7/2010
CA 2729388 A1 9/2011
CA 2800123 C 7/2016
CA 2986980 A1 5/2019
CH 707412 A2 6/2014
CN 1083229 A 3/1994
CN 1337638 A 2/2002
CN 1397904 A 2/2003
CN 2602404 Y 2/2004
CN 1536511 A 10/2004
CN 1610866 A 4/2005
CN 1997957 A 7/2007
CN 101059756 A 10/2007
CN 101128794 A 2/2008
CN 101382438 A 3/2009
CN 100492288 C 5/2009
CN 101505320 A 8/2009
CN 101620494 A 1/2010
CN 101627349 A 1/2010
CN 101627361 A 1/2010
CN 101702112 A 5/2010
CN 101819486 A 9/2010
CN 101939740 A 1/2011
CN 101943883 A 1/2011
CN 101981987 A 2/2011
CN 102214335 A 10/2011
CN 102375690 A 3/2012
CN 102430244 A 5/2012
CN 102446435 A 5/2012
CN 102455860 A 5/2012
CN 202217134 U 5/2012
CN 102541438 A 7/2012
CN 102681648 A 9/2012
CN 102687176 A 9/2012
CN 102750070 A 10/2012
CN 102800045 A 11/2012
CN 102984342 A 3/2013

(56) References Cited

FOREIGN PATENT DOCUMENTS

| | | | |
|---|---|---|---|
| CN | 103154954 | A | 6/2013 |
| CN | 103191557 | A | 7/2013 |
| CN | 103399480 | A | 11/2013 |
| CN | 103399750 | A | 11/2013 |
| CN | 103544920 | A | 1/2014 |
| CN | 103562832 | A | 2/2014 |
| CN | 103562841 | A | 2/2014 |
| CN | 103607660 | A | 2/2014 |
| CN | 103649897 | A | 3/2014 |
| CN | 103902165 | A | 7/2014 |
| CN | 103914238 | A | 7/2014 |
| CN | 103973899 | A | 8/2014 |
| CN | 203773233 | U | 8/2014 |
| CN | 104281405 | A | 1/2015 |
| CN | 104487929 | A | 4/2015 |
| CN | 104501043 | A | 4/2015 |
| CN | 104580576 | A | 4/2015 |
| CN | 104737114 | A | 6/2015 |
| CN | 104885089 | A | 9/2015 |
| CN | 104898402 | A | 9/2015 |
| CN | 105204931 | A | 12/2015 |
| CN | 105260049 | A | 1/2016 |
| CN | 105264479 | A | 1/2016 |
| CN | 105286843 | A | 2/2016 |
| CN | 105302468 | A | 2/2016 |
| CN | 105335087 | A | 2/2016 |
| CN | 105354034 | A | 2/2016 |
| CN | 105388966 | A | 3/2016 |
| CN | 105389078 | A | 3/2016 |
| CN | 105389107 | A | 3/2016 |
| CN | 105453016 | A | 3/2016 |
| CN | 105574378 | A | 5/2016 |
| CN | 105607858 | A | 5/2016 |
| CN | 205608658 | U | 9/2016 |
| CN | 106056848 | A | 10/2016 |
| CN | 106470110 | A | 3/2017 |
| CN | 106486044 | A | 3/2017 |
| CN | 106506322 | A | 3/2017 |
| CN | 106598201 | A | 4/2017 |
| CN | 106605201 | A | 4/2017 |
| CN | 106814886 | A | 6/2017 |
| CN | 106909064 | A | 6/2017 |
| CN | 107239101 | A | 10/2017 |
| CN | 107257951 | A | 10/2017 |
| CN | 107430489 | A | 12/2017 |
| CN | 107561904 | A | 1/2018 |
| CN | 107643677 | A | 1/2018 |
| CN | 107710135 | A | 2/2018 |
| CN | 107797657 | A | 3/2018 |
| CN | 107870560 | A | 4/2018 |
| CN | 108255049 | A | 7/2018 |
| CN | 109196469 | A | 1/2019 |
| CN | 109287116 | A | 1/2019 |
| CN | 109313655 | A | 2/2019 |
| CN | 109690445 | A | 4/2019 |
| CN | 110460797 | A | 11/2019 |
| CN | 110471582 | B | 10/2021 |
| CN | 113795815 | A | 12/2021 |
| DE | 202017105858 | U1 | 3/2018 |
| EP | 0579093 | A1 | 1/1994 |
| EP | 0831629 | A2 | 3/1998 |
| EP | 1659504 | A2 | 5/2006 |
| EP | 1674889 | A1 | 6/2006 |
| EP | 1674977 | A2 | 6/2006 |
| EP | 1750242 | A2 | 2/2007 |
| EP | 1832969 | A2 | 9/2007 |
| EP | 1855170 | A2 | 11/2007 |
| EP | 1988432 | A1 | 11/2008 |
| EP | 2120115 | A2 | 11/2009 |
| EP | 2175367 | A2 | 4/2010 |
| EP | 2194508 | A1 | 6/2010 |
| EP | 2204702 | A1 | 7/2010 |
| EP | 2290922 | A1 | 3/2011 |
| EP | 2312512 | A1 | 4/2011 |
| EP | 2360902 | A2 | 8/2011 |

| | | | |
|---|---|---|---|
| EP | 2394711 | A1 | 12/2011 |
| EP | 2413577 | A2 | 2/2012 |
| EP | 2423810 | A1 | 2/2012 |
| EP | 2426902 | A1 | 3/2012 |
| EP | 2600215 | A1 | 6/2013 |
| EP | 2629483 | A1 | 8/2013 |
| EP | 2738640 | A2 | 6/2014 |
| EP | 2742404 | A2 | 6/2014 |
| EP | 2942932 | A1 | 11/2015 |
| EP | 2955591 | A2 | 12/2015 |
| EP | 2980741 | A1 | 2/2016 |
| EP | 2990887 | A2 | 3/2016 |
| EP | 2993602 | A1 | 3/2016 |
| EP | 3056949 | A1 | 8/2016 |
| EP | 3062271 | A1 | 8/2016 |
| EP | 3079044 | A1 | 10/2016 |
| EP | 3096275 | A1 | 11/2016 |
| EP | 3101958 | A1 | 12/2016 |
| EP | 3152643 | A1 | 4/2017 |
| EP | 3047622 | B1 | 8/2017 |
| EP | 3349400 | A1 | 7/2018 |
| EP | 3376342 | A1 | 9/2018 |
| EP | 3401770 | A1 | 11/2018 |
| EP | 3465408 | B1 | 8/2020 |
| EP | 3896560 | A1 | 10/2021 |
| EP | 3175344 | B1 | 1/2022 |
| EP | 3455696 | B1 | 10/2023 |
| GB | 2306020 | A | 4/1997 |
| GB | 2475669 | A | 6/2011 |
| JP | 49-134364 | A | 12/1974 |
| JP | 53-31170 | A | 3/1978 |
| JP | 56-621 | A | 1/1981 |
| JP | 5-90390 | U | 12/1993 |
| JP | 3007616 | U | 2/1995 |
| JP | 8-110955 | A | 4/1996 |
| JP | 8-285964 | A | 11/1996 |
| JP | 9-251084 | A | 9/1997 |
| JP | 10-143636 | A | 5/1998 |
| JP | 10-506472 | A | 6/1998 |
| JP | 11-109066 | A | 4/1999 |
| JP | 11-160470 | A | 6/1999 |
| JP | 11-232013 | A | 8/1999 |
| JP | 2000-162349 | A | 6/2000 |
| JP | 3062531 | B2 | 7/2000 |
| JP | 2000-241199 | A | 9/2000 |
| JP | 2000-270264 | A | 9/2000 |
| JP | 2001-144884 | A | 5/2001 |
| JP | 2001-147282 | A | 5/2001 |
| JP | 2001-273064 | A | 10/2001 |
| JP | 2001-313886 | A | 11/2001 |
| JP | 2001-318852 | A | 11/2001 |
| JP | 2002-73486 | A | 3/2002 |
| JP | 2002-507718 | A | 3/2002 |
| JP | 2002-251238 | A | 9/2002 |
| JP | 2002-271451 | A | 9/2002 |
| JP | 2003-9404 | A | 1/2003 |
| JP | 2003-67210 | A | 3/2003 |
| JP | 2003-121568 | A | 4/2003 |
| JP | 2003-125366 | A | 4/2003 |
| JP | 2003-233616 | A | 8/2003 |
| JP | 2003-296246 | A | 10/2003 |
| JP | 2004-28918 | A | 1/2004 |
| JP | 2004-37998 | A | 2/2004 |
| JP | 2004-177148 | A | 6/2004 |
| JP | 2004-184396 | A | 7/2004 |
| JP | 2004-334642 | A | 11/2004 |
| JP | 2005-521890 | A | 7/2005 |
| JP | 2005-245619 | A | 9/2005 |
| JP | 2005-284592 | A | 10/2005 |
| JP | 2005-339017 | A | 12/2005 |
| JP | 2005-352679 | A | 12/2005 |
| JP | 2006-71582 | A | 3/2006 |
| JP | 2006-101505 | A | 4/2006 |
| JP | 2006-222531 | A | 8/2006 |
| JP | 2006-242717 | A | 9/2006 |
| JP | 2006-284365 | A | 10/2006 |
| JP | 2006-293340 | A | 10/2006 |
| JP | 2007-226794 | A | 9/2007 |
| JP | 2007-243275 | A | 9/2007 |

(56) References Cited

FOREIGN PATENT DOCUMENTS

| | | | |
|---|---|---|---|
| JP | 2008-175800 | A | 7/2008 |
| JP | 2009-9252 | A | 1/2009 |
| JP | 2009-95030 | A | 4/2009 |
| JP | 2009-147889 | A | 7/2009 |
| JP | 2009-217612 | A | 9/2009 |
| JP | 2009-229106 | A | 10/2009 |
| JP | 2009-293960 | A | 12/2009 |
| JP | 2010-60355 | A | 3/2010 |
| JP | 2010-109552 | A | 5/2010 |
| JP | 2010-124181 | A | 6/2010 |
| JP | 2010-257051 | A | 11/2010 |
| JP | 2011-503711 | A | 1/2011 |
| JP | 2011-34574 | A | 2/2011 |
| JP | 2011-515726 | A | 5/2011 |
| JP | 3168099 | U | 6/2011 |
| JP | 2011-159172 | A | 8/2011 |
| JP | 2011-525648 | A | 9/2011 |
| JP | 2011-217000 | A | 10/2011 |
| JP | 2012-32306 | A | 2/2012 |
| JP | 2012-53642 | A | 3/2012 |
| JP | 2012-505478 | A | 3/2012 |
| JP | 2012-109778 | A | 6/2012 |
| JP | 2012-113600 | A | 6/2012 |
| JP | 2012-113644 | A | 6/2012 |
| JP | 2012-147432 | A | 8/2012 |
| JP | 2012-517630 | A | 8/2012 |
| JP | 2012-203537 | A | 10/2012 |
| JP | 2012-203832 | A | 10/2012 |
| JP | 2012-247283 | A | 12/2012 |
| JP | 2012-531607 | A | 12/2012 |
| JP | 2013-3671 | A | 1/2013 |
| JP | 2013-29925 | A | 2/2013 |
| JP | 2013-92989 | A | 5/2013 |
| JP | 2013-146557 | A | 8/2013 |
| JP | 2013-157959 | A | 8/2013 |
| JP | 2013-229656 | A | 11/2013 |
| JP | 2013-232230 | A | 11/2013 |
| JP | 2014-35766 | A | 2/2014 |
| JP | 2014-123197 | A | 7/2014 |
| JP | 2014-517366 | A | 7/2014 |
| JP | 2014-143575 | A | 8/2014 |
| JP | 2014-519126 | A | 8/2014 |
| JP | 2014-520296 | A | 8/2014 |
| JP | 2014-174649 | A | 9/2014 |
| JP | 2014-216868 | A | 11/2014 |
| JP | 5630676 | B2 | 11/2014 |
| JP | 5661835 | B2 | 12/2014 |
| JP | 2015-504619 | A | 2/2015 |
| JP | 2015-210587 | A | 11/2015 |
| JP | 2015-219862 | A | 12/2015 |
| JP | 2015-534664 | A | 12/2015 |
| JP | 2016-13151 | A | 1/2016 |
| JP | 2016-62482 | A | 4/2016 |
| JP | 2016-224225 | A | 12/2016 |
| JP | 2017-37599 | A | 2/2017 |
| JP | 2017-41098 | A | 2/2017 |
| JP | 2017-50003 | A | 3/2017 |
| JP | 2017-111083 | A | 6/2017 |
| JP | 2017-527026 | A | 9/2017 |
| JP | 2017-531225 | A | 10/2017 |
| JP | 2017-531230 | A | 10/2017 |
| JP | 2017-534934 | A | 11/2017 |
| JP | 2018-506103 | A | 3/2018 |
| JP | 2018-72912 | A | 5/2018 |
| JP | 2018-514838 | A | 6/2018 |
| JP | 2018-113544 | A | 7/2018 |
| JP | 2018-116067 | A | 7/2018 |
| JP | 2018-524679 | A | 8/2018 |
| JP | 2018-152073 | A | 9/2018 |
| JP | 2019-16251 | A | 1/2019 |
| JP | 2019-164825 | A | 9/2019 |
| JP | 2020-17285 | A | 1/2020 |
| JP | 2020-56745 | A | 4/2020 |
| JP | 2020-194555 | A | 12/2020 |
| JP | 2021-502640 | A | 1/2021 |
| KR | 10-2004-0027236 | A | 4/2004 |
| KR | 10-2004-0107489 | A | 12/2004 |
| KR | 20-0425314 | Y1 | 9/2006 |
| KR | 10-2007-0025292 | A | 3/2007 |
| KR | 10-0810379 | B1 | 3/2008 |
| KR | 10-2008-0058246 | A | 6/2008 |
| KR | 10-0864578 | B1 | 10/2008 |
| KR | 10-2009-0112132 | A | 10/2009 |
| KR | 10-2010-0025853 | A | 3/2010 |
| KR | 102010-0025846 | A | 3/2010 |
| KR | 10-2011-0013653 | A | 2/2011 |
| KR | 10-2011-0093729 | A | 8/2011 |
| KR | 10-2012-0003537 | A | 1/2012 |
| KR | 10-2012-0132134 | A | 12/2012 |
| KR | 10-2013-0097551 | A | 9/2013 |
| KR | 10-2013-0109466 | A | 10/2013 |
| KR | 10-1352713 | B1 | 1/2014 |
| KR | 10-2014-0025552 | A | 3/2014 |
| KR | 10-2014-0064687 | A | 5/2014 |
| KR | 10-2014-0070218 | A | 6/2014 |
| KR | 10-2014-0074824 | A | 6/2014 |
| KR | 10-2014-0094801 | A | 7/2014 |
| KR | 10-2014-0131093 | A | 11/2014 |
| KR | 10-2014-0139982 | A | 12/2014 |
| KR | 10-2015-0008996 | A | 1/2015 |
| KR | 10-2015-0038711 | A | 4/2015 |
| KR | 10-2015-0081140 | A | 7/2015 |
| KR | 10-2015-0093090 | A | 8/2015 |
| KR | 10-2015-0140212 | A | 12/2015 |
| KR | 10-2016-0024266 | A | 3/2016 |
| KR | 10-2016-0026314 | A | 3/2016 |
| KR | 10-2016-0054573 | A | 5/2016 |
| KR | 10-2016-0076201 | A | 6/2016 |
| KR | 10-2016-0105279 | A | 9/2016 |
| KR | 10-2016-0132457 | A | 11/2016 |
| KR | 10-2017-0006761 | A | 1/2017 |
| KR | 10-2017-0011784 | A | 2/2017 |
| KR | 10-2017-0032471 | A | 3/2017 |
| KR | 10-2017-0076452 | A | 7/2017 |
| KR | 10-2017-0081391 | A | 7/2017 |
| KR | 10-2017-0082698 | A | 7/2017 |
| KR | 10-2017-0107572 | A | 9/2017 |
| KR | 10-2017-0130417 | A | 11/2017 |
| KR | 10-2018-0011581 | A | 2/2018 |
| KR | 10-2018-0046206 | A | 5/2018 |
| KR | 10-2018-0051556 | A | 5/2018 |
| KR | 10-1875907 | B1 | 7/2018 |
| KR | 10-2018-0108531 | A | 10/2018 |
| KR | 10-2019-0020850 | A | 3/2019 |
| KR | 10-2019-0071285 | A | 6/2019 |
| KR | 10-2019-0114034 | A | 10/2019 |
| SG | 130285 | A1 | 4/2007 |
| TW | 498240 | B | 8/2002 |
| TW | 546942 | B | 8/2003 |
| TW | 200512616 | A | 4/2005 |
| TW | 200850058 | A | 12/2008 |
| TW | 200915698 | A | 4/2009 |
| TW | I348803 | B | 9/2011 |
| TW | D144158 | S | 12/2011 |
| TW | 201232486 | A | 8/2012 |
| TW | 201419115 | A | 5/2014 |
| WO | 98/40795 | A1 | 9/1998 |
| WO | 01/71433 | A1 | 9/2001 |
| WO | 02/054157 | A1 | 7/2002 |
| WO | 03/048872 | A1 | 6/2003 |
| WO | 03/085460 | A2 | 10/2003 |
| WO | 2006/012343 | A2 | 2/2006 |
| WO | 2006/112641 | A1 | 10/2006 |
| WO | 2006/131780 | A1 | 12/2006 |
| WO | 2007/018881 | A2 | 2/2007 |
| WO | 2008/086302 | A1 | 7/2008 |
| WO | 2008/114491 | A1 | 9/2008 |
| WO | 2009/053775 | A1 | 4/2009 |
| WO | 2009/123428 | A2 | 10/2009 |
| WO | 2009/146857 | A2 | 12/2009 |
| WO | 2010/017627 | A1 | 2/2010 |
| WO | 2011/000893 | A1 | 1/2011 |
| WO | 2011/037134 | A1 | 3/2011 |
| WO | 2011/062871 | A2 | 5/2011 |

(56) References Cited

FOREIGN PATENT DOCUMENTS

| | | | |
|---|---|---|---|
| WO | 2011/099819 | A2 | 8/2011 |
| WO | 2011/128416 | A2 | 10/2011 |
| WO | 2012/021507 | A2 | 2/2012 |
| WO | 2012/129231 | A1 | 9/2012 |
| WO | 2012/161434 | A2 | 11/2012 |
| WO | 2012/166976 | A2 | 12/2012 |
| WO | 2012/170446 | A2 | 12/2012 |
| WO | 2013/051048 | A1 | 4/2013 |
| WO | 2013/093558 | A1 | 6/2013 |
| WO | 2013/103570 | A1 | 7/2013 |
| WO | 2013/136548 | A1 | 9/2013 |
| WO | 2013/169842 | A2 | 11/2013 |
| WO | 2013/169846 | A1 | 11/2013 |
| WO | 2013/169849 | A2 | 11/2013 |
| WO | 2013/169875 | A2 | 11/2013 |
| WO | 2013/169882 | A2 | 11/2013 |
| WO | 2014/078114 | A1 | 5/2014 |
| WO | 2014/081181 | A1 | 5/2014 |
| WO | 2014/088475 | A1 | 6/2014 |
| WO | 2014/105274 | A1 | 7/2014 |
| WO | 2014/105278 | A1 | 7/2014 |
| WO | 2014/105631 | A2 | 7/2014 |
| WO | 2014/113987 | A1 | 7/2014 |
| WO | 2014/172757 | A1 | 10/2014 |
| WO | 2014/189197 | A1 | 11/2014 |
| WO | 2014/200730 | A1 | 12/2014 |
| WO | 2015/023419 | A1 | 2/2015 |
| WO | 2015/029313 | A1 | 3/2015 |
| WO | 2015/034960 | A1 | 3/2015 |
| WO | 2015/057320 | A1 | 4/2015 |
| WO | 2015/065402 | A1 | 5/2015 |
| WO | 2015/084891 | A1 | 6/2015 |
| WO | 2015/138865 | A2 | 9/2015 |
| WO | 2015/163536 | A1 | 10/2015 |
| WO | 2016/022203 | A1 | 2/2016 |
| WO | 2016/022204 | A1 | 2/2016 |
| WO | 2016/022205 | A1 | 2/2016 |
| WO | 2016/022496 | A2 | 2/2016 |
| WO | 2016/025395 | A2 | 2/2016 |
| WO | 2016/032062 | A1 | 3/2016 |
| WO | 2016/032076 | A1 | 3/2016 |
| WO | 2016/032534 | A1 | 3/2016 |
| WO | 2016/036427 | A1 | 3/2016 |
| WO | 2016/036522 | A2 | 3/2016 |
| WO | 2016/057062 | A1 | 4/2016 |
| WO | 2016/099097 | A1 | 6/2016 |
| WO | 2016/129863 | A1 | 8/2016 |
| WO | 2016/144385 | A1 | 9/2016 |
| WO | 2016/144563 | A1 | 9/2016 |
| WO | 2016/144577 | A1 | 9/2016 |
| WO | 2016/144975 | A2 | 9/2016 |
| WO | 2016/144977 | A1 | 9/2016 |
| WO | 2016/204936 | A1 | 12/2016 |
| WO | 2017/030642 | A1 | 2/2017 |
| WO | 2017/030646 | A1 | 2/2017 |
| WO | 2017/041641 | A1 | 3/2017 |
| WO | 2017/062621 | A1 | 4/2017 |
| WO | 2017/072589 | A2 | 5/2017 |
| WO | 2017/078792 | A1 | 5/2017 |
| WO | 2017/124116 | A1 | 7/2017 |
| WO | 2017/213777 | A1 | 12/2017 |
| WO | 2017/213899 | A1 | 12/2017 |
| WO | 2017/213937 | A1 | 12/2017 |
| WO | 2017/218298 | A1 | 12/2017 |
| WO | 2018/048700 | A1 | 3/2018 |
| WO | 2018/209152 | A1 | 11/2018 |
| WO | 2018/213451 | A1 | 11/2018 |
| WO | 2019/200350 | A1 | 10/2019 |
| WO | 2019/217003 | A1 | 11/2019 |
| WO | 2019/217086 | A2 | 11/2019 |
| WO | 2019/217249 | A2 | 11/2019 |
| WO | 2020/226927 | A1 | 11/2020 |
| WO | 2021/050190 | A1 | 3/2021 |

OTHER PUBLICATIONS

Notice of Acceptance received for Australian Patent Application No. 2023282284, mailed on Jul. 18, 2024, 3 pages.

Notice of Allowance received for Korean Patent Application No. 10-2023-0189466, mailed on Jul. 22, 2024, 8 pages (2 pages of English Translation and 6 pages of Official Copy).

Notice of Allowance received for Korean Patent Application No. 10-2023-7008854, mailed on Jul. 26, 2024, 8 pages (2 pages of English Translation and 6 pages of Official Copy).

Office Action received for Chinese Patent Application No. 202110369387.8, mailed on Jul. 2, 2024, 10 pages (4 pages of English Translation and 6 pages of Official Copy).

Notice of Allowance received for Japanese Patent Application No. 2023-559823, mailed on Aug. 19, 2024, 5 pages (1 page of English Translation and 4 pages of Official Copy).

Minority_14, "The Ultimate Beautiful Holo Stopwatch: Ultimate Stopwatch & Timer", Available online at: https://sspai.com/post/21699, Mar. 1, 2013, 4 pages (Official Copy only). {See Communication under Rule 37 CFR § 1.98(a) (3)}.

Office Action received for Australian Patent Application No. 2023285972, mailed on Aug. 19, 2024, 2 pages.

Office Action received for Chinese Patent Application No. 202010697187.0, mailed on Jul. 25, 2024, 16 pages (5 pages of English Translation and 11 pages of Official Copy).

Office Action received for Chinese Patent Application No. 202110369265.9, mailed on Jul. 31, 2024, 18 pages (6 pages of English Translation and 12 pages of Official Copy).

Record of Oral Hearing received for U.S. Appl. No. 17/031,671, mailed on Aug. 27, 2024, 17 pages.

Examiner's Answer to Appeal Brief received for U.S. Appl. No. 16/943,737, mailed on Feb. 2, 2024, 15 pages.

Notice of Allowance received for Chinese Patent Application No. 202310124087.2, mailed on Jan. 25, 2024, 4 pages (1 page of English Translation and 3 pages of Official Copy).

Notice of Allowance received for Japanese Patent Application No. 2022-152693, mailed on Feb. 5, 2024, 4 pages (1 page of English Translation and 3 pages of Official Copy).

Notice of Allowance received for Korean Patent Application No. 10-2022-7019034, mailed on Feb. 1, 2024, 7 pages (2 pages of English Translation and 5 pages of Official Copy).

Office Action received for European Patent Application No. 21728746.5, mailed on Jan. 11, 2024, 4 pages.

Office Action received for Korean Patent Application No. 10-2022-0006401, mailed on Jan. 25, 2024, 11 pages (5 pages of English Translation and 6 pages of Official Copy).

Corrected Notice of Allowance received for U.S. Appl. No. 16/861,651, mailed on Jan. 18, 2024, 3 pages.

Corrected Notice of Allowance received for U.S. Appl. No. 17/738,940, mailed on Jan. 24, 2024, 3 pages.

Decision on Appeal received for U.S. Appl. No. 15/405,122, mailed on Dec. 12, 2023, 18 pages.

Decision to Grant received for European Patent Application No. 18730556.0, mailed on Dec. 7, 2023, 4 pages.

Examiner's Answer to Appeal Brief received for U.S. Appl. No. 17/031,671, mailed on Dec. 8, 2023, 16 pages.

Extended European Search Report received for European Patent Application No. 23190272.7, mailed on Nov. 21, 2023, 11 pages.

Final Office Action received for U.S. Appl. No. 17/366,698, mailed on Dec. 12, 2023, 17 pages.

International Preliminary Report on Patentability received for PCT Patent Application No. PCT/US2022/029279, mailed on Nov. 23, 2023, 11 pages.

Non-Final Office Action received for U.S. Appl. No. 17/713,005, mailed on Jan. 19, 2024, 17 pages.

Non-Final Office Action received for U.S. Appl. No. 18/196,345, mailed on Jan. 23, 2024, 17 pages.

Notice of Allowance received for U.S. Appl. No. 16/861,651, mailed on Jan. 9, 2024, 6 pages.

Notice of Allowance received for U.S. Appl. No. 17/366,698, mailed on Jan. 31, 2024, 9 pages.

Notice of Allowance received for U.S. Appl. No. 17/717,275, mailed on Dec. 26, 2023, 8 pages.

(56) References Cited

OTHER PUBLICATIONS

Office Action received for Australian Patent Application No. 2023203197, mailed on Jan. 10, 2024, 3 pages.
Office Action received for Australian Patent Application No. 2023282284, mailed on Jan. 19, 2024, 6 pages.
Office Action received for Chinese Patent Application No. 202110957983.8, mailed on Dec. 27, 2023, 23 pages (13 pages of English Translation and 10 pages of Official Copy).
Office Action received for Korean Patent Application No. 10-2023-7008379, mailed on Nov. 13, 2023, 15 pages (7 pages of English Translation and 8 pages of Official Copy).
Office Action received for Korean Patent Application No. 10-2023-7008854, mailed on Nov. 15, 2023, 6 pages (2 pages of English Translation and 4 pages of Official Copy).
Office Action received for Korean Patent Application No. 10-2023-7033642, mailed on Dec. 4, 2023, 5 pages (2 pages of English Translation and 3 pages of Official Copy).
Pre-Appeal Review Report received for Japanese Patent Application No. 2022-013919, mailed on Oct. 27, 2023, 5 pages (2 pages of English Translation and 3 pages of Official Copy).
International Preliminary Report on Patentability received for PCT Patent Application No. PCT/US2023/011151, mailed on Aug. 8, 2024, 13 pages.
Notice of Allowance received for Korean Patent Application No. 10-2024-7017078, mailed on Aug. 1, 2024, 8 pages (2 pages of English Translation and 6 pages of Official Copy).
Office Action received for Australian Patent Application No. 2023229597, mailed on Jul. 30, 2024, 3 pages.
Office Action received for Chinese Patent Application No. 202110369341.6, mailed on Jul. 24, 2024, 11 pages (5 pages of English Translation and 6 pages of Official Copy).
Office Action received for Chinese Patent Application No. 202110369363.2, mailed on Jul. 9, 2024, 14 pages (6 pages of English Translation and 8 pages of Official Copy).
Advisory Action received for U.S. Appl. No. 17/713,005, mailed on Jul. 19, 2024, 3 pages.
Applicant-Initiated Interview Summary received for U.S. Appl. No. 17/713,005, mailed on Jun. 18, 2024, 2 pages.
Applicant-Initiated Interview Summary received for U.S. Appl. No. 17/746,807, mailed on May 21, 2024, 2 pages.
Applicant-Initiated Interview Summary received for U.S. Appl. No. 18/196,345, mailed on Apr. 8, 2024, 4 pages.
Applicant-Initiated Interview Summary received for U.S. Appl. No. 18/209,333, mailed on May 2, 2024, 4 pages.
Corrected Notice of Allowance received for U.S. Appl. No. 17/949,081, mailed on Apr. 24, 2024, 3 pages.
Corrected Notice of Allowance received for U.S. Appl. No. 18/220,715, mailed on Apr. 8, 2024, 2 pages.
Corrected Notice of Allowance received for U.S. Appl. No. 18/220,715, mailed on Apr. 25, 2024, 2 pages.
Corrected Notice of Allowance received for U.S. Appl. No. 18/220,715, mailed on Jul. 23, 2024, 2 pages.
Corrected Notice of Allowance received for U.S. Appl. No. 18/220,715, mailed on Jun. 24, 2024, 2 pages.
Examiner's Answer to Appeal Brief received for U.S. Appl. No. 17/947,530, mailed on May 21, 2024, 34 pages.
Final Office Action received for U.S. Appl. No. 17/713,005, mailed on Apr. 30, 2024, 22 pages.
Hayakawa, Atsushi, "An On-Line Wear Club", Mac People, ASCII CORP, Japan, vol. 8, No. 20., Oct. 15, 2002, 4 pages (Official copy Only).( See Communication Under Rule 37 CFR § 1.98(a)(3)}.
Intention to Grant received for European Patent Application No. 20730136.7, mailed on Jul. 15, 2024, 8 pages.
Intention to Grant received for European Patent Application No. 21728746.5, mailed on Jul. 12, 2024, 10 pages.
International Search Report and Written Opinion received for PCT Patent Application No. PCT/US2023/032899, mailed on Feb. 26, 2024, 22 pages.
Invitation to Pay Additional Fees and Partial International Search Report received for PCT Patent Application No. PCT/US2023/032899, mailed on Jan. 3, 2024, 14 pages.
Non-Final Office Action received for U.S. Appl. No. 18/196,345, mailed on Jul. 16, 2024, 14 pages.
Non-Final Office Action recetved for U.S. Appl. No. 18/209,333, mailed on Mar. 27, 2024, 19 pages.
Notice of Allowance received for Chinese Patent Application No. 202110369386.3, mailed on Jul. 9, 2024, 5 pages (1 page of English Translation and 4 pages of Official Copy).
Notice of Allowance received for Japanese Patent Application No. 2021-157213, mailed on Jun. 7, 2024. 19 pages (1 page of English Translation and 18 pages of Official Copy).
Notice of Allowance received for Japanese Patent Application No. 2022-205934, mailed on Jun. 10, 2024, 4 pages (1 page of English Translation and 3 pages of Official Copy).
Notice of Allowance received for Korean Patent Application No. 10-2022-0006401 , mailed on Apr. 5, 2024, 7 pages (2 pages of English Translation and 5 pages of Official Copy).
Notice of Allowance received for Korean Patent Application No. 10-2023-7008379, mailed on Jun. 12, 2024, 7 pages (2 pages of English Translation and 5 pages of Official Copy).
Notice of Allowance received for Korean Patent Application No. 10-2023-7033642, mailed on Apr. 18, 2024, 7 pages (2 pages of English Translation and 5 pages of Official Copy),
Notice of Allowance received for U.S. Appl. No. 15/421,865, mailed on Apr. 15, 2024. 12 pages.
Notice of Allowance received for U.S. Appl. No. 17/031,765, mailed on Apr. 2, 2024, 34 pages.
Notice of Allowance received for U.S. Appl. No. 17/746,807, mailed on Jul. 3, 2024, 23 pages.
Notice of Allowance received for U.S. Appl. No. 17/949,081, mailed on Apr. 12, 2024, 8 pages.
Notice of Allowance received for U.S. Appl. No. 18/209,333, mailed on Jul. 5, 2024, 10 pages.
Notice of Allowance received for U.S. Appl. No. 18/220,715, mailed on Jun. 13, 2024, 10 pages.
Office Action received for Chinese Patent Application No. 201880048209.1. mailed on Jan. 31, 2024, 2 pages (1 page of English Translation and 1 page of Official Copy).
Office Action received for Chinese Patent Application No. 202110957983.8, mailed on Jul. 6, 2024, 17 pages (11 pages of English Translation and 6 pages of Official Copy).
Office Action received for Chinese Patent Application No. 202110957983.8. mailed on May 13, 2024, 18 pages (12 pages of English Translation and 6 pages of Official Copy).
Office Action received for Chinese Patent Application No. 202210112700.4, mailed on Apr. 8, 2024, 19 pages (9 pages of English Translation and 10 pages of Official Copy).
Office Action received for Chinese Patent Application No. 202210639919.X, mailed on Jun. 15, 2024, 18 pages (10 pages of English Translation and 8 pages of Official Copy).
Office Action received for Chinese Patent Application No. 202311634654.5, mailed on Apr. 28, 2024, 19 pages (9 pages of English Translation and 10 pages of Official Copy).
Office Action received for European Patent Application No. 22153137.9, mailed on Jul. 10, 2024, 6 pages.
Office Action received for European Patent Application No. 22729905.4, mailed on Mar. 22, 2024, 8 pages.
Office Action received for Indian Patent Application No. 202218027229, mailed on Jun. 13, 2024, 8 pages.
Office Action received for Japanese Patent Application No. 2022-194369, mailed on Mar. 15, 2024, 11 pages (5 pages of English Translation and 6 pages of Official Copy).
Office Action received for Japanese Patent Application No. 2022-205934, mailed on Mar. 11, 2024, 4 pages (2 pages of English Translation and 2 pages of Official Copy).
Office Action received for Japanese Patent Application No. 2023-138172, mailed on Jul. 12, 2024, 6 pages (3 pages of English Translation and 3 pages of Official Copy).
Office Action received for Japanese Patent Application No. 2023-559823, mailed on Jun. 10, 2024, 6 pages (3 pages of English Translation and 3 pages of Official Copy).

(56) References Cited

OTHER PUBLICATIONS

Office Action received for Japanese Patent Application No. 2023-559823, mailed on Mar. 4, 2024, 6 pages (3 pages of English Translation and 3 pages of Official Copy).
Office Action received for Korean Patent Application No. 10-2024-7014705, mailed on May 17, 2024, 10 pages (4 pages of English Translation and 6 pages of Official Copy).
Supplemental Notice of Allowance received for U.S. Appl. No. 15/421,865, mailed on Jun. 20, 2024, 3 pages.
Supplemental Notice of Allowance received for U.S. Appl. No. 17/031,765, mailed on Apr. 9, 2024, 2 pages.
Supplemental Notice of Allowance received for U.S. Appl. No. 17/031,765, mailed on Apr. 19, 2024, 3 pages.
Supplemental Notice of Allowance received for U.S. Appl. No. 17/031,765, mailed on May 2, 2024, 3 pages.
Advisory Action received for U.S. Appl. No. 14/841,606, mailed on Feb. 28, 2019, 3 pages.
Advisory Action received for U.S. Appl. No. 14/815,898, mailed on Aug. 30, 2016, 3 pages.
Advisory Action received for U.S. Appl. No. 14/846,511, mailed on Oct. 22, 2019, 5 pages.
Advisory Action received for U.S. Appl. No. 14/846,511, mailed on Sep. 19, 2018, 8 pages.
Advisory Action received for U.S. Appl. No. 15/405,122, mailed on Apr. 18, 2022, 5 pages.
Advisory Action received for U.S. Appl. No. 15/421,865, mailed on Apr. 16, 2020, 7 pages.
Advisory Action received for U.S. Appl. No. 15/554,204, mailed on Mar. 12, 2020, 3 pages.
Advisory Action received for U.S. Appl. No. 16/389,722, mailed on Jun. 9, 2023, 4 pages.
Advisory Action received for U.S. Appl. No. 16/389,722, mailed on Mar. 9, 2021, 5 pages.
Advisory Action received for U.S. Appl. No. 16/582,020, mailed on Aug. 3, 2020, 4 pages.
Advisory Action received for U.S. Appl. No. 16/861,651, mailed on Jul. 29, 2022, 4 pages.
Advisory Action received for U.S. Appl. No. 16/935,002, mailed on May 6, 2022, 3 pages.
Advisory Action received for U.S. Appl. No. 16/943,737, mailed on Jun. 1, 2022, 6 pages.
Advisory Action received for U.S. Appl. No. 17/031,765, mailed on Dec. 12, 2022, 7 pages.
Advisory Action received for U.S. Appl. No. 17/158,936, mailed on Jul. 24, 2023, 4 pages.
AdyClock—Night Alarm Clock, App for android, Google play store page: https://web.archive.org/web/20130924223153/https://play.google.com/store/apps/details?id=com.adyclock&hl=en, Sep. 24, 2013, 2 pages.
Airshow, "Airshow App for Mobile Devices", 2012, 4 pages.
Andro Dollar, "Huawei Watch GT Always on Mode Update is finally here!", Online Availabe at: https://www.youtube.com/watch?v=AJw_FIAf7v4, Jun. 6, 2019, 4 pages.
Android Central, "BeWeather weather app for Android", Available online at: <https://www.youtube.com/watch?v=G2EY2K-XkSI>, Sep. 1, 2011, 1 page.
Android Central, "Changing the watchface on your Android Wear device", Retrieved from: https://www.youtube.com/watch?v=YYwFe2K_qil, Jul. 2, 2014, 4 pages.
Android Tips, "Create a Minimal Lock Screen With WidgetLocker", Online Available at: http://appstap192.blogspot.com/2012/01/create-minimal-lock-screen-with.html, Jan. 18, 2012, 6 pages.
Androidika, "Butterfly 3D Live Wallpaper 1.0 APK", Available at: <http://net-suckga-ilauncher2.apk-dl.com/butterfly-3d-live-wallpaper>, Feb. 26, 2013, 7 pages.
AOD too dim. I've answered my own question to help others, Online Available: https://forums.androidcentral.com/samsung-galaxy-s9-s9-plus/874444-aod-too-dim-ive-answered-my-own-question-help-others.html, Mar. 11, 2018,, 3 pages.
Applicant Initiated Interview Summary received for U.S. Appl. No. 14/846,511, mailed on Apr. 20, 2020, 4 pages.
Applicant Initiated Interview Summary received for U.S. Appl. No. 15/884,195, mailed on Apr. 28, 2020, 5 pages.
Applicant Initiated Interview Summary received for U.S. Appl. No. 15/884,195, mailed on Aug. 17, 2021, 4 pages.
Applicant Initiated Interview Summary received for U.S. Appl. No. 15/884,195, mailed on Dec. 17, 2020, 3 pages.
Applicant Initiated Interview Summary received for U.S. Appl. No. 15/981,817, mailed on Apr. 22, 2020, 5 pages.
Applicant Initiated Interview Summary received for U.S. Appl. No. 16/389,722, mailed on Jul. 7, 2020, 5 pages.
Applicant Initiated Interview Summary received for U.S. Appl. No. 16/582,020, mailed on Jul. 9, 2021, 4 pages.
Applicant Initiated Interview Summary received for U.S. Appl. No. 16/582,020, mailed on Jul. 14, 2020, 5 pages.
Applicant Initiated Interview Summary received for U.S. Appl. No. 16/582,020, mailed on Mar. 25, 2020, 5 pages.
Applicant Initiated Interview Summary received for U.S. Appl. No. 16/584,445, mailed on Mar. 17, 2020, 5 pages.
Applicant Initiated Interview Summary received for U.S. Appl. No. 16/585,399, mailed on Mar. 25, 2020, 3 pages.
Applicant Initiated Interview Summary received for U.S. Appl. No. 16/736,704, mailed on Aug. 27, 2020, 5 pages.
Applicant Initiated Interview Summary received for U.S. Appl. No. 17/031,671, mailed on Aug. 2, 2021, 5 pages.
Applicant Initiated Interview Summary received for U.S. Appl. No. 17/031,671, mailed on Jun. 13, 2022, 7 pages.
Applicant Initiated Interview Summary received for U.S. Appl. No. 17/031,671, mailed on Nov. 8, 2021 , 5 pages.
Applicant Initiated Interview Summary received for U.S. Appl. No. 17/546,630, mailed on May 22, 2023, 4 pages.
Applicant Initiated Interview Summary received for U.S. Appl. No. 17/681,584, mailed on Mar. 24, 2023, 2 pages.
Applicant Initiated Interview Summary received for U.S. Appl. No. 17/746,807, mailed on Jun. 9, 2023, 2 pages.
Applicant Initiated Interview Summary received for U.S. Appl. No. 17/746,807, mailed on Mar. 31, 2023, 2 pages.
Applicant-lnitiated Interview Summary received for U.S. Appl. No. 15/405,122, mailed on Dec. 22, 2020, 5 pages.
Applicant-lnitiated Interview Summary received for U.S. Appl. No. 15/405,122, mailed on Jul. 7, 2021, 4 pages.
Applicant-lnitiated Interview Summary received for U.S. Appl. No. 15/405,122, mailed on Mar. 1, 2022, 4 pages.
Applicant-lnitiated Interview Summary received for U.S. Appl. No. 15/405,122, mailed on May 21, 2020, 5 pages.
Applicant-lnitiated Interview Summary received for U.S. Appl. No. 15/421,865, mailed on Dec. 15, 2020, 6 pages.
Applicant-lnitiated Interview Summary received for U.S. Appl. No. 15/421,865, mailed on Feb. 3, 2020, 5 pages.
Applicant-lnitiated Interview Summary received for U.S. Appl. No. 15/421,865, mailed on Feb. 28, 2022, 5 pages.
Applicant-lnitiated Interview Summary received for U.S. Appl. No. 15/421,865, mailed on Jun. 30, 2021, 6 pages.
Applicant-lnitiated Interview Summary received for U.S. Appl. No. 15/554,204, mailed on Jan. 31, 2020, 3 pages.
Applicant-lnitiated Interview Summary received for U.S. Appl. No. 15/554,204, mailed on Oct. 11, 2019, 5 pages.
Applicant-lnitiated Interview Summary received for U.S. Appl. No. 15/798,235, mailed on Feb. 3, 2020, 3 pages.
Applicant-lnitiated Interview Summary received for U.S. Appl. No. 16/389,722, mailed on Feb. 11, 2021, 4 pages.
Applicant-lnitiated Interview Summary received for U.S. Appl. No. 16/389,722, mailed on Feb. 18, 2022, 5 pages.
Applicant-lnitiated Interview Summary received for U.S. Appl. No. 16/389,722, mailed on May 31, 2023, 4 pages.
Applicant-lnitiated Interview Summary received for U.S. Appl. No. 16/389,722, mailed on Nov. 4, 2022, 4 pages.
Applicant-lnitiated Interview Summary received for U.S. Appl. No. 16/389,722, mailed on Sep. 7, 2021, 4 pages.
Applicant-lnitiated Interview Summary received for U.S. Appl. No. 16/401,934, mailed on Feb. 23, 2021, 8 pages.

(56) References Cited

OTHER PUBLICATIONS

Applicant-Initiated Interview Summary received for U.S. Appl. No. 16/418,786, mailed on Mar. 30, 2021, 4 pages.
Applicant-Initiated Interview Summary received for U.S. Appl. No. 16/418,786, mailed on May 9, 2022, 2 pages.
Applicant-Initiated Interview Summary received for U.S. Appl. No. 16/418,786, mailed on Sep. 23, 2022, 2 pages.
Applicant-Initiated Interview Summary received for U.S. Appl. No. 16/584,281, mailed on Mar. 9, 2020, 5 pages.
Applicant-Initiated Interview Summary received for U.S. Appl. No. 16/584,281, mailed on Sep. 14, 2020, 6 pages.
Applicant-Initiated Interview Summary received for U.S. Appl. No. 16/585,714, mailed on Jul. 20, 2020, 5 pages.
Applicant-Initiated Interview Summary received for U.S. Appl. No. 16/585,721, mailed on Aug. 31, 2020, 5 pages.
Applicant-Initiated Interview Summary received for U.S. Appl. No. 16/585,721, mailed on Mar. 13, 2020, 5 pages.
Applicant-Initiated Interview Summary received for U.S. Appl. No. 16/659,507, mailed on Nov. 17, 2020, 3 pages.
Applicant-Initiated Interview Summary received for U.S. Appl. No. 16/736,704, mailed on Dec. 11, 2020, 4 pages.
Applicant-Initiated Interview Summary received for U.S. Appl. No. 16/861,651, mailed on Dec. 29, 2021, 5 pages.
Applicant-Initiated Interview Summary received for U.S. Appl. No. 16/861,651, mailed on Mar. 25, 2021, 6 pages.
Applicant-Initiated Interview Summary received for U.S. Appl. No. 16/861,651, mailed on Sep. 3, 2021, 5 pages.
Applicant-Initiated Interview Summary received for U.S. Appl. No. 16/935,002, mailed on Sep. 21, 2021, 4 pages.
Applicant-Initiated Interview Summary received for U.S. Appl. No. 16/943,737, mailed on Apr. 29, 2022, 6 pages.
Applicant-Initiated Interview Summary received for U.S. Appl. No. 16/943,737, mailed on Sep. 7, 2021, 4 pages.
Applicant-Initiated Interview Summary received for U.S. Appl. No. 16/997,588, mailed on Jan. 29, 2021, 3 pages.
Applicant-Initiated Interview Summary received for U.S. Appl. No. 16/997,588, mailed on May 12, 2021, 2 pages.
Applicant-Initiated Interview Summary received for U.S. Appl. No. 17/031,654, mailed on Feb. 1, 2021, 2 pages.
Applicant-Initiated Interview Summary received for U.S. Appl. No. 17/031,671, mailed on Dec. 9, 2022, 5 pages.
Applicant-Initiated Interview Summary received for U.S. Appl. No. 17/031,671, mailed on May 23, 2023, 3 pages.
Applicant-Initiated Interview Summary received for U.S. Appl. No. 17/031,765, mailed on Apr. 17, 2023, 4 pages.
Applicant-Initiated Interview Summary received for U.S. Appl. No. 17/031,765, mailed on Dec. 15, 2021, 4 pages.
Applicant-Initiated Interview Summary received for U.S. Appl. No. 17/031,765, mailed on May 3, 2023, 6 pages.
Applicant-Initiated Interview Summary received for U.S. Appl. No. 17/031,765, mailed on May 23, 2022, 5 pages.
Applicant-Initiated Interview Summary received for U.S. Appl. No. 17/031,765, mailed on Nov. 16, 2022, 5 pages.
Applicant-Initiated Interview Summary received for U.S. Appl. No. 17/031,765, mailed on Sep. 22, 2021, 5 pages.
Applicant-Initiated Interview Summary received for U.S. Appl. No. 17/037,085, mailed on Sep. 27, 2021, 4 pages.
Applicant-Initiated Interview Summary received for U.S. Appl. No. 17/041,350, mailed on Aug. 18, 2021, 2 pages.
Applicant-Initiated Interview Summary received for U.S. Appl. No. 17/041,350, mailed on Feb. 2, 2022, 2 pages.
Applicant-Initiated Interview Summary received for U.S. Appl. No. 17/068,386, mailed on Apr. 24, 2023, 2 pages.
Applicant-Initiated Interview Summary received for U.S. Appl. No. 17/068,386, mailed on Jan. 13, 2022, 2 pages.
Applicant-Initiated Interview Summary received for U.S. Appl. No. 17/068,386, mailed on Sep. 21, 2021, 2 pages.
Applicant-Initiated Interview Summary received for U.S. Appl. No. 17/078,896, mailed on Apr. 25, 2022, 2 pages.
Applicant-Initiated Interview Summary received for U.S. Appl. No. 17/158,936, mailed on Dec. 28, 2022, 4 pages.
Applicant-Initiated Interview Summary received for U.S. Appl. No. 17/317,042, mailed on Apr. 29, 2022, 2 pages.
Applicant-Initiated Interview Summary received for U.S. Appl. No. 17/321,006, mailed on Aug. 25, 2023, 2 pages.
Applicant-Initiated Interview Summary received for U.S. Appl. No. 17/321,006, mailed on Jan. 3, 2023, 4 pages.
Applicant-Initiated Interview Summary received for U.S. Appl. No. 17/341,839, mailed on Apr. 29, 2022, 2 pages.
Applicant-Initiated Interview Summary received for U.S. Appl. No. 17/341,839, mailed on Sep. 16, 2022, 2 pages.
Applicant-Initiated Interview Summary received for U.S. Appl. No. 17/366,698, mailed on Aug. 25, 2023, 2 pages.
Applicant-Initiated Interview Summary received for U.S. Appl. No. 17/373,163, mailed on Apr. 11, 2022, 2 pages.
Applicant-Initiated Interview Summary received for U.S. Appl. No. 17/546,630, mailed on Aug. 9, 2023, 4 pages.
Applicant-Initiated Interview Summary received for U.S. Appl. No. 17/556,165, mailed on Oct. 28, 2022, 4 pages.
Applicant-Initiated Interview Summary received for U.S. Appl. No. 17/591,184, mailed on Feb. 27, 2023, 2 pages.
Applicant-Initiated Interview Summary received for U.S. Appl. No. 17/591,184, mailed on Jun. 28, 2023, 2 pages.
Applicant-Initiated Interview Summary received for U.S. Appl. No. 17/591,184, mailed on Sep. 23, 2022, 2 pages.
Applicant-Initiated Interview Summary received for U.S. Appl. No. 17/681,584, mailed on Jun. 6, 2023, 2 pages.
Applicant-Initiated Interview Summary received for U.S. Appl. No. 17/713,016, mailed on Feb. 14, 2023, 4 pages.
Applicant-Initiated Interview Summary received for U.S. Appl. No. 17/738,940, mailed on Mar. 7, 2023, 4 pages.
Applicant-Initiated Interview Summary received for U.S. Appl. No. 17/941,962, mailed on May 30, 2023, 2 pages.
Applicant-Initiated Interview Summary received for U.S. Appl. No. 17/947,530, mailed on Jun. 14, 2023, 2 pages.
Applicant-Initiated Interview Summary received for U.S. Appl. No. 17/947,530, mailed on Sep. 19, 2023, 2 pages.
Applicant-Initiated Interview Summary received for U.S. Appl. No. 17/948,578, mailed on Apr. 11, 2023, 3 pages.
Applicant-Initiated Interview Summary received for U.S. Appl. No. 17/949,081, mailed on Apr. 28, 2023, 2 pages.
Applicant-Initiated Interview Summary received for U.S. Appl. No. 17/949,081, mailed on Sep. 8, 2023, 2 pages.
Avdonin Nikita, "Astroviewer 3D", Available at <:https:jjwww.youtube.comjwatch?v=zY0tslx3JHY/>, Nov. 5, 2013, 2 pages.
Baar Marius, "Fitbit Ace—Unboxing, Setup and 24 Hour Test", YouTube [online] [video], Retrieved from: <https://youtu.be/ekvkfqOyrls> See especially 4:44., Oct. 24, 2018, 3 pages.
Barbosa Jonathan, "Weather Clock 2.1 for Android", APKPure, Online Available at: https://apkpure.com/weather-clock/com.urbandroid.wclock, Oct. 15, 2015, 3 pages.
Big Phil TV,"Gear S3 Watch faces with great always on display(A O D)", Available online at: https://www.youtube.com/watch?v=2cxMnrMiGU8, Apr. 5, 2017, 3 pages.
Bogdanov Alexei, "SKMEI 1016", XP054977588, Available online at <URL:https://www.youtube.com/watch?v=E4q4Fug05Fw>, Jun. 21, 2014, 2 pages.
Brief Communication regarding Oral Proceedings received for European Patent Application No. 15730925.3, mailed on Feb. 18, 2020, 7 pages.
Brief Communication regarding Oral Proceedings received for European Patent Application No. 17206177.2, mailed on Nov. 21, 2019, 5 pages.
Brief Communication Regarding Oral Proceedings received for European Patent Application No. 17810723.1 , mailed on Nov. 11, 2022, 11 pages.
Brief Communication Regarding Oral Proceedings received for European Patent Application No. 18730556.0, mailed on Aug. 23, 2023, 1 page.
Cancellation of Oral Proceedings received for European Patent Application No. 17206177.2, mailed on Dec. 4, 2019, 2 pages.

(56) References Cited

OTHER PUBLICATIONS

Castellini Rick, "Google Earth", Retrieved from <https://www.youtube.com/watch?v=bgjMSBXsFZQ>, How to Use Google Earth for Beginners, Feb. 12, 2013, 3 pages.
Cengic Suad, "Samsung Gear S3—Display Always on! Cool!", Available online at: https://www.youtube.com/watch?v=ceeDinbPwOY, Mar. 10, 2017, 3 pages.
Certificate of Examination received for Australian Patent Application No. 2020102158, mailed on Jun. 8, 2021, 2 pages.
Clark Josh, "Designing Great iPhone Apps", O'Reilly Japan Co., O'Reilly Tim, vol. 1, May 24, 2012, 5 pages.
Corrected Notice of Allowance received for U.S. Appl. No. 14/815,879, mailed on Jul. 13, 2017, 3 pages.
Corrected Notice of Allowance received for U.S. Appl. No. 14/815,879, mailed on Jul. 28, 2017, 3 pages.
Corrected Notice of Allowance received for U.S. Appl. No. 14/815,879, mailed on Sep. 21, 2017, 2 pages.
Corrected Notice of Allowance received for U.S. Appl. No. 15/183,663, mailed on Feb. 25, 2019, 3 pages.
Corrected Notice of Allowance received for U.S. Appl. No. 15/183,663, mailed on Mar. 27, 2019, 2 pages.
Corrected Notice of Allowance received for U.S. Appl. No. 15/355,956, mailed on Jan. 3, 2020, 2 pages.
Corrected Notice of Allowance received for U.S. Appl. No. 15/554,204, mailed on Aug. 19, 2020, 3 pages.
Corrected Notice of Allowance received for U.S. Appl. No. 15/798,257, mailed on Aug. 26, 2019, 2 pages.
Corrected Notice of Allowance received for U.S. Appl. No. 15/798,257, mailed on Jul. 9, 2019, 2 pages.
Corrected Notice of Allowance received for U.S. Appl. No. 15/798,257, mailed on Jun. 12, 2019, 2 pages.
Corrected Notice of Allowance received for U.S. Appl. No. 16/401,934, mailed on Dec. 23, 2019, 3 pages.
Corrected Notice of Allowance received for U.S. Appl. No. 16/401,934, mailed on Feb. 28, 2022, 3 pages.
Corrected Notice of Allowance received for U.S. Appl. No. 16/418,786, mailed on Jan. 5, 2022, 3 pages.
Corrected Notice of Allowance received for U.S. Appl. No. 16/418,786, mailed on Jun. 23, 2022, 2 pages.
Corrected Notice of Allowance received for U.S. Appl. No. 16/582,020, mailed on Aug. 11, 2021, 2 pages.
Corrected Notice of Allowance received for U.S. Appl. No. 16/935,002, mailed on Jul. 17, 2023, 5 pages.
Corrected Notice of Allowance received for U.S. Appl. No. 16/935,002, mailed on Mar. 2, 2023, 2 pages.
Corrected Notice of Allowance received for U.S. Appl. No. 16/935,002, mailed on Mar. 28, 2023, 2 pages.
Corrected Notice of Allowance received for U.S. Appl. No. 17/041,350, mailed on Apr. 4, 2022, 3 pages.
Corrected Notice of Allowance received for U.S. Appl. No. 17/041,350, mailed on Mar. 15, 2022, 3 pages.
Corrected Notice of Allowance received for U.S. Appl. No. 17/321,006, mailed on Aug. 31, 2023, 6 pages.
Corrected Notice of Allowance received for U.S. Appl. No. 17/341,839, mailed on Oct. 26, 2022, 2 pages.
Corrected Notice of Allowance received for U.S. Appl. No. 17/373,163, mailed on Jul. 15, 2022, 5 pages.
Corrected Notice of Allowance received for U.S. Appl. No. 17/373,163, mailed on Jun. 27, 2022, 5 pages.
Corrected Notice of Allowance received for U.S. Appl. No. 17/515,143, mailed on Mar. 29, 2023, 2 pages.
Corrected Notice of Allowance received for U.S. Appl. No. 17/941,962, mailed on Apr. 14, 2023, 6 pages.
Corrected Notice of Allowance received for U.S. Appl. No. 17/941,962, mailed on Aug. 3, 2023, 2 pages.
Cyr Jim, "Apple Watch—Customize Modular Watch Face", available online at: https://www.youtube.com/watch?v=02W93HbKIK8, May 13, 2015, 2 pages.
Dan, "Get This Look: 'Minimal' Zooper Widget", Online Available at:https://www.androidguys.com/featured/customize/get-look-minimal-zooper-widget/, Mar. 7, 2014, 2 pages.
Decision of Refusal received for Japanese Patent Application No. 2021-157213, mailed on May 15, 2023, 4 pages.
Decision on Acceptance received for Australian Patent Application No. 2015298710, mailed on Jul. 19, 2019, 18 pages.
Decision on Acceptance received for Australian Patent Application No. 2018201089, mailed on Apr. 20, 2021, 28 pages.
Decision on Appeal received for U.S. Appl. No. 14/815,890, mailed on Nov. 24, 2020, 13 pages.
Decision on Appeal received for U.S. Appl. No. 14/846,511, mailed on Dec. 29, 2021, 20 pages.
Decision on Appeal received for U.S. Appl. No. 16/861,651, mailed on Sep. 1, 2023, 14 pages.
Decision on Opposition received for Australian Patent Application No. 2015298710, mailed on Aug. 9, 2019, 4 pages.
Decision on Opposition received for Australian Patent Application No. 2015298710, mailed on Aug. 20, 2018, 20 pages.
Decision to Grant Received for Danish Patent Application No. PA201770397, mailed on Feb. 6, 2018, 2 pages.
Decision to Grant received for Danish Patent Application No. PA201770502, mailed on Feb. 25, 2021, 2 pages.
Decision to Grant received for Danish Patent Application No. PA201770503, mailed on Feb. 14, 2020, 2 pages.
Decision to Grant received for Danish Patent Application No. PA201770791, mailed on Jul. 7, 2020, 2 pages.
Decision to Grant received for Danish Patent Application No. PA201970596, mailed on Feb. 26, 2021, 2 pages.
Decision to Grant received for Danish Patent Application No. PA201970597, mailed on Aug. 19, 2021, 2 pages.
Decision to Grant received for Danish Patent Application No. PA202070609, mailed on May 3, 2021, 2 pages.
Decision to Grant received for European Patent Application No. 15730925.3, mailed on Dec. 9, 2021, 2 pages.
Decision to Grant received for European Patent Application No. 15747595.5, mailed on Jul. 16, 2020, 2 pages.
Decision to Grant received for European Patent Application No. 16762356.0, mailed on Apr. 26, 2022, 2 pages.
Decision to Grant received for European Patent Application No. 17206177.2, mailed on Aug. 6, 2020, 2 pages.
Decision to Grant received for European Patent Application No. 20185974.1, mailed on Aug. 19, 2022, 3 pages.
Decision to Grant received for European Patent Application No. 20761084.1, mailed on Jul. 27, 2023, 4 pages.
Decision to Grant received for European Patent Application No. 21169911.1, mailed on Jun. 29, 2023, 3 pages.
Decision to Grant received for European Patent Application No. 21177569.7, mailed on Apr. 6, 2023, 3 pages.
Decision to Refuse received for European Patent Application No. 15730924.6, mailed on Mar. 15, 2019, 12 pages.
Decision to Refuse received for Japanese Patent Application No. 2020-159824, mailed on Sep. 30, 2022, 6 pages.
Deluxe Moon—Guide, available online at:—https://web.archive.org/web/20130520161057/http://www.lifewaresolutions.com/deluxe_moon_guide_ip.html, May 20, 2013, 5 pages.
Digital alarm clock app for Android, Goggle play store digital alarm clock description page, Mar. 25, 2015, 3 pages.
Droid Life, "20+ Galaxy S9, S9+ Tips and Tricks", Available Online at: https://www.youtube.com/watch?v=sso0mYTfV6w, Mar. 22, 2018, pp. 1-33.
Droid Life, "How to: Use Always-on Apps with Android Wear", Available online at: https://www.youtube.com/watch?v=_-xYB9EBTaA, Jun. 26, 2015, 3 pages.
Ebpman Tech Reviews, "LG G3 Tips: How to customize the clock face", Available online at: https://www.youtube.com/watch?v=evraMWFb1fY, Jul. 25, 2014, 1 page.
Elecont, "Weather clock—hourly forecast description", Accurate 10-day weather forecast, NOAA radar and satellite, buoy, Elecont LLC Forums, Online Available at: https://www.tapatalk.com/groups/elecontfr/weather-clock-hourly-forecast-description-t427.html, Dec. 1, 2011, 5 pages.

(56) References Cited

OTHER PUBLICATIONS

Ergonomic requirements for office work with visual display terminals (VDTs), Part 13: User guidance, International Standard ISO, Zuerich, CH, vol. 9241-13,, Jul. 15, 1998, 40 pages.
European Search Report received for European Patent Application No. 17206177.2, mailed on Apr. 30, 2018, 4 pages.
European Search Report received for European Patent Application No. 20172197.4, mailed on Jul. 28, 2020, 4 pages.
European Search Report received for European Patent Application No. 20204436.8, mailed on Mar. 9, 2021, 5 pages.
Evgenyevich Sergey, "Earth & Moon in HD Gyro 3D", Available at <https://www.youtube.com/watch?v=IRwNcaSYrls/>, Dec. 1, 2013, 2 pages.
Examiner's Answer to Appeal Brief received for U.S. Appl. No. 14/815,890, mailed on Mar. 20, 2020, 16 pages.
Examiner's Answer to Appeal Brief received for U.S. Appl. No. 14/846,511, mailed on Jun. 14, 2021, 15 pages.
Examiner's Answer to Appeal Brief received for U.S. Appl. No. 15/405,122, mailed on Jan. 11, 2023, 16 pages.
Examiner's Answer to Appeal Brief received for U.S. Appl. No. 16/861,651, mailed on Jan. 18, 2023, 16 pages.
Extended European Search Report received for European Patent Application No. 16762356.0, mailed on Nov. 9, 2018, 10 pages.
Extended European Search Report received for European Patent Application No. 16837432.0, mailed on Mar. 11, 2019, 10 pages.
Extended European Search Report received for European Patent Application No. 17810723.1, mailed on Nov. 12, 2019, 9 pages.
Extended European Search Report received for European Patent Application No. 20185974.1, mailed on Oct. 28, 2020, 7 pages.
Extended European Search Report received for European Patent Application No. 21169911.1, mailed on Sep. 20, 2021, 9 pages.
Extended European Search Report received for European Patent Application No. 21177569.7, mailed on Sep. 20, 2021, 8 pages.
Extended European Search Report received for European Patent Application No. 22153137.9, mailed on Jul. 15, 2022, 7 pages.
Extended European Search Report received for European Patent Application No. 22173249.8, mailed on Aug. 19, 2022, 15 pages.
Extended European Search Report received for European Patent Application No. 22188724.3, mailed on Mar. 2, 2023, 14 pages.
Feist Jonathan, "Android customization—how to create a custom clock widget using Zooper Widget", Available Online at: https://www.androidauthority.com/zooper-widget-clock-366476/, May 15, 2014, 10 pages.
Feldman Ari, "Excerpts from: Designing Arcade Computer Game Graphics", Available online at: http://www.phatcode.net/res/269/files/dacgg.pdf, Jan. 1, 2001, 35 pages.
Final Office Action received for U.S. Appl. No. 14/815,890, mailed on Feb. 26, 2018, 20 pages.
Final Office Action received for U.S. Appl. No. 14/815,890, mailed on May 14, 2019, 22 pages.
Final Office Action received for U.S. Appl. No. 14/815,890, mailed on Nov. 21, 2016, 18 pages.
Final Office Action received for U.S. Appl. No. 14/815,898, mailed on Jun. 9, 2016, 19 pages.
Final Office Action received for U.S. Appl. No. 14/821,667, mailed on Apr. 26, 2018, 13 pages.
Final Office Action received for U.S. Appl. No. 14/841,606, mailed on Sep. 7, 2018, 34 pages.
Final Office Action received for U.S. Appl. No. 14/846,511 mailed on May 10, 2018, 21 pages.
Final Office Action received for U.S. Appl. No. 14/846,511, mailed on Aug. 11, 2020, 25 pages.
Final Office Action received for U.S. Appl. No. 14/846,511, mailed on Jun. 5, 2019, 24 pages.
Final Office Action received for U.S. Appl. No. 15/405,122, mailed on Jan. 21, 2020, 36 pages.
Final Office Action received for U.S. Appl. No. 15/405,122, mailed on Nov. 5, 2021, 45 pages.
Final Office Action received for U.S. Appl. No. 15/421,865, mailed on Dec. 2, 2019, 19 pages.
Final Office Action received for U.S. Appl. No. 15/421,865, mailed on Jul. 12, 2022, 27 pages.
Final Office Action received for U.S. Appl. No. 15/421,865, mailed on Mar. 19, 2021, 20 pages.
Final Office Action received for U.S. Appl. No. 15/554,204, mailed on Oct. 31, 2019, 22 pages.
Final Office Action received for U.S. Appl. No. 15/798,235, mailed on Oct. 9, 2018, 45 pages.
Final Office Action received for U.S. Appl. No. 15/798,235, mailed on Oct. 18, 2019, 25 pages.
Final Office Action received for U.S. Appl. No. 15/881,544, mailed on Jan. 29, 2019, 14 pages.
Final Office Action received for U.S. Appl. No. 15/884,195, mailed on Feb. 22, 2021, 26 pages.
Final Office Action received for U.S. Appl. No. 15/884,195, mailed on Sep. 29, 2020, 20 pages.
Final Office Action received for U.S. Appl. No. 16/389,722, mailed on Dec. 6, 2021, 19 pages.
Final Office Action received for U.S. Appl. No. 16/389,722, mailed on Dec. 8, 2020, 18 pages.
Final Office Action received for U.S. Appl. No. 16/389,722, mailed on Mar. 17, 2023, 14 pages.
Final Office Action received for U.S. Appl. No. 16/401,934, mailed on Jun. 14, 2021, 30 pages.
Final Office Action received for U.S. Appl. No. 16/418,786, mailed on Jan. 13, 2021, 14 pages.
Final Office Action received for U.S. Appl. No. 16/582,020, mailed on Apr. 28, 2020, 31 pages.
Final Office Action received for U.S. Appl. No. 16/584,281, mailed on Apr. 15, 2020, 26 pages.
Final Office Action received for U.S. Appl. No. 16/585,721, mailed on Apr. 1, 2020, 28 pages.
Final Office Action received for U.S. Appl. No. 16/736,704, mailed on Oct. 13, 2020, 62 pages.
Final Office Action received for U.S. Appl. No. 16/861,651, mailed on Apr. 20, 2021, 14 pages.
Final Office Action received for U.S. Appl. No. 16/861,651, mailed on Jan. 26, 2022, 16 pages.
Final Office Action received for U.S. Appl. No. 16/935,002, mailed on Jan. 5, 2022, 25 pages.
Final Office Action received for U.S. Appl. No. 16/943,737, mailed on Feb. 4, 2022, 24 pages.
Final Office Action received for U.S. Appl. No. 16/997,588, mailed on Mar. 30, 2021, 23 pages.
Final Office Action received for U.S. Appl. No. 17/031,671, mailed on Nov. 15, 2022, 27 pages.
Final Office Action received for U.S. Appl. No. 17/031,671, mailed on Sep. 7, 2021, 27 pages.
Final Office Action received for U.S. Appl. No. 17/031,765, mailed on Oct. 29, 2021, 34 pages.
Final Office Action received for U.S. Appl. No. 17/031,765, mailed on Sep. 1, 2023, 37 pages.
Final Office Action received for U.S. Appl. No. 17/031,765, mailed on Sep. 12, 2022, 37 pages.
Final Office Action received for U.S. Appl. No. 17/041,350, mailed on Sep. 17, 2021, 25 pages.
Final Office Action received for U.S. Appl. No. 17/068,386, mailed on Mar. 3, 2022, 29 pages.
Final Office Action received for U.S. Appl. No. 17/068,386, mailed on May 8, 2023, 23 pages.
Final Office Action received for U.S. Appl. No. 17/158,936, mailed on Apr. 7, 2023, 18 pages.
Final Office Action received for U.S. Appl. No. 17/341,839, mailed on Jul. 18, 2022, 15 pages.
Final Office Action received for U.S. Appl. No. 17/546,630, mailed on Jun. 27, 2023, 31 pages.
Final Office Action received for U.S. Appl. No. 17/591,184, mailed on Dec. 23, 2022, 10 pages.
Final Office Action received for U.S. Appl. No. 17/681,584, mailed on Apr. 20, 2023, 15 pages.
Final Office Action received for U.S. Appl. No. 17/713,016, mailed on Mar. 15, 2023, 6 pages.

(56) References Cited

OTHER PUBLICATIONS

Final Office Action received for U.S. Appl. No. 17/746,807, mailed on Apr. 26, 2023, 16 pages.
Final Office Action received for U.S. Appl. No. 17/947,530, mailed on Jul. 13, 2023, 17 pages.
Final Office Action received for U.S. Appl. No. 17/949,081, mailed on Jun. 5, 2023, 23 pages.
Final Office Action received for U.S. Appl. No. 14/815,879, mailed on Mar. 24, 2016, 46 pages.
First Action Interview received for U.S. Appl. No. 14/815,890, mailed on Aug. 12, 2016, 3 pages.
Fitbit surge Fitness Watch, Manual version 1.0, May 7, 2015, 48 pages.
Fuchphone Extras, "LG G Watch—Designs | Watch Faces", Available online at: https://www.youtube.com/watch?v=yqxzqdi_MSE, Jul. 27, 2014, 1 page.
Fuchphone Extras, "Samsung Gear Live—Designs | Watch Faces", Available online at: https://www.youtube.com/watch?v=fFjtVAxyimE, Jul. 26, 2014, 1 page.
Fukuda Kazuhiro, "Xperia Z1 Perfect Manual", Sotec Co., Ltd., No. 1,, Nov. 15, 2013, pp. 217-218.
Gauging Gadgets, "How to Customize Watch Faces—Garmin Venu Tutorial", Online Available at: https://www.youtube.com/watch?v=dxajKKulaP0, Jan. 7, 2020, 14 pages.
Gazer,"iPhone 4S Super Manual", Shuwa System Co., Saito Kazukuni, vol. 1, Jun. 6, 2013, 7 pages.
Geary David, "Programming HTML5 Canvas", O'Reilly Japan, Inc., No. 1, Jul. 23, 2014, pp. 327-330.
Geek, "How to Put the Day of the Week into the Windows Taskbar Clock", available online at: https://www.howtogeek.com/194103/how-to-put-the-day-of-the-week-into-the-windows-taskbar-clock/, 2014, 3 pages.
Google Earth 7.0.1.8244, retrieved from the Internet: http://dl.google.com/dl/earth/client/ge7/release_7_0_1/googleearth-win-bundle-7.0.1.8244.exe, Oct. 29, 2012, 1 page.
Google Earth on Android—AndroidCentral.com, Available online at:—https://www.youtube.com/watch?v=1WxN1RunrE4, Feb. 22, 2010, 1 page.
Google, "Android User's Guide", Retrieved from the Internet: https://static.googleusercontent.com/media/www.google.com/en//help/hc/pdfs/mobile/AndroidUsersGuide-30-100.pdf, Feb. 23, 2011, 140 pages.
Gottabemobile, "How to Change Watch Faces on Android Wear", available online at URL:https://www.youtube.com/watch?v=B8iRGkGq6a8, Jul. 9, 2014, 4 pages.
Hartl et al., "Efficient Verification of Holograms Using Mobile Augmented Reality", IEEE Transactions on Visualization and Computer Graphics, vol. 22, No. 7, Online available at: https://arbook.icg.tugraz.at/schmalstieg/Schmalstieg_302.pdf, 2015, 9 pages.
Hoffman Chris, "5+ Cool Uses for Android's Daydream Mode", Online Available at: https://www.howtogeek.com/170990/5-cool-uses-for-androids-daydream-mode/, Jul. 12, 2017, 8 pages.
Hoffman Chris, "5+ Cool Uses for Android's Daydream Mode", retrieved from—https://www.howtogeek.com/170990/5-cool-uses-for-androids-daydream-mode, Jul. 12, 2017, 8 pages.
ILOVEX, ""Stripe Generator", a tool that makes it easy to create striped materials", Online available at : https://www.ilovex.co.jp/blog/system/webconsulting/stripe-generator.html, May 2, 2012, 3 pages.
Instruction Manual, Detailed version, KDDI Corporation, No. 1, vol. 1,, Jun. 2014, 4 pages.
Intention to Grant received for Danish Patent Application No. PA201570496 , mailed on Feb. 17, 2016, 6 pages.
Intention to Grant Received for Danish Patent Application No. PA201770397, mailed on Aug. 18, 2017, 7 pages.
Intention to Grant received for Danish Patent Application No. PA201770502, mailed on Oct. 6, 2020, 2 pages.
Intention to Grant received for Danish Patent Application No. PA201770503, mailed on Nov. 11, 2019, 2 pages.
Intention to Grant received for Danish Patent Application No. PA201770791, mailed on Feb. 19, 2020, 2 pages.
Intention to Grant Received for Danish Patent Application No. PA201970596, mailed on Dec. 1, 2020, 2 pages.
Intention to Grant received for Danish Patent Application No. PA201970597, mailed on Apr. 20, 2021, 2 pages.
Intention to Grant received for Danish Patent Application No. PA202070609, mailed on Jan. 14, 2021, 2 pages.
Intention to Grant received for Danish Patent Application No. PA202070623, mailed on Jul. 20, 2022, 2 pages.
Intention to Grant received for European Patent Application No. 15730925.3, mailed on Aug. 16, 2021, 10 pages.
Intention to Grant received for European Patent Application No. 15730925.3, mailed on May 28, 2020, 10 pages.
Intention to Grant received for European Patent Application No. 15747595.5, mailed on Feb. 17, 2020, 8 pages.
Intention to Grant received for European Patent Application No. 16762356.0, mailed on Dec. 23, 2021, 8 pages.
Intention to Grant received for European Patent Application No. 16837432.0, mailed on Apr. 14, 2023, 8 pages.
Intention to Grant received for European Patent Application No. 17206177.2, mailed on Feb. 24, 2020, 8 pages.
Intention to Grant received for European Patent Application No. 17810723.1, mailed on Dec. 16, 2022, 9 pages.
Intention to Grant received for European Patent Application No. 17810723.1, mailed on Jun. 12, 2023, 9 pages.
Intention to Grant received for European Patent Application No. 20185974.1, mailed on Apr. 28, 2022, 8 pages.
Intention to Grant received for European Patent Application No. 20204436.8, mailed on May 3, 2023, 10 pages.
Intention to Grant received for European Patent Application No. 20729346.5, mailed on Jul. 10, 2023, 9 pages.
Intention to Grant received for European Patent Application No. 20761084.1, mailed on Mar. 27, 2023, 10 pages.
Intention to Grant received for European Patent Application No. 21169911.1, mailed on Mar. 6, 2023, 9 pages.
Intention to Grant received for European Patent Application No. 21177569.7, mailed on Oct. 27, 2022, 8 pages.
Preliminary Report on Patentability received for PCT Application No. PCT/US2016/037686, mailed on Mar. 1, 2018, 12 pages.
Preliminary Report on Patentability received for PCT Patent Application No. PCT/US2015/034604, mailed on Feb. 16, 2017, 21 pages.
Preliminary Report on Patentability received for PCT Patent Application No. PCT/US2015/034606, mailed on Feb. 16, 2017, 11 pages.
Preliminary Report on Patentability received for PCT Patent Application No. PCT/US2015/034607, mailed on Feb. 16, 2017, 18 pages.
Preliminary Report on Patentability received for PCT Patent Application No. PCT/US2015/044473, mailed on Mar. 2, 2017, 20 pages.
Preliminary Report on Patentability received for PCT Patent Application No. PCT/US2015/044485, mailed on Mar. 2, 2017, 20 pages.
Preliminary Report on Patentability received for PCT Patent Application No. PCT/US2015/053353, mailed on Sep. 21, 2017., 15 pages.
Preliminary Report on Patentability received for PCT Patent Application No. PCT/US2015/054223, mailed on Dec. 14, 2017, 18 pages.
Preliminary Report on Patentability received for PCT Patent Application No. PCT/US2016/021403, mailed on Sep. 21, 2017, 21 pages.
Preliminary Report on Patentability received for PCT Patent Application No. PCT/US2016/035090, mailed on Dec. 14, 2017, 14 pages.
International Preliminary Report on Patentability received for PCT Patent Application No. PCT/US2017/034834, mailed on Dec. 20, 2018, 9 pages.
International Preliminary Report on Patentability received for PCT Patent Application No. PCT/US2018/032164, mailed on Nov. 21, 2019, 11 pages.

(56) References Cited

OTHER PUBLICATIONS

International Preliminary Report on Patentability received for PCT Patent Application No. PCT/US2018/033054, mailed on Nov. 28, 2019, 21 pages.
International Preliminary Report on Patentability received for PCT Patent Application No. PCT/US2019/030770, mailed on Nov. 19, 2020, 14 pages.
International Preliminary Report on Patentability received for PCT Patent Application No. PCT/US2020/030079, mailed on Nov. 18, 2021, 12 pages.
International Preliminary Report on Patentability received for PCT Patent Application No. PCT/US2020/031536, mailed on Nov. 18, 2021, 11 pages.
International Preliminary Report on Patentability received for PCT Patent Application No. PCT/US2020/031575, mailed on Nov. 18, 2021, 9 pages.
International Preliminary Report on Patentability received for PCT Patent Application No. PCT/US2020/045814, mailed on Mar. 17, 2022, 12 pages.
International Preliminary Report on Patentability received for PCT Patent Application No. PCT/US2021/031212, mailed on Nov. 24, 2022, 16 pages.
International Preliminary Report on Patentability received for PCT Patent Application No. PCT/US2021/031669, mailed on Nov. 24, 2022, 12 pages.
International Search Report and Written Opinion received for PCT Application No. PCT/US2015/034604, mailed on Nov. 9, 2015, 30 pages.
International Search Report and Written Opinion received for PCT Patent Application No. PCT/US2018/033054, mailed on Oct. 30, 2018, 32 pages.
International Search Report and Written Opinion received for PCT Patent Application No. PCT/US2015/034606, mailed on Dec. 2, 2015, 17 pages.
International Search Report and Written Opinion received for PCT Patent Application No. PCT/US2015/044473, mailed on Feb. 12, 2016, 24 pages.
International Search Report and Written Opinion received for PCT Patent Application No. PCT/US2015/044485, mailed on Feb. 9, 2016, 27 pages.
International Search Report and Written Opinion received for PCT Patent Application No. PCT/US2015/053353, mailed on May 9, 2016, 21 pages.
International Search Report and Written Opinion received for PCT Patent Application No. PCT/US2015/054223, mailed on Jul. 6, 2016, 25 pages.
International Search Report and Written Opinion received for PCT Patent Application No. PCT/US2016/021403, mailed on May 12, 2016, 23 pages.
International Search Report and Written Opinion received for PCT Patent Application No. PCT/US2016/035090, mailed on Oct. 4, 2016, 17 pages.
International Search Report and Written Opinion received for PCT Patent Application No. PCT/US2016/037686, mailed on Sep. 9, 2016, 19 pages.
International Search Report and Written Opinion received for PCT Patent Application No. PCT/US2017/034834, mailed on Aug. 23, 2017, 10 pages.
International Search Report and Written Opinion received for PCT Patent Application No. PCT/US2018/032164, mailed on Oct. 18, 2018, 16 pages.
International Search Report and Written Opinion received for PCT Patent Application No. PCT/US2019/030770, mailed on Oct. 31, 2019, 23 pages.
International Search Report and Written Opinion received for PCT Patent Application No. PCT/US2020/030079, mailed on Sep. 4, 2020, 18 pages.
International Search Report and Written Opinion received for PCT Patent Application No. PCT/US2020/031536, mailed on Sep. 23, 2020, 16 pages.
International Search Report and Written Opinion received for PCT Patent Application No. PCT/US2020/031575, mailed on Aug. 20, 2020, 14 pages.
International Search Report and Written Opinion received for PCT Patent Application No. PCT/US2020/045814, mailed on Jan. 20, 2021, 16 pages.
International Search Report and Written Opinion received for PCT Patent Application No. PCT/US2021/031212, mailed on Sep. 21, 2021, 21 pages.
International Search Report and Written Opinion received for PCT Patent Application No. PCT/US2021/031669, mailed on Oct. 13, 2021, 17 pages.
International Search Report and Written Opinion received for PCT Patent Application No. PCT/US2022/026371, mailed on Oct. 12, 2022, 16 pages.
International Search Report and Written Opinion received for PCT Patent Application No. PCT/US2022/029279, mailed on Nov. 9, 2022, 16 pages.
International Search Report and Written Opinion received for PCT Patent Application No. PCT/US2023/011151, mailed on Jul. 5, 2023, 20 pages.
International Search Report and Written Opinion received for PCT Patent Application No. PCT/US2015/034607, mailed on Dec. 1, 2015, 23 pages.
Internet Blog Post,"[PC] Pre-Customization of Black Desert's Characters", Online Available at :—<https://blog.naver.com/hsh6051/220209813968>, Dec. 14, 2014, 41 pages.
Inventerium, "Tropical Fish 14", Available online at: https://www.turbosquid.com/3d-models/tropical-fish-3d-model/388510, Feb. 4, 2008, 2 pages.
Invitation to Additional Fees and Partial International Search Report received for PCT Patent Application No. PCT/US2015/034604 mailed on Sep. 4, 2015, 6 pages.
Invitation to Additional Fees and Partial International Search Report received for PCT Patent Application No. PCT/US2015/034606 mailed on Sep. 9, 2015, 6 pages.
Invitation to Pay Additional Fee received for European Patent Application No. 15747595.5, mailed on Feb. 9, 2018, 6 pages.
Invitation to Pay Additional Fees and Partial International Search Report received for PCT Patent Application No. PCT/US2022/029279, mailed on Sep. 15, 2022, 9 pages.
Invitation to Pay Additional Fees and Partial International Search Report received for PCT Patent Application No. PCT/US2023/011151, mailed on May 12, 2023, 13 pages.
Invitation to Pay Additional Fees received for PCT Patent Application No. PCT/US2015/034607, mailed on Sep. 30, 2015, 4 pages.
Invitation to Pay Additional Fees received for PCT Patent Application No. PCT/US2015/044473, mailed on Nov. 3, 2015, Nov. 3, 2015, 5 pages.
Invitation to Pay Additional Fees received for PCT Patent Application No. PCT/US2015/044485, mailed on Nov. 3, 2015, Nov. 3, 2015, 7 pages.
Invitation to Pay Additional fees received for PCT Patent Application No. PCT/US2015/053353, mailed on Jan. 21, 2016, 7 pages.
Invitation to pay additional fees received for PCT Patent Application No. PCT/US2015/054223, mailed on Mar. 9, 2016, 9 pages.
Invitation to Pay Additional Fees received for PCT Patent Application No. PCT/US2016/035090, mailed on Jul. 15, 2016, 2 pages.
Invitation to Pay Additional Fees received for PCT Patent Application No. PCT/US2018/032164, mailed on Aug. 21, 2018, 10 pages.
Invitation to Pay Additional Fees received for PCT Patent Application No. PCT/US2018/033054, mailed on Sep. 4, 2018, 25 pages.
Invitation to Pay Additional Fees received for PCT Patent Application No. PCT/US2019/030770, mailed on Jul. 26, 2019, 12 pages.
Invitation to Pay Additional Fees received for PCT Patent Application No. PCT/US2020/030079, mailed on Jul. 14, 2020, 12 pages.
Invitation to Pay Additional Fees received for PCT Patent Application No. PCT/US2020/031536, mailed on Jul. 31, 2020, 9 pages.
Invitation to Pay Additional Fees received for PCT Patent Application No. PCT/US2020/045814, mailed on Nov. 18, 2020, 11 pages.

(56) References Cited

OTHER PUBLICATIONS

Invitation to Pay Additional Fees received for PCT Patent Application No. PCT/US2021/031212, mailed on Jul. 28, 2021, 19 pages.
Invitation to Pay Additional Fees received for PCT Patent Application No. PCT/US2021/031669, mailed on Aug. 19, 2021, 9 pages.
Invitation to Pay Additional Fees received for PCT Patent Application No. PCT/US2022/026371, mailed on Aug. 18, 2022, 9 pages.
Invitation to Pay Search Fees received for European Patent Application No. 18730556.0, mailed on Mar. 2, 2020, 3 pages.
Invitation to Pay Search Fees received for European Patent Application No. 20730136.7, mailed on Jul. 1, 2022, 4 pages.
Invitation to Pay Search Fees received for European Patent Application No. 20761084.1, mailed on Dec. 7, 2021, 3 pages.
Jahpizzie, "Brightness on Lock Screen", Online Available at: https://www.reddit.com/r/galaxys10/comments/b4d5fb/brightness_on_lock_screen/, 2019, 1 page.
Jean, "Our Pact Parental Control Review", Available online at : https://www.bewebsmart.com/parental-controls/our-pact-parental-control-review/, Jun. 25, 2016, 25 pages.
Jurick et al., "iPhone Hacks", Tips & Tools for Unlocking the Power of Your iPhone & iPod touch, Online:URL:https://api.pageplace.de/preview/DT0400.9780596550974_A23629666/preview-9780596550974_A23629666.pdf >, Apr. 2009, 49 pages.
Kasai Yoshino, "Apple Watch Absolute Basics—Season 3—The key is to customize the dial", Mynavi Corporation, Online Available at: https://news.mynavi.jp/article/20171104-apple_watch/, Nov. 4, 2017, 5 pages.
Kenney Briley, "How to Customize a Smartwatch and other Personalization Questions", Available online at: <https://smartwatches.org/learn/customize-smartwatch/>, Jan. 23, 2014, 3 pages.
Kidizoom Smartwatch, Available online at <URL:https://www.vtechnl.com/media/downloads/Kidizoom-Smart-Watch.pdf>, Jun. 24, 2014, 23 pages.
Lee et al., "Pass: Reducing Redundant Notifications between a Smartphone and a Smartwatch for Energy Saving", IEEE Transactions on Mobile Computing, vol. 19, No. 11, Jul. 23, 2019, pp. 2656-2669.
Lein et al., "Patternizer", Available online at: https://patternizer.com/, Apr. 2016, 5 pages.
Link to Wayback Machine with link to Google Play showing different layouts of complications associated with a clock face, available online at <https://play.google.com/store/apps/details?id=com.levelup.beautifulwidgets.free&hl=da >, Sep. 9, 2013, 6 pages.
Living Earth, available at : http;//www.livingcarthapp.com/, 2014, 6 pages.
Looking for a Launcher That Changes the Default Homescreen or Widgets Based on Wifi, Location, or Other Context, Online Available at: https://www.reddit.com/r/androidapps/comments/35lu90/looking_for_a_launcher_that_changes_the_default/, 2015, 2 pages.
Lyons Kent, "Smartwatch Innovation: Exploring a Watch-First Model", Pervasive Computing, Jan. 2016, pp. 10-13.
Minutes of Oral Proceedings received for European Patent Application No. 15730924.6, mailed on Mar. 13, 2019, 4 pages.
Minutes of Oral Proceedings received for European Patent Application No. 15730925.3, mailed on May 26, 2020, 11 pages.
Minutes of Oral Proceedings received for European Patent Application No. 16762356.0, mailed on Dec. 17, 2021, 5 pages.
Minutes of the Oral Proceedings received for European Patent Application No. 17810723.1, mailed on Dec. 9, 2022, 7 pages.
Minutes of the Oral Proceedings received for European Patent Application No. 20729346.5, mailed on Jul. 4, 2023, 6 pages.
MS Excel 2013, Jan. 29, 2013, 2 pages.
My Mate Vince, "Setting up the Fitbit Alta HR Activity Tracker on Apple iOS", Online available at:—<https://youtu.be/FdwRF4IfvFc>, Jun. 18, 2017, 3 pages.
Nerdtalk, "The Best Android Clock Widgets", available at: https://www.youtube.com/watch?v=E1bAprWByfU, Apr. 25, 2011, 1 page.
New, but unsigned—Easy StopWatch for Symbian, XP55393563, Available online at <http://www.allaboutsymbian.com/flow/item/19490_New_but_unsigned-Easy_StopWatc.php>, Mar. 15, 2014, 15 pages.
Night Display (Alarm Clock) App, Google Play Store Night Display (Alarm Clock) Description page, available at <https://web.archive.org/web/20141007124222/https://play.google.com/store/apps/details?id=com.srk.nighttimedisplay&hl=en>, Oct. 7, 2014, pp. 1-3.
Non Final Office Action received for U.S. Appl. No. 17/037,085, mailed on Jul. 8, 2021, 37 pages.
Non Final Office Action received for U.S. Appl. No. 14/815,890, mailed on Jun. 6, 2017, 19 pages.
Non Final Office Action received for U.S. Appl. No. 14/815,890, mailed on Oct. 19, 2015, 5 pages.
Non Final Office Action received for U.S. Appl. No. 15/881,544, mailed on Jun. 7, 2018, 15 pages.
Non-Final Office Action received for U.S. Appl. No. 15/421,865, mailed on Mar. 21, 2019, 18 pages.
Non-Final Office Action received for U.S. Appl. No. 15/554,204, mailed on Apr. 17, 2019, 19 pages.
Non-Final Office Action received for U.S. Appl. No. 14/815,879, mailed on Dec. 15, 2016, 33 pages.
Non-Final Office Action received for U.S. Appl. No. 14/815,890, mailed on Dec. 18, 2018, 21 pages.
Non-Final Office Action received for U.S. Appl. No. 14/821,667, mailed on Feb. 4, 2019, 13 pages.
Non-Final Office Action received for U.S. Appl. No. 14/821,667, mailed on Jul. 14, 2017, 12 pages.
Non-Final Office Action received for U.S. Appl. No. 14/839,889, mailed on Mar. 7, 2017, 26 pages.
Non-Final Office Action received for U.S. Appl. No. 14/841,606, mailed on Dec. 7, 2017, 30 pages.
Non-Final Office Action received for U.S. Appl. No. 14/841,606, mailed on May 8, 2019, 28 pages.
Non-Final Office Action received for U.S. Appl. No. 14/846,511 mailed on Jan. 7, 2020, 25 pages.
Non-Final Office Action received for U.S. Appl. No. 14/846,511 mailed on Oct. 27, 2017, 15 pages.
Non-Final Office Action received for U.S. Appl. No. 15/183,663, mailed on Jul. 9, 2018, 13 pages.
Non-Final Office Action received for U.S. Appl. No. 15/355,956, mailed on May 31, 2019, 32 pages.
Non-Final Office Action received for U.S. Appl. No. 15/405,122, mailed on Apr. 2, 2021, 35 pages.
Non-Final Office Action received for U.S. Appl. No. 15/405,122, mailed on May 31, 2019, 43 pages.
Non-Final Office Action received for U.S. Appl. No. 15/405,122, mailed on Sep. 24, 2020, 30 pages.
Non-Final Office Action received for U.S. Appl. No. 15/421,865, mailed on Dec. 29, 2021, 23 pages.
Non-Final Office Action received for U.S. Appl. No. 15/421,865, mailed on Jul. 11, 2023, 32 pages.
Non-Final Office Action received for U.S. Appl. No. 15/421,865, mailed on Oct. 7, 2020, 20 pages.
Non-Final Office Action received for U.S. Appl. No. 15/798,235, mailed on Apr. 24, 2019, 25 pages.
Non-Final Office Action received for U.S. Appl. No. 15/798,235, mailed on Mar. 14, 2018, 58 pages.
Non-Final Office Action received for U.S. Appl. No. 15/884,195, mailed on Feb. 27, 2020, 18 pages.
Non-Final Office Action received for U.S. Appl. No. 15/884,195, mailed on May 18, 2021, 26 pages.
Non-Final Office Action received for U.S. Appl. No. 15/981,817, mailed on Jan. 2, 2020, 31 pages.
Non-Final Office Action received for U.S. Appl. No. 16/389,722, mailed on Apr. 3, 2020, 15 pages.
Non-Final Office Action received for U.S. Appl. No. 16/389,722, mailed on Jul. 7, 2022, 16 pages.
Non-Final Office Action received for U.S. Appl. No. 16/389,722, mailed on Jun. 3, 2021, 17 pages.
Non-Final Office Action received for U.S. Appl. No. 16/401,934, mailed on Dec. 11, 2020, 26 pages.

(56) References Cited

OTHER PUBLICATIONS

Non-Final Office Action received for U.S. Appl. No. 16/418,786, mailed on Apr. 24, 2020, 16 pages.
Non-Final Office Action received for U.S. Appl. No. 16/418,786, mailed on Aug. 1, 2022, 18 pages.
Non-Final Office Action received for U.S. Appl. No. 16/418,786, mailed on Mar. 28, 2022, 14 pages.
Non-Final Office Action received for U.S. Appl. No. 16/418,786, mailed on Oct. 4, 2021, 10 pages.
Non-Final Office Action received for U.S. Appl. No. 16/582,020, mailed on Apr. 5, 2021, 29 pages.
Non-Final Office Action received for U.S. Appl. No. 16/582,020, mailed on Jan. 13, 2020, 39 pages.
Non-Final Office Action received for U.S. Appl. No. 16/584,281, mailed on Dec. 10, 2019, 23 pages.
Non-Final Office Action received for U.S. Appl. No. 16/584,445, mailed on Dec. 26, 2019, 19 pages.
Non-Final Office Action received for U.S. Appl. No. 16/585,399, mailed on Jan. 23, 2020, 28 pages.
Non-Final Office Action received for U.S. Appl. No. 16/585,714, mailed on Apr. 16, 2020, 18 pages.
Non-Final Office Action received for U.S. Appl. No. 16/585,721, mailed on Dec. 27, 2019, 25 pages.
Non-Final Office Action received for U.S. Appl. No. 16/659,507, mailed on Oct. 7, 2020, 16 pages.
Non-Final Office Action received for U.S. Appl. No. 16/736,704, mailed on May 1, 2020, 41 pages.
Non-Final Office Action received for U.S. Appl. No. 16/861,651, mailed on Nov. 27, 2020, 11 pages.
Non-Final Office Action received for U.S. Appl. No. 16/861,651, mailed on Sep. 30, 2021, 16 pages.
Non-Final Office Action received for U.S. Appl. No. 16/935,002, mailed on Jun. 25, 2021, 20 pages.
Non-Final Office Action received for U.S. Appl. No. 16/943,737, mailed on Jun. 25, 2021, 18 pages.
Non-Final Office Action received for U.S. Appl. No. 16/943,737, mailed on Mar. 28, 2023, 28 pages.
Non-Final Office Action received for U.S. Appl. No. 16/997,588, mailed on Dec. 14, 2020, 21 pages.
Non-Final Office Action received for U.S. Appl. No. 17/031,654, mailed on Nov. 19, 2020, 12 pages.
Non-Final Office Action received for U.S. Appl. No. 17/031,671, mailed on Apr. 1, 2022, 32 pages.
Non-Final Office Action received for U.S. Appl. No. 17/031,671, mailed on Apr. 30, 2021, 27 pages.
Non-Final Office Action received for U.S. Appl. No. 17/031,671, mailed on Mar. 17, 2023, 34 pages.
Non-Final Office Action received for U.S. Appl. No. 17/031,765, mailed on Jun. 28, 2021, 32 pages.
Non-Final Office Action received for U.S. Appl. No. 17/031,765, mailed on Mar. 28, 2023, 31 pages.
Non-Final Office Action received for U.S. Appl. No. 17/031,765, mailed on Mar. 29, 2022, 33 pages.
Non-Final Office Action received for U.S. Appl. No. 17/068,386, mailed on Jun. 10, 2021, 24 pages.
Non-Final Office Action received for U.S. Appl. No. 17/068,386, mailed on Jan. 30, 2023, 20 pages.
Non-Final Office Action received for U.S. Appl. No. 17/068,386, mailed on Jul. 15, 2021, 16 pages.
Non-Final Office Action received for U.S. Appl. No. 17/068,386, mailed on Oct. 28, 2021, 20 pages.
Non-Final Office Action received for U.S. Appl. No. 17/158,936, mailed on Nov. 30, 2022, 17 pages.
Non-Final Office Action received for U.S. Appl. No. 17/317,042, mailed on Nov. 10, 2021, 13 pages.
Non-Final Office Action received for U.S. Appl. No. 17/321,006, mailed on Nov. 1, 2022, 10 pages.
Non-Final Office Action received for U.S. Appl. No. 17/341,839, mailed on Mar. 17, 2022, 14 pages.
Non-Final Office Action received for U.S. Appl. No. 17/366,698, mailed on Jul. 31, 2023, 20 pages.
Non-Final Office Action received for U.S. Appl. No. 17/373,163, mailed on Jan. 27, 2022, 14 pages.
Non-Final Office Action received for U.S. Appl. No. 17/546,630, mailed on Mar. 30, 2023, 41 pages.
Non-Final Office Action received for U.S. Appl. No. 17/556,165, mailed on Sep. 7, 2022, 15 pages.
Non-Final Office Action received for U.S. Appl. No. 17/591,184, mailed on Apr. 21, 2023, 15 pages.
Non-Final Office Action received for U.S. Appl. No. 17/591,184, mailed on Aug. 4, 2022, 18 pages.
Non-Final Office Action received for U.S. Appl. No. 17/681,584, mailed on Jan. 18, 2023, 12 pages.
Non-Final Office Action received for U.S. Appl. No. 17/713,016, mailed on Oct. 27, 2022, 25 pages.
Non-Final Office Action received for U.S. Appl. No. 17/717,275, mailed on Jul. 3, 2023, 10 pages.
Non-Final Office Action received for U.S. Appl. No. 17/738,940, mailed on Dec. 22, 2022, 31 pages.
Non-Final Office Action received for U.S. Appl. No. 17/746,807, mailed on Feb. 2, 2023, 14 pages.
Non-Final Office Action received for U.S. Appl. No. 17/746,807, mailed on Jul. 20, 2023, 14 pages.
Non-Final Office Action received for U.S. Appl. No. 17/947,530, mailed on Mar. 31, 2023, 14 pages.
Non-Final Office Action received for U.S. Appl. No. 17/948,578, mailed on Feb. 2, 2023, 13 pages.
Non-Final Office Action received for U.S. Appl. No. 17/949,081, mailed on Feb. 27, 2023, 19 pages.
Non-Final Office Action received for U.S. Appl. No. 14/846,511, mailed on Nov. 30, 2018, 22 pages.
Non-Final Office Action received for U.S. Appl. No. 14/815,879, mailed on Nov. 6, 2015, 35 pages.
Non-Final Office Action received for U.S. Appl. No. 14/815,898, mailed on Dec. 1, 2015, 22 pages.
Non-Final Office Action received for U.S. Appl. No. 14/815,907, mailed on Jan. 12, 2016, 22 pages.
Non-Final Office Action received for U.S. Appl. No. 14/815,909, mailed on Nov. 27, 2015, 12 pages.
Non-Final received for U.S. Appl. No. 17/078,896, mailed on Dec. 24, 2021, 17 pages.
Notice of Acceptance received for Australian Patent Application No. 2015298710, mailed on Oct. 8, 2019, 3 pages.
Notice of Acceptance received for Australian Patent Application No. 2016229847, mailed on Sep. 12, 2018, 3 pages.
Notice of Acceptance received for Australian Patent Application No. 2017277813, mailed on Jun. 16, 2020, 3 pages.
Notice of Acceptance received for Australian Patent Application No. 2018201089, mailed on May 28, 2021, 3 pages.
Notice of Acceptance received for Australian Patent Application No. 2018269512, mailed on Jan. 28, 2020, 3 pages.
Notice of Acceptance received for Australian Patent Application No. 2018279037, mailed on May 13, 2020, 3 pages.
Notice of Acceptance received for Australian Patent Application No. 2019208225, mailed on Jan. 21, 2021, 3 pages.
Notice of Acceptance received for Australian Patent Application No. 2019267413, mailed on Nov. 23, 2021, 3 pages.
Notice of Acceptance received for Australian Patent Application No. 2020202953, mailed on Oct. 1, 2021 , 3 pages.
Notice of Acceptance received for Australian Patent Application No. 2020204506, mailed on Apr. 8, 2021, 3 pages.
Notice of Acceptance received for Australian Patent Application No. 2020239670, mailed on Jul. 2, 2021, 3 pages.
Notice of Acceptance received for Australian Patent Application No. 2020239749, mailed on May 27, 2022, 3 pages.
Notice of Acceptance received for Australian Patent Application No. 2020239774, mailed on Jan. 5, 2022, 3 pages.
Notice of Acceptance received for Australian Patent Application No. 2020250323, mailed on Feb. 28, 2022, 3 pages.
Notice of Acceptance received for Australian Patent Application No. 2020269232, mailed on Dec. 16, 2021, 3 pages.

(56) References Cited

OTHER PUBLICATIONS

Notice of Acceptance received for Australian Patent Application No. 2020309093, mailed on Jul. 8, 2021, 3 pages.
Notice of Acceptance received for Australian Patent Application No. 2021202797, mailed on May 9, 2022, 3 pages.
Notice of Acceptance received for Australian Patent Application No. 2021202834, mailed on Jul. 15, 2021, 3 pages.
Notice of Acceptance received for Australian Patent Application No. 2021202836, mailed on Jun. 25, 2021, 3 pages.
Notice of Acceptance received for Australian Patent Application No. 2021203216, mailed on Jul. 26, 2022, 3 pages.
Notice of Acceptance received for Australian Patent Application No. 2021245228, mailed on Oct. 4, 2022, 3 pages.
Notice of Acceptance received for Australian Patent Application No. 2021250863, mailed on Jan. 13, 2023, 3 pages.
Notice of Acceptance received for Australian Patent Application No. 2021290334, mailed on Feb. 8, 2023, 3 pages.
Notice of Acceptance received for Australian Patent Application No. 2022200367, mailed on Mar. 23, 2023, 3 pages.
Notice of Acceptance received for Australian Patent Application No. 2022201419, mailed on May 31, 2023, 3 pages.
Notice of Acceptance received for Australian Patent Application No. 2022202292, mailed on Jul. 6, 2022, 3 pages.
Notice of Acceptance received for Australian Patent Application No. 2022202583, mailed on Aug. 7, 2023, 3 pages.
Notice of Acceptance received for Australian Patent Application No. 2022220279, mailed on Sep. 27, 2022, 3 pages.
Notice of Acceptance received for Australian Patent Application No. 2023200039, mailed on Aug. 31, 2023, 3 pages
Notice of Allowance received for Chinese Patent Application No. 201510479088.4, mailed on Jan. 21, 2021, 2 pages.
Notice of Allowance received for Chinese Patent Application No. 201510481525.6, mailed on May 27, 2019, 2 pages
Notice of Allowance received for Chinese Patent Application No. 201510483268.X, mailed on Nov. 6, 2019, 2 pages.
Notice of Allowance received for Chinese Patent Application No. 201510483305.7, mailed on Jan. 8, 2019, 3 pages.
Notice of Allowance received for Chinese Patent Application No, 201510484514.3, mailed on Jun. 6, 2019, 2 pages.
Notice of Allowance received for Chinese Patent Application No. 201520594249.X mailed on Jul. 12, 2016, 4 pages.
Notice of Allowance received for Chinese Patent Application No. 201680013193.1, mailed on May 7, 2021, 5 pages.
Notice of Allowance received for Chinese Patent Application No. 201680047983.1, mailed on Apr. 28, 2021, 3 pages.
Notice of Allowance received for Chinese Patent Application No. 201780033973.7, mailed on Jul. 7, 2021, 5 pages.
Notice of Allowance received for Chinese Patent Application No. 201810037665.8, mailed on Jul. 9, 2019, 4 pages.
Notice of Allowance received for Chinese Patent Application No. 201910906898.1, mailed on Oct. 28, 2021, 4 pages.
Notice of Allowance received for Chinese Patent Application No. 201910924197.0, mailed on Apr. 5, 2023, 3 pages.
Notice of Allowance received for Chinese Patent Application No. 202010174749.3, mailed on Oct. 28, 2021, 4 pages.
Notice of Allowance received for Chinese Patent Application No. 202011206499.3, mailed on Feb. 14, 2022, 6 pages.
Notice of Allowance received for Chinese Patent Application No. 202110194015.6, mailed on Mar. 9, 2022, 6 pages.
Notice of Allowance received for Chinese Patent Application No. 202110454541.1, mailed on May 31, 2022, 6 pages.
Notice of Allowance received for Chinese Patent Application No. 202111457936.3, mailed on Nov. 7, 2022, 4 pages.
Notice of Allowance received for Chinese Patent Application No. 202210023470.4, mailed on Mar. 22, 2023, 3 pages.
Notice of Allowance received for Danish Patent Application No. PA201570495, mailed on Feb. 22, 2017, 1 page.
Notice of Allowance received for Danish Patent Application No. PA201570496, mailed on Apr. 18, 2016, 2 pages.
Notice of Allowance received for Danish Patent Application No. PA202070623, mailed on Sep. 20, 2022, 2 pages.
Notice of Allowance received for Japanese Patent Application No. 2017-505450, mailed on Mar. 9, 2018, 10 pages.
Notice of Allowance received for Japanese Patent Application No. 2017-505842, mailed on Mar. 16, 2020, 4 pages.
Notice of Allowance received for Japanese Patent Application No. 2017-505847, mailed on May 20, 2019, 4 pages.
Notice of Allowance received for Japanese Patent Application No. 2017-545918, mailed on Jul. 22, 2019, 4 pages.
Notice of Allowance received for Japanese Patent Application No. 2018-074971 , mailed on Apr. 23, 2019, 4 pages.
Notice of Allowance received for Japanese Patent Application No. 2018-537840, mailed on Mar. 19, 2020, 4 pages.
Notice of Allowance received for Japanese Patent Application No. 2019-096219, mailed on Jun. 26, 2020, 4 pages.
Notice of Allowance received for Japanese Patent Application No. 2019-151358, mailed on Jan. 22, 2021, 4 pages.
Notice of Allowance received for Japanese Patent Application No. 2019-572834, mailed on Nov. 1, 2021, 5 pages.
Notice of Allowance received for Japanese Patent Application No. 2020-074878, mailed on May 28, 2021, 4 pages.
Notice of Allowance received for Japanese Patent Application No. 2020-124605, mailed on Dec. 5, 2022, 4 pages.
Notice of Allowance received for Japanese Patent Application No. 2020-159823, mailed on Jul. 24, 2023, 23 pages.
Notice of Allowance received for Japanese Patent Application No. 2020-159825, mailed on Mar. 25, 2022, 5 pages.
Notice of Allowance received for Japanese Patent Application No. 2020-551465, mailed on Jun. 28, 2021, 4 pages.
Notice of Allowance received for Japanese Patent Application No. 2020-562622, mailed on Aug. 26, 2022, 4 pages.
Notice of Allowance received for Japanese Patent Application No. 2021-023661, mailed on Apr. 10, 2023, 4 pages.
Notice of Allowance received for Japanese Patent Application No. 2021-105941, mailed on Jul. 4, 2022, 4 pages.
Notice of Allowance received for Japanese Patent Application No. 2021-122610, mailed on Aug. 5, 2022, 4 pages.
Notice of Allowance received for Japanese Patent Application No. 2021-565837, mailed on May 16, 2022, 4 pages.
Notice of Allowance received for Japanese Patent Application No. 2022-096730, mailed on Jun. 5, 2023, 4 pages.
Notice of Allowance received for Japanese Patent Application No. 2022-139320, mailed on Jan. 6, 2023, 4 pages.
Notice of Allowance received for Japanese Patent Application No. 2022-512865, mailed on Oct. 3, 2022, 4 pages.
Notice of Allowance received for Korean Patent Application No. 10-2017-7005939, mailed on Mar. 30, 2018, 5 pages.
Notice of Allowance received for Korean Patent Application No. 10-2018-7018904, mailed on Jun. 26, 2020, 4 pages.
Notice of Allowance received for Korean Patent Application No. 10-2018-7022101, mailed on Oct. 14, 2019, 4 pages.
Notice of Allowance received for Korean Patent Application No. 10-2019-7029673, mailed on Aug. 3, 2021 , 3 pages.
Notice of Allowance received for Korean Patent Application No. 10-2019-7033768, mailed on Jun. 3, 2020, 6 pages.
Notice of Allowance received for Korean Patent Application No. 10-2020-0123852, mailed on Mar. 9, 2023, 7 pages.
Notice of Allowance received for Korean Patent Application No. 10-2020-0123852, mailed on Nov. 28, 2022, 7 pages.
Notice of Allowance received for Korean Patent Application No. 10-2020-0123857, mailed on Feb. 21, 2023, 6 pages.
Notice of Allowance received for Korean Patent Application No. 10-2020-0123887, mailed on Nov. 28, 2022, 7 pages.
Notice of Allowance received for Korean Patent Application No. 10-2020-7001340, mailed on May 10, 2021, 5 pages.
Notice of Allowance received for Korean Patent Application No. 10-2020-7025711, mailed on Jan. 19, 2021, 6 pages.
Notice of Allowance received for Korean Patent Application No. 10-2020-7026036, mailed on Jul. 26, 2021, 4 pages.
Notice of Allowance received for Korean Patent Application No. 10-2020-7028759, mailed on Oct. 19, 2021 , 4 pages.

(56) References Cited

OTHER PUBLICATIONS

Notice of Allowance received for Korean Patent Application No. 10-2021-7002597, mailed on Feb. 25, 2021, 5 pages.
Notice of Allowance received for Korean Patent Application No. 10-2021-7011434, mailed on Jul. 29, 2021, 5 pages.
Notice of Allowance received for Korean Patent Application No. 10-2021-7013453, mailed on Aug. 11, 2021, 5 pages.
Notice of Allowance received for Korean Patent Application No. 10-2021-7013454, mailed on Aug. 12, 2021, 4 pages.
Notice of Allowance received for Korean Patent Application No. 10-2021-7025301, mailed on Mar. 16, 2022, 4 pages.
Notice of Allowance received for Korean Patent Application No. 10-2021-7034748, mailed on Jan. 27, 2022, 6 pages.
Notice of Allowance received for Korean Patent Application No. 10-2021-7035417, mailed on Jan. 3, 2022, 5 pages.
Notice of Allowance received for Korean Patent Application No. 10-2021-7036016, mailed on Sep. 28, 2022, 7 pages.
Notice of Allowance received for Korean Patent Application No. 10-2021-7036246, mailed on Mar. 2, 2022, 5 pages.
Notice of Allowance received for Korean Patent Application No. 10-2021-7036678, mailed on Mar. 7, 2022, 5 pages.
Notice of Allowance received for Korean Patent Application No. 10-2022-7001721, mailed on Feb. 28, 2022, 5 pages.
Notice of Allowance received for Korean Patent Application No. 10-2022-7007288, mailed on Mar. 17, 2022, 5 pages.
Notice of Allowance received for Korean Patent Application No. 10-2022-7014529, mailed on Dec. 13, 2022, 8 pages.
Notice of Allowance received for Korean Patent Application No. 10-2022-7019205, mailed on Jan. 5, 2023, 8 pages.
Notice of Allowance received for Korean Patent Application No. 10-2022-7019902, mailed on Oct. 28, 2022, 8 pages.
Notice of Allowance received for Korean Patent Application No. 10-2023-7003678, mailed on Jul. 21, 2023, 8 pages.
Notice of Allowance received for Taiwanese Patent Application No. 104124962, mailed on Jul. 27, 2017, 3 pages.
Notice of Allowance received for Taiwanese Patent Application No. 104124963, mailed on Sep. 28, 2017, 5 pages.
Notice of Allowance received for Taiwanese Patent Application No. 104124995, mailed on Jul. 27, 2017, 3 pages.
Notice of Allowance received for Taiwanese Patent Application No. 104124997, mailed on Jun. 16, 2017, 5 pages.
Notice of Allowance received for Taiwanese Patent Application No. 104124998, mailed on Mar. 31, 2017, 3 pages.
Notice of Allowance received for Taiwanese Patent Application No. 104134740, mailed on Dec. 8, 2016, 5 pages.
Notice of Allowance received for U.S. Appl. No. 14/815,879, mailed on Jun. 26, 2017, 8 pages.
Notice of Allowance received for U.S. Appl. No. 14/815,890, mailed on Feb. 12, 2021, 8 pages.
Notice of Allowance received for U.S. Appl. No. 14/815,898, mailed on Dec. 5, 2016, 3 pages.
Notice of Allowance received for U.S. Appl. No. 14/815,898, mailed on Oct. 24, 2016, 14 pages.
Notice of Allowance received for U.S. Appl. No. 14/815,907, mailed on Jul. 28, 2016, 9 pages.
Notice of Allowance received for U.S. Appl. No. 14/815,907, mailed on Nov. 30, 2016, 2 pages.
Notice of Allowance received for U.S. Appl. No. 14/815,909, mailed on Jun. 9, 2016, 3 pages.
Notice of Allowance received for U.S. Appl. No. 14/815,909, mailed on May 3, 2016, 12 pages.
Notice of Allowance received for U.S. Appl. No. 14/815,909, mailed on May 20, 2016, 2 pages.
Notice of Allowance received for U.S. Appl. No. 14/815,909, mailed on Sep. 6, 2016, 2 pages.
Notice of Allowance received for U.S. Appl. No. 14/821,667, mailed on Jun. 12, 2019, 9 pages.
Notice of Allowance received for U.S. Appl. No. 14/839,889, mailed on Oct. 30, 2017, 16 pages.
Notice of Allowance received for U.S. Appl. No. 15/183,663, mailed on Jan. 17, 2019, 6 pages.
Notice of Allowance received for U.S. Appl. No. 15/355,956, mailed on Nov. 22, 2019, 29 pages.
Notice of Allowance received for U.S. Appl. No. 15/554,204, mailed on Jul. 13, 2020, 10 pages.
Notice of Allowance received for U.S. Appl. No. 15/798,235, mailed on Apr. 1, 2020, 8 pages.
Notice of Allowance received for U.S. Appl. No. 15/798,235, mailed on Sep. 22, 2020, 8 pages.
Notice of Allowance received for U.S. Appl. No. 15/798,257, mailed on May 22, 2019, 14 pages.
Notice of Allowance received for U.S. Appl. No. 15/881,544, mailed on Jun. 26, 2019, 6 pages.
Notice of Allowance received for U.S. Appl. No. 15/881,544, mailed on Nov. 7, 2019, 5 pages.
Notice of Allowance received for U.S. Appl. No. 15/884,195, mailed on Nov. 17, 2021, 19 pages.
Notice of Allowance received for U.S. Appl. No. 15/981,817, mailed on May 28, 2020, 16 pages.
Notice of Allowance received for U.S. Appl. No. 16/401,934, mailed on Feb. 2, 2022, 8 pages.
Notice of Allowance received for U.S. Appl. No. 16/401,934, mailed on Nov. 1, 2021, 11 pages.
Notice of Allowance received for U.S. Appl. No. 16/418,786, mailed on Dec. 9, 2021, 9 pages.
Notice of Allowance received for U.S. Appl. No. 16/418,786, mailed on Jun. 14, 2022, 9 pages.
Notice of Allowance received for U.S. Appl. No. 16/418,786, mailed on Nov. 22, 2022, 6 pages.
Notice of Allowance received for U.S. Appl. No. 16/582,020, mailed on Jul. 27, 2021, 29 pages.
Notice of Allowance received for U.S. Appl. No. 16/584,281, mailed on Nov. 18, 2020, 8 pages.
Notice of Allowance received for U.S. Appl. No. 16/584,281, mailed on Sep. 29, 2020, 5 pages.
Notice of Allowance received for U.S. Appl. No. 16/584,445, mailed on Apr. 17, 2020, 9 pages.
Notice of Allowance received for U.S. Appl. No. 16/584,445, mailed on Jul. 23, 2020, 8 pages.
Notice of Allowance received for U.S. Appl. No. 16/584,445, mailed on Jun. 24, 2020, 5 pages.
Notice of Allowance received for U.S. Appl. No. 16/584,445, mailed on May 29, 2020, 5 pages.
Notice of Allowance received for U.S. Appl. No. 16/584,445, mailed on Oct. 21 , 2020, 6 pages.
Notice of Allowance received for U.S. Appl. No. 16/585,366, mailed on Jan. 2, 2020, 6 pages.
Notice of Allowance received for U.S. Appl. No. 16/585,399, mailed on Jul. 21, 2020, 9 pages.
Notice of Allowance received for U.S. Appl. No. 16/585,714, mailed on Jan. 8, 2021, 8 pages.
Notice of Allowance received for U.S. Appl. No. 16/585,714, mailed on Jan. 27, 2021, 2 pages.
Notice of Allowance received for U.S. Appl. No. 16/585,714, mailed on Sep. 25, 2020, 15 pages.
Notice of Allowance received for U.S. Appl. No. 16/585,721, mailed on Oct. 30, 2020, 9 pages.
Notice of Allowance received for U.S. Appl. No. 16/585,721, mailed on Sep. 30, 2020, 15 pages.
Notice of Allowance received for U.S. Appl. No. 16/659,507, mailed on Feb. 24, 2021, 7 pages.
Notice of Allowance received for U.S. Appl. No. 16/736,704, mailed on Feb. 23, 2021, 11 pages.
Notice of Allowance received for U.S. Appl. No. 16/867,002, mailed on Aug. 20, 2021, 12 pages.
Notice of Allowance received for U.S. Appl. No. 16/867,002, mailed on Mar. 1, 2022, 7 pages.
Notice of Allowance received for U.S. Appl. No. 16/935,002, mailed on Feb. 15, 2023, 15 pages.
Notice of Allowance received for U.S. Appl. No. 16/935,002, mailed on Jun. 28, 2023, 8 pages.

(56) References Cited

OTHER PUBLICATIONS

Notice of Allowance received for U.S. Appl. No. 16/997,588, mailed on Mar. 18, 2022, 9 pages.
Notice of Allowance received for U.S. Appl. No. 16/997,588, mailed on Sep. 30, 2021, 12 pages.
Notice of Allowance received for U.S. Appl. No. 17/031,654, mailed on Feb. 10, 2021, 9 pages.
Notice of Allowance received for U.S. Appl. No. 17/031,654, mailed on May 27, 2021, 8 pages.
Notice of Allowance received for U.S. Appl. No. 17/037,085, mailed on Nov. 10, 2021, 10 pages.
Notice of Allowance received for U.S. Appl. No. 17/041,350, mailed on Feb. 24, 2022, 6 pages.
Notice of Allowance received for U.S. Appl. No. 17/078,896, mailed on May 13, 2022, 8 pages.
Notice of Allowance received for U.S. Appl. No. 17/087,845, mailed on Mar. 3, 2022, 9 pages.
Notice of Allowance received for U.S. Appl. No. 17/087,845, mailed on Oct. 28, 2021, 9 pages.
Notice of Allowance received for U.S. Appl. No. 17/317,042, mailed on Jul. 26, 2022, 12 pages.
Notice of Allowance received for U.S. Appl. No. 17/317,042, mailed on Nov. 9, 2022, 10 pages.
Notice of Allowance received for U.S. Appl. No. 17/321,006, mailed on Aug. 16, 2023, 9 pages.
Notice of Allowance received for U.S. Appl. No. 17/321,006, mailed on Mar. 9, 2023, 8 pages.
Notice of Allowance received for U.S. Appl. No. 17/341,839, mailed on Dec. 2, 2022, 6 pages.
Notice of Allowance received for U.S. Appl. No. 17/341,839, mailed on Oct. 5, 2022, 5 pages.
Notice of Allowance received for U.S. Appl. No. 17/373,163, mailed on Jul. 27, 2022, 8 pages.
Notice of Allowance received for U.S. Appl. No. 17/373,163, mailed on May 11, 2022, 8 pages.
Notice of Allowance received for U.S. Appl. No. 17/515,143, mailed on Dec. 16, 2022, 11 pages.
Notice of Allowance received for U.S. Appl. No. 17/515,143, mailed on Mar. 13, 2023, 10 pages.
Notice of Allowance received for U.S. Appl. No. 17/556,165, mailed on Feb. 21, 2023, 12 pages.
Notice of Allowance received for U.S. Appl. No. 17/591,184, mailed on Feb. 22, 2023, 5 pages.
Notice of Allowance received for U.S. Appl. No. 17/713,016, mailed on Apr. 18, 2023, 10 pages.
Notice of Allowance received for U.S. Appl. No. 17/713,016, mailed on Aug. 4, 2023, 7 pages.
Notice of Allowance received for U.S. Appl. No. 17/738,940, mailed on Jun. 22, 2023, 9 pages.
Notice of Allowance received for U.S. Appl. No. 17/738,940, mailed on Oct. 2, 2023, 9 pages.
Notice of Allowance received for U.S. Appl. No. 17/941,962, mailed on Jul. 3, 2023, 9 pages.
Notice of Allowance received for U.S. Appl. No. 17/941,962, mailed on Mar. 10, 2023, 11 pages.
Notice of Allowance received for U.S. Appl. No. 17/941,962, mailed on May 3, 2023, 10 pages.
Nova Launcher—Lock Screen Edit, Online Available at: https://forums.androidcentral.com/ask-question/835057-nova-launcher-lock-screen-edit.html, Sep. 2017, 2 pages.
Nova, "Tour of the Solar System", Retrieved fro <http://www.pbs.org/wgbh/nova/space/tour-solar-system.html>, May 24, 2013, 14 pages.
Obara Yuuta, "iPhone Application Selection for Univesity Students", Shuwa System Co., Saito Kazukuni, vol. 1, May 16, 2013, 4 pages.
Octoba, "Just Install It—Utilizing Method for Android Application Business", ASCII Media Works Co. Takano Kiyoshi, vol. 1, Apr. 25, 2013, 6 pages.
Office Action and Search Report received for Danish Patent Application No. PA201970598, mailed on Jan. 28, 2020, 6 pages.
Office Action received for Australian Patent Application No. 2015101020, mailed on Oct. 26, 2015, 8 pages.
Office Action received for Danish Patent Application No. PA201570499, mailed on Nov. 1, 2017, 6 pages.
Office Action received for European Patent Application No. 15730924.6, mailed on Dec. 12, 2017, 8 pages.
Office Action received for Australian Patent Application No. 2015101019, issued on Oct. 14, 2015, 3 pages.
Office Action received for Australian Patent Application No. 2015101019, issued on Apr. 7, 2016, 4 pages.
Office Action received for Australian Patent Application No. 2015101021, issued on Apr. 26, 2016, 4 pages.
Office Action received for Australian Patent Application No. 2015101021, issued on Oct. 28, 2015, 10 pages.
Office Action received for Australian Patent Application No. 2015298710, mailed on Apr. 13, 2017, 3 pages.
Office Action received for Australian Patent Application No. 2015298710, mailed on Feb. 15, 2017, 2 pages.
Office Action received for Australian Patent Application No. 2015298710, mailed on Nov. 6, 2018, 4 pages.
Office Action received for Australian Patent Application No. 2015298710, mailed on Sep. 24, 2018, 4 pages.
Office Action received for Australian Patent Application No. 2016100411, mailed on Jun. 10, 2016, 3 pages.
Office Action received for Australian Patent Application No. 2016100476, mailed on Jun. 9, 2016, 4 pages.
Office Action received for Australian Patent Application No. 2016100765, issued on Aug. 5, 2016, 2 pages.
Office Action received for Australian Patent Application No. 2016100765, mailed on Dec. 16, 2016, 3 pages.
Office Action received for Australian Patent Application No. 2016229847, mailed on Jul. 3, 2018, 4 pages.
Office Action received for Australian Patent Application No. 2017277813, mailed on Jun. 11, 2019, 3 pages.
Office Action received for Australian Patent Application No. 2017277813, mailed on Mar. 20, 2020, 4 pages.
Office Action received for Australian Patent Application No. 2018201089, mailed on Jul. 23, 2020, 4 pages.
Office Action received for Australian Patent Application No. 2018201089, mailed on Oct. 11, 2019, 4 pages.
Office Action received for Australian Patent Application No. 2018206770, mailed on Apr. 30, 2019, 4 pages.
Office Action received for Australian Patent Application No. 2018206770, mailed on Jul. 16, 2019, 5 pages.
Office Action received for Australian Patent Application No. 2018206770, mailed on Jul. 25, 2018, 5 pages.
Office Action received for Australian Patent Application No. 2018206770, mailed on Mar. 5, 2019, 3 pages.
Office Action received for Australian Patent Application No. 2018279037, mailed on Jan. 17, 2020, 4 pages.
Office Action received for Australian Patent Application No. 2018279037, mailed on Jun. 18, 2019, 5 pages.
Office Action received for Australian Patent Application No. 2019208225, mailed on Dec. 21, 2020, 3 pages.
Office Action received for Australian Patent Application No. 2019208225, mailed on Mar. 20, 2020, 3 pages.
Office Action received for Australian Patent Application No. 2019267413, mailed on Jun. 29, 2021, 3 pages.
Office Action received for Australian Patent Application No. 2020102158, mailed on Apr. 27, 2021, 5 pages.
Office Action received for Australian Patent Application No. 2020102158, mailed on Dec. 8, 2020, 9 pages.
Office Action received for Australian Patent Application No. 2020202953, mailed on Mar. 29, 2021, 4 pages.
Office Action received for Australian Patent Application No. 2020204506, mailed on Dec. 7, 2020, 6 pages.
Office Action received for Australian Patent Application No. 2020239670, mailed on Mar. 3, 2021, 4 pages.
Office Action received for Australian Patent Application No. 2020239749, mailed on Jan. 21, 2022, 4 pages.

(56) References Cited

OTHER PUBLICATIONS

Office Action received for Australian Patent Application No. 2020239749, mailed on Jul. 16, 2021, 5 pages.
Office Action received for Australian Patent Application No. 2020239774, mailed on Jun. 28, 2021, 8 pages.
Office Action received for Australian Patent Application No. 2020239774, mailed on Oct. 5, 2021, 3 pages.
Office Action received for Australian Patent Application No. 2020250323, mailed on Dec. 14, 2021, 2 pages.
Office Action received for Australian Patent Application No. 2020309093, mailed on Jan. 21, 2021, 3 pages.
Office Action received for Australian Patent Application No. 2021202797, mailed on Feb. 4, 2022, 5 pages.
Office Action received for Australian Patent Application No. 2021202834, mailed on May 28, 2021, 2 pages.
Office Action received for Australian Patent Application No. 2021203216, mailed on Mar. 7, 2022, 8 pages.
Office Action received for Australian Patent Application No. 2021245228, mailed on Aug. 31, 2022, 2 pages.
Office Action received for Australian Patent Application No. 2021250863, mailed on Oct. 6, 2022, 6 pages.
Office Action received for Australian Patent Application No. 2021290334, mailed on Oct. 26, 2022, 3 pages.
Office Action received for Australian Patent Application No. 2022200367, mailed on Jan. 17, 2023, 4 pages.
Office Action received for Australian Patent Application No. 2022201419, mailed on Mar. 20, 2023, 3 pages.
Office Action received for Australian Patent Application No. 2022202292, mailed on May 10, 2022, 2 pages.
Office Action received for Australian Patent Application No. 2022202583, mailed on Mar. 24, 2023, 4 pages.
Office Action received for Australian Patent Application No. 2022203957, mailed on May 12, 2023, 5 pages.
Office Action received for Australian Patent Application No. 2022218607, mailed on Apr. 14, 2023, 3 pages.
Office Action received for Australian Patent Application No. 2022218607, mailed on Jun. 30, 2023, 4 pages.
Office Action received for Australian Patent Application No. 2022235622, mailed on Jun. 27, 2023, 3 pages.
Office Action received for Australian Patent Application No. 2022235622, mailed on May 22, 2023, 2 pages.
Office Action received for Australian Patent Application No. 2022235634, mailed on May 25, 2023, 4 pages.
Office Action received for Australian Patent Application No. 2022287595, mailed on Jul. 20, 2023, 3 pages.
Office Action received for Australian Patent Application No. 2023200039, mailed on Jul. 4, 2023, 2 pages.
Office Action received for Australian Patent Application No. 2015101019, mailed on Feb. 12, 2016, 4 pages.
Office Action received for Chinese Patent Application No. 201520595384.6, mailed on Mar. 25, 2016, 3 pages.
Office Action received for Chinese Patent Application No. 201510479088.4, mailed on Apr. 22, 2020, 7 pages.
Office Action received for Chinese Patent Application No. 201510479088.4, mailed on Mar. 12, 2018, 20 pages.
Office Action received for Chinese Patent Application No. 201510479088.4, mailed on May 7, 2019, 6 pages.
Office Action received for Chinese Patent Application No. 201510481525.6, mailed on Aug. 29, 2018, 10 pages.
Office Action received for Chinese Patent Application No. 201510481525.6, mailed on Nov. 29, 2017, 9 pages.
Office Action received for Chinese Patent Application No. 201510483268.X, mailed on Apr. 16, 2019, 6 pages.
Office Action received for Chinese Patent Application No. 201510483268.X, mailed on Dec. 1, 2017, 11 pages.
Office Action received for Chinese Patent Application No. 201510483268.X, mailed on Oct. 19, 2018, 10 pages.
Office action received for Chinese Patent Application No. 201510483305.7, mailed on Aug. 31, 2018, 10 pages.
Office action received for Chinese Patent Application No. 201510483305.7, mailed on Dec. 1, 2017, 13 pages.
Office Action received for Chinese Patent Application No. 201510484514.3, mailed on Apr. 4, 2018, 12 pages.
Office Action received for Chinese Patent Application No. 201510484514.3, mailed on Dec. 24, 2018, 13 pages.
Office Action received for Chinese Patent Application No. 201520594249.X, mailed on Mar. 25, 2016, 3 pages.
Office Action received for Chinese Patent Application No. 201520595384.6, mailed on Dec. 30, 2016, 2 pages.
Office Action received for Chinese Patent Application No. 201520595384.6, mailed on Jul. 22, 2016, 3 pages.
Office Action received for Chinese Patent Application No. 201520595385.0, mailed on Dec. 30, 2016, 2 pages.
Office Action received for Chinese Patent Application No. 201520595385.0, mailed on Jul. 22, 2016, 3 pages.
Office Action received for Chinese Patent Application No. 201520595385.0, mailed on Mar. 25, 2016, 3 pages.
Office Action Received for Chinese Patent Application No. 201520595408.8, mailed on Dec. 9, 2015, 4 pages.
Office Action Received for Chinese Patent Application No. 201520595408.8, mailed on Dec. 30, 2016, 2 pages.
Office Action received for Chinese Patent Application No. 201520595408.8, mailed on Jul. 25, 2016, 3 pages.
Office Action received for Chinese Patent Application No. 201520595408.8, mailed on Mar. 25, 2016, 3 pages.
Office Action received for Chinese Patent Application No. 201520595538.1, mailed on Dec. 30, 2016, 2 pages.
Office Action received for Chinese Patent Application No. 201520595538.1, mailed on Jul. 22, 2016, 3 pages.
Office Action received for Chinese Patent Application No. 201520595538.1, mailed on Mar. 25, 2016, 3 pages.
Office Action received for Chinese Patent Application No. 201680013193.1, mailed on Feb. 1, 2021, 8 pages.
Office Action received for Chinese Patent Application No. 201680013193.1, mailed on Mar. 25, 2020, 21 pages.
Office Action received for Chinese Patent Application No. 201680013193.1, mailed on Sep. 7, 2020, 6 pages.
Office Action received for Chinese Patent Application No. 201680047983.1, mailed on Feb. 1, 2021, 6 pages.
Office Action received for Chinese Patent Application No. 201680047983.1, mailed on Jul. 1, 2020, 6 pages.
Office Action received for Chinese Patent Application No. 201680047983.1, mailed on Mar. 18, 2019, 18 pages.
Office Action received for Chinese Patent Application No. 201680047983.1, mailed on Nov. 28, 2019, 9 pages.
Office Action received for Chinese Patent Application No. 201780033973.7, mailed on Jan. 22, 2021, 27 pages.
Office Action received for Chinese Patent Application No. 201810037665.8, mailed on Dec. 7, 2018, 10 pages.
Office Action received for Chinese Patent Application No. 201910906898.1, mailed on Jun. 23, 2021, 6 pages.
Office Action received for Chinese Patent Application No. 201910906898.1, mailed on Sep. 9, 2020, 8 pages.
Office Action received for Chinese Patent Application No. 201910924197.0, mailed on Nov. 30, 2022, 13 pages.
Office Action received for Chinese Patent Application No. 202010174749.3, mailed on Jun. 2, 2021, 19 pages.
Office Action received for Chinese Patent Application No. 202010174749.3, mailed on Nov. 6, 2020, 9 pages.
Office Action received for Chinese Patent Application No. 202011206499.3, mailed on May 21, 2021, 20 pages.
Office Action received for Chinese Patent Application No. 202011206499.3, mailed on Sep. 28, 2021, 7 pages.
Office Action received for Chinese Patent Application No. 202110194015.6, mailed on Sep. 28, 2021, 13 pages.
Office Action received for Chinese Patent Application No. 202110453180.9, mailed on Dec. 26, 2022, 13 pages.
Office Action received for Chinese Patent Application No. 202110453180.9, mailed on Jun. 16, 2022, 14 pages.
Office Action received for Chinese Patent Application No. 202110453180.9, mailed on Nov. 8, 2021, 21 pages.

(56) References Cited

OTHER PUBLICATIONS

Office Action received for Chinese Patent Application No. 202110454541.1, mailed on Oct. 20, 2021, 19 pages.
Office Action received for Chinese Patent Application No. 202110783860.7, mailed on Mar. 10, 2022, 15 pages.
Office Action received for Chinese Patent Application No. 202110783860.7, mailed on Nov. 15, 2022, 8 pages.
Office Action received for Chinese Patent Application No. 202111457936.3, mailed on Jul. 5, 2022, 18 pages.
Office Action received for Chinese Patent Application No. 202210023470.4, mailed on Sep. 5, 2022, 12 pages.
Office Action Received for Chinese Patent Application No. 201520594249.X, mailed on Dec. 9, 2015, 4 pages.
Office Action Received for Chinese Patent Application No. 201520595384.6, mailed on Dec. 9, 2015, 4 pages ..
Office Action Received for Chinese Patent Application No. 201520595385.0, mailed on Dec. 9, 2015, 4 pages.
Office Action Received for Chinese Patent Application No. 201520595538.1, mailed on Dec. 9, 2015, 4 pages.
Office Action received for Danish Patent Application No. PA201570495, mailed on Dec. 9, 2016, 2 pages.
Office action received for Danish Patent Application No. PA201570495, mailed on May 4, 2016, 8 pages.
Office Action received for Danish Patent Application No. PA201570495, mailed on Oct. 29, 2015, 7 pages.
Office Action received for Danish Patent Application No. PA201570497, mailed on Feb. 21, 2017, 3 pages.
Office Action received for Danish Patent Application No. PA201570497, mailed on May 17, 2016, 6 pages.
Office Action received for Danish Patent Application No. PA201570497, mailed on Nov. 15, 2016, 2 pages.
Office Action received for Danish Patent Application No. PA201570497, mailed on Oct. 24, 2017, 2 pages.
Office Action received for Danish Patent Application No. PA201570498, mailed on Feb. 6, 2017, 2 pages.
Office Action received for Danish Patent Application No. PA201570498, mailed on Jun. 2, 2016, 8 pages.
Office Action received for Danish Patent Application No. PA201570498, mailed on Oct. 26, 2017, 5 pages.
Office Action received for Danish Patent Application No. PA201570498, mailed on Oct. 30, 2015, 7 pages.
Office Action received for Danish Patent Application No. PA201570499, mailed on Feb. 14, 2017, 2 pages.
Office Action received for Danish Patent Application No. PA201570499, mailed on Jun. 16, 2016., 8 pages.
Office Action received for Danish Patent Application No. PA201570499, mailed on Jun. 19, 2018, 4 pages.
Office Action received for Danish Patent Application No. PA201570499, mailed on Nov. 3, 2015, 7 pages.
Office Action Received for Danish Patent Application No. PA201570768, mailed on Sep. 13, 2016, 8 pages.
Office Action received for Danish Patent Application No. PA201570770, mailed on Apr. 7, 2017., 7 pages.
Office Action received for Danish Patent Application No. PA201570770, mailed on Mar. 17, 2016, 9 pages.
Office Action received for Danish Patent Application No. PA201570770, mailed on Sep. 12, 2016, 6 pages.
Office Action received for Danish Patent Application No. PA201770502, mailed on Dec. 14, 2018, 7 pages.
Office Action received for Danish Patent Application No. PA201770502, mailed on Jan. 20, 2020, 2 pages.
Office Action received for Danish Patent Application No. PA201770502, mailed on May 7, 2020, 5 pages.
Office Action received for Danish Patent Application No. PA201770502, mailed on Sep. 9, 2019, 2 pages.
Office Action received for Danish Patent Application No. PA201770503, mailed on Dec. 19, 2018, 6 pages.
Office Action received for Danish Patent Application No. PA201770503, mailed on Nov. 24, 2017, 10 pages.
Office Action received for Danish Patent Application No. PA201770503, mailed on Sep. 20, 2019, 5 pages.
Office Action received for Danish Patent Application No. PA201770505, mailed on Aug. 18, 2021, 2 pages.
Office Action received for Danish Patent Application No. PA201770505, mailed on Jan. 17, 2020, 7 pages.
Office Action received for Danish Patent Application No. PA201770505, mailed on Jul. 27, 2018, 4 pages.
Office Action received for Danish Patent Application No. PA201770505, mailed on May 20, 2019, 7 pages.
Office Action received for Danish Patent Application No. PA201770505, mailed on Sep. 19, 2017, 10 pages.
Office Action received for Danish Patent Application No. PA201770791, mailed on Jan. 31, 2018, 8 pages.
Office Action received for Danish Patent Application No. PA201770791, mailed on Jul. 13, 2018, 2 pages.
Office Action received for Danish Patent Application No. PA201770791, mailed on Jun. 11, 2019, 3 pages.
Office Action received for Danish Patent Application No. PA201970596, mailed on May 6, 2020, 4 pages.
Office Action received for Danish Patent Application No. PA201970597, mailed on Oct. 29, 2020, 4 pages.
Office Action received for Danish Patent Application No. PA201970598, mailed on Apr. 15, 2021, 6 pages.
Office Action received for Danish Patent Application No. PA201970598, mailed on Oct. 9, 2020, 4 pages.
Office Action received for Danish Patent Application No. PA201970599, mailed on Jan. 23, 2020, 6 pages.
Office Action received for Danish Patent Application No. PA201970599, mailed on Mar. 1, 2021, 4 pages.
Office Action received for Danish Patent Application No. PA201970599, mailed on May 27, 2020, 4 pages.
Office Action received for Danish Patent Application No. PA202070609, mailed on Dec. 10, 2020, 8 pages.
Office Action received for Danish Patent Application No. PA202070610, mailed on Jun. 18, 2021, 8 pages.
Office Action received for Danish Patent Application No. PA202070610, mailed on Mar. 14, 2022, 7 pages.
Office Action received for Danish Patent Application No. PA202070623, mailed on Aug. 24, 2021, 3 pages.
Office Action received for Danish Patent Application No. PA202070623, mailed on May 23, 2022, 3 pages.
Office Action received for Danish Patent Application No. PA202070624, mailed on Feb. 4, 2022, 4 pages.
Office Action received for Danish Patent Application No. PA202070624, mailed on Jun. 16, 2021, 5 pages.
Office Action received for Danish Patent Application No. PA202070625, mailed on Feb. 8, 2022, 2 pages.
Office Action received for Danish Patent Application No. PA202070625, mailed on Jun. 16, 2021, 3 pages.
Office Action received for Danish Patent Application No. PA202070625, mailed on Sep. 23, 2022, 4 pages.
Office Action received for Danish Patent Application No. PA201570496, mailed on Oct. 29, 2015, 6 pages.
Office Action received for Danish Patent Application No. PA201570497, mailed on Oct. 30, 2015, 6 pages.
Office Action received for European Patent Application No. 15730925.3, mailed on Apr. 12, 2018, 8 pages.
Office Action received for European Patent Application No. 15747595.5, mailed on Apr. 15, 2019, 4 pages.
Office Action received for European Patent Application No. 15747595.5, mailed on Jun. 27, 2018, 8 pages.
Office Action received for European Patent Application No. 16762356.0, mailed on Dec. 11, 2020, 7 pages.
Office Action received for European Patent Application No. 16837432.0, mailed on Jan. 10, 2020, 7 pages.
Office Action received for European Patent Application No. 16837432.0, mailed on Jan. 27, 2021, 7 pages.
Office Action received for European Patent Application No. 17206177.2, mailed on May 15, 2018, 6 pages.
Office Action received for European Patent Application No. 17810723.1, mailed on Jul. 9, 2021, 8 pages.

(56) References Cited

OTHER PUBLICATIONS

Office Action received for European Patent Application No. 18730556.0, mailed on Dec. 16, 2020, 7 pages.
Office Action received for European Patent Application No. 18730556.0, mailed on Jun. 23, 2020, 11 pages.
Office Action received for European Patent Application No. 19724997.2, mailed on Oct. 27, 2022, 5 pages.
Office Action received for European Patent Application No. 20172197.4, mailed on Aug. 5, 2020, 6 pages.
Office Action received for European Patent Application No. 20172197.4, mailed on Jul. 8, 2021, 5 pages.
Office Action received for European Patent Application No. 20204436.8, mailed on Mar. 22, 2021, 10 pages.
Office Action received for European Patent Application No. 20204436.8, mailed on Sep. 21, 2022, 4 pages.
Office Action received for European Patent Application No. 20729346.5, mailed on Jan. 17, 2022, 8 pages.
Office Action received for European Patent Application No. 20729346.5, mailed on Jul. 28, 2022, 9 pages.
Office Action received for European Patent Application No. 20730136.7, mailed on Jan. 19, 2023, 4 pages.
Office Action received for European Patent Application No. 20730136.7, mailed on Jun. 27, 2023, 5 pages.
Office Action received for European Patent Application No. 20730136.7, mailed on Oct. 6, 2022, 11 pages.
Office Action received for European Patent Application No. 20761084.1, mailed on Dec. 14, 2022, 5 pages.
Office Action received for European Patent Application No. 20761084.1, mailed on May 9, 2022, 9 pages.
Office Action received for European Patent Application No. 21169911.1, mailed on Dec. 1, 2022, 4 pages.
Office Action received for European Patent Application No. 21169911.1, mailed on Jun. 3, 2022, 5 pages.
Office Action received for European Patent Application No. 21177569.7, mailed on Jun. 9, 2022, 5 pages.
Office Action received for European Patent Application No. 21728746.5, mailed on Aug. 21, 2023, 4 pages.
Office Action received for European Patent Application No. 15730925.3, mailed on Feb. 27, 2019, 5 pages.
Office Action received for German Patent Application No. 112015003083.2, mailed on Mar. 9, 2018, 12 pages.
Office Action received for Indian Patent Application No. 202017041557, mailed on Dec. 8, 2021, 8 pages.
Office Action received for Indian Patent Application No. 202017048447, mailed on Sep. 5, 2022, 6 pages.
Office Action received for Indian Patent Application No. 202118025047, mailed on Apr. 26, 2022, 6 pages.
Office Action received for Japanese Patent Application No. 2017-505450, mailed on Jun. 20, 2017, 8 pages.
Office Action received for Japanese Patent Application No. 2017-505842, mailed on Feb. 22, 2019, 11 pages.
Office Action received for Japanese Patent Application No. 2017-505842, mailed on Sep. 9, 2019, 7 pages.
Office Action received for Japanese Patent Application No. 2017-505847, mailed on Feb. 12, 2019, 13 pages.
Office Action received for Japanese Patent Application No. 2017-545918, mailed on Sep. 14, 2018, 12 pages.
Office Action received for Japanese Patent Application No. 2018-074971, mailed on Jan. 28, 2019, 6 pages.
Office Action received for Japanese Patent Application No. 2018-537840, mailed on Jul. 8, 2019, 15 pages.
Office Action received for Japanese Patent Application No. 2019-151358, mailed on Oct. 2, 2020, 5 pages.
Office Action received for Japanese Patent Application No. 2019-572834, mailed on Dec. 4, 2020, 7 pages.
Office Action received for Japanese Patent Application No. 2019-572834, mailed on Jul. 17, 2020, 13 pages.
Office Action received for Japanese Patent Application No. 2019-572834, mailed on Jun. 7, 2021, 5 pages.
Office Action received for Japanese Patent Application No. 2020-074878, mailed on Sep. 7, 2020, 13 pages.
Office Action received for Japanese Patent Application No. 2020-124605, mailed on Dec. 17, 2021, 2 pages.
Office Action received for Japanese Patent Application No. 2020-124605, mailed on May 13, 2022, 6 pages.
Office Action received for Japanese Patent Application No. 2020-124605, mailed on Sep. 3, 2021, 5 pages.
Office Action received for Japanese Patent Application No. 2020-159823, mailed on Aug. 15, 2022, 6 pages.
Office Action received for Japanese Patent Application No. 2020-159823, mailed on Dec. 23, 2021, 8 pages.
Office Action received for Japanese Patent Application No. 2020-159824, mailed on Dec. 17, 2021, 13 pages.
Office Action received for Japanese Patent Application No. 2020-159825, mailed on Dec. 10, 2021, 4 pages.
Office Action received for Japanese Patent Application No. 2020-562622, mailed on Jan. 7, 2022, 13 pages.
Office Action received for Japanese Patent Application No. 2021-023661, mailed on Feb. 25, 2022, 6 pages.
Office Action received for Japanese Patent Application No. 2021-023661, mailed on Oct. 3, 2022, 8 pages.
Office Action received for Japanese Patent Application No. 2021-157213, mailed on Oct. 28, 2022, 10 pages.
Office Action received for Japanese Patent Application No. 2022-013919, mailed on Jan. 30, 2023, 7 pages.
Office Action received for Japanese Patent Application No. 2022-013919, mailed on Jul. 3, 2023, 6 pages.
Office Action received for Korean Patent Application No. 10-2017-7005939, mailed on Jun. 30, 2017, 6 pages.
Office Action received for Korean Patent Application No. 10-2017-7024570, mailed on Jul. 10, 2019, 6 pages.
Office Action received for Korean Patent Application No. 10-2017-7024570, mailed on Sep. 28, 2018, 14 pages.
Office Action received for Korean Patent Application No. 10-2018-7018904, mailed on Aug. 20, 2019, 8 pages.
Office Action received for Korean Patent Application No. 10-2018-7022101, mailed on Feb. 14, 2019, 15 pages.
Office Action received for Korean Patent Application No. 10-2018-7022101, mailed on Jul. 9, 2019, 10 pages.
Office Action received for Korean Patent Application No. 10-2019-7029673, mailed on Apr. 8, 2021, 7 pages.
Office Action received for Korean Patent Application No. 10-2019-7029673, mailed on Nov. 5, 2019, 10 pages.
Office Action received for Korean Patent Application No. 10-2019-7029673, mailed on Sep. 3, 2020, 9 pages.
Office Action received for Korean Patent Application No. 10-2019-7033768, mailed on Mar. 13, 2020, 6 pages.
Office Action received for Korean Patent Application No. 10-2020-0123852, mailed on Jun. 9, 2022, 10 pages.
Office Action received for Korean Patent Application No. 10-2020-0123857, mailed on Dec. 16, 2022, 8 pages.
Office Action received for Korean Patent Application No. 10-2020-0123857, mailed on Jun. 9, 2022, 12 pages.
Office Action received for Korean Patent Application No. 10-2020-0123887, mailed on Jun. 9, 2022, 5 pages.
Office Action received for Korean Patent Application No. 10-2020-7001340, mailed on Mar. 26, 2021, 13 pages.
Office Action received for Korean Patent Application No. 10-2020-7001340, mailed on Sep. 24, 2020, 19 pages.
Office Action received for Korean Patent Application No. 10-2020-7025711, mailed on Sep. 11, 2020, 12 pages.
Office Action received for Korean Patent Application No. 10-2020-7026036, mailed on Dec. 7, 2020, 8 pages.
Office Action received for Korean Patent Application No. 10-2020-7028759, mailed on Jun. 29, 2021, 12 pages.
Office Action received for Korean Patent Application No. 10-2020-7032187, mailed on Jun. 10, 2022, 16 pages.
Office Action received for Korean Patent Application No. 10-2021-7011434, mailed on Apr. 28, 2021, 6 pages.
Office Action received for Korean Patent Application No. 10-2021-7013453, mailed on Jun. 5, 2021, 6 pages.

(56) References Cited

OTHER PUBLICATIONS

Office Action received for Korean Patent Application No. 10-2021-7013454, mailed on Jun. 5, 2021, 6 pages.
Office Action received for Korean Patent Application No. 10-2021-7025301, mailed on Oct. 15, 2021, 5 pages.
Office Action received for Korean Patent Application No. 10-2021-7036016, mailed on Nov. 10, 2021, 13 pages.
Office Action received for Korean Patent Application No. 10-2021-7036246, mailed on Nov. 26, 2021, 5 pages.
Office Action received for Korean Patent Application No. 10-2021-7036678, mailed on Dec. 22, 2021, 6 pages.
Office Action received for Korean Patent Application No. 10-2022-7019205, mailed on Sep. 21, 2022, 6 pages.
Office Action received for Korean Patent Application No. 10-2022-7019902, mailed on Jul. 1, 2022, 10 pages.
Office Action received for Korean Patent Application No. 10-2023-0064928, mailed on Jun. 9, 2023, 6 pages.
Office Action received for Korean Patent Application No. 10-2023-7003678, mailed on Feb. 15, 2023, 6 pages.
Office Action received for Korean Patent Application No. 10-2023-7011744, mailed on May 15, 2023, 11 pages.
Office Action received for Netherland Patent Application No. 2015245, mailed on Jan. 24, 2017, 11 pages.
Office Action received for Netherlands Patent Application No. 2015239, mailed on Oct. 28, 2016, 13 pages.
Office Action Received for Taiwanese Patent Application No. 104124962, issued on Nov. 29, 2016, 6 pages.
Office Action received for Taiwanese Patent Application No. 104124998, mailed on Nov. 29, 2016, 6 pages.
Office Action received for Taiwanese Patent Application No. 104124963, mailed on Jan. 5, 2017, 11 pages.
Office Action received for Taiwanese Patent Application No. 104124995, issued on Dec. 1, 2016, 6 pages.
Office Action received for Taiwanese Patent Application No. 104124997, issued on Dec. 8, 2016, 12 pages.
Office Action received for Taiwanese Patent Application No. 104126627, issued on Nov. 29, 2016, 9 pages.
Office Action received for Taiwanese Patent Application No. 104126627, mailed on Aug. 30, 2018, 22 pages.
Office Action received for Taiwanese Patent Application No. 104126627, mailed on Dec. 20, 2018, 4 pages.
Office Action received for Taiwanese Patent Application No. 104126627, mailed on Oct. 16, 2017, 7 pages.
Office Action received for Taiwanese Patent Application No. 104132636, issued on Dec. 13, 2018, 26 pages.
Office Action received for Taiwanese Patent Application No. 104132636, issued on Mar. 23, 2017, 25 pages.
Office Action received for Taiwanese Patent Application No. 104132636, issued on Oct. 31, 2017, 10 pages.
Omar Romero, "Sony Smartwatch 2 Custom Watchfaces Tutorial", Retrieved From: <https://www.youtube.com/watch?v=8odbxqwSQR8>, May 1, 2014, 2 pages.
Online Alarm Clock, https://web.archive.org/web/20150505081746/http://www.online-stopwatch.com/online-alarm-clock, May 5, 2015, 2 pages.
Pentax K20D Operating Manual, http://www.ricoh-imaging.eu/en/operating-manuals-download.html, Pentax Corporation, 2008, pp. 173-174.
Phandroid, "New Android Wear Wrist Gestures in Marshmallow", Available online at: https://www.youtube.com/watch?v=0WhKuklpQ9A, Feb. 11, 2016, 3 pages.
Phlam Dev, "Clockwork Tomato Presentation", Retrieved from the Internet: URL: https://www.youtube.com/watch?v=2IQDx9REn0E, Apr. 29, 2016, 6 pages.
Phonebuff, "Hybrid Stopwatch & Timer Android App Review", Available Online at: https://www.youtube.com/watch?v=B43oCFPiWvY, Apr. 4, 2012, 7 pages.
Poppinga et al., "Sensor-Based Identification of Opportune Moments for Triggering Notifications", IEEE CS, Mar. 14, 2014, pp. 22-29.
Pradhan et al., "Understanding and Managing Notifications", IEEE Infocom 2017—IEEE Conference on Computer Communications, May 1, 2017, 9 pages.
Pre-Appeal Review Report received for Japanese Patent Application No. 2020-159823, mailed on Jan. 12, 2023, 4 pages.
Pre-Interview First Office Action received for U.S. Appl. No. 14/815,890, mailed on May 26, 2016, 4 pages.
Programmatically download APK from google play store, Retrieved from the Internet: https://stackoverflow.com/questions/13703982/prog ram maticallydownload-apk-from-google-play-store/13704021#13704021, Dec. 10, 2012, 2 pages.
Record of Oral Hearing received for U.S. Appl. No. 14/815,890, mailed on Nov. 20, 2020, 18 pages.
Record of Oral Hearing received for U.S. Appl. No. 15/405,122, mailed on Sep. 12, 2023, 20 pages.
Record of Oral Hearing received for U.S. Appl. No. 16/861,651, mailed on Sep. 5, 2023, 16 pages.
Rehman A, "Install Android 4.2 Gesture-Based Keyboard & Clock App on Jelly Bean 4.1 or Higher", Excerpts From, Available online at <http://www.addictivetips.com/android/install-android-4-2-keyboard-clock-app-apk-on-jelly-bean-4-1-x/>, Nov. 3, 2012, 4 pages.
Restriction Requirement received for U.S. Appl. No. 14/815,890, mailed on Feb. 22, 2016, 5 pages.
Restriction Requirement received for U.S. Appl. No. 17/949,081, mailed on Dec. 2, 2022, 6 pages.
Restriction Requirement received for U.S. Appl. No. 17/949,081, mailed on Jan. 3, 2023, 6 pages.
Result of Consultation received for European Patent Application No. 16762356.0, mailed on Nov. 29, 2021, 3 pages.
Result of Consultation received for European Patent Application No. 17810723.1, mailed on Nov. 30, 2022, 3 pages.
Result of Consultation received for European Patent Application No. 20185974.1, mailed on Apr. 4, 2022, 4 pages.
Result of Consultation received for European Patent Application No. 20729346.5, mailed on Jun. 21, 2023, 3 pages.
Result of Consultation received for European Patent Application No. 15730925.3, mailed on Nov. 24, 2020, 4 pages.
Rosa et al., "Stripe Generator—a Free Tool for the Web Design Community", Available online at: http://www.stripegenerator.com/, Mar. 28, 2019, 10 pages.
Rowinski Dan, "Why the All-In-One Smartwatch Isn't Happening Any Time Soon", Online available at:—https://web.archive.org/web/20140123074218if_/https://readwrite.com/2014/01/20/smartwatch-wearable-fitness-remote-control/, Jan. 20, 2014, 6 pages.
Rozario Hamlin, "How to Edit Photos on iPhone & iPad", Online Available at: https://osxdaily.com/2020/01/23/how-to-edit-photos-on-iphone-ipad/, Jan. 23, 2020, 10 pages.
Search Report and Opinion received for Danish Patent Application No. PA201770502, mailed on Nov. 10, 2017, 10 pages.
Search Report and Opinion received for Danish Patent Application No. PA201970596, mailed on Dec. 4, 2019, 11 pages.
Search Report and Opinion received for Danish Patent Application No. PA201970597, mailed on Dec. 18, 2019, 10 pages.
Search Report and Opinion received for Danish Patent Application No. PA201970598, mailed on Oct. 31, 2019, 9 pages.
Search Report and Opinion received for Danish Patent Application No. PA201970599, mailed on Nov. 8, 2019, 12 pages.
Search Report and Opinion received for Danish Patent Application No. PA202070610, mailed on Jan. 8, 2021, 9 pages.
Search Report and Opinion received for Danish Patent Application No. PA202070623, mailed on Dec. 21, 2020, 9 pages.
Search Report and Opinion received for Danish Patent Application No. PA202070624, mailed on Dec. 10, 2020, 10 pages.
Search Report and Opinion received for Danish Patent Application No. PA202070625, mailed on Dec. 17, 2020, 9 pages.
Search Report and Opinion Received for Netherland Patent Application No. 2015232, mailed on Jan. 25, 2017, 9 pages.
Search Report and Opinion received for Netherlands Patent Application No. 2015242, issued on Jul. 4, 2017., 20 pages.
Search Report and Opinion received for Netherlands Patent Application No. 2018531, issued on Jul. 27, 2017, 14 pages.
Search Report received for Danish Patent Application No. 201570768, mailed on Mar. 17, 2016, 11 pages.

(56) References Cited

OTHER PUBLICATIONS

Search Report received for Netherlands Patent Application No. 2015236, mailed on Apr. 21, 2021, 19 pages.
Shiota Shinji, "Windows 7 Dojo", Weekly Ascii, Ascii Mediaworks Inc., vol. 798,, Aug. 31, 2010, 3 pages.
Singh Lovepreet, "Samsung Galaxy Watch: How to Change Watch Face—Tips and Tricks", Online available at :<https://www.youtube.com/watch?pp=desktop&v=IN7gPxTZ1qU>, Dec. 4, 2018, 80 pages.
Smartwatch, "App Earth Space HD Live Wallpaper APK for Smart Watch", Version 1.7, Android version 2.2, Aug. 27, 2013, 1 page.
Solar Walk Free, Vito Technology, Jun. 19, 2014, 9 pages.
Sony Smartwatch 2 update—new feartures and watchface creator !!! New !!! , Online available at:—https://www.youtube.com/watch?v=k3jjBv7QZSk, May 8, 2014, 3 pages.
Sony, "Live View_ micro display", Extended User Guide, Aug. 2010, 27 pages.
Sony, "Sony SmartWatch", User Guide, Dec. 2011, 18 pages.
Spears Ann, "dimming screen before/instead of screensaver?", retrieved from—https://discussions.apple.com/thread/339700, Jan. 28, 2006, 1 page.
Stateoftech, "Samsung Galaxy Gear Tips—Installing and Customizing Clock Faces", Online available at:—https://www.youtube.com/watch?v=p2GzpL3xlUo, Dec. 12, 2013, 3 pages.
Stateoftech, "Samsung Galaxy Gear Tips—Change the Clock Face", Retrieved from: https://www.youtube.com/watch?v=GOom7AZUAjY, Dec. 11, 2013, 2 pages.
Summons to Attend Oral Proceedings received for European Patent Application No. 15730924.6, mailed on Jun. 13, 2018, 10 pages.
Summons to Attend Oral Proceedings received for European Patent Application No. 15730925.3, mailed on Oct. 2, 2019, 8 pages.
Summons to Attend Oral Proceedings received for European Patent Application No. 16762356.0, mailed on May 10, 2021, 10 pages.
Summons to Attend Oral Proceedings received for European Patent Application No. 17206177.2, mailed on Jun. 3, 2019, 8 pages.
Summons to Attend Oral Proceedings received for European Patent Application No. 17810723.1, mailed on Jul. 5, 2022, 8 pages.
Summons to Attend Oral Proceedings received for European Patent Application No. 18730556.0, mailed on Oct. 13, 2022, 6 pages.
Summons to Attend Oral Proceedings received for European Patent Application No. 20172197.4, mailed on Apr. 14, 2023, 8 pages.
Summons to Attend Oral Proceedings received for European Patent Application No. 20729346.5, mailed on Jan. 23, 2023, 11 pages.
Sun Set, "Sun Set solar image clock", Available at <https://web.archive.orgjweb/20140719005410/http://www.sunsetclock.com/>, 2013, 5 pages.
Supplemental Notice of Allowance received for U.S. Appl. No. 14/815,890, mailed on Mar. 10, 2021, 2 pages.
Supplemental Notice of Allowance received for U.S. Appl. No. 15/884,195, mailed on Dec. 16, 2021, 3 pages.
Supplemental Notice of Allowance received for U.S. Appl. No. 16/585,399, mailed on Aug. 26, 2020, 2 pages.
Supplemental Notice of Allowance received for U.S. Appl. No. 16/867,002, mailed on Mar. 16, 2022, 2 pages.
Supplemental Notice of Allowance received for U.S. Appl. No. 16/867,002, mailed on Sep. 9, 2021, 2 pages.
Supplemental Notice of Allowance received for U.S. Appl. No. 16/997,588, mailed on Apr. 20, 2022, 4 pages.
Supplemental Notice of Allowance received for U.S. Appl. No. 16/997,588, mailed on Oct. 22, 2021, 4 pages.
Talkandroid, "Android Wear walkthrough", Available online at: https://www.youtube.com/watch?v=4xntpZac4sw, Jun. 30, 2014, 1 page.
Techcloud, "How to Create Custom Watch Face for Samsung Galaxy Gear Smartwatch just in Few Seconds", Online available at:—https://www.youtube.com/watch?v=6rO-_SREDjQ, Oct. 9, 2013, 3 pages.
The Simply Alarm app for Pebble, available online at <https://web.archive.org/web/20150517070400>/http://www.rebootsramblings.ca/n/sahhelp/https://www.youtube.com/watch?v=IVp1scQPw08, May 17, 2015, 1 page.
Theunlockr, "How to Change the Watch Face on the Galaxy Gear", Online available at:—https://www.youtube.com/watch?v=Z7EBG5aBiZg, Jan. 3, 2014, 3 pages.
Tweedie Steven, "Create and Customize Your Own Emojis with 'Makemoji' for iPhone", Available online at: http://www.businessinsider.com/create-custom-emojis-with-makemoji-app-2014-8, Aug. 19, 2014, 6 pages.
UIKit User Interface Catalog: Page Controls, Available online at https://web.archive.org/web/20140703123442/https://developer.apple.com/library/ios/documentation/userexperience/conceptual/UIKitUICatalog/UIPageControl.html, Dec. 16, 2013, 4 pages.
Vidstube, "Bitmoji Clockface on Fitbit Versa Sense/Versa 3/Versa 2", Available online at: <https://www.youtube.com/watch?v=4V_xDnSLeHE>, Retrieved on Dec. 3, 2020, Jun. 30, 2019, 1 page.
Viticci Frederico, "Checking Time Zones with Living Earth—MacStories", Available at <https://www.macstories.net/reviews/checking-time-zones-with-living-earth/>, Dec. 11, 2013, pp. 1-5.
Wade Cliff, "Get the Most Out of Nova Launcher: Changing Icon Sizes", Online Available at: https://www.androidguys.com/tips-tools/get-nova-launcher-changing-icon-sizes/, Nov. 16, 2015, 6 pages.
Wade Cliff, "Get the Most Out of Nova Launcher: Customizing the Dock (Contest Included)", Online Available at: https://www.androidguys.com/tips-tools/get-nova-launcher-customizing-dockcontest-included/, Dec. 1, 2015, 5 pages.
Watchophilia, "Mickey Mouse Watches", Online Available at: https://web.archive.org/web/20130929065422/https://www.watchophilia.com/photogallery/mickey-mouse/, Sep. 29, 2013, 16 pages.
Watchuseek, "The watch every father needs: M-I-C-K-E-Y, M-O-U-S-E. Mickey Mouse . . . ?", Online Available at: https://forums.watchuseek.com/f2/watch-every-father-needs-m-i-c-k-e-y-m-o-u-s-e-mickey-mouse-855069.html, 2013, 3 pages.
Wearablezone, "How to Set Up Your Fitbit Profile", Online available at:—<https://youtu.be/jsWPtcDWiJM>, Jun. 6, 2016, 3 pages.
Whitwam Ryan, "Facer is Fast Becoming the De Facto Custom Watch Face Maker for Android Wear", Available online at: http://www.androidpolice.com/2014/09/19/facer-is-fast-becoming-the-de-facto-custom-watch-face-maker-for-android-wear, Sep. 19, 2014, 11 pages.
Wikipedia, "Emoji", Available online at: https://en.wikipedia.org/w/index.php?title=Emoji&oldid=648831795, Feb. 25, 2015, 12 pages.
Wikipedia, "Emoticon", Available online at: https://en.wikipedia.org/w/index.php?title=Emoticon&oldid=648776142, Feb. 25, 2015, 9 pages.
Woolsey Amanda, "How to Customize the Clock on the Apple Watch", Available online at: <https://www.youtube.com/watch?v=t-3Bckdd9B4>, Retrieved on Dec. 11, 2020, Apr. 25, 2015, 1 page.
Xdream, "TickTalk Video User Manual", YouTube [online] [video], Online available at: <https://youtu.be/jYhq3DwmVzo>, Mar. 17, 2017, 3 pages.
Zelgadis, "Reuse Animations—Synfig Animation Studio", Available online at: https://wiki.synfig.org/index.php?title=Doc:Reuse_Animations&oldid=18173, May 20, 2013, 5 pages.
Zephyrnix, "Steam's In-Game Home menu", Online Available at: <https://www.youtube.com/watch?v=jLoRFiPkcUw>, see 0;00-1;06., Feb. 15, 2011, 3 pages.
Zukerman Erez, "6 Beautiful, Interesting & Versatile Timer Apps [Android]", available at: http://www.makeuseof.com/tag/beautiful-interesting-versatile-timer-apps-android/, May 18, 2012, 5 pages.
Applicant-Initiated Interview Summary received for U.S. Appl. No. 17/713,005, mailed on Feb. 29, 2024, 2 pages.
Final Office Action received for U.S. Appl. No. 17/746,807, mailed on Feb. 20, 2024, 24 pages.
Notice of Acceptance received for Australian Patent Application No. 2023201920, mailed on Feb. 9, 2024, 3 pages.
Notice of Acceptance received for Australian Patent Application No. 2023203197, mailed on Feb. 5, 2024, 3 pages.
Notice of Allowance received for Korean Patent Application No. 10-2024-7004706, mailed on Feb. 22, 2024, 8 pages (2 pages of English Translation and 6 pages of Official Copy).
Office Action received for Chinese Patent Application No. 201980030338.2, mailed on Feb. 7, 2024, 20 pages (12 pages of English Translation and 8 pages of Official Copy).

(56) References Cited

OTHER PUBLICATIONS

Advisory Action received for U.S. Appl. No. 17/031,765, mailed on Nov. 13, 2023, 5 pages.
Advisory Action received for U.S. Appl. No. 17/947,530, mailed on Oct. 13, 2023, 3 pages.
Applicant-Initiated Interview Summary received for U.S. Appl. No. 15/421,865, mailed on Oct. 3, 2023, 6 pages.
Applicant-Initiated Interview Summary received for U.S. Appl. No. 17/031,765, mailed on Oct. 31, 2023, 5 pages.
Applicant-Initiated Interview Summary received for U.S. Appl. No. 17/717,275, mailed on Sep. 26, 2023, 6 pages.
Applicant-Initiated Interview Summary received for U.S. Appl. No. 17/746,807, mailed on Nov. 3, 2023, 2 pages.
Decision to Grant received for European Patent Application No. 17810723.1, mailed on Sep. 21, 2023, 2 pages.
Decision to Grant received for European Patent Application No. 20204436.8, mailed on Oct. 12, 2023, 4 pages.
Decision to Grant received for European Patent Application No. 20729346.5, mailed on Nov. 16, 2023, 2 pages.
Examiner's Pre-Review Report received for Japanese Patent Application No. 2021-157213, mailed on Oct. 25, 2023, 3 pages (2 pages of English Translation and 1 page of Official Copy).
Extended European Search Report received for European Patent Application No. 23201849.9, mailed on Oct. 26, 2023, 9 pages.
Intention to Grant received for European Patent Application No. 18730556.0, mailed on Sep. 20, 2023, 9 pages.
Intention to Grant received for European Patent Application No. 20204436.8, mailed on Sep. 19, 2023, 9 pages.
Notice of Acceptance received for Australian Patent Application No. 2022203957, mailed on Sep. 27, 2023, 3 pages.
Notice of Acceptance received for Australian Patent Application No. 2022235622, mailed on Sep. 13, 2023, 3 pages.
Notice of Allowance received for Korean Patent Application No. 10-2023-0064928, mailed on Sep. 22, 2023, 7 pages (2 pages of English Translation and 5 pages of Official Copy).
Notice of Allowance received for Korean Patent Application No. 10-2023-7036172, mailed on Nov. 8, 2023, 8 pages (2 pages of English Translation and 6 pages of Official Copy).
Office Action received for Australian Patent Application No. 2023201920, mailed on Nov. 10, 2023, 2 pages.
Office Action received for Chinese Patent Application No. 202310124087.2, mailed on Sep. 9, 2023, 24 pages (13 pages of English Translation and 11 pages of Official Copy).
Office Action received for European Patent Application No. 20730136.7, mailed on Nov. 3, 2023, 5 pages.
Office Action received for Japanese Patent Application No. 2022-152693, mailed on Oct. 27, 2023, 6 pages (3 pages of English Translation and 3 pages of Official Copy).
Office Action received for Korean Patent Application No. 10-2022-7019034, mailed on Sep. 18, 2023, 6 pages (2 pages of English Translation and 4 pages of Official Copy).
Corrected Notice of Allowance received for U.S. Appl. No. 17/366,698, mailed on Mar. 6, 2024, 3 pages.
Final Office Action received for U.S. Appl. No. 15/421,865, mailed on Mar. 7, 2024, 27 pages.
Intention to Grant received for European Patent Application No. 20730136.7, mailed on Mar. 1, 2024, 9 pages.
Notice of Allowance received for U.S. Appl. No. 18/220,715, mailed on Mar. 7, 2024, 11 pages.
Applicant-Initiated Interview Summary received for U.S. Appl. No. 18/196,345, mailed on Sep. 16, 2024, 4 pages.
Notice of Allowance received for Chinese Patent Application No. 202110369387.8, mailed on Aug. 30, 2024, 2 pages (1 page of English Translation and 1 page of Official Copy).
Notice of Allowance received for U.S. Appl. No. 15/421,865, mailed on Sep. 30, 2024, 6 pages.
Notice of Allowance received for U.S. Appl. No. 18/209,333, mailed on Sep. 19, 2024, 8 pages.
Office Action received for Chinese Patent Application No. 202110368426.2, mailed on Aug. 23, 2024, 17 pages (8 pages of English Translation and 9 pages of Official Copy).
Office Action received for Japanese Patent Application No. 2022-194369, mailed on Sep. 20, 2024, 5 pages (2 pages of English Translation and 3 pages of Official Copy).
Office Action received for Japanese Patent Application No. 2023-104475, mailed on Sep. 17, 2024, 6 pages (3 pages of English Translation and 3 pages of Official Copy).
Intention to Grant received for European Patent Application No. 22729905.4, mailed on Nov. 14, 2024, 9 pages.
Decision to Grant received for European Patent Application No. 22729905.4, mailed on Mar. 27, 2025, 4 pages.
Applicant-Initiated Interview Summary received for U.S. Appl. No. 18/375,448, mailed on Jul. 23, 2025, 4 pages.
Office Action received for European Patent Application No. 22188724.3, mailed on Jul. 24, 2025, 10 pages.
Office Action received for Japanese Patent Application No. 2024-110376, mailed on Jul. 18, 2025, 6 pages (3 pages of English Translation and 3 pages of Official Copy).
Supplemental Notice of Allowance received for U.S. Appl. No. 17/946,993, mailed on Jul. 22, 2025, 2 pages.
Applicant-Initiated Interview Summary received for U.S. Appl. No. 17/946,993, mailed on May 29, 2025, 4 pages.
Applicant-Initiated Interview Summary received for U.S. Appl. No. 18/196,345, mailed on Apr. 4, 2025, 4 pages.
Applicant-Initiated Interview Summary received for U.S. Appl. No. 18/618,920, mailed on Apr. 22, 2025, 6 pages.
Applicant-Initiated Interview Summary received for U.S. Appl. No. 18/618,920, mailed on Jan. 17, 2025, 6 pages.
Corrected Notice of Allowance received for U.S. Appl. No. 16/943,737, mailed on Jun. 20, 2025, 3 pages.
Corrected Notice of Allowance received for U.S. Appl. No. 17/031,671, mailed on Mar. 19, 2025, 3 pages.
Corrected Notice of Allowance received for U.S. Appl. No. 17/746,807, mailed on Feb. 26, 2025, 3 pages.
Decision on Appeal received for U.S. Appl. No. 16/943,737, mailed on Mar. 4, 2025, 10 pages.
Decision on Appeal received for U.S. Appl. No. 17/031,671, mailed on Nov. 1, 2024, 24 pages.
Decision on Appeal received for U.S. Appl. No. 17/947,530, mailed on Mar. 21, 2025, 16 pages.
Decision to Grant received for European Patent Application No. 19724997.2, mailed on Apr. 10, 2025, 4 pages.
Decision to Grant received for European Patent Application No. 20730136.7, mailed on Nov. 28, 2024, 3 pages.
Decision to Grant received for European Patent Application No. 21728746.5, mailed on Feb. 6, 2025, 4 pages.
Decision to Grant received for Japanese Patent Application No. 2022-013919, mailed on Feb. 17, 2025, 4 pages (2 pages of English Translation and 2 pages of Official Copy).
Decision to Grant received for Japanese Patent Application No. 2023-134400, mailed on Mar. 3, 2025, 3 pages (1 page of English Translation and 2 pages of Official Copy).
Dyna Logix, "Smart Stand up reminder for Wear OS (and Android Wear 2.x / 1.x)", Available online at: <https://www.youtube.com/watch?v=dQdMEZ6tJLY>, Apr. 4, 2017, 2 pages.
Examiner-Initiated Interview Summary received for U.S. Appl. No. 17/031,671, mailed on Jan. 6, 2025, 2 pages.
Examiner's Answer to Appeal Brief received for U.S. Appl. No. 17/713,005, mailed on Feb. 25, 2025, 14 pages.
Extended European Search Report received for European Patent Application No. 24212853.6, mailed on Feb. 24, 2025, 9 pages.
Extended European Search Report received for European Patent Application No. 24215123.1, mailed on Apr. 8, 2025, 9 pages.
Extended European Search Report received for European Patent Application No. 24216681.7, mailed on Mar. 4, 2025, 8 pages.
Final Office Action received for U.S. Appl. No. 18/196,345, mailed on Jan. 10, 2025, 15 pages.
Final Office Action received for U.S. Appl. No. 18/618,920, mailed on Feb. 19, 2025, 12 pages.
Hao Liu, "The Design and Implementation of Rural Commercial Bank Online Banking", University of Electronic Science and Tech-

(56) References Cited

OTHER PUBLICATIONS nology of China Online available at: https://www.cnki.net, Mar. 25, 2015, 83 pages (Official Copy Only). {See Communication under Rule 37 CFR § 1.98(a) (3)}.
Intention to Grant received for European Patent Application No. 19724997.2, mailed on Dec. 3, 2024, 8 pages.
Intention to Grant received for European Patent Application No. 21728746.5, mailed on Dec. 6, 2024, 8 pages.
International Preliminary Report on Patentability received for PCT Patent Application No. PCT/US2023/032899, mailed on Mar. 27, 2025, 16 pages.
Non-Final Office Action received for U.S. Appl. No. 17/713,005, mailed on Jun. 11, 2025, 27 pages.
Non-Final Office Action received for U.S. Appl. No. 17/946,993, mailed on Mar. 12, 2025, 21 pages.
Non-Final Office Action received for U.S. Appl. No. 18/368,521, mailed on Jun. 2, 2025, 30 pages.
Non-Final Office Action received for U.S. Appl. No. 18/375,448, mailed on Mar. 20, 2025, 16 pages.
Non-Final Office Action received for U.S. Appl. No. 18/618,920, mailed on May 20, 2025, 14 pages.
Non-Final Office Action received for U.S. Appl. No. 18/618,920, mailed on Nov. 5, 2024, 17 pages.
Notice of Acceptance received for Australian Patent Application No. 2023229597, mailed on Oct. 8, 2024, 3 pages.
Notice of Allowance received for Chinese Patent Application No. 201880048209.1, mailed on Jan. 23, 2025, 2 pages (1 page of English Translation and 1 page of Official Copy).
Notice of Allowance received for Chinese Patent Application No. 201980030338.2, mailed on Oct. 12, 2024, 2 pages (1 page of English Translation and 1 page of Official Copy).
Notice of Allowance received for Chinese Patent Application No. 202010697187.0, mailed on Nov. 18, 2024, 6 pages (1 page of English Translation and 5 pages of Official Copy).
Notice of Allowance received for Chinese Patent Application No. 202110367834.6, mailed on Jan. 2, 2025, 4 pages (1 page of English Translation and 3 pages of Official Copy).
Notice of Allowance received for Chinese Patent Application No. 202110368164.X, mailed on Mar. 13, 2025, 4 pages (1 page of English Translation and 3 pages of Official Copy).
Notice of Allowance received for Chinese Patent Application No. 202110368460.X, mailed on Mar. 13, 2025, 4 pages (1 page of English Translation and 3 pages of Official Copy).
Notice of Allowance received for Chinese Patent Application No. 202110369341.6, mailed on Nov. 4, 2024, 4 pages (1 page of English Translation and 3 pages of Official Copy).
Notice of Allowance received for Chinese Patent Application No. 202110369363.2, mailed on Nov. 22, 2024, 4 pages (1 page of English Translation and 3 pages of Official Copy).
Notice of Allowance received for Chinese Patent Application No. 202210112700.4, mailed on Nov. 11, 2024, 2 pages (1 page of English Translation and 1 page of Official Copy).
Notice of Allowance received for Chinese Patent Application No. 202210639919.X, mailed on Apr. 28, 2025, 5 pages (1 page of English Translation and 4 pages of Official Copy).
Notice of Allowance received for Japanese Patent Application No. 2023-104475, mailed on Dec. 13, 2024, 4 pages (1 page of English Translation and 3 pages of Official Copy).
Notice of Allowance received for Japanese Patent Application No. 2023-138172, mailed on Jan. 10, 2025, 5 pages (2 pages of English Translation and 3 pages of Official Copy).
Notice of Allowance received for Korean Patent Application No. 10-2023-0189466, mailed on Feb. 17, 2025, 10 pages (2 pages of English Translation and 8 pages of Official Copy).
Notice of Allowance received for Korean Patent Application No. 10-2023-0189466, mailed on Nov. 5, 2024, 10 pages (2 pages of English Translation and 8 pages of Official Copy).
Notice of Allowance received for Korean Patent Application No. 10-2024-7014705, mailed on Jan. 22, 2025, 7 pages (2 pages of English Translation and 5 pages of Official Copy).
Notice of Allowance received for Korean Patent Application No. 10-2024-7035938, mailed on Feb. 21, 2025, 8 pages (2 pages of English Translation and 6 pages of Official Copy).
Notice of Allowance received for U.S. Appl. No. 16/943,737, mailed on Jun. 3, 2025, 6 pages.
Notice of Allowance received for U.S. Appl. No. 17/031,671, mailed on Jan. 29, 2025, 37 pages.
Notice of Allowance received for U.S. Appl. No. 17/746,807, mailed on Nov. 14, 2024, 6 pages.
Office Action received for Australian Patent Application No. 2023285697, mailed on Dec. 16, 2024, 2 pages.
Office Action received for Australian Patent Application No. 2023285972, mailed on Feb. 12, 2025, 4 pages.
Office Action received for Australian Patent Application No. 2023285972, mailed on Jun. 19, 2025, 6 pages.
Office Action received for Australian Patent Application No. 2023285972, mailed on Nov. 27, 2024, 4 pages.
Office Action received for Australian Patent Application No. 2024203181, mailed on Feb. 21, 2025, 3 pages.
Office Action received for Australian Patent Application No. 2024203181, mailed on Jan. 23, 2025, 3 pages.
Office Action received for Chinese Patent Application No. 201880048209.1, mailed on Aug. 30, 2024, 10 pages (5 pages of English Translation and 5 pages of Official Copy).
Office Action received for Chinese Patent Application No. 202110367769.7, mailed on Dec. 27, 2024, 22 pages (7 pages of English Translation and 15 pages of Official Copy).
Office Action received for Chinese Patent Application No. 202110367769.7, mailed on Sep. 30, 2024, 21 pages (6 pages of English Translation and 15 pages of Official Copy).
Office Action received for Chinese Patent Application No. 202110367834.6, mailed on Nov. 4, 2024, 10 pages (5 pages of English Translation and 5 pages of Official Copy).
Office Action received for Chinese Patent Application No. 202110368164.X, mailed on Nov. 15, 2024, 27 pages (6 pages of English Translation and 21 pages of Official Copy).
Office Action received for Chinese Patent Application No. 202110368426.2, mailed on Feb. 24, 2025, 9 pages (5 pages of English Translation and 4 pages of Official Copy).
Office Action received for Chinese Patent Application No. 202110368460.X, mailed on Nov. 9, 2024, 11 pages (5 pages of English Translation and 6 pages of Official Copy).
Office Action received for Chinese Patent Application No. 202110369265.9, mailed on Dec. 27, 2024, 16 pages (5 pages of English Translation and 11 pages of Official Copy).
Office Action received for Chinese Patent Application No. 202110369265.9, mailed on Mar. 27, 2025, 16 pages (4 pages of English Translation and 12 pages of Official Copy).
Office Action received for Chinese Patent Application No. 202110481400.9, mailed on Apr. 23, 2025, 24 pages (14 pages of English Translation and 10 pages of Official Copy).
Office Action received for Chinese Patent Application No. 202210639919.X, mailed on Jan. 9, 2025, 15 pages (9 pages of English Translation and 6 pages of Official Copy).
Office Action received for Chinese Patent Application No. 202311634654.5, mailed on Sep. 18, 2024, 14 pages (8 pages of English Translation and 6 pages of Official Copy).
Office Action received for European Patent Application No. 23201849.9, mailed on Apr. 2, 2025, 6 pages.
Office Action received for European Patent Application No. 23705794.8, mailed on Feb. 12, 2025, 8 pages.
Office Action received for Japanese Patent Application No. 2022-013919, mailed on Dec. 2, 2024, 4 pages (2 pages of English Translation and 2 pages of Official Copy).
Office Action received for Japanese Patent Application No. 2024-034095, mailed on Mar. 7, 2025, 8 pages (4 pages of English Translation and 4 pages of Official Copy).
Office Action received for Korean Patent Application No. 10-2024-7035938, mailed on Nov. 21, 2024, 10 pages (4 pages of English Translation and 6 pages of Official Copy).
Record of Oral Hearing received for U.S. Appl. No. 16/943,737, mailed on Feb. 24, 2025, 22 pages.

(56) References Cited

OTHER PUBLICATIONS

Record of Oral Hearing received for U.S. Appl. No. 17/947,530, mailed on Mar. 27, 2025, 14 pages.
Shaqtech, "The FitBit Charge HR hands-on", Available Online at: https://www.youtube.com/watch?v=uWo04yzJpdg, Sep. 19, 2015, 6 pages.
Summons to Attend Oral Proceedings received for German Patent Application No. 112015003083.2, mailed on Oct. 28, 2024, 7 pages (3 pages of English Translation and 4 pages of Official Copy).
Supplemental Notice of Allowance received for U.S. Appl. No. 17/031,671, mailed on Feb. 12, 2025, 4 pages.
Supplemental Notice of Allowance received for U.S. Appl. No. 17/031,671, mailed on Feb. 27, 2025, 3 pages.
Xuetao Yang, "WP7 version of the desktop clock literary style Metro Time trial", Online available at: https://tech.sina.com.cn/s/s/2012-02-24/09216764878.shtml, Feb. 24, 2012, 10 pages (6 pages of English Translation and 4 pages of Official Copy).
Notice of Allowance received for Japanese Patent Application No. 2024-034095, mailed on Jul. 25, 2025, 4 pages (1 page of English Translation and 3 pages of Official Copy).
Board Decision received for Chinese Patent Application No. 202110368426.2, mailed on Jul. 2, 2025, 2 pages (1 page of English Translation and 1 page of Official Copy).
International Search Report and Written Opinion received for PCT Patent Application No. PCT/US2025/011749, mailed on Jun. 23, 2025, 20 pages.
Invitation to Pay Additional Fees and Partial International Search Report received for PCT Patent Application No. PCT/US2025/011749, mailed on Apr. 29, 2025, 13 pages.
Non-Final Office Action received for U.S. Appl. No. 18/893,427, mailed on Jul. 7, 2025, 13 pages.
Notice of Allowance received for Chinese Patent Application No. 202110368426.2, mailed on Jul. 7, 2025, 4 pages (1 page of English Translation and 3 pages of Official Copy).
Notice of Allowance received for Japanese Patent Application No. 2022-194369, mailed on Jul. 7, 2025, 3 pages (1 page of English Translation and 2 pages of Official Copy).
Notice of Allowance received for U.S. Appl. No. 17/946,993, mailed on Jul. 8, 2025, 5 pages.
Notice of Allowance received for U.S. Appl. No. 18/196,345, mailed on Jul. 7, 2025, 13 pages.
Supplemental Notice of Allowance received for U.S. Appl. No. 18/196,345, mailed on Jul. 15, 2025, 2 pages.
Extended European Search Report received for European Patent Application No. 25164661.8, mailed on Jul. 28, 2025, 9 pages.
Notice of Allowance received for U.S. Appl. No. 17/031,671, mailed on Aug. 6, 2025, 7 pages.
Notice of Allowance received for U.S. Appl. No. 16/943,737, mailed on Aug. 25, 2025, 5 pages.
Office Action received for European Patent Application No. 23705794.8, mailed on Aug. 20, 2025, 5 pages.
Office Action received for Japanese Patent Application No. 2024-156798, mailed on Aug. 15, 2025, 10 pages (5 pages of English Translation and 5 pages of Official Copy).
Applicant-Initiated Interview Summary received for U.S. Appl. No. 18/618,920, mailed on Aug. 28, 2025, 6 pages.
Non-Final Office Action received for U.S. Appl. No. 18/821,090, mailed on Aug. 29, 2025, 28 pages.
Notice of Allowance received for U.S. Appl. No. 18/368,521, mailed on Aug. 28, 2025, 8 pages.
Applicant-Initiated Interview Summary received for U.S. Appl. No. 18/368,521, mailed on Aug. 12, 2025, 5 pages.
Corrected Notice of Allowance received for U.S. Appl. No. 17/031,671, mailed on Aug. 18, 2025, 3 pages.
Office Action received for Australian Patent Application No. 2023285972, mailed on Aug. 18, 2025, 4 pages.
Office Action received for Chinese Patent Application No. 202411593986.8, mailed on Aug. 2, 2025, 10 pages (5 pages of English Translation and 5 pages of Official Copy).

* cited by examiner

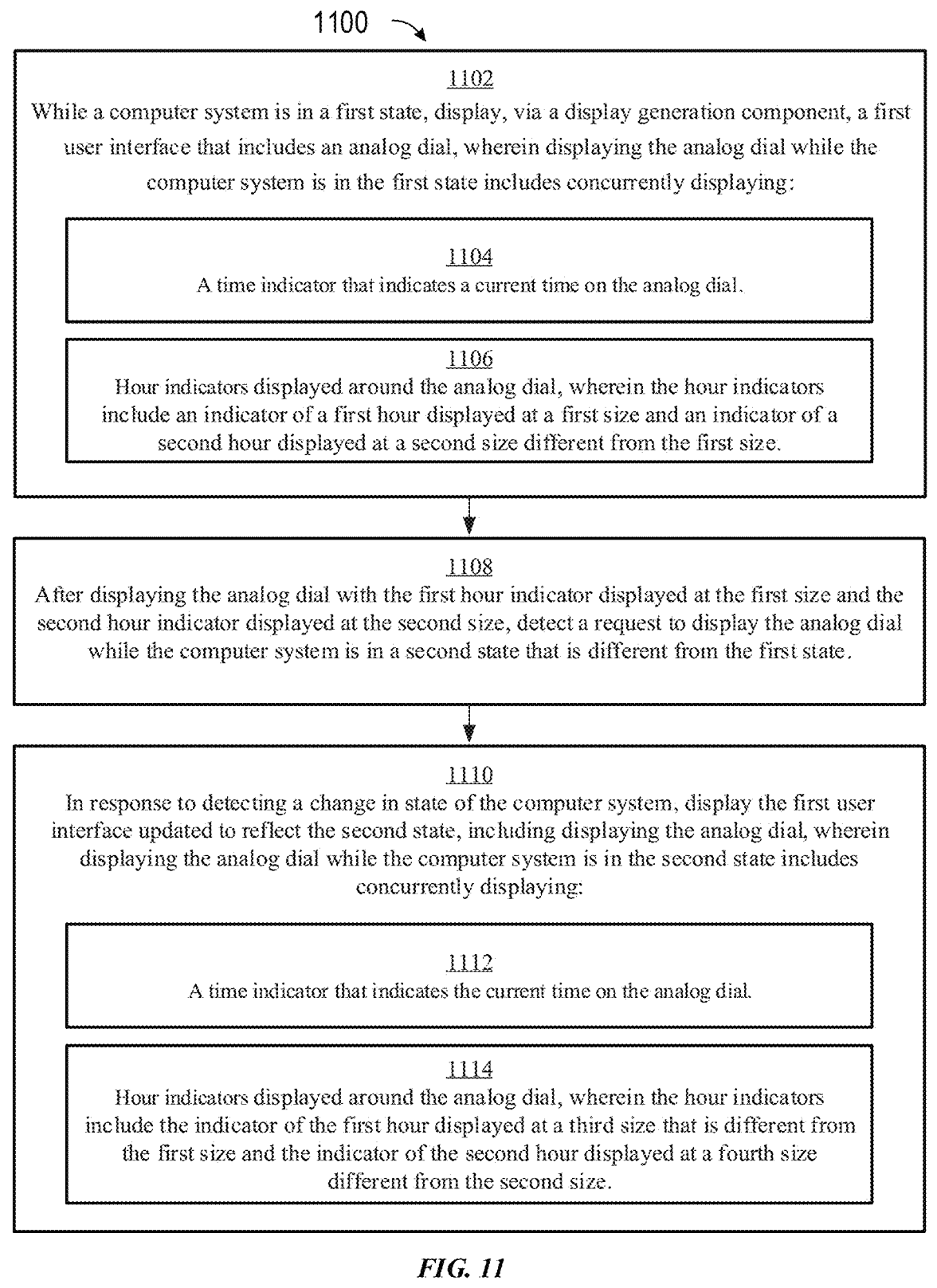

1100

1102
While a computer system is in a first state, display, via a display generation component, a first user interface that includes an analog dial, wherein displaying the analog dial while the computer system is in the first state includes concurrently displaying:

1104
A time indicator that indicates a current time on the analog dial.

1106
Hour indicators displayed around the analog dial, wherein the hour indicators include an indicator of a first hour displayed at a first size and an indicator of a second hour displayed at a second size different from the first size.

1108
After displaying the analog dial with the first hour indicator displayed at the first size and the second hour indicator displayed at the second size, detect a request to display the analog dial while the computer system is in a second state that is different from the first state.

1110
In response to detecting a change in state of the computer system, display the first user interface updated to reflect the second state, including displaying the analog dial, wherein displaying the analog dial while the computer system is in the second state includes concurrently displaying:

1112
A time indicator that indicates the current time on the analog dial.

1114
Hour indicators displayed around the analog dial, wherein the hour indicators include the indicator of the first hour displayed at a third size that is different from the first size and the indicator of the second hour displayed at a fourth size different from the second size.

*FIG. 11*

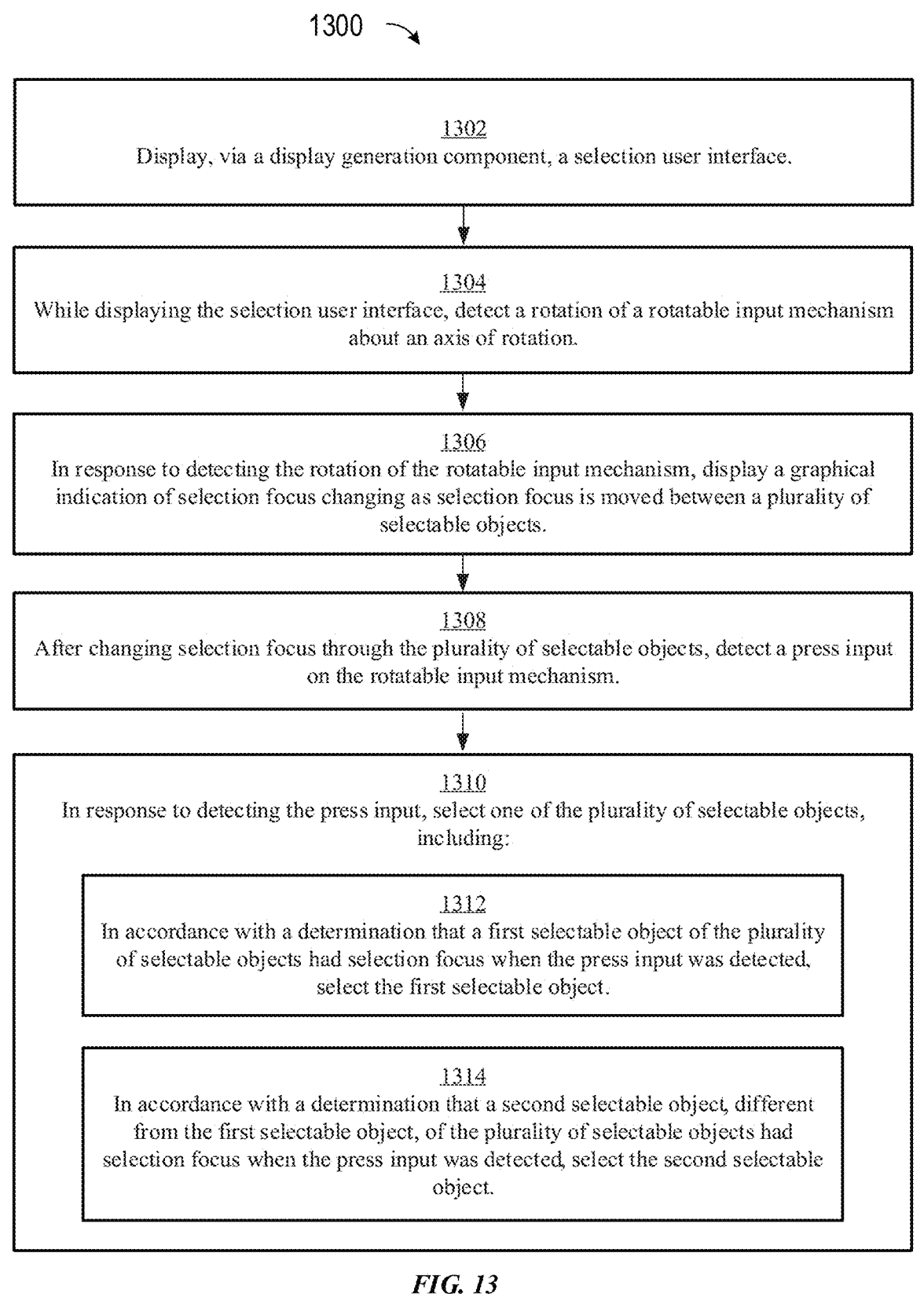

1300

1302
Display, via a display generation component, a selection user interface.

1304
While displaying the selection user interface, detect a rotation of a rotatable input mechanism about an axis of rotation.

1306
In response to detecting the rotation of the rotatable input mechanism, display a graphical indication of selection focus changing as selection focus is moved between a plurality of selectable objects.

1308
After changing selection focus through the plurality of selectable objects, detect a press input on the rotatable input mechanism.

1310
In response to detecting the press input, select one of the plurality of selectable objects, including:

1312
In accordance with a determination that a first selectable object of the plurality of selectable objects had selection focus when the press input was detected, select the first selectable object.

1314
In accordance with a determination that a second selectable object, different from the first selectable object, of the plurality of selectable objects had selection focus when the press input was detected, select the second selectable object.

*FIG. 13*

USER INTERFACES RELATED TO TIME

CROSS-REFERENCE TO RELATED APPLICATIONS

This application is a continuation of U.S. application Ser. No. 17/738,940, filed May 6, 2022, entitled "USER INTERFACES RELATED TO TIME," which claims priority to U.S. Provisional Application Ser. No. 63/197,447, filed Jun. 6, 2021, entitled "USER INTERFACES RELATED TO TIME;" and U.S. Provisional Application Ser. No. 63/188,801, filed May 14, 2021, entitled "USER INTERFACES RELATED TO TIME," which are each hereby incorporated by reference in their entirety.

FIELD

The present disclosure relates generally to computer user interfaces, and more specifically to techniques for managing watch faces.

BACKGROUND

Smart watch devices and other personal electronic device allow users to manipulate the appearance of a watch face. Users can select a variety of options to manage how the watch faces appears.

BRIEF SUMMARY

Some techniques for managing watch faces using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing watch faces. Such methods and interfaces optionally complement or replace other methods for managing watch faces. Such methods and interfaces reduce the cognitive burden on a user and produce a more efficient human-machine interface. For battery-operated computing devices, such methods and interfaces conserve power and increase the time between battery charges.

In accordance with some embodiments, a method is described. The method is performed at a computer system that is in communication with a display generation component and one or more input devices. The method comprises receiving, via the one or more input devices, an input that corresponds to a request to display a user interface based on a media item; and in response to receiving the input, displaying, via the display generation component, a user interface, wherein displaying the user interface includes concurrently displaying: a media item that includes a background element and a foreground element that is segmented from the background element based on depth information; and system text, wherein the system text is displayed in front of the background element and behind the foreground element and has content that is dynamically selected based on a context of the computer system.

In accordance with some embodiments a non-transitory computer-readable storage medium is described. The non-transitory computer-readable storage medium stores one or more programs configured to be executed by one or more processors of a computer system, wherein the computer system is in communication with a display generation component and one or more input devices, the one or more programs including instructions for: receiving, via the one or more input devices, an input that corresponds to a request to display a user interface based on a media item; and in response to receiving the input, displaying, via the display generation component, a user interface, wherein displaying the user interface includes concurrently displaying: a media item that includes a background element and a foreground element that is segmented from the background element based on depth information; and system text, wherein the system text is displayed in front of the background element and behind the foreground element and has content that is dynamically selected based on a context of the computer system.

In accordance with some embodiments a transitory computer-readable storage medium is described. The transitory computer-readable storage medium stores one or more programs configured to be executed by one or more processors of a computer system, wherein the computer system is in communication with a display generation component and one or more input devices, the one or more programs including instructions for: receiving, via the one or more input devices, an input that corresponds to a request to display a user interface based on a media item; and in response to receiving the input, displaying, via the display generation component, a user interface, wherein displaying the user interface includes concurrently displaying: a media item that includes a background element and a foreground element that is segmented from the background element based on depth information; and system text, wherein the system text is displayed in front of the background element and behind the foreground element and has content that is dynamically selected based on a context of the computer system.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: receiving, via the one or more input devices, an input that corresponds to a request to display a user interface based on a media item; and in response to receiving the input, displaying, via the display generation component, a user interface, wherein displaying the user interface includes concurrently displaying: a media item that includes a background element and a foreground element that is segmented from the background element based on depth information; and system text, wherein the system text is displayed in front of the background element and behind the foreground element and has content that is dynamically selected based on a context of the computer system.

In accordance with some embodiments, a computer system is described. The computer system is in communication with a display generation component and one or more input devices. The computer system comprises: means for receiving, via the one or more input devices, an input that corresponds to a request to display a user interface based on a media item; and means, responsive to receiving the input, displaying, via the display generation component, a user interface, wherein displaying the user interface includes concurrently displaying: a media item that includes a background element and a foreground element that is segmented from the background element based on depth information;

and system text, wherein the system text is displayed in front of the background element and behind the foreground element and has content that is dynamically selected based on a context of the computer system.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, an input that corresponds to a request to display a user interface based on a media item; and in response to receiving the input, displaying, via the display generation component, a user interface wherein displaying the user interface includes concurrently displaying: a media item that includes a background element and a foreground element that is segmented from the background element based on depth information; and system text, wherein the system text is displayed in front of the background element and behind the foreground element and has content that is dynamically selected based on a context of the computer system.

In accordance with some embodiments, a method is described. The method is performed at a computer system that is in communication with a display generation component and one or more input devices. The method comprises: receiving, via the one or more input devices, a request to display a clock face; in response to receiving the request to display the clock face, displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments a non-transitory computer-readable storage medium is described. The non-transitory computer-readable storage medium stores one or more programs configured to be executed by one or more processors of a computer system, wherein the computer system is in communication with a display generation component and one or more input devices, the one or more programs including instructions for: receiving, via the one or more input devices, a request to display a clock face; in response to receiving the request to display the clock face, displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments a transitory computer-readable storage medium is described. The transitory computer-readable storage medium stores one or more programs configured to be executed by one or more processors of a computer system, wherein the computer system is in communication with a display generation component and one or more input devices, the one or more programs including instructions for: receiving, via the one or more input devices, a request to display a clock face; in response to receiving the request to display the clock face, displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments, a computer system is described. The computer system comprises one or more processors, wherein the computer system is in communication with a display generation component and one or more input devices; and memory storing one or more programs configured to be executed by the one or more processors, the one or more programs including instructions for: receiving, via the one or more input devices, a request to display a clock face; in response to receiving the request to display the clock face, displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments, a computer system is described. The computer system is in communication with a display generation component and one or more input devices. The computer system comprises: means for receiving, via the one or more input devices, a request to display a clock face; means, responsive to receiving the request to display the clock face, for displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments, a computer program product is described. The computer program product comprises one or more programs configured to be executed by one or more processors of a computer system that is in communication with a display generation component and one or more input devices, the one or more programs including instructions for: receiving, via the one or more input devices, a request to display a clock face; in response to receiving the request to display the clock face, displaying, via the display generation component, a clock face that includes names of one or more different cities, including concurrently displaying: a current time indication for a current time zone associated with the computer system; names of one or more different cities, wherein the one or more different cities include a first city and displaying the name of the one or more cities includes displaying the first city name, wherein: in accordance with a determination that the computer system is associated with a first time zone, the first city name is displayed at a first location in the clock face with text that is oriented so that bottoms of the letters in the first city name are closer to the current time indication than tops of the letters in the first city name are to the current time indication; and in accordance with a determination that the computer system is associated with a second time zone that is different from the first time zone, the first city name is displayed at a second location in the clock face with text that is oriented so that the tops of the letters in the first city name are closer to the current time indication than the bottoms of the letters in the first city name are to the current time indication.

In accordance with some embodiments, a method is described. The method is performed at a computer system that is in communication with a display generation component. The method comprises: while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and after displaying the analog dial with the first hour indicator displayed at the first size and the second hour indicator displayed at the second size, detecting a request to display the analog dial while the computer system is in a second state that is different from the first state; and in response to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments a non-transitory computer-readable storage medium is described. The non-transitory computer-readable storage medium stores one or more programs configured to be executed by one or more processors of a computer system, wherein the computer system is in communication with a display generation component, the one or more programs including instructions for: while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and after displaying the analog dial with the first hour indicator displayed at the first size and the second hour indicator displayed at the second size, detecting a request to display the analog dial while the computer system is in a second state that is different from the first state; and in response to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments a transitory computer-readable storage medium is described. The transitory computer-readable storage medium stores one or more programs configured to be executed by one or more processors of a computer system, wherein the computer system is in communication with a display generation component, the one or more programs including instructions for: while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and after displaying the analog dial with the first hour indicator displayed at the first size and the second hour indicator displayed at the second size, detecting a request to display the analog dial while the computer system is in a second state that is different from the first state; and in response to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments, a computer system is described. The computer system comprises: one or more processors, wherein the computer system is in communication with a display generation component; and memory storing one or more programs configured to be executed by the one or more processors, the one or more programs including instructions for: while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and after displaying the analog dial with the first hour indicator displayed at the first size and the second hour indicator displayed at the second size, detecting a request to display the analog dial while the computer system is in a second state that is different from the first state; and in response to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments, a computer system is described. The computer system is in communication with a display generation component. The computer system comprises: means for, while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and means for, after displaying the analog dial with the first hour indicator displayed at the first size and the second hour indicator displayed at the second size, detecting a request to display the analog dial while the computer system is in a second state that is different from the first state; and means, responsive to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments, a computer program product is described. The computer program product comprising one or more programs configured to be executed by one or more processors of a computer system that is in communication with a display generation component, the one or more programs including instructions for: while the computer system is in a first state, displaying, via the display generation component, a first user interface that includes an analog dial, wherein displaying the analog dial while the computer system is in the first state includes concurrently displaying: a time indicator that indicates a current time on the analog dial; and hour indicators displayed around the analog dial, wherein the hour indicators include an indicator of a first hour displayed at a first size and an indicator of a second hour displayed at a second size different from the first size; and after displaying the analog dial with the first hour indicator displayed at the first size and the second hour indicator displayed at the second size, detecting a request to display the analog dial while the computer system is in a second state that is different from the first state; and in response to detecting a change in state of the computer system, displaying the first user interface updated to reflect the second state, including displaying the analog dial, wherein displaying the analog dial while the computer system is in the second state includes concurrently displaying: a time indicator that indicates the current time on the analog dial; and hour indicators displayed around the analog dial, wherein the hour indicators include the indicator of the first hour displayed at a third size that is different from the first size and the indicator of the second hour displayed at a fourth size different from the second size.

In accordance with some embodiments, a method is described. The method is performed at a computer system that is in communication with a display generation component and one or more input devices including a rotatable input mechanism. The method comprises: displaying, via the display generation component, a selection user interface; while displaying the selection user interface, detecting a rotation of the rotatable input mechanism about an axis of rotation; in response to detecting the rotation of the rotatable input mechanism, displaying a graphical indication of selection focus changing as selection focus is moved between a plurality of selectable objects; after changing selection focus through the plurality of selectable objects, detecting a press input on the rotatable input mechanism; and in response to detecting the press input, selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments a non-transitory computer-readable storage medium is described. The non-transitory computer-readable storage medium stores one or more programs configured to be executed by one or more processors of a computer system, wherein the computer system is in communication with a display generation component and one or more input devices including a rotatable input mechanism, the one or more programs including instructions for: displaying, via the display generation component, a selection user interface; while displaying the selection user interface, detecting a rotation of the rotatable input mechanism about an axis of rotation; in response to detecting the rotation of the rotatable input mechanism, displaying a graphical indication of selection focus changing as selection focus is moved between a plurality of selectable objects; after changing selection focus through the plurality of selectable objects, detecting a press input on the rotatable input mechanism; and in response to detecting the press input, selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments a transitory computer-readable storage medium is described. The transitory computer-readable storage medium stores one or more programs configured to be executed by one or more processors of a computer system, wherein the computer system is in communication with a display generation component and one or more input devices including a rotatable input mechanism, the one or more programs including instructions for: displaying, via the display generation component, a selection user interface; while displaying the selection user interface, detecting a rotation of the rotatable input mechanism about an axis of rotation; in response to detecting the rotation of the rotatable input mechanism, displaying a graphical indication of selection focus changing as selection focus is moved between a plurality of selectable objects; after changing selection focus through the plurality of selectable objects, detecting a press input on the rotatable input mechanism; and in response to detecting the press input, selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments, a computer system is described. The computer system comprises one or more processors, wherein the computer system is in communication with a display generation component and one or more input devices including a rotatable input mechanism; and memory storing one or more programs configured to be executed by the one or more processors, the one or more programs including instructions for: displaying, via the display generation component, a selection user interface; while displaying the selection user interface, detecting a rotation of the rotatable input mechanism about an axis of rotation; in response to detecting the rotation of the rotatable input mechanism, displaying a graphical indication of selection focus changing as selection focus is moved between a plurality of selectable objects; after changing selection focus through the plurality of selectable objects, detecting a press input on the rotatable input mechanism; and in response to detecting the press input, selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments, a computer system is described. The computer system is in communication with a display generation component and one or more input devices including a rotatable input mechanism. The computer system comprises: means for displaying, via the display generation component, a selection user interface; means for, while displaying the selection user interface, detecting a rotation of the rotatable input mechanism about an axis of rotation; means for, responsive to in detecting the rotation of the rotatable input mechanism, displaying a graphical indication of selection focus changing as selection focus is moved between a plurality of selectable objects; means for, after changing selection focus through the plurality of selectable objects, detecting a press input on the rotatable input mechanism; and means, responsive to detecting the press input, for selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments, a computer program product is described. The computer program product comprising one or more programs configured to be executed by one or more processors of a computer system that is in communication with a display generation component and one or more input devices including a rotatable input mechanism, the one or more programs including instructions for: displaying, via the display generation component, a selection user interface; while displaying the selection user interface, detecting a rotation of the rotatable input mechanism about an axis of rotation; in response to detecting the rotation of the rotatable input mechanism, displaying a graphical indication of selection focus changing as selection focus is moved between a plurality of selectable objects; after changing selection focus through the plurality of selectable objects, detecting a press input on the rotatable input mechanism; and in response to detecting the press input, selecting one of the plurality of selectable objects, including: in accordance with a determination that a first selectable object of the plurality of selectable objects had selection focus when the press input was detected, selecting the first selectable object; and in accordance with a determination that a second selectable object, different from the first selectable object, of the plurality of selectable objects had selection focus when the press input was detected, selecting the second selectable object.

In accordance with some embodiments, a method performed at a computer system that is in communication with a display generation component and one or more input devices is described. The method comprises: detecting, via the one or more input devices, an input that corresponds to a request to display an editing user interface; in response to detecting the input, displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; detecting a user input directed to the editing user interface; and in response to detecting the user input directed to the editing user interface: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

In accordance with some embodiments, a non-transitory computer-readable storage medium is described. The non-transitory computer-readable storage medium stores one or more programs configured to be executed by one or more processors of a computer system that is in communication with a display generation component and one or more input devices, the one or more programs including instructions for: detecting, via the one or more input devices, an input that corresponds to a request to display an editing user interface; in response to detecting the input, displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; detecting a user input directed to the editing user interface; and in response to detecting the user input directed to the editing user interface: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

In accordance with some embodiments, a transitory computer-readable storage medium is described. The transitory computer-readable storage medium stores one or more programs configured to be executed by one or more processors of a computer system that is in communication with a display generation component and one or more input devices, the one or more programs including instructions for: detecting, via the one or more input devices, an input that corresponds to a request to display an editing user interface; in response to detecting the input, displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; detecting a user input directed to the editing user interface; and in response to detecting the user input directed to the editing user interface: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

In accordance with some embodiments, a computer system that is configured to communicate with a display generation component and one or more input devices is described. The computer system comprises: one or more processors; and memory storing one or more programs configured to be executed by the one or more processors, the one or more programs including instructions for: detecting, via the one or more input devices, an input that corresponds to a request to display an editing user interface; in response to detecting the input, displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; detecting a user input directed to the editing user interface; and in response to detecting the user input directed to the editing user interface: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

In accordance with some embodiments, a computer system that is configured to communicate with a display generation component and one or more input devices is described. The computer system comprises: means for detecting, via the one or more input devices, an input that corresponds to a request to display an editing user interface; means, responsive to detecting the input, for displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; means for detecting a user input directed to the editing user interface; and means, responsive to detecting the user input directed to the editing user interface, for: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

In accordance with some embodiments, a computer program product is described. The computer program product comprises one or more programs configured to be executed by one or more processors of a computer system that is in communication with a display generation component and one or more input devices. The one or more programs include instructions for: detecting, via the one or more input devices, an input that corresponds to a request to display an editing user interface; in response to detecting the input, displaying, via the display generation component, an editing user interface, wherein displaying the editing user interface includes concurrently displaying: a media item that includes a background element and a foreground element that is segmented from the background element based on depth information; and system text, wherein: the system text is displayed with a first layer arrangement relative to the foreground element based on the depth information; and the foreground element of the media item is displayed at a first position relative to the system text; detecting a user input directed to the editing user interface; and in response to detecting the user input directed to the editing user interface: in accordance with a determination that the user input is a first type of user input, updating the system text to be displayed with a second layer arrangement relative to the foreground element that was segmented based on depth information for the media item; and in accordance with a determination that the user input is a second type of user input different from the first type of user input, updating the media item so that the foreground element of the media item is displayed at a second position relative to the system text, wherein the second position is different from the first position.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing watch faces, thereby increasing the effectiveness, efficiency, and user satisfaction with such devices. Such methods and interfaces may complement or replace other methods for managing watch faces.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIG. 11 is a flow diagram illustrating a method for managing clock faces based on state information of a computer system.

FIG. 13 is a flow diagram illustrating a method related to user interfaces for the management of time.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing clock faces. For example, there is a need for devices that enable an intuitive and efficient method for displaying a watch face based on a previously captured media item that includes depth data. For another example, there is a need for devices that enable an intuitive and efficient method for displaying a watch face that includes information based on the geographic location data. For another example, there is a need for devices that enable an intuitive and efficient method for displaying a watch face that provide an indication of a current time in a compelling manner. For another example, there is a need for devices that enable adjustments and modifications to a background and/or complications of a watch face in an intuitive and efficient manner. Such techniques can reduce the cognitive burden on a user who manage clock faces, thereby enhancing productivity. Further, such techniques can reduce processor and battery power otherwise wasted on redundant user inputs.

Below, FIGS. 1A-1B, 2, 3, 4A-4B, and 5A-5H provide a description of exemplary devices for performing the techniques for managing event notifications.

Figure 6A:
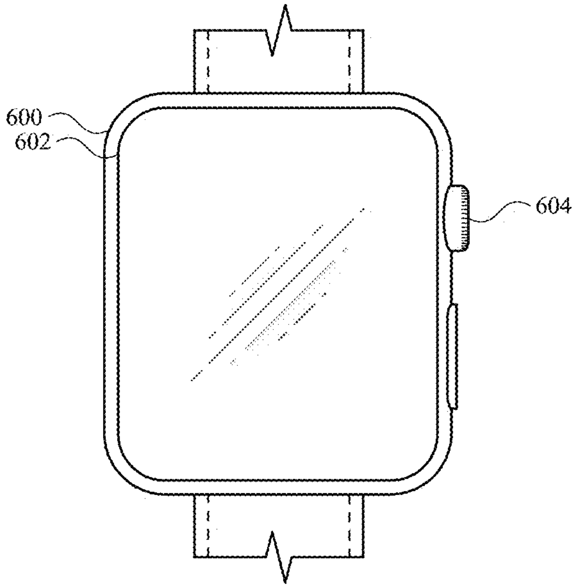
FIGS. 6A-6U illustrate exemplary user interfaces for managing watch faces based on depth data of a previously captured media item.
Figure 6B:
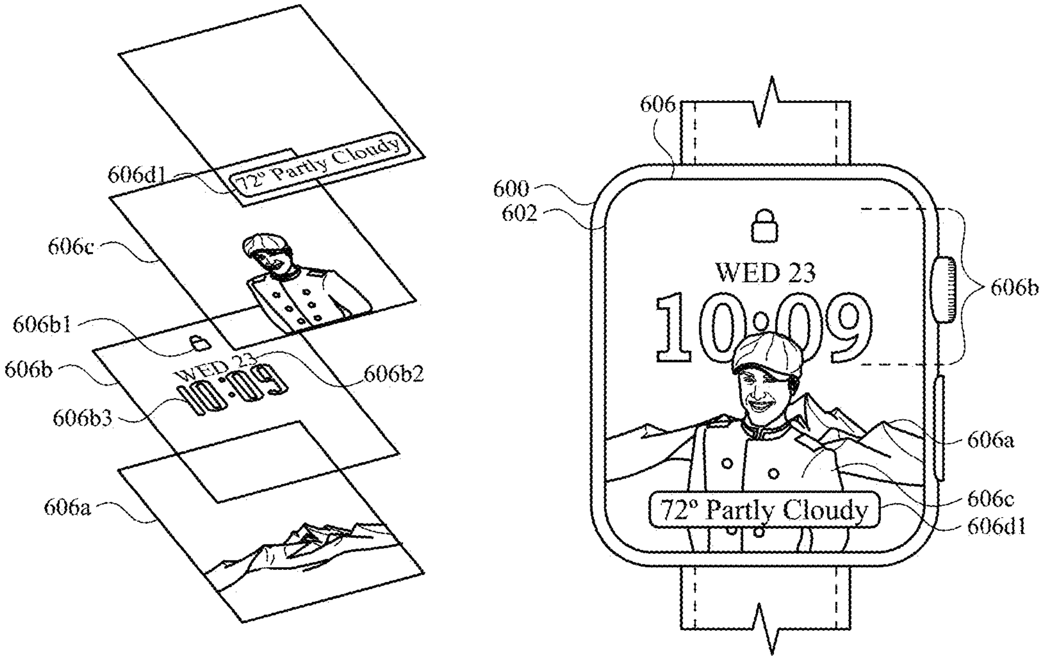
Figure 6C:
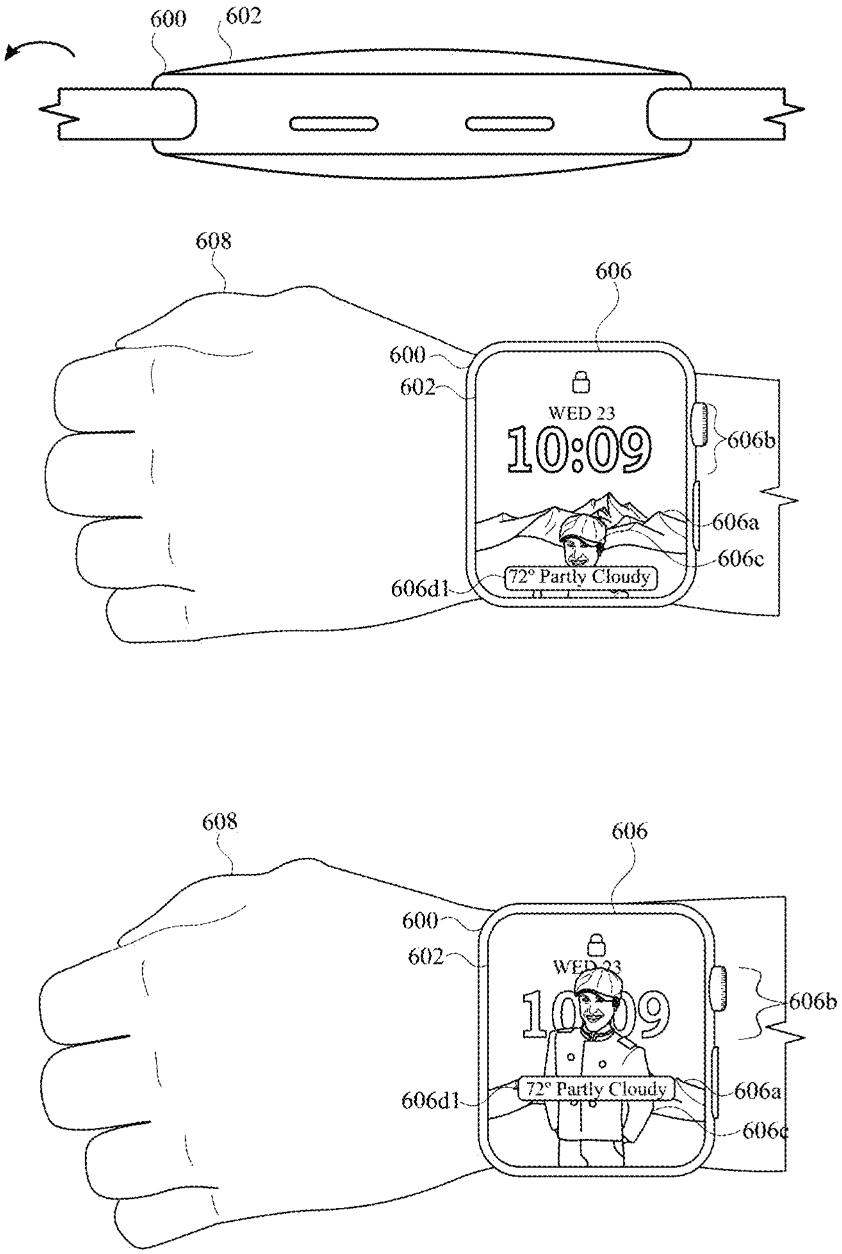
Figure 6D:
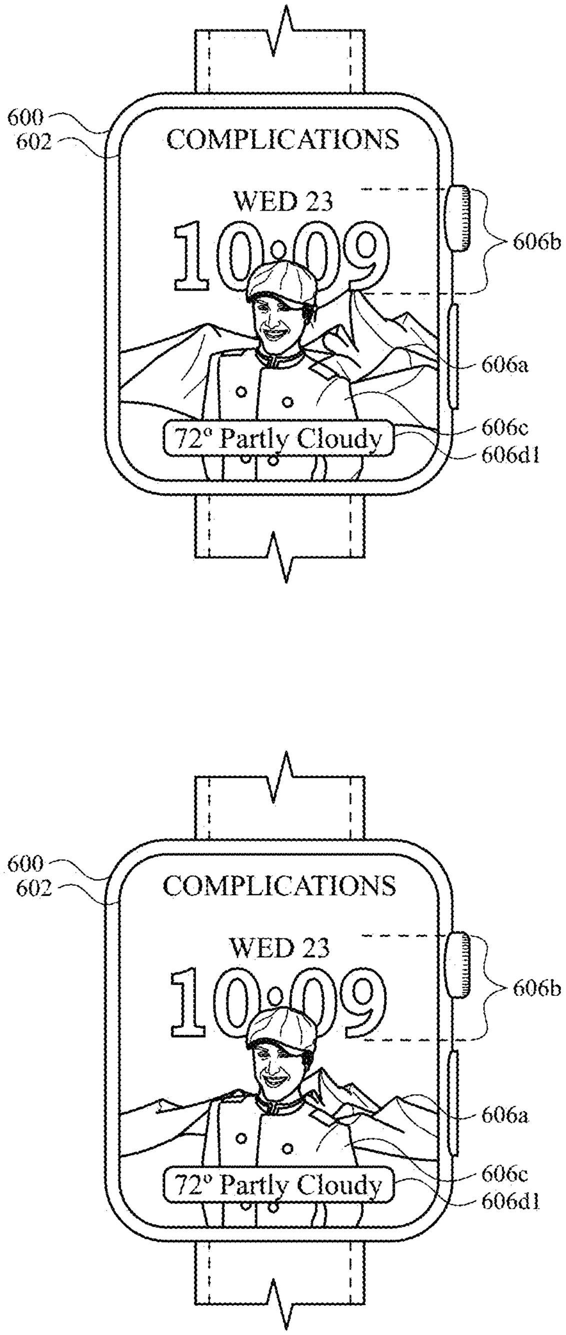
Figure 6E:
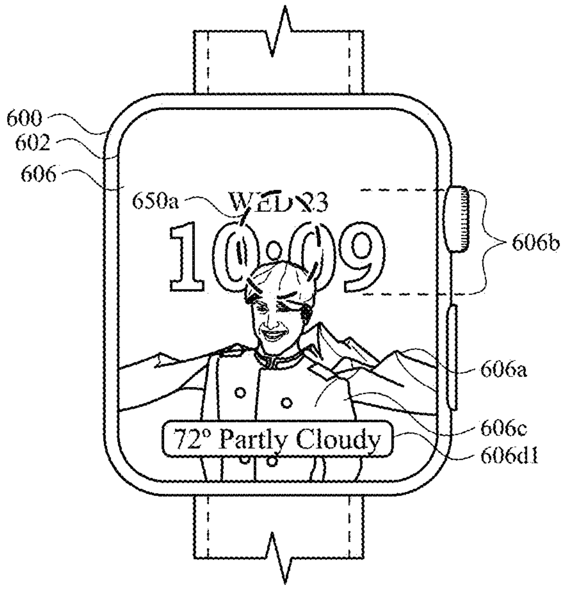
Figure 6F:
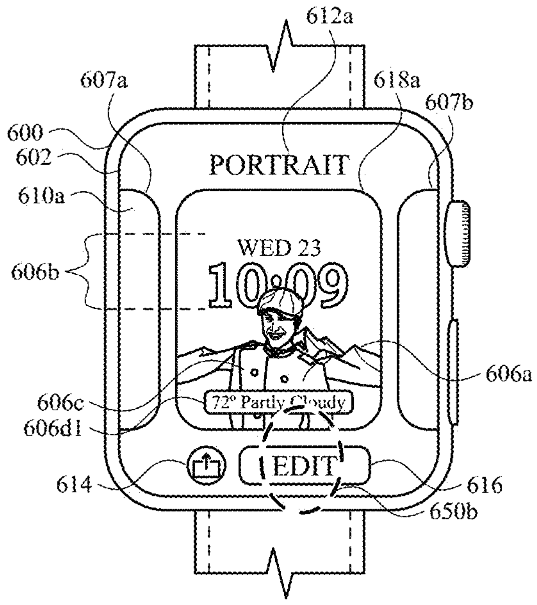
Figure 6G:
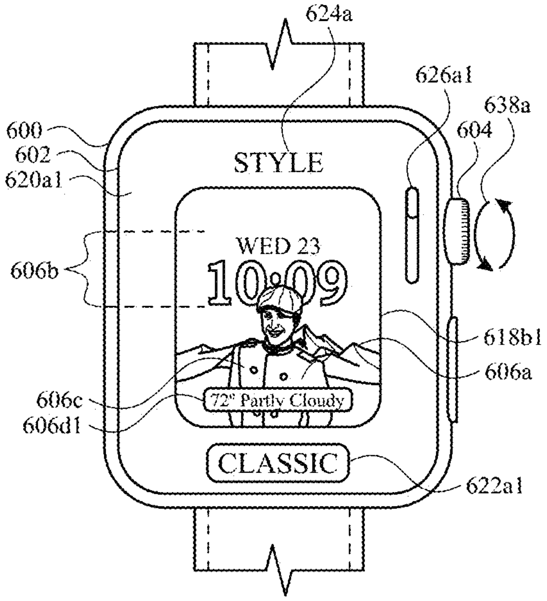
Figure 6H:
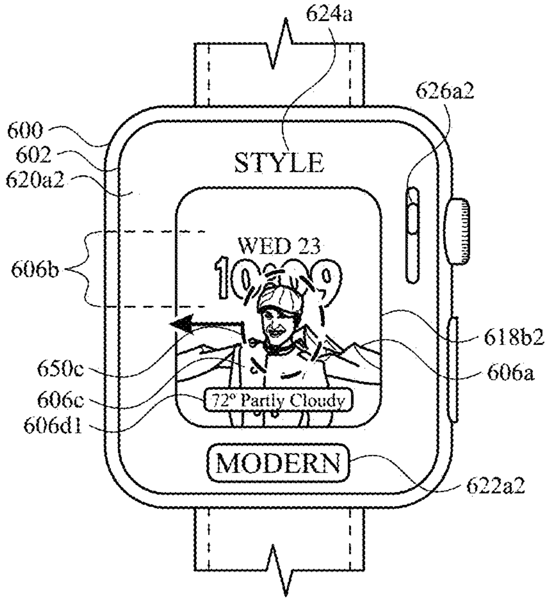
Figure 6I:
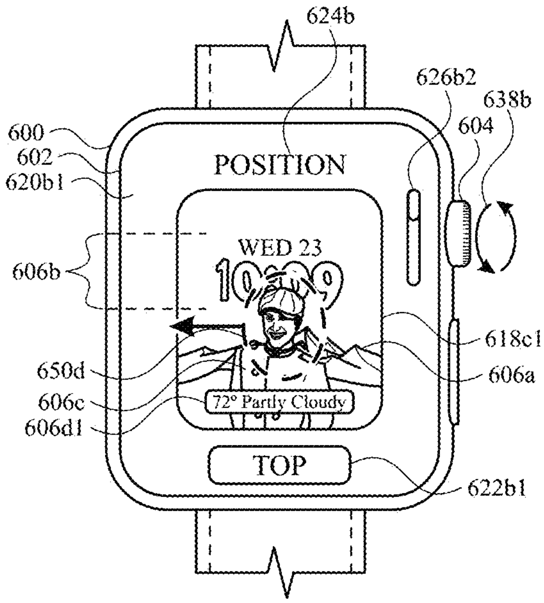
Figure 6J:
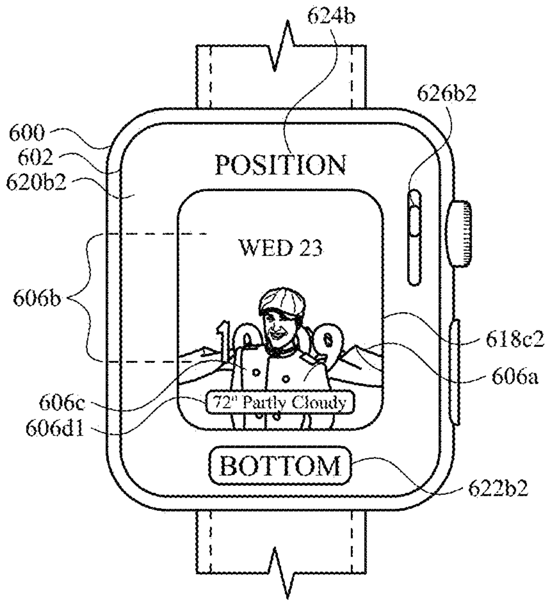
Figure 6K:
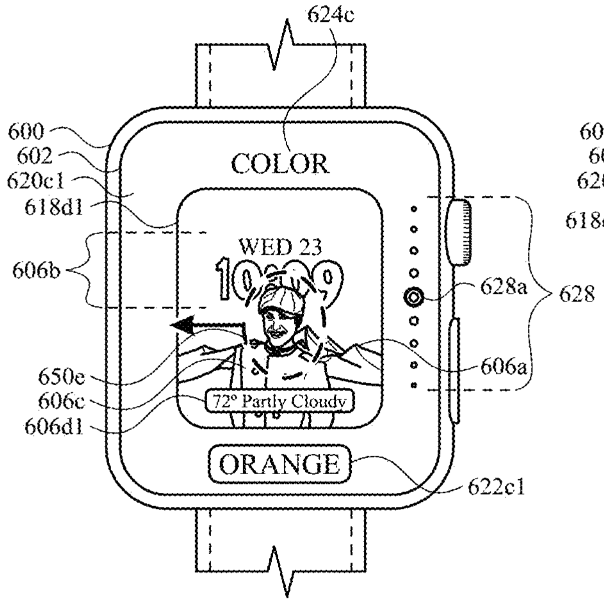
Figure 6L:
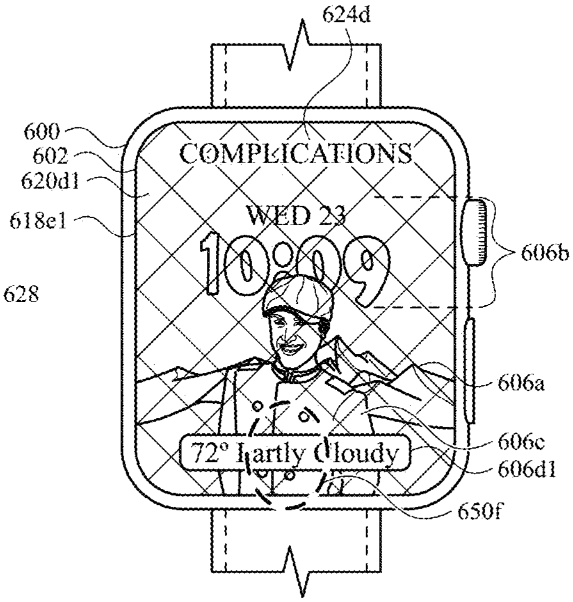
Figure 6M:
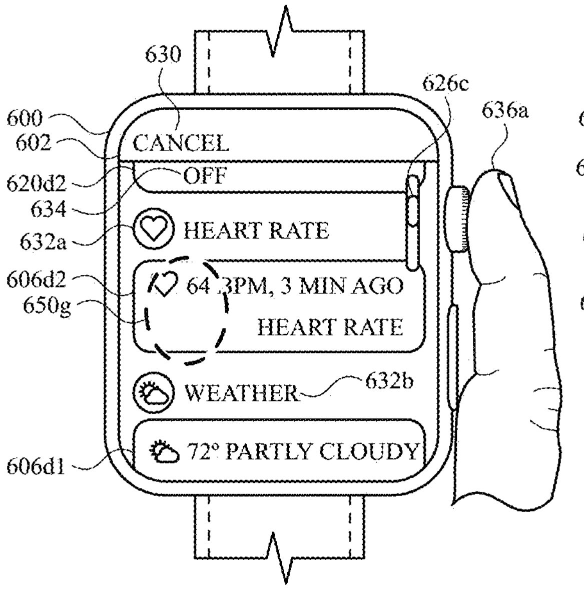
Figure 6N:
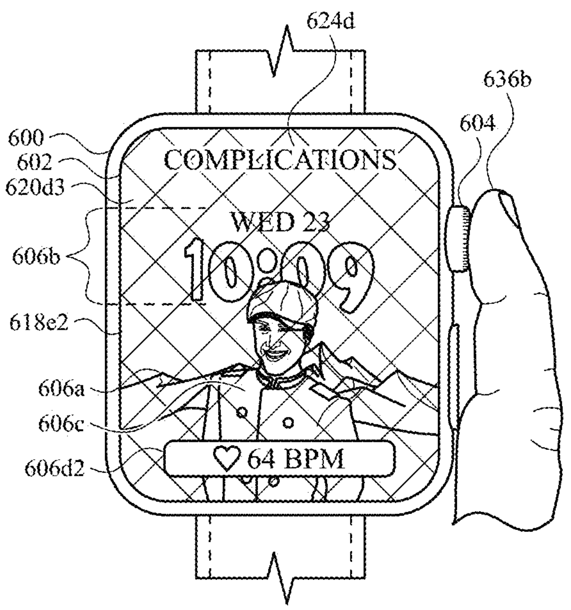
Figure 6O:
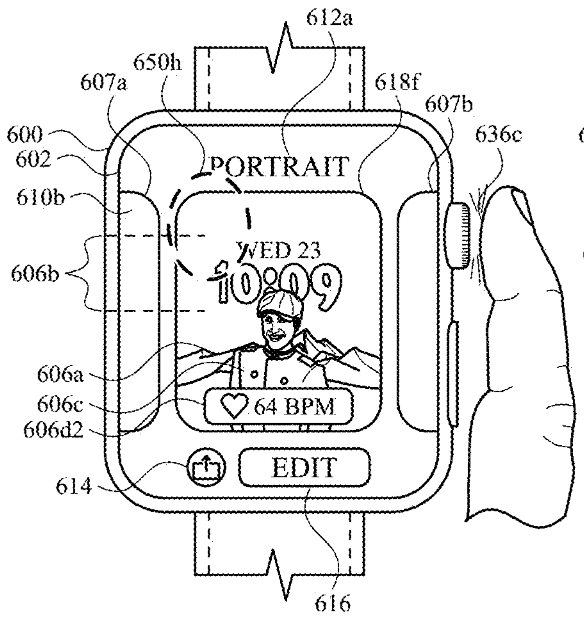
Figure 6P:
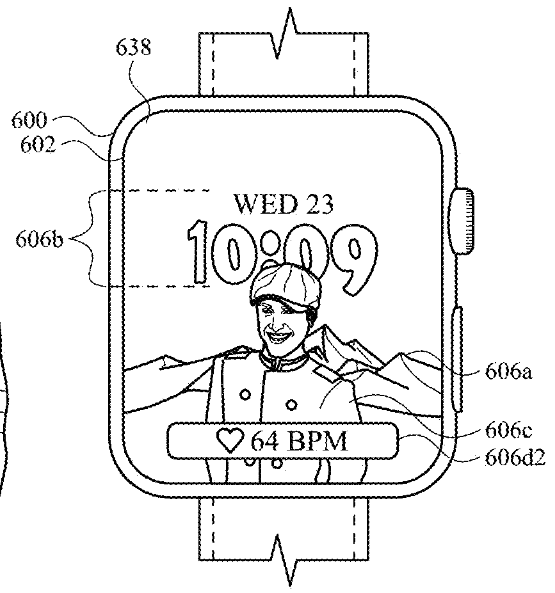
Figure 6Q:
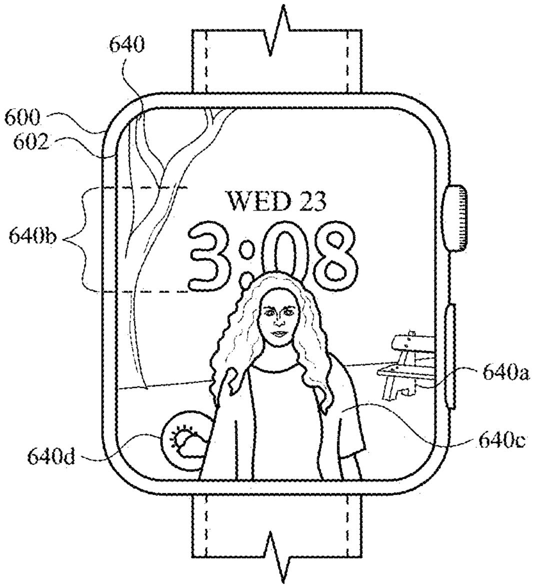
Figure 6R:
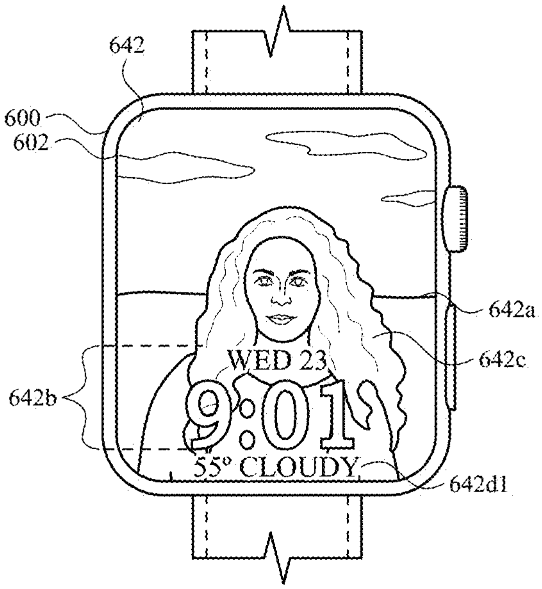
Figure 6S:
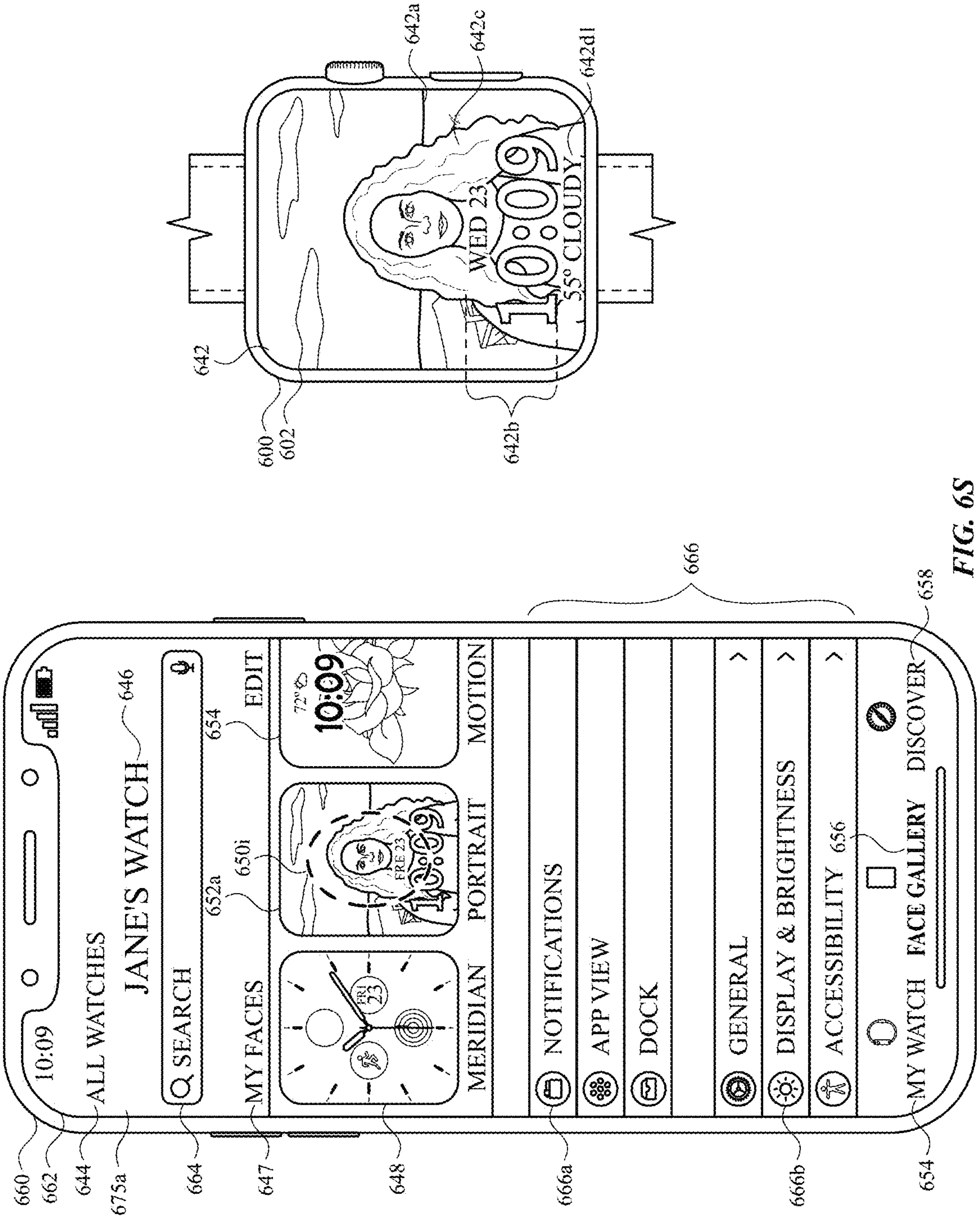
Figure 6T:
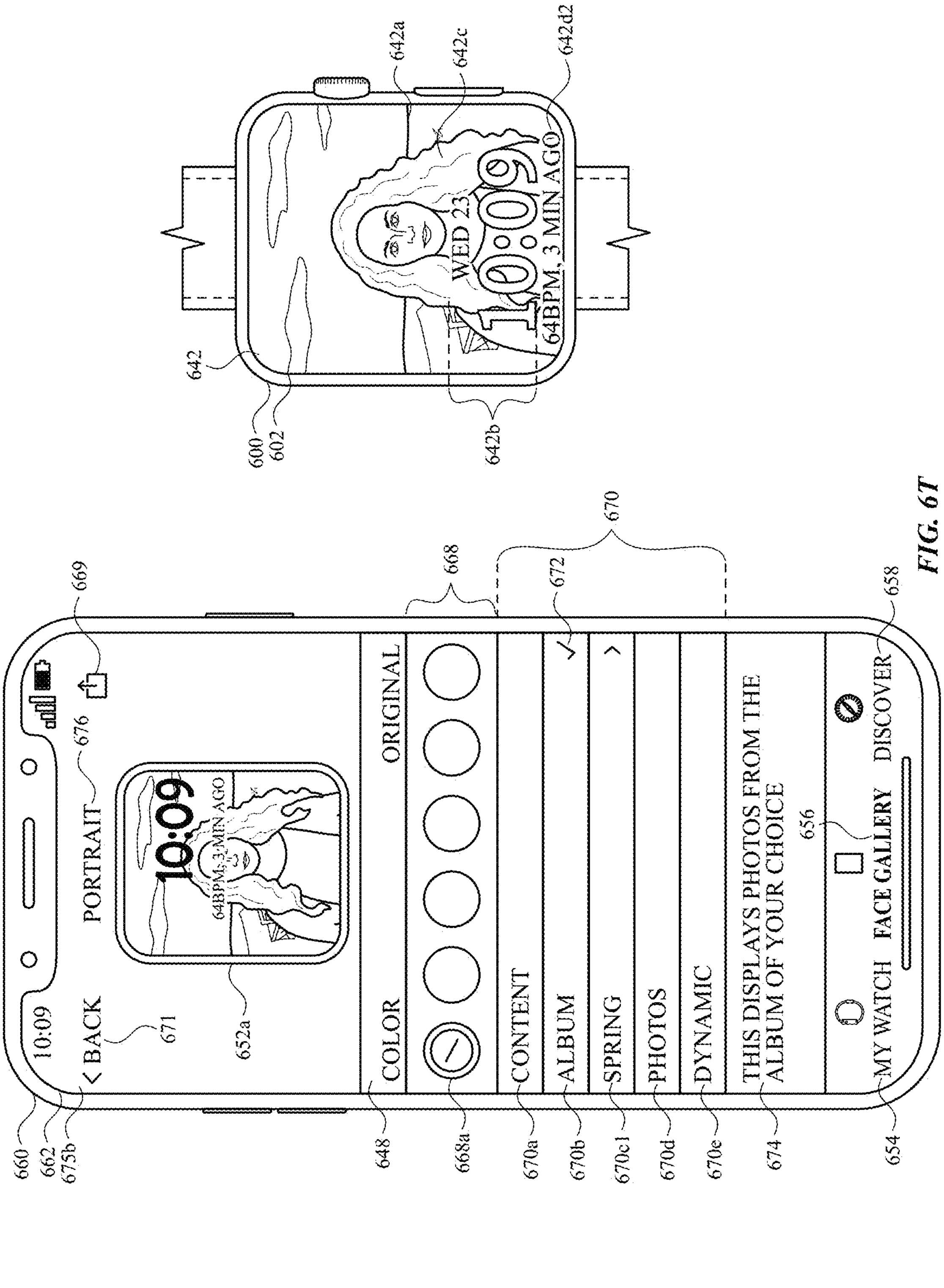
Figure 6U:
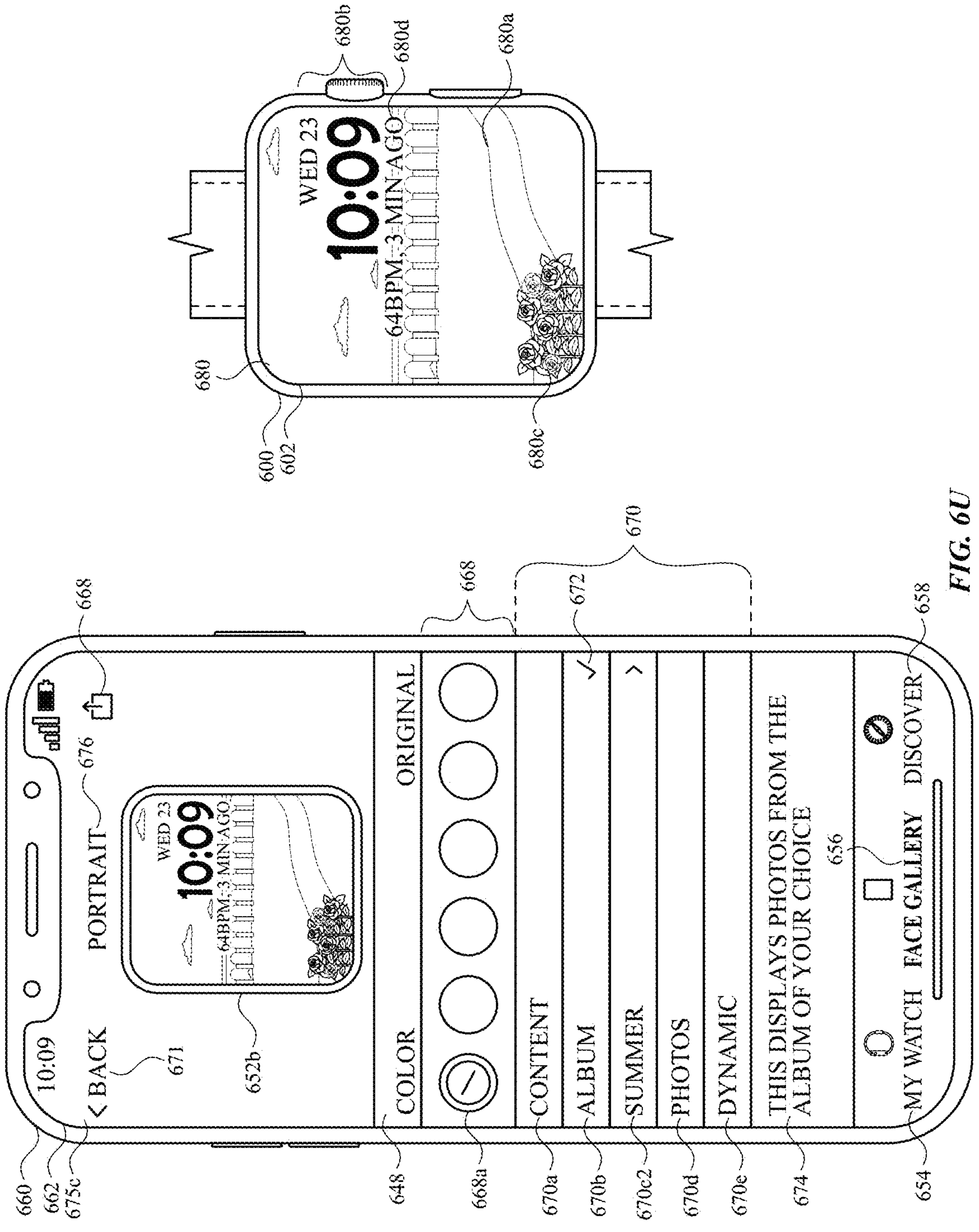
Figure 7:
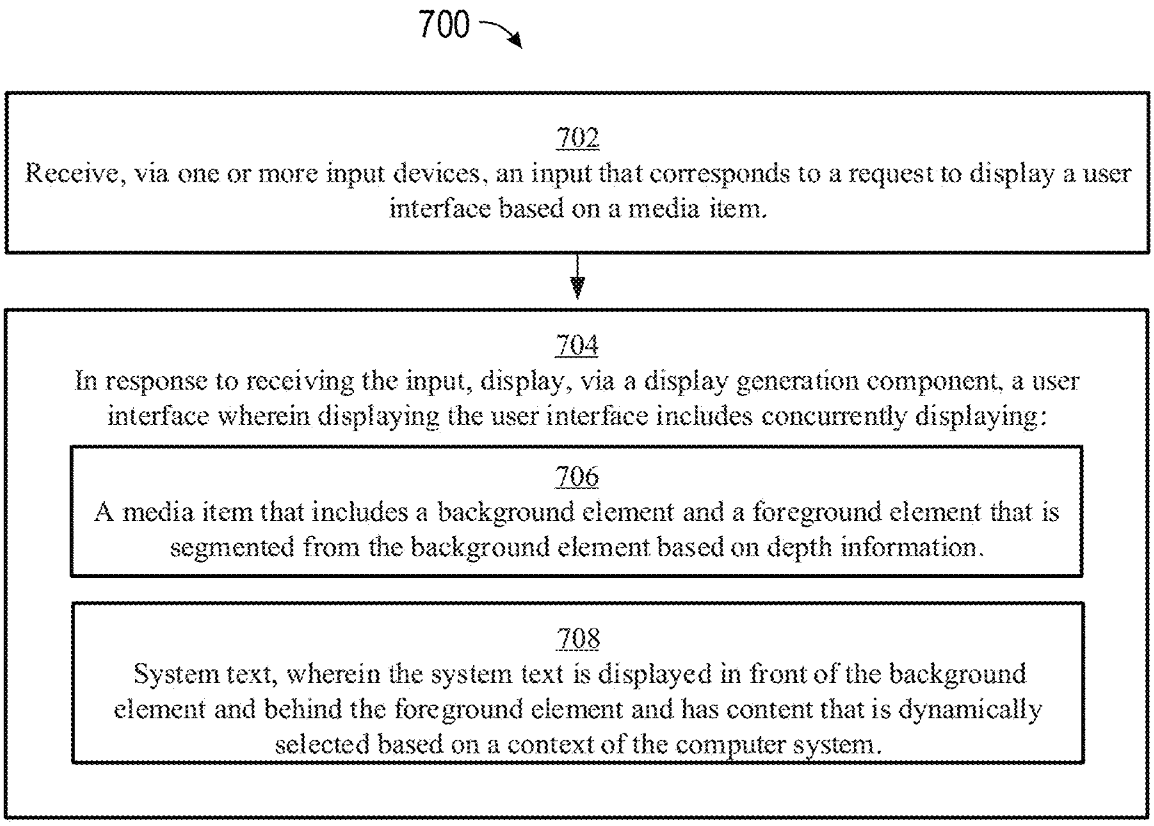
FIG. 7 is a flow diagram illustrating a method for managing watch faces based on depth data of a previously captured media item.

FIGS. 6A-6U illustrate exemplary user interfaces for managing watch faces based on depth data of a previously captured media item. FIG. 7 is a flow diagram illustrating methods of managing watch faces based on depth data of a previously captured media item in accordance with some embodiments. The user interfaces in FIGS. 6A-6U are used to illustrate the processes described below, including the processes in FIG. 7.

FIGS. 8A-8M illustrate exemplary user interfaces for managing clock faces based on geographic data. FIG. 9 is a flow diagram illustrating methods of managing clock faces based on geographic data in accordance with some embodiments. The user interfaces in FIGS. 8A-8M are used to illustrate the processes described below, including the processes in FIG. 9.

Figure 10B:
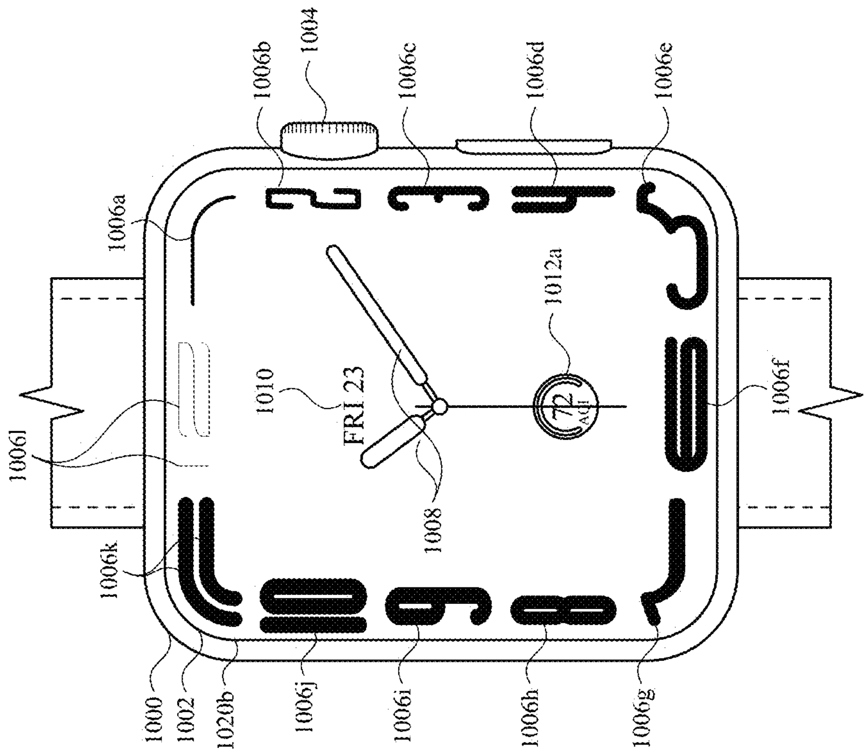
FIGS. 10A-10W illustrate exemplary user interfaces for managing clock faces based on state information of a computer system.
Figure 10A:
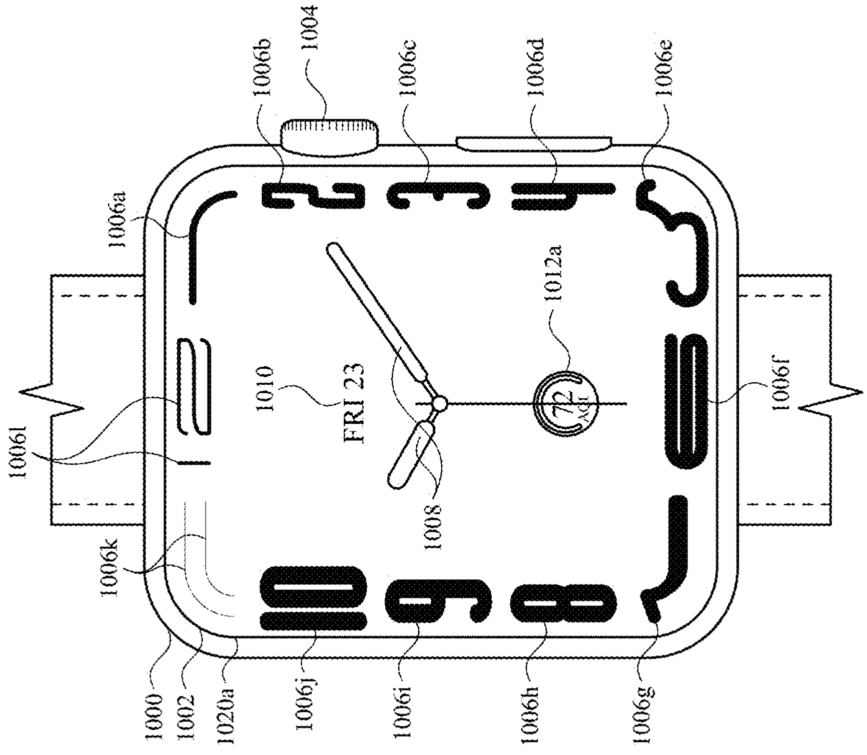
Figure 10D:
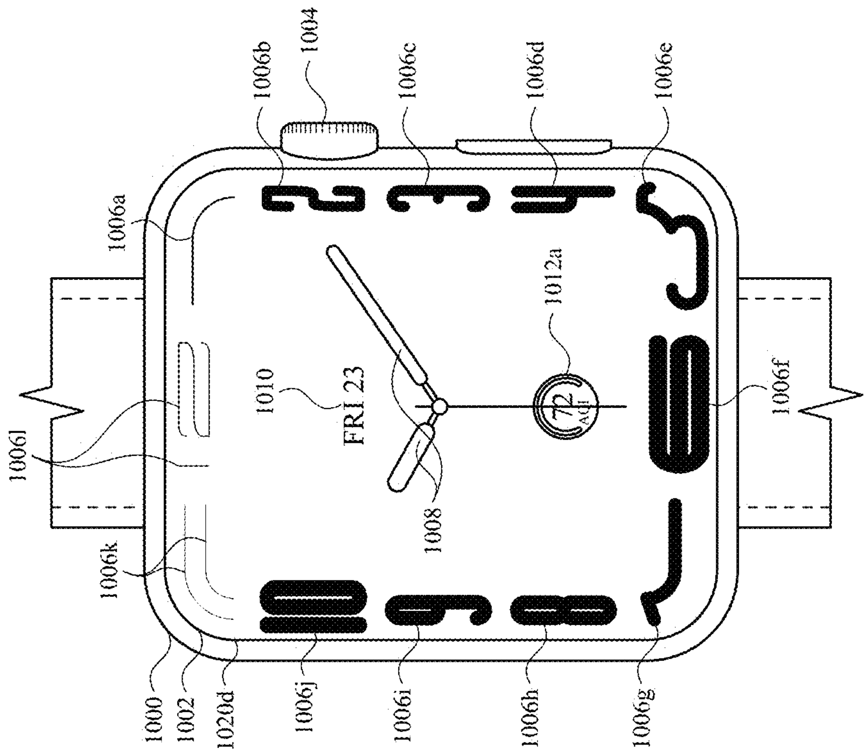
Figure 10C:
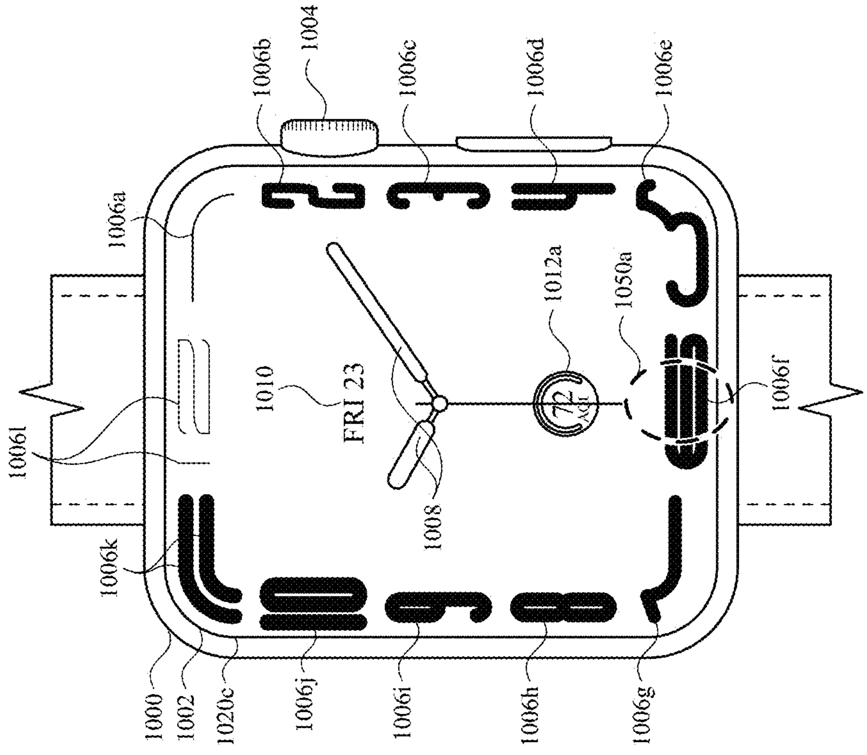
Figure 10F:
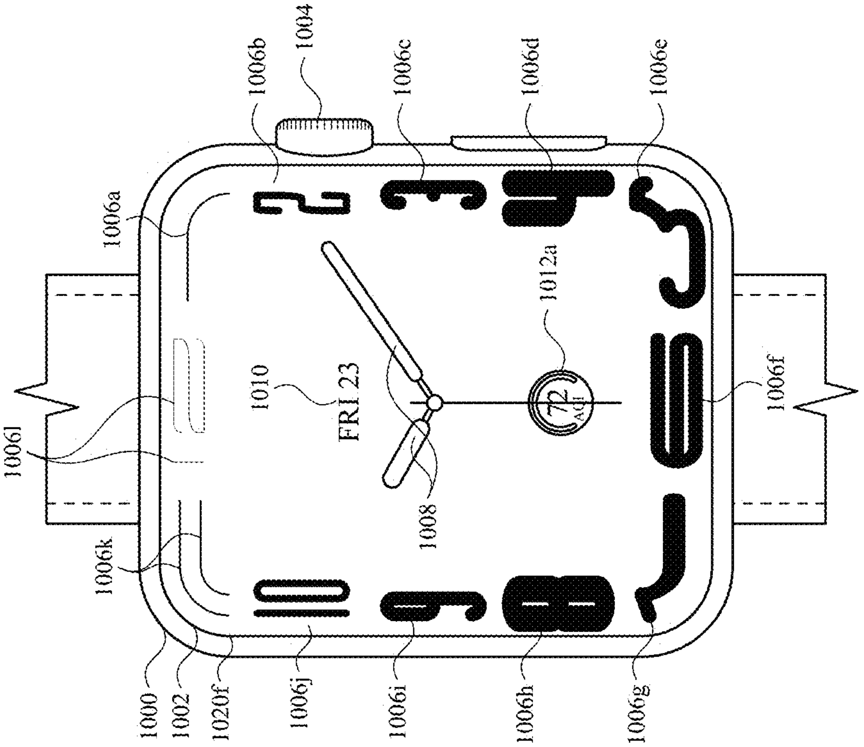
Figure 10E:
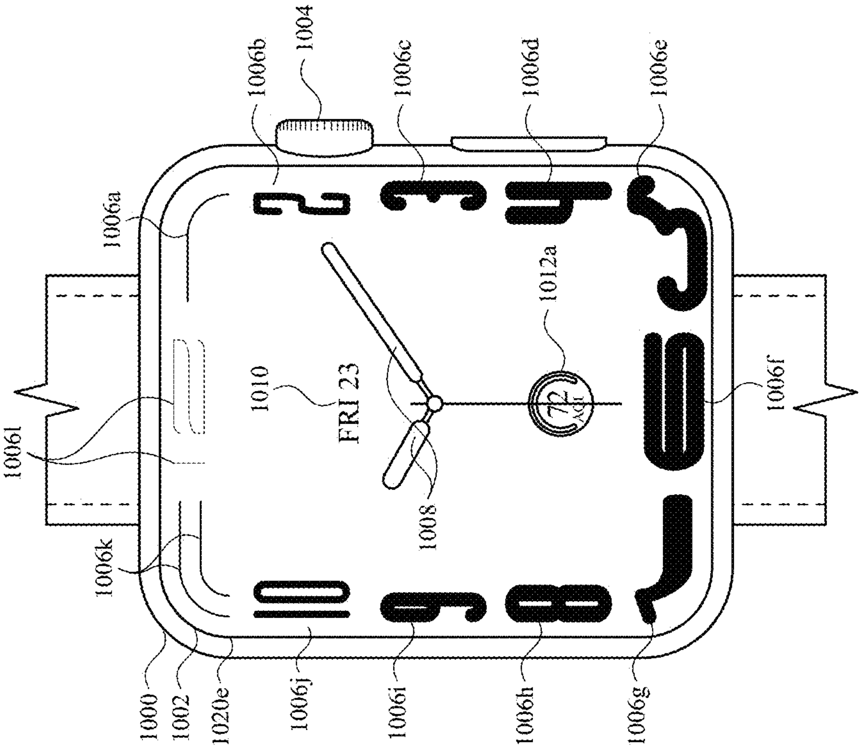
Figure 10H:
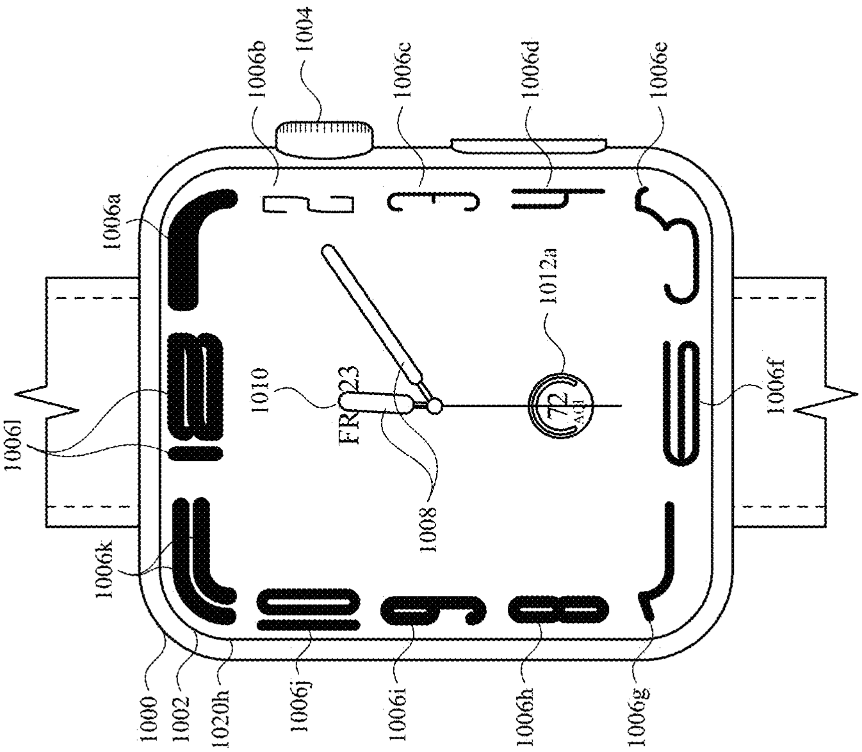
Figure 10G:
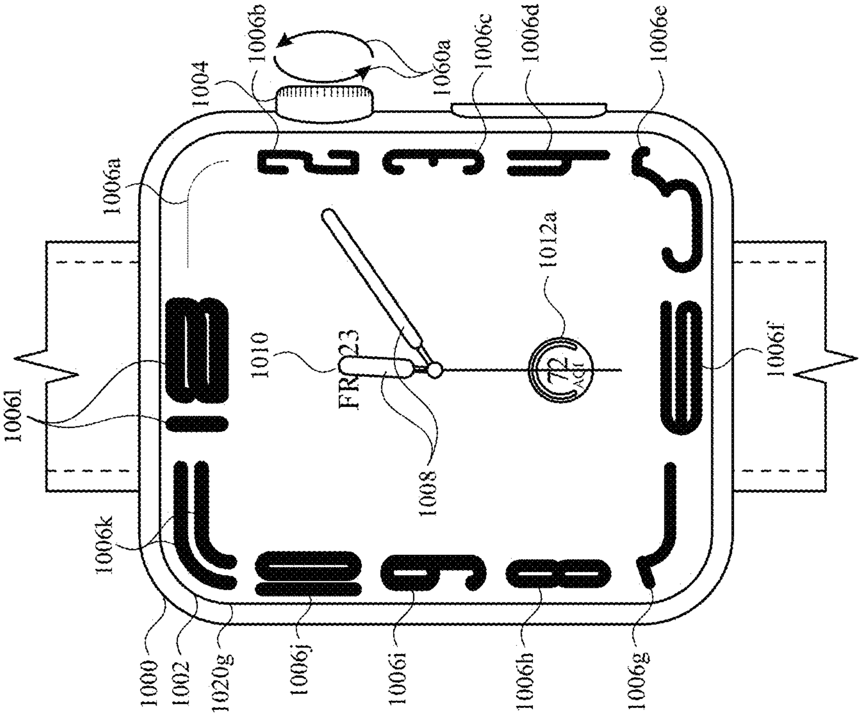
Figure 10J:
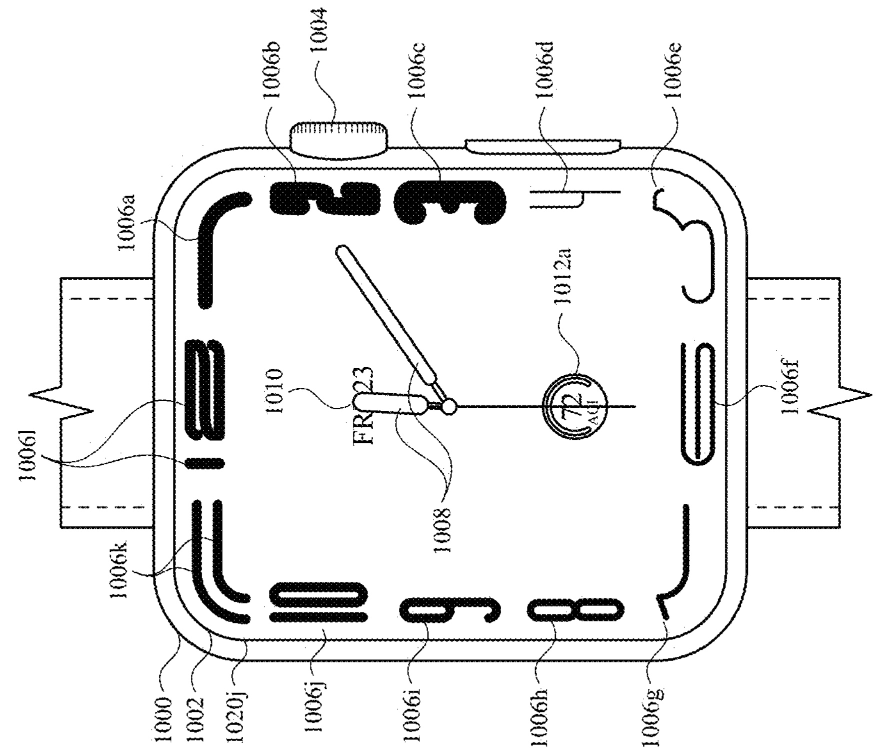
Figure 10I:
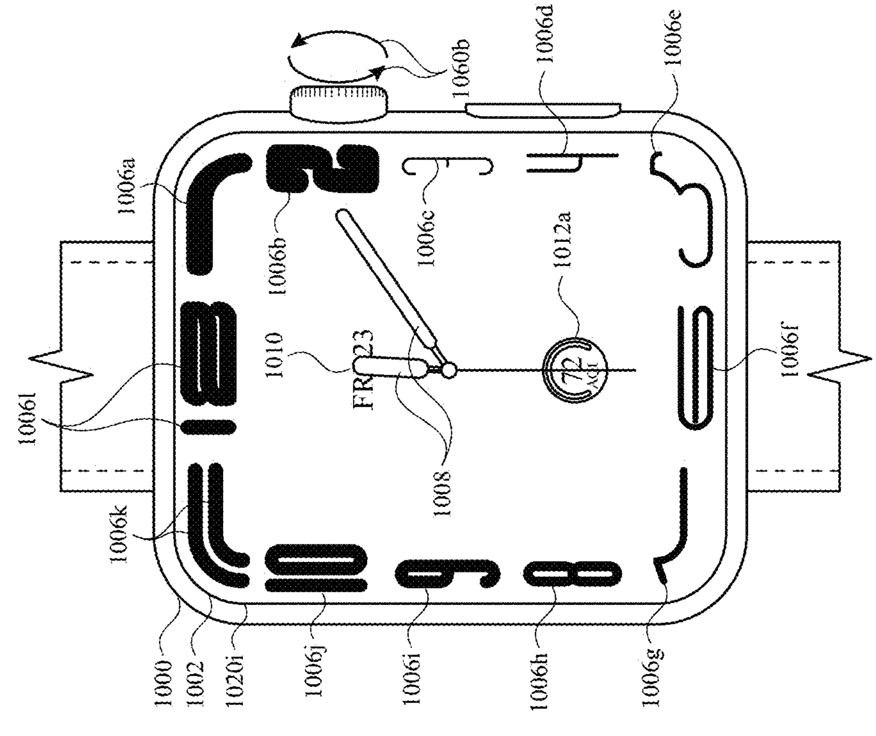
Figure 10L:
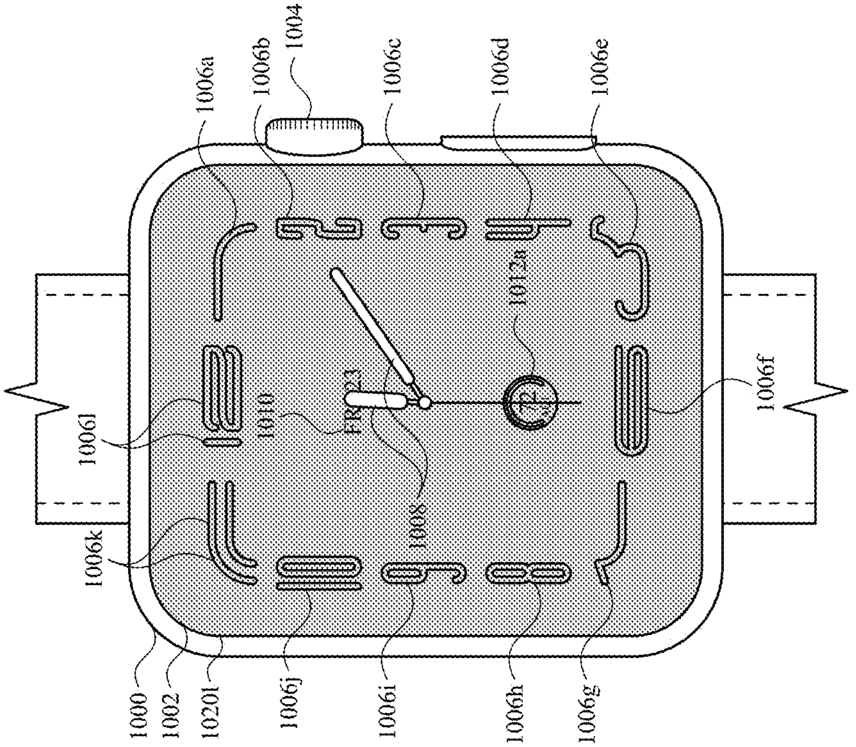
Figure 10K:
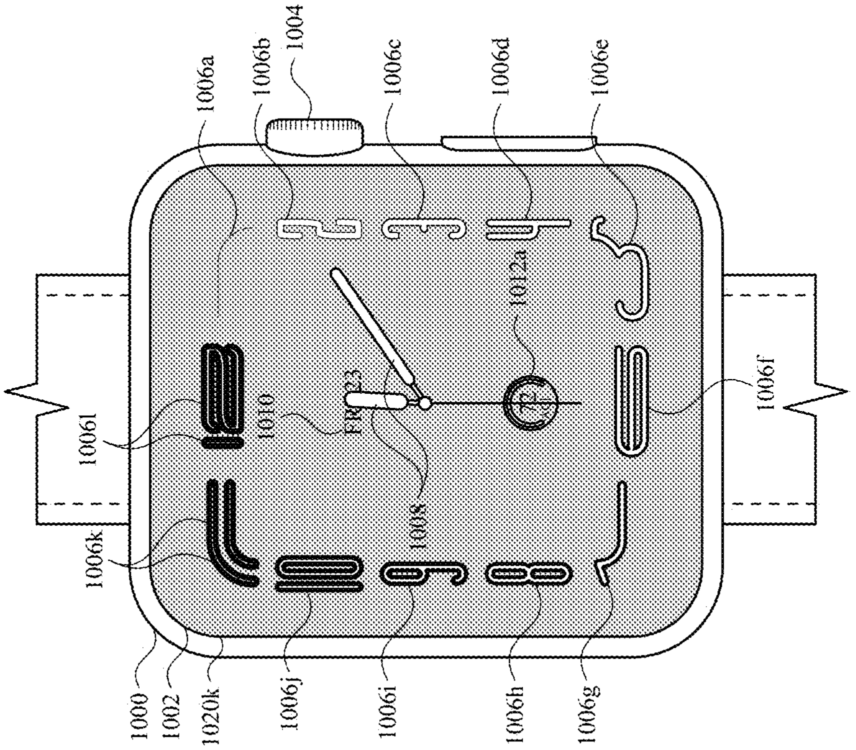
Figure 10N:
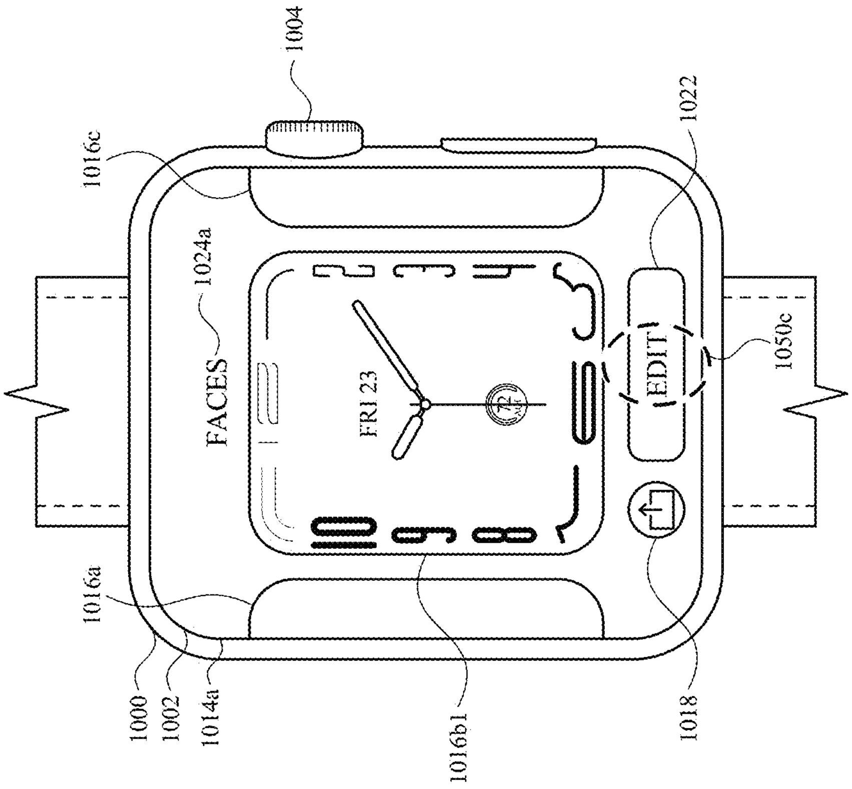
Figure 10M:
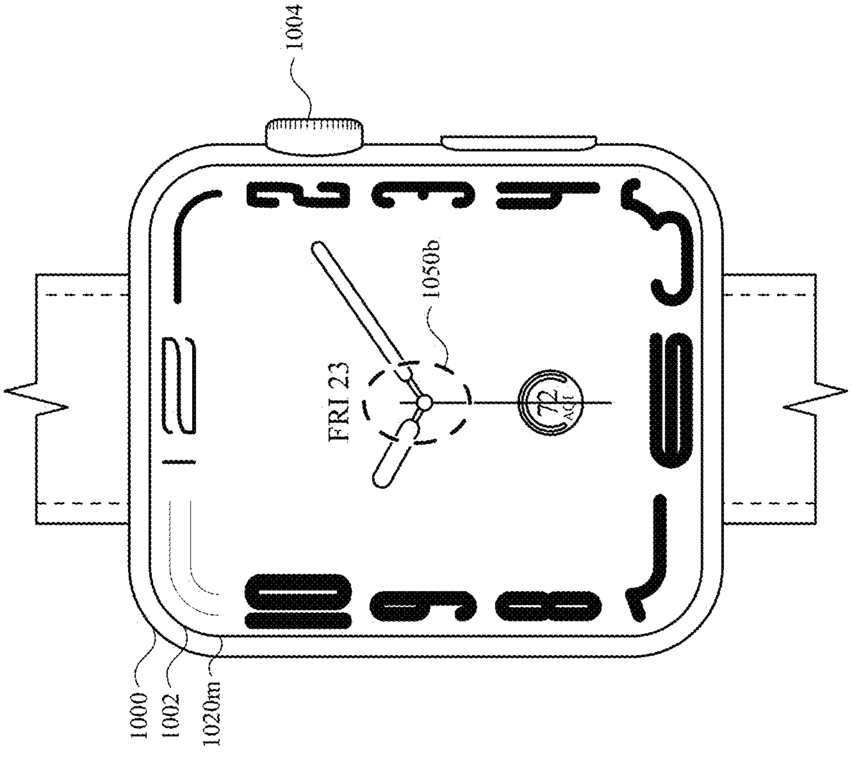
Figure 10P:
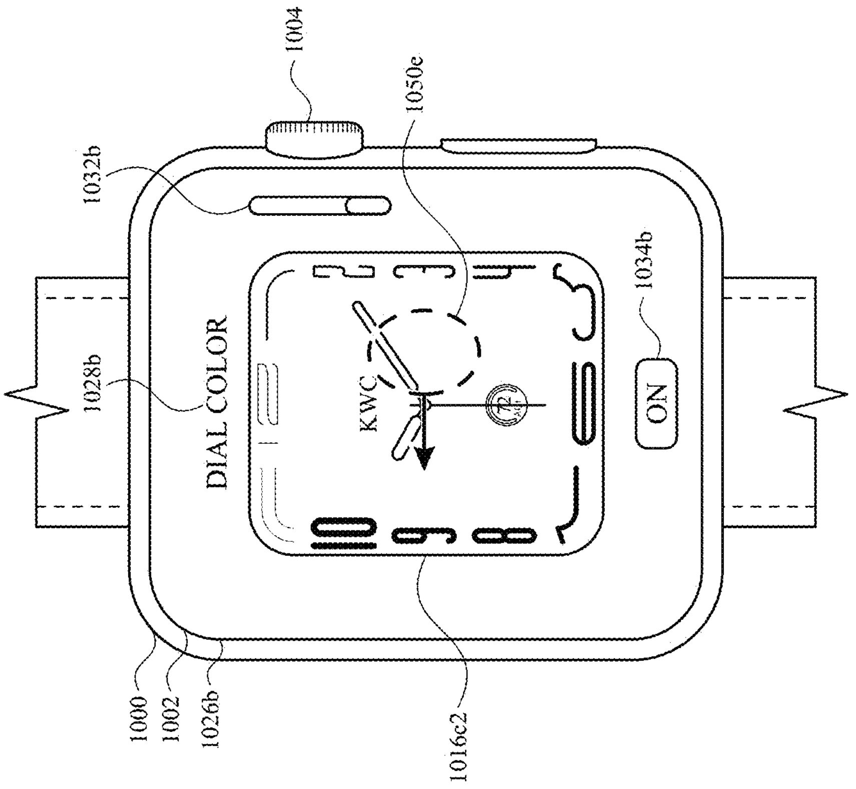
Figure 10O:
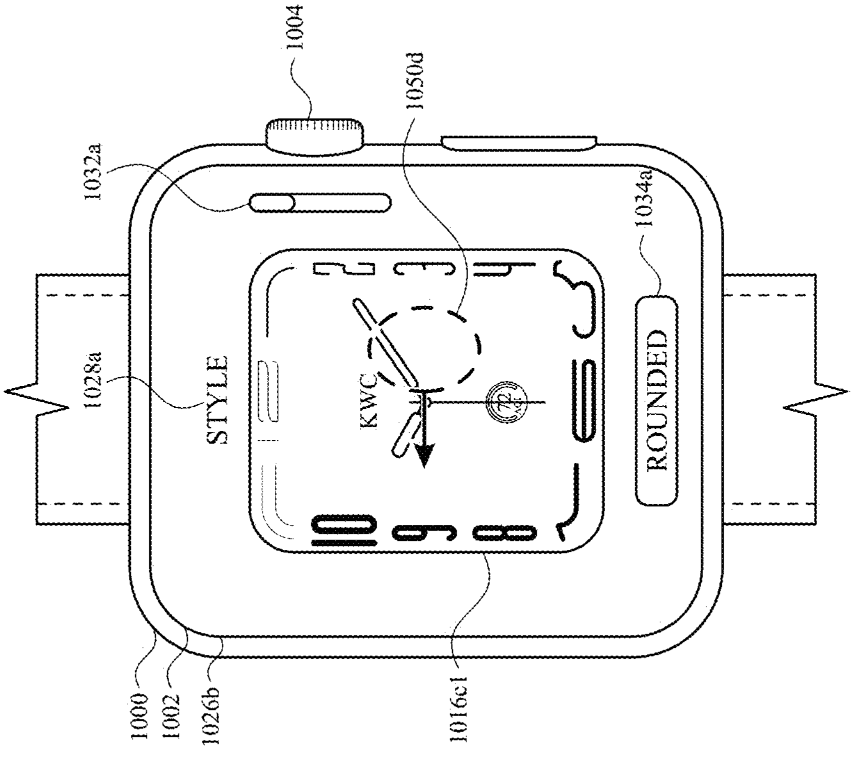
Figure 10R:
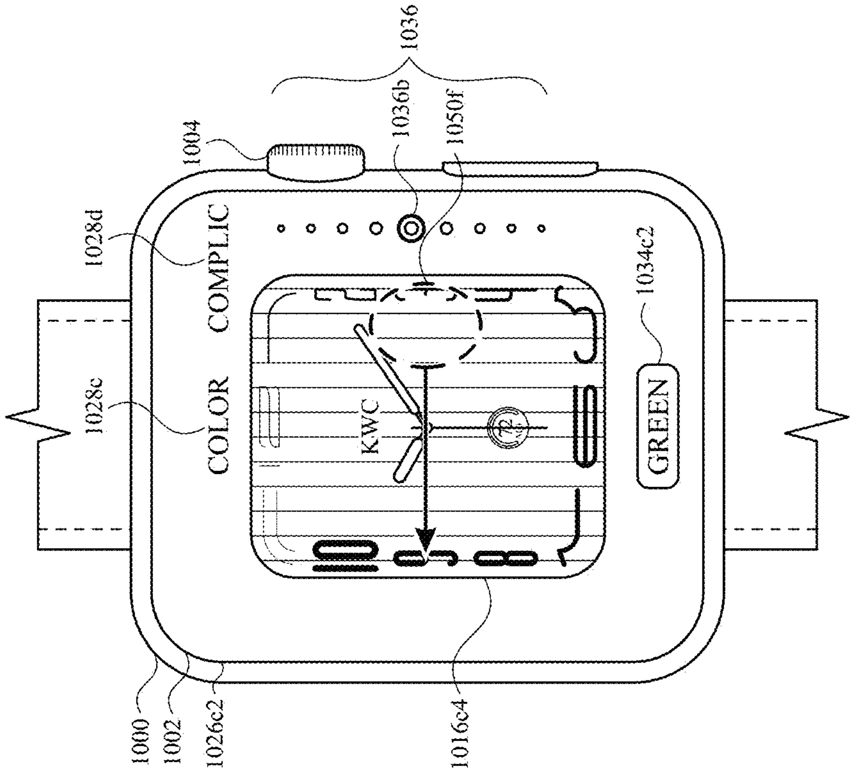
Figure 10Q:
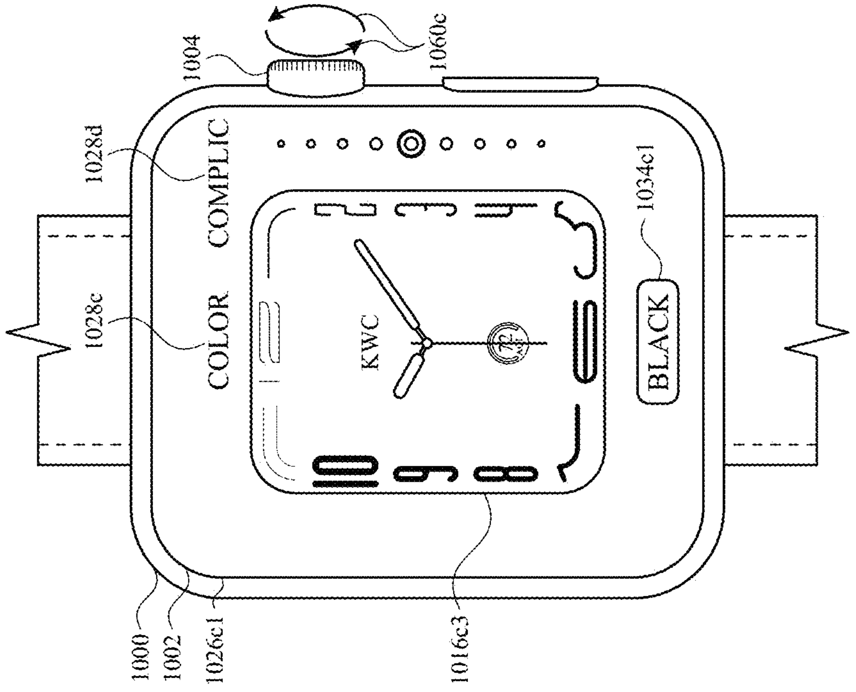
Figure 10T:
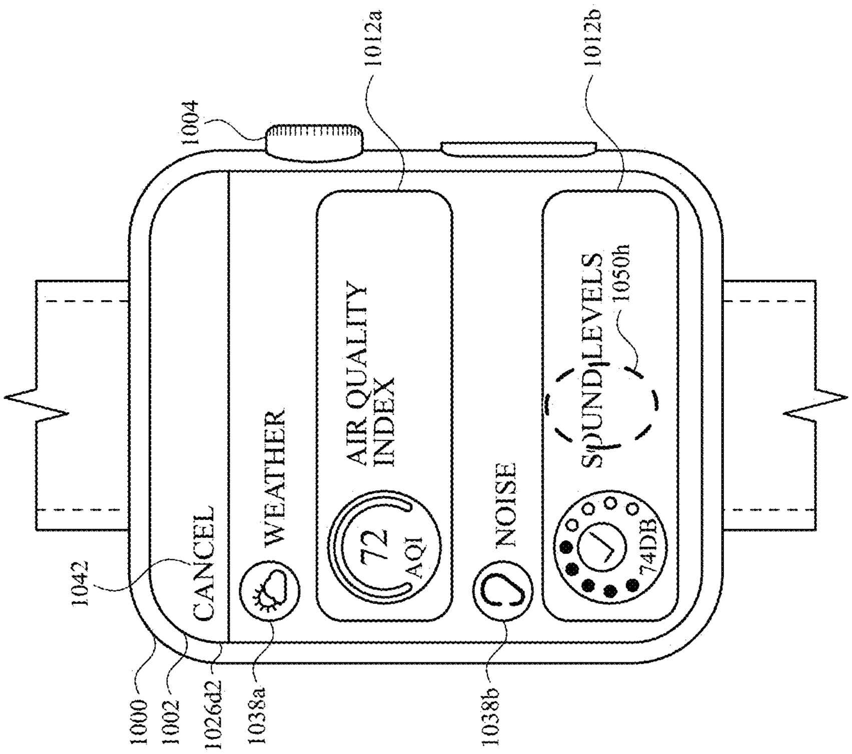
Figure 10S:
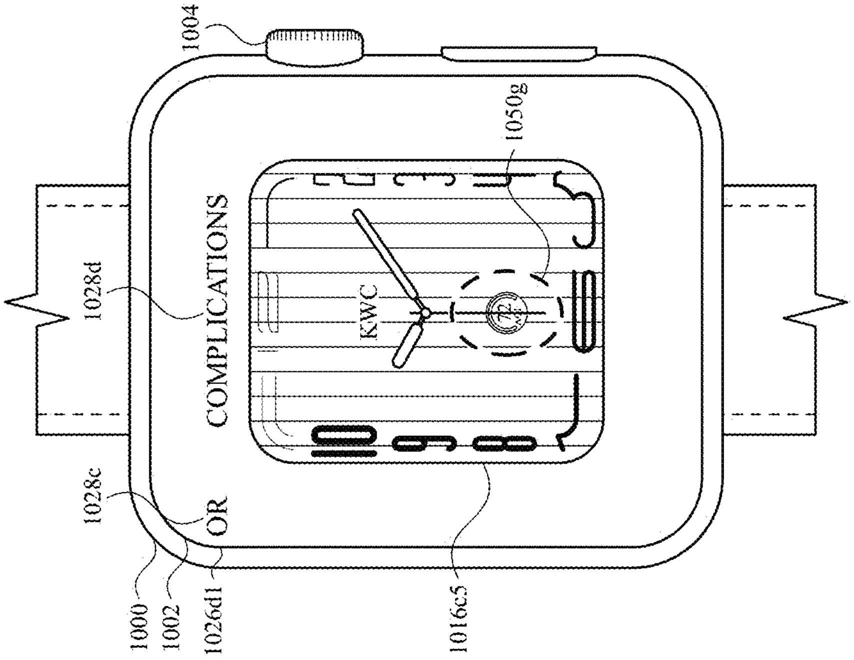
Figure 10V:
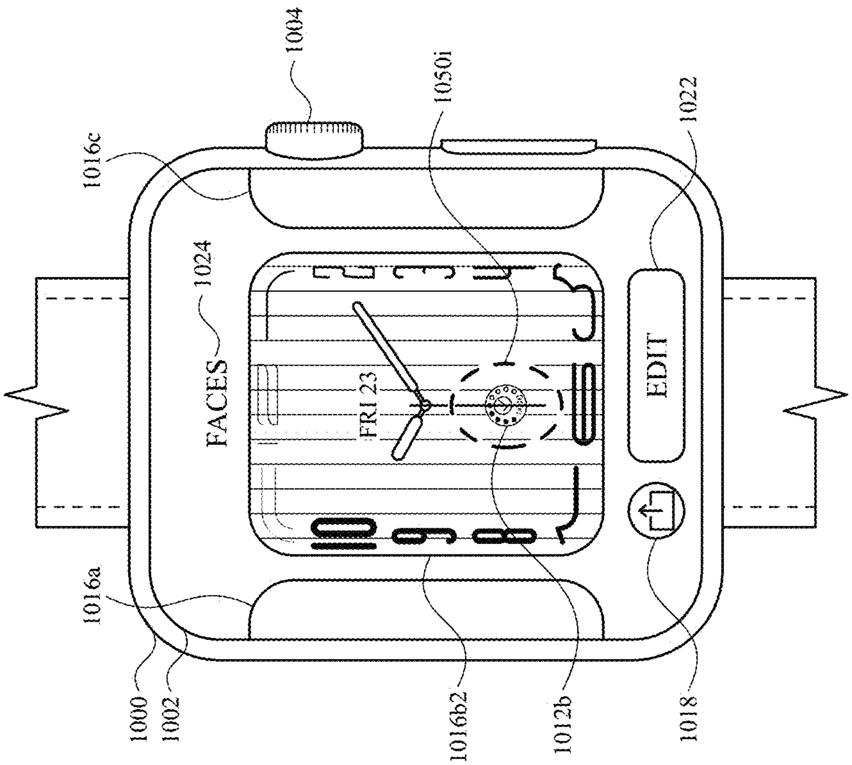
Figure 10U:
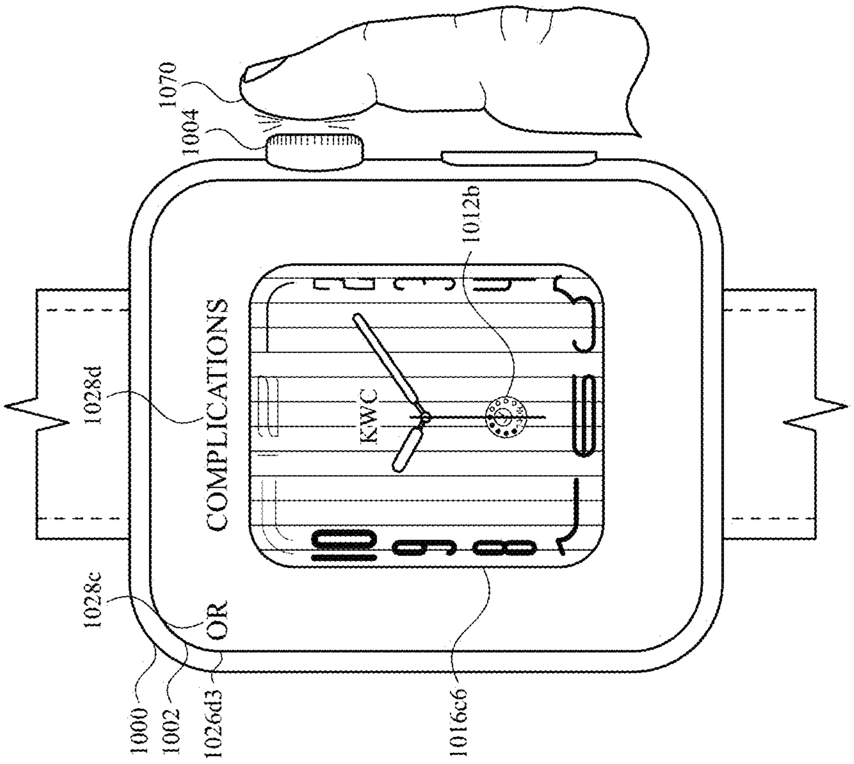
Figure 10W:
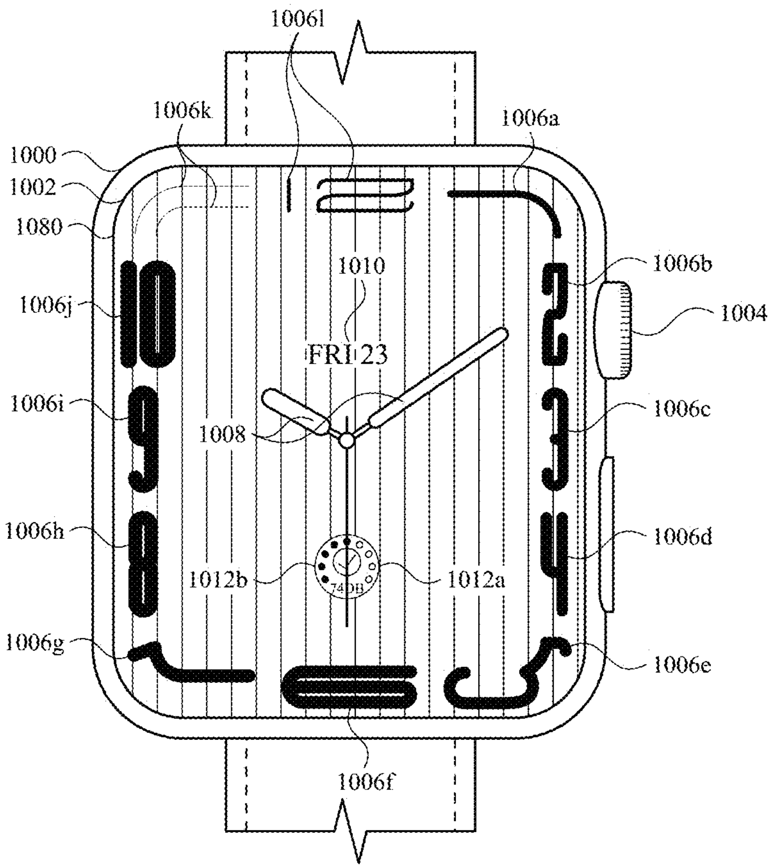

FIGS. 10A-10W illustrate exemplary user interfaces for managing clock faces based on state information of a computer system. FIG. 11 is a flow diagram illustrating methods of managing clock faces based on state information of a computer system in accordance with some embodiments. The user interfaces in FIGS. 10A-10W are used to illustrate the processes described below, including the processes in FIG. 11.

Figure 12A:
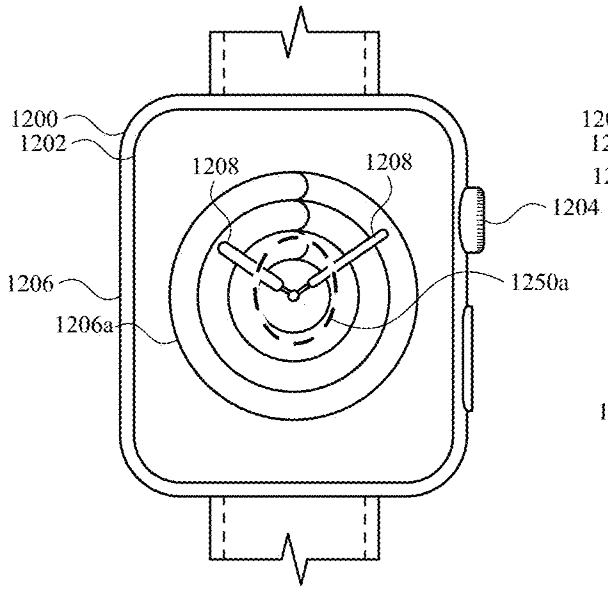
FIGS. 12A-12W illustrate exemplary user interfaces related to the management of time.
Figure 12B:
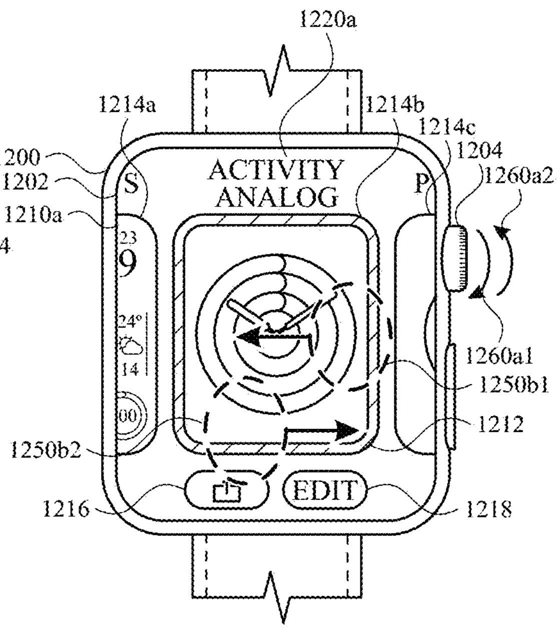
Figure 12C:
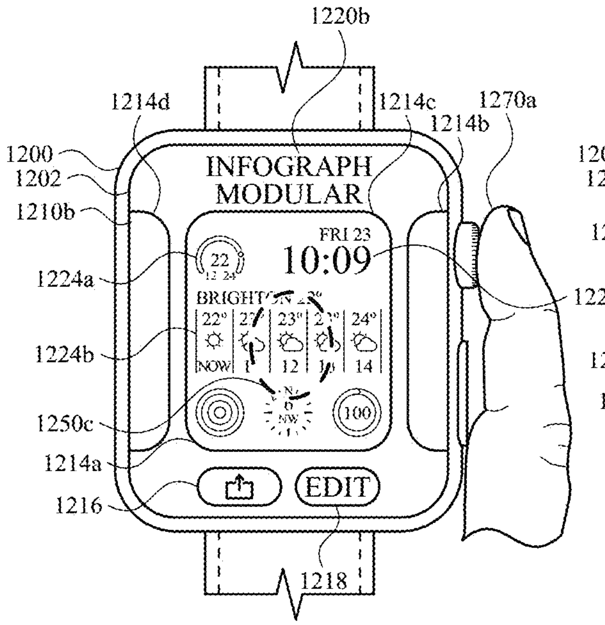
Figure 12D:
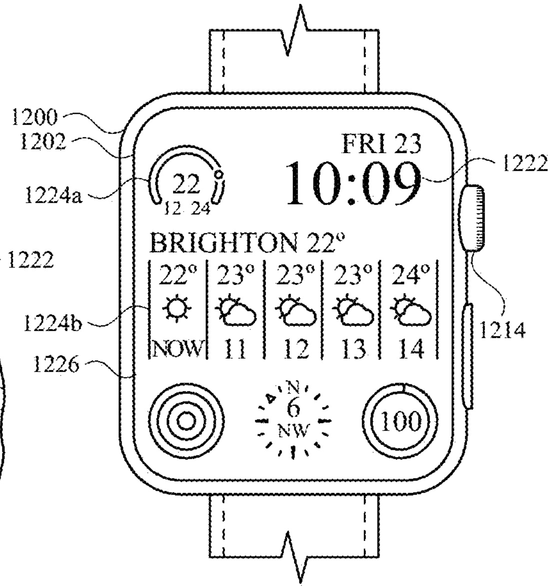
Figure 12E:
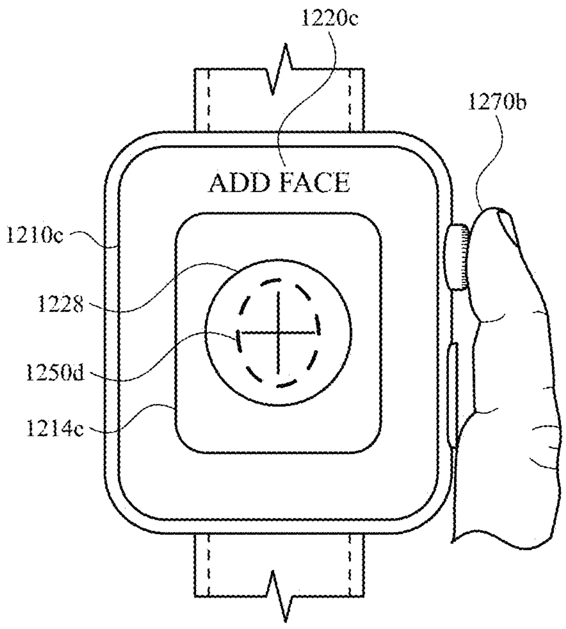
Figure 12F:
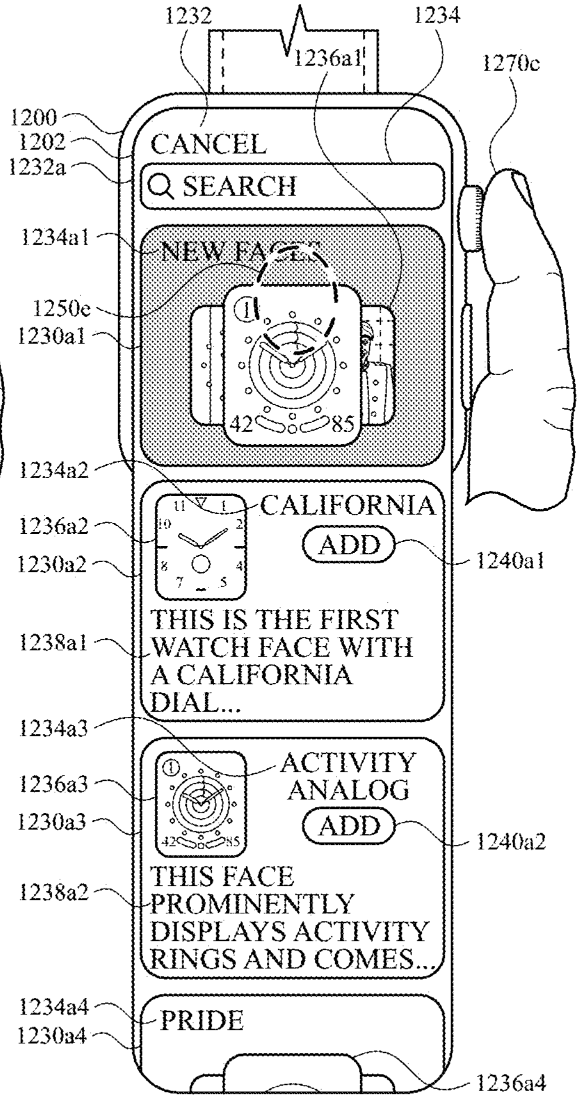
Figure 12G:
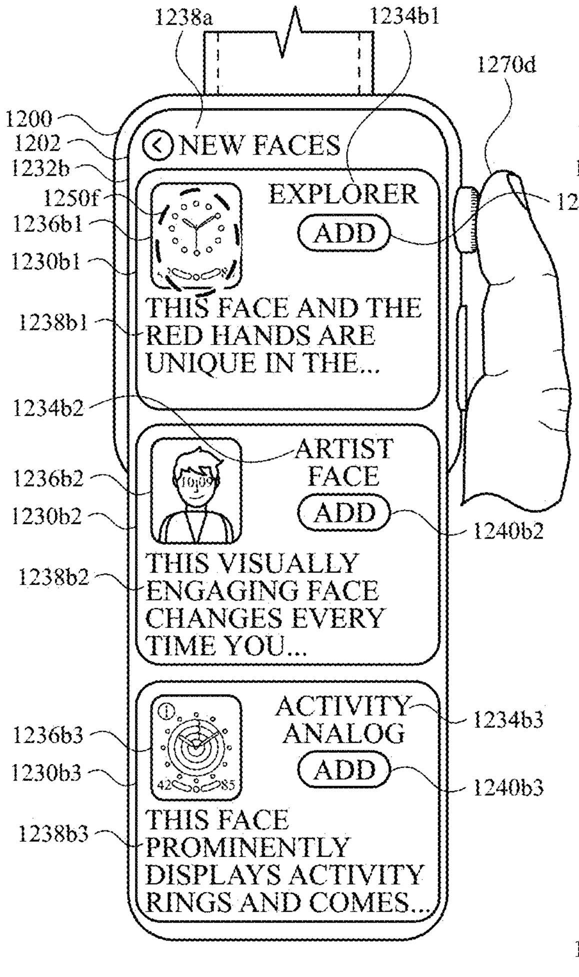
Figure 12H:
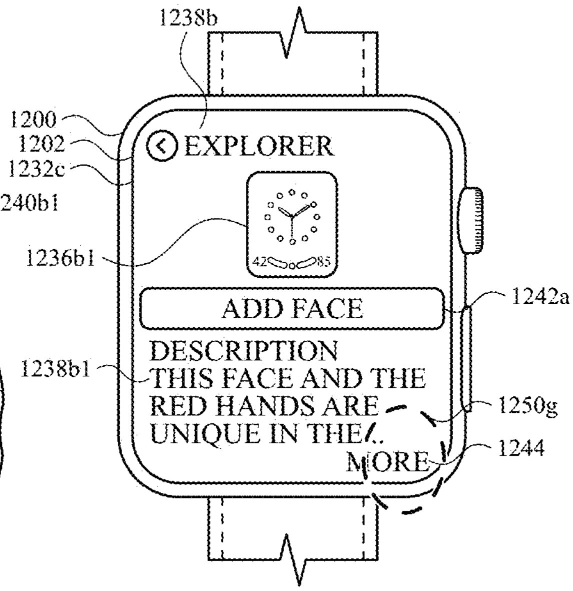
Figure 12I:
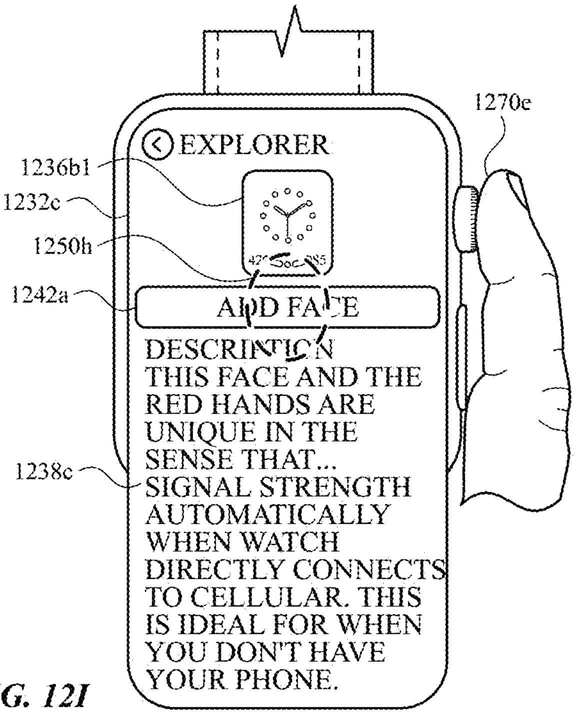
Figure 12J:
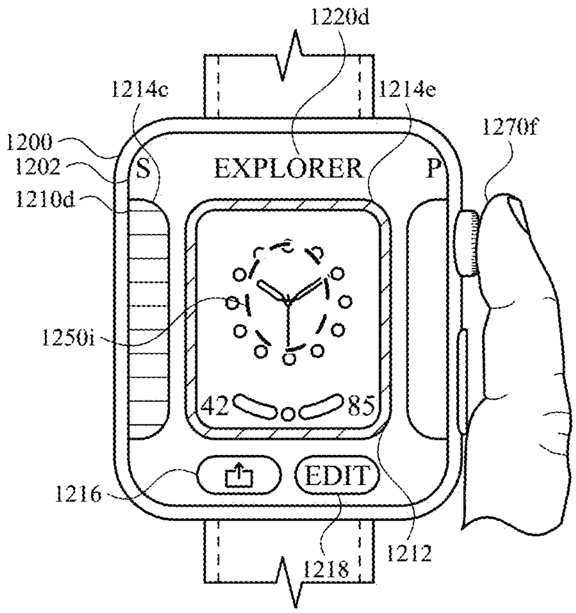
Figure 12K:
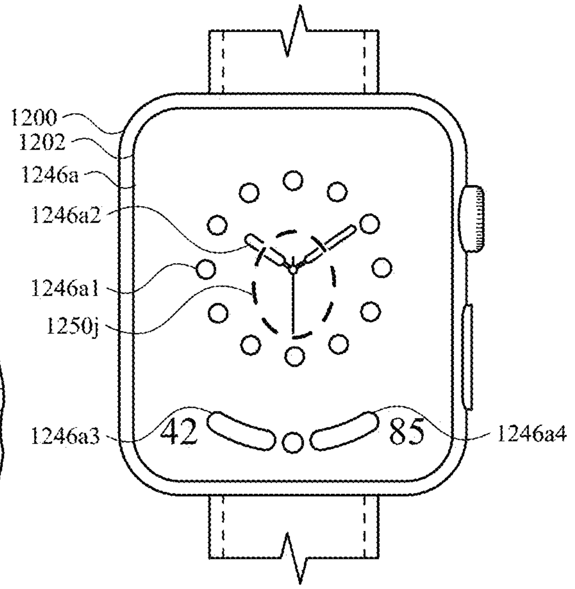
Figure 12L:
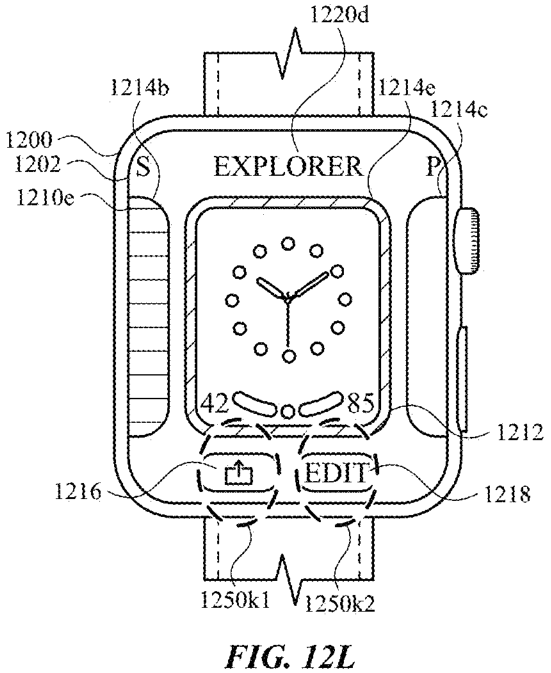
Figure 12M:
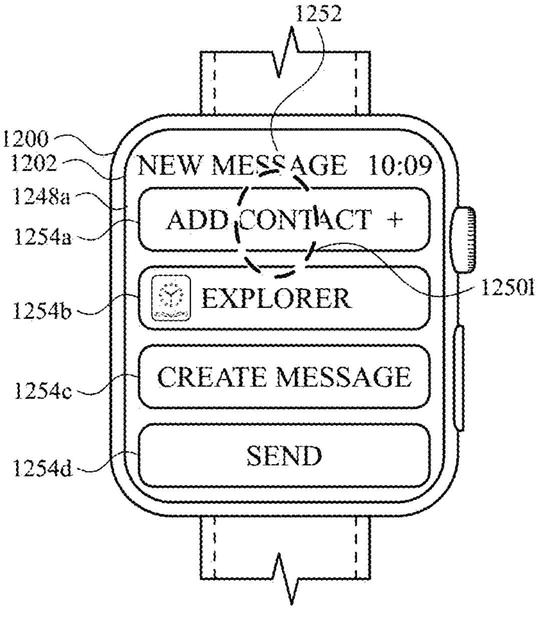
Figure 12N:
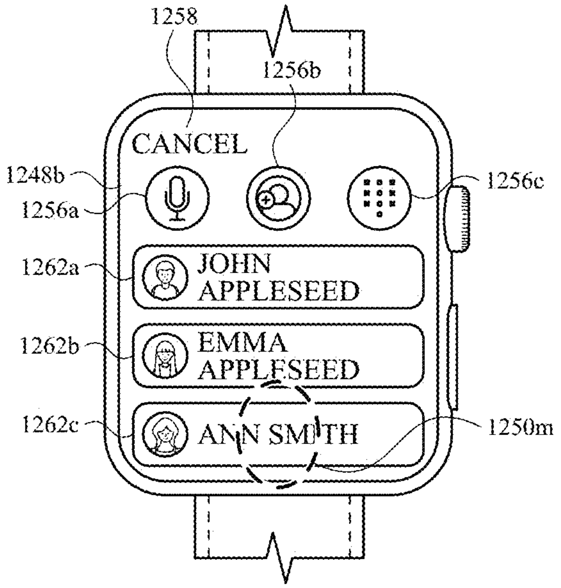
Figure 12O:
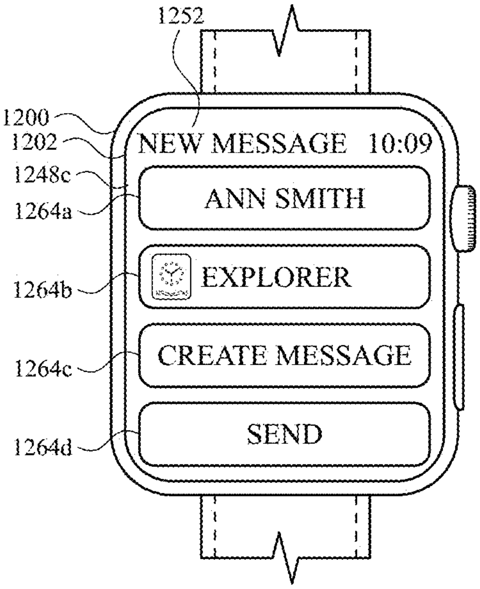
Figure 12P:
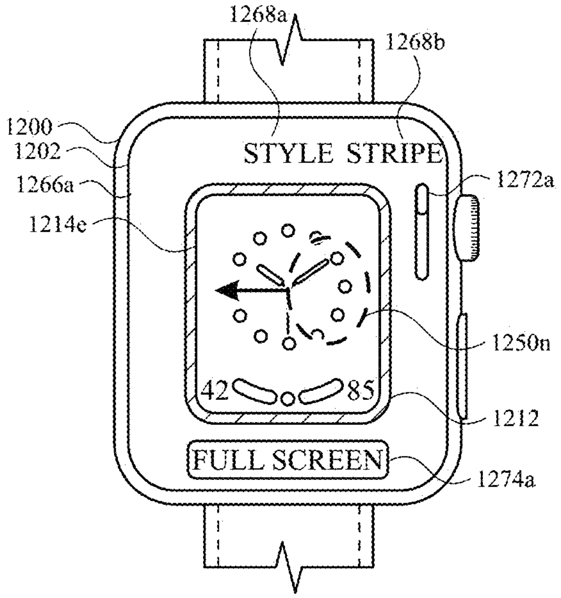
Figure 12Q:
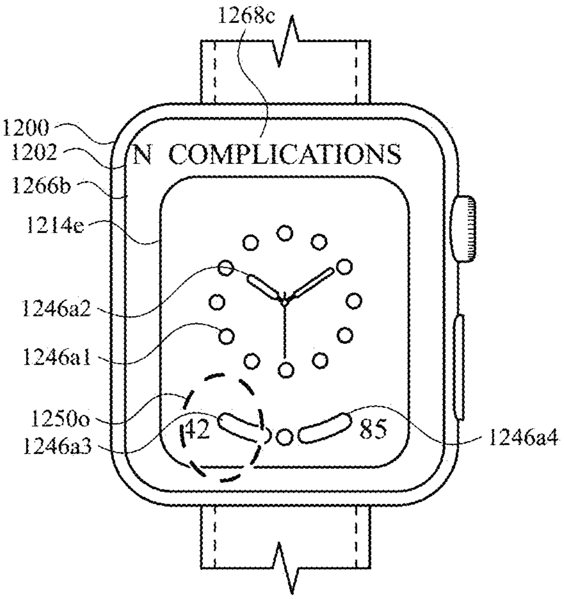
Figure 12R:
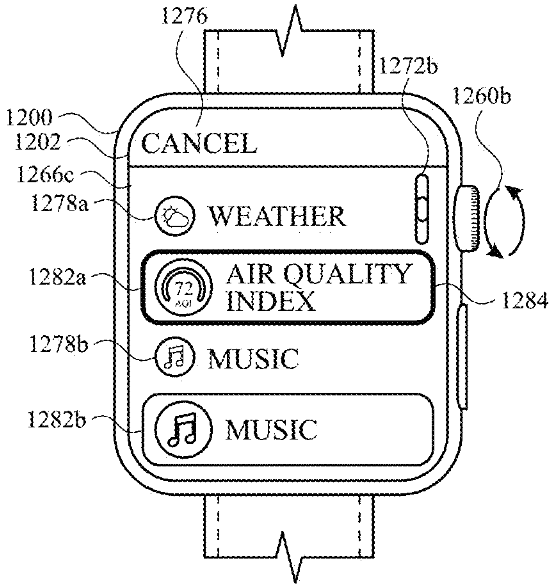
Figure 12S:
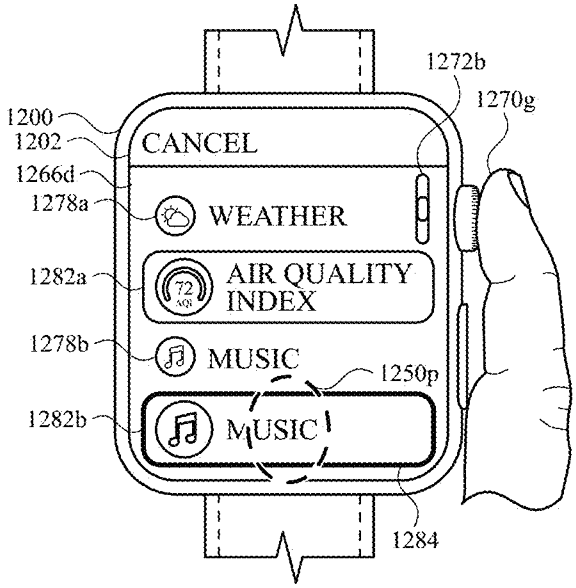
Figure 12T:
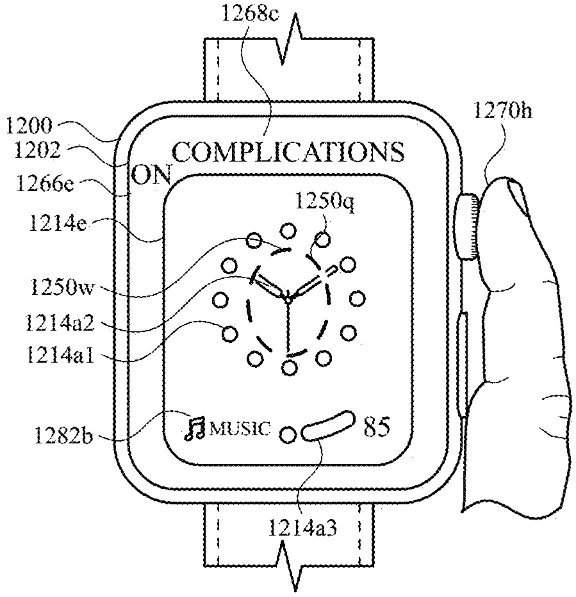
Figure 12U:
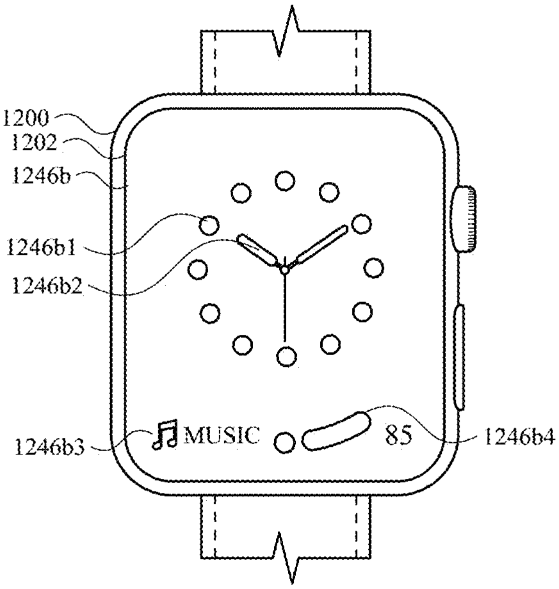
Figure 12V:
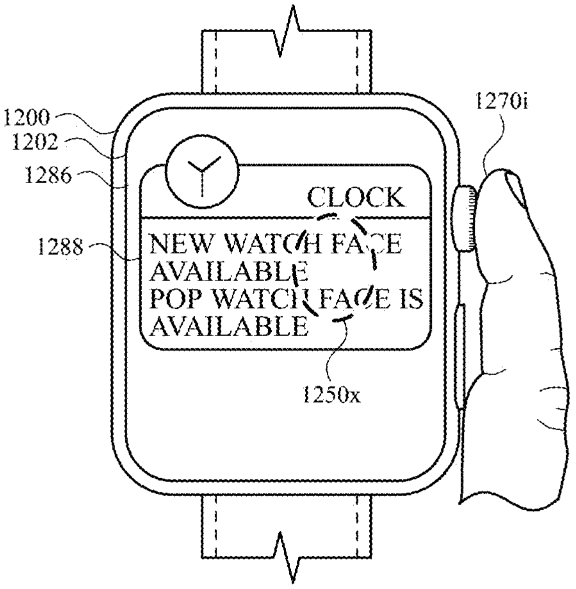
Figure 12W:
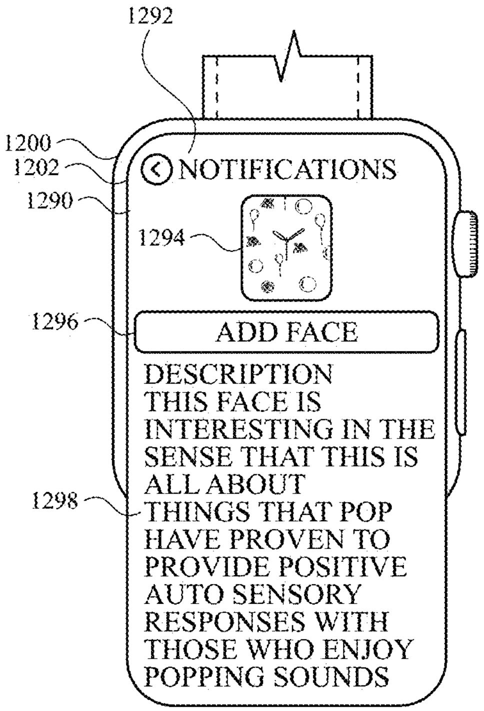

FIGS. 12A-12W illustrate exemplary user interfaces related to the management of time. FIG. 13 is a flow diagram illustrating methods related to user interfaces for managing time. The user interfaces in FIGS. 12A-12W are used to illustrate the processes described below, including the processes in FIG. 13.

Figure 14A:
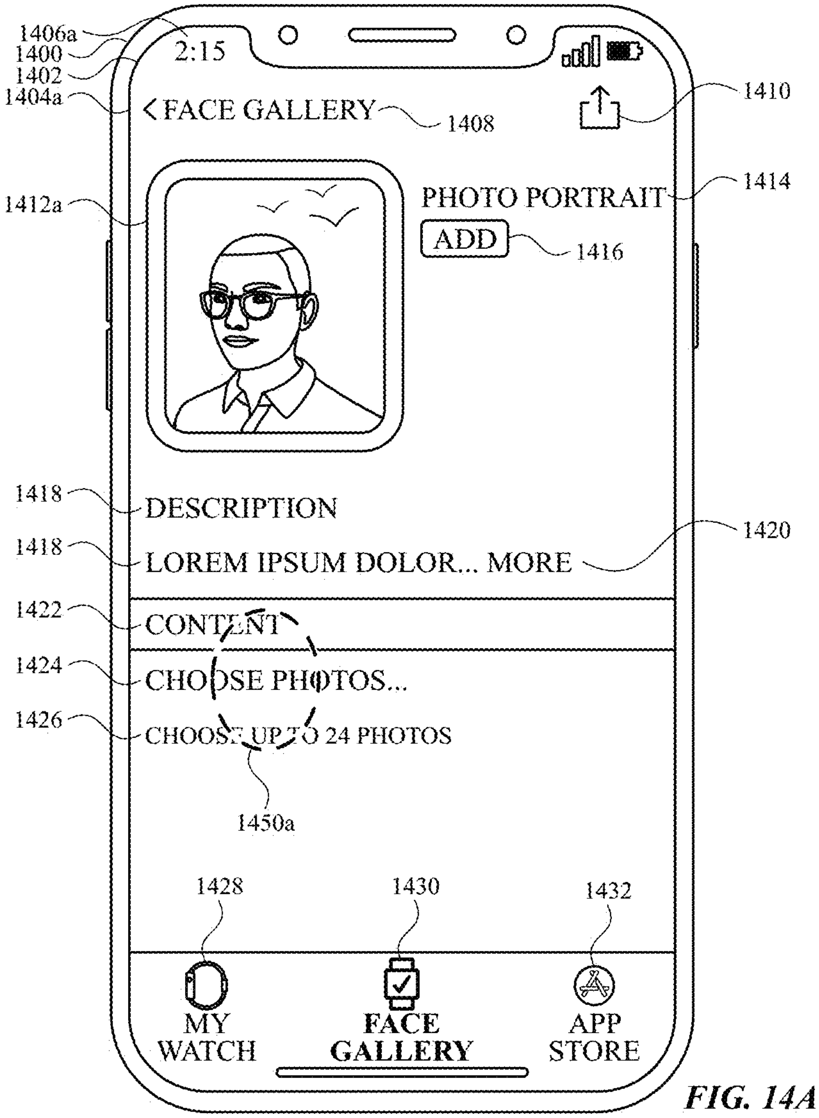
FIGS. 14A-14R illustrate exemplary user interfaces for editing user interfaces based on depth data of a previously captured media item.
Figure 14B:
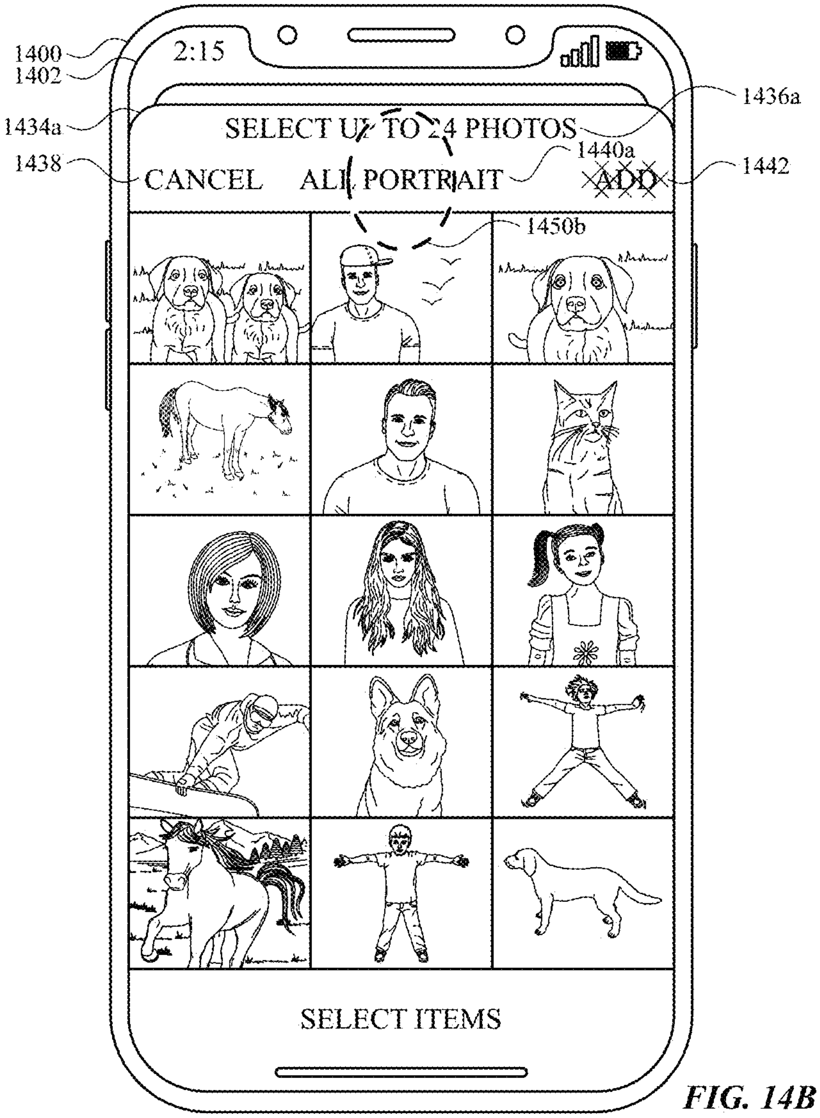
Figure 14C:
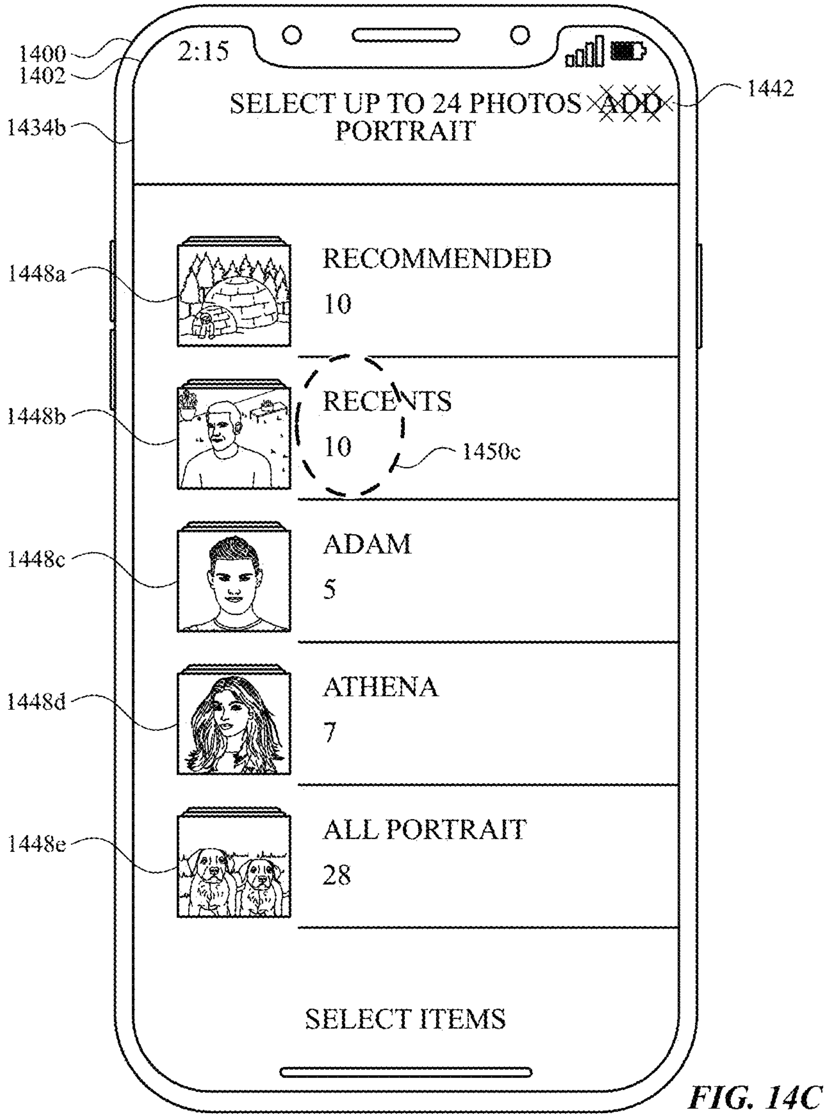
Figure 14D:
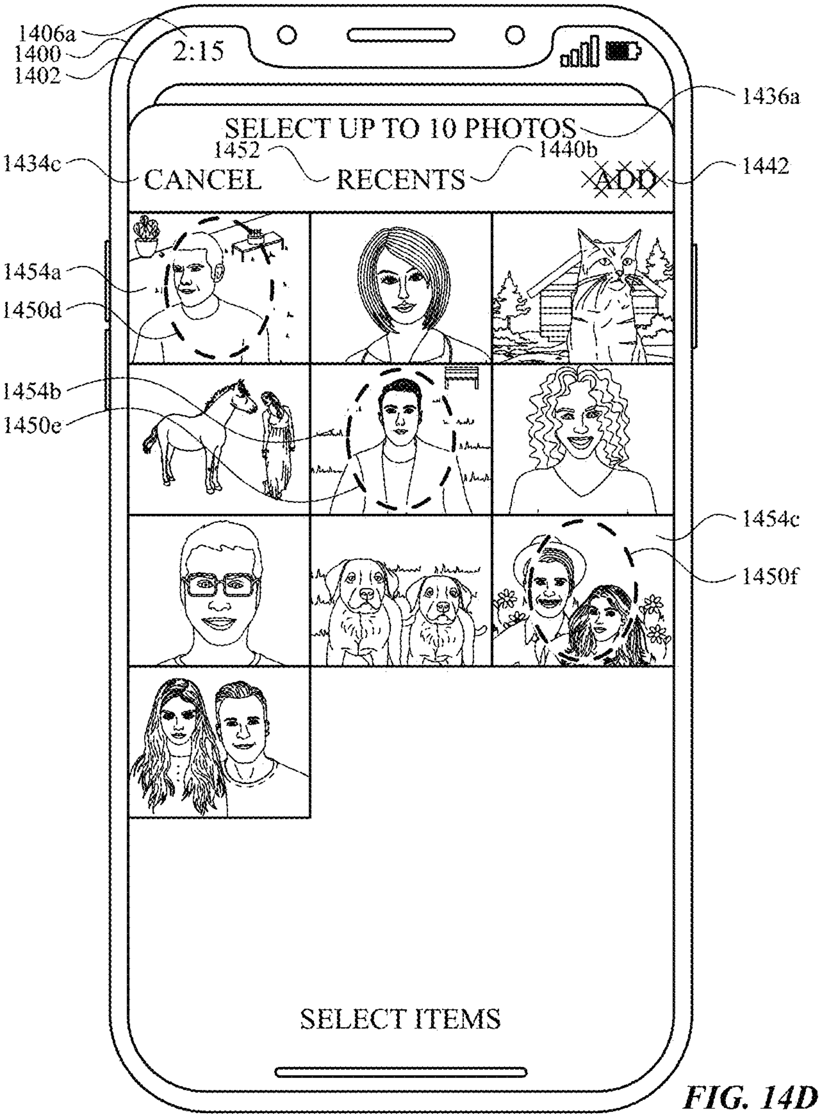
Figure 14E:
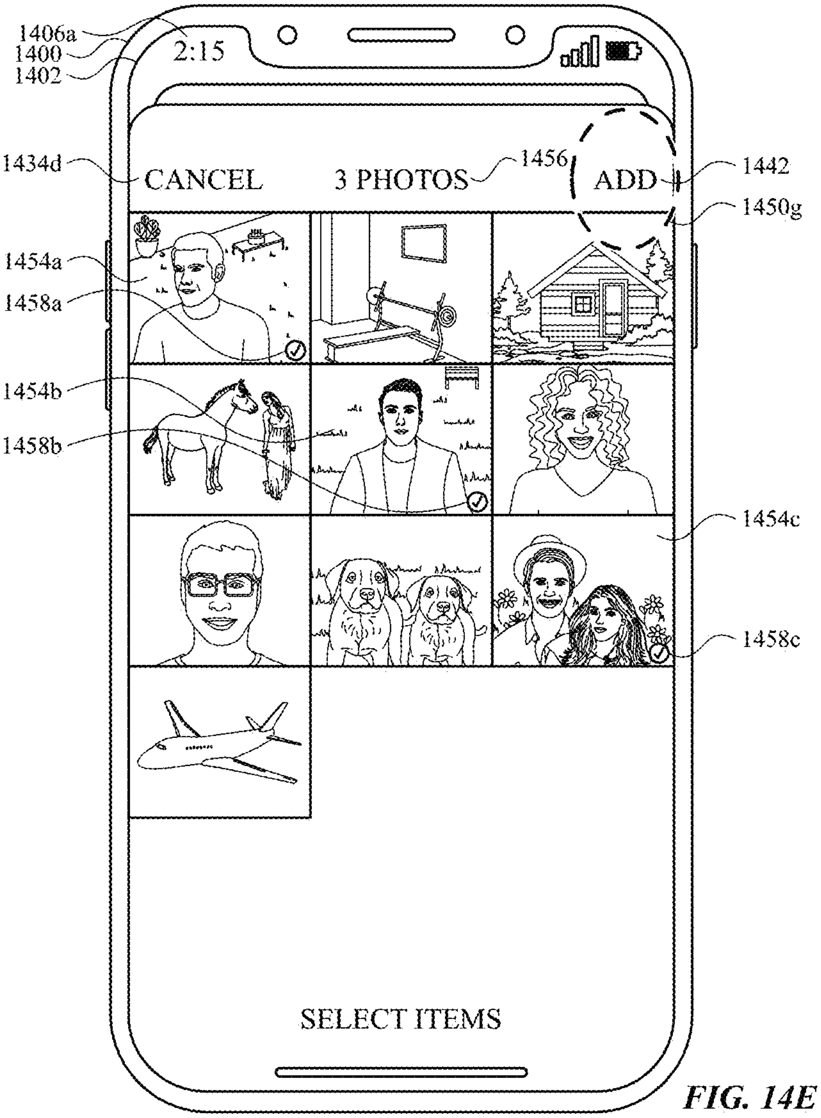
Figure 14F:
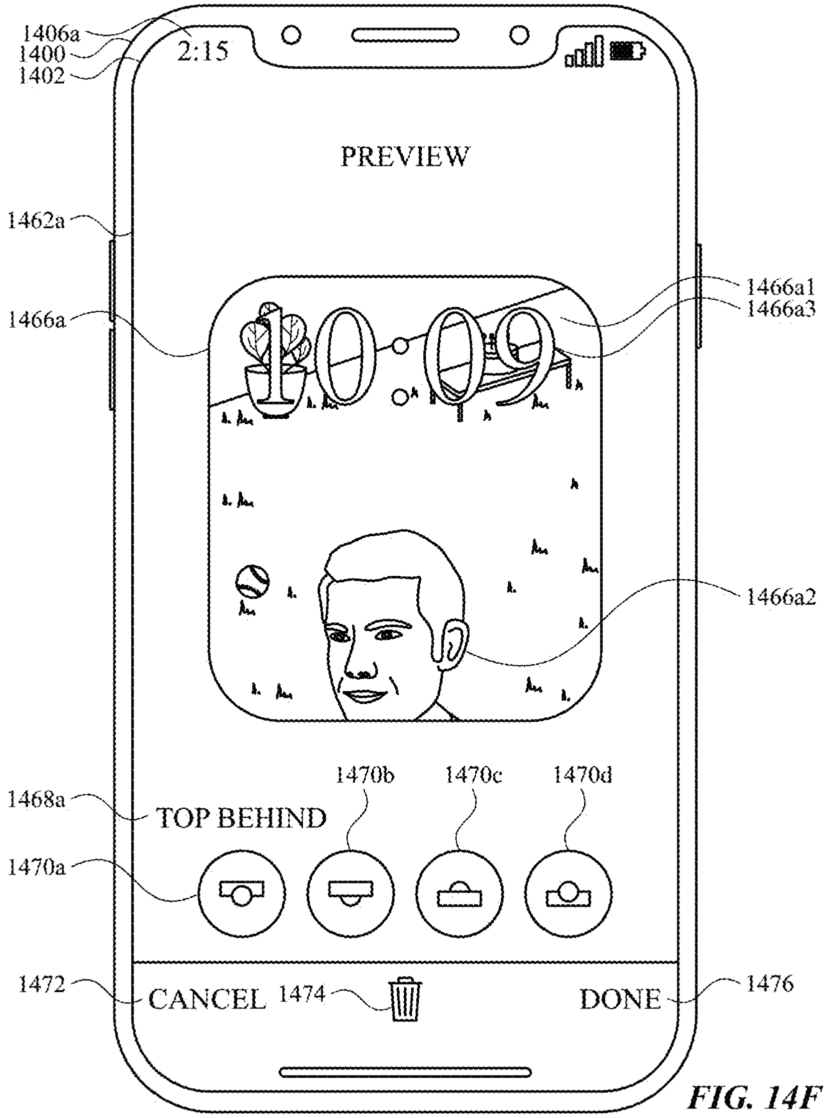
Figure 14G:
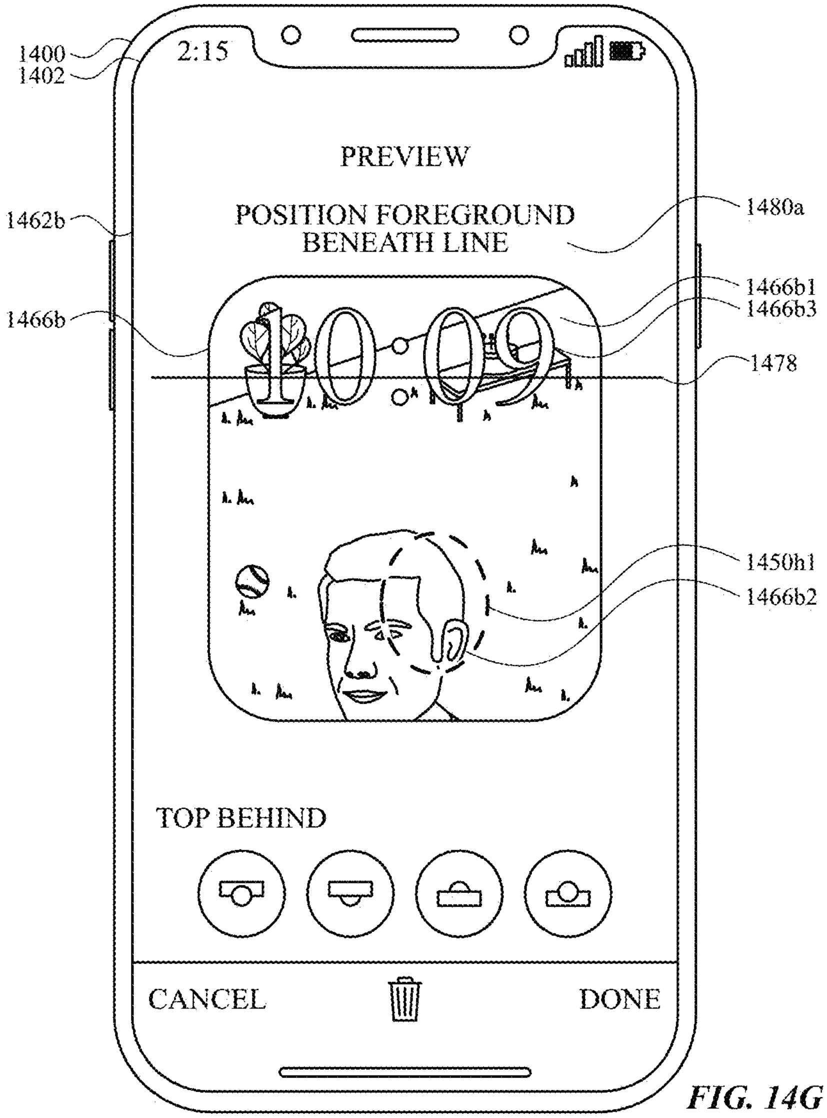
Figure 14H:
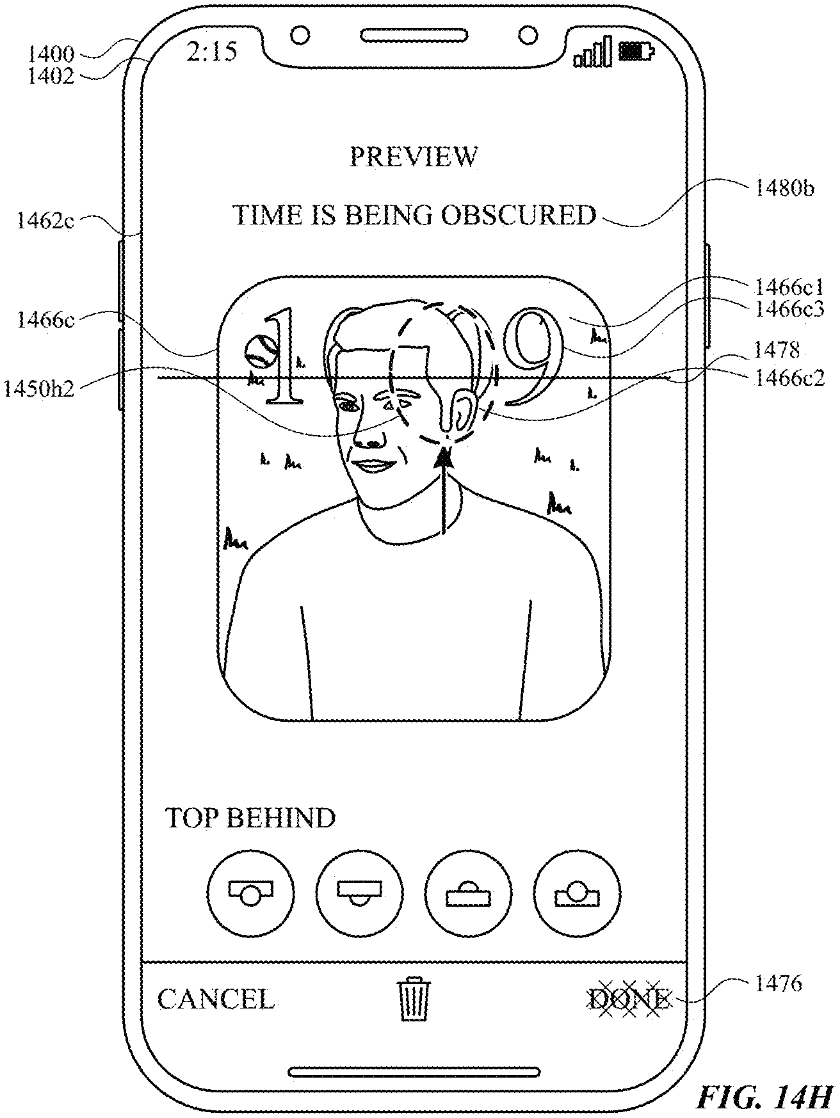
Figure 14I:
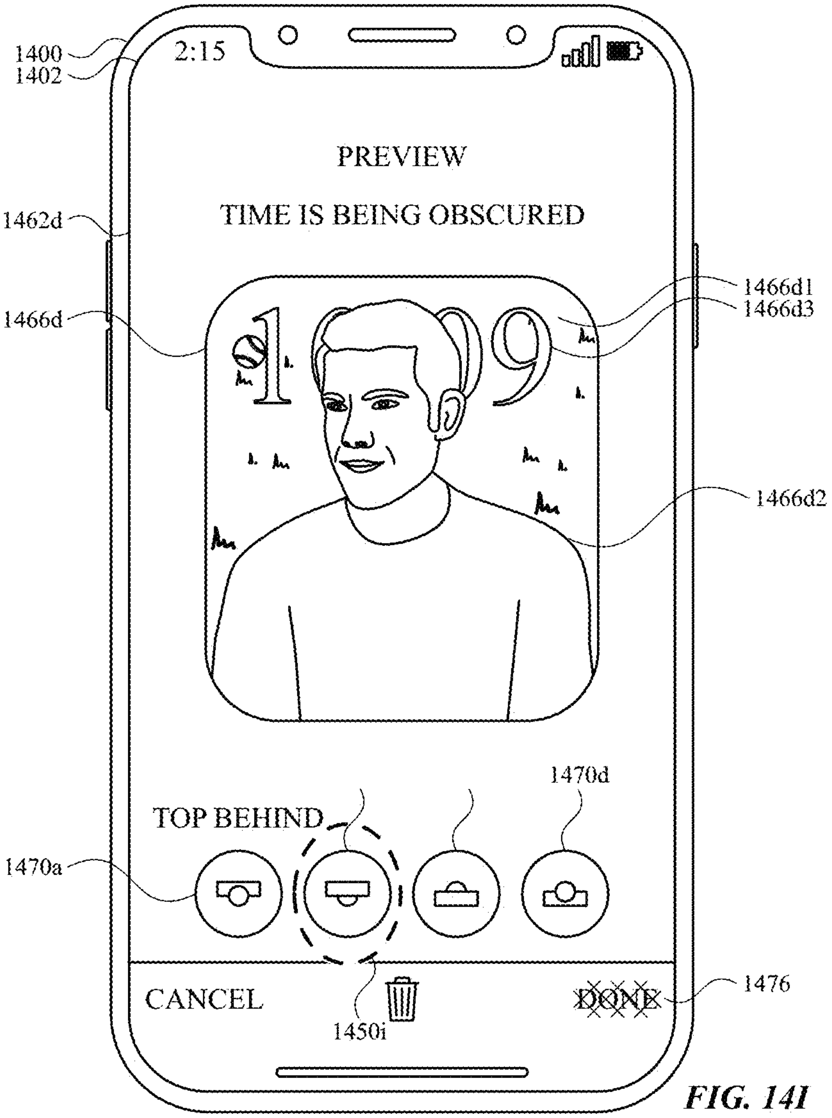
Figure 14J:
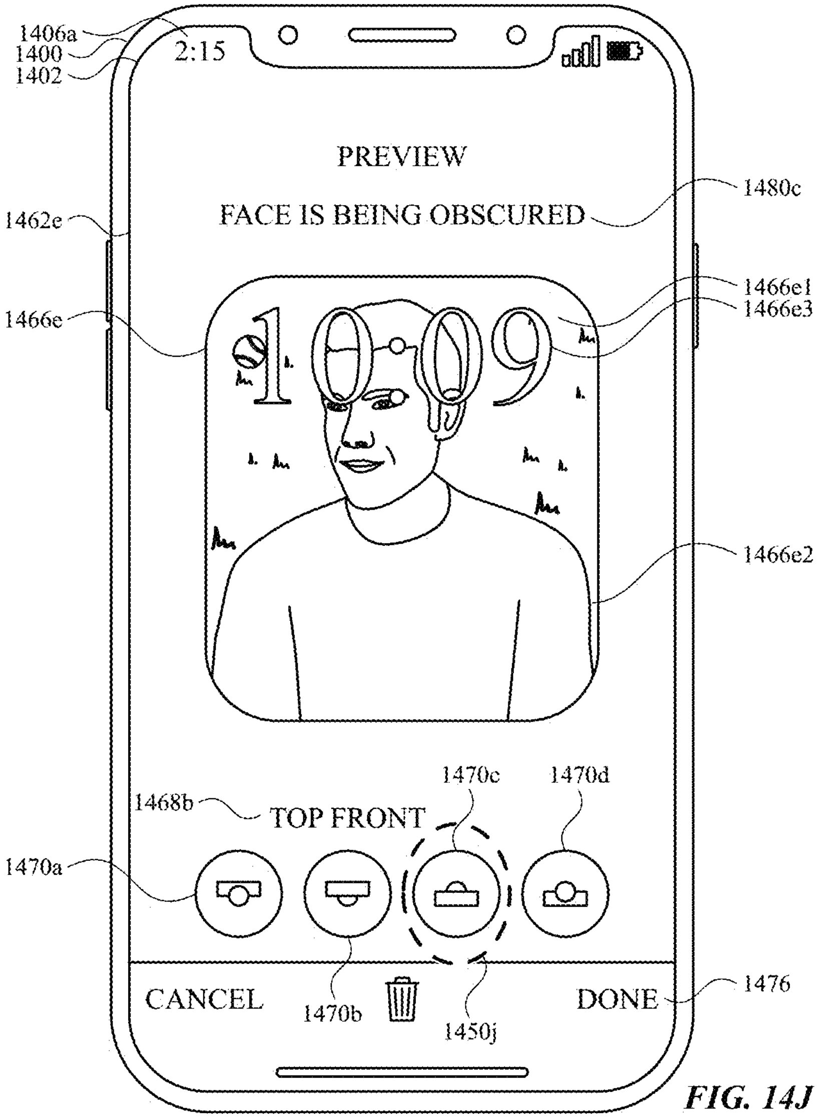
Figure 14K:
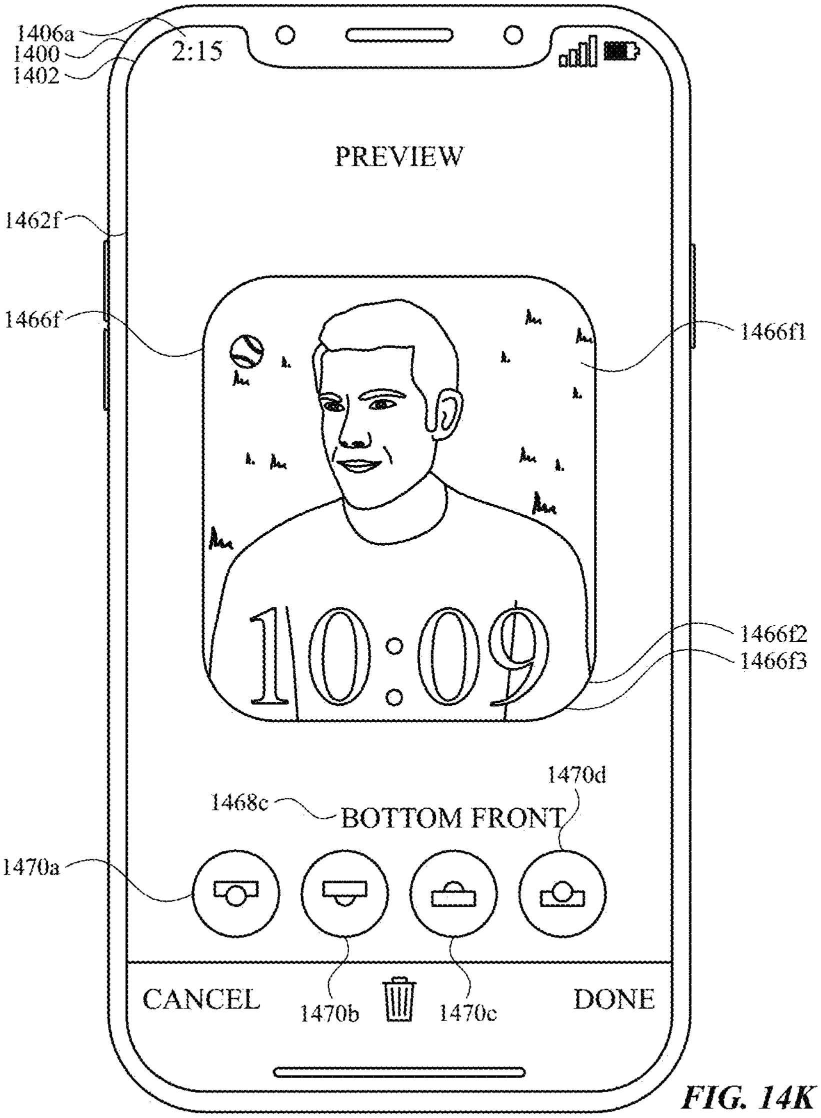
Figure 14L:
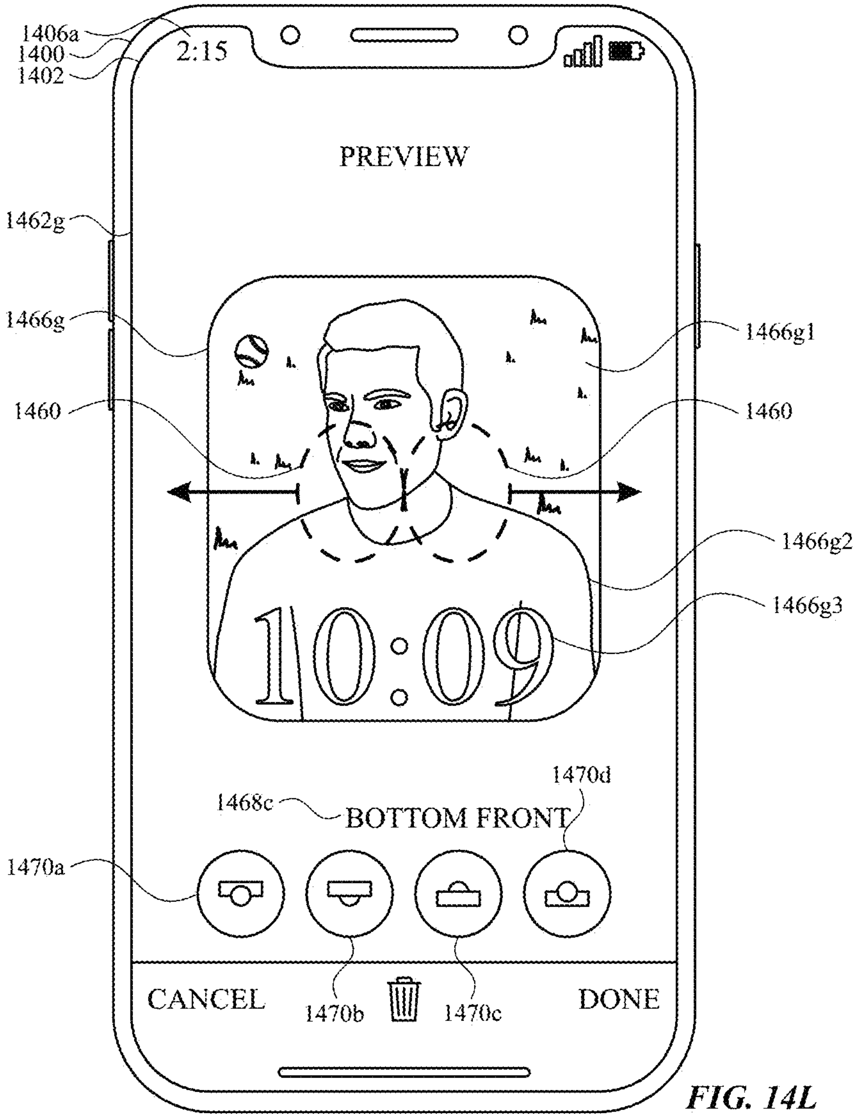
Figure 14M:
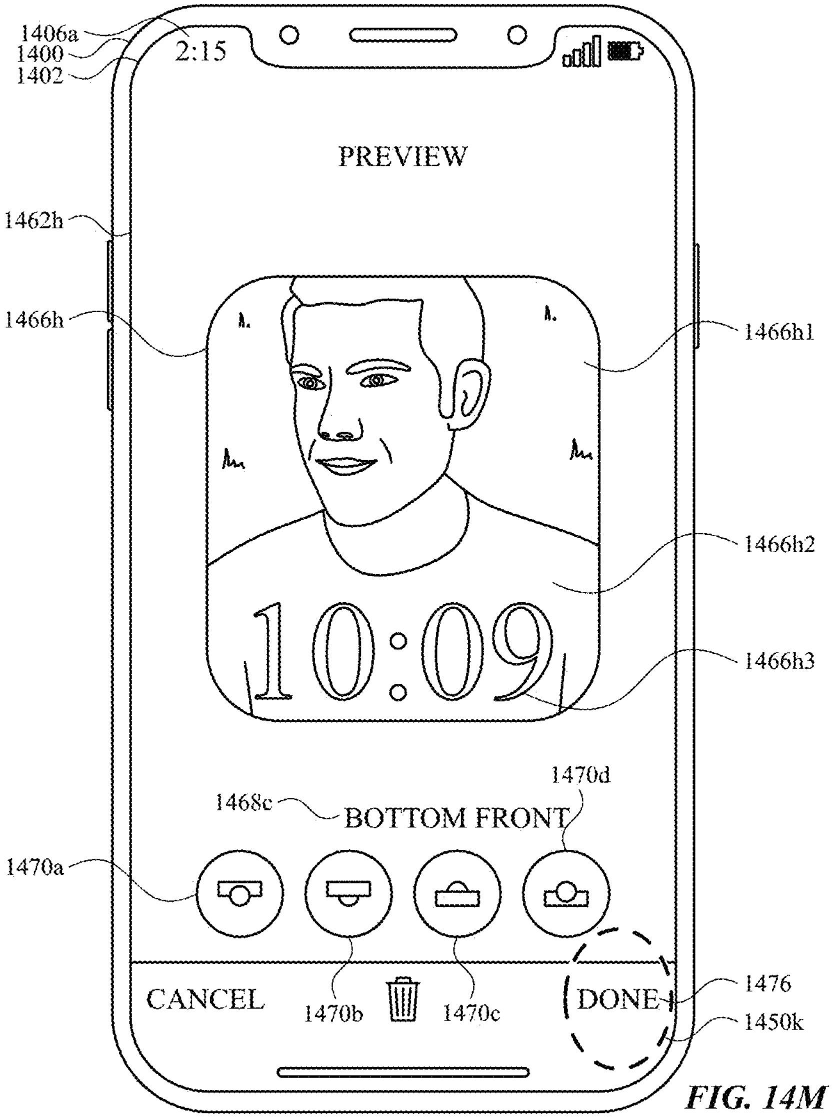
Figure 14N:
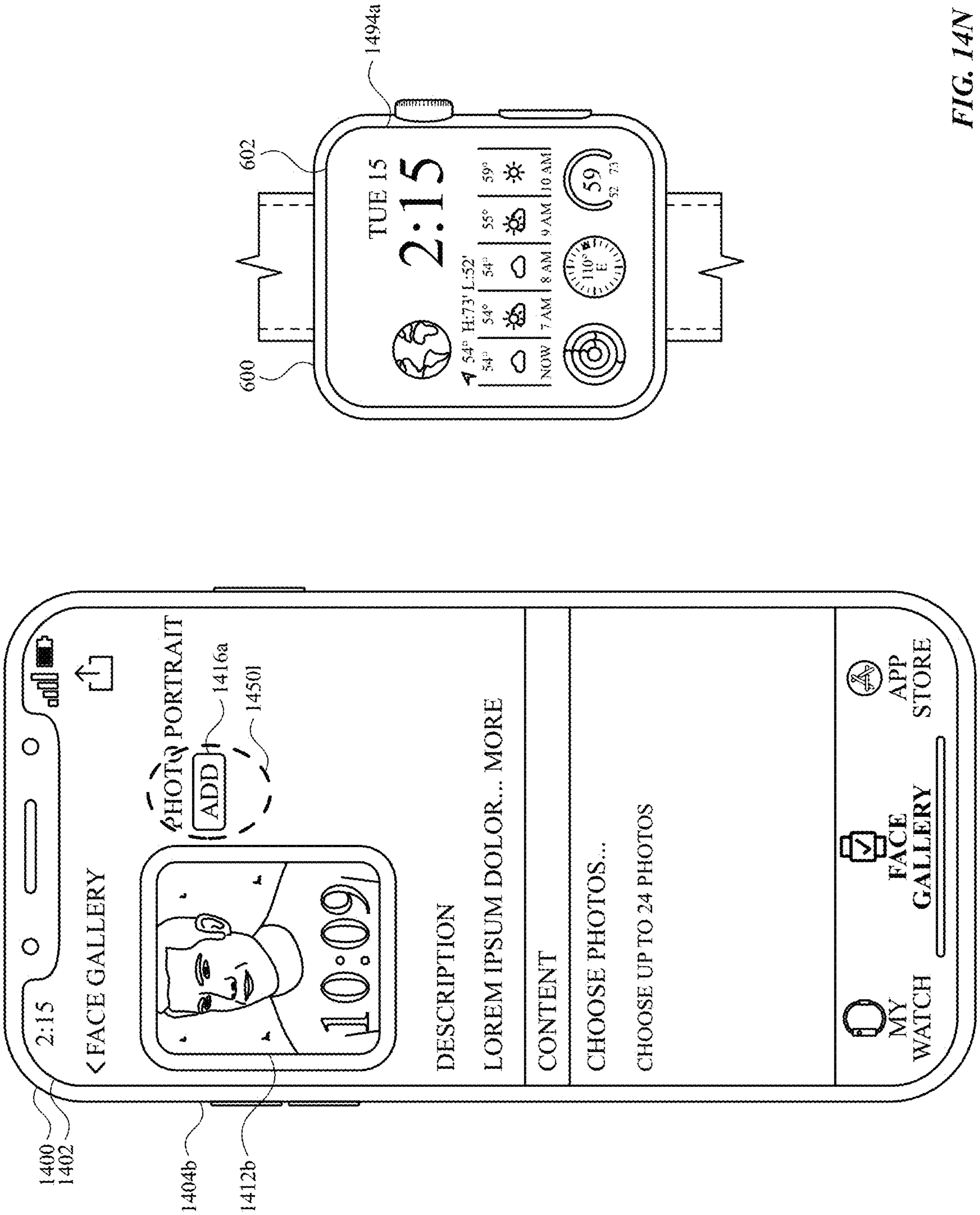
Figure 140:
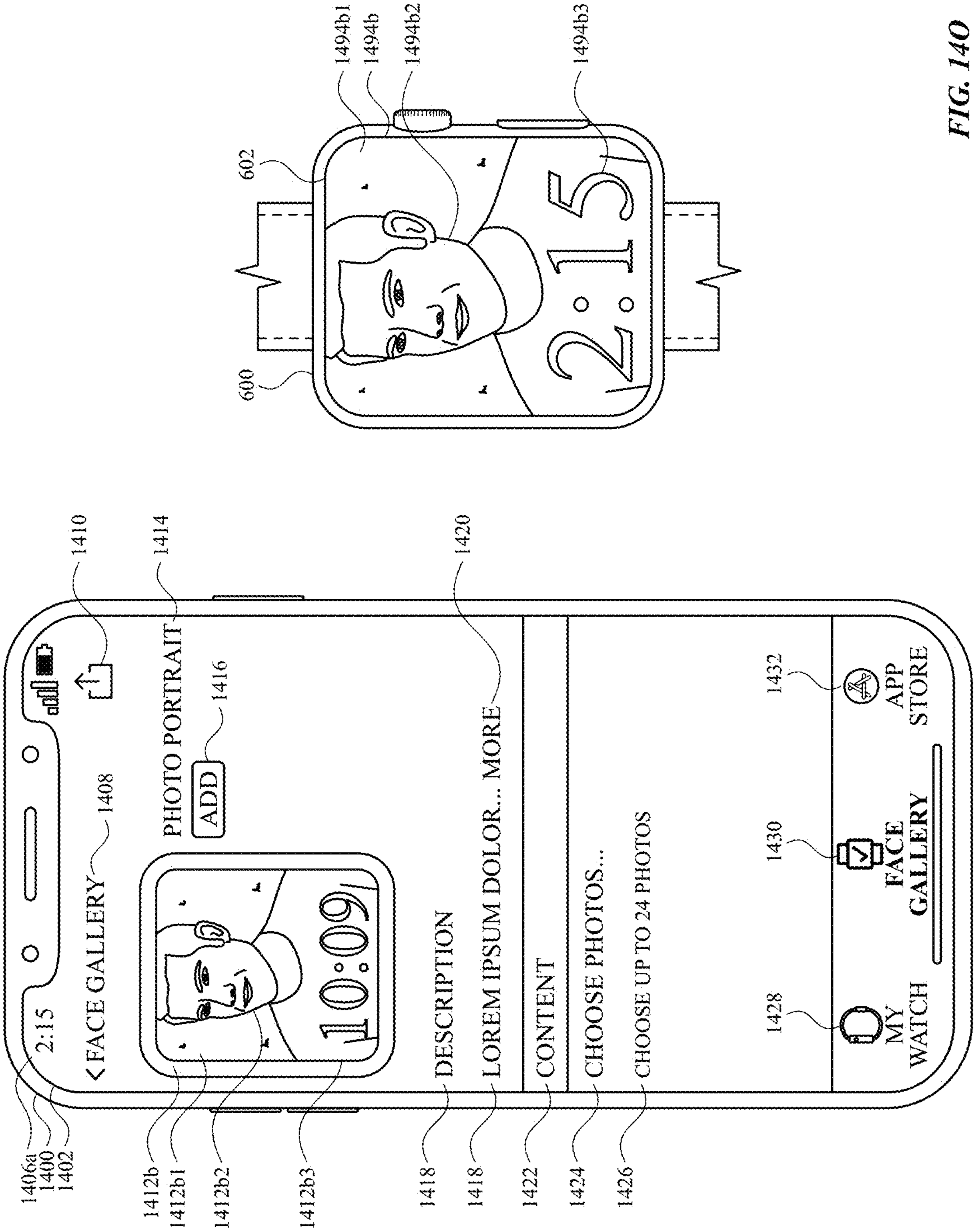
Figure 14P:
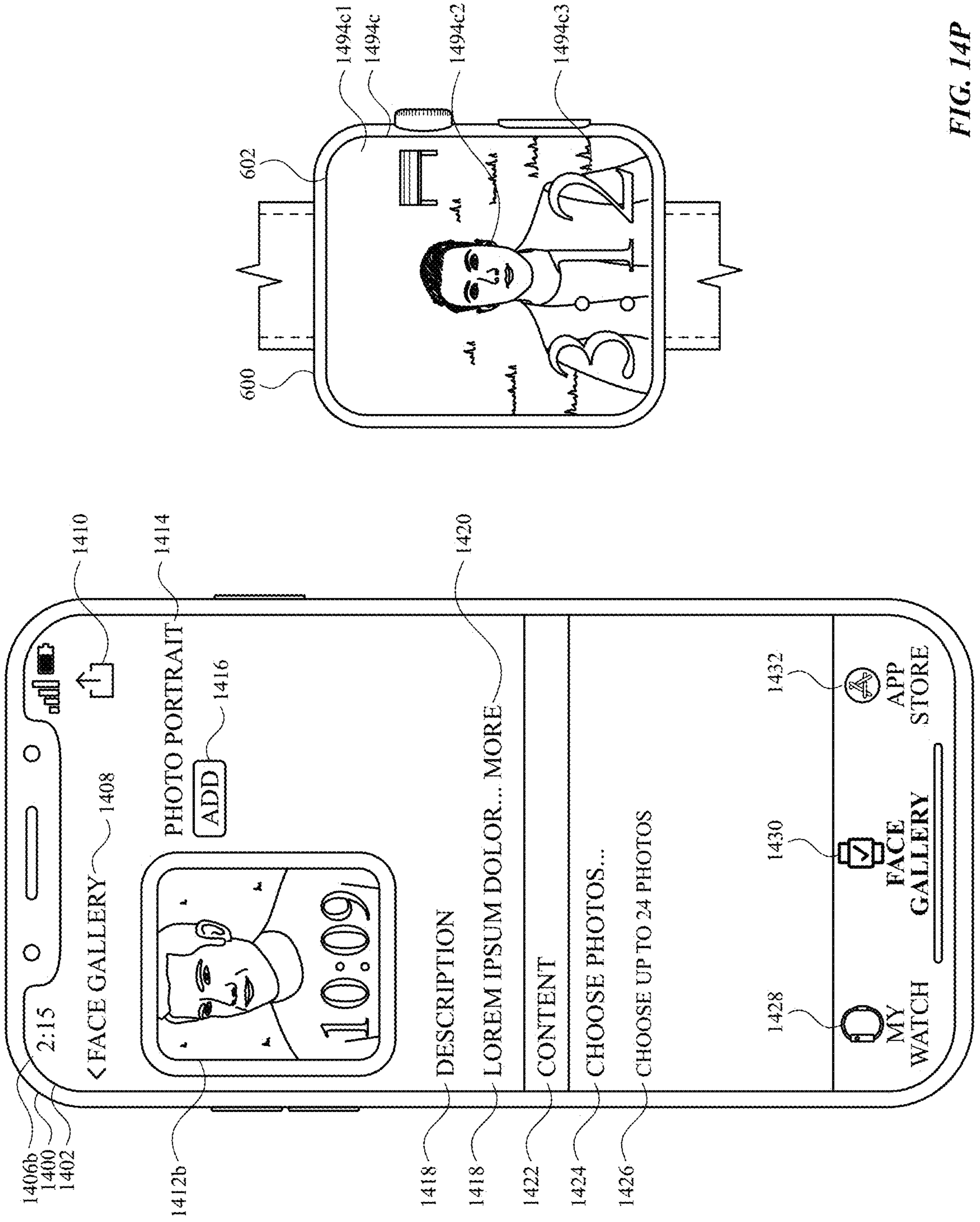
Figure 14Q:
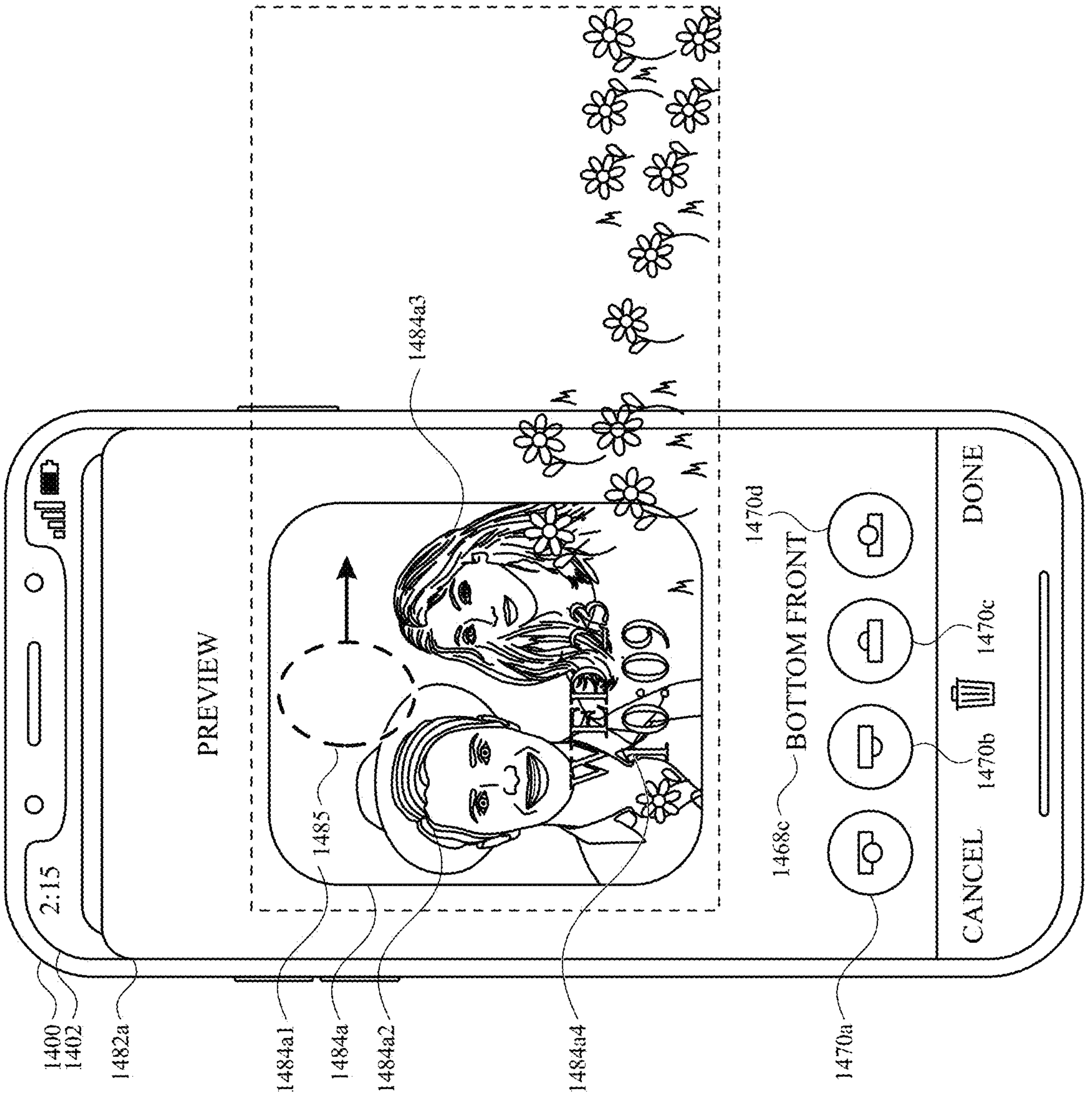
Figure 14R:
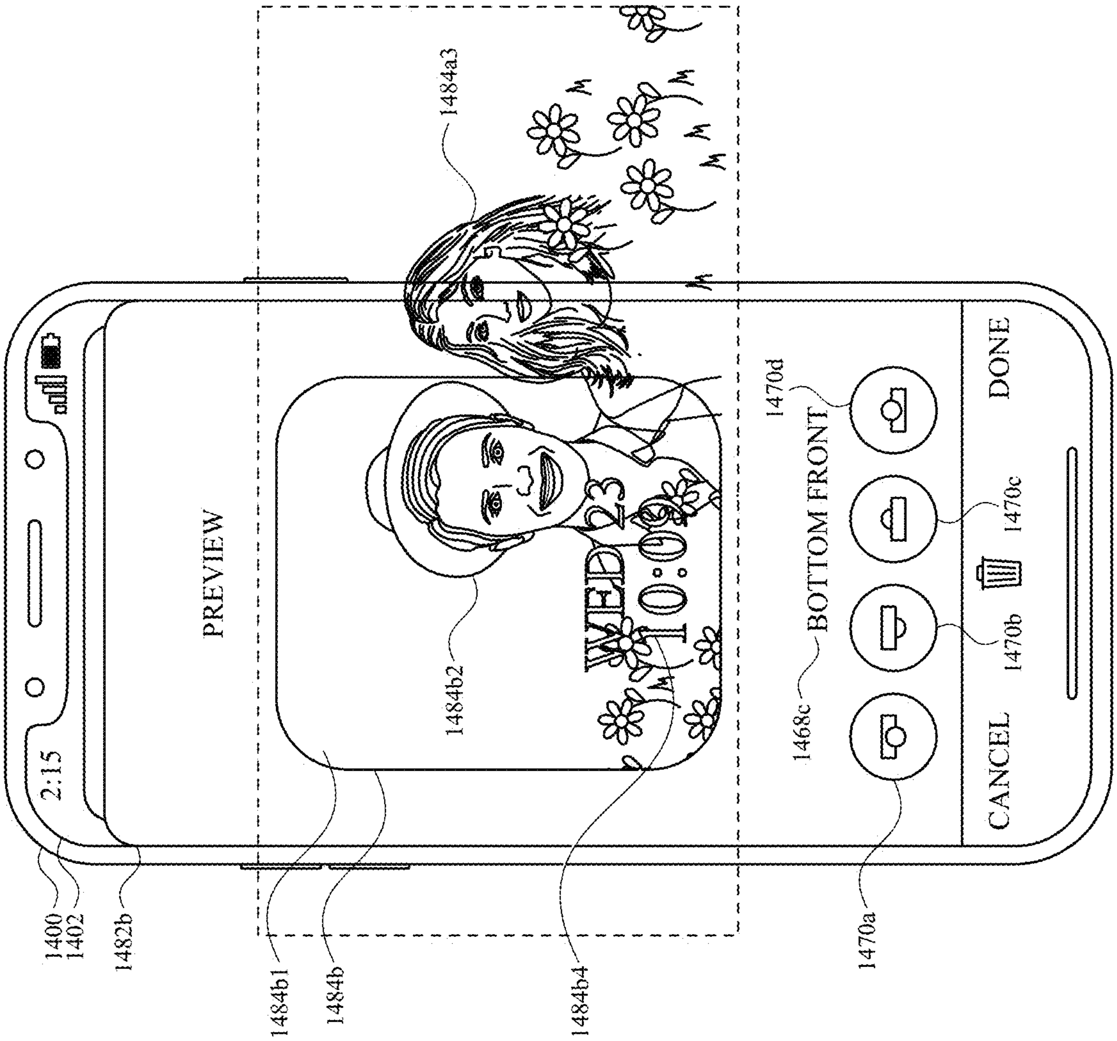

FIGS. 14A-14R illustrate exemplary user interfaces for editing user interfaces based on depth data of a previously captured media item. The user interfaces in FIGS. 14A-14R are used to illustrate the processes described below, including the processes in FIG. 15.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer-readable medium claims where the system or computer-readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer-readable storage medium can repeat the steps of a method as many times as are needed to ensure that all of the contingent steps have been performed.

Although the following description uses terms "first," "second," etc. to describe various elements, these elements should not be limited by the terms. In some embodiments, these terms are used to distinguish one element from another. For example, a first touch could be termed a second touch, and, similarly, a second touch could be termed a first touch, without departing from the scope of the various described embodiments. In some embodiments, the first touch and the second touch are two separate references to the same touch. In some embodiments, the first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
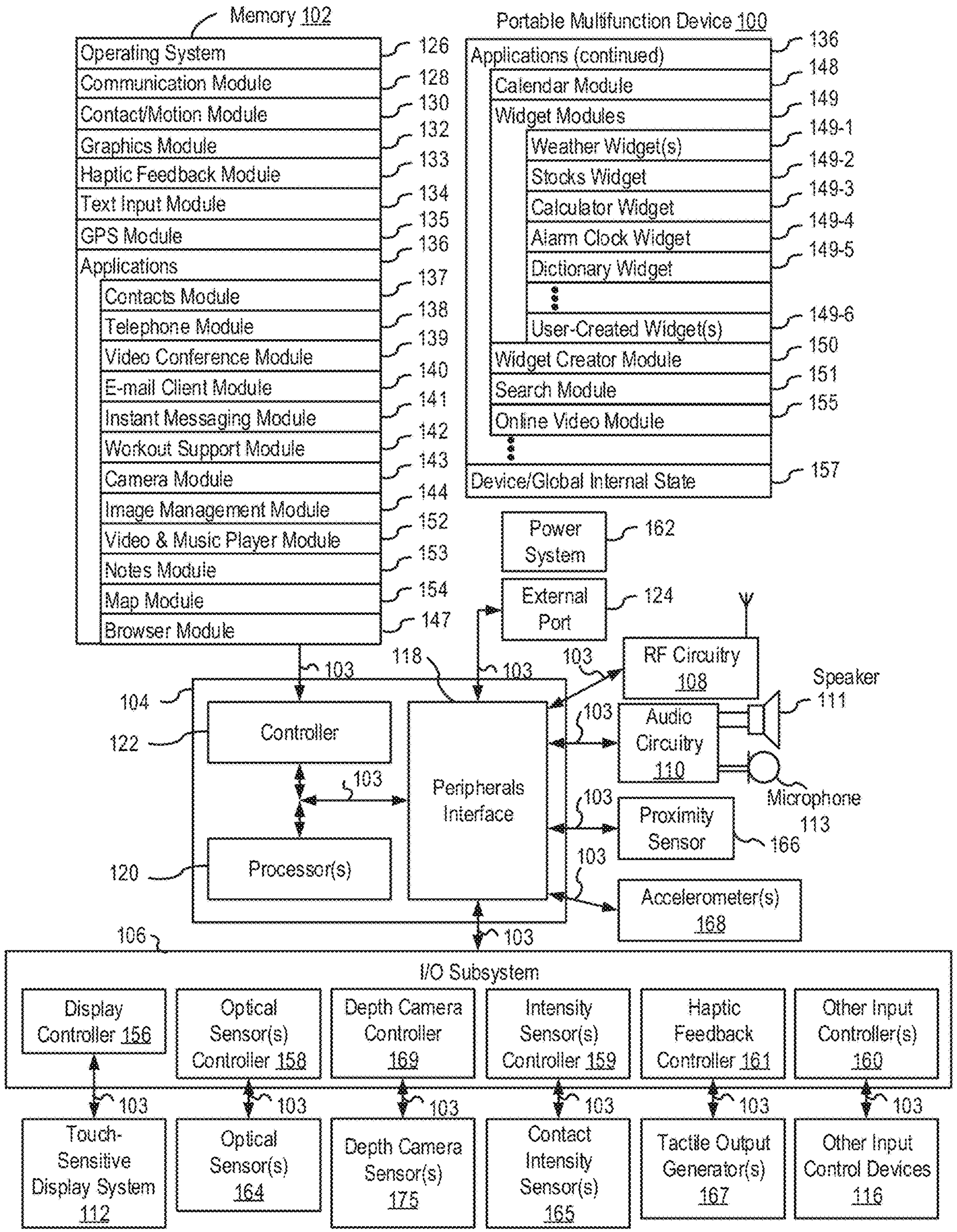
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs (such as computer programs (e.g., including instructions)) and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures and/or air gestures) as input. In some embodiments, the one or more input devices are integrated with the computer system. In some embodiments, the one or more input devices are separate from the computer system. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
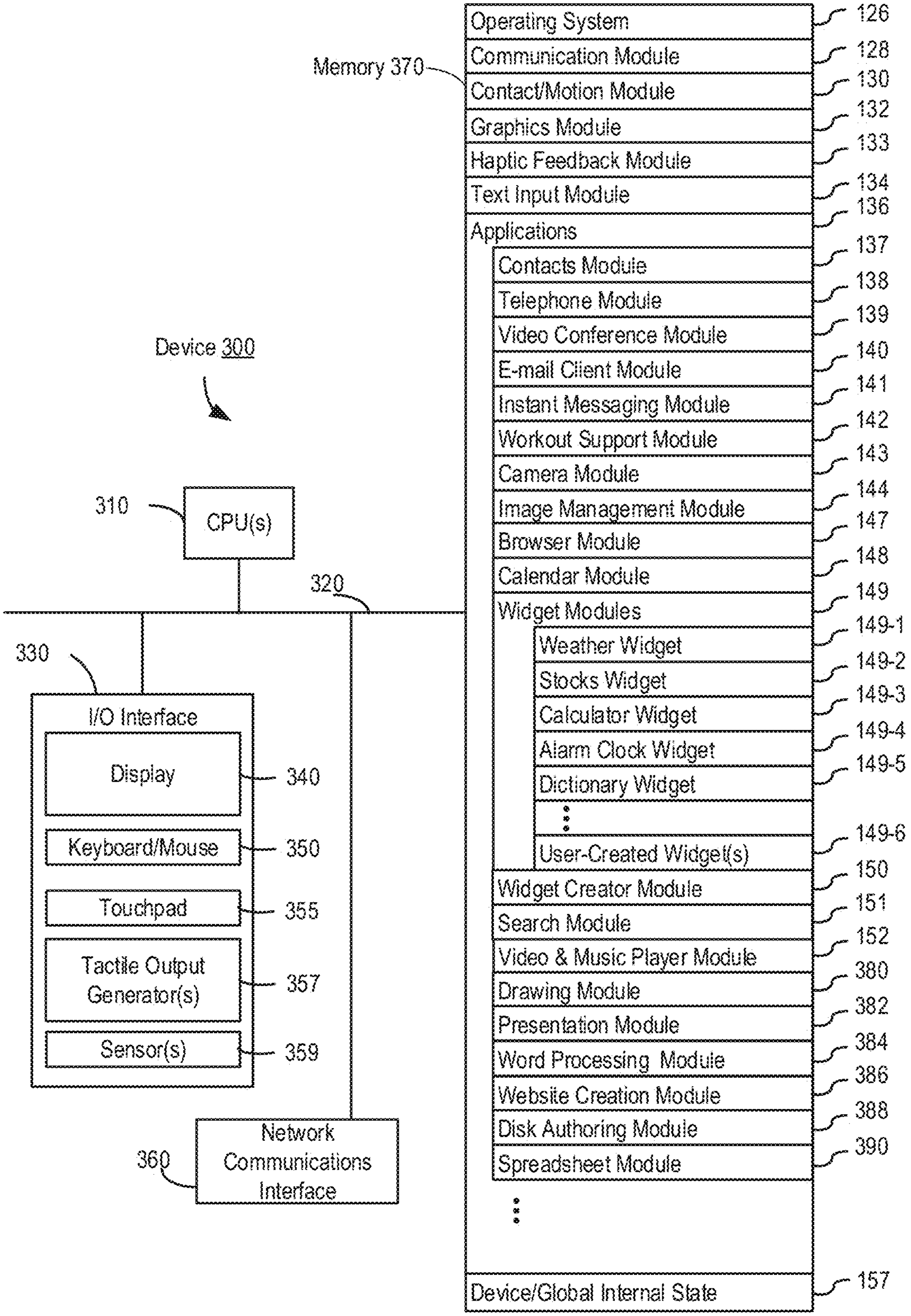
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, IM module 141, browser module 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone module 138, video conference module 139, e-mail client module 140, or IM module 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs (such as computer programs (e.g., including instructions)), procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
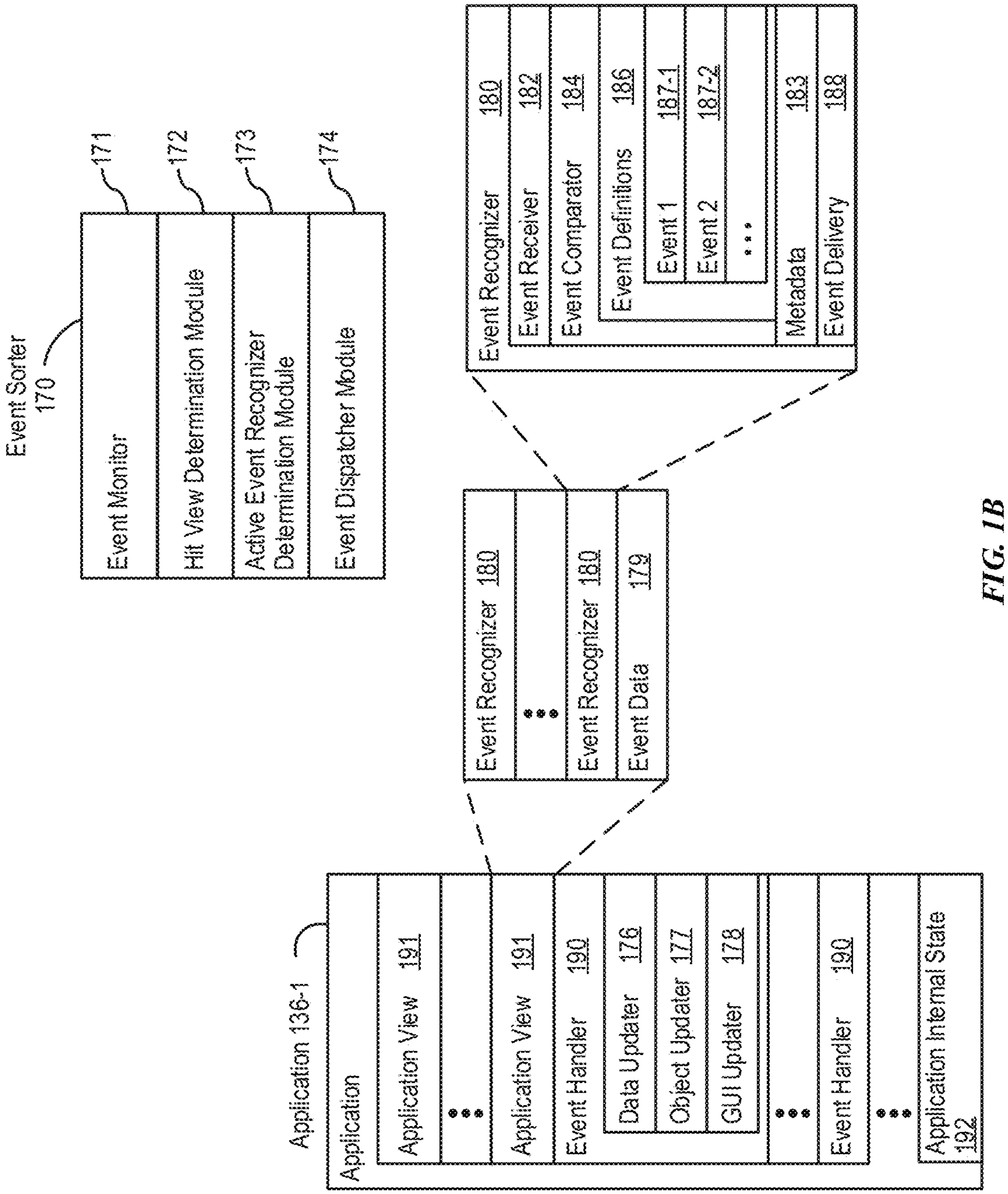
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (e.g., 187-1 and/or 187-2) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definitions 186 include a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
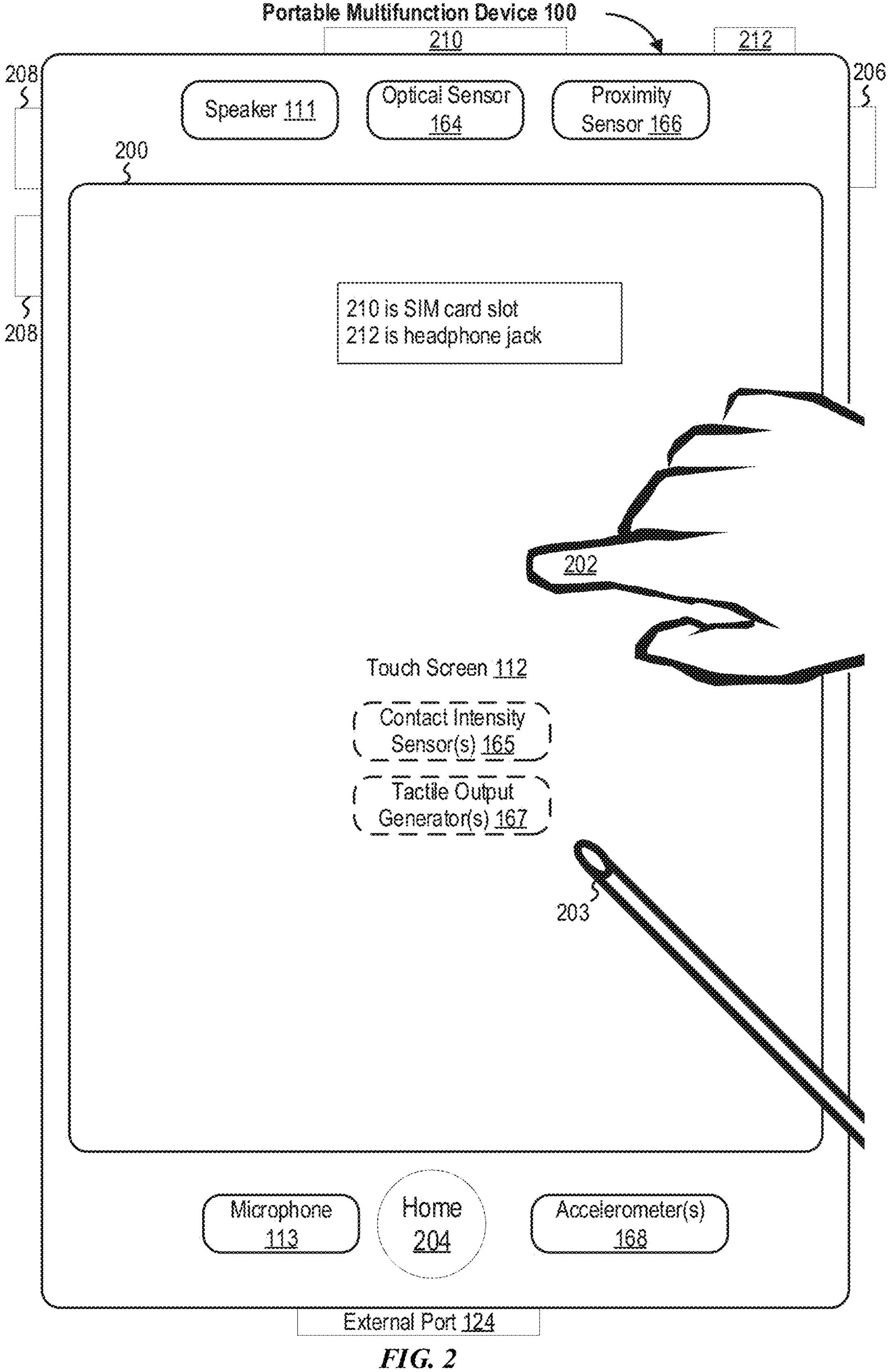
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or computer programs (e.g., sets of instructions or including instructions) need not be implemented as separate software programs (such as computer programs (e.g., including instructions)), procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
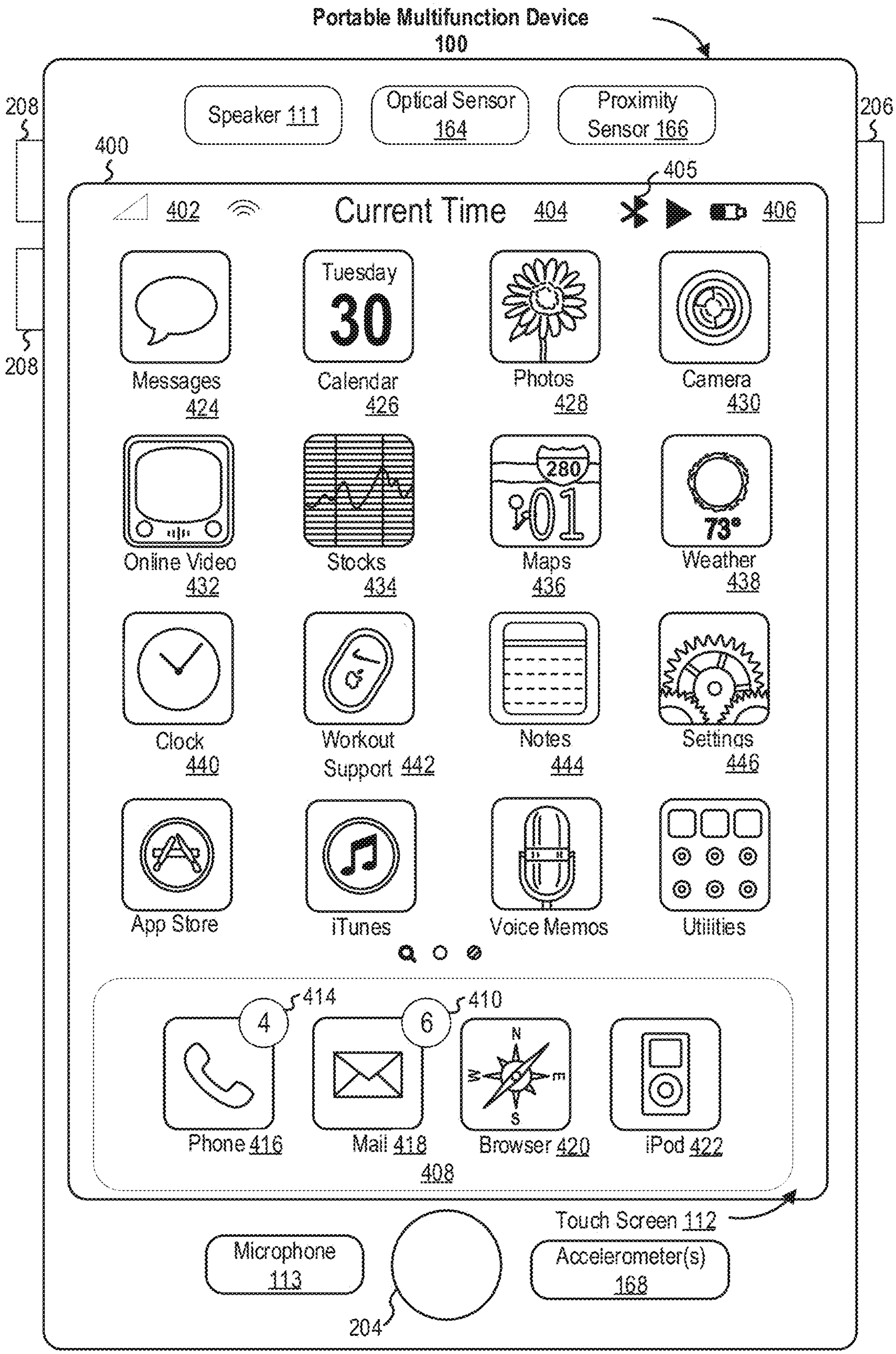
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
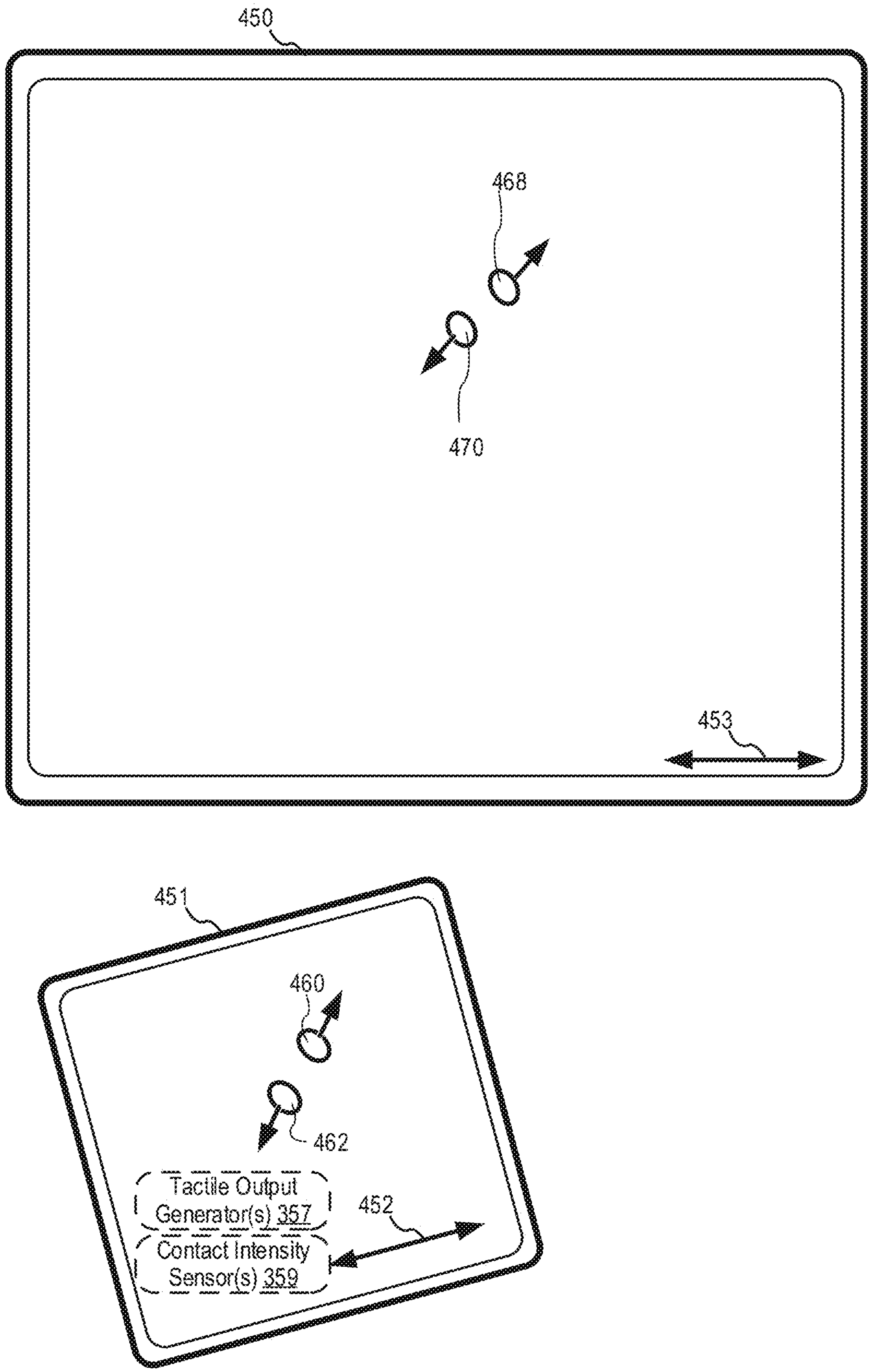
FIG. 4B illustrates an exemplary user interface for a multifunction device with a touch-sensitive surface that is separate from the display in accordance with some embodiments.

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
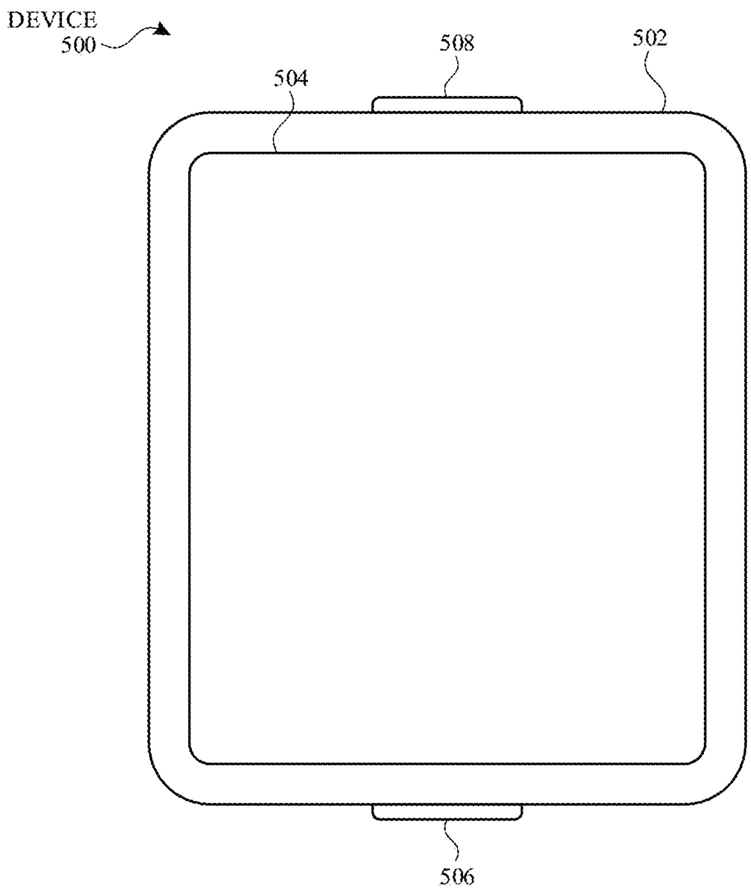
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
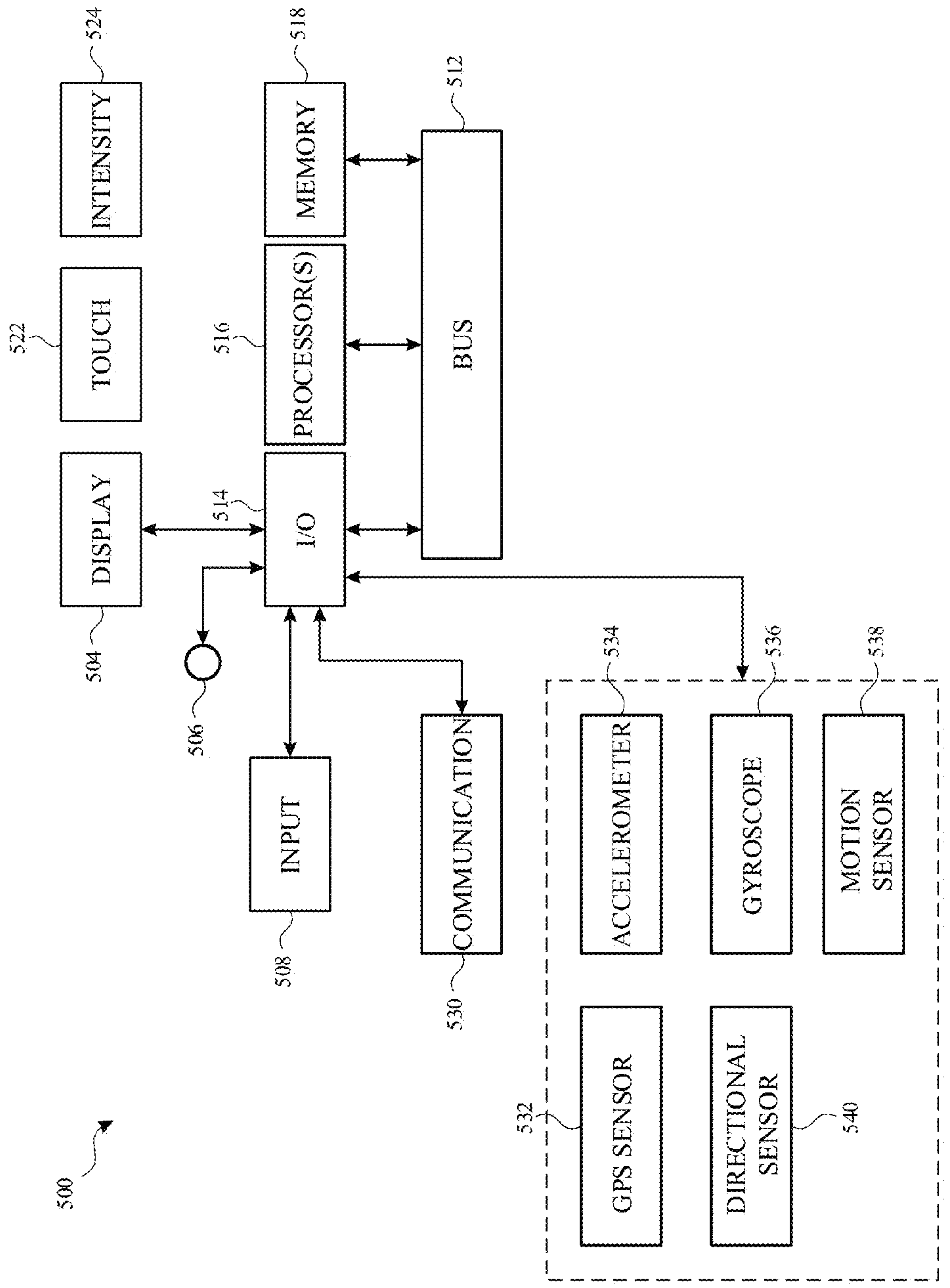
FIG. 5B is a block diagram illustrating a personal electronic device in accordance with some embodiments.
Figure 5C:
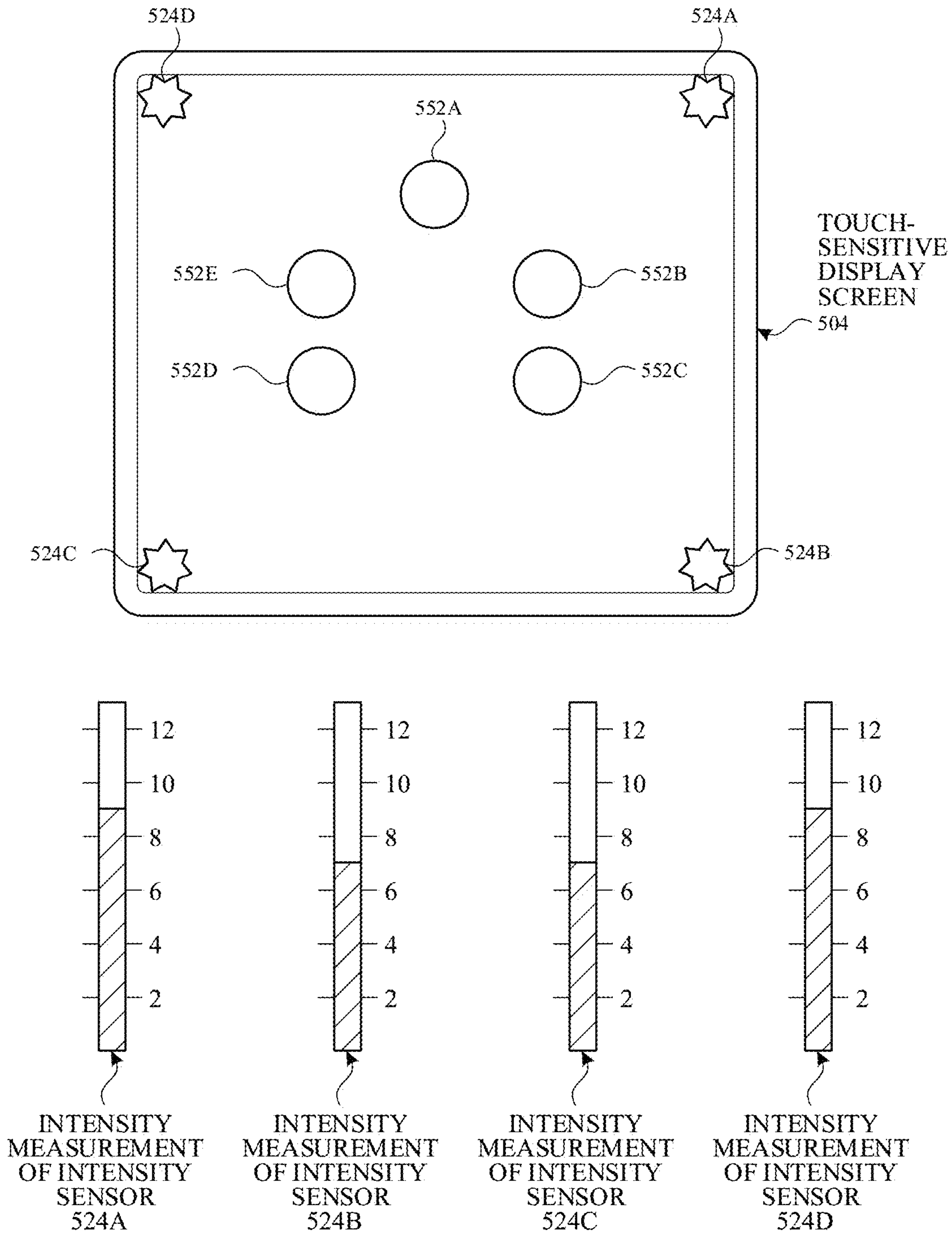
FIGS. 5C-5D illustrate exemplary components of a personal electronic device having a touch-sensitive display and intensity sensors in accordance with some embodiments.
Figure 5D:
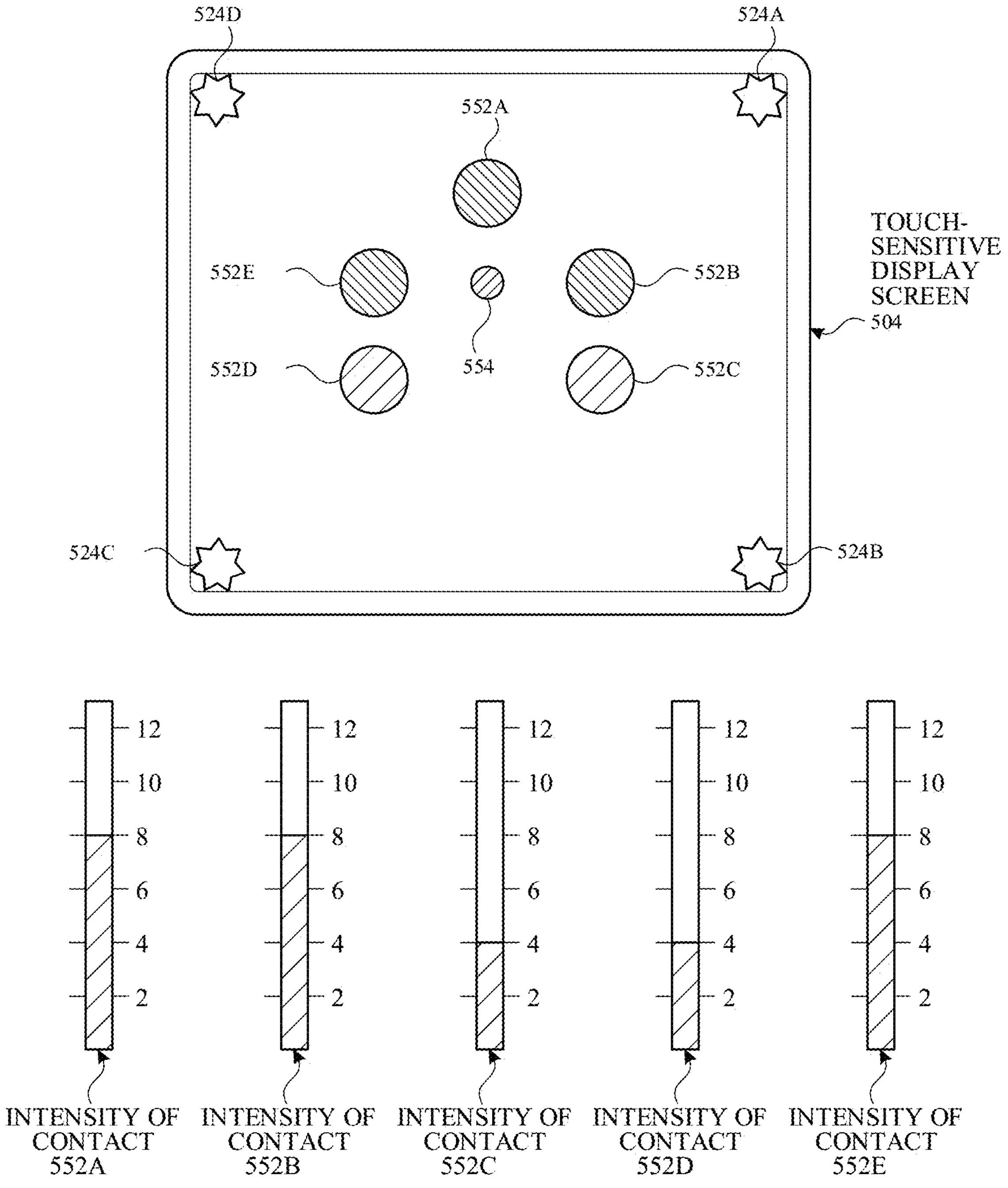
Figure 5E:
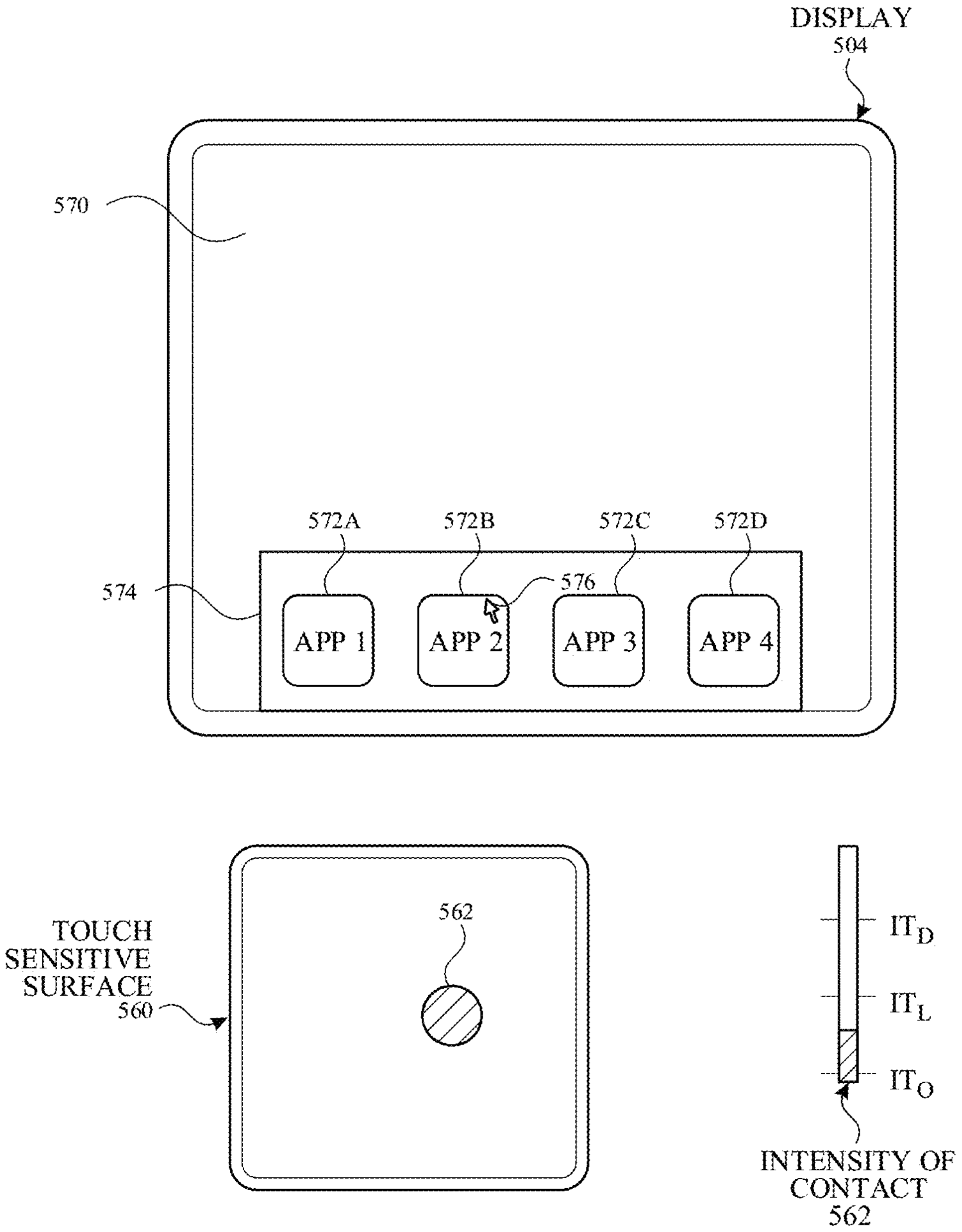
FIGS. 5E-5H illustrate exemplary components and user interfaces of a personal electronic device in accordance with some embodiments.
Figure 5F:
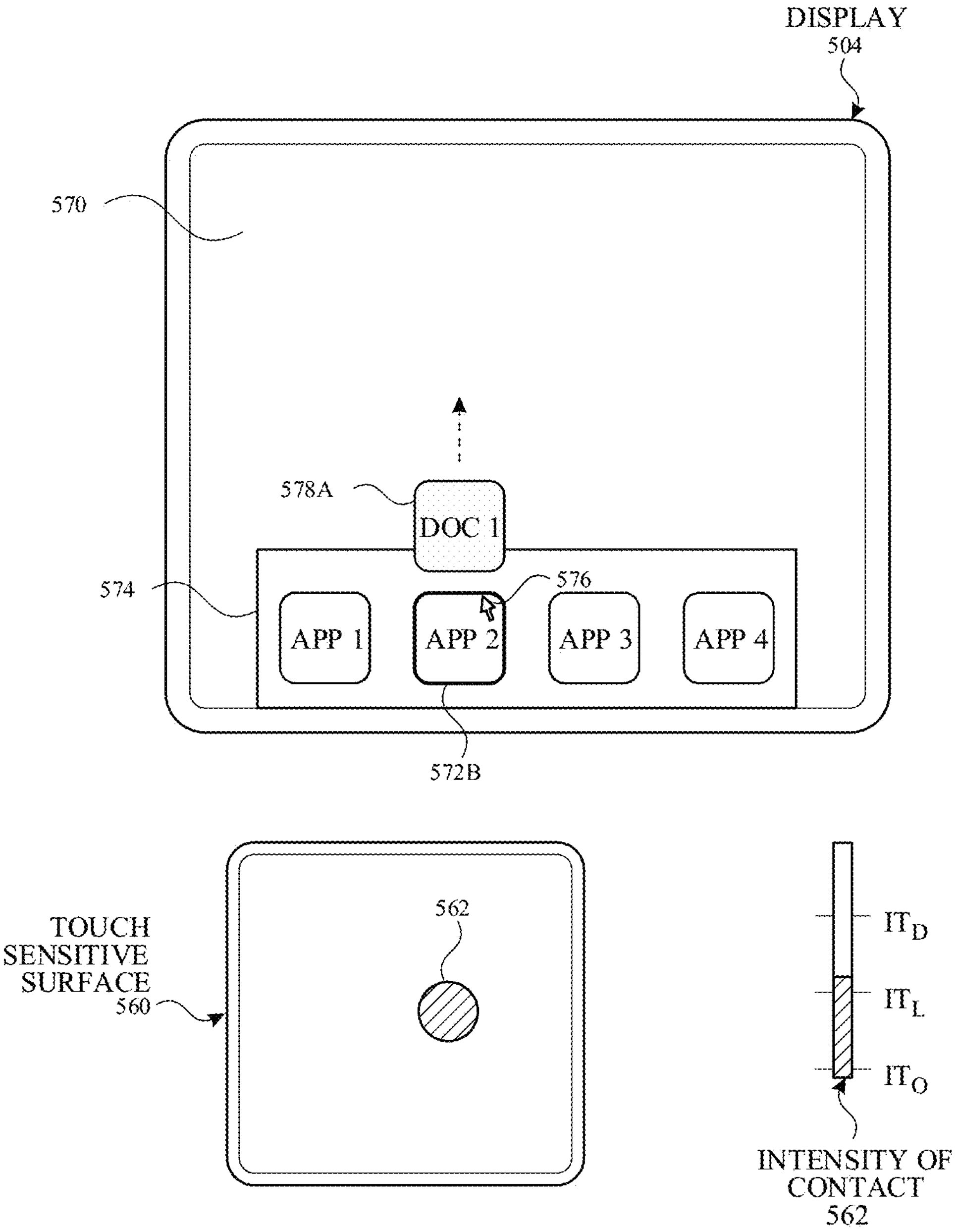
Figure 5G:
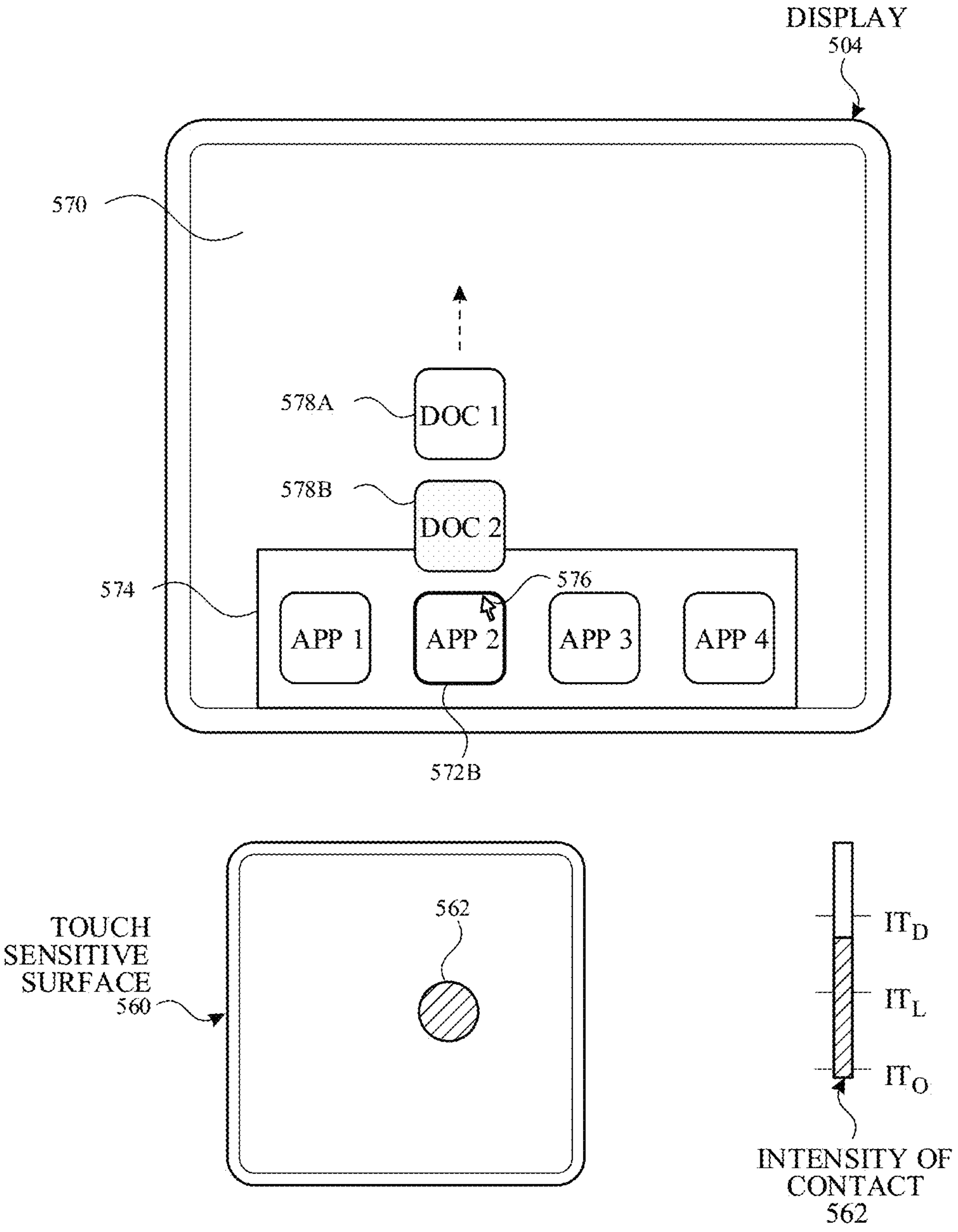
Figure 5H:
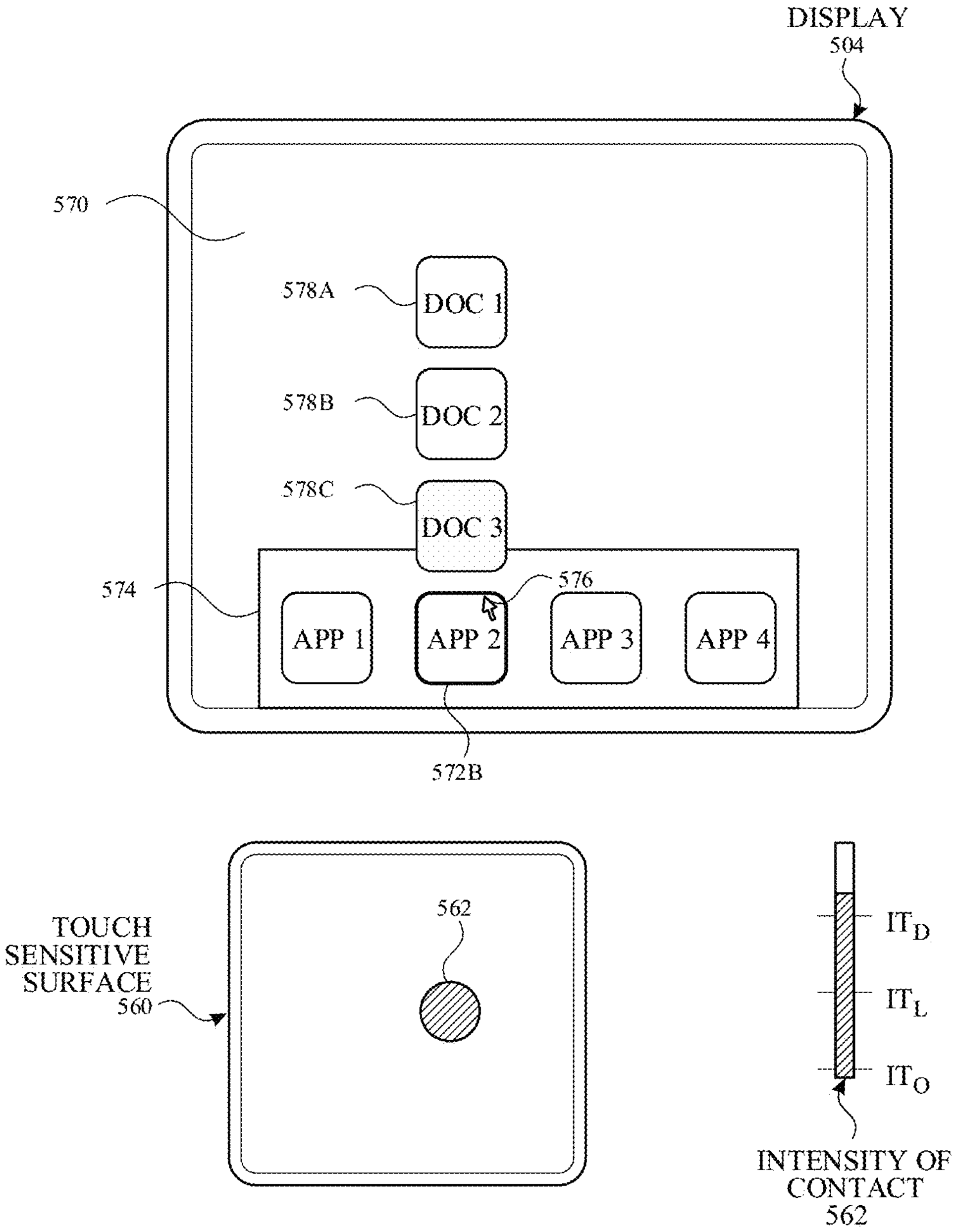

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100, and 1300 (FIGS. 7, 9, 11, and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5H). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Attention is now directed towards embodiments of user interfaces ("UI") and associated processes that are implemented on an electronic device, such as portable multifunction device 100, device 300, or device 500.

FIGS. 6A-6U illustrate exemplary user interfaces for managing watch faces based on depth data of a previously captured media item, in accordance with some embodiments. The user interfaces in these figures are used to illustrate the processes described below, including the processes in FIG. 7.

FIG. 6A illustrates computer 600 with display 602 turned off. Computer system 600 includes rotatable and depressible input mechanism 604. In some embodiments, computer system 600 optionally includes one or more features of device 100, device 300, or device 500. In some embodiments, computer system 600 is a tablet, phone, laptop, desktop, camera, etc. In some embodiments, the inputs described below can optionally be substituted for alternate inputs, such as a press input and/or a rotational input received via rotatable and depressible input mechanism 604.

In some embodiments, computer system 600 wakes and displays watch user interface 606 in response to an input, such as a tap input, a wrist raise input, a press input received via rotatable and depressible input mechanism 604, and/or a rotational input received via rotatable and depressible input mechanism 604.

In FIG. 6B, computer system 600 displays watch user interface 606, which includes background element 606*a*, system text 606*b*, foreground element 606*c*, and complication 606*d*1. In one embodiment, foreground element 606*c* and background element 606*a* correspond to portions of a portrait media item (e.g., a picture) that is divided into at least two layers based on depth data of the media item, such that foreground element 606*c* is based on a first layer of the media item and background element 606*a* is based on a second layer of the media item different from the first layer of the media item. In some embodiments, computer system 600 segments the media item into the first layer and the second layer based on a determination that the first layer of the media item and the second layer of the media item were different distances from a camera sensor at the time that the media item with depth data was captured.

At FIG. 6B, watch user interface 606 is based on an image that includes depth data indicating that foreground element 606*c* was closer to the camera sensor at the time that the image was captured than background element 606*a*. Computer system 600 generates and displays watch user interface 606 based on the image depth data by stacking elements of watch user interface 606 to indicate a field of depth (FOD). For example, FIG. 6B illustrates that background element 606*a* is beneath (e.g., overlaid by) system text 606*b*, which is beneath foreground element 606*c*, which is beneath complication 606*d*1. Thus, watch user interface 606 includes elements displayed in a simulated stack, such that each element is displayed with a different simulated (e.g., virtual) distance from display 602. For example, in FIG. 6B, complication 606*d*1 has the smallest simulated distance from display 602 whereas background element 606*a* has the largest simulated distance from display 602. In some embodiments, computer system 600 creates and/or generates watch user interface 606 without user inputs specifying the order in which to layer or virtually stack the elements of an image with depth data. In some embodiments, the elements of watch user interface are displayed in a different arrangement or virtual stack order. For example, in some embodiments, computer system 600 generates and/or displays a watch user interface based on an image with depth data wherein a complication (e.g., 606*d*1, 640*d*, etc.) is displayed beneath (e.g., behind) a foreground element (e.g., 606*c*, 640*c*, etc.) such as in FIG. 6Q, which is described below. In some embodiments, computer system 600 generates and/or displays a watch user interface based on an image with depth data wherein system text (e.g., 606*b*, 642*b*, etc.) is displayed above (e.g., in front of) a foreground element (e.g., 606*c*, 642*c*, etc.) such as in FIG. 6R, which is described below.

In FIG. 6B, system text 606*b* includes lock icon 606*b*1, which indicates that computer system 600 is currently in a locked state. In some embodiments, the features of computer system 600 are limited when computer system 600 is in a locked state. System text 606*b* further includes date 606*b*2, which indicates the current date (e.g., month, date, and/or year) and current time 606*b*3, which indicates the current time of day (e.g., hour, minute, and/or second).

FIG. 6C illustrates computer system 600 displaying watch user interface 606 with a simulated parallax visual effect. In FIG. 6C, computer 600 is a watch that is being worn on wrist 608. In FIG. 6C, the relative positions of elements of watch user interface 606 including background element 606*a*, system text 606*b*, and foreground element 606*c* are adjusted based on the angle of rotation of wrist 608. For example, the top portion of FIG. 6C illustrates that, when wrist 608 is at a first angle of rotation, foreground element 606*c* is displayed at an angle that significantly obscures system text 606*b*. However, the bottom portion of FIG. 6C illustrates that, when wrist 608 is at a second angle of rotation different from the first angle of rotation, the relative positions of the elements of watch user interface 606 are adjusted based on the change in the angle of wrist 608 such that foreground element 606*c* does not obscure system text 606*b*. In some examples, the magnitude of the change in position of elements of watch user interface 606 is significantly based on the angle of rotation of a user's wrist.

In some embodiments, the relative positions of the elements of watch user interface 606 are bound within a range, and a change in a wrist position beyond a threshold amount (e.g., beyond a threshold angle) will not cause the elements of watch user interface 606 to be updated beyond a threshold amount. In some embodiments, the magnitude of the simulated parallax visual effect is less significant than that illustrated in FIG. 6C. In some embodiments, some elements of watch user interface are affected by (e.g., moved based on) a wrist rotation, whereas other elements maintain a fixed position within watch user interface 606. For example, in some embodiments, the simulated parallax visual effect is applied to a foreground element (e.g., 606*c*) and a background element (e.g., 606*a*), but is not applied to system text (e.g., 606*b*) or a complication (e.g., 606*d*1, 606*d*2).

FIG. 6D illustrates watch user interface 606 being displayed with a simulated dolly zoom animation (e.g., an animation where a simulated camera moves toward or away from a subject while adjusting a zoom in such a way as to keep the subject the same size to create a visual effect where the background grows in size and detail or the foreground increases in size relative to the background). In some embodiments, when computer system 600 initially displays watch user interface 606 (e.g., after closing out of an application, after selecting watch user interface 606 via a watch face selection mode, after waking from a sleep state, after initially powering on, after unlocking computer system 600, etc.), it displays watch user interface 606 with a dolly zoom animation. The top portion of FIG. 6D illustrates computer system 600 displaying watch user interface 606 with a dolly zoom effect wherein, initially, background element 606*a* of watch user interface 606 is displayed with a first simulated zoom level applied. The bottom portion of FIG. 6D illustrates a second portion of the dolly zoom animation wherein background element 606*a* has been updated to be displayed with a second simulated zoom level different from the first simulated zoom level. In some embodiments, computer system 600 displays the simulated dolly zoom animation on watch user interface 606 automatically and, after playing the simulated animation, maintains the second simulated zoom level applied to background element 606*a* after the animation is displayed.

In some embodiments, the simulated dolly zoom applies progressive levels of zoom to background element 606*a* while the simulated zoom level applied to foreground element 606*c* is maintained. In some embodiments, displaying the simulated dolly zoom animation involves initially applying the least amount of simulated zoom effect (e.g., the lowest magnification level) to background element 606*a*. Over the course of the simulated dolly zoom animation, the simulated zoom effect applied to background element 606*a* is updated such that, at the end of the simulated dolly zoom animation, a higher amount of simulated zoom effect is applied to background element 606*a* of watch user interface 606. In some embodiments, displaying the simulated dolly zoom animation involves initially applying the greatest amount of simulated zoom effect (e.g., the highest magnification level) to background element 606*a*. Over the course of the simulated dolly zoom animation, the simulated zoom effect applied to background element 606*a* is updated such that, at the end of the simulated dolly zoom animation, a lower amount of simulated zoom effect is applied to background element (e.g., 606*a* as illustrated in FIG. 6A) of watch user interface 606.

At FIG. 6E, computer system 600 displays watch user interface 606, wherein system text 606*b* has been updated to be displayed without lock icon 606*b*1, which indicates that computer 600 is not in a locked state. In some embodiments, computer 600 system transitions from a locked state to an unlocked state in response to a sequence of user inputs received via one or more input mechanisms in communication with computer system 600. In some embodiments, computer system 600 transitions from a locked state to an unlocked state in response to a number of tap inputs received at computer system 600 corresponding to entry of a passcode. In some embodiments, computer system 600 transitions from a locked state to an unlocked state in response to a press input received on rotatable and depressible input mechanism 604. In some embodiments, computer system 600 transitions from a locked state to an unlocked state in response to a sequence of one or more user inputs received via a computer system other than computer system 600 that is in communication with computer system 600, such as a paired phone (e.g., computer system 660). In some embodiments, computer system 600 transitions from a locked state to an unlocked state in response to a wrist raise gesture.

At FIG. 6E, computer system 600 detects long press input 650*a* on watch user interface 606. At FIG. 6F, in response to detecting long press input 650*a*, computer system 600 displays selection user interface 610*a*. Selection user interface 610*a* includes representation 618*a*, which is a graphical representation of watch user interface 606. Representation 618*a* includes elements of watch user interface 606, including background element 606*a*, system text 606*b*, foreground element 606*c*, and complication 606*d*1. In some embodiments, representation 618*a* is a static representation of watch user interface 606, and includes current time 606*b*3 with text indicating a time other than the current time, and complication 606*d*1 with information other than real-time data.

Selection user interface 610*a* includes share user-interactive graphical user interface object 614 which, when selected, causes computer system 600 to display a user interface related to transmitting and/or sharing information related to watch user interface 606 to another computer system (e.g., a phone, a watch, a tablet, etc.). Selection user interface 610*a* further includes edit user-interactive graphical user interface object 616 which, when selected, causes computer system 600 to display an editing user interface for editing aspects of watch user interface 606. Selection user interface 610*a* further includes face indicator 612*a*, which includes a visual and/or textual indicator indicating the name of the watch user interface currently centered in selection user interface 610*a*. At FIG. 6F, face indicator 612*a* indicates that currently indicated watch user interface 606, which is represented in selection user interface 610*a* by representation 618*a*, is titled "Portrait."

Selection user interface 610*a* further includes at least a partial view of representation 607*a* and representation 607*b*. Representation 607*a* and representation 607*b* represent watch user interfaces other than watch user interface 606. In some embodiments, in response to receiving a swipe input on display 602 and/or a rotational input via rotatable and depressible input mechanism 604, computer system displays representation 607*a* or 607*b* in the center of selection user interface 610*a*, with a fuller view of the respective representation than is illustrated at FIG. 6F.

At FIG. 6F, computer system 600 detects tap input 650*b* on edit user-interactive graphical user interface object 616. At FIG. 6G, in response to detecting tap input 650*b*, computer system 600 displays editing user interface 620*a*1. Editing user interface 620*a*1 includes representation 618*b*1, which represents watch user interface 606. In some embodiments, representation 618*b*1 is significantly the same as 618*a*. In some embodiments, representation 618*b*1 significantly matches representation 618*a*, but is displayed at a different size from representation 618*a*. At FIG. 6G, representation 618*b*1 includes elements of watch user interface of 606, including background element 606*a*, system text 606*b*, foreground element 606*c*, and complication 606*d*1.

Editing user interface 620*a*1 includes aspect indicator 624*a*, which includes a visual and/or textual representation of the aspect of watch user interface 606 currently selected for editing. At FIG. 6G, aspect indicator 624*a* indicates that the aspect of watch user interface 606 that is currently selected for editing is "Style."

Editing user interface 620*a*1 further includes selection indicator 622*a*1, which includes a visual and/or textual representation of the currently selected option for the editable aspect of watch user interface 606. At FIG. 6G, selection indicator 622*a*1 indicates that the currently selected "Style" option for watch user interface 606 is "Classic."

Editing user interface 620*a*1 further includes positional indicator 626*a*1. Positional indicator 626*a*1 includes a graphical indication of the number of selectable options for the editable aspect of watch user interface 606 that is currently being edited, as well as the position of the currently selected option among the list of selectable options. For example, positional indicator 626*a*1 indicates that the currently selected option for the "Style" aspect of watch user interface 606, "Classic," is at the top of a list of at least two possible options for the "Style" aspect of watch user interface 606.

At FIG. 6G, computer system 600 detects rotational input 638*a* via rotatable and depressible input mechanism 604. At FIG. 6H, in response to detecting rotational input 638*a*, computer system 600 displays editing user interface 620*a*2. In some embodiments, computer system 600 displays editing user interface 620*a*2 in response to a swipe input (e.g., a downward swipe input on display 602) received while editing user interface 620*a*1 is displayed. Editing user interface 620*a*2 includes representation 618*b*2, which represents an edited representation of watch user interface 606 that now includes current time 606*b*3 of system text 606*b* displayed in a different font than the font that was previously used to display current time 606*b*3 (e.g., the font used at FIGS. 6B-6G). At FIG. 6H, the "Style" aspect of watch face 606 has been edited to be displayed with the "Modern" style instead of the "Classic" style. Accordingly, selection indicator 622*a*2 indicates that the currently selected "Style" option for watch user interface 606 is "Modern," and positional indicator 626*a*2 indicates that the position within the selectable options for the "Style" aspect of watch user interface 606 has been updated.

At FIG. 6H, computer system 600 detects swipe input 650*c* on editing user interface 620*a*2. At FIG. 6I, in response to detecting swipe input 650*c*, computer system 600 displays editing user interface 620*b*1, which includes representation 618*c*1 of watch user interface 606. Editing user interface

**620*b*1 further includes aspect indicator 624*b*, which indicates that editing user interface 620*b*1 is for editing the position of system text 606*b***.

Editing user interface **620*b*1 further includes selection indicator 622*b*1, which includes a visual and/or textual representation of the currently selected option for the editable aspect of watch user interface 606. At FIG. 6I, selection indicator 622*b*1 indicates that the currently selected "Position" option for watch user interface 606 is "Top." Thus, representation 618*c*1 includes system text 606*b* that is displayed toward the top of display 602**.

Editing user interface **620*b*1 further includes positional indicator 626*b*1. Positional indicator 626*b*1 includes a graphical indication of the number of selectable options for the editable aspect of watch user interface 606 that is currently being edited, as well as the position of the currently selected option among the list of selectable options. For example, positional indicator 626*b*1 indicates that the currently selected option for the "Position" of system text 606*b*, "Top," is at the top of a list of at least two possible options for the "Position" aspect of system text 606*b***.

At FIG. 6I, computer system 600 detects rotational input **638*b* via rotatable and depressible input mechanism 604. At FIG. 6J, in response to detecting rotational input 638*b*, computer system 600 displays editing user interface 620*b*2, which includes representation 618*c*2. Representation 618*c*2 significantly matches representation 618*c*1, except that the position of system text 606*b* has been altered so that system text 606*b* is now displayed closer to the bottom of representation 618*c*2 and, accordingly, closer to the bottom of display 602. Editing user interface 620*b*2 further includes aspect indicator 624*b*, which indicates that editing user interface 620*b*2 is a user interface for editing the position of system text 606*b***.

Editing user interface **620*b*2 further includes selection indicator 622*b*2, which includes a visual and/or textual representation of the currently selected option for the editable aspect of watch user interface 606. At FIG. 6J, selection indicator 622*b*2 indicates that the currently selected "Position" option for system text 606*b*** is "Bottom."

Editing user interface **620*b*2 further includes positional indicator 626*b*2. Positional indicator 626*b*2 includes a graphical indication of the number of selectable options for the editable aspect of watch user interface 606 that is currently being edited, as well as the position of the currently selected option among the list of selectable options. For example, positional indicator 626*b*2 indicates that the currently selected option for the "Position" of watch user interface 606, "Bottom," is lower than the position of the "Top" selectable option as illustrated by positional indicator 626*b*1 at FIG. 6**I.

At FIG. 6I, computer system 600 detects swipe input **650*d* on editing user interface 620*b*1. At FIG. 6K, in response to detecting swipe input 650*d*, computer system 600 displays editing user interface 620*c*1, which includes representation 618*d*1. Representation 618*d*1 significantly matches representation 618*c*1. Editing user interface 620*c*1 further includes aspect indicator 624*c*, which indicates that editing user interface 620*c*1 is a user interface for editing the color of aspects of watch user interface 606**.

Editing user interface **620*c*1 further includes selection indicator 622*c*1, which includes a visual and/or textual representation of the currently selected color option for aspects of watch user interface 606. In some embodiments, the currently selected color option is applied to the elements of system text 606*b*. In some embodiments, the currently selected color option is applied to some elements of system text 606*b* (e.g., current time 606*b*3) but not others (e.g., date 606*b*2 and/or lock icon 606*b*1). At FIG. 6K, selection indicator 622*c*1 indicates that the currently selected "Color" option for watch user interface 606** is "Orange."

Editing user interface **620*c*1 further includes color options indicator 628, which includes various selectable color options. Selected color 628*a* includes a visual indication around the currently selected color, which provides a visual and/or graphical indication of the selected color as well as its position within color options indicator 628**.

At FIG. 6K, computer system 600 detects swipe input **650*e* on editing user interface 620*c*1. At FIG. 6L, in response to detecting swipe input 650*e*, computer system 600 displays editing user interface 620*d*1, which includes representation 618*e*1. Representation 618*e*1 is significantly the same as representation 618*d*1, except that it is displayed at a larger size, and a blur and/or darkening effect is being applied to elements of representation 618*d*1 that are not currently being edited (e.g., elements of watch user interface 606 other than complications). Editing user interface 620*d*1 further includes aspect indicator 624*d*, which indicates that editing user interface 620*d*1 is a user interface for editing the complication displayed with watch user interface 606**.

At FIG. 6L, computer system 600 detects tap input **650*f* on complication 606*d*1. At FIG. 6M, in response to detecting tap input 650*f*, computer system 600 displays editing user interface 620*d*2, which includes multiple selectable complication options to be displayed with watch user interface 606**.

FIG. 6M includes complication options that can be selected to be displayed with watch user interface 606. In some embodiments, the selectable complications are sorted into categories based on associated features/and or applications related to the selectable complications. Editing user interface **620*d*2 includes category 632*a*, which includes a visual and/or textual indication that the complication beneath category 632*a* is related to "Heart Rate." Editing user interface 620*d*2 further includes category 632*b*, which includes a visual and/or textual indication that the complication beneath category 632*b* is related to "Weather." In some embodiments, the categories may include multiple complications, in which case the multiple complications related to a given category are displayed below text and/or a visual indication related to the category. In some embodiments, editing user interface 620*d*2 is initially displayed with the selected complication from the previous user interface centered and/or with focus selection. In some embodiments, computer system navigates from one complication option to another complication option (e.g., moves focus selection) by scrolling via a swipe input on editing user interface 620*d*2 and/or via a rotational input via rotatable and depressible input mechanism 604**.

Editing user interface **620*d*2 further includes cancel user-interactive graphical user interface object 630 which, when selected, causes computer system 600 to stop displaying editing user interface 620*d*2 and display editing user interface 620*d*1. Editing user interface 620*d*2 further includes off user-interactive graphical user interface object 634 which, when selected, edits watch user interface 606 to be displayed without a complication (e.g., without 606*d*1 or 606*d*2**).

Editing user interface **620*d*2 further includes positional indicator 626*c*. Positional indicator 626*c* includes a graphical indication of the number of selectable options for the complication displayed with watch user interface 606, as well as the position of the complication within the list of selectable complication options that currently has focus selection. For example, at FIG. 6M, positional indicator 626*c* indicates the relative position of complication 606*d*2** within the list of selectable complication options to be displayed with watch user interface 606.

At FIG. 6M, computer system 600 detects tap input 650*g* on complication 606*d*2 and press input 636*a* via rotatable and depressible input mechanism while complication has 606*d*2 has focus selection. At FIG. 6N, in response to detecting tap input 650*g* or press input 636*a*, computer system 600 displays editing user interface 620*d*3, which includes representation 618*e*2. Representation 618*e*2 is significantly the same as representation 618*e*1, except that the complication option has been edited so that representation 618*e*2 includes complication 606*d*2, which is a heart rate complication, instead of complication 606*d*1, which is a weather complication.

At FIG. 6M, computer system 600 detects press input 636*b* via rotatable and depressible input mechanism 604. At FIG. 6O, in response to press input 636*b*, computer system 600 displays selection user interface 610*b*, which is significantly the same as selection user interface 610*a* except that it includes representation 618*f*, which includes edits to watch user interface 606 made at FIGS. 6G-6N. In particular, representation 618*f* differs from representation 618*a* in that the current time 606*b*3 is displayed in a different font, and representation 618*f* includes complication 606*d*2 instead of complication 606*d*1.

At FIG. 6O, computer system 600 detects tap input 650*h* on representation 618*f* and press input 636*c* via rotatable and depressible input mechanism 604. At FIG. 6P, in response to detecting tap input 650*h* or press input 636*c*, computer system 600 displays watch user interface 638, which includes background element 606*a*, system text 606*b* displayed in a different font than was used for watch user interface 606 at FIG. 6A, foreground element 606*c*, and complication 606*d*2.

At FIG. 6Q, computer system 600 displays watch user interface 640. In some embodiments, computer system 600 transitions from displaying watch user interface 638 to displaying watch user interface 640 in response to an input (e.g., a tap input on watch user interface 638). In some embodiments, computer system 600 transitions from displaying watch user interface 638 to displaying watch user interface 640 based on the passage of time (e.g., system text 606*b* indicates that the current time at FIG. 6P is 10:09, whereas system text 640*b* indicates that the current time at FIG. 6Q is 3:08). In some embodiments, computer system 600 transitions from displaying watch user interface 638 to displaying watch user interface 640 in response to a wrist raise gesture.

Watch user interface 640 includes background element 640*a*, system text 640*b*, foreground element 640*c*, and complication 640*d*. As with user interface 606, the elements of watch user interface 640 are arranged and displayed in a virtual stack. The elements of watch user interface 640 are arranged so that background element 640*a* is beneath system text 640*b*, which is beneath complication 640*d*, which is beneath foreground element 640*c*. Notably, the virtual arrangement of having a foreground element (e.g., 640*c*) in front of (e.g., overlaying) a complication (e.g., 640*d*) differs from watch user interface 606.

In some embodiments, when computer system generates and/or creates a watch user interface, such as watch user interface 640, based on an image with depth data, computer system 600 virtually arranges the layers in accordance with a determination that the layers can be displayed in a certain order without particular layers arranged on top obscuring the layers arranged below beyond a threshold amount. For example, in some embodiments, a foreground element (e.g., 640*c*) is arranged in front of (e.g., overlaying) a complication (e.g., 640) in accordance with a determination that the foreground element will not obscure the complication by more than a threshold amount (e.g., ⅕ of the complication, ⅙ of the complication, etc.).

The process described above for layering a foreground element above a complication can also be applied to the layering of a foreground element above system text. For example, as described below with respect to FIG. 6R, computer system 600 may generate a watch user interface based on a media item with depth data wherein a foreground element is arranged beneath system text in accordance with a determination that there is not sufficient space in the media item to generate and/or display a watch user interface based on the media item wherein the system text can be arranged beneath the foreground element such that the system text will not be obscured beyond a threshold amount.

At FIG. 6R, computer system 600 displays watch user interface 642. In some embodiments, computer system 600 transitions from displaying watch user interface 640 to displaying watch user interface 642 in response to an input (e.g., a tap input on watch user interface 640). In some embodiments, computer system 600 transitions from displaying watch user interface 640 to displaying watch user interface 642 based on the passage of time (e.g., system text 640*b* indicates that the current time at FIG. 6Q is 3:08, whereas system text 642*b* indicates that the current time at FIG. 6R is 9:01). In some embodiments, computer system 600 transitions from displaying watch user interface 640 to displaying watch user interface 642 in response to a wrist raise gesture.

Watch user interface 642 includes background element 642*a*, system text 642*b*, foreground element 642*c*, and complication 642*d*. As with watch user interface 606 and watch user interface 640, the elements of watch user interface 642 are virtually arranged as layers. In watch user interface 642, the elements of watch user interface 640 are arranged in a virtual stack so that background element 642*a* is beneath foreground element 640*c*, which is beneath system text 642*b* and complication 642*d*1. Notably, the arrangement of having a foreground element (e.g., 640*c*) virtually arranged beneath system text 642*b* differs from watch user interface 606.

In some embodiments, when computer system generates a watch user interface such as watch user interface 642 based on a media with depth data, computer system 600 arranges elements of the watch user interface in a virtual stack in accordance with a determination that the layers can be displayed in a certain order without particular layers arranged on top obscuring the layers arranged below beyond a threshold amount. For example, in some embodiments, a foreground element (e.g., 642*c*) is arranged in front of (e.g., overlaying) system text (e.g., 642*b*) in accordance with a determination that the foreground element will not obscure more than a threshold amount of the system text (e.g., ⅕ of the system text, ⅙ of the system text, etc.).

At FIG. 6R, computer system 600 generates and displays watch user interface 642 in accordance with a determination that there is not sufficient space in the media item to generate a watch user interface wherein system text 642*b* arranged beneath the foreground element, and such that system text 642*b* is not be obscured or blocked beyond a threshold amount by foreground element 642*c*. Thus, computer system 600 generates watch user interface 642 with the elements of watch user interface 642 arranged in a virtual stack such that foreground element is beneath system text 642*b*.

FIGS. 6S-6U illustrate user interfaces for enabling and displaying user interfaces using a media item with depth data via computer system 660, wherein computer system 660 is in wireless communication with computer system 600. In some embodiments, computer system 600 and computer system 660 are logged into a same user account. In some embodiments, computer system 600 and computer system 660 are paired. In some embodiments, computer system 660 optionally includes one or more features of device 100, device 300, or device 500. In some embodiments, computer system 660 is a tablet, phone, laptop, desktop, camera, etc.

At FIG. 6S, computer system 660 displays, via display 662, my watch user interface 675*a*, which includes options for editing watch user interfaces that can be displayed via computer system 600. My watch user interface 675*a* includes back user-interactive graphical user interface 644 which, when selected, causes computer system 660 to display a user interface for selecting which computer system (e.g., watch) is being configured via computer system 660. My watch user interface 675*a* further includes watch name 646, which indicates that the watch currently selected to be configured via computer system 660 is Jane's Watch. In FIG. 6S, computer system 600 corresponds to Jane's Watch. My watch user interface 675*a* further includes search bar 664 which, when selected, can be used to search among multiple selectable watch user interfaces available via computer system 600 for configuration via computer system 660.

My watch user interface 675*a* further includes header 647, which includes a visual and/or textual indication that the representations of watch faces displayed below header 647 correspond to watch faces that are available on (e.g., stored in the local memory of) computer system 600 (e.g., Jane's Watch). My watch user interface 675*a* includes representations of a plurality of watch faces available on computer system 600, including representation 648 of a watch user interface titled "Meridian," representation 652 of a watch user interface titled "Portrait," which corresponds to watch user interface 642 being displayed via computer system 600, and representation 654 of a watch user interface titled "Motion."

My watch user interface 675*a* further includes options region 666. Options region 666 includes multiple selectable options for configuring various features of computer system 600. Options region 666 includes notifications user-interactive graphical user interface object 666*a* which, when selected, causes computer system 660 to display a user interface for editing notifications settings of computer system 600. Options region 666 further includes display user-interactive graphical user interface object 666*b* which, when selected, causes computer system 660 to display a user interface including options for editing the display and brightness settings of computer system 600.

My watch user interface 675*a* further includes selectable options for displaying, via computer system 660, user interfaces other than my watch user interface 675*a* related to configuring features of computer system 600. For example, my watch user interface 675*a* includes face gallery user-interactive graphical user interface object 656 which, when selected, causes computer system 660 to display a user interface for viewing additional watch user interfaces available on computer system 600. My watch user interface 675*a* further includes discover user-interactive graphical user interface object 658 which, when selected, causes computer system 660 to display a user interface for obtaining (e.g., downloading) additional watch user interfaces onto computer system 600 that have not yet been downloaded onto computer system 600. My watch user interface 675*a* further includes face gallery user-interactive graphical user interface object 654, which corresponds to my watch user interface 675*a* and which, when selected, causes computer system 660 to display my watch user interface 675*a*.

In FIG. 6S, computer system 600 displays watch user interface 642, which maintains the features of watch user interface 642 as described and illustrated in FIG. 6R, as discussed above. At FIG. 6S, computer system 660 detects tap input 650*i* on representation 652*a*, which corresponds to watch user interface 642 that is then being displayed on computer system 600.

At FIG. 6T, in response to detecting tap input 650*i*, computer system 660 displays my watch user interface 675*b*, which includes additional options for configuring the way that watch user interface 642 is displayed via computer system 600. My watch user interface 675*b* includes back user-interactive graphical user interface 671 which, when selected, causes computer system 660 to display my watch user interface 675*a*. My watch user interface 675*b* further includes face name 676, which indicates that the name of the watch user interface currently selected to be configured via computer system 660 is "Portrait." My faces user interface 675*b* further includes share user-interactive graphical user interface object 669 which, when selected, causes computer system 660 to display user interfaces related to transmitting and/or sharing information related to watch user interface 642 with another device (e.g., another computer system).

My watch user interface 675*b* further includes representation 652*a* is a representation of the watch user interface currently being displayed on computer system 600 (e.g., watch user interface 642). In some embodiments, representation 652*a* is a live preview of the currently selected configuration that has been selected for display via computer system 600. Thus, in some embodiments, representation 652*a* is updated in response to inputs received via computer system 660, such that selecting options on my faces user interface 675*b* cause both representation 652*a* as displayed by computer system 660 and watch user interface 642 as displayed by 600 to be updated. Watch user interface further includes description 674, which includes a textual description of the features of the watch user interface currently selected for editing (e.g., the "Portrait" watch user interface, corresponding to watch user interface 642).

My watch user interface 675*b* further includes colors region 668 for selecting a color with which to display aspects of watch user interface 642 via computer system 600. Colors region 668*a* includes selected color 668*a*, which indicates the currently selected color that aspects of watch user interface 642 are being displayed in. In some embodiments, the aspects affected by the color selection include system text 642*b*. In this way, watch user interface 675*b* can be used to edit the color of aspects of watch user interface 642 in a similar way to the color editing process described above with respect to editing user interface 620*c*1.

Watch user interface 675*b* further includes options region 670, which includes selectable options for editing aspects of watch user interface 642. Options region 670 includes content header 670*a*, which indicates that the options included in region 670 below header 670*a* are for editing the content of the currently selected watch user interface (e.g., 642). Region 670 further includes album user-interactive graphical user interface object 670*b* which, when selected, configures the "Portrait" watch user interface to be displayed using media items with depth data from a selected album of media items. Selection indicator 672 is displayed as a checkmark on album user-interactive graphical user interface object 670*b* to indicate that watch user interface 642 is currently configured to be displayed using an album of media items. Album name user-interactive graphical user interface object 670*c*1 includes the title of the album from which the media items including depth data that computer system 600 uses to generate watch user interfaces are being selected from. At FIG. 6T, album name user-interactive graphical user interface object 670*c*1 indicates that the media items with depth data being used to generate watch user interface 642 are currently being selected from an album titled "Spring." Region 670 further includes photos user-interactive graphical user interface object 670*d* which, when selected, configures the "Portrait" watch user interface (e.g., 642) to be displayed using media items with depth data from a photos album accessible by computer system 600 and/or computer system 600. Region 670 further includes dynamic user-interactive graphical user interface object 670*e* which, when selected, configures the "Portrait" watch user interface (e.g., 642) to be displayed using media items with depth data from new and/or updated media items and/or media items with depth data that become newly available via computer system 600 and/or computer system 660.

At FIG. 6U, computer system 660 displays my watch user interface 675*c*. At FIG. 6U, in my watch user interface 675*c*, album name user-interactive graphical user interface object 670*c*1 has been replaced with album name user-interactive graphical user interface object 670*c*2, which indicates that the album of media items with depth data from which the "Portrait" watch user interface is being generated has been updated from "Spring" to "Summer." Accordingly, representation 652*a* has been replaced with representation 652*b*, which corresponds to watch user interface 680 that is being displayed via 600.

Watch user interface 680 is generated and displayed by computer system 600 based on a media item with depth data chosen from an album titled "Summer" rather than the previously selected album titled "Spring." In some embodiments, computer system 660 transitions from my watch user interface 675*b* to my watch user interface 675*c* and computer system 600 transitions from displaying watch user interface 642 to displaying watch user interface 680 in response to a sequence of user inputs received at computer system 660, including a tap input on album name user-interactive graphical user interface object 670*c*1. Thus, at FIG. 6U, in response to a sequence of one or more user inputs received via computer system 660 including a tap input on album name 670*c*1 while my watch user interface 675*b* is displayed, computer system 600 displays watch user interface 680, which includes background element 680*a*, system text 680*b*, foreground object 680*c*, and complication 680*d*.

Thus, FIGS. 6S-6U illustrate that the watch user interface displayed via computer system 600 can be updated and/or configured via inputs received at a computer system in wireless communication with (e.g., paired with) computer system 600. Moreover, FIGS. 6S-6U demonstrate that the source of the media items with depth data that are used to generate watch user interfaces for display via computer system 600 can be edited and/or configured manually via computer system 660 (e.g., a computer system in wireless communication with computer system 600).

FIG. 7 is a flow diagram illustrating a method for managing watch faces based on depth data of a previously captured media item using a computer system in accordance with some embodiments. Method 700 is performed at a computer system (e.g., 100, 300, 500, 600) (e.g., a smartwatch, a wearable electronic device, a smartphone, a desktop computer, a laptop, a tablet) that is in communication with a display generation component and one or more input devices (e.g., a display controller, a touch-sensitive display system, a rotatable input mechanism, a touch-sensitive surface). Some operations in method 700 are, optionally, combined, the orders of some operations are, optionally, changed, and some operations are, optionally, omitted.

As described below, method 700 provides an intuitive way for managing watch faces based on depth data of a previously captured media item. The method reduces the cognitive burden on a user for managing watch faces based on depth data of a previously captured media item, thereby creating a more efficient human-machine interface. For battery-operated computing devices, enabling a user to manage watch faces based on depth data of a previously captured media item faster and more efficiently conserves power and increases the time between battery charges.

In some embodiments, the watch faces described in method 700 can be displayed and/or edited in the manner described below with respect to method 1500 (e.g., FIG. 15) and/or as described below with respect to FIGS. 14A-14R.

The computer system (e.g., 600), receives (702), via the one or more input devices, an input that corresponds to a request to display a user interface based on a media item (e.g., a raise to wake gesture, a tap gesture, a digital crown rotation gesture, or the like).

In response to receiving the input, the computer system displays (704), via the display generation component, a user interface (e.g., 606) (e.g., a watch user interface, a wake screen, a watch face, a lock screen). Displaying the user interface includes concurrently displaying: a media item (706) (e.g., a photo, a video, a GIF, an animation) that includes a background element (e.g., 606*a* as illustrated in FIG. 6B) and a foreground element (e.g., 606*c* as illustrated in FIG. 6B) that is segmented from the background element based on depth information and system text (e.g., 606*b* as illustrated in FIG. 6B) (708) (e.g., a first time, a current date), wherein the system text is displayed in front of (e.g., visually overlaying or at a location that corresponds to a portion of) the background element and behind (e.g., at least partially visually overlaid by) the foreground element and has content that is dynamically selected based on a context of the computer system. In some embodiments, the media item includes depth data (e.g., data that can be used to segment a foreground element from one or more background elements such as data indicating that the foreground element was less than a threshold distance away from one or more cameras when the media was captured and a background element was more than the threshold distance away from the one or more cameras when the media was captured or a data set related to the distance between two objects in the media, a data set including the relative distances between a camera sensor and at least a first and second object that were in the field of view of the camera sensor at the time the media was captured, a plurality of layers). In some embodiments, the background element and the foreground element are selected (in some embodiments, automatically) based on the depth data (e.g., in accordance with a determination that the background element is positioned behind the foreground element). Automatically creating a user interface (e.g., 606 as illustrated in FIG. 6B), wherein displaying the user interface includes concurrently displaying a media item that includes a background element, a foreground element that is segmented from the background element based on depth information, and system text, wherein the system text is displayed in front of the background element and behind the foreground element and has content that is dynamically selected based on a context of the computer system, enables the user interface to be displayed without requiring the user to provide multiple inputs to configure the user interface (e.g., configuring the user interface by manually dividing the media item into segmented elements, and/or by selecting which element of the media should be the foreground element and which element of the media item should be the background element). Performing an operation when a set of conditions has been met without requiring further user input enhances the operability of the device and makes the user-device interface more efficient (e.g., by helping the user interface to be displayed by determining that the media item includes a background element and a foreground element segmented from the background element based on depth information) which, additionally, reduces power usage and improves battery life of the device by enabling the user to use the device more quickly and efficiently.

In some embodiments, in accordance with a determination that the input was received in a first context (e.g., at a first time, on a first date, in a first time zone), the computer system (e.g., 600) displays first content in the system text (e.g., **606*b* as illustrated in FIG. 6B) (e.g., a first time, a first date). In some embodiments, in accordance with a determination that the input was received in a second context (e.g., at a second time, on a second date, in a second time zone), the computer system displays second content (e.g., 640*b* as illustrated in FIG. 6**Q) (e.g., a second time, a second date) different from the first content in the system text. Displaying system text that has different content depending on different contexts provides visual feedback about the context of the computer system. Providing improved feedback enhances the operability of the device and makes the user-device interface more efficient (e.g., by helping the user to be able to quickly and easily view information about the context of the computer system) which, additionally, reduces power usage and improves battery life of the device by enabling the user to use the device more quickly and efficiently.

In some embodiments, the computer system (e.g., 600) detects a change in context of the computer system (e.g., a change in time, a change in date, a change in time zone). In some embodiments, in response to detecting the change in context of the computer system, the computer system updates the system text (e.g., **606*b* as illustrated in FIG. 6**B) at least partially based on the change in context. In some embodiments, updating the system text includes revising the system text to display different content. Updating the system text based on a change in context of the computer system provides improved visual feedback by enabling the computer system to display context-specific system text to quickly and easily inform a user about current context information. Providing improved feedback enhances the operability of the device and makes the user-device interface more efficient (e.g., by helping the user to quickly and easily view context information) which, additionally, reduces power usage and improves battery life of the device by enabling the user to use the device more quickly and efficiently.

In some embodiments, the user interface based on a media item is a watch face (e.g., 606 as illustrated in FIG. 6B) (e.g., a watch face that includes an indication of time and one or more watch complications). Displaying a user interface as a watch face provides improved visual feedback by helping a user to quickly and easily access the information provided by the user interface conveniently in a watch face. Providing improved feedback enhances the operability of the device and makes the user-device interface more efficient (e.g., by helping the user to quickly and easily access the information included in the user interface) which, additionally, reduces power usage and improves battery life of the device by enabling the user to use the device more quickly and efficiently.

In some embodiments, the user interface (e.g., 606 as illustrated in FIG. 6B) is an initially displayed screen (e.g., a wake screen or a lock screen) of the computer system (e.g., 600) (e.g., a smartphone, a tablet, a computer, a TV) when the computer system transitions from a low power state (e.g., as illustrated in FIG. 6A) (e.g., an off state, a sleeping state, a low power mode, a battery saver mode, an eco-mode) to a higher power state (e.g., an active state, an on state, a normal (e.g., non-low power) mode). Initially displaying the user interface when the computer system transitions from a low power state to a higher power state provides improved visual feedback by helping a user quickly and easily access the information when the computer system transitions from the low power state to the higher power state (e.g., upon wake). Providing improved feedback enhances the operability of the device and makes the user-device interface more efficient (e.g., by helping the user to access the information provided in the user interface) which, additionally, reduces power usage and improves battery life of the device by enabling the user to use the device more quickly and efficiently.

In some embodiments, the user interface is a lock screen (e.g., 606 as illustrated in FIG. 6A) (e.g., where authentication (e.g., biometric authentication; passcode authentication) is required to unlock the computer system). In some embodiments, the lock screen includes a prompt (e.g., an instruction) to provide information to unlock the device. Displaying the user interface as a lock screen improves visual feedback by helping a user to quickly and easily access the information provided in the user interface while limiting access to other features of the device based on the lock state of the device. Providing improved visual feedback enhances the operability of the device and makes the user-device interface more efficient (e.g., by helping the user to access the information included in the user interface while the device is in a locked state) which, additionally, reduces power usage and improves battery life of the device by enabling the user to use the device more quickly and efficiently. In addition, displaying the user interface as a lock screen user interface improves the security of the device while maintaining functionality by helping the user to view the information included in the user interface while other features of the computer system are not enabled due to the device being in a locked state.

In some embodiments, displaying the system text (e.g., **606*b* as illustrated in FIG. 6B) includes displaying a current time (e.g., 606*b*3 as illustrated in FIG. 6B) (e.g., a current time of day; the time in the current time zone) and/or a current date in the system text. In some embodiments, the text is continuously updated with the passage of time to reflect the current time of day. In some embodiments, text is coordinated with and/or intended to reflect the coordinated universal time with an offset based on a currently selected time zone. Displaying the user interface (e.g., 606 as illustrated in FIG. 6**B), wherein displaying the user interface includes displaying system text that includes a current time and/or a current date allows user interface to include information about a current activity state of the computer system, which provides improved visual feedback by enabling a user to quickly and efficiently view current activity state information. Providing improved visual feedback enhances the operability of the device and makes the user-device interface more efficient (e.g., by helping the user to quickly determine the date/time) which, additionally, reduces power usage and improves battery life of the device by enabling the user to use the device more quickly and efficiently.

In some embodiments, the system text (e.g., 606*b* as illustrated in FIG. 6B) is at least partially obscured by the foreground element (e.g., 606*c* as illustrated in FIG. 6B). Displaying system text, wherein the system text is at least partially obscured by the foreground element of a media item allows elements displayed in a user interface (e.g., 606 as illustrated in FIG. 6B) (e.g., the system text and/or the foreground element) to be displayed at a larger size without reducing the functionality and/or readability of the system text, which provides improved visual feedback by allowing a user to easily and efficiently view the content of the system text (e.g., in a larger font, to improve readability) and/or view the foreground element of the media item at a larger size to see foreground element more clearly. Providing improved feedback enhances the operability of the device and makes the user-device interface more efficient (e.g., by helping the user to view the foreground element and the system text at larger sizes without hindering readability) which, additionally, reduces power usage and improves battery life of the device by enabling the user to use the device more quickly and efficiently.

In some embodiments, the media includes a photo and/or a video. Displaying a user interface that includes system text (e.g., 606*b* as illustrated in FIG. 6B) and a media item, wherein the media item is a photo and/or a video, provides improved visual feedback by allowing a user to easily and efficiently view a photo and/or a video while concurrently viewing the system text. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the user interface (e.g., 606 as illustrated in FIG. 6B) includes displaying an animation. In some embodiments, the animation includes a change over time of the appearance of one or more of the elements of the user interface based at least partially on the depth information. In some embodiments, the animation includes displaying the foreground element with a first set of characteristics and the background element with a second set of characteristics different from the first set of characteristics. Displaying an animation, wherein the animation includes a change over time of the appearance of one or more elements of the user interface based at least partially on the depth information of the media item, wherein displaying the animation provides improved visual feedback about which portion of the media item is the background element (e.g., 606*a* as illustrated in FIG. 6B) and which portion of the media item is the foreground element (e.g., 606*c* as illustrated in FIG. 6B). Providing improved feedback enhances the operability of the device and makes the user-device interface more efficient (e.g., by visually identifying the different elements of the media item) which, additionally, reduces power usage and improves battery life of the device by enabling the user to use the device more quickly and efficiently.

In some embodiments, the animation includes a simulated rack focus effect. In some embodiments, the rack focus effect includes blurring the background element (e.g., 606*a* as illustrated in FIG. 6B). In some embodiments, the rack focus effect includes decreasing the blur of (e.g., focusing) the foreground element (e.g., 606*c* as illustrated in FIG. 6B). In some embodiments, the rack focus effect includes blurring the background element while decreasing the blur of the foreground element. Displaying an animation of the media item that includes a simulated rack focus effect provides improved visual feedback about which portion of the media item is the background element and which portion of the media item is the foreground element. Providing improved feedback enhances the operability of the device and makes the user-device interface more efficient (e.g., by visually identifying the different elements of the media item) which, additionally, reduces power usage and improves battery life of the device by enabling the user to use the device more quickly and efficiently.

In some embodiments, the animation includes a simulated dolly zoom effect. In some embodiments, the dolly zoom effect includes displaying an animation where a simulated camera moves toward or away from the foreground element (e.g., 606*c* as illustrated in FIG. 6D) while adjusting a zoom in such a way as to keep the foreground element (e.g., 606*c*) the same size to create a visual effect where the background (e.g., 606*a* as illustrated in FIG. 6D) grows in size and detail or the foreground increases in size relative to the background. In some embodiments, the dolly zoom effect includes updating a simulated zoom effect applied to background element (e.g., 606*a*) while maintaining the foreground element (e.g., 606*c* as illustrated in FIG. 6D) at a constant zoom level. In some embodiments, the dolly zoom effect includes zooming out on the background element (e.g., 606*a*) while maintaining the simulated zoom level applied to the foreground element (e.g., 606*c*). In some embodiments, the dolly zoom effect includes zooming in on the background element (e.g., 606*a*) while maintaining the simulated zoom level applied to the foreground element (e.g., 606*c*). Displaying an animation of the media item that includes a simulated dolly zoom effect provides improved visual feedback about which portion of the media item is the background element and which portion of the media item is the foreground element (e.g., 606*c*). Providing improved visual feedback enhances the operability of the device and makes the user-device interface more efficient (e.g., by visually identifying the different elements of the media item) which, additionally, reduces power usage and improves battery life of the device by enabling the user to use the device more quickly and efficiently.

In some embodiments, the animation includes a parallax effect (e.g., as illustrated in FIG. 6C). In some embodiments, the parallax effect includes updating the position at which the foreground element (e.g., 606*c* as illustrated in FIG. 6C) is displayed relative to the background element (e.g., 606*a* as illustrated in FIG. 6C). In some embodiments, the parallax effect includes translating the foreground element on the display at a first velocity and translating the background element on the display at a second velocity different from the first velocity. Displaying an animation of the media item that includes a parallax effect provides improved visual feedback about which portion of the media item is the background element and which portion of the media item is the foreground element. Providing improved feedback enhances the operability of the device and makes the user-device interface more efficient (e.g., by visually identifying the different elements of the media item) which, additionally, reduces power usage and improves battery life of the device by enabling the user to use the device more quickly and efficiently.

In some embodiments, the computer system (e.g., 600) detects movement (e.g., of the computer system; e.g., a movement caused by a user of the computer system (e.g., a wrist tilt gesture, a wrist tilt gesture)) (e.g., as illustrated in FIG. 6C) while the computer system is in a higher power state (e.g., an active state, an on state, a normal (e.g., non-low power) mode). In some embodiments, in response to detecting the movement, the computer system displays, via the display generation component, the user interface with a simulated parallax effect that has a direction and/or magnitude that is determined based on a direction and/or a magnitude of the movement. In some embodiments, the parallax effect is at least partially based on the degree and/or direction of the movement. In some embodiments, displaying the user interface (e.g., 606 as illustrated in FIG. 6C) with a simulated parallax effect includes displaying the media item with a simulated panning effect, wherein the foreground element is shown as moving more quickly as the field of view pans than the background element. In some embodiments, the user interface is not displayed with a parallax effect in response to detecting the movement while the computer system is in a low power state (e.g., an off state, a sleeping state, a low power mode, a battery saver mode, an eco-mode). Displaying an animation of the media item that includes a parallax effect in response to movement provides improved visual feedback about which portion of the media item is the background element and which portion of the media item is the foreground element. Providing improved feedback enhances the operability of the device and makes the user-device interface more efficient (e.g., by visually identifying the different elements of the media item) which, additionally, reduces power usage and improves battery life of the device by enabling the user to use the device more quickly and efficiently.

In some embodiments, the computer system (e.g., 600) displays, via the display generation component, an editing user interface (e.g., 620*a*1) for editing a first complication (e.g., 606*d*1 as illustrated in FIG. 6B) of the user interface (e.g., 606 as illustrated in FIG. 6B). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, while displaying the editing user interface, the computer system receives, via the one or more input devices, a first sequence of one or more user inputs (e.g., touch inputs, rotational inputs, press inputs). In some embodiments, in response to receiving the first sequence of one or more user inputs, the computer system edits the first complication (e.g., as illustrated in FIGS. 6L-6N). In some embodiments, wherein the complication includes information from a first application, editing the complication includes editing the complication to display different information from the first application. In some embodiments, editing the complication includes editing the complication to display different information from a second application different from the first application. Editing a first complication in response to receiving a sequence of one or more user inputs while the editing user interface is displayed enables a user to edit a first complication easily and in an intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the system text (e.g., 606*b* as illustrated in FIG. 6B) displayed in the user interface (e.g., 606 as illustrated in FIG. 6B) is displayed with a first font. In some embodiments, after displaying the user interface with the system text displayed with a first font, the computer system receives, via the one or more input devices, a request to edit the user interface (e.g., touch inputs, rotational inputs, press inputs) (e.g., as illustrated in FIG. 6F). In some embodiments, in response to receiving the request to edit the user interface, the computer system displays, via the display generation component, an editing user interface (e.g., 620*a*1) for editing the user interface. In some embodiments, while displaying the editing user interface, the computer system receives, via the one or more input devices, a second sequence of one or more user inputs (e.g., touch inputs, rotational inputs, press inputs) (e.g., as illustrated in FIGS. 6G-6H). In some embodiments, in response to receiving the second sequence of one or more user inputs, the computer system selects a second font for the system text. In some embodiments, after selecting the second font for the system text, the computer system displays the user interface. In some embodiments, the system text displayed in the user interface is displayed with a second font different from the first font (e.g., as illustrated in FIG. 6P). In some embodiments, updating the user interface to display the system text with a second font different from the first font involves updating the user interface to cease displaying the system text in the first font. Editing the font that the system text is displayed with in response to receiving a second sequence of one or more user inputs while the editing user interface is displayed enables a user to edit the font easily and in an intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the system text (e.g., 606*b* as illustrated in FIG. 6B) displayed in the user interface (e.g., 606) is displayed with a first color. In some embodiments, after displaying the user interface, with the system text displayed with a first color, the computer system receives, via the one or more input devices, a second request to edit the user interface. In some embodiments, in response to receiving the second request to edit the user interface, the computer system displays, via the display generation component, an editing user interface for editing the user interface (e.g., 620*c*1). In some embodiments, while displaying the editing user interface, the computer system receives, via the one or more input devices, a third sequence of one or more user inputs (e.g., touch inputs, rotational inputs, press inputs). In some embodiments, in response to receiving the third sequence of one or more user inputs, the computer system selects a second color for the system text. In some embodiments, after selecting the second color for the system text, the computer system displays the user interface with the system text displayed in the user interface is displayed with a second color different from the first color. In some embodiments, updating the user interface to display the system text in a second color different from the first font involves updating the user interface to cease displaying the system text in the first color. Editing the color that the system text is displayed with response to receiving a third sequence of one or more user inputs while the editing user interface is displayed enables a user to edit the color easily and in an intuitive manner. Providing improved control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects that a predetermined condition has been satisfied (e.g., a predetermined amount of time has passed, a user input (e.g., a tap, a wrist raise) has been detected). In some embodiments, in response to detecting that the predetermined condition has been satisfied, the computer system displays the user interface (e.g., 606 as illustrated in FIG. 6B). In some embodiments, the user interface is based on a second media item instead of being based on the media item (e.g., as illustrated in FIG. 6Q). In some embodiments, displaying the user interface includes concurrently displaying the second media item (that includes a second background element and a second foreground element that is segmented from the second background element based on depth information) and system text (e.g., 640*b* as illustrated in FIG. 6Q). In some embodiments, the system text is displayed in front of the second background element (e.g., 640*a*) and behind the second foreground element (e.g., 640*c*) and has content that is dynamically selected based on the context of the computer system (e.g., as illustrated in FIG. 6Q). In some embodiments, the predetermined condition is satisfied when the computer detects an input via one or more input devices (e.g., a tap input, a rotational input, and/or a movement). In some embodiments, the predetermined condition is satisfied when the computer system changes state (e.g., from a low power state to a higher power state, from an off state to an on state, from a sleep state to a wake state). In some embodiments, the second media item is selected automatically. In some embodiments, the second media item includes depth data. In some embodiments, the second media item includes a second background element and a second foreground element. Conditionally causing, based on whether a predetermined condition has been satisfied, the media item to cease to be displayed and for the user interface based on a second media item to be displayed, causes the operation to be performed by the specific device without requiring further user input. Performing an operation when a set of conditions has been met without requiring further user input enhances the operability of the device and makes the user-device interface more efficient (e.g., by helping the user interface to be displayed based on an updated media item when a certain condition is satisfied) which, additionally, reduces power usage and improves battery life of the device by enabling the user to use the device more quickly and efficiently.

In some embodiments, the computer system (e.g., 600, 660) displays, via the display generation component, a media selection user interface (e.g., 675*b*) that includes a set of media items (e.g., as illustrated in FIG. 6S) (e.g., from a media library of the computer system). In some embodiments, the computer system receives, via the one or more input devices, a fourth sequence of one or more user inputs (e.g., touch inputs, rotational inputs, press inputs) corresponding to a selection of a third media item. In some embodiments, in response to receiving the fourth sequence of one or more user inputs (e.g., touch inputs, rotational inputs, press inputs) corresponding to a selection of a subset of the set of media items including a third media item, the computer system displays the user interface. In some embodiments, the user interface is based on the third media item. In some embodiments, the computer system generates a set of eligible media items based at least partially on the characteristics of media items (e.g., availability of depth information, a shape of the depth information, a presence of a particular type of point of interest (e.g., a face, a pet, a favorite person)), a location of a point of interest (e.g., a face, a pet, a significant foreground element) in the media item. In some embodiments, the set of media items is a subset of a larger set of media items accessible from (e.g., stored on) the computer system (e.g., a photos album). Displaying the user interface based on the third media item in response to receiving the fourth sequence of one or more user inputs corresponding to a selection of the third media item enables a user to edit user interface to be displayed based on a selected media item easily and in an intuitive manner. Providing improved control options enhances the operability of the device and makes the user-device interface more efficient (e.g., by helping the user to provide select the media item that the user interface will be based on) which, additionally, reduces power usage and improves battery life of the device by enabling the user to use the device more quickly and efficiently.

In some embodiments, in accordance with a determination that a plurality of media items contains at least one media item that satisfies a first set of predetermined criteria (e.g., availability of depth information, a shape of the depth information, a presence of a particular type of point of interest (e.g., a face, a pet, a favorite person), a location of a point of interest (e.g., a face, a pet, a significant foreground element) in the media), adding one or more media items that satisfy the first set of predetermined criteria to a subset of media items selected for use with the user interface (e.g., 606). In some embodiments, in accordance with a determination that the plurality of media items does not contain at least one media item that satisfies the first set of predetermined criteria, the computer system forgoes adding media items to the subset of media items selected for use with the user interface. In some embodiments, the determination that the plurality of media items contains at least one media item that satisfies the first set of criteria includes evaluating the plurality of media items available to (e.g., accessible by) the computer system to determine whether media items in the plurality of media items satisfy the first set of predetermined criteria. In some embodiments, after adding one or more media items that satisfy the first set of predetermined criteria to the subset of media items, displaying the user interface. In some embodiments, as a part of displaying the user interface, the computer system automatically selects (e.g., without user input) a fourth media item from the subset of media items selected for use with the user interface and after selecting the fourth media item from the subset of media items selected for use with the user interface, the computer system displays the fourth media item. Displaying a user interface that includes a media item, wherein the media item is automatically selected based on a determination about a set of characteristics of the media item provides the user with a user interface based on a media item, without requiring the user to select a media item in order to view the user interface based on the media item. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the determination about a set of characteristics of the media item includes a determination that displaying the system text (e.g., 606*b*) behind the foreground element would not obscure more than a threshold amount of the system text. In some embodiments, the determination includes a determination that the media item contains a portion above the foreground element (e.g., at the top of the media item) that is sufficiently large enough for the system text to be displayed without being obscured more than a threshold amount. Displaying the user interface based on a media item, wherein the media item is selected based on whether displaying the system text behind a foreground element of the media item would cause it to be obscured more than a threshold amount provides the user with a user interface based on a media item, without requiring the user to select a media item in order to view the user interface (e.g., 640) based on the media item, without system text that is overly obscured (e.g., to maximize legibility and/or readability). Performing an operation when a set of conditions has been met without requiring further user input enhances the operability of the device and makes the user-device interface more efficient (e.g., by providing a user interface with readable system text behind a foreground element of a media item) which, additionally, reduces power usage and improves battery life of the device by enabling the user to use the device more quickly and efficiently.

In some embodiments, in accordance with a determination that a fifth media item (e.g., a photo, a video, a GIF, an animation) satisfies a first set of predetermined criteria, the computer system (e.g., 600) displays, via the display generation component, a second user interface (e.g., 640 as illustrated in FIG. 6Q) based on the fifth media item (e.g., a watch user interface, a wake screen, a watch face, a lock screen). As a part of displaying the second user interface the computer system concurrently displays the fifth media item that includes a third background element and a third foreground element that is segmented from the third background element based on depth information and system text (e.g., a first time, a current date). In some embodiments, the system text is displayed in front of (e.g., visually overlaying or at a location that corresponds to a portion of) the third background element and behind (e.g., at least partially visually overlaid by) the third foreground element and has content that is dynamically selected based on a third context of the computer system (e.g., 640 as illustrated in FIG. 6Q). In some embodiments, in accordance with a determination that the fifth media item does not satisfy the first set of predetermined criteria, the computer system displays, via the display generation component, the second user interface. In some embodiments, as a part of displaying the second user interface, the computer system concurrently displays the fifth media item that includes a third background element and a third foreground element that is segmented from the background element based on depth information and system text. In some embodiments, the system text is displayed in front of (e.g., visually overlaying or at a location that corresponds to a portion of) the third background element and in front of the third foreground element and has content that is dynamically selected based on the third context of the computer system (e.g., 642 as illustrated in FIG. 6R). Determining whether to display system text in front of or behind a foreground element of the media item based on predetermined criteria provides the user with a user interface based on a media item, wherein the position in which the system text is chosen based on the predetermined criteria, without requiring the user to select the position of the system text. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the fifth media item satisfies the first set of predetermined criteria, the computer system (e.g., 600) displays system text (e.g., 640*b* as illustrated in FIG. 6Q) in an upper portion (e.g., the top) of the second user interface. In some embodiments, in accordance with a determination that the fifth media item does not satisfy the first set of predetermined criteria, the computer system displays system text (e.g., 642*b*) in a lower portion (e.g., the bottom) of the second user interface (e.g., 642 as illustrated in FIG. 6S). Displaying a second user interface with the system text in either an upper portion or a lower portion of the user interface based on whether the fifth media item satisfies the first set of predetermined criteria provides the user with a user interface based on a media item, wherein the portion of the second user interface in which the system text is displayed is automatically determined without requiring the user to select the position of the system text. Performing an operation when a set of conditions has been met without requiring further user input enhances the operability of the device and makes the user-device interface more efficient (e.g., by selecting a preferred portion of the media item to display the system text in) which, additionally, reduces power usage and improves battery life of the device by enabling the user to use the device more quickly and efficiently.

In some embodiments, as a part of displaying the user interface, the computer system concurrently displays a second complication (e.g., 606*d*2 as illustrated in FIG. 6P). In some embodiments, the second complication is displayed in front of (e.g., visually overlaying or at a location that corresponds to a portion of) the foreground element (e.g., 606*c*). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). Displaying the second complication in front of the foreground element provides improved visual feedback by allowing a user to view the second complication without it being visually obscured by a foreground element of the media item, which provides visual feedback that the second complication can still be selected while the foreground element is displayed. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of displaying the user interface (e.g., 640), the computer system (e.g., 600) concurrently displays a third complication (e.g., 640*d*). In some embodiments, the third complication is displayed behind (e.g., at least partially visually overlaid by) the foreground element (e.g., 640*c* as illustrated in FIG. 6S). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). Displaying the second complication behind the foreground element provides improved visual feedback by visually emphasizing the foreground element of the media item while maintaining display of the second complication. Providing improved feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 700 (e.g., FIG. 7) are also applicable in an analogous manner to the methods described below with reference to method 900, 1100, and 1300. For example, method 700 optionally includes one or more of the characteristics of the various methods described above with reference to method 900. For example, a device can use as a watch user interface either a user interface that includes an indication of time based on geographic data as described with reference to FIGS. 8A-8M or a watch user interface as described with reference to FIGS. 6A-6U. As another example, a watch user interface as described with reference to FIGS. 6A-6U can include hour numerals that are updated based on the current time as described with reference to FIGS. 10A-10W with reference to method 1100. For another example, method 1300 optionally includes one or more of the characteristics of the various methods described above with reference to method 700. For example, the watch user interfaces of FIGS. 6A-6U can be created or edited via the process for updating and selecting watch user interfaces as described with reference to FIGS. 12A-12W. For another example, method 1500 optionally includes one or more of the characteristics of the various methods described above with reference to method 700. For example, the watch user interfaces of FIGS. 6A-6U can be edited first via a second computer system as illustrated with reference to FIGS. 14A-14R. For brevity, these details are not repeated below.

FIGS. 8A-8M illustrate exemplary user interfaces for managing clock faces based on geographic data. The user interfaces in these figures are used to illustrate the processes described below, including the processes in FIG. 9.

Figure 8A:
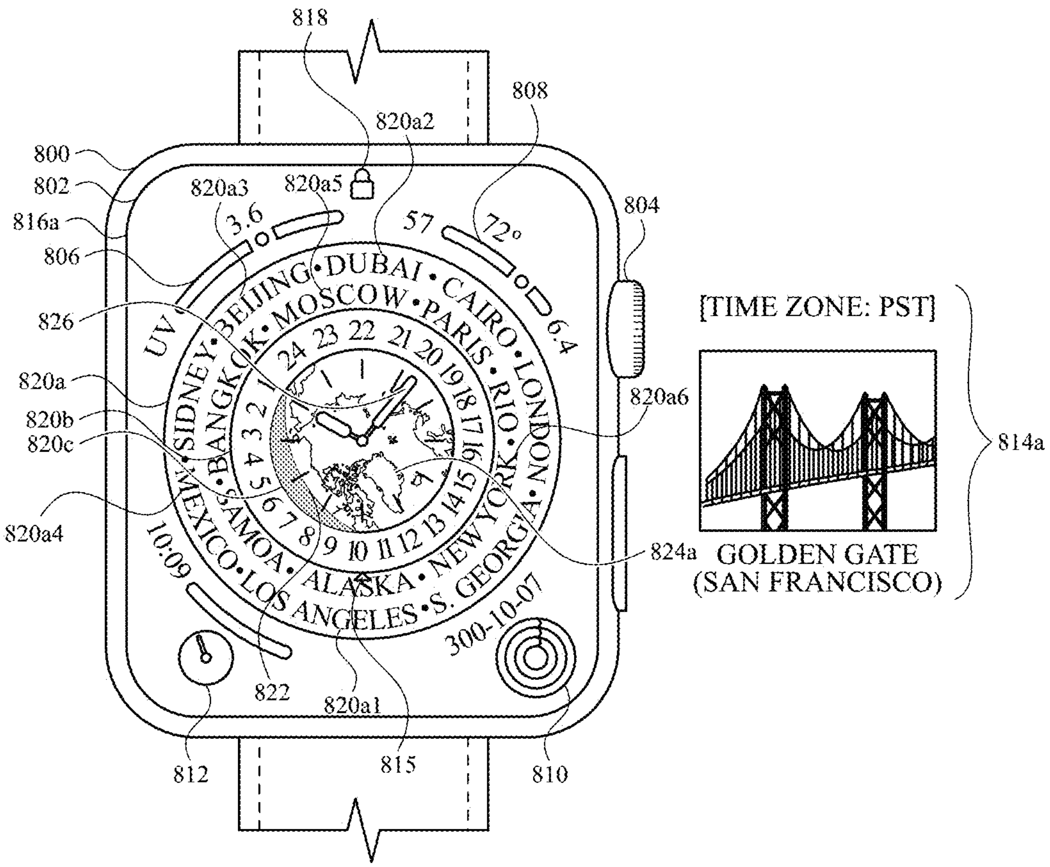
FIGS. 8A-8M illustrate exemplary user interfaces for managing clock faces based on geographic data.
Figure 9:
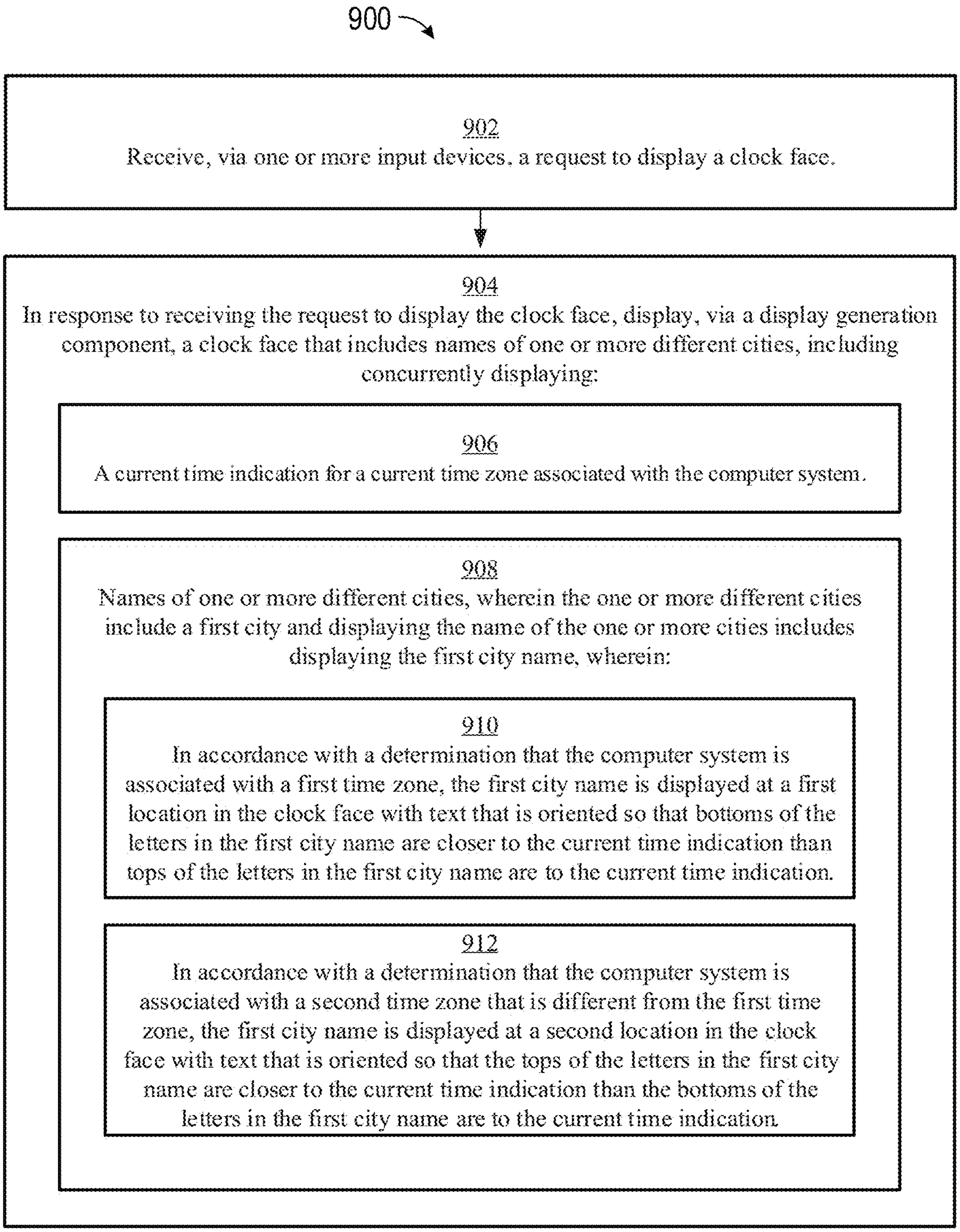
FIG. 9 is a flow diagram illustrating a method for managing clock faces based on geographic data.

FIG. 8A illustrates computer system 800 displaying, via display 802, watch user interface 816*a*. Computer system 800 includes rotatable and depressible input mechanism 804. In some embodiments, computer system 800 optionally includes one or more features of device 100, device 300, or device 500. In some embodiments, computer system 800 is a tablet, phone, laptop, desktop, camera, etc. In some embodiments, the inputs described below can optionally be substituted for alternate inputs, such as a press input and/or a rotational input received via rotatable and depressible input mechanism 804.

FIG. 8A includes location indicator 814*a*, which indicates that computer system 800 is located in San Francisco, which is in the Pacific Time zone. In some embodiments, features of watch user interface 816*a* correspond to and/or are based on a determination that computer system 800 is located in a particular location and/or a particular time zone, as discussed further below.

Watch user interface 816*a* includes multiple portions including portion 820*a*, which includes a circular dial with location names (e.g., cities, countries, islands, regions, etc.) displayed around the circular dial. The names of the various locations include name 820*a*1, which is Los Angeles, name 820*a*2, which is Dubai, name 820*a*3, which is Beijing, and name 820*a*4, which is Mexico. The position within portion 820*a* at which the location names are displayed and the orientation in which the location names are displayed corresponds to geographic data indicating the current location and/or time zone in which computer system 800 is located. At FIG. 8A, Los Angeles is displayed at the bottom center of portion 820*a* based on a determination that computer system 800 is located in San Francisco (as indicated by location indicator 814*a*), which is in the Pacific Time zone. At FIG. 8A, portion 820*a* includes location names corresponding to locations representative of different time zones. In some embodiments, computer system 800 displays a location name that corresponds to the time zone in which computer system 800 is located in the bottom center position of portion 820*a* (e.g., where name 820*a*1, Los Angeles, is located in FIG. 8A). In some embodiments, the location name that corresponds to the time zone in which computer system 800 is located is different than the actual city in which computer system 800 is located (e.g., Los Angeles is representative of San Francisco, etc.). In some embodiments, in accordance with a determination that the location of computer system 800 has changed and/or that computer system 800 has moved from a first time zone to a different time zone, computer system 800 updates the positions and/or orientations of the location names displayed within portion 820*a*.

Watch user interface 816*a* further includes indicator 815, which includes a graphical indicator of the location name corresponding to the location of computer system 800. In some embodiments, indicator 815 includes a graphical indicator of the hour numeral included in portion 820*b* that corresponds to the current hour in the time zone in which computer system 800 is located. In watch user interface 816*a*, indicator 815 includes an arrow in the bottom center of portion 820*a* that indicates that the hour numeral included in portion 820*b* that corresponds to the current hour in Los Angeles is 10 (e.g., the time in Los Angeles is roughly 10:00 A.M.).

Watch user interface 816*a* further includes portion 820*b*, which includes a circular dial containing a plurality of hour numerals corresponding to hours of the day. In watch user interface 816*a*, portion 820*b* includes a plurality of hour numerals ranging from 1 through 24, wherein each numeral corresponds to a different hour making up the 24 hours of a day. In some embodiments, portion 820*b* includes 12 hour numerals instead of 24 hour numerals. In some embodiments, portion 820*b* contains duplicates of some hour numerals (e.g., two eights, etc.) and/or certain hour numerals are omitted (e.g., no seven numeral, etc.) to account for the observance of Daylight Savings Time in different time zones and/or cities or countries. In some embodiments, in accordance with a determination that the date corresponds to a time period during which Daylight Savings Time is in effect, computer system 800 updates the hour numerals included in portion 820*b* to omit at least one hour numeral and/or to repeat at least one hour numeral.

In some embodiments, the relative positions of a location name included in portion 820*a* and an hour numeral included in portion 820*b* roughly indicates the time in the location corresponding to a location name displayed adjacent to the hour numeral. For example, at FIG. 8A, name 820*a*2, Dubai, is displayed centered with an hour numeral "22" indicating that the current time in Dubai corresponds to the "22" hour numeral (e.g., roughly 10:00 P.M.). Name 820*a*4, Mexico, is displayed centered with an hour numeral "5", indicating that the current time in Mexico City is corresponds to the "5" hour numeral (e.g., roughly 5:00 A.M.).

Watch user interface 816*a* further includes portion 820*c*, which includes a circular region of watch user interface 816*a* that includes time indication 826, which includes analog clock hands, wherein the position of the analog clock hands represents the current time (e.g., hour, minute, and/or second). Portion 820*c* further includes map 824*a*, which includes at least a partial view of an animated map and/or globe. In some embodiments, map 824*a* includes a view of an animated map and/or globe that includes a representation of a location (e.g., a city, a country, an island, a region, etc.) in which computer system 800 is located (e.g., San Francisco, the region corresponding to the Pacific Time zone, etc.). Portion 820*c* further includes terminator line 822, which includes a visual and/or graphical animation representing the separation between day and night. In some embodiments, terminator line 822 is displayed on map 824*a* such that it indicates the portion of the animated map and/or globe where it is currently night time, and/or the portion of the animated map and/or globe where it is currently day time. In some embodiments, terminator line 822 is updated with the passage of time to reflect the passage of time and/or the movement of the Earth.

Computer system 800 displays the location names in orientations such that the location names are more easily legible. For example, in watch user interface 816*a*, name 820*a*1, Los Angeles, is oriented so that the tops of the letters of name 820*a*1 are displayed closer to time indication 826 than the bottoms of the letters of name 820*a*1. Similarly, name 820*a*4, Mexico, is oriented so that the tops of the letters of name 820*a*4 are displayed closer to time indication 826 than the bottoms of the letters of name 820*a*4. However, name 820*a*2, Dubai, and name 820*a*3, Beijing, are displayed so that the bottoms of the letters of are displayed closer to time indication 826 than the tops of the letters. In some embodiments, the orientation in which the location names are displayed is updated based on geographic data related to the location of computer system 800.

Watch user interface 816*a* further includes lock icon 818, which indicates that computer system 800 is currently in a locked state. In some embodiments, the features of computer system 800 are limited when computer system 800 is in a locked state. Watch user interface 816*a* further includes a number of complications, including complication 806, complication 808, complication 810, and complication 812. In some embodiments, the complications (806, 808, 810, 812) include information from applications available on (e.g., installed on) computer system 800. In some embodiments, the complications (806, 808, 810, 812) are updated in accordance with the passage of time to display updated information (e.g., from applications associated with the complications). In some embodiments, selecting a complication (806, 808, 810, 812) causes computer system 800 to launch an application corresponding to the selected complication.

Figure 8B:
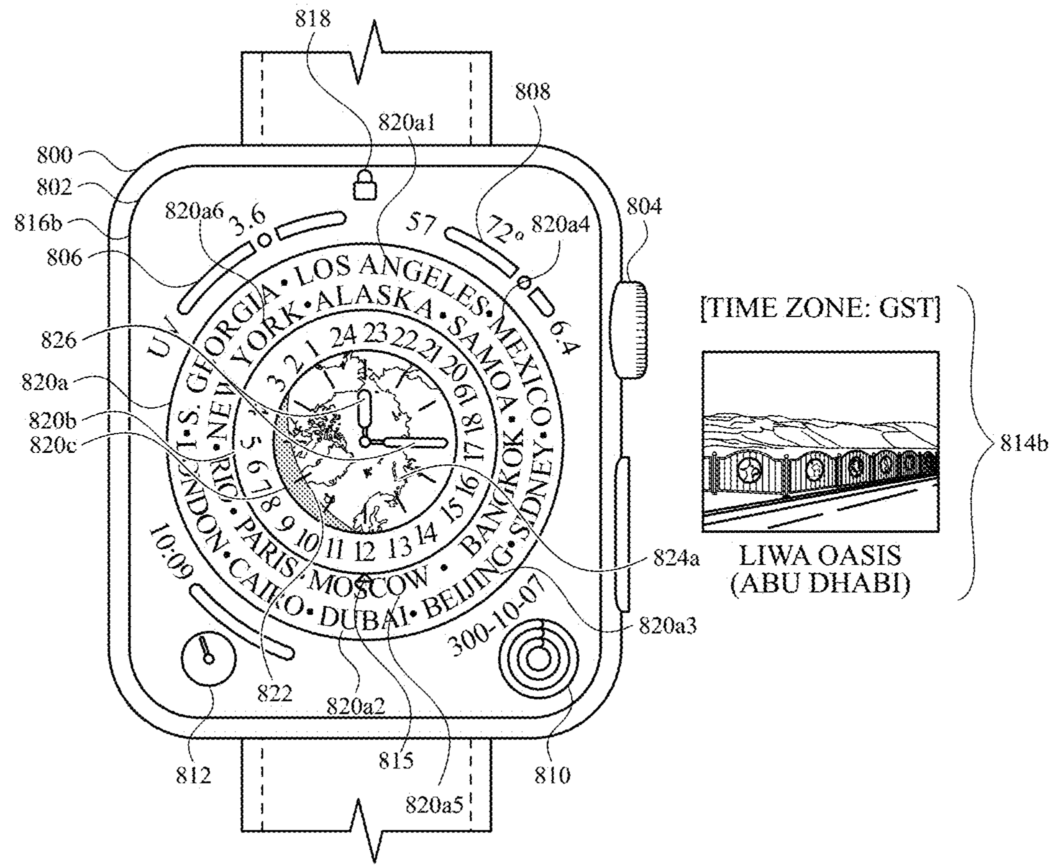

FIG. 8B illustrates computer system 800 at a different time and at a different location. FIG. 8B includes location indicator 814*b*, which indicates that computer system 800 is located in Abu Dhabi, which is located in the Gulf Standard Time zone. At FIG. 8B, computer system 800 displays watch user interface 816*b*. Watch user interface 816*b*, includes portion 820*a*, wherein the location names displayed within portion 820*a* have been updated. For example, whereas name 820*a*1, Los Angeles, was displayed in the bottom center of portion 820*a* in watch user interface 816*a*, name 820*a*1 is displayed in the top center of portion 820*a* in watch user interface 816*b*. Whereas name 820*a*2, Dubai, was displayed in the top center of portion 820*a* in 816*a*, name 820*a*2, is displayed in the bottom center of portion 820*a* in watch user interface 816*b*. The locations at which name 820*a*4, Mexico, and name 820*a*3, Beijing, are displayed has also been updated in watch user interface 816*b*.

The orientation in which some location names are displayed has also been updated in watch user interface 816*b*. In watch user interface 816*a*, name 820*a*1, Los Angeles, was displayed in an orientation such that the tops of the letters of name 820*a*1 were closer to time indication 826 than the bottoms of the letters of name 820*a*1. In watch user interface 816*b*, name 820*a*1, Los Angeles, is displayed in an orientation such that the bottoms of the letters of name 820*a*1 are closer to time indication 826 than the tops of the letters of name 820*a*1. Similarly, in watch user interface 816*a*, name 820*a*2, Dubai, was displayed in an orientation such that the bottoms of the letters of name 820*a*2 were closer to time indication 826 than the tops of the letters of name 820*a*1. In watch user interface 816*b*, name 820*a*2, Dubai, is displayed in an orientation such that the tops of the letters of name 820*a*2 are closer to time indication 826 than the bottoms of the letters of name 820*a*2. The orientation in which name 820*a*3, Beijing, and 820*a*4, Mexico, are displayed has also been updated.

Watch user interface 816*b* further includes indicator 815, which includes a graphical indicator of the location name corresponding to geographical data related to the location of computer system. Indicator 815 further includes a graphical indicator of the hour numeral included in portion 820*b* that corresponds to the current hour in the time zone in which computer system 800 is located. In watch user interface 816*b*, indicator 815 includes an arrow in the bottom center of portion 820*a* that indicates that the hour numeral included in portion 820*b* that corresponds to the current hour in Dubai is 12.

Watch user interface 816*a* further includes portion 820*b*, which includes a circular dial containing a plurality of hour numerals corresponding to hours of the day. In watch user interface 816*b*, portion 820*b* includes a plurality of hour numerals ranging from 1 through 24, wherein each numeral corresponds to a different hour making up the 24 hours of a day.

Watch user interface 816*b* further includes portion 820*c*, which includes a circular region of watch user interface 816*b* that includes time indication 826, which includes analog clock hands, wherein the position of the analog clock hands represents the current time (e.g., hour, minute, and/or second). Portion 820*c* further includes map 824*a*, which includes at least a partial view of an animated map and/or globe. In some embodiments, map 824*a* includes a view of an animated map and/or globe that includes a representation of a location (e.g., a city, a country, an island, a region, etc.) in which computer system 800 is located (e.g., Dubai, the region corresponding to the Gulf Standard Time zone, etc.). Portion 820*c* further includes terminator line 822, which includes a visual and/or graphical animation representing the separation between day and night. In some embodiments, terminator line 822 is displayed on map 824*a* such that it indicates the portion of the animated map and/or globe where it is currently night time, and/or the portion of the animated map and/or globe where it is currently day time.

Watch user interface 816*b* further includes lock icon 818, which indicates that computer system 800 is currently in a locked state. In some embodiments, the features of computer system 800 are limited when computer system 800 is in a locked state. Watch user interface 816*b* further includes a number of complications, including complication 806, complication 808, complication 810, and complication 812. In some embodiments, the complications (806, 808, 810, 812) include information from applications available on (e.g., installed on) computer system 800. In some embodiments, the complications (806, 808, 810, 812) are updated in accordance with the passage of time to display updated information. In some embodiments, selecting a complication (806, 808, 810, 812) causes computer system 800 to launch an application corresponding to the selected complication.

Figure 8C:
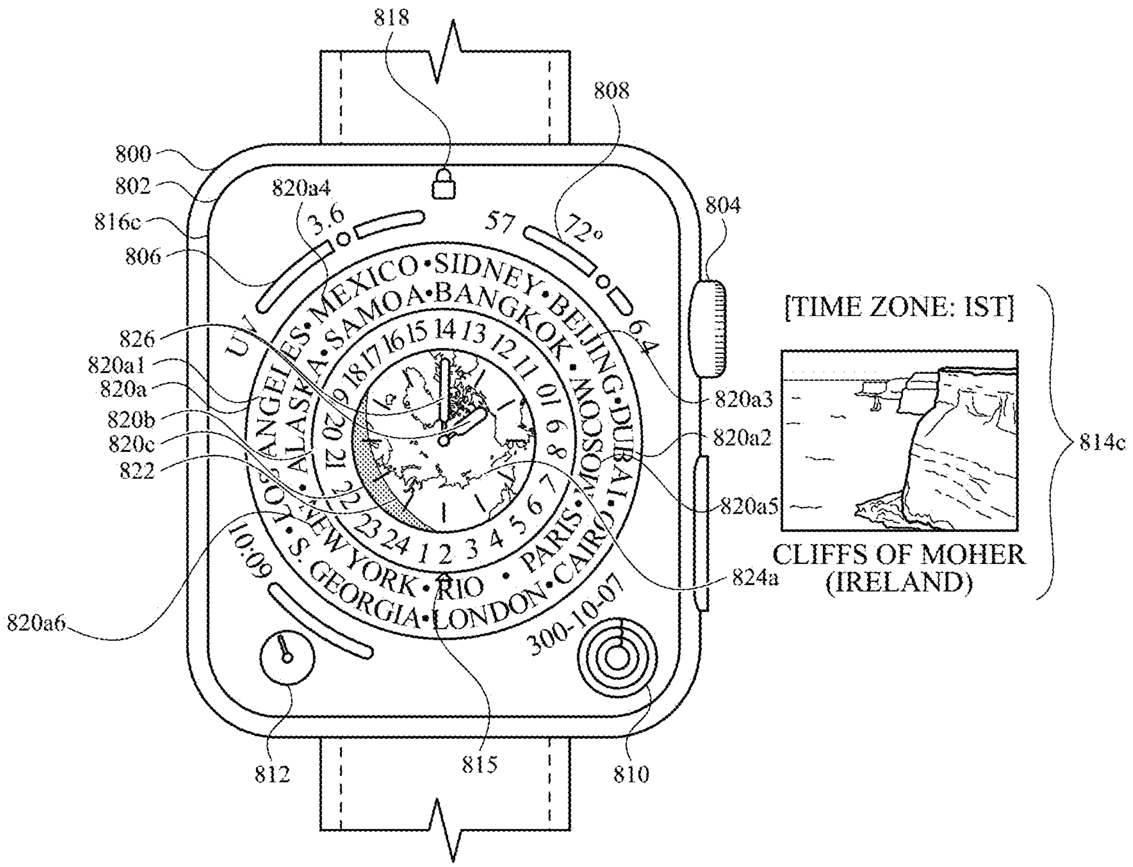

FIG. 8C illustrates computer system 800 at a different time and at a different location. FIG. 8C includes location indicator 814*c*, which indicates that computer system 800 is located in Ireland, which is located in the Irish Standard Time zone. At FIG. 8C, computer system 800 displays watch user interface 816*c*. Watch user interface 816*c*, includes portion 820*a*, wherein the location names displayed within portion 820*a* have been updated. For example, whereas name 820*a*1, Los Angeles, was displayed in the bottom center of portion 820*a* in watch user interface 816*a*, and in the top center of portion 820*a* in watch user interface 816*b*, name 820*a*1 is displayed on the left side of portion 820*a* in watch user interface 816*c*. Whereas name 820*a*2 was displayed in the top center of portion 820*a* in watch user interface 816*a* and at the bottom center of portion 820*a* in watch user interface 816*b*, name 820*a*2 is displayed on the right side of portion 820*a* in watch user interface 816*c*. The locations at which name 820*a*4*a*, Mexico, and name 820*a*3, Beijing, have also been updated in watch user interface 816*c*.

The orientation in which some location names are displayed has also been updated in watch user interface 816*c*. In watch user interface 816*a*, name 820*a*1, Los Angeles, was displayed in an orientation such that the tops of the letters of name 820*a*1 were closer to time indication 826 than the bottoms of the letters of name 820*a*1, and in watch user interface 816*b*, name 820*a*1, Los Angeles, was displayed in an orientation such that the bottoms of the letters of name 820*a*1 are closer to time indication 826 than the tops of the letters of name 820*a*1. In watch user interface 816*a*, name 820*a*2, Dubai, was displayed in an orientation such that the bottoms of the letters of name 820*a*2 were closer to time indication 826 than the tops of the letters of name 820*a*1 and in watch user interface 816*b*, name 820*a*2, Dubai, was displayed in an orientation such that the tops of the letters of name 820*a*2 are closer to time indication 826 than the bottoms of the letters of name 820*a*2. In watch user interface 816*c*, both name 820*a*1, Los Angeles, and name 820*a*2, Dubai, are displayed in the same orientation such that the bottoms of the letters are closer to time indication 826 than the tops of the letters. The orientation of some location names is maintained between time zone transitions. For example, name 820*a*4, Mexico, is displayed in an orientation such that the bottoms of the letters are closer to time indication 826 in both watch user interface 816*b* and 816*c*. In some embodiments, computer system 800 flips the orientation in which a given location name is displayed in accordance with a determination that the position in portion 820*a* in which the location name has been moved has changed beyond a threshold amount. In some embodiments, computer system 800 flips the orientation in which a given city name is displayed in accordance with a determination that the angle at which the name will be displayed at based on an updated time zone has changed beyond a threshold amount.

Watch user interface 816*c* further includes indicator 815, which includes a graphical indicator of the location name corresponding to the location of computer system 800. Indicator 815 further includes a graphical indicator of the hour numeral included in portion 820*b* that corresponds to the current hour in the time zone in which computer system 800 is located. In watch user interface 816*c*, indicator 815 includes an arrow in the bottom center of portion 820*a* that indicates that the hour numeral included in portion 820*b* that corresponds to the current hour in London is 2 (e.g., the time in London is roughly 2:00 A.M.).

Watch user interface 816*c* further includes portion 820*b*, which includes a circular dial containing a plurality of hour numerals corresponding to hours of the day. In watch user interface 816*c*, portion 820*b* includes a plurality of hour numerals ranging from 1 through 24, wherein each numeral corresponds to a different hour making up the 24 hours of a day.

Watch user interface 816*c* further includes portion 820*c*, which includes a circular region of watch user interface 816*c* that includes time indication 826, which includes analog clock hands, wherein the position of the analog clock hands represents the current time (e.g., hour, minute, and/or second). Portion 820*c* further includes map 824*a*, which includes at least a partial view of an animated map and/or globe. In some embodiments, map 824*a* includes a view of an animated map and/or globe that includes a representation of a location (e.g., a city, a country, an island, a region, etc.) in which computer system 800 is located (e.g., Ireland, the region corresponding to the Irish Standard Time zone, etc.). Portion 820*c* further includes terminator line 822, which includes a visual and/or graphical animation representing the separation between day and night. In some embodiments, terminator line 822 is displayed on map 824*a* such that it indicates the portion of the animated map and/or globe where it is currently night time, and/or the portion of the animated map and/or globe where it is currently day time.

Watch user interface 816*b* further includes lock icon 818, which indicates that computer system 800 is currently in a locked state. In some embodiments, the features of computer system 800 are limited when computer system 800 is in a locked state. Watch user interface 816*b* further includes a number of complications, including complication 806, complication 808, complication 810, and complication 812. In some embodiments, the complications (806, 808, 810, 812) include information from applications available on (e.g., installed on) computer system 800. In some embodiments, the complications (806, 808, 810, 812) are updated in accordance with the passage of time to display updated information. In some embodiments, selecting a complication (806, 808, 810, 812) causes computer system 800 to launch an application corresponding to the selected complication.

Figure 8D:
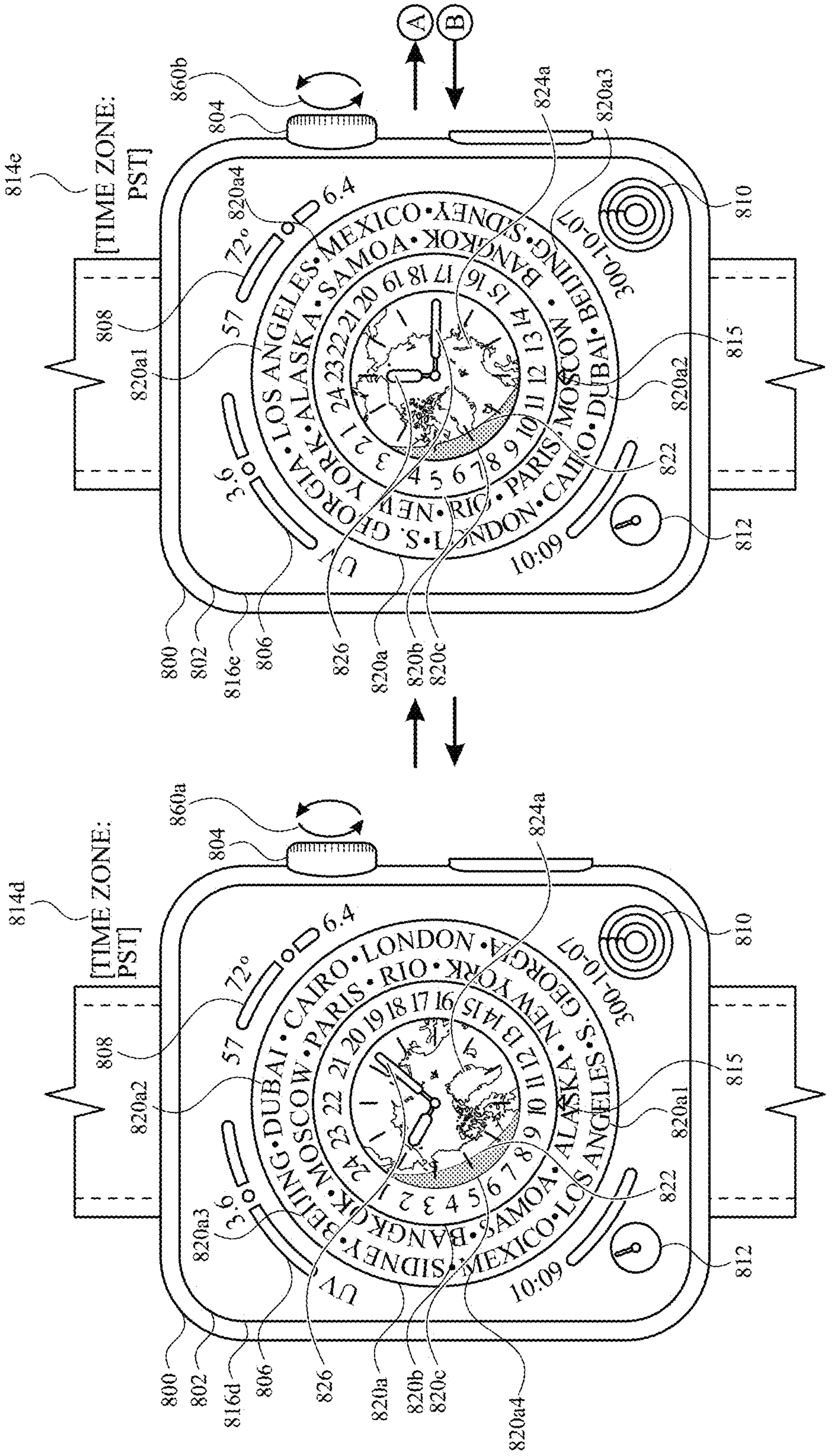
Figure 8D:
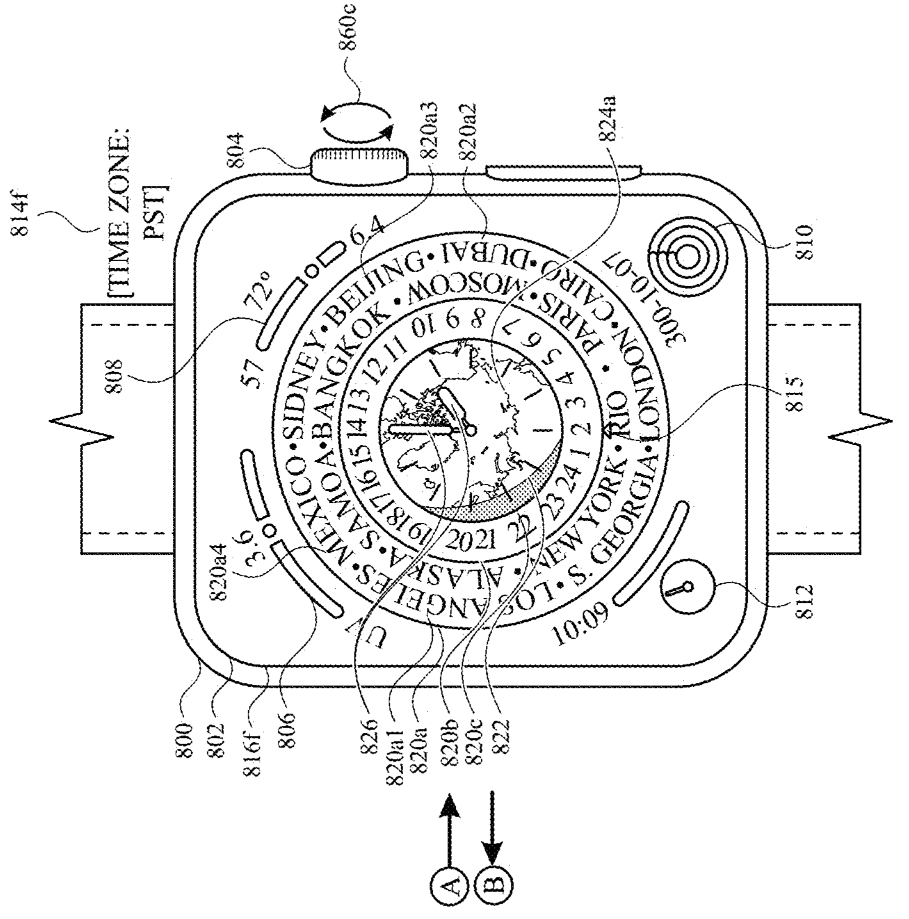

FIG. 8D illustrates that, in some embodiments, in response to a rotational input received via rotatable and depressible input mechanism 804, computer system displays portion 820*a* rotating through different time zones. In some embodiments, a rotational input can be used to change a currently selected time zone, so that a watch user interface is displayed in accordance with a first time zone instead of a second time zone. FIG. 6D illustrates computer system 800 displaying watch user interface 816*d*, which is being displayed in accordance with the Pacific Standard Time zone is selected, as indicated by location indication 814*d*. While displaying watch user interface 816*d*, computer system 800 receives rotational input 860*a* via rotatable and depressible input mechanism 804 and, in response to receiving rotational input 860*a*, computer system 800 displays watch user interface 816*e*, which is an updated display of watch user interface 816*d* displayed in accordance with the Gulf Standard Time zone being selected, as indicated by location indication 814*e*. While displaying watch user interface 816*e*, computer system 800 receives rotational input 860*b* via rotatable and depressible input mechanism 804 and, in response to receiving rotational input 860*b*, computer system 800 displays watch user interface 816*f*, which is an updated display of watch user interface 816*e* displayed in accordance with the Irish Standard Time zone being selected, as indicated by location indication 814*f*. In some embodiments, while displaying watch user interface 816*f*, computer system 800 receives rotational input 860*c* via rotatable and depressible input mechanism 804 and, in response to receiving rotational input 860*c*, computer system 800 displays watch user interface 816*d*, which is an updated display of watch user interface 816*f* displayed in accordance with the Pacific Standard Time zone is selected, as indicated by location indication 814*f*. In some embodiments, the selected time zone continues to update in response to rotational inputs received via rotatable and depressible input mechanism 804. In some embodiments, computer system 800 cycles through a limited number of time zone options in a set order.

At FIG. 8D, computer system 600 displays watch user interfaces (e.g., 816*d*, 816*e*, 816*f*) without lock icon 818, which indicates that computer 800 is not in a locked state. In some embodiments, computer 800 system transitions from a locked state to an unlocked state in response to a sequence of user inputs received via one or more input mechanisms in communication with computer system 800. In some embodiments, computer system 800 transitions from a locked state to an unlocked state in response to a number of tap inputs received at computer system 800 corresponding to entry of a passcode. In some embodiments, computer system 800 transitions from a locked state to an unlocked state in response to a press input received on rotatable and depressible input mechanism 604. In some embodiments, computer system 800 transitions from a locked state to an unlocked state in response to a sequence of one or more user inputs received via a computer system other than computer system 800 that is in communication with computer system 800, such as a paired phone. In some embodiments, computer system 800 transitions from a locked state to an unlocked state in response to a wrist raise gesture. In some embodiments, computer system 800 does not update the watch user interface displayed via display 802 to correspond to a different time zone in response to receiving a rotational input via rotatable and depressible input mechanism 804 as illustrated in FIG. 8D while computer system 800 is in a locked state.

Figure 8F:
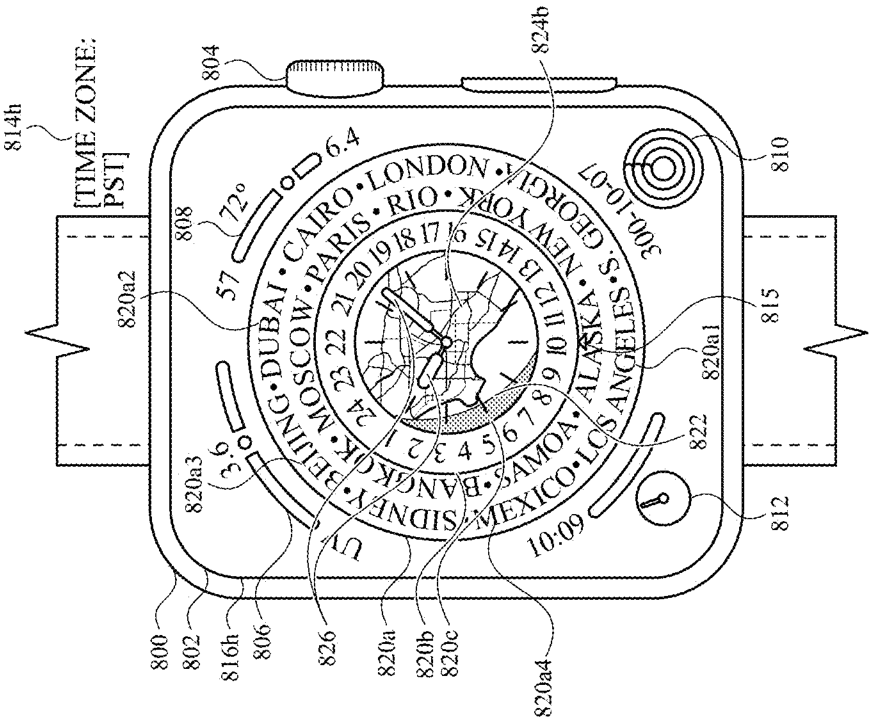
Figure 8E:
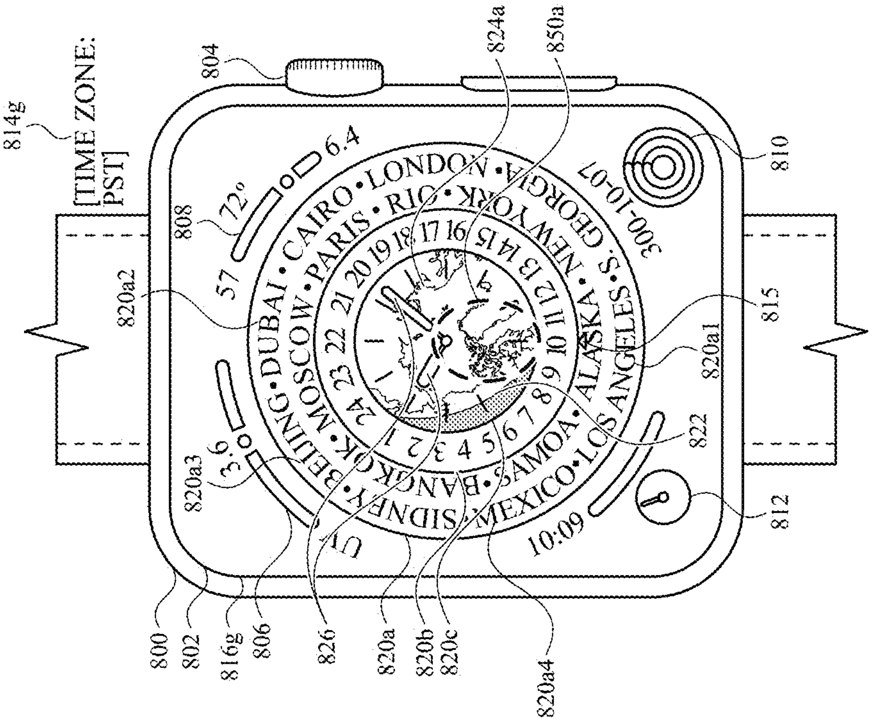

FIG. 8E illustrates computer system 800 displaying watch user interface 816*g*, which matches watch user interface 816*a*. Watch user interface 816*g* includes portion 820*c*, which includes a circular region of watch user interface 816*g* that includes time indication 826, which includes analog clock hands, wherein the position of the analog clock hands represents the current time (e.g., hour, minute, and/or second). Portion 820*c* further includes map 824*a*, which includes at least a partial view of an animated map and/or globe. In some embodiments, map 824*a* includes a view of an animated map and/or globe that includes a representation of a location (e.g., a city, a country, an island, a region, etc.) in which computer system 800 is located (e.g., San Francisco, the region corresponding to the Pacific Standard Time zone, etc.). Portion 820*c* further includes terminator line 822, which includes a visual and/or graphical animation representing the separation between day and night. In some embodiments, terminator line 822 is displayed on map 824*a* such that it indicates the portion of the animated map and/or globe where it is currently night time, and/or the portion of the animated map and/or globe where it is currently day time. At FIG. 8E, computer system 800 detects input 850*a* (e.g., a tap input) on map 824*a*.

At FIG. 8F, in response to receiving input 850*a*, computer system 800 displays watch user interface 816*h*, which is an updated version of watch user interface 816*g* wherein map 824*a* has been replaced with map 824*b*. In some embodiments, map 824*b* is a more zoomed in version of map 824*a*. In some embodiments, map 824*b* includes a city-level view of the location corresponding to the location name currently being indicated by indicator 815. At FIG. 8F, indicator 815 indicates location name 820*a*1, Los Angeles. Accordingly, map 824*b* includes a city view of at least a portion of a map of Los Angeles. In some embodiments, transitioning from displaying map 824*a*, as shown in watch user interface 816*g*, to displaying map 824*b*, as shown in watch user interface 816*h*, includes displaying an animation, wherein the animation depicts an animation of a globe turning and/or a zooming in animation transitioning from map 824*a* to map 824*b*.

Figure 8H:
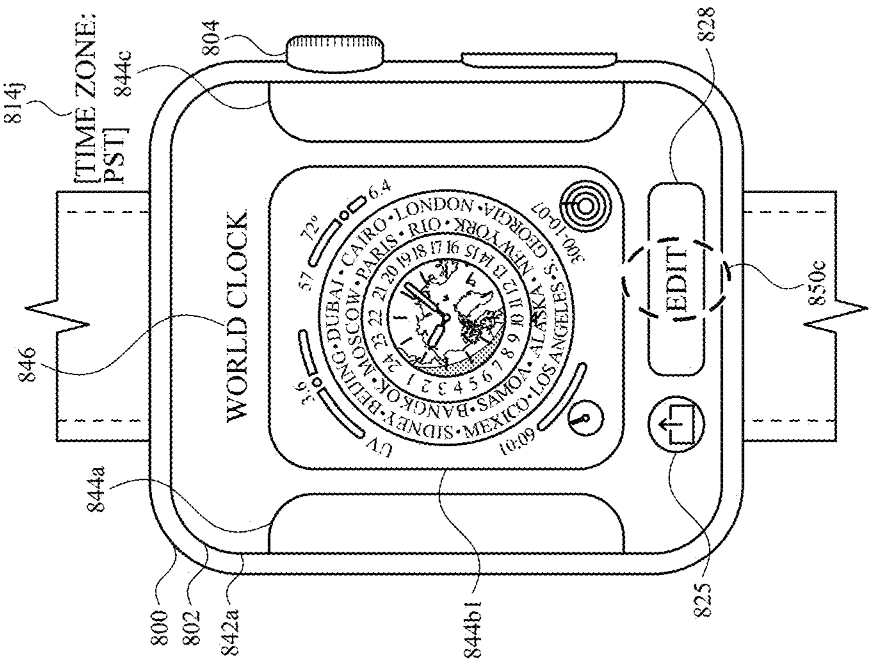
Figure 8G:
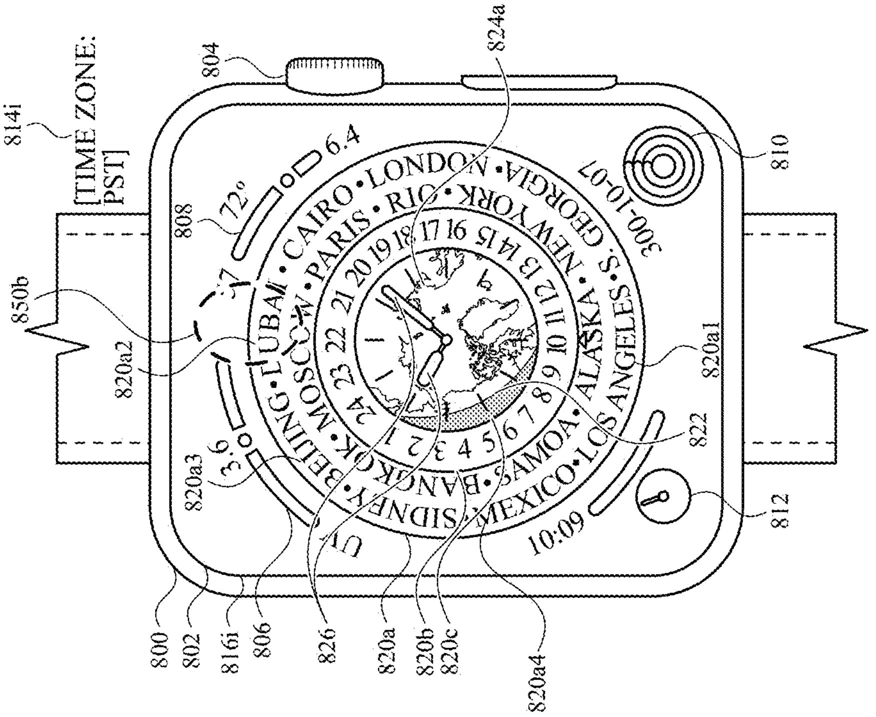

FIG. 8G illustrates computer system 800 displaying watch user interface 816*i*, which matches watch user interface 816*a*. In particular, like watch user interface 816*a*, watch user interface 816*a* includes portion 820*c*, which includes a circular region of watch user interface 816*i* that includes time indication 826, which includes analog clock hands, wherein the position of the analog clock hands represents the current time (e.g., hour, minute, and/or second). Portion 820*c* further includes map 824*a*, which includes at least a partial view of an animated map and/or globe. In some embodiments, map 824*a* includes a view of an animated map and/or globe that includes a representation of a location (e.g., a city, a country, an island, a region, etc.) in which computer system 800 is located. Portion 820*c* further includes terminator line 822, which includes a visual and/or graphical animation representing the separation between day and night. In some embodiments, terminator line 822 is displayed on map 824*a* such that it indicates the portion of the animated map and/or globe where it is currently night time, and/or the portion of the animated map and/or globe where it is currently day time. At FIG. 8G, computer system 800 detects input 850*b* (e.g., a long press input) on watch user interface 816*i*.

At FIG. 8H, in response to receiving input 850*b*, computer system 800 displays selection user interface 842*a*. Selection user interface 842*a* is a user interface for selecting a watch user interface to be displayed by computer system 800. Selection user interface 842*a* includes representation 844*b*1, which is a representation of watch user interface 816*i*, and includes various features of watch user interface 816*i*. In some embodiments, representation 844*b*1 is a static representation of watch user interface 816*i*, and includes an indication of a time other than the current time, and/or complications containing information other than real-time, updated data.

Selection user interface 842*a* further includes partial views of representation 844*a* and representation 844*b*, which correspond to watch user interfaces other than watch user interface 816*i*. Selection user interface 842*a* further includes share user-interactive graphical user interface object 825 which, when selected, causes computer system 800 to display user interfaces related to transmitting and/or sharing information related to watch user interface 816*i* with another device (e.g., another computer system). Selection user interface 842*a* further includes edit user-interactive graphical user interface object 828 which, when selected, causes computer system 800 to display an editing user interface for editing aspects of watch user interface 816*i*. Selection user interface 842*a* further includes face indicator 846, which includes a visual and/or textual indication of the name of the watch user interface currently centered in selection user interface 842*a*. At FIG. 8H, face indicator 846 indicates that currently indicated watch user interface 816*i*, which is represented in selection user interface 842*a* by representation 844*b*1, is titled "World Clock." At FIG. 8H, computer system detects input 850*c* (e.g., a tap input) on edit user-interactive graphical user interface object 828.

Figure 8J:
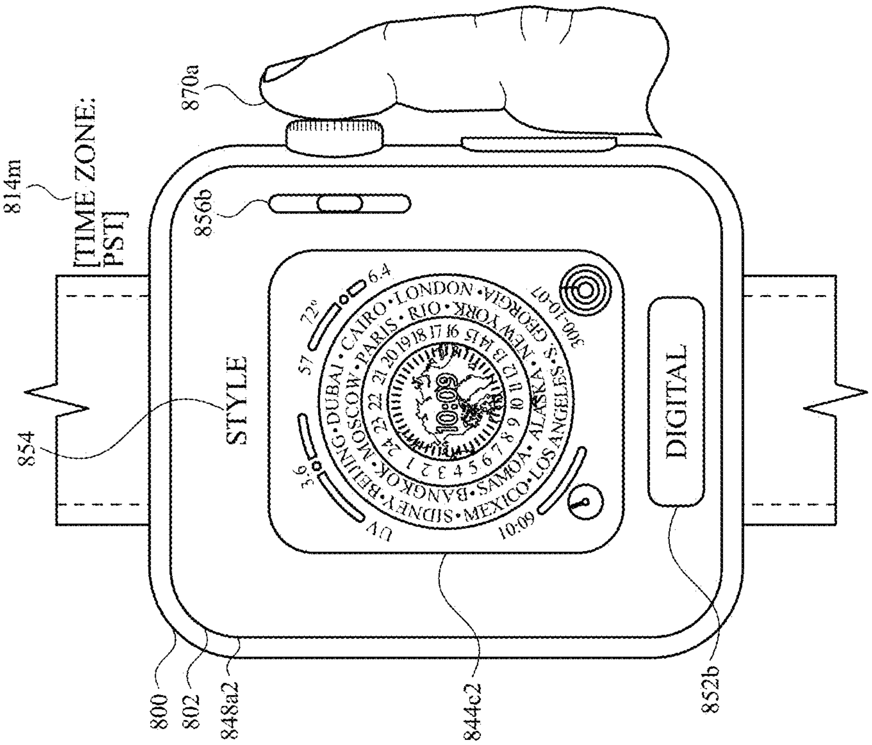
Figure 8I:
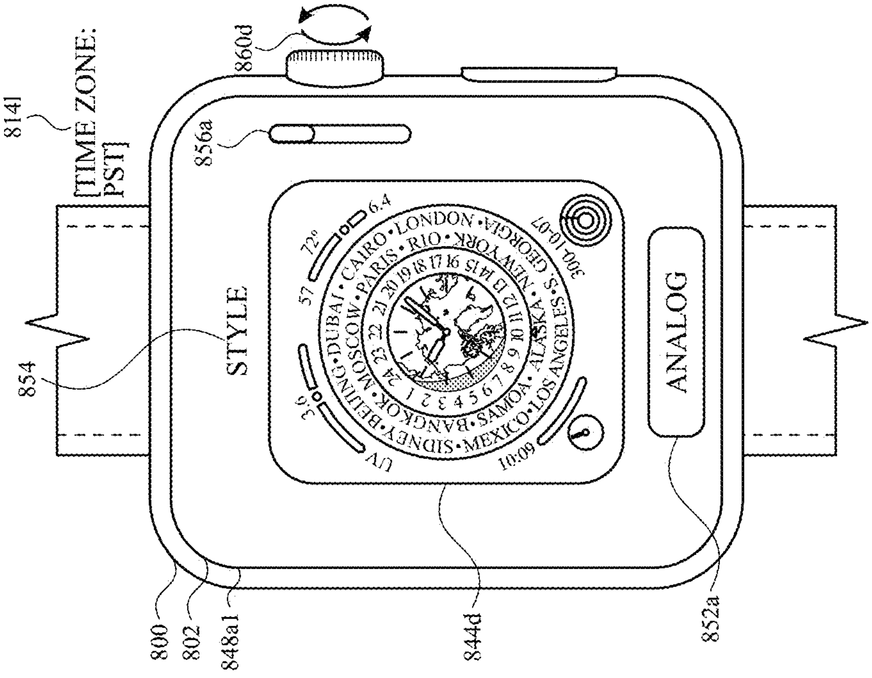

At FIG. 8I, in response to detecting input 850*c*, computer system 800 displays editing user interface 848*a*1. Editing user interface 848*a*1 includes aspect indicator 854, which includes a visual and/or textual representation of the aspect of watch user interface 816*i* currently selected for editing. At FIG. 8I, aspect indicator 854 indicates that the aspect of watch user interface 816*i* that is currently selected for editing is "Style."

Editing user interface 848*a*1 further includes selection indicator 852*a*, which includes a visual and/or textual representation of the currently selected option for the editable aspect of watch user interface 816*i*. At FIG. 8I, selection indicator 852*a* indicates that the currently selected "Style" option for watch user interface 816*i* is "Analog."

Editing user interface 848*a*1 further includes positional indicator 856*a*. Positional indicator 856*a* includes a graphical indication of the number of selectable options for the editable aspect of watch user interface 816*i* that is currently being edited, as well as the position of the currently selected option among the list of selectable options. For example, positional indicator 856*a* indicates that the currently selected option for the "Style" aspect of watch user interface 816*i*, "Analog," is at the top of a list of at least two possible options for the "Style" aspect of watch user interface 816*i*.

Editing user interface 848*a*1 further includes representation 844*d*, which indicates that the watch user interface currently being edited is the watch user interface corresponding to representation 844*d*, which is watch user interface 816*i*. Representation 844*d* corresponds to watch user interface 816*i*, and includes features of watch user interface 816*i* including portion 820*c*, which includes a circular region of watch user interface 816*a* that includes time indication 826, which includes analog clock hands, wherein the position of the analog clock hands represents a time (e.g., hour, minute, and/or second). In some embodiments, in representation 844*d*, the time indicated by indication 826 (e.g., by the position of the analog clock hands) is a fixed time and/or is different from the current time. At FIG. 8I, computer system 1200 detects rotational input 860*d* via rotatable and depressible input mechanism 804.

At FIG. 8J, in response to receiving rotational input 860*d*, computer system 800 displays editing user interface 848*a*2, which is an edited version of editing user interface 848*a*1 wherein representation 844*d* no longer includes time indication 826 and, instead, includes time indication 858, which includes a digital indication of time without analog clock hands.

Editing user interface 848*a*2 further includes selection indicator 852*b*, which includes a visual and/or textual representation of the currently selected option for the editable aspect of watch user interface 816*i*. At FIG. 8J, selection indicator 852*a* indicates that the currently selected "Style" option for watch user interface 816*i* is "Digital."

Editing user interface 848*a*2 further includes positional indicator 856*b*. Positional indicator 856*b* includes an updated version of positional indicator 856*a*, wherein the change in positional indicator 856*b* relative to positional indicator 856*a* indicates that the currently selected "Style" option has changed (e.g., from "Analog" to "Digital"). At FIG. 8J, computer system 800 receives press input 870*a* via rotatable and depressible input mechanism 804.

Figure 8L:
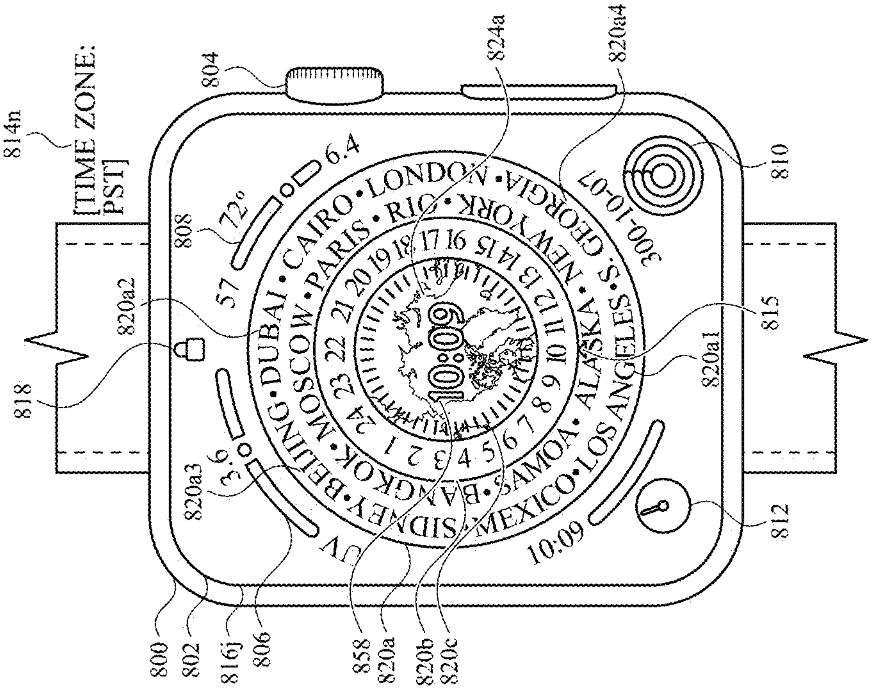
Figure 8K:
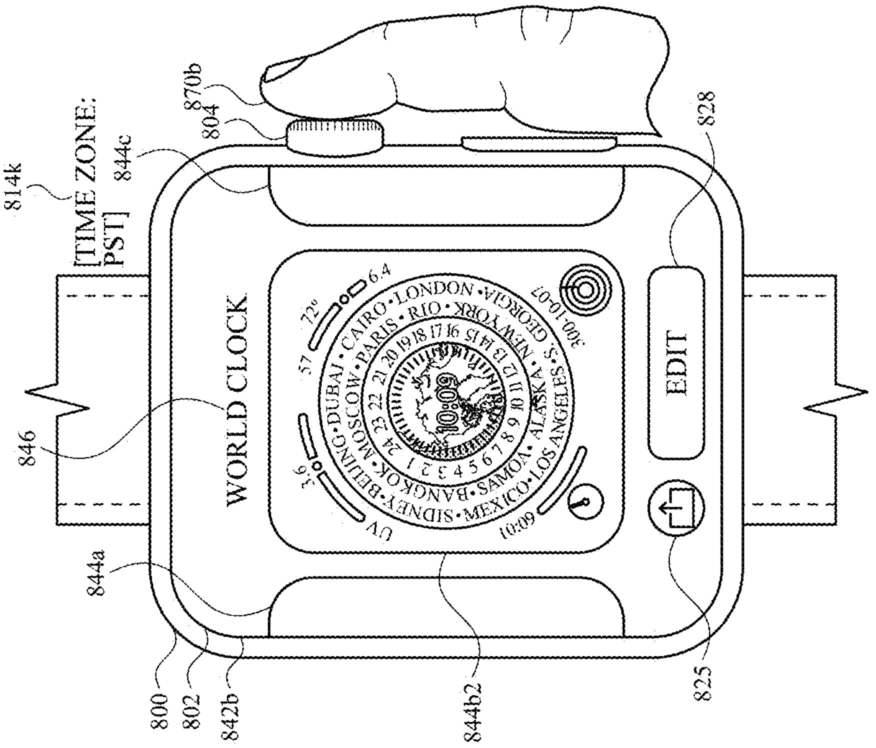

At FIG. 8K, in response to receiving press input 870*a*, computer system 800 displays selection user interface 842*b*. FIG. 8K illustrates an edited representation of watch user interface 816*i* in a selection user interface. Selection user interface 842*b* matches selection user interface 842*a*, except representation 844*b*1 has been replaced with representation 844*b*2. Representation 844*b*2 includes time indication 858 (e.g., a digital indication of time) instead of time indication 826, which included analog clock hands. At FIG. 8K, computer system 800 detects press input 870*b* via depressible and rotatable input mechanism 804.

At FIG. 8L, in response to detecting press input 870*b*, computer system 800 displays watch user interface 816*j*. Watch user interface 816*j* matches watch user interface 816*i*, except that watch user interface 816*j* includes time indication 858, which includes a digital indication of time, instead of time indication 826, which included analog clock hands, in portion 820*c*.

Figure 8M:
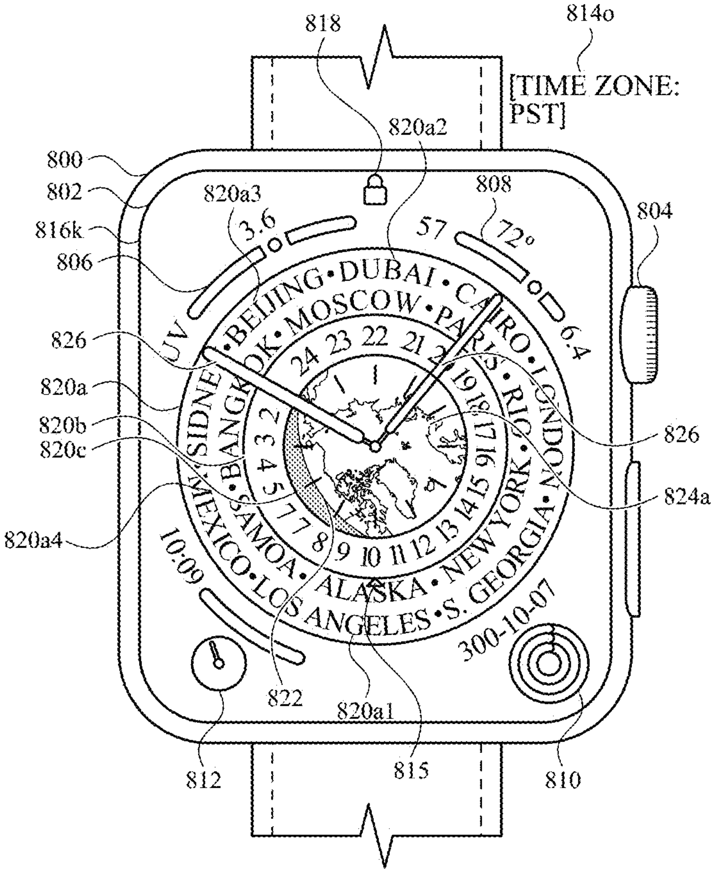

At FIG. 8M, computer system 800 displays watch user interface 816*k*, which includes time indication 826 wherein the analog clock hands are displayed as extending beyond the edge of portion 820*c*. In FIG. 8M, the analog clock hands of time indication 826 are displayed as extending to the edge of portion 820*a*. In some embodiments, the analog clock hands are displayed as extending further or less far than as illustrated in FIG. 8M. In some embodiments, the analog clock hands at least partially obscure at least one hour numeral contained within portion 820*b*. In some embodiments, the analog clock hands at least partially obscure at least one location name within portion 820*a*. In some embodiments, the length of the clock hands included in time indication 826 is an editable aspect of the watch user interface.

FIG. 9 is a flow diagram illustrating a method for managing clock faces based on geographic data using a computer system in accordance with some embodiments. Method (900) is performed at a computer system (e.g., 800) (e.g., a smartwatch, a wearable electronic device, a smartphone, a desktop computer, a laptop, a tablet) that is in communication with a display generation component (e.g., 802) and one or more input devices (e.g., a display controller, a touch-sensitive display system). In some embodiments, the computer system is in communication with one or more input devices (e.g., a rotatable input mechanism, a touch-sensitive surface). Some operations in method 900 are, optionally, combined, the orders of some operations are, optionally, changed, and some operations are, optionally, omitted.

As described below, method 900 provides an intuitive way for managing clock faces based on geographic data. The method reduces the cognitive burden on a user for managing clock faces based on geographic data, thereby creating a more efficient human-machine interface. For battery-operated computing devices, enabling a user to manage clock faces based on geographic data faster and more efficiently conserves power and increases the time between battery charges.

The computer system receives (902), via the one or more input devices, a request to display a clock face (e.g., 816*a*) (e.g., a tap input, a swipe, a wrist raise, a press input).

In response to receiving the request to display the clock face, the computer system (e.g., 800) displays (904), via the display generation component (e.g., 802), a clock face (e.g., 816*a*) that includes names of one or more different cities (e.g., 820*a*1, 820*a*2, 820*a*3, and 820*a*4 as illustrated in FIG. 8A). Displaying the clock face includes concurrently displaying a current time indication (e.g., 826 as illustrated in FIG. 8A) (906) for a current time zone associated with the computer system and names (908) of one or more different cities (e.g., surrounding at least a portion of the current time indication for the current time zone). In some embodiments, the current time indication is continuously or periodically updated with the passage of time to reflect the current time of day (e.g., the time in the current time zone). In some embodiments, the current time indication is coordinated with and/or intended to reflect the coordinated universal time with an offset based on a currently selected time zone.

Where the one or more different cities include a first city (e.g., 820*a*5 as illustrated in FIG. 8A) and displaying the name of the one or more cities includes displaying the first city name, wherein in accordance with (910) a determination that the computer system is associated with a first time zone (e.g., 814*a*) (e.g., the current time zone is the first time zone), the first city name (e.g., 820*a*5 as illustrated in FIG. 8A) is displayed at a first location in the clock face with text that is oriented so that bottoms of the letters in the first city name are closer to the current time indication (e.g., 826 as illustrated in FIG. 8A) than tops of the letters in the first city name are to the current time indication; and in accordance with (912) a determination that the computer system is associated with a second time zone (e.g., 814*b*) (e.g., the current time zone is the second time zone) that is different from the first time zone, the first city name (e.g., 820*a*5 as illustrated in FIG. 8B) is displayed at a second location in the clock face with text that is oriented so that the tops of the letters in the first city name are closer to the current time indication than the bottoms of the letters in the first city name are to the current time indication. In some embodiments, the clock face includes at least one complication (e.g., 812 as illustrated in FIG. 8A). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, the complications can be edited (e.g., to display data corresponding to different applications available on the computer system). Conditionally displaying, based on whether a computer system is associated with a first time zone (e.g., 814*a*) or a second time zone (e.g., 814*b*), a city name in a first location in a first orientation (e.g., 820*a*5 as illustrated in FIG. 8A) or a second location in a second orientation (e.g., 820*a*2 as illustrated in FIG. 8B) provides the user with relevant information about the context of the computer system without requiring the user to provide further inputs and improves the legibility of the city names by maintaining the city names as right side up as opposed to rotating the names around the dial such that they are displayed upside down. Performing an operation when a set of conditions has been met without requiring further user input enhances the operability of the device and makes the user-device interface more efficient (e.g., by helping the user to determine whether the first city name represents the current time zone associated with the computer system) which, additionally, reduces power usage and improves battery life of the device by enabling the user to use the device more quickly and efficiently. Further, selecting an orientation for the text of city names in accordance with a determination that the computer system is associated with a particular time zone reduces the number of inputs required to display the city name in the orientation by eliminating the need for a user to manually select an orientation for the text of different city names. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more cities include a second city (e.g., 820*a*6 as illustrated in FIG. 8A) and displaying the name of the one or more cities includes concurrently displaying the second city name (e.g., 820*a*6 as illustrated in FIG. 8A) and the first city name (e.g., 820*a*5 as illustrated in FIG. 8A), wherein, in accordance with a determination that the computer system (e.g., 800) is associated with the first time zone (e.g., 814*a*) (e.g., the current time zone is the first time zone), the second city name (e.g., 814*a*6 as illustrated in FIG. 8A) is displayed at a third location in the clock face with text that is oriented so that tops of the letters in the second city name are closer to the current time indication (e.g., 826 as illustrated in FIG. 8A) than bottoms of the letters in the second city name are to the current time indication; and in accordance with a determination that the computer system is associated with the second time zone (e.g., 814*b*) (e.g., the current time zone is the second time zone) that is different from the first time zone, the second city name (e.g., 814*a*6 as illustrated in FIG. 8B) is displayed at a fourth location in the clock face with text that is oriented so that the bottoms of the letters in the second city name are closer to the current time indication than the tops of the letters in the second city name are to the current time indication. Conditionally displaying, based on whether a computer system is associated with a first time zone or a second time zone, a second city name in a third location in a first orientation or a fourth location in a second orientation provides the user with relevant information about the context of the computer system without requiring the user to provide further inputs. Performing an operation when a set of conditions has been met without requiring further user input enhances the operability of the device and makes the user-device interface more efficient (e.g., by helping the user to determine whether the second city name represents the current time zone associated with the computer system) which, additionally, reduces power usage and improves battery life of the device by enabling the user to use the device more quickly and efficiently.

In some embodiments, the one or more cities include a third city (e.g., 820*a*3 as illustrated in FIG. 8A) and as a part of displaying the name of the one or more cities the computer system (e.g., 800) concurrently displays the third city name (e.g., 820*a*3 as illustrated in FIG. 8A), the first city name (e.g., 820*a*5 as illustrated in FIG. 8A), and the second city name (e.g., 820*a*61 as illustrated in FIG. 8A). In some embodiments, in accordance with a determination that the computer system is associated with the first time zone (e.g., 814*a*) (e.g., the current time zone is the first time zone), the computer system displays the third city name (e.g., 820*a*3 as illustrated in FIG. 8A) at a fifth location in the clock face with text that is oriented so that bottoms of the letters in the third city name are closer to the current time indication (e.g., 826 as illustrated in FIG. 8A) than tops of the letters in the third city name are to the current time indication. In some embodiments, in accordance with a determination that the computer system is associated with the second time zone (e.g., 814*b*) (e.g., the current time zone is the second time zone) that is different from the first time zone, the computer systems displays the third city (e.g., 820*a*3 as illustrated in FIG. 8B) at a sixth location in the clock face with text that is oriented so that the tops of the letters in the third city name are closer to the current time indication than the bottoms of the letters in the third city name are to the current time indication. Conditionally displaying, based on whether a computer system is associated with a first time zone or a second time zone, a third city name in a fifth location in a first orientation or a sixth location in a second orientation provides the user with relevant information about the context of the computer system without requiring the user to provide further inputs. Performing an operation when a set of conditions has been met without requiring further user input enhances the operability of the device and makes the user-device interface more efficient (e.g., by helping the user to determine whether the third city name represents the current time zone associated with the computer system) which, additionally, reduces power usage and improves battery life of the device by enabling the user to use the device more quickly and efficiently.

In some embodiments, the one or more cities include a fourth city (e.g., 820*a*2 as illustrated in FIG. 8A) and as a part of displaying the name of the one or more cities the computer system (e.g., 800) concurrently displays the fourth city name (e.g., 820*a*2 as illustrated in FIG. 8A), the first city name (e.g., 820*a*5 as illustrated in FIG. 8A), the second city name (e.g., 820*a*6 as illustrated in FIG. 8A), and the third city name (e.g., 820*a*3 as illustrated in FIG. 8A). In some embodiments, in accordance with a determination that the computer system (e.g., 800) is associated with the first time zone (e.g., 814*a*) (e.g., the current time zone is the first time zone), the computer system displays the fourth city name (e.g., 820*a*2 as illustrated in FIG. 8A) at a seventh location in the clock face with text that is oriented so that bottoms of the letters in the fourth city name are closer to the current time indication (e.g., 826 as illustrated in FIG. 8A) than tops of the letters in the fourth city name are to the current time indication. In some embodiments, in accordance with a determination that the computer system is associated with the second time zone (e.g., 814*b*) (e.g., the current time zone is the second time zone) that is different from the first time zone, the computer system displays the fourth city name (e.g., 820*a*2 as illustrated in FIG. 8B) at an eighth location in the clock face with text that is oriented so that the tops of the letters in the fourth city name are closer to the current time indication than the bottoms of the letters in the fourth city name are to the current time indication. Conditionally displaying, based on whether a computer system is associated with a first time zone or a second time zone, a fourth city name in a seventh location in a first orientation or an eighth location in a second orientation provides the user with relevant information about the context of the computer system without requiring the user to provide further inputs. Performing an operation when a set of conditions has been met without requiring further user input enhances the operability of the device and makes the user-device interface more efficient (e.g., by helping the user to determine whether the fourth city name represents the current time zone associated with the computer system) which, additionally, reduces power usage and improves battery life of the device by enabling the user to use the device more quickly and efficiently.

In some embodiments, in accordance with a determination that the computer system (e.g., 800) is associated with a third time zone (e.g., 814*c*) (e.g., the current time zone is the third time zone) that is different from the first time zone and the second time zone, the computer system displays the first city name (e.g., 820*a*5 as illustrated in FIG. 8C) with text that is oriented so that the tops of the letters in the first city name are closer to the current time indication (e.g., 826 as illustrated in FIG. 8C) than the bottoms of the letters in the first city name are to the current time indication. In some embodiments, in accordance with a determination that the computer system is associated with the third time zone (e.g., 814*c*) (e.g., the current time zone is the third time zone), the computer system displays the second city name (e.g., 820*a*6 as illustrated in FIG. 8C) with text that is oriented so that the tops of the letters in the second city name are closer to the current time indication than the bottoms of the letters in the second city name are to the current time indication. Conditionally displaying the first city name in the same orientation as the second city name provides the user with relevant information about the context of the computer system without requiring the user to provide further inputs. Performing an operation when a set of conditions has been met without requiring further user input enhances the operability of the device and makes the user-device interface more efficient (e.g., by displaying information about which city corresponds to which time zone) which, additionally, reduces power usage and improves battery life of the device by enabling the user to use the device more quickly and efficiently.

In some embodiments, the one or more cities include a third city (e.g., 820*a*3 as illustrated in FIG. 8A) and as a part of displaying the name of the one or more cities the computer system (e.g., 800) concurrently displays the third city name (e.g., 820*a*3 as illustrated in FIG. 8A), the first city name (e.g., 820*a*5 as illustrated in FIG. 8A), and the second city name (e.g., 820*a*6 as illustrated in FIG. 8A). In some embodiments, in accordance with a determination that the computer system is associated with the first time zone (e.g., 814*a*) (e.g., the current time zone is the first time zone), the computer system displays third city name (e.g., 820*a*3 as illustrated in FIG. 8A) at a fifth location in the clock face with text that is oriented so that bottoms of the letters in the third city name are closer to the current time indication (e.g., 826 as illustrated in FIG. 8A) than tops of the letters in the third city name are to the current time indication. In some embodiments, in accordance with a determination that the computer system is associated with the second time zone (e.g., 814*b*) (e.g., the current time zone is the second time zone) that is different from the first time zone, the computer system displays the third city name (e.g., 820*a*3 as illustrated in FIG. 8B) at a sixth location in the clock face with text that is oriented so that the tops of the letters in the third city name are closer to the current time indication than the bottoms of the letters in the third city name are to the current time indication. In some embodiments, in accordance with a determination that the computer system is associated with a third time zone (e.g., 814*c*) (e.g., the current time zone is the third time zone), the computer system displays the third city name (e.g., 820*a*3 as illustrated in FIG. 8C) with text that is oriented so that the bottoms of the letters in the third city name are closer to the current time indication than the tops of the letters in the third city name are to the current time indication. Conditionally displaying the first city name in the same orientation as the second city name while a third city name is displayed in a different orientation provides the user with relevant information about the context of the computer system (e.g., the relative time zones of the first, second, and third cities) without requiring the user to provide further inputs. Performing an operation when a set of conditions has been met without requiring further user input enhances the operability of the device and makes the user-device interface more efficient (e.g., by displaying information about which city corresponds to which time zone) which, additionally, reduces power usage and improves battery life of the device by enabling the user to use the device more quickly and efficiently.

In some embodiments, the orientation in which the names of one or more different cities are displayed is maintained while the current time zone associated with the computer system is maintained (e.g., the orientation of name 820*a*4 is maintained so that the bottoms of the letters are closer to the current time indication than the tops of the letters as illustrated in FIGS. 8B-8C). In some embodiments, the computer system forgoes changing the orientation at which the names of one or more different cities are displayed as long as the computer system remains in the same time zone. Maintaining the orientation in which the names of one of more different cities are displayed while the current time zone associated with the computer system is maintained provides the user with visual feedback that the current time zone associated with the computer system has not changed. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the first location in the clock face at which the first city name (e.g., 820*a*5 as illustrated in FIG. 8A) is displayed indicates a current time in the first city (e.g., the current time in Moscow) (e.g., the current time in the time zone associated with the first city) relative to a current time in the current time zone associated with the computer system (e.g., 814*a*) (e.g., the current time in the time zone associated with the computer system). In some embodiments, the current time in the time zone associated with the first city (e.g., 820*a*5 as illustrated in FIG. 8A) is different from the current time in the time zone associated with the computer system (e.g., 826 as illustrated in FIG. 8A). Displaying a first city name, wherein the first location in a clock face at which the first city name is displayed indicates a current time in the first city relative to a current time in the current time zone associated with the computer system, provides the user with visual feedback about the relative times between the current time in the first city and the current time in the current time zone associated with the computer system. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, a ninth location in the clock face (e.g., 816*a*) at which a fifth city name (e.g., 820*a*4 as illustrated in FIG. 8A) is displayed indicates a current time in the fifth city (e.g., the current time in the time zone associated with the city (e.g., Mexico)) relative to the current time in the first city (e.g., 820*a*4 as illustrated in 8A) and relative to the current time (e.g., as indicated by 826 as illustrated in FIG. 8A) in the current time zone (e.g., 814*a*) associated with the computer system. Displaying a fifth city name, wherein the first location in a clock face at which the fifth city name is displayed indicates a current time in the fifth city relative to a current time in the current time zone associated with the computer system, provides the user with visual feedback about the relative times between the current time in the fifth city and the current time in the current time zone associated with the computer system. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face (e.g., 816*a*) includes an indicator of a sunrise time (e.g., 822 as illustrated in FIG. 8A) (e.g., a visual element representing the sunrise time, a textual element) in the current time zone associated with the computer system. In some embodiments, the clock face includes an indicator of a sunset time (e.g., 822 as illustrated in FIG. 8A) (e.g., a visual element representing the sunset time, a textual element) in the current time zone associated with the computer system. Concurrently displaying indicators of sunrise and sunset times provides the user with visual feedback about the sunrise time and the sunset times and a current time indication for the current time zone associated with the computer system provides visual feedback about various relevant times corresponding to a current time zone (e.g., 814*a*) associated with the computer system, and enables the user to quickly and efficiently discern the sunrise and sunset times in addition to the current time. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the sunrise time and the sunset time change throughout a year. In some embodiments, the graphical indicator of the sunrise time (e.g., 822 as illustrated in FIG. 8A) and the graphical indicator of a sunset time (e.g., 822 as illustrated in FIG. 8A) are updated (e.g., automatically by the computer system) to indicate the sunrise/sunset time for a current day. In some embodiments, the graphical indicator of the sunrise time and the graphical indicator of a sunset time are updated based on data retrieved from a remote computer (e.g., a remote server, a software update server). Concurrently displaying indicators of sunrise and sunset times, wherein the sunrise and sunset times change throughout a year, and the current time indication for the current time zone associated with the computer system enables the user to quickly and efficiently discern the sunrise and sunset times in addition to the current time throughout a year. The sunrise time and the sunset time changing throughout the year allows the indicators to provide visual indications of up-to-date sunrise and sunset times as sunrise times and sunset times naturally shift throughout a year. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face includes an analog dial (e.g., 820*c* as illustrated in FIG. 8A) (e.g., a circular dial with hour markers evenly spaced around the perimeter of the circle, representing 24 hours (e.g., as opposed to 12 hours)). In some embodiments, the indicator of a sunrise time (e.g., 822 in FIG. 8A) and the indicator of a sunset time (e.g., 822 in FIG. 8A) are displayed within the analog dial. Concurrently displaying the indicator of sunrise and sunset time in an analog dial provides the user with visual feedback about the sunrise time and the sunset times while the current time indication is displayed enables the user to quickly and efficiently discern the sunrise and sunset and the current time. Displaying the indicator of sunrise time and the indicator of sunset time within the analog dial provides visual feedback that the indicators are related to features provided by and/or within the analog dial (e.g., time-telling features). Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face includes a map (e.g., 824*a* as illustrated in FIG. 8A) (e.g., a visual representation of a globe). In some embodiments, the indicator of a sunrise time includes a first terminator line (e.g., 822 as illustrated in FIG. 8A) that is displayed on the map and the indicator of a sunset time includes a second terminator line that is displayed on the map. In some embodiments, a terminator line includes a visual animation depicting a change in a lighting effect applied to the map. In some embodiments, a shadow effect is selectively displayed over the portion of the map on one side of a terminator line. In some embodiments, the first terminator line and the second terminator line are a single terminator line (e.g., first terminator line and the second terminator line are (e.g., parts of) the same line). In some embodiments, the single terminator line curves across the map to indicate both the sunrise time and a sunset time. Displaying indicators of sunrise and sunset times via terminator lines enables the user to quickly and efficiently view the sunrise and sunset times in a graphical manner, and provides visual feedback about the relationship between the sunset time and/or sunrise time and the map included in the clock face (e.g., the width between the indicator lines can provide visual feedback about the length of a day). Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the current time zone (e.g., 814*a* as illustrated in FIG. 8A) associated with the computer system (e.g., 800) is selected based on an automatically determined location of the computer system (e.g., based on GPS, GLONASS, Wi-Fi/Bluetooth triangulation, cell tower metadata, etc.). In some embodiments, the computer system automatically selects the current time zone associated with the computer system based on an automatically determined location of the computer system. Selecting the current time zone associated with the computer system based on global positioning data enables the computer system to display information related to the time zone in which the computer system is located without requiring additional user inputs from the user to select a current time zone associated with the computer system. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the one or more different cities include a representative city (e.g., 820*a*1 as illustrated in FIG. 8A) selected based on the automatically determined location of the computer system. In some embodiments, the computer system displays a visual indicator (e.g., 815 as illustrated in FIG. 8A) (e.g., a marker (e.g., a triangular marker), a graphical element, an arrow, a text element (e.g., a text element displayed with bolded font)) corresponding to the representative city. In some embodiments, the representative city is a city is selected based on a determination that it is located in the current time zone (e.g., 814*a*) associated with the computer system. In some embodiments, the visual indicator corresponding to the representative city indicates that the representative city represents the current time zone associated with the computer system. Displaying a visual indicator corresponding to a representative city selected based on the automatically determined location of the computer system provides visual feedback that the current time indication corresponds to the representative city (as opposed to a different city displayed around the clock face). Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the representative city (e.g., 820*a*1 as illustrated in FIG. 8A) is different than a city in which the computer system is located (e.g., San Francisco as illustrated by 814*a* in FIG. 8A). Displaying the user interface with a representative city that is different than a city in which the computer system is located provides visual feedback that the time being shown corresponds to a current time zone associated with the computer system of which the representative city is in, and indicates that the time shown is not specific to the city in which the computer system is accurate for cities other than the current city in which the computer system is located. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, rotating the positions on the clock face at which the names of one or more different cities are displayed corresponds to updating the current time zone associated with the computer system (e.g., as illustrated in FIGS. 8A-8C) (e.g., 800). In some embodiment, updating the position of the names of one or more different cities includes rotating the positions of names around the clock face (e.g., by an angle) around an axis of rotation. Shifting the current time zone when the dial containing the names of one or more cities is rotated provides visual feedback that the position at which the cities are displayed on the clock face relates to a current time zone associated with the computer system. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 800) is in communication with a rotatable input mechanism (e.g., 804) (e.g., a rotatable input device; a rotatable input device). In some embodiments, the computer system detects, via the rotatable input mechanism, a rotation (e.g., 860*a*) of the rotatable input mechanism about a first axis of rotation (e.g., as illustrated in FIG. 8D). In some embodiments, in response to detecting the rotation of the rotatable input mechanism about the first axis of rotation, the computer system rotates the positions on the clock face at which the names of one or more different cities are displayed about a second axis of rotation different from (e.g., perpendicular to) the first axis of rotation, wherein rotating the positions on the clock face at which the names of one or more different cities are displayed includes: in accordance with a determination that the rotation of the rotatable input mechanism about the first axis of rotation is in a first direction (e.g., clockwise), the direction in which the one or more different cities are rotated about the second axis of rotation is a third direction (e.g., clockwise); and in accordance with a determination that the rotation of the rotatable input mechanism about the first axis of rotation is in a second direction (e.g., counterclockwise) different from the first direction, the direction in which the one or more different cities are rotated about the second axis of rotation is a fourth direction (e.g., counterclockwise) different from the third direction. Rotating the positions on a clock face at which names of one or more different cities are displayed in either different directions based on a determination about whether a detected rotational input is in a first direction or a second direction provides visual feedback that the direction of the rotational input can be used control the direction of the rotation reduces the number of inputs needed to perform an operation enhances the operability of the device and makes the user-device interface more efficient (e.g., by helping the user to provide proper inputs and reducing user mistakes when operating/interacting with the system) which, additionally, reduces power usage and improves battery life of the device by enabling the user to use the system more quickly and efficiently. Reducing the number of inputs needed to perform an operation enhances the operability of the device and makes the user-device interface more efficient (e.g., by helping the user to rotate the cities in a desired direction quickly and efficiently) which, additionally, reduces power usage and improves battery life of the device by enabling the user to use the device more quickly and efficiently.

In some embodiments, a background of the clock face is a world map (e.g., 824*a* as illustrated in FIG. 8A) (e.g., an animation representing a globe). Displaying a clock face, wherein the background of the clock face is a world map provides visual feedback that features of the clock face relate to the world map. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 800) receives, via the one or more input devices, a user input (e.g., 850*a*) (e.g., a tap input, a swipe, a press input, and/or a mouse click) on the world map (e.g., 824*a*, as illustrated in FIG. 8E). In some embodiments, in response to receiving the user input, the computer system centers a city that represents the current time zone associated with the computer system on the world map (e.g., as illustrated in FIG. 8F). In some embodiments, centering the city that represents the current time zone associated with the computer system on the world map includes zooming in on the city that represents the current time zone associated with the computer system (e.g., illustrated in map 824*b* in FIG. 8F). Centering a city that represents the current time zone associated with the computer system in response to a user input reduces the number of inputs needed to center the selected city (e.g., by helping the user to center a relevant city without, for example, multiple pinch and/or swipe inputs) which, additionally, reduces power usage and improves battery life of the device by enabling the user to use the system more quickly and efficiently. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, as a part of centering the city that represents the current time zone associated with the computer system (e.g., 800) on the world map (e.g., 824*a*), the computer system transitions from displaying the city associated with the current time zone associated with the computer system off-center to displaying the city associated with the current time zone associated with the computer system in the center of the clock face (e.g., 816*h*) at a point on the clock face about which a plurality of clock hands including a first clock hand (e.g., an hour, minute, or second hand) and a second clock hand (e.g., 826) (e.g., another one of an hour, minute, or second hand) rotate (e.g., 824*b*, as illustrated in FIG. 8F). Displaying the city associated with the current time zone associated with the computer system in the center of the world map, wherein the city that represents the current time zone associated with the computer system is displayed behind a plurality of clock hands, provides visual feedback that the time currently being indicated by the clock hands corresponds to the city displayed behind the clock hands. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face (e.g., 816*k*) includes a plurality of clock hands (e.g., 826 as illustrated in FIG. 8A) including a first clock hand (e.g., an hour, minute, or second hand) and a second clock hand (e.g., 826) (e.g., another one of an hour, minute, or second hand). In some embodiments, the computer system updates a position of the clock hands to indicate the current time in the current time zone associated with the computer system (e.g., 800). In some embodiments, the computer system displays names of one or more different cities behind (e.g., overlaid by) the plurality of clock hands (e.g., 826 as illustrated in FIG. 8M). Displaying names of the one or more different cities behind the plurality of clock hands enables the plurality of clock hands to be displayed without the plurality of clock hands being obscured, thereby providing improved visual feedback by allowing the names of the cities to be read while maintaining unobstructed views of the clock hands to indicate a current time. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face (e.g., 816*a*) includes a second analog dial (e.g., 820*b* as illustrated in FIG. 8A) (e.g., a circular dial with hour markers evenly spaced angularly around the perimeter of the circle, representing 24 hours (e.g., as opposed to 12 hours)), and wherein the analog dial is updated (e.g., automatically) based on the current time in the current time zone associated with the computer system (e.g., 800). In some embodiments, the analog dial rotates (e.g., automatically) over time to reflect the passage of time, wherein the change in the angle of rotation of the analog dial corresponds to the change in time. Displaying a clock face that includes a second analog dial that is gradually updated based on the current time provides visual feedback about a current time, and enables a user to quickly and efficiently determine the current time when looking at the clock face. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, an indication (e.g., 815) of the current time (e.g., 815 as illustrated in FIG. 8A) in the current time zone associated with the computer system (e.g., 800) is displayed at the bottom of the clock face. Displaying a city that represents the current time zone associated with the computer system in a fixed portion of the clock face (such as the bottom of a user interface) provides visual feedback that the city in that location corresponds to the current time zone associated with the computer system. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face includes an inset time indication (e.g., 826 as illustrated in FIG. 8A) (e.g., an analog clock face with an hour hand and, optionally, a minute hand and/or a second hand indicating time) at a first position on the clock face (e.g., 826 as illustrated in FIG. 8G) (e.g., in the center of the clock face). In some embodiments, the clock face includes a digital indication of time (e.g., 858 as illustrated in FIG. 8L), wherein the digital indication of time includes tick marks representing seconds around a digital time indication. In some embodiments, the clock face is circular. In some embodiments, the inset time indication includes a representation of the current time in the current time zone associated with the computer system in a 12-hour format (e.g., as opposed to 24-hours). Displaying an inset time indication that includes a representation of the current time in a 12-hour format provides visual feedback about a current time, and enables the clock face to quickly and easily convey to a viewer the current time in the current time zone associated with the computer system in a second manner in addition to the current time indication. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system displays, via the display generation component (e.g., 802), the inset time indication (e.g., 826 as illustrated in FIG. 8G). In some embodiments, the inset time indication is presented according to a first format (e.g., 826 as illustrated in FIG. 8G) (e.g., the first indication of time includes an analog indication of time). In some embodiments, the computer system receives, via the one or more input devices, a sequence of one or more user inputs (e.g., as illustrated in FIGS. 8G-8L) (e.g., touch inputs, rotational inputs, press inputs) corresponding to a request to edit the inset time indication. In some embodiments, in response to receiving the sequence of one or more user inputs corresponding to a request to edit the inset time indication, the computer system displays, via the display generation component, the inset time indication (e.g., 858, as illustrated in FIG. 8L). In some embodiments, the inset time indication (e.g., 858 as illustrated in FIG. 8L) is presented according to a second format (e.g., the first indication of time includes a digital indication of time) different from the first format (e.g., 858). Editing the inset time indication to be displayed according to a second format different from a first format provides improved visual feedback by allowing improve readability, and/or to match a user's preference. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the clock face includes a second analog dial (e.g., 820*b*) including a plurality of hour markers representing a twenty-four hour time period (e.g., a circular dial with hour markers evenly spaced angularly around the perimeter of the circle, representing 24 hours (e.g., as opposed to 12 hours)). In some embodiments, the second dial (e.g., 820*b* as illustrated in FIG. 8A) is completely contained within a perimeter of the first dial (e.g., 820*a* as illustrated in FIG. 8A). In some embodiments, the second dial is oriented with the zero hour (e.g., midnight) at the bottom of the dial and the twelfth hour (e.g., noon) at the top of the dial. In some embodiments, the second dial is contained within a first area of the watch face representing a first clock face. In some embodiments, in accordance with a determination that a current date does not fall within a predetermined time range (e.g., a time range during which Daylight Savings Time is observed in at least one of the time zones represented on the clock face), the plurality of hour markers representing a twenty-four hour time period is a first plurality of hour markers (e.g., hour numerals ranging from 0 to 24). In some embodiments, in accordance with a determination that the current date falls within a predetermined time range (e.g., a time range during which Daylight Savings Time is observed in at least one of the time zones represented on the clock face), the plurality of hour markers representing a twenty-four hour time period is a second plurality of hour markers different from the first plurality of hour markers. In some embodiments, the first plurality of hour markers contains hour markers ranging from 1 to 24 (e.g., 1, 2, 3, 4 . . . 24) to represent the 24 hours in a day, whereas the second plurality of hour markers includes at least one marker different from the first plurality of hour markers to account for the observance of Daylight Savings Time in different time zones and/or cities or countries (e.g., 1, 2, 2, 4 . . . 24). In some embodiments, the second analog dial includes the first plurality of hour markers when Daylight Savings Time is not in effect, but includes the second plurality of hour markers when Daylight Savings Time is in effect. Conditionally displaying a plurality of hour markers representing a twenty-four hour time period that is either a first plurality of hour markers or a second plurality of hour markers based on whether a current date falls within a predetermined time range provides the user with the appropriate plurality of hour markers, when the relevant conditions are met, without requiring the user to provide further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the second plurality of hour markers includes at least one duplicate hour marker (e.g., 820*b* as illustrated in FIG. 8M) (e.g., at least one hour marker is included in the second plurality of hour markers more than once). In some embodiments, displaying the hour markers representing the twenty-four hour time period during Daylight Savings Time includes displaying at least one of the hour markers in more than one location on the clock face. Including at least one duplicate hour marker in the second plurality of hour markers provides visual feedback that the current time in at least two of the time zones represented by the second plurality of hour markers is the same, when the relevant conditions are met, without requiring the user to provide further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first plurality of hour markers includes at least a first hour marker that is not included in the second plurality of hour markers (e.g., as illustrated in 820*b* as shown in FIG. 8B as compared to 820*b* in FIG. 8M). In some embodiments, displaying the hour markers representing the twenty-four hour time period during Daylight Savings Time includes omitting at least one hour marker (e.g., as illustrated by the lack of a “6” hour numeral in 820*b* of FIG. 8M) corresponding to a particular time (e.g., hour) of the day. Including at least a first hour marker that is not included in the second plurality of hour markers, provides visual feedback that the relative differences between the time zones represented by the hour markers is different when the second plurality of hour markers is displayed relative to when the first plurality of hour markers is displayed, when the relevant conditions are met, without requiring the user to provide further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

Note that details of the processes described above with respect to method 900 (e.g., FIG. 9) are also applicable in an analogous manner to the methods described herein. For example, method 900 optionally includes one or more of the characteristics of the various methods described herein with reference to method 700, method 1100, and method 1300. For example, method 900 optionally includes one or more of the characteristics of the various methods described above with reference to method 700. For example, a device can use as a watch user interface either a user interface that includes an indication of time based on geographic data as described with reference to FIGS. 8A-8M or a watch user interface as described with reference to FIGS. 6A-6U. As another example, a watch user interface as described with reference to FIGS. 8A-8M can include in hour numerals that are updated based on the current time as described with reference to FIGS. 10A-10W and method 1100. For another example, method 900 optionally includes one or more of the characteristics of the various methods described below with reference to method 1300. For example, the watch user interfaces of FIGS. 8A-8M can be created or edited via the process for updating and selecting watch user interfaces as described with reference to FIGS. 12A-12W. For another example, method 900 optionally includes one or more of the characteristics of the various methods described below with reference to method 1500. For example, a layout editing user interface including a preview user interface corresponding to the watch user interfaces of FIGS. 8A-8M can be displayed on a computer system in communication with computer system 800. For brevity, these details are not repeated below.

FIGS. 10A-10W illustrate exemplary user interfaces for managing clock faces based on state information of a computer system. The user interfaces in these figures are used to illustrate the processes described below, including the processes in FIG. 11.

FIGS. 10A-10W illustrate exemplary user interfaces for enabling and displaying user interfaces including hour numerals that are displayed with different width strokes. The user interfaces in these figures are used to illustrate the processes described below, including the process in FIG. 11.

FIG. 10A illustrates computer 1000 displaying, via display 1002, watch user interface **1020*a*. Computer system 1000 includes rotatable and depressible input mechanism 1004. In some embodiments, computer system 1000 optionally includes one or more features of device 100, device 300, or device 500. In some embodiments, computer system 1000 is a tablet, phone, laptop, desktop, camera, etc. In some embodiments, the inputs described below can optionally be substituted for alternate inputs, such as a press input and/or a rotational input received via rotatable and depressible input mechanism 1004**.

In FIG. 10A, watch user interface **1020*a* includes a plurality of hour numerals that are displayed with different width strokes. At FIG. 10A, watch user interface 1020*a* includes hour numeral 1006*a*, corresponding to the "1" hour numeral, which corresponds to an hour portion of a current time being "1" (e.g., 1:00 A.M., 1:00 P.M., etc.). Watch user interface 1020*a* further includes hour numeral 1006*b*, which corresponds to the "2" hour numeral, hour numeral 1006*c*, which corresponds to the "3" hour numeral, hour numeral 1006*d*, which corresponds to the "4" hour numeral, hour numeral 1006*e*, which corresponds to the "5" hour numeral, hour numeral 1006*f*, which corresponds to the "6" hour numeral, hour numeral 1006*g*, which corresponds to the "7" hour numeral, hour numeral 1006*h*, which corresponds to the "8" hour numeral, hour numeral 1006*i*, which corresponds to the "9" hour numeral, hour numeral 1006*j*, which corresponds to the "10" hour numeral, hour numeral 1006*k*, which corresponds to the "11" hour numeral, and hour numeral 1006*l*, which corresponds to the "12" hour numeral. In some embodiments, watch user interface 1020 includes 24 numerals corresponding to the 24 hours of a day instead of 12 hour numerals (e.g., in a military time format). At watch user interface 1020*a*, the hour numerals (e.g., hour numerals 1006*a*-1006*l*) are displayed with a different stroke width. In some embodiments, displaying a numeral with a given stroke width includes displaying an hour numeral, wherein the width of the strokes and/or lettering that make up lines of the hour numeral are drawn and/or displayed with a certain thickness. Watch user interface 1020*a* includes hour numerals 1020*a*-1020*l* displayed in a roughly square shape, in a numerical order that can be traversed in a clockwise or counterclockwise direction. In some embodiments, hour numerals 1020*a*-1020*l*** can be displayed in a round shape (e.g., a circle, an ellipse, etc.).

Watch user interface **1020*a* displays the hour numerals (e.g., hour numerals 1006*a*-1006*l*) with width strokes based on the current time. In watch user interface 1020*a*, the current time is 10:09, as indicated by the position of the analog clock hands included in time indication 1008. In some embodiments, the width at which each hour numeral included in watch user interface 1020*a* is displayed is based on the hour portion of the current time. In watch user interface 1020*a*, the hour numeral that corresponds to the hour portion of the current time is displayed with the largest width stroke. In watch user interface 1020*a*, the hour numeral that is displayed adjacent to the hour numeral that corresponds to the hour portion of the current time in a counterclockwise direction is displayed with the second largest width stroke. This pattern continues around the dial in a counterclockwise direction up to the hour numeral that is displayed adjacent to the hour numeral that corresponds to the hour portion of the current time in a clockwise direction, which is displayed with the smallest width stroke. For example, at watch user interface 1020*a*, at 10:09, hour numeral 1006*j* ("10") is displayed with the largest width stroke, hour numeral 1006*i* ("9") is displayed with the second largest width stroke, and hour numeral 1006*k* ("11") is displayed with the smallest width stroke. In some embodiments, displaying an hour numeral with a given width stroke corresponds to displaying hour numerals with a certain pixel width. For example, in watch user interface 1020*a*, the lines that make up the numbers of hour numeral 1006*j* ("10") are 20 pixels wide, the lines that make up the numbers of hour numeral 1006*i* ("9") are 18 pixels wide, and the lines that make up the numbers of hour numeral 1006*k* ("11") are 2 pixels wide. Accordingly, the width stroke with which the other hour numerals (e.g., hour numerals 1006*a*-1006*h* and hour numeral 1006*l*) are displayed gradually decreases as one traverses around watch user interface 1020*a* in a counterclockwise direction, starting with the hour numeral that corresponds to the hour portion of the current time, 1006*j* ("10"), and ending with the hour numeral that numerically succeeds the hour numeral that corresponds to the hour portion of the current time, 1006*k*** ("11").

Watch user interface **1020*a* further includes time indication 1008, which includes analog clock hands, wherein the position of the analog clock hands represents the current time (e.g., hour, minute, and/or second). At watch user interface 1020*a*, time indication 1008** indicates that the current time is 10:09 (e.g., A.M. or P.M.).

Watch user interface **1020*a* further includes date indication 1010, which includes a visual and/or textual indication of the current date (e.g., the current day of the week, the current day of the month, the current month, and/or the current year). Watch user interface 1020*a* further includes complication 1012*a*, which includes information from an application available on (e.g., installed on) computer system 1000. In some embodiments, complication 1012*a* is updated in accordance with the passage of time to display updated information (e.g., from the application associated with complication 1012*a*). In some embodiments, selecting complication 1012*a* causes computer system 1000 to launch the application that corresponds to complication 1012*a***.

At FIG. 10B, computer system 1000 displays watch user interface **1020*b*, which illustrates an updated version of watch user interface 1020*a* at a different time. Watch user interface 1020*b* includes time indication 1008, wherein the position of the analog clock hands in watch user interface 1020*b* indicates that the current time in watch user interface 1020*b*** is 11:09.

In watch user interface **1020*b*, based on the updated time, computer system 1000 updates the width stroke with which hour numerals 1006*a*-1006*l* are displayed such that the hour numeral that corresponds to the hour portion of the current time, 1006*k* ("11") is displayed with the largest width stroke. In watch user interface 1020*b*, the hour numeral that is displayed adjacent to the hour numeral that corresponds to the current hour portion of the current time in a counterclockwise direction is displayed with the second largest width stroke. This pattern continues around the dial in a counterclockwise direction up to the hour numeral that is displayed adjacent to the hour numeral that corresponds to the hour portion of the current time in a clockwise direction, which is displayed with the smallest width stroke. For example, at watch user interface 1020***b*, at 11:09, hour numeral 1006*k* ("11") is displayed with the largest width stroke, hour numeral 1006*j* ("10") is displayed with the second largest width stroke, and hour numeral 1006*l* ("12") is displayed with the smallest width stroke. Accordingly, the width stroke with which the hour numerals are displayed gradually decreases as one traverses around watch user interface 1020*b* in a counterclockwise direction, starting with the hour numeral that corresponds to the hour portion of the current time, 1006*k* ("11"), and ending with the hour numeral that numerically succeeds the hour numeral that corresponds to the hour portion of the current time, 1006*l* ("12").

FIG. 10C illustrates computer system 1000 receiving input 1050*a* (e.g., a tap input) on an hour numeral. In FIG. 10C, computer system is displaying watch user interface 1020*c*, which significantly matches watch user interface 1020*b*, and computer system 1000 receives input 1050*a* on hour numeral 1006*f* ("6").

At FIG. 10D, in response to receiving input 1050*a*, computer system 1000 displays 1020*d*, which is similar to watch user interface 1020*c*, but includes hour numerals being displayed with different width strokes in response to input 1050*a*. FIGS. 10D-10F illustrate computer system 1000 displaying watch user interfaces that include hour numerals 1006*a*-1006*l*, wherein the width strokes of one or more hour numerals are updated in response to input 1050*a*. In some embodiments, computer system 1000 displays hour numerals with a ripple animation in response to receiving an input received on an hour numeral (e.g., 1006*f*). In some embodiments, displaying the ripple animation includes temporarily displaying the hour numeral on which the input was received with an increased width stroke and, subsequently, reducing the width stroke with which the selected hour numeral is displayed and displaying one or more hour numerals adjacent to the selected hour numeral with an increased width stroke. In some embodiments, the ripple animation continues through all of the hour numerals included in a given watch user interface. In some embodiments, the animation ends after an hour numeral displayed opposite from (e.g., across from) the selected hour numeral on display 1002 is temporarily displayed with an increased width stroke. For example, in some embodiments, an input received on hour numeral 1006*f* ("6") would cause computer system 1000 to display a ripple animation in which hour numerals included in a watch user interface would be temporarily displayed with an increased width stroke in the following order: first hour numeral 1006*f* ("6"), then hour numerals 1006*g* ("7") and 1006*e* ("5"), then 1006*h* ("8") and 1006*d* ("4"), then 1006*i* ("9") and 1006*c* ("3"), then 1006*j* ("10") and 1006*b* ("2"), then 1006*k* ("11") and 1006*a* ("1"), and lastly hour numeral 1006*l* ("12"). As described above, FIG. 10D illustrates computer system 1000 displaying watch user interface 1020*d*, wherein hour numeral 1006*f* ("6") is temporarily displayed with an increased width stroke in response to input 1050*a*.

At FIG. 10E, after displaying hour numeral 1006*f* ("6") with an increased width stroke in response to input 1050*a*, computer system 1000 displays watch user interface 1020*e*, which includes hour numerals 1006*g* ("7") and 1006*e* ("5") being displayed with an increased width stroke. In watch user interface 1020*e*, hour numeral 1006*f* ("6") is displayed with the width stroke it was displayed with before computer system 1000 received input 1050*a* (e.g., in watch user interface 1020*b*). In some embodiments, computer system 100 displays an animation wherein the affected hour numerals grow and/or shrink gradually. For example, in some embodiments, the transition from displaying watch user interface 1020*d* to 1020*e* includes displaying an animation of hour numeral 1006*f* ("6") shrinking while concurrently displaying an animation of hour numerals 1006*g* ("7") and 1006*e* ("5") growing.

At FIG. 10F, after displaying watch user interface 1020*e* and in response to receiving input 1050*a*, computer system 1000 displays 1020*f*, which is similar to watch user interface 1020*d*, but includes hour numerals being displayed with different width strokes in response to input 1050*a*. At FIG. 10F, computer system 1000 displays watch user interface 1020*f*, which includes hour numerals 1006*h* ("8") and 1006*d* ("4") being displayed with an increased width stroke. In some embodiments, hour numerals 1006*f* ("6"), 1006*g* ("7"), and 1006*e* ("5") are displayed with the width stroke that they were displayed with before computer system 1000 received input 1050*a*. In watch user interface 1020*f*, the width stroke that hour numeral 1006*f* ("6") is displayed with is back to the width stroke it was displayed in at watch user interface 1020*c*, hour numerals 1006*g* ("7") and 1006*e* ("5") are displayed with a slightly increased width stroke relative to the width strokes they were displayed with in watch user interface 1020*c*, and hour numerals 1006*h* ("8") and 1006*d* ("4") being displayed with width strokes that have been increased by a larger magnitude.

In some embodiments, computer system 100 displays an animation illustrating the affected hour numerals growing and/or shrinking gradually. For example, in some embodiments, the transition from displaying watch user interface 1020*e* to 1020*f* includes displaying an animation of hour numerals 1006*g* ("7") and 1006*e* ("5") shrinking while concurrently displaying an animation of hour numerals 1006*h* ("8") and 1006*d* ("4") growing.

FIGS. 10G-10J illustrate computer system 1000 displaying watch user interfaces including hour numerals 1006*a*-1006*l*, wherein the width strokes that hour numerals 1006*a*-1006*l* are displayed with are updated based on a rotational input, such that the width strokes that hour numerals 1006*a*-1006*l* are displayed with reflect a snaking animation. At FIG. 10G, computer system 1000 displays watch user interface 1020*g*, which includes hour numerals 1006*a*-1006*l*. Watch user interface 1020*g* includes time indication 1008, which indicates that the current time at watch user interface 1020*g* is 12:09. Based on the current time, computer system 1000 displays watch user interface 1020*g*, wherein hour numeral 1006*l* ("12") is displayed with the largest width stroke, hour numeral 1006*a* ("1") is displayed with the smallest width stroke, hour numeral 1006*k* ("11") is displayed with the second largest width stroke, and so on as described above with respect to FIGS. 12A-12B. At FIG. 10G, computer system 1000 receives rotational input 1060*a* via rotatable and depressible input mechanism 1004.

At FIG. 10H, in response to receiving rotational input 1060*a*, computer system 1000 displays watch user interface 1020*h*, which updates the width stroke at which hour numerals 1006*a*-1006*l* are displayed in accordance with a snaking animation. Displaying watch user interface 1020*h* with the snaking animation includes displaying hour numerals 1006*a*-1006*l* with updated width strokes, such that the width strokes at which each hour numeral is displayed is shifted around the watch user interface in a first direction (e.g., clockwise or counterclockwise) around a first rotational axis in response to the rotatable and depressible input mechanism

1004 being rotated around a second rotational axis different from the first rotational axis. For example, watch user interface 1020*h* includes hour numerals 1006*a*-1006*l* wherein, despite the current time being 12:09, as indicated by time indication 1008, hour numeral 1006*a* ("1") is displayed with the largest width stroke, hour numeral 1006*l* ("12") is displayed with the second largest width stroke, and so on as one traverses around the hour numerals in a counterclockwise direction up until hour numeral 1006*b* ("2"), which is displayed with the smallest width stroke.

At FIG. 10I, after displaying watch user interface 1020*h*, computer system 1000 displays watch user interface 1020*i*. At watch user interface 1020*i*, some or all of hour numerals 1006*a*-1006*l* are displayed with stroke widths that have shifted one hour numeral over relative to watch user interface 1020*h*. For example, watch user interface 1020*i* includes hour numerals 1006*a*-1006*l* wherein, despite the current time being 12:09, as indicated by time indication 1008, hour numeral 1006*b* ("2") is displayed with the largest width stroke, hour numeral 1006*a* ("1") is displayed with the second largest width stroke, and so on as one traverses around the hour numerals in a counterclockwise direction up until hour numeral 1006*c* ("3"), which is displayed with the smallest width stroke.

At FIG. 10J, after displaying watch user interface 1020*i*, computer system 1000 displays watch user interface 1020*j*. At watch user interface 1020*j*, hour numerals 1006*a*-1006*l* are displayed with stroke widths that have all shifted one hour numeral over relative to watch user interface 1020*i*. For example, watch user interface 1020*j* includes hour numerals 1006*a*-1006*l* wherein, despite the current time being 12:09, as indicated by time indication 1008, hour numeral 1006*c* ("3") is displayed with the largest width stroke, hour numeral 1006*b* ("2") is displayed with the second largest width stroke, and so on as one traverses around the hour numerals in a counterclockwise direction up until hour numeral 1006*d* ("4"), which is displayed with the smallest width stroke.

In some embodiments, the duration of the snaking animation is based at least partially on the magnitude of rotational input 1060*a* (e.g., the number of degrees that rotatable and depressible input mechanism 1004 is rotated). In some embodiments, the snaking animation continues with the pattern described above until each hour numeral (e.g., hour numerals 1006*a*-1006*l*) has been displayed with the largest width stroke.

FIG. 10K illustrates computer system 1000 displaying watch user interface 1020*k* while computer system 1000 is in a lower power state. In some embodiments, in accordance with a determination that computer system 1000 has not received an input for a threshold duration of time, computer system 1000 enters a lower power state. In some embodiments, in accordance with a determination that computer system 1000 received a gesture including at least a threshold portion of display 1002 being covered (e.g., by a user's palm), computer system 1000 enters the lower power state. In some embodiments, in response to receiving an input (e.g., a tap input, a rotational input, a press input, etc.) while computer system 1000 is in the lower power state, computer system exits the lower power state and returns to a higher power state. In some embodiments, entering the low power state includes displaying a watch user interface with a lower brightness. In some embodiments, entering the lower power state includes limiting and/or changing the animations and/or visual effects displayed in a watch user interface. In some embodiments, entering the lower power state includes displaying a watch user interface without displaying elements of a watch user interface that would be displayed in the higher power state (e.g., updating time indicator 1008 to be displayed without a seconds analog clock hand). In some embodiments, entering the lower power state includes foregoing updating elements included in a watch user interface, such as foregoing updating complication 1012*a* while computer system 1000 is in the lower power state, or updating complication 1012*a* less frequently while computer system 1000 is in the lower power state.

At FIG. 10K, computer system 1000 displays watch user interface 1020*k*, which is an updated version of watch user interface 1020*g* wherein computer system 1000 has entered the lower power state. In accordance with entering the lower power state, computer system 1000 displays 1020*k*, which includes displaying hour numerals 1006*a*-1006*l* in updated positions within display 1002. In watch user interface 1020*k*, the distance between hour numerals 1006*a*-1006*l* and the edge of display 1002 is greater than the distance between hour numerals 1006*a*-1006*l* in watch user interface 1020*g*. In some embodiments, updating watch user interface 1020*g* to be replaced with watch user interface 1020*k* includes displaying an animation of hour numerals 1006*a*-1006*l* contracting toward the center of display 1002. In some embodiments, transitioning from the higher power state to the lower power state includes lowering the brightness of display 1002.

At watch user interface 1020*k*, hour numerals 1006*a*-1006*l* are displayed as outlines instead of as solid lines. In some embodiments, displaying hour numerals as outlines instead of solid lines allows a background color of a watch user interface to show through portions of the hour numerals. In some examples, transitioning from displaying watch user interface 1020*g* to displaying watch user interface 1020*k* includes displaying an animation of hour numerals 1006*a*-1006*l* being updated to be displayed as outlines. In some embodiments, computer system 1000 updates a watch user interface including hour numerals 1006*a*-1006*l* based on computer system 1000 entering a lower power state without displaying hour numerals 1006*a*-1006*l* as outlines.

FIG. 10L illustrates an embodiment wherein, when computer system is in a lower power state, computer system 1000 displays watch user interface 1020*l*, which includes displaying hour numerals 1006*a*-1006*l* with the same width stroke. In some embodiments, computer system 1000 transitions from displaying watch user interface 1020*g* to displaying watch user interface 1020*l* in accordance with computer system 1000 entering a lower power state. In some embodiments, transitioning from displaying watch user interface 1020*g* to displaying watch user interface 1020*l* includes displaying an animation of hour numerals 1006*a*-1006*l* being updated to be displayed with the same width stroke. At watch user interface 1020*l*, the width stroke that hour numerals 1006*a*-1006*l* are displayed with is the same as the smallest width stroke that one of hour numerals 1006*a*-1006*l* is displayed with when computer system 1000 is in a higher power state. In some embodiments, transitioning from watch user interface 1020*g* to displaying 1020*l* includes updating hour numerals 1006*a*-1006*l* to be displayed with the same width stroke that hour numeral 1006*a* ("1") is displayed with in watch user interface 1020*g*.

At watch user interface 1020*l*, hour numerals 1006*a*-1006*l* are displayed as outlines instead of with solid lines. In some examples, transitioning from displaying watch user interface 1020*g* to displaying watch user interface 1020*l* includes displaying an animation of hour numerals 1006*a*-1006*l* being updated to be displayed as outlines. In some embodiments, computer system 1000 displays watch user interface 1020*l* wherein hour numerals 1006*a*-1006*l* are not displayed as outlines.

FIG. 10M illustrates computer system 1000 receiving input 1050*b* (e.g., a long press input) on watch user interface 1020*m*. In FIG. 10M, computer system 1000 is displaying watch user interface 1020*m*, which significantly matches watch user interface 1020*a*.

At FIG. 10N, in response to receiving input 1050*b*, computer system 1000 displays selection user interface 1014*a*. Selection user interface 1014*a* is a user interface for selecting a watch user interface to be displayed by computer system 1000. Selection user interface 1014*a* includes representation 1016*b*1, which is a representation of watch user interface 1020*m*, and includes various features of watch user interface 1020*m*. In some embodiments, representation 1016*b*1 is a static representation of watch user interface 1020*m*, and includes an indication of a time other than the current time, and/or a complication containing information other than real-time, updated data.

Selection user interface 1014*a* further includes partial views of representation 1016*a* and representation 1016*c*, which correspond to watch user interfaces other than watch user interface 1020*m*. Selection user interface 1014*a* further includes share user-interactive graphical user interface object 1018 which, when selected, causes computer system 1000 to display user interfaces related to transmitting and/or sharing information related to watch user interface 1020*m* with another device (e.g., another computer system). Selection user interface 1014*a* further includes edit user-interactive graphical user interface object 1022 which, when selected, causes computer system 1000 to display an editing user interface for editing aspects of watch user interface 1020*m*. Selection user interface 1014*a* further includes face indicator 1024, which includes a visual and/or textual indication of the name of the watch user interface currently centered in selection user interface 1014*a*. At FIG. 10N, face indicator 1024 indicates that currently indicated watch user interface 1020*m*, which is represented in selection user interface 1014*a* by representation 1016*b*1, is titled "Faces." At FIG. 10N, computer system 1000 detects input 1050*c* (e.g., a tap input) on edit user-interactive graphical user interface object 1022.

At FIG. 10O, in response to detecting input 1050*c*, computer system 1000 displays editing user interface 1026*a*. Editing user interface 1026*a* includes aspect indicator 1028*a*, which includes a visual and/or textual representation of the aspect of watch user interface 1020*m* currently selected for editing. At FIG. 10O, aspect indicator 1028*a* indicates that the aspect of watch user interface 1020*m* that is currently selected for editing is "Style."

Editing user interface 1026*a* further includes selection indicator 1034*a*, which includes a visual and/or textual representation of the currently selected option for the editable aspect of watch user interface 1020*m*. At FIG. 10O, selection indicator 1034*a* indicates that the currently selected "Style" option for watch user interface 1020*m* is "Rounded."

Editing user interface 1026*a* further includes positional indicator 1032*a*. Positional indicator 1032*a* includes a graphical indication of the number of selectable options for the editable aspect of watch user interface 1020*m* that is currently being edited, as well as the position of the currently selected option among the list of selectable options. For example, positional indicator 1032*a* indicates that the currently selected option for the "Style" aspect of watch user interface 1020*m*, "Rounded," is at the top of a list of at least two possible options for the "Style" aspect of watch user interface 1020*m*.

Editing user interface 1026*a* further includes representation 1016*c*1, which indicates that the watch user interface currently being edited is the watch user interface corresponding to representation 1016*c*1, which is watch user interface 1020*m*. Representation 1016*c*1 corresponds to watch user interface 1020*m*, and includes features of watch user interface 1020*m*, including a representation of complication 1012*a*. At FIG. 10O, computer system 1000 detects an input 1050*d* (e.g., a swipe input) on editing user interface 1026*a*.

At FIG. 10P, in response to receiving swipe input 1050*d*, computer system 1000 displays editing user interface 1026*b*. Editing user interface 1026*b* includes aspect indicator 1028*b*, which includes a visual and/or textual representation of the aspect of watch user interface 1020*m* currently selected for editing. At FIG. 10P, aspect indicator 1028*b* indicates that the aspect of watch user interface 1020*m* that is currently selected for editing is "Dial Color."

Editing user interface 1026*b* further includes selection indicator 1034*b*, which includes a visual and/or textual representation of the currently selected option for the editable aspect of watch user interface 1020*m*. At FIG. 10P, selection indicator 1034*b* indicates that the currently selected "Dial Color" option for watch user interface 1020*m* is "On."

Editing user interface 1026*b* further includes positional indicator 1032*b*. Positional indicator 1032*b* includes a graphical indication of the number of selectable options for the editable aspect of watch user interface 1020*m* that is currently being edited, as well as the position of the currently selected option among the list of selectable options. For example, positional indicator 1032*b* indicates that the currently selected option for the "Dial Color" aspect of watch user interface 1020*m*, "On," is at the bottom of a list of at least two possible options for the "Dial Color" aspect of watch user interface 1020*m*.

Editing user interface 1026*b* further includes representation 1016*c*2, which indicates that the watch user interface currently being edited is the watch user interface corresponding to representation 1016*c*2, which is watch user interface 1020*m*. Representation 1016*c*2 corresponds to watch user interface 1020*m*, and includes features of watch user interface 1020*m*, including a representation of complication 1012*a*. At FIG. 10P, computer system 1000 detects an input 1050*e* (e.g., a swipe input) on editing user interface 1026*b*.

At FIG. 10Q, in response to receiving swipe input 1050*e*, computer system 1000 displays editing user interface 1026*c*1. Editing user interface 1026*c*1 includes aspect indicator 1028*c*, which includes a visual and/or textual representation of the aspect of watch user interface 1020*m* currently selected for editing. At FIG. 10Q, aspect indicator 1028*c* indicates that the aspect of watch user interface 1020*m* that is currently selected for editing is "Color."

Editing user interface 1026*c* further includes selection indicator 1034*c*1, which includes a visual and/or textual representation of the currently selected option for the editable aspect of watch user interface 1020*m*. At FIG. 10Q selection indicator 1034*c*1 indicates that the currently selected "Color" option for watch user interface 1020*m* is "Black."

Editing user interface 1026*c* further includes color options indicator 1036, which includes various selectable color options. Color options indicator 1036 includes selected color

1036*a*, which includes a visual indication around the currently selected color to provide a visual and/or graphical indication of the selected color as well as its position within color options indicator 1036.

Editing user interface 1026*c*1 further includes representation 1016*c*3, which indicates that the watch user interface currently being edited is the watch user interface corresponding to representation 1016*c*3, which is watch user interface 1020*m*. Representation 1016*c*3 corresponds to watch user interface 1020*m*, and includes features of watch user interface 1020*m*, including a representation of complication 1012*a*. At FIG. 10Q, computer system 1000 detects rotational input 1060*c* via rotatable and depressible input mechanism 1004.

At FIG. 10R, in response to receiving rotational input 1060*c*, computer system 1000 displays editing user interface 1026*c*2. Editing user interface 1026*c*2 includes aspect indicator 1028*c*, which includes a visual and/or textual representation of the aspect of watch user interface 1020*m* currently selected for editing. At FIG. 10R, aspect indicator 1028*c* indicates that the aspect of watch user interface 1020*m* that is currently selected for editing is "Color."

Editing user interface 1026*c*2 further includes selection indicator 1034*c*2, which includes a visual and/or textual representation of the currently selected option for the editable aspect of watch user interface 1020*m*. At FIG. 10R selection indicator 1034*c*2 indicates that the currently selected "Color" option for watch user interface 1020*m* is "Green."

Editing user interface 1026*c*2 further includes color options indicator 1036, which includes various selectable color options. Color options indicator 1036 includes selected color 1036*b*, which includes a visual indication around the currently selected color to provide a visual and/or graphical indication of the selected color as well as its position within color options indicator 1036. In some embodiments, transitioning from displaying editing user interface 1026*c*1 to displaying editing user interface 1026*c*2 includes displaying an animation showing the colors included in color options indicator 1036 moving such that the newly selected color (e.g., "Green" instead of "Black") is displayed within visual indication included in selected color 1036*b*.

Editing user interface 1026*c*2 further includes representation 1016*c*4, which indicates that the watch user interface currently being edited is the watch user interface corresponding to representation 1016*c*4, which is watch user interface 1020*m*. In editing user interface 1026*c*2, representation 1016*c*4 has been updated so that the background of representation 1016*c*4, corresponding to the background of watch user interface 1020*m*, has been updated to be displayed in green. Thus, FIG. 10R illustrates that the color selected for the background of watch user interface 1020*m* has been edited. Representation 1016*c*4 corresponds to watch user interface 1020*m*, and includes features of watch user interface 1020*m*, including a representation of complication 1012*a*. At FIG. 10R, computer system 1000 detects input 1050*f* (e.g., a swipe input) on editing user interface 1026*c*2.

At FIG. 10S, in response to receiving input 1050*f*, computer system 1000 displays editing user interface 1026*d*1. Editing user interface 1026*d*1 includes aspect indicator 1028*d*, which includes a visual and/or textual representation of the aspect of watch user interface 1020*m* currently selected for editing. At FIG. 10S, aspect indicator 1028*d* indicates that the aspect of watch user interface 1020*m* that is currently selected for editing is "Complications."

Editing user interface 1026*d*1 further includes representation 1016*c*5, which indicates that the watch user interface currently being edited is the watch user interface corresponding to representation 1016*c*5, which is watch user interface 1020*m*. At FIG. 10S, computer system 1000 detects an input 1050*g* (e.g., a tap input) on a portion of representation 1016*c*5 that corresponds to complication 1012*a* of watch user interface 1020*m*.

At FIG. 10T, in response to detecting tap input 1060*g*, computer system 1000 displays editing user interface 1026*d*2, which includes multiple selectable complication options to be displayed with watch user interface 1020*m*. In some embodiments, the selectable complications are sorted into categories based on associated features/and or applications related to the selectable complication options. Editing user interface 1026*d*2 includes category 1038*a*, which includes a visual and/or textual indication that the complication beneath category 1038*a* is related to "Weather." Editing user interface 1026*d*2 further includes category 1038*b*, which includes a visual and/or textual indication that the complication beneath category 1038*b* is related to "Noise." In some embodiments, a category includes multiple complications, in which case the multiple complications related to a given category are displayed below the text and/or a visual indication related to the category. In some embodiments, editing user interface 1026*d*2 is initially displayed with the selected complication from the previous user interface (e.g., editing user interface 1026*d*1) centered and/or with selection focus. In some embodiments, computer system 1000 navigates from one complication option to another complication option (e.g., moves selection focus) by scrolling via a swipe input on editing user interface 1026*d*2 and/or via a rotational input via rotatable and depressible input mechanism 1004. Editing user interface 1026*d*2 further includes cancel user-interactive graphical user interface object 1042 which, when selected, causes computer system 1000 to stop displaying editing user interface 1026*d*2 and display editing user interface 1026*d*1. Editing user interface 1026*d*2 further includes complication 1012*a* and complication 1012*b*, wherein selecting a complication corresponds to selecting the corresponding complication for display within watch user interface 1020*m*. At FIG. 10T, computer system 1000 receives input 1050*h* (e.g., a tap input) on complication 1012*b*.

At FIG. 10U, in response to receiving input 1050*h*, computer system 1000 displays editing user interface 1026*d*3, which includes representation 1016*c*6. Representation 1016*c*6 is a modified version of representation 1016*c*5 that includes complication 1012*b* instead of complication 1012*a*. Thus, editing user interface 1026*d*3 indicates that watch user interface 1020*m* has been edited in response to input 1050*h* and that, in response to receiving input 1050*h*, computer system 1200 edited representation 1016*c*6 to include complication 1012*b*. At FIG. 10U, computer system 1000 receives press input 1070 on rotatable and depressible input mechanism 1004.

At FIG. 10V, in response to receiving press input 1070, computer system 1000 displays selection used interface 1014*b*. Selection user interface 1014*b* significantly matches selection user interface 1014*a*, but selection user interface includes representation 1016*b*2, which is an updated version of 1016*b*1 that includes the updates to watch user interface 1020*m* that were illustrated in FIGS. 100-10U (e.g., the updated background color and the new complication, 1012*b*). At FIG. 10V, computer system 1000 detects input 1050*i* (e.g., a tap input) on representation 1016*b*2.

At FIG. 10W, in response to receiving input 1050*i*, computer system 1000 displays watch user interface 1080. Watch user interface 1080 is an edited version of watch user interface 1020*m*, wherein complication 1012*a*, which corresponds to an air quality index complication, has been replaced with complication 1012*b*, which corresponds to a noise complication. Watch user interface 1080 is also displayed with a different background color than watch user interface 1020*m* (e.g., green instead of black, discussed above with reference to FIGS. 10Q-10R). In some embodiments, other aspects of the watch user interfaces described above can be edited in a similar manner to the process described above.

FIG. 11 is a flow diagram illustrating a method for managing clock faces based on state information of a computer system (e.g., 1000) in accordance with some embodiments. Method (1100) is performed at a computer system (e.g., a smartwatch, a wearable electronic device, a smartphone, a desktop computer, a laptop, a tablet) that is in communication with a display generation component (e.g., 1002) (e.g., a display controller, a touch-sensitive display system). In some embodiments, the computer system is in communication with one or more input devices (e.g., a rotatable input mechanism, a touch-sensitive surface). Some operations in method 1100 are, optionally, combined, the orders of some operations are, optionally, changed, and some operations are, optionally, omitted.

As described below, method 1100 provides an intuitive way for managing clock faces based on state information of a computer system (e.g., 1000). The method reduces the cognitive burden on a user for managing clock faces based on state information of a computer system, thereby creating a more efficient human-machine interface. For battery-operated computing devices, enabling a user to manage clock faces based on state information of a computer system faster and more efficiently conserves power and increases the time between battery charges.

While the computer system is in a first state, the computer system displays (1102), via the display generation component, a first user interface (e.g., 1020*a*) (e.g., a clock face, a watch user interface, a wake screen, a watch face, a lock screen) that includes an analog dial (e.g., a 12-hour dial, a 24-hour dial). Displaying the analog dial while the computer system is in the first state includes concurrently displaying a time indicator (e.g., 1008 as illustrated in FIG. 10A) (1104) (e.g., an hour hand or an hour hand and a minute hand) that indicates a current time (e.g., a current time of day; the time in the current time zone) on the analog dial and hour indicators (e.g., 1006*a*-1006*l* as illustrated in FIG. 10A) (1106) (e.g., a plurality of numerals corresponding to hours of the day) displayed around the analog dial, where the hour indicators include an indicator of a first hour displayed at a first size (e.g., 1006*j* as illustrated in FIG. 10A) (e.g., a width stroke, and/or font size that correspond to the first size) and an indicator of a second hour displayed at a second size (e.g., 1006*i* as illustrated in FIG. 10A) (e.g., a width stroke, and/or font size that correspond to the second size) different from the first size. In some embodiments, the time indicator is continuously or periodically updated with the passage of time to reflect the current time of day. In some embodiments, the time indicator is coordinated with and/or intended to reflect the coordinated universal time with an offset based on a currently selected time zone. In some embodiments, displaying the hour numerals along an outer edge of the user interface includes displaying the hour indicators along the edge of a touch-sensitive display.

After displaying the analog dial with the first hour indicator (e.g., 1006*j* as illustrated in FIG. 10A) displayed at the first size and the second hour indicator displayed at the second size (e.g., 1006*i* as illustrated in FIG. 10A), the computer system detects (1108) (e.g., determining) a request to display the analog dial while the computer system is in a second state that is different from the first state (e.g., in response to detecting a change in state of the computer system from the first state to the second state) (e.g., a change in the current time (e.g., a change in the hour of the current time, a change in the minute of the current time, a change in the second of the current time); a change in a state of the computer system due to a detected user input and the computer system displaying/providing a response to the user input and/or performing an operation due to the user input).

In response to detecting a change in state (e.g., from the first state to the second state) of the computer system (e.g., 1000), the computer system displays (1110) the first user interface updated (e.g., as illustrated in FIG. 10B) to reflect the second state, including displaying the analog dial. Displaying the analog dial while the computer system is in the second state includes concurrently displaying a time indicator (e.g., 1008 as illustrated in FIG. 10B) (1112) (e.g., an hour hand or an hour hand and a minute hand) that indicates the current time on the analog dial and hour indicators (e.g., 1006*a*-1006*l* as illustrated in FIG. 10B) (1114) (e.g., a plurality of numerals corresponding to hours of the day) displayed around the analog dial, where the hour indicators include the indicator of the first hour (e.g., 1006*j* as illustrated in FIG. 10B) displayed at a third size (e.g., a width stroke, and/or font size that correspond to the third size) that is different from the first size and the indicator of the second hour (e.g., 1006*i* as illustrated in FIG. 10B) displayed at a fourth size (e.g., a width stroke, and/or font size that correspond to the fourth size) different from the second size. In some embodiments, the third size is different from the second size and the fourth size. In some embodiments, the third size is the same as the second size or the fourth size. In some embodiments, the fourth size is the same as the first size. In some embodiments, the fourth size is different from the first size and the third size. Displaying a first user interface including an indicator of a first hour displayed at a first size and an indicator of a second hour displayed at a second size while the computer system is in a first state (e.g., as illustrated in FIG. 10A), and displaying the first user interface including an indicator of the first hour displayed at a third size and the indicator of the second hour displayed at a fourth size (e.g., as illustrated in FIG. 10B) while the computer system is in a second state provides the user with visual feedback about the current time based on the sizes at which the hour indicators are displayed and improves the visibility of the current hour for a small user interface (e.g., where the current hour is displayed at a larger size than an different hour). Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, while displaying the first user interface, the computer system (e.g., 1000) updates the indicator of the first hour (e.g., 1006*j* as illustrated in FIG. 10A) from being displayed at the first size (e.g., the width stroke, and/or font size that correspond to the first size) to being displayed at the third size (e.g., as illustrated in FIG.

10B)(e.g., the width stroke, and/or font size that correspond to the third size). In some embodiments, while displaying the first user interface, the computer system updates the indicator of the second hour (e.g., 1006*i* as illustrated in FIG. 10A) from being displayed at the second size (e.g., the width stroke, and/or font size that correspond to the second size) to being displayed at the fourth size (e.g., as illustrated in FIG. 10B)(e.g., the width stroke, and/or font size that correspond to the fourth size). In some embodiments, transitioning from displaying the indicator of the first hour at the first size to displaying the indicator of the first hour at the third size and transitioning from displaying the indicator of the second hour at the second size to displaying the indicator of the second hour at the fourth size occurs in response to a user input (e.g., a rotational user input) (e.g., as illustrated in FIGS. 10G-10H). In some embodiments, transitioning from displaying the indicator of the first hour at the first size to displaying the indicator of the first hour at the third size and transitioning from displaying the indicator of the second hour at the second size to displaying the indicator of the second hour at the fourth size occurs in accordance with a determination that the computer system is in an active state (e.g., a higher power state) (e.g., as illustrated in FIGS. 10A-10B). Updating the sizes at which the hour indicators are displayed while the hour indicators are displayed provides visual feedback that the time has changed (e.g., from a first hour to a second hour). Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the request to display the analog dial while the device is in the second state includes a user input (e.g., as illustrated in FIGS. 10A-10B) (e.g., a touch input, a tap (e.g., 1050*a*), a wrist raise gesture). Displaying the user input in response to a user input provides visual feedback that the user input was received, and that the computer system is awake and/or active for further user inputs. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the change in state of the computer system (e.g., 1000) includes a change in the current time (e.g., as illustrated in FIGS. 10A-10B)(e.g., a change in the hour of the current time, a change in the minute of the current time, a change in the second of the current time). Conditionally changing the size of the hour indicators displayed on the first user interface based on a change in the current time provides the user with visual feedback that the current time has changed, without requiring the user to provide further inputs. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system detects a second user input (e.g., as illustrated in FIG. 10C) (e.g., 1050*a*) (e.g., a touch input on a touch-sensitive display, a tap, a wrist raise gesture). In some embodiments, in response to detecting the second user input, the computer system updates the indicator of the first hour (e.g., 1006*f* as illustrated in FIG. 10D) to be displayed at a fifth size different from the first size. In some embodiments, tapping on a particular hour indicator temporarily causes the hour indicator to be displayed at an increased size. In some embodiments, displaying the indicator of the first hour at the fifth size includes animating the indicator of the first hour to grow to the fifth size. In some embodiments, the change to the size of the indicator of the first hour is temporary. In some embodiments, displaying the indicator of the first hour at the fifth size corresponds to displaying an animation of the indicator of the first hour growing to the fifth size and then shrinking to the first size (e.g., as illustrated in FIGS. 10C-10F). Updating the indicator of the first hour to be displayed at a fifth size different from the first size in response to detecting a second user input provides visual feedback that the user input was received. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system sequentially animates the hour indicators (e.g., 1006*a*-1006*l* as illustrated in FIGS. 10G-10J) displayed around the dial, wherein animating an hour indicator includes: displaying the hour indicator (e.g., 1006*j*) at an initial size; updating the hour indicator to be displayed at an enlarged size different from the initial size; and after updating the hour indicator to be displayed at the enlarged size different from the initial size, reducing a size of the hour indicator (e.g., updating the hour indicator to be displayed at the initial size). In some embodiments, sequentially animating the hour indicators displayed around the dial includes animating hour indicators around the edge of the dial in numerical order. In some embodiments, sequentially animating the hour indicators displayed around the dial includes displaying overlapping the animations for at least two hour indicators (e.g., the animations are staggered), such that the one hour indicator is growing while another hour indicator is shrinking. In some embodiments, sequentially animating the hour indicators displayed around the dial concludes when each of the hour indicators displayed around the dial has been animated. Sequentially animating the hour indicators displayed around the dial, wherein animating an hour indicator includes displaying the hour indicator at an initial size, updating the hour indicator to be displayed at an enlarged size different from the initial size and, after updating the hour indicator to be displayed at the enlarged size different from the initial size, updating the hour indicator to be displayed at the initial size, provides visual feedback that the hour indicators are responsive, non-static graphical elements that are updates in response to changes in context and/or inputs. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the time indicator (e.g., 1008 as illustrated in FIG. 10A) includes a plurality of clock hands. In some embodiments, the computer system (e.g., 1000) updates a position of the clock hands relative to the analog dial over time (e.g., as illustrated in FIGS. 10A-10B) (e.g., automatically) to indicate the current time (e.g., the current time; the time of the current time zone). Displaying a plurality of clock hands, wherein the position of the clock hands is updated to indicate the current time provides visual feedback about the current time being indicated by the first user interface. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1000) displays the hour indicators at a plurality of different sizes. In some embodiments, the computer system display an hour indicator (e.g., 1006*j* as illustrated in FIG. 10A) that corresponds to the current time at the largest size of the plurality of different sizes. In some embodiments, the size at which the hour indicators are displayed gradually decreases around the analog dial (e.g., clockwise or counterclockwise, in numerical order or in reverse numerical order). In some embodiments, the hour indicator that corresponds to the hour after the current time (e.g., 1006*k* as illustrated in FIG. 10A) is displayed at the smallest size. In some embodiments, the hour indicator that corresponds to the hour before the current time is displayed at the second largest size (e.g., 1006*i* as illustrated in FIG. 10A). Displaying hour indicators at a plurality of different sizes, wherein the hour indicator that corresponds to the current time is displayed at the largest size, provides visual feedback about the relevance of the current hour indicator, which is displayed at the largest size, relative to the other hour indicators based on their relatively smaller sizes. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1000) is in communication with a rotatable input mechanism (e.g., 1004) (e.g., a rotatable input device; a rotatable input device). In some embodiments, the computer system detects, via the rotatable input mechanism, a rotational input (e.g., 1060*a*) (e.g., a rotation of the rotatable and depressible input mechanism about an axis of rotation) (e.g., clockwise rotational input, counter-clockwise rotational input) (in some embodiments, a non-rotational input (e.g., a tap gesture, a swipe gesture, and/or a mouse click)). In some embodiments, in response to detecting the rotational input, the computer system temporarily increases a size at which at least one hour indicator (e.g., 1006*a* as illustrated in FIGS. 10G-10H) is displayed. In some embodiments, increasing a size at which an hour indicator is displayed corresponds to animating the hour indicator to grow to a larger size. In some embodiments, the change to the size of the hour indicator is temporary. In some embodiments, displaying hour indicator at the increased size includes displaying an animation of the hour indicator at the enlarged size and then shrinking it to be displayed at its previous size. In some embodiments, in response to detecting the rotational input, the computer system temporarily decreases a size at which at least one hour indicator is displayed (e.g., 1006*e* as illustrated in FIGS. 10G-10H). In some embodiments, in response to detecting the rotational input, the computer system temporarily decreases a size at which a plurality of hour indicators are displayed. In some embodiments, in response to detecting the rotational input, the computer system temporarily increases a size at which a plurality of hour indicators are displayed. Temporarily increasing a size at which the hour indicators are displayed in response to detecting a rotational input provides visual feedback that the rotational input was received. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, in response to detecting the rotational input (e.g., 1060*a*), the computer system (e.g., 1000) temporarily increases a size at which a plurality of hour indicators (e.g., 1006*a*-1006*l*, as illustrated in FIGS. 10G-10J) are displayed. In some embodiments, temporarily increasing the size at which the plurality of hour indicators are displayed includes sequentially animating the hour indicators displayed around the dial. In some embodiments, animating an hour indicator includes, for a plurality of different hour indicators: displaying the hour indicator (e.g., 1006*a* as illustrated in FIG. 10G) at a respective initial size; updating the hour indicator to be displayed at a respective enlarged size different from the respective initial size (e.g., 1006*a* as illustrated in FIG. 10H); and after updating the hour indicator to be displayed at the respective enlarged size different from the respective initial size, updating the hour indicator to be displayed at the respective initial size (e.g., 1006*a* as illustrated in FIG. 10G). In some embodiments, temporarily increasing the size at which the plurality of hour indicators are displayed includes animating the hour indicators displayed around the analog dial once per hour indicator (e.g., as illustrated in FIGS. 10G-10J) (e.g., clockwise or counterclockwise, in numerical order or in reverse numerical order) (e.g., beginning with the hour indicator that corresponds to the current time). In some embodiments, if the current time is 12:00 P.M., temporarily increasing the size at which the plurality of hour indicators are displayed includes: i) displaying a 1 numeral at an initial size (e.g., 1006*a* as illustrated in FIG. 10G), then displaying the 1 numeral at an enlarged size (e.g., 1006*a* as illustrated in FIG. 10H), then displaying the 1 numeral at the initial size (e.g., 1006*a* as illustrated in FIG. 10G), and ii) displaying a 2 numeral at an initial size (e.g., 1006*b* as illustrated in FIG. 10G), then displaying a 2 numeral at an enlarged size (e.g., 1006*b* as illustrated in FIG. 10I), then displaying the 2 numeral at the initial size (e.g., 1006*b* as illustrated in FIG. 10G), and iii) displaying a 3 numeral at an initial size (e.g., 1006*c* as illustrated in FIG. 10G), then displaying a 3 numeral at an enlarged size (e.g., 1006*c* as illustrated in FIG. 10J), then displaying the 3 numeral at the initial size (e.g., 1006*c* as illustrated in FIG. 10G), etc., continuing around the dial (e.g., in numerical order) until xii) the 12 numeral is returned to (e.g., displayed at) its initial size (e.g., 1006*l* as illustrated in FIG. 10G). In some embodiments, while a present hour numeral is displayed as shrinking (e.g., from an enlarged size back to an initial size), the next numeral (e.g., the numeral that succeeds the present numeral) is concurrently displayed as growing (e.g., from an initial size to an enlarged size). Sequentially increasing the size at which the hour indicators are displayed by sequentially animating the hour indicators around the dial in response to detecting a rotational input provides visual feedback that the rotational input was received. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, as a part of temporarily increasing the size at which the hour indicators are displayed, the computer system (e.g., 1000) sequentially increases the size at which the hour indicators are displayed, starting with an initial hour indicator (e.g., 1006*a* as illustrated in FIG. 10G) of the hour indicators and sequentially increasing sizes of hour indicators in a respective order around the analog dial. In some embodiments, in accordance with a determination that the rotational input is in a first direction (e.g., clockwise), the respective order is clockwise order around the analog dial (e.g., clockwise). In some embodiments, in accordance with a determination that the rotational input is in a second direction (e.g., counterclockwise) different from the first direction, the respective order is counterclockwise order around the analog dial (e.g., counterclockwise). In some embodiments, the initial hour indicator is an hour indicator that corresponds to the current time (e.g., as indicated by time indicator 1008 in FIG. 10G) (e.g., the current hour). Temporarily increasing the size at which the hour indicators are displayed by traversing around the analog dial in particular direction in accordance with a determination that the rotational input was in a given direction provides visual feedback that the rotational input was received, and that the rotational input was in a particular direction. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, while the computer system is in a higher power state (e.g., an active state, an on state, a normal (e.g., non-low power) mode), the computer system (e.g., 1000) displays the hour indicators (e.g., 1006*a*-1006*l*, as illustrated in FIG. 10A) with different width strokes. In some embodiments, each hour indicator is displayed with a different width stroke. In some embodiments, the hour indicator that corresponds to the current hour is displayed the thickest width stroke, and the hour indicator that corresponds to the upcoming hour (e.g., the next hour) is displayed with the thinnest width stroke. Displaying the hour indicators with different width strokes provides visual feedback about the relative significance of the different hour indicators. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the time indicator (e.g., 1008 as illustrated in FIG. 10A) includes a plurality of clock hands. In some embodiments, the clock hands are displayed with a first width stroke. In some embodiments, the hour indicator that corresponds to the current time is displayed with the first width stroke. Displaying the clock hands with the same width stroke as the hour indicator that corresponds to the current time provides visual feedback that the current time indicated by the plurality of clock hands corresponds to the hour indicator that corresponds to the current time. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1000) is transitioned to a low power state (e.g., as illustrated in FIGS. 10K-10L) (e.g., an off state, a sleeping state, a low power mode, a battery saver mode, an eco-mode). In some embodiments, while the computer system is in the low power state, the computer system displays the hour indicators (e.g., 1006*a*-1006*l* as illustrated in FIG. 10K) with a reduced width stroke. In some embodiments, the reduced width stroke is the same width as the thinnest width stroke within the range of width strokes. Displaying the hour indicators with a reduced width stroke while the computer system is in a low power state provides visual feedback that the computer system is in the low power state. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1000) transitions to a low power state (e.g., an off state, a sleeping state, a low power mode, a battery saver mode, an eco-mode). In some embodiments, while the computer system is in the low power state (e.g., as illustrated in FIGS. 10K-10L), the computer system displays all of the hour indicators with the same width stroke. In some embodiments, while the computer system is in the low power state, all of the hour indicators (e.g., 1006*a*-1006*l* as illustrated in FIG. 10L) are displayed with the width stroke that the upcoming hour (e.g., the next hour) is displayed with while the computer system is in a higher power state (e.g., the thinnest width stroke). Displaying the hour indicators with the same width stroke while the computer system is in the low power state provides visual feedback that the computer system is in the low power state, enabling a user to quickly and efficiently distinguish at a glance whether the computer system is in the low power state or a higher power state. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the time indicator (e.g., 1008 as illustrated in FIG. 10A) includes a plurality of clock hands. In some embodiments, while the computer system (e.g., 1000) is in a higher power state (e.g., an active state, an on state, a normal (e.g., non-low power) mode), the computer system displays the clock hands with a second width stroke (e.g., 1008 as illustrated in FIG. 8A). In some embodiments, the computer system transitions to a low power state (e.g., an off state, a sleeping state, a low power mode, a battery saver mode, an eco-mode). In some embodiments, while the computer system is in the low power state, the computer system displays the clock hands with a third width stroke (e.g., 1008 as illustrated in FIG. 10K). In some embodiments, the clock hands are displayed as outlines (e.g., 1008 as illustrated in FIG. 10L). In some embodiments, the third width stroke is thinner than the second width stroke. Displaying the clock hands as outlines while the computer system is in the low power state provides visual feedback that the computer system is in the low power state, enabling a user to quickly and efficiently distinguish at a glance whether the computer system is in the low power state or a higher power state. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, as a part of displaying the hour indicators around the analog dial the computer system displays the hour indicators as outlines with the third width stroke (e.g., 1006*a*-1006*l* as illustrated in FIG. 10L). In some embodiments, the outlines that correspond to the clock hands have the same thickness as the outlines that correspond to the hour indicators. Displaying the clock hands and the hour indicators as outlines while the computer system is in the low power state enabling a user to quickly and efficiently distinguish at a glance whether the computer system is in the low power state or a higher power state. Further, displaying the hour indicators and the clock hands as outlines provides visual feedback that the clock hands and the hour indicators, which are both displayed as outlines, collectively indicate the time. Providing improved visual feedback to the user enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1000) is in communication with one or more input devices (e.g., a display controller, a touch-sensitive display system). In some embodiments, the user interface includes at least a first complication (e.g., 1012*a* as illustrated in FIG. 10A). In some embodiments, a complication refers to any clock face feature other than those used to indicate the hours and minutes of a time (e.g., clock hands or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, the computer system displays the first complication and the hour indicators in a first color. In some embodiments, the computer system displays, via the display generation component, an editing user interface (e.g., 1026*b* as illustrated in FIG. 10O) for editing the user interface. In some embodiments, while displaying the editing user interface, the computer system receives, via the one or more input devices, a first sequence of one or more user inputs (e.g., touch inputs, rotational inputs, press inputs). In some embodiments, in response to receiving the first sequence of one or more user inputs, the computer system changes a color for the user interface. In some embodiments, after changing the color for the user interface, the computer system displays, via the display generation component, the first complication and the hour indicators in a second color different from the first color. In some embodiments, the editing user interface includes options for editing the first complication. In some embodiments, the editing user interface induces options for replacing the first complication with a second complication different from the first complication. In some embodiments, replacing the first complication (e.g., 1012*a* as illustrated in FIG. 10A) with the second complication (e.g., 1012 as illustrated in FIG. 10W) includes displaying the second complication at the location at which the first complication was previously displayed. In some embodiments, the editing user interface includes options for displaying the hour indicators in different styles. In some embodiments, the editing user interface includes options for displaying the hour indicators with different font features (e.g., rounded end caps, flat end caps). Editing the color in which a complication and the hour numerals are displayed in response to receiving a first sequence of one or more user inputs while displaying an editing user interface reduces the number of inputs required to edit the color in which the complication and the hour numerals are displayed. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1000) displays, via the display generation component (e.g., 1002), an editing user interface (e.g., 1014*a*) for editing the user interface. In some embodiments, while displaying the editing user interface (e.g., 1026*c*1 as illustrated in FIG. 10Q), the computer system receives, via the one or more input devices, a second sequence of one or more user inputs (e.g., 1060*c* as illustrated in FIG. 10Q) (e.g., touch inputs, rotational inputs, press inputs). In some embodiments, in response to receiving the second sequence of one or more inputs and in accordance with a determination that the second sequence of one or more user inputs corresponds to a request to display a background with a color fill, the computer system displays, via the display generation component, the user interface (e.g., 1026*c*2 as illustrated in FIG. 10R) with a background portion of the user interface filled with a color. In some embodiments, in response to receiving the second sequence of one or more inputs and in accordance with a determination that the second sequence of one or more user inputs corresponds to a request to display the background without a color fill, the computer system displays, via the display generation component, the user interface without the background portion of the user interface filled with the color. In some embodiments, displaying the user interface without the background portion of the user interface filled with the color includes displaying the background as a default background color (e.g., black). Editing the color fill selection in accordance with a determination about whether a second sequence of one or more user inputs corresponded to a request to display the background with a color fill reduces the number of inputs needed to edit the color fill selection. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in accordance with a determination that the second sequence of one or more user inputs corresponds to a request to display the background with a color fill, the computer system (e.g., 1000) displays, via the display generation component (e.g., 1002), the user interface (e.g., 1080 as illustrated in FIG. 10W) with the hour indicators (e.g., 1006*a*-1006*l* as illustrated in FIG. 10W) displayed at a first distance from an outer edge of a display region of the display generation component. In some embodiments, in accordance with a determination that the second sequence of one or more user inputs corresponds to a request to display the background without a color fill (e.g., 1020 as illustrated in FIG. 10A), the computer system displays, via the display generation component, the user interface with the hour indicators (e.g., 1006*a*-1006*l* as illustrated in FIG. 10A) displayed at a second distance from an outer edge of a display region of the display generation component. In some embodiments, the second distance is different from the first distance. In some embodiments, the first distance is greater than the second distance. Conditionally displaying, based on whether a sequence of one or more user inputs corresponds to a request to display the background with a color fill, a user interface a different distance from an edge of the display provides the user with an improved visual display experience by allowing the color fill color to be displayed at an edge of the display, whereas the hour numerals are displayed in the same location (at the edge of the display) when color fill is not selected, without requiring the user to provide further inputs corresponding to what distance the user interface should be displayed from the edge of the display. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1100 (e.g., FIG. 11) are also applicable in an analogous manner to the methods described herein. For example, method 900 optionally includes one or more of the characteristics of the various methods described herein with reference to method 700, method 900, and method 1300. For example, method 1100 optionally includes one or more of the characteristics of the various methods described above with reference to method 700. For example, a device can use as a watch user interface either a user interface including hour numerals that are displayed with different width strokes with reference to FIGS. 10A-10W or a watch user interface as described with reference to FIGS. 6A-6U that is based on a media item that includes depth data. As another example, a watch user interface as described with reference to FIGS. 10A-10W can include a plurality of city names that are oriented based on the current location of the computer system, as described above with reference to FIGS. 8A-8M. For another example, method 1100 optionally includes one or more of the characteristics of the various methods described below with reference to method 1300. For example, the watch user interfaces of FIGS. 10A-10W can be created or edited via the process for updating and selecting watch user interfaces as described with reference to FIGS. 12A-12W. For another example, method 1100 optionally includes one or more of the characteristics of the various methods described below with reference to method 1500. For example, the watch user interfaces described with reference to FIGS. 10A-10W could be configured and/or edited via computer system 1400 before being added to computer system 1000. For brevity, these details are not repeated below.

FIGS. 12A-12W illustrate exemplary user interfaces for selecting and displaying user interfaces. The user interfaces in these figures are used to illustrate the processes described below, including the process in FIG. 13.

FIG. 12A illustrates computer system 1200 displaying, via display 1202, watch user interface 1206. Computer system 1200 includes rotatable and depressible input mechanism 1204. In some embodiments, computer system 1200 optionally includes one or more features of device 100, device 300, or device 500. In some embodiments, computer system 1200 is a tablet, phone, laptop, desktop, camera, etc. In some embodiments, the inputs described below can optionally be substituted for alternate inputs, such as a press input and/or a rotational input received via rotatable and depressible input mechanism 1204.

In some embodiments, computer system 1200 has access to a plurality of watch user interfaces that can be selected and/or displayed by computer system 1200 via display 1202. In FIG. 12A, computer system 1200 displays watch user interface 1206. Watch user interface 1206 includes graphical element 1206*a*, which indicates information about activity levels, and time indication 1208, which includes a set of clock hands that indicate a current time (e.g., a current hour and minute).

At FIG. 12A, computer system 1200 detects input 1250*a* (e.g., a long press) on watch user interface 1206. At FIG. 12B, in response to detecting input 1250*a*, computer system 1200 displays selection user interface 1210*a*. Selection user interface 1210*a* is a user interface for selecting a watch user interface to be displayed by computer system 1200. Selection user interface 1210*a* includes representation 1214*a*, which is a representation of watch user interface 1206 and includes various features of watch user interface 1206. In some embodiments, representation 1214*a* is a static representation of watch user interface 1206, and includes an indication of a time other than the current time, and/or complications containing information other than real-time, updated data.

Selection user interface 1210*a* further includes a partial view of representation 1214*a*, which corresponds to a watch user interface other than watch user interface 1206, and a partial view of representation 1214*c*, which corresponds to a watch user interface for generating and/or obtaining new watch user interfaces for display via computer system 1200.

Selection user interface 1210*a* further includes selection focus indicator 1212. Selection focus indicator includes a graphical indicator of an element displayed within a current user interface that is currently focused for selection. In some embodiments, a press gesture received via rotatable and depressible input mechanism 1204 results in the selection of the element of a currently displayed user interface that has selection focus. In some embodiments, selection focus indicator 1212 provides a visual indication of which element of the currently displayed user interface has selection focus to provide improved visual feedback about which element of a currently displayed user interface will be selected in response to a press input received via rotatable and depressible input mechanism 1204 at a given point in time.

Selection user interface 1210*a* further includes share user-interactive graphical user interface object 1216 which, when selected, causes computer system 1200 to display user interfaces related to transmitting and/or sharing information related to watch user interface 1206 with another device (e.g., another computer system). Selection user interface 1210*a* further includes edit user-interactive graphical user interface object 1218 which, when selected, causes computer system 1200 to display an editing user interface for editing aspects of watch user interface 1206. Selection user interface 1210*a* further includes face indicator 1220*a*, which includes a visual and/or textual indication of the name of the watch user interface currently centered in selection user interface 1210*a*. At FIG. 12B, face indicator 1220*a* indicates that currently indicated watch user interface 1206, which is represented in selection user interface 1210*a* by representation 1214*b*, is titled "Activity Analog."

At FIG. 12B, computer system 1200 detects swipe input 1250*b*1 on watch user interface 1210*a* in a first direction, and swipe input 1250*b*2 on watch user interface 1210*a* in a second direction different from the first direction. At FIG. 12B, computer system 1200 further detects rotational input 1260*a*1 via rotatable input mechanism 1204 in a first direction (e.g., clockwise around an axis of rotation) and, rotational input 1260*a*2 via rotatable input mechanism 1204 in a second direction different from the first direction (e.g., counterclockwise around the axis of rotation).

At FIG. 12C, in response to receiving rotational input 1260*a*2 or in response to receiving swipe input 1250*b*2, computer system 1200 displays selection user interface 1210*b*. Selection user interface 1210*b* includes representation 1214*a*, which is a representation of watch user interface 1226 and includes various features of watch user interface 1226. In some embodiments, representation 1214*a* is a static representation of watch user interface 1226, and includes an indication of a time other than the current time, and/or complications containing information other than real-time data. For example, representation 1214*a* includes complication 1224*a* and complication 1224*b* but, in some embodiments, the data displayed by complication 1224*a* and complication 1224 in representation 1210 is not current and/or accurate. Selection user interface 1210*b* further includes a partial view of representation 1214*d*, which corresponds to a watch user interface other than watch user interface 1226, and a partial view of representation 1214*b*, which corresponds to watch user interface 1206.

Selection user interface 1210*b* further includes share user-interactive graphical user interface object 1216 which, when selected, causes computer system 1200 to display user interfaces related to transmitting and/or sharing information related to watch user interface 1226 with another device (e.g., another computer system). Selection user interface 1210*b* further includes edit user-interactive graphical user interface object 1218 which, when selected, causes computer system 1200 to display an editing user interface for editing aspects of watch user interface 1226. Selection user interface 1210*b* further includes face indicator 1220*b*, which includes a visual and/or textual indication of the name of the watch user interface currently centered in selection user interface 1210*b*. At FIG. 12C, face indicator 1220*b* indicates that currently indicated watch user interface 1226, which is represented in selection user interface 1210*b* by representation 1214*a*, is titled "Infograph Modular."

At FIG. 12C, computer system 1200 detects tap input 1250*c* on representation 1214*a*. At FIG. 12C, computer system 1200 further detects press input 1270*a* on rotatable and depressible input mechanism 1204.

At FIG. 12D, in response to receiving tap input 1250*c* or in response to receiving press input 1270*a*, computer system 1200 displays watch user interface 1226. Watch user interface 1226 includes current time 1222, which indicates the current time (e.g., a current hour and/or minute). Watch user interface 1226 further includes a number of complications, including complication 1224*a* and complication 1224*b*. In some embodiments, complication 1224*a* and complication 1224*b* include information from applications available on (e.g., installed on) computer system 1200. In some embodiments, complication 1224*a* and complication 1224*b* are updated in accordance with the passage of time to display updated information. In some embodiments, selecting complication 1224*a* (e.g., via a tap) causes computer system 1200 to launch an application corresponding to complication 1224*a*. In some embodiments, selecting complication 1224*b* (e.g., via a tap) causes computer system 1200 to launch an application corresponding to complication 1224*b*.

At FIG. 12E, in response to receiving rotational input 1260*a*1 or in response to receiving swipe input 1250*b*1, computer system 1200 displays selection user interface 1210*c*. Selection user interface 1210*c* is a watch user interface for generating and/or obtaining new watch user interfaces for display via computer system 1200. Selection user interface 1210*c* includes face indicator 1220*c*, which includes a visual and/or textual indication that selection user interface 1210*c* is titled "Add Face." Selection user interface 1210*c* further includes add user-interactive graphical user interface object 1228 which, when selected, causes computer system 1200 to display a user interface for generating and/or obtaining new watch user interface(s) for display via computer system 1200. Add user-interactive graphical user interface object 1228 includes a plus ("+") sign that corresponds to adding a watch user interface onto computer system 1200.

At FIG. 12E, computer system 1200 detects tap input 1250*d* on add user-interactive graphical user interface object 1228. At FIG. 12E, computer system 1200 further detects press input 1270*b* on rotatable and depressible input mechanism 1204.

At FIG. 12F, in response to receiving tap input 1250*d* or in response to receiving press input 1270*b*, computer system 1200 displays generation user interface 1232*a*. Generation user interface 1232*a* includes options for adding various watch user interfaces for display via computer system 1200. Available watch user interfaces are sorted into platters, which are displayed in generation user interface 1232*a*. Generation user interface 1232*a* includes platter 1230*a*1, which includes name 1234*a*1 indicating that platter 1230*a*1 is titled "New Faces," and image 1236*a*1, which includes graphical representations of watch user interfaces corresponding to platter 1230*a*1.

Generation user interface 1232*a* further includes platter 1230*a*2, which includes name 1234*a*2 indicating that platter 1230*a*2 is titled "California," and image 1236*a*2, which includes a graphical representation of a watch user interface corresponding to platter 1230*a*2. Platter 1230*a*2 further includes description 1238*a*1, which includes a textual description of a watch user interface corresponding to platter 1230*a*2, and add user-interactive graphical user interface object 1240*a*1 which, when selected, causes computer system 1200 to add the watch user interface corresponding to platter 1230*a*2 (e.g., download the watch user interface from a remote server) to be displayed via computer system 1200. In FIG. 12F, platter 1230*a*1 is displayed with a first background color and platter 1230*a*2 is displayed with a background color. In some embodiments, the background color of a platter indicates whether the platter corresponds to a single available watch user interface or a collection of available watch user interfaces (e.g., a plurality of watch user interfaces). For example, in FIG. 12F, platter 1230*a*1 is displayed with a background color indicating that it corresponds to a collection of available watch user interfaces, and platter 1230*a*2 is displayed with a background color indicating that it corresponds to a single available watch user interface.

Generation user interface 1232*a* further includes platter 1230*a*3, which includes name 1234*a*3 indicating that platter 1230*a*3 is titled "Activity Analog," and image 1236*a*3, which includes a graphical representation of a watch user interface corresponding to platter 1230*a*3. Platter 1230*a*3 further includes description 1238*a*2, which includes a textual description of a watch user interface corresponding to platter 1230*a*3. Generation user interface 1232*a* further includes add user-interactive graphical user interface object 1240*a*2 which, when selected, causes computer system 1200 to add the watch user interface corresponding to platter 1230*a*3 (e.g., download the watch user interface from a remote server) to be displayed via computer system 1200.

Generation user interface 1232*a* further includes cancel user-interactive graphical user interface object 1232*a* which, when selected, causes computer system to display selection user interface 1210*c*. Generation user interface 1232*a* further includes search bar 1234 which, when selected, causes computer system 1200 to display a user interface including options for searching among a number of available watch user interfaces (e.g., by inputting letters corresponding to a name or title of a watch user interface using voice and/or touch inputs).

At FIG. 12F, computer system 1200 detects tap input 1250*e* on platter 1230*a*1. At FIG. 12F, computer system 1200 further detects press input 1270*c* on rotatable and depressible input mechanism 1204 while platter 1230*a*1 has selection focus. In some embodiments, generation user interface 1232*a* includes selection focus indicator 1212 displayed around platter 1230*a*1 to indicate that platter 1230*a*1 currently has selection focus.

At FIG. 12G, in response to receiving tap input 1250*e* or in response to receiving press input 1270*c*, computer system 1200 displays generation user interface 1232*b*. Generation user interface 1232*b* includes options for adding various watch user interfaces for display via computer system 1200. Available watch user interfaces are sorted into platters, which are displayed within generation user interface 1232*b*. Generation user interface 1232*b* includes platter 1230*b*1, which includes name 1234*b*1 indicating that platter 1230*b*1 is titled "Explorer," and image 1236*b*1, which includes a graphical representation of a watch user interface corresponding to platter 1230*b*1. Platter 1230*b*1 further includes description 1238*b*1, which includes a textual description of a watch user interface corresponding to platter 1230*b*1, and add user-interactive graphical user interface object 1240*b*1 which, when selected, causes computer system 1200 to add the watch user interface corresponding to platter 1230*b*1 (e.g., download the watch user interface from a remote server) to be displayed via computer system 1200.

Generation user interface 1232*b* further includes platter 1230*b*2, which includes name 1234*b*2 indicating that platter 1230*b*2 is titled "Artist Face," and image 1236*b*2, which includes a graphical representation of a watch user interface corresponding to platter 1230*b*2. Platter 1230*b*2 further includes description 1238*b*2, which includes a textual description of a watch user interface corresponding to platter 1230*b*2, and add user-interactive graphical user interface object 1240*b*2 which, when selected, causes computer system 1200 to add the watch user interface corresponding to platter 1230*b*2 (e.g., download the watch user interface from a remote server) to be displayed via computer system 1200.

Generation user interface 1232*b* further includes platter 1230*b*3, which includes name 1234*b*3 indicating that platter 1230*b*3 is titled "Activity Analog," and image 1236*b*3, which includes a graphical representation of a watch user interface corresponding to platter 1230*b*3. Platter 1230*b*3 further includes description 1238*b*3, which includes a textual description of a watch user interface corresponding to platter 1230*b*3, and add user-interactive graphical user interface object 1240*b*3 which, when selected, causes computer system 1200 to add the watch user interface corresponding to platter 1230*b*3 (e.g., download the watch user interface from a remote server) to be displayed via computer system 1200. Generation user interface 1232*b* further includes back user-interactive graphical user interface 1237*a* which, when selected, causes computer system 1200 to display generation user interface 1232*a*. In some embodiments, generation user interface 1232*b* includes selection focus indicator 1212 displayed around platter 1230*b*1 to indicate that platter 1230*b*1 currently has selection focus.

At FIG. 12G, computer system 1200 detects tap input 1250*f* on platter 1230*b*1. At FIG. 12G, computer system 1200 further detects press input 1270*d* on rotatable and depressible input mechanism 1204 while platter 1230*b*1 has selection focus.

At FIG. 12H, in response to receiving tap input 1250*f* or in response to receiving press input 1270*d*, computer system 1200 displays generation user interface 1232*c*. Generation user interface 1232*c* includes information related to adding the "Explorer" watch face to computer system 1200. Generation user interface 1232*c* includes back user-interactive graphical user interface 1237*b* which, when selected, causes computer system 1200 to display generation user interface 1232*b*. Generation user interface 1232*c* further includes image 1236*b*1, which includes a graphical representation of a watch user interface that can be added to computer system 1200. Generation user interface further includes add face user-interactive graphical user interface object 1242*a* which, when selected, causes computer system 1200 to add the "Explorer" watch user interface corresponding to image 1236*b*1 (e.g., download the watch user interface from a remote server) to be displayed via computer system 1200. Generation user interface 1232*c* further includes description 1238*b*1, which includes a textual description of the "Explorer" watch user interface currently selected for addition to computer system 1200. Generation user interface 1232 further includes more user-interactive graphical user interface object 1244 which, when selected, causes computer system 1200 to display additional textual description of the "Explorer" watch user interface currently selected for addition to computer system 1200. At FIG. 12H, computer system 1200 detects tap input 1250*g* on more user-interactive graphical user interface object 1244.

At FIG. 12I, in response to receiving tap input 1250*g*, computer system 1200 maintains display of generation user interface 1232*c* and displays description 1238*c*, which includes additional textual description of the "Explorer" watch user interface currently selected for addition to computer system 1200.

At FIG. 12I, computer system 1200 detects tap input 1250*h* on add face user-interactive graphical user interface object 1242*a*. At FIG. 12I, computer system 1200 further detects press input 1270*e* on rotatable and depressible input mechanism 1204.

At FIG. 12J, in response to receiving tap input 1250*h* or in response to receiving press input 1270*e*, computer system 1200 displays selection user interface 1210*d*. At selection user interface 1210*d*, the "Explorer" watch face has been added to computer system 1200, and is represented by representation 1214*e*. Representation 1214*e* is displayed at significantly the center of selection user interface 1210*d*, and is displayed with selection indicator 1212 around it to indicate that representation 1214*e* currently has selection focus. Representation 1214*e* is displayed between a partial view of representation 1214*b* (on the left) and a partial view of representation 1214*c* (on the right).

Selection user interface 1210*d* further includes share user-interactive graphical user interface object 1216 which, when selected, causes computer system 1200 to display user interfaces related to transmitting and/or sharing information related to watch user interface 1246*a* with another device (e.g., another computer system). Selection user interface 1210*d* further includes edit user-interactive graphical user interface object 1218 which, when selected, causes computer system 1200 to display an editing user interface for editing aspects of watch user interface 1246*a*. Selection user interface 1210*d* further includes face indicator 1220*d*, which includes a visual and/or textual indication of the name of the watch user interface currently centered in selection user interface 1210*d*. At FIG. 12J, face indicator 1220*d* indicates that currently indicated watch user interface 1246*a*, which is represented in selection user interface 1210*b* by representation 1214*e*, is titled "Explorer."

At FIG. 12J, computer system 1200 detects tap input 1250*i* on representation 1214*e*. At FIG. 12J, computer system 1200 further detects press input 1270*f* on rotatable and depressible input mechanism 1204.

At FIG. 12K, in response to receiving tap input 1250*i* or in response to receiving press input 1270*f*, computer system 1200 displays watch user interface 1246*a*. Watch user interface 1246*a* includes dial 1246*a*1, which includes a circle of dots representing hours of a day, time indication 1246*a*2, which includes analog hour hands representing the current time (e.g., hour, minute, and/or second), complication 1246*a*3, which includes a complication representing an application available on computer system 1200, and displays information from the corresponding application, and complication 1246*a*4, which includes a complication representing an application available on computer system 1200, and displays information from the corresponding application. At FIG. 12K, computer system 1200 detects input 1250*j* (e.g., a long press) on watch user interface 1246*a*.

At FIG. 12L, in response to detecting input 1250*j*, computer system 1200 displays selection user interface 1210*e*. Selection user interface 1210*e* significantly matches selection user interface 1210*d*. At FIG. 12L, computer system 1200 receives tap input 1250*k*1 on share user-interactive graphical user interface object 1216 and detects tap input 1250*k*2 on edit user-interactive graphical user interface object 1218.

At FIG. 12M, in response to detecting tap input 1250*k*1, computer system 1200 displays sharing user interface 1248*a*. Sharing user interface 1248*a* includes indication 1252, which includes a textual indication that sharing user interface 1248*a* is for generating a new message, add contact user-interactive graphical user interface object 1254*a* which, when selected, causes computer system 1200 to display a user interface for adding a recipient to receive a message. Sharing user interface 1248*a* further includes watch face user-interactive graphical user interface object 1254*b* which, when selected, causes computer system to display a user interface containing information about the watch user interface currently selected for sharing. Sharing user interface 1248*a* further includes create message user-interactive graphical user interface object 1254*c* which, when selected, causes computer system 1200 to display a user interface for creating (e.g., drafting, typing) a message to transmit. Sharing user interface 1248*a* further includes send user-interactive graphical user interface object 1254*d* which, when selected, causes computer system 1200 to transmit (e.g., send) information related to watch user interface 1246*a* to a selected recipient (or selected recipients). At FIG. 12M, computer system 1200 detects tap input 1250*l* on add contact user-interactive graphical user interface object 1254*a*.

At FIG. 12N, in response to receiving tap input 1250*l*, computer system 1200 displays sharing user interface 1248*b*. Sharing user interface 1248*b* includes cancel user-interactive graphical user interface object 1258 which, when selected, causes computer system 1200 to display selection user interface 1210*e*. In some embodiments, selecting cancel user-interactive graphical user interface object 1258 causes computer system 1200 to display sharing user interface 1248*a*. Sharing user interface 1248*b* further includes voice user-interactive graphical user interface object 1256*a* which, when selected, causes computer system 1200 to display options for adding a recipient using a voice method (e.g., using a microphone). Sharing user interface 1248*b* further includes add contact user-interactive graphical user interface object 1258*b* which, when selected, causes computer system 1200 to display options for adding an additional recipient via list of contacts accessible via computer system 1200. Sharing user interface 1248*b* further includes dial contact user-interactive graphical user interface object 1258*c* which, when selected, causes computer system 1200 to display options for adding a recipient using touch inputs (e.g., by typing in a phone number of a recipient on a numerical touch keypad). Sharing user interface 1248*b* further includes options related to suggested contacts that can be added via contact user-interactive graphical user interface object 1262*a*, contact user-interactive graphical user interface object 1262*b*, or contact user-interactive graphical user interface object 1262*c*. Each of contact user-interactive graphical user interface objects 1262*a*, 1262*b*, and 1262*c* includes an image and/or textual representation of a potential recipient for the message (e.g., a name and/or image corresponding to a potential recipient). In response to a selection of a contact user-interactive graphical user interface object (e.g., 1262*a*, 1262*b*, or 1262*c*), computer system 1200 selects a recipient corresponding to the selected contact user-interactive graphical user interface object to transmit the message to. At FIG. 12N, computer system 1200 receives tap input 1250*m* on contact user-interactive graphical user interface object 1262*c*.

At FIG. 12O, in response to receiving tap input 1250*m*, computer system 1200 displays sharing user interface 1248*c*, which is significantly the same as sharing user interface 1248*a* except that add user-interactive graphical user interface object 1254*a* has been replaced with recipient 1264*a*, corresponding to the selection of "Ann Smith" as a recipient of the message.

At FIG. 12P, in response to detecting tap input 1250*k*2, computer system 1200 displays editing user interface 1266*a*. Editing user interface 1266*a* includes aspect indicator 1268*a*, which includes a visual and/or textual representation of the aspect of watch user interface 1246*a* currently selected for editing. At FIG. 12P, aspect indicator 1268*a* indicates that the aspect of watch user interface 1246*a* that is currently selected for editing is "Style." Editing user interface 1266*a* further includes a partial view of aspect indicator 1268*b*, which corresponds to a different editable aspect of watch user interface 1246*a* (e.g., "Stripes").

Editing user interface 1266*a* further includes selection indicator 1274*a*, which includes a visual and/or textual representation of the currently selected option for the editable aspect of watch user interface 1246*a*. At FIG. 12P, selection indicator 1274*a* indicates that the currently selected "Style" option for watch user interface 1246*a* is "Fullscreen."

Editing user interface 1266*a* further includes positional indicator 1272*a*. Positional indicator 1272*a* includes a graphical indication of the number of selectable options for the editable aspect of watch user interface 1246*a* that is currently being edited, as well as the position of the currently selected option among the list of selectable options. For example, positional indicator 1272*a* indicates that the currently selected option for the "Style" aspect of watch user interface 1246*a*, "Fullscreen," is toward the top of a list of at least two possible options for the "Style" aspect of watch user interface 1246*a*.

Editing user interface 1266*a* further includes representation 1214*e*, which indicates that the watch user interface currently being edited is the watch user interface corresponding to representation 1214*e*, which is watch user interface 1246*a*. At FIG. 12P, computer system 1200 detects swipe input 1250*n*.

At FIG. 12Q, in response to a sequence of one or more user inputs including swipe input 1250*n* (e.g., two or more swipe inputs including swipe input 1250*n*), computer system 1200 displays editing user interface 1266*b*. Editing user interface 1266*b* includes aspect indicator 1268*c*, which includes a visual and/or textual representation of the aspect of watch user interface 1246*a* currently selected for editing. At FIG. 12Q, aspect indicator 1268*c* indicates that the aspect of watch user interface 1246*a* that is currently selected for editing is "Complications."

Editing user interface 1266*b* further includes representation 1214*e*, which indicates that the watch user interface currently being edited is the watch user interface corresponding to representation 1214*e*, which is watch user interface 1246*a*. At FIG. 12Q, computer system 1200 detects tap input 1250*o* on a portion of representation 1214*e* that corresponds to complication 1246*a*3 of watch user interface 1246*a*.

At FIG. 12R, in response to detecting tap input 1250*o*, computer system 1200 displays editing user interface 1266*c*, which includes multiple selectable complication options to be displayed with watch user interface 1246*a*. In some embodiments, the selectable complications are sorted into categories based on associated features/and or applications related to the selectable complication options. Editing user interface 1266*c* includes category 1278*a*, which includes a visual and/or textual indication that the complication beneath category 1278*a* is related to "Weather." Editing user interface 1266*c* further includes category 1278*b*, which includes a visual and/or textual indication that the complication beneath category 1278*b* is related to "Music." In some embodiments, a category includes multiple complications, in which case the multiple complications related to a given category are displayed below the text and/or a visual indication related to the category. In some embodiments, editing user interface 1266*c* is initially displayed with the selected complication from the previous user interface (e.g., editing user interface 1266*b*) centered and/or with selection focus. In some embodiments, computer system navigates from one complication option to another complication option (e.g., moves selection focus) by scrolling via a swipe input on editing user interface 1266*c* and/or via a rotational input via rotatable and depressible input mechanism 604. Editing user interface 1266*c* further includes cancel user-interactive graphical user interface object 1276 which, when selected, causes computer system 1200 to stop displaying editing user interface 1266*c* and display editing user interface 1266*b*.

Editing user interface 1266*c* further includes positional indicator 1272*b*. Positional indicator 1272*b* includes a graphical indication of the number of selectable options for the complication displayed with watch user interface 1246*a*, as well as the position of the complication within the list of selectable complication options that currently has selection focus.

At FIG. 12R, positional indicator 1272*b* indicates the relative position of complication 1282*a* within the list of selectable complication options to be displayed with watch user interface 1246*a*. Editing user interface 1266*c* further includes selection focus indicator 1284 around complication 1282*a*, which indicates that complication 1282*a* currently has selection focus in editing user interface 1266*c*.

At FIG. 12R, computer system 1200 detects rotational input 1260*b* via rotatable and depressible input mechanism while complication has 1282*a* has selection focus. At FIG. 12S, in response to detecting rotational input 1260*b*, computer system 1200 displays editing user interface 1266*d*, in which the selection focus has moved from complication 1282*a* to complication 1282*b*. Accordingly, selection focus indicator 1284 is now displayed around complication 1282*b*.

At FIG. 12S, computer system 1200 detects press input 1270*g* via rotatable and depressible input mechanism 1204. At FIG. 12T, in response to press input 1270*g*, computer system 1200 displays editing user interface 1266*e*, which includes a modified version of representation 1214*e* including complication 1282*b* instead of complication 1282*a*. Thus, editing user interface 1266*e* indicates that representation 1214*e* has been edited in response to press input 1270*g* and that, in response to receiving press input 1270*g*, computer system 1200 edited representation 1214*e* to include the complication option that had selection focus when press input 1270*g* was received (e.g., complication 1282*b*).

At FIG. 12T, computer system 1200 detects press input 1270*h* on rotatable and depressible input mechanism 1204. At FIG. 12U, in response to receiving press input 1270*h*, computer system 1200 displays watch user interface 1246*b*. Watch user interface 1246*b* is an edited version of watch user interface 1246*a*, wherein complication 1246*a*3, which corresponds to an air quality complication, has been replaced with complication 1246*b*3, which is a music complication. Watch user interface 1246*b* includes dial 1246*b*1, which includes a circle of dots representing hours of a day, time indication 1246*b*1, which includes analog hour hands representing the current time (e.g., hour, minute, and/or second), complication 1246*b*3, which includes a complication representing an application available on computer system 1200, and which displays information from a music application, and complication **1246*b*4, which includes a complication representing an application available on computer system 1200**, and which displays information from a corresponding application.

At FIG. 12V, computer system 1200 displays notification user interface 1286. Notification user interface includes watch face notification 1288, which includes visual and/or textual information related to the availability of a new watch user interface. At FIG. 12V, watch face notification 1288 includes text indicating that a new watch user interface is available. At FIG. 12V, computer system 1200 detects tap input **1250*w* on notification 1288 and press input 1270*i* on rotatable and depressible input mechanism 1204**.

At FIG. 12W, in response to receiving tap input **1250*w* or press input 1270*i*, computer system 1200 displays add user interface 1290. Add user interface 1290 includes back user-interactive graphical user interface 1292 which, when selected, causes computer system 1200 to display notification user interface 1286. Add user interface 1290 further includes image 1294, which corresponds to a watch user interface that is currently being shown as available to add to (e.g., download onto) computer system 1200. Add user interface 1290 further includes add face user-interactive graphical user interface object 1296 which, when selected, causes computer system 1200 to add a watch user interface corresponding to image 1294 (e.g., download the watch user interface from a remote server) to be displayed via computer system 1200. Add user interface 1290 further includes description 1298, which includes a textual description of the watch user interface corresponding to image 1294. In some embodiments, in response to a press input on rotatable and depressible input mechanism 1204 while add user interface 1290 is displayed, computer system 1200 downloads the watch user interface corresponding to image 1294 from a remote server for display via computer system 1200**.

FIG. 13 is a flow diagram illustrating a method related to user interfaces for the management of time in accordance with some embodiments. Method (1300) is performed at a computer system (e.g., 1200) (e.g., a smartwatch, a wearable electronic device, a smartphone, a desktop computer, a laptop, a tablet) that is in communication with a display generation component (e.g., 1202) (e.g., a display controller, a touch-sensitive display system) and one or more input devices including a rotatable input mechanism (e.g., 1204). In some embodiments, the computer system is in communication with one or more input devices (e.g., a touch-sensitive surface). Some operations in method 1300 are, optionally, combined, the orders of some operations are, optionally, changed, and some operations are, optionally, omitted.

As described below, method 1300 provides an intuitive way for managing user interfaces related to time. The method reduces the cognitive burden on a user for managing user interfaces related to time, thereby creating a more efficient human-machine interface. For battery-operated computing devices, enabling a user to manage user interfaces related to time faster and more efficiently conserves power and increases the time between battery charges.

The computer system displays (1302), via the display generation component, a selection user interface (e.g., **1210*a***) (e.g., a watch face selection user interface, a watch face generation user interface) (e.g., a representation of a watch face, a representation of a collection of watch faces).

While displaying the selection user interface (e.g., **1210*a*), the computer system (e.g., 1200) detects (1304) a rotation (e.g., 1260*a*1**) of the rotatable input mechanism about an axis of rotation (e.g., clockwise rotational input, counter-clockwise rotational input) (or, in some embodiments, detecting a non-rotational input (e.g., a tap gesture, a swipe gesture, and/or a mouse click)).

In response to detecting the rotation of the rotatable input mechanism (or, in some embodiments, in response to detecting a non-rotational input (e.g., a tap gesture, a swipe gesture, and/or a mouse click)), the computer system displays (1306) a graphical indication of selection focus (e.g., 1212 as illustrated in FIG. 12B) changing as selection focus is moved between a plurality of selectable objects (e.g., a representation of a watch face, a representation of a collection of watch faces). In some embodiments, the second set of content does not include the first graphical element.

After changing selection focus through the plurality of selectable objects, the computer system (e.g., 1200) detects (1308) a press input (e.g., **1270*a***) on the rotatable input mechanism (e.g., in a direction that includes a component that is parallel to the axis of rotation) (e.g., the press input is primarily or substantially in a direction that is parallel to the axis of rotation) (in some embodiments, a non-press input (e.g., a swipe gesture, a tap gesture, and/or a mouse click)).

In response to detecting the press input (e.g., **1270*a*), the computer system (e.g., 1200) selects (1310) one of the plurality of selectable objects (e.g., 1214*c*), including: in accordance with a determination that a first selectable object of the plurality of selectable objects had selection focus when the press input was detected, the computer system selects (1312) the first selectable object (e.g., without selecting a second selectable object of the plurality of selectable objects); and in accordance with a determination that a second selectable object (e.g., 1214*b*), different from the first selectable object, of the plurality of selectable objects had selection focus when the press input was detected, the computer systems selects (1314**) the second selectable object (e.g., without selecting the first selectable object of the plurality of selectable objects). Selecting one of a plurality of selectable objects based on which selectable object had selection focus when a press input was detected enables a user to select a desired selectable object easily and in an intuitive manner. In particular, changing the selection focus in response to a rotation of the rotatable input mechanism about an axis of rotation and selecting a selectable object in response to a press input on the rotatable input mechanism allows for both the navigation among selectable objects and the selection of a selectable object without requiring interactions with and/or inputs from multiple input devices. Providing improved control options enhances the operability of the computer system and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, selection focus is indicated by a location of selectable objects (e.g., **1224*b* as illustrated in FIG. 12C) in the selection user interface (e.g., 1210*b***). In some embodiments, selection focus corresponds to a selectable object that is in the substantially centered in the selection user interface. In some embodiments, the graphical indication of selection focus corresponds to the location of a selectable object included in the selection user interface. Indicating selection focus with the location of selectable objects in the selection user interface provides improved visual feedback about which selectable object has selection focus, as the selectable object that has selection focus will be indicated as having selection focus by its location in the selection user interface. Providing improved visual feedback enhances the operability of the device and makes the user-device interface more efficient (e.g., by helping the user to know which of the selectable objects being displayed has selection focus to reduce the number of user inputs and prevent the user from mistakenly selecting an incorrect selectable object) which, additionally, reduces power usage and improves battery life of the device by enabling the user to use the device more quickly and efficiently.

In some embodiments, the computer system (e.g., 1200) displays, via the display generation component, a visual indication (e.g., 1212 as illustrated in FIG. 12B) (e.g., cursor, outlining, shading, color, transparent overlay, etc.) corresponding to the selectable object that has selection focus. In some embodiments, the visual indication corresponding to the selectable object is displayed translated to a currently selectable object as selection focus is moved between a plurality of selectable objects. Indicating selection focus by displaying a visual indication corresponding to the selectable object that has selection focus provides improved visual feedback about which selectable object has selection focus. Providing improved visual feedback enhances the operability of the device and makes the user-device interface more efficient (e.g., by helping the user to know which of the selectable objects being displayed has selection focus to reduce the number of user inputs and prevent the user from mistakenly selecting an incorrect selectable object) which, additionally, reduces power usage and improves battery life of the device by enabling the user to use the device more quickly and efficiently.

In some embodiments, while displaying the selection user interface, the computer system (e.g., 1200) detects a swipe input (e.g., 1250*b*1) (or, in some embodiments, detecting a non-swipe gesture (e.g., a tap gesture, a press input, and/or a mouse click)). In some embodiments, in response to detecting the swipe input (or, in some embodiments, in response to detecting a non-swipe gesture (e.g., a tap gesture, a press input, and/or a mouse click)), the computer system changes selection focus from a third selectable object (e.g., 1214*b* as illustrated in FIG. 12C) to a fourth selectable object (e.g., 1214*c* as illustrated in FIG. 12E) (e.g., a representation of a watch face, a representation of a collection of watch faces). Changing selection focus from one selectable object to another in response to a swipe input enables a user to change the selectable object that has selection focus in an easy, intuitive manner. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 1200) detects a tap input (e.g., 1250*c*) (e.g., a touch input) (or in some embodiments, detecting a non-tap gesture (e.g., a swipe gesture, a press-and-hold gesture, and/or a mouse click)). In some embodiments, in response to detecting the tap input (or, in some embodiments, in response to detecting a non-tap gesture (e.g., a swipe gesture, a press-and-hold gesture, and/or a mouse click)), the computer system selects one of the plurality of selectable objects (e.g., 1214*c* as illustrated in FIG. 12C) and in accordance with a determination that the tap input was on a respective portion of a third selectable object, the computer system performs a first operation that includes selecting the third selectable object (e.g., without selecting a different selectable object). Selecting a selectable object in response to a tap input enables a user to select a selectable object in an easy, intuitive manner. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, in response to detecting the tap input (e.g., 1250*c*), the computer system (e.g., 1200) selects one of the plurality of selectable objects and in accordance with a determination that the tap input was on a fourth selectable object (e.g., 1214*c* as illustrated in FIG. 12E) different from the respective portion of the third selectable object (e.g., 1214*b*), the computer system performs a second operation that is different from the first operation (e.g., selecting the fourth selectable object or displaying additional information about the third selectable object) (e.g., without selecting the third selectable object of the plurality of selectable objects). Selecting a selectable object in response to a tap input and in accordance with a determination that the tap input was on the selectable object being selected enables a user to select a selectable object in an easy, intuitive manner. Providing additional control options enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system displays a first watch face (e.g., 1206) (e.g., a user interface that includes an indication of a current time; a clock user interface for a smartwatch). In some embodiments, while displaying the first watch face, the computer system detects a first user input (e.g., 1250*a*) (e.g., a long press touch input, a tap gesture, a press input, and/or a mouse click) corresponding to a user request to select a watch face. In some embodiments, in response to detecting the first user input, the computer system displays the selection user interface (e.g., 1210*a*). In some embodiments, the selection user interface is a watch face selection user interface. In some embodiments, in response to detecting the first user input, the computer system visually distinguishes the first watch face (e.g., 1214*b* as illustrated in FIG. 12B) to indicate the watch face selection user interface. In some embodiments, while displaying the watch face selection user interface, the computer system detects a second user input (e.g., 1250*a*1) (e.g., a rotational input via a rotational input mechanism, a swipe input, a press input, and/or a mouse click), and in response to detecting the second user input, the computer system visually distinguishes a second watch face (e.g., 1214*a* as illustrated in FIG. 12C) different from the first watch face; and (e.g., moving the second watch face to a predetermined location in the user interface such as substantially in a center of the user interface, on a right side of the user interface or a left side of the user interface). In some embodiments, while displaying the watch face selection user interface and while displaying the second watch face, the computer system detects a second press input (e.g., 1270*a*) on the rotatable input mechanism (e.g., 1204) (e.g., in a direction that includes a component that is parallel to the axis of rotation) (e.g., the press input is primarily or substantially in a direction that is parallel to the axis of rotation) (or in some embodiments, detecting a non-press input (e.g., a tap gesture, a swipe gesture, and/or a mouse click)). In some embodiments, in response to detecting the second press input (or in some embodiments, in response to detecting a non-press input (e.g., a tap gesture, a swipe gesture, and/or a mouse click)), the computer system selects the second watch face as a currently selected watch face for the computer system (e.g., for display by the computer system). In some embodiments, selecting the second watch face for display by the computer system includes setting the second watch face as the default watch face for display by the computer system (e.g., on wake). Selecting the second watch face (e.g., 1214*c* as illustrated in FIG. 12C) in response to the second press input received while the second watch face is being displayed provides improved feedback by allowing a user to select the second watch face while the second watch face is being displayed, thereby providing improved visual feedback, enhancing the operability of the device, and making the user-device interface more efficient (e.g., by helping the user to understand which watch face is currently available for selection) which, additionally, reduces power usage and improves battery life of the device by enabling the user to use the device more quickly and efficiently.

In some embodiments, the computer system displays a third watch face (e.g., 1246*a*) (e.g., a watch face; a user interface that includes an indication of a current time; a clock user interface for a smartwatch). In some embodiments, while displaying the third watch face, the computer system (e.g., 1200) receives, via the one or more input devices, a first sequence of one or more user inputs (e.g., long press touch input, tap inputs, rotational inputs, press inputs) that corresponds to a request to edit the third watch face (as illustrated in FIGS. 12K-12L). In some embodiments, in response to receiving the first sequence of one or more user inputs, the computer system enters a watch face edit mode of the computer system (e.g., as illustrated in FIG. 12P). In some embodiments, in response to receiving the first sequence of one or more user inputs, the computer visually distinguishes an element (e.g., 1268*a*) of the third watch face for editing. In some embodiments, the visually distinguished element is a first selectable option for the visually distinguished element of the third watch face. In some embodiments, while the computer system is in the watch face edit mode, the computer system receives, via the one or more input devices, a second sequence of one or more user inputs (e.g., touch inputs, rotational inputs, press inputs), and in response to receiving the second sequence of one or more user inputs, the computer system displays a second selectable option for the visually distinguished element of the third watch face. In some embodiments, while the computer system is in the watch face edit mode and while displaying the second selectable option for the visually distinguished element of the third watch face, the computer system detects a third press input (e.g., 1270*h*) on the rotatable input mechanism (e.g., in a direction that includes a component that is parallel to the axis of rotation) (e.g., the press input is primarily or substantially in a direction that is parallel to the axis of rotation) (or, in some embodiments, detecting a non-press input (e.g., a tap gesture, a swipe gesture, and/or a mouse click)). In some embodiments, in response to detecting the third press input (or, in some embodiments, in response to detecting a non-press input (e.g., a tap gesture, a swipe gesture, and/or a mouse click)), the computer system selects the second selectable option for the visually distinguished element of the third watch face. In some embodiments, selecting the second selectable option for the visually distinguished element of the third watch face includes selecting the second option for the visually distinguished element to be displayed in the third watch face. Editing an element of watch face by detecting a third press input while displaying a second selectable option for a visually distinguished element of the third watch face enables a user to quickly and easily select a edit an element of a watch face based on input received while a selectable option for the element being edited is being displayed, thereby providing improved visual feedback, enhancing the operability of the device, and making the user-device interface more efficient (e.g., by helping the user to see which element of the watch face they are editing while inputting the third press input) which, additionally, reduces power usage and improves battery life of the device by enabling the user to use the device more quickly and efficiently.

In some embodiments, the computer system displays, a fourth watch face (e.g., 1246*a*) (e.g., a watch face; a user interface that includes an indication of a current time; a clock user interface for a smartwatch). In some embodiments, while displaying the fourth watch face, the computer system (e.g., 1200) receives, via the one or more input devices, a third sequence of one or more user inputs (e.g., touch inputs, rotational inputs, press inputs) that corresponds to a request to edit the fourth watch face (e.g., as illustrated in FIGS. 12K-12L). In some embodiments, in response to receiving the third sequence of one or more user inputs, the computer system enters a watch face edit mode of the computer system (e.g., as illustrated in FIG. 12P). In some embodiments, in response to receiving the third sequence of one or more inputs, the computer system visually distinguishes a complication (e.g., 1282*a*) of the fourth watch face for editing. In some embodiments, while the computer system is in the watch face edit mode, the computer system displays a first complication option for the complication. In some embodiments, while the computer system is in the watch face edit mode, the computer system receives, via the one or more input devices, a fourth sequence of one or more user inputs (e.g., touch inputs, rotational inputs, press inputs), and in response to receiving the fourth sequence of one or more user inputs, the computer system displays a second complication option (e.g., 1282*b*). In some embodiments, while the computer system is in the watch face edit mode and while displaying the second complication option, the computer system detects a fourth press input on the rotatable input mechanism (e.g., 1270*g*) (e.g., in a direction that includes a component that is parallel to the axis of rotation) (e.g., the press input is primarily or substantially in a direction that is parallel to the axis of rotation) (or, in some embodiments, detecting a non-press input (e.g., a tap gesture, a swipe gesture, and/or a mouse click)). In some embodiments, in response to detecting the fourth press input (or, in some embodiments, in response to detecting a non-press input (e.g., a tap gesture, a swipe gesture, and/or a mouse click)), selects the second complication option. In some embodiments, selecting the second complication option includes selecting the second option for the visually distinguished element to be displayed in the fourth watch face. In some embodiments, in accordance with a determination that the second complication option has been selected, the computer system displays a representation of the fourth watch face that includes a representation of the second complication option to be displayed. Editing an complication by detecting a fourth press input while displaying a second complication option enables a user to quickly and easily select a complication based on input received while the second complication option is being displayed, thereby providing improved visual feedback, enhancing the operability of the device, and making the user-device interface more efficient (e.g., by helping the user to see which complication option they are editing while inputting the fourth press input) which, additionally, reduces power usage and improves battery life of the device by enabling the user to use the device more quickly and efficiently.

In some embodiments, after selecting the second complication option (e.g., as illustrated in FIG. 12S), the computer system (e.g., 1200) detects a fifth press input (e.g., 1270*h*) on the rotatable input mechanism (e.g., 1204) (e.g., in a direction that includes a component that is parallel to the axis of rotation) (e.g., the press input is primarily or substantially in a direction that is parallel to the axis of rotation) (or, in some embodiments, detecting a non-press input (e.g., a tap gesture, a swipe gesture, and/or a mouse click)). In some embodiments, in response to detecting the fifth press input (or, in some embodiments, in response to detecting a non-press input (e.g., a tap gesture, a swipe gesture, and/or a mouse click)), the computer system selects the fourth watch face for display by the computer system (e.g., as illustrated in 12U). In some embodiments, selecting the fourth watch face for display by the computer system includes setting the fourth watch face, including the selected second complication option, as the default watch face for display by the computer system (e.g., on wake). Selecting the fourth watch face for display in response to a fifth press input received after selecting the second complication option enables a user to quickly and easily select the watch face including the edited complication, thereby providing improved visual feedback, enhancing the operability of the device, and making the user-device interface more efficient (e.g., by helping the user to select the edited watch face including the second complication as a current watch face) which, additionally, reduces power usage and improves battery life of the device by enabling the user to use the device more quickly and efficiently.

In some embodiments, the computer system (e.g., 1200) displays a fifth watch face (e.g., 1246*a*) (e.g., a watch face; a user interface that includes an indication of a current time; a clock user interface for a smartwatch). In some embodiments, while displaying the fifth watch face, the computer system receives, via the one or more input devices, a fifth sequence of one or more user inputs (e.g., touch inputs, rotational inputs, press inputs) that corresponds to a request to send the fifth watch face to a recipient (e.g., as illustrated in FIGS. 12K-12L). In some embodiments, sending the watch face to a user includes transmitting the watch face to a recipient device (e.g., a device associated with the recipient). In some embodiments, in response to receiving the fifth sequence of one or more user inputs, the computer system displays a recipient selection user interface; (e.g., a user interface that includes the names of one or more potential recipients of the watch face). In some embodiments, while the recipient selection user interface (e.g., 1248*b*) is displayed, the computer system displays a name of a recipient. In some embodiments, the name of the recipient has selection focus. In some embodiments, while the recipient selection user interface is displayed, the computer system detects a sixth press input on the rotatable input mechanism (e.g., in a direction that includes a component that is parallel to the axis of rotation) (e.g., the press input is primarily or substantially in a direction that is parallel to the axis of rotation) (or, in some embodiments, detecting a non-press input (e.g., a tap gesture, a swipe gesture, and/or a mouse click)). In some embodiments, in response to detecting the sixth press input (or, in some embodiments, in response to detecting a non-press input (e.g., a tap gesture, a swipe gesture, and/or a mouse click)), the computer system transmits information associated with the fifth watch face to the recipient. In some embodiments, transmitting information associated with the watch face to the recipient includes transmitting a representation of the watch face that specifies an arrangement of user interface elements including a first user interface element corresponding to a first application and one or more other user interface elements corresponding to software that is different from the first application. In some embodiments, transmitting information associated with the watch face to the recipient includes transmitting data identifying a plurality of independently configurable graphical elements constituting the watch face. Detecting a sixth press input while the recipient selection user interface is displayed and, in response to detecting the sixth press input, transmitting information associated with the fifth watch face to the recipient enables a user to quickly and easily select a recipient to receive the selected watch face, thereby enhancing the operability of the device and making the user-device interface more efficient (e.g., by helping the user to easily transition from viewing the watch face to selecting a recipient for the watch face) which, additionally, reduces power usage and improves battery life of the device by enabling the user to use the device more quickly and efficiently.

In some embodiments, the computer system (e.g., 1200) displays, via the display generation component (e.g., 1202), a watch face gallery user interface (e.g., 1232*a*) for viewing selectable watch faces that are included in a watch face gallery for the computer system (e.g., a user interface for obtaining watch faces, a user interface that includes watch faces that can be downloaded onto the computer system, a user interface that includes watch face collections). In some embodiments, the watch face gallery user interface for viewing selectable watch faces (e.g., 1232*a* as illustrated in FIG. 12F) includes a plurality of selectable graphical elements that correspond to watch faces that can be downloaded onto the computer system. In some embodiments, the watch face gallery user interface for viewing selectable watch faces displays watch faces that are not available (e.g., have not been downloaded) on the computer system. In some embodiments, the watch face gallery user interface for viewing selectable watch faces includes a search bar (e.g., in a top portion of the watch face gallery user interface for viewing selectable watch faces) for searching the watch faces that can be downloaded onto the computer system for a particular watch face. Displaying a watch face gallery user interface for viewing selectable watch faces enables a user to quickly and easily view available watch faces within the watch face gallery, thereby enhancing the operability of the device and making the user-device interface more efficient (e.g., by helping the user to quickly view available watch faces and add them to the computer system) which, additionally, reduces power usage and improves battery life of the device by enabling the user to use the device more quickly and efficiently.

In some embodiments, the computer system (e.g., 1200) displays the selection user interface (e.g., 1210*c*). In some embodiments, the selection user interface is a watch face selection user interface. In some embodiments, while displaying the watch face selection user interface, the computer system displays a watch face generation affordance (e.g., 1214*c* as illustrated in FIG. 12E) (e.g., an affordance for obtaining a watch face on the computer system, an add affordance). In some embodiments, the computer system receives, via the one or more input devices, a third user input (e.g., 1250*d*) (e.g., a tap input, a rotational input via a rotational input mechanism, a swipe input) that corresponds to the watch face generation affordance (e.g., a press input, a tap input). In some embodiments, the user input that corresponds to the watch face generation affordance includes a press input on the rotatable input mechanism (e.g., in a direction that includes a component that is parallel to the axis of rotation) (e.g., the press input is primarily or substantially in a direction that is parallel to the axis of rotation) that is received while the watch face generation affordance has selection focus. In some embodiments, in response to receiving the third user input, displaying the watch face gallery user interface for viewing selectable watch faces. Displaying a watch face generation affordance while displaying the watch face selection user interface enables a user to quickly and easily transition from selecting among watch faces already available on the device (e.g., already downloaded) to viewing options that are available to download, thereby enhancing the operability of the device and making the user-device interface more efficient by reducing the number of inputs required to transition from selecting a downloaded watch face to downloading a new one. Reducing the number of inputs needed to perform an operation enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the watch face gallery user interface for viewing selectable watch faces (e.g., 1234*a*1 as illustrated in FIG. 12F) includes a representation of a sixth watch face (e.g., 1236*a*2). In some embodiments, the watch face gallery user interface for viewing selectable watch faces includes a third selectable option (e.g., 1244) for displaying additional information (e.g., a description) related to the sixth watch face. In some embodiments, the watch face gallery user interface for viewing selectable watch faces includes a fourth selectable option e.g., 1240*a*1 (e.g., an affordance for downloading and/or installing the watch face) for adding the sixth watch face to the watch face gallery for the computer system. Concurrently displaying a representation of a sixth watch face, a third selectable option for displaying additional information related to the sixth watch face, and a fourth selectable option for adding the sixth watch face to the watch face gallery for the computer system enables a user to quickly and easily select among various options related to an available watch face with a reduced number of inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the watch face gallery user interface (e.g., 1232*b*) for viewing selectable watch faces, the computer system (e.g., 1200) displays a graphical element (e.g., a platter with text) that corresponds to a seventh watch face (e.g., 1236*b*1 as illustrated in FIG. 12G). In some embodiments, the computer system receives, via the one or more input devices, a fourth user input (e.g., 1250*f*) (e.g., a tap input, a rotational input via a rotational input mechanism, a swipe input). In some embodiments, in response to receiving the fourth user input and in accordance with a determination that the fourth user input corresponds to a tap on the graphical element that corresponds to the seventh watch face, the computer system displays additional information (e.g., a description) about the seventh watch face. In some embodiments, in response to receiving the fourth user input and in accordance with a determination that the fourth user input corresponds to a seventh press input on the rotatable input mechanism (e.g., in a direction that includes a component that is parallel to the axis of rotation) (e.g., the press input is primarily or substantially in a direction that is parallel to the axis of rotation), the computer system adds (e.g., downloading) the seventh watch face to the watch face gallery of the computer system. Selectively displaying additional information about the seventh watch face or adding the seventh watch face to the watch face gallery for the computer system in accordance with a determination that a fourth user input is either a tap on the graphical element that corresponds to the seventh watch face or a press input provides visual feedback about the options available to a user, enables a user to quickly and easily choose to either view more information about the seventh watch face or download the watch face, thereby reducing the number of inputs needed to perform an operation. Providing improved visual feedback to the user and reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the watch face gallery user interface (e.g., 1232*b*) for viewing selectable watch faces includes an affordance (e.g., 1238*a*) for returning to a previously displayed user interface (e.g., 1232*a*) (e.g., a back button). In some embodiments, the computer system receives an input that corresponds to selection (e.g., a tap gesture, a swipe, a press input, and/or a mouse click) of the affordance for returning to the previously displayed user interface. In some embodiments, in response to receiving the input that corresponds to selection of the affordance for returning to the previously displayed user interface, the computer system displays, via the display generation component, the previously displayed user interface (e.g., 1232*a* as illustrated in FIG. 12F). Displaying an affordance for returning to a previously displayed user interface in the watch face gallery user interface for viewing selectable watch faces enables a user quickly and easily return to a previously displayed user interface from the watch face gallery without requiring multiple user inputs. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the watch face gallery user interface (e.g., 1232*c*) for viewing selectable watch faces, the computer system concurrently displays a second graphical element (e.g., 1236*b*1) (e.g., a platter with text) that corresponds to an eighth watch face and an affordance (e.g., 1242*a*) for adding the eighth watch face to the watch face gallery for the computer system (e.g., 1200)

(e.g., an affordance for downloading and/or installing the watch face). In some embodiments, the computer system receives, via the one or more input devices, a fifth user input (e.g., 1250*h*) (e.g., a tap input, a rotational input via a rotational input mechanism, a swipe input). In some embodiments, in response to receiving the fifth user input and in accordance with a determination that the fifth user input is a tap input on the affordance for adding the eighth watch face (e.g., a tap input on the affordance) to the watch face gallery for the computer system, the computer system adds (e.g., downloads) the eighth watch face to the watch face gallery for the computer system. In some embodiments, in response to receiving the fifth user input and in accordance with a determination that the fifth user input corresponds to an eighth press input (e.g., 1270*e*) on the rotatable input mechanism (e.g., in a direction that includes a component that is parallel to the axis of rotation) (e.g., the press input is primarily or substantially in a direction that is parallel to the axis of rotation), the computer system adds (e.g., downloading) the eighth watch face to the watch face gallery for the computer system. Concurrently displaying a second graphical element that corresponds to the eighth watch face and an affordance for adding the eighth watch face to the watch face gallery for the computer system enables a user quickly and easily view the graphical element that corresponds to the eighth watch face (e.g., a platter with text describing the watch face, a representation of the watch face) with the option to add the eighth watch face to the watch face gallery for the computer system via the affordance for adding the eighth watch face without further inputs, thereby reducing the number of inputs required to add the watch face on the computer system. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while displaying the watch face gallery user interface for viewing selectable watch faces (e.g., 1232*a*, as illustrated in FIG. 12F), the computer system (e.g., 1200) detects a sixth user input (e.g., a rotation of the rotatable input mechanism about an axis of rotation, a swipe input, a tap input, and/or a mouse click). In some embodiments, in response to detecting the sixth user input, the computer system displays a third graphical indication of selection focus changing as selection focus is moved between a second plurality of selectable objects (e.g., a representation of a watch face, a representation of a collection of watch faces). Displaying a third graphical indication of selection focus changing as selection focus is moved throughout a second plurality of selectable objects provides visual feedback about which selectable object has selection focus. Providing improved visual feedback enhances the operability of the device and makes the user-device interface more efficient (e.g., by helping the user to know which of the selectable objects being displayed has selection focus to reduce the number of user inputs and prevent the user from mistakenly selecting an incorrect selectable object) which, additionally, reduces power usage and improves battery life of the device by enabling the user to use the device more quickly and efficiently.

In some embodiments, the watch face gallery user interface (e.g., 1232*a* as illustrated in FIG. 12F) for viewing selectable watch faces includes a third graphical element (e.g., 1230*a*2) (e.g., a platter with text) that corresponds to a single watch face and a fourth graphical element (e.g., 1230*a*1) that corresponds to a plurality of watch faces. Displaying a watch face gallery user interface for viewing selectable watch faces that includes a third graphical element that corresponds to a single watch face and a fourth watch graphical element that corresponds to a plurality of watch faces enables a user to quickly and easily view both individual watch faces and collections of watch faces within the watch face gallery, thereby enhancing the operability of the device, providing improved visual feedback, and making the user-device interface more efficient (e.g., by helping the user to quickly view available watch faces and add them to the computer system) which, additionally, reduces power usage and improves battery life of the device by enabling the user to use the device more quickly and efficiently.

In some embodiments, the graphical element that corresponds to a single watch face (e.g., 1230*a*2 as illustrated in FIG. 12F) includes a background (e.g., a portion of the graphical element on which text and/or additional graphical features are overlaid) of a first color, and the graphical element that corresponds to a plurality of watch faces (e.g., 1232*a*1 as illustrated in FIG. 12F) includes a background of a second color different from the first color. Displaying the graphical element that corresponds to a single watch face with a background of a first color and the graphical element that corresponds to a plurality of watch face with a background of a second color provides improved visual feedback about whether a graphical element corresponds to one or multiple watch faces. Providing improved visual feedback enhances the operability of the device and makes the user-device interface more efficient (e.g., by helping the user to know which of the graphical elements correspond to a plurality of watch faces) which, additionally, reduces power usage and improves battery life of the device by enabling the user to use the device more quickly and efficiently.

In some embodiments, the computer system receives, via the one or more input devices, a selection (e.g., 1250*e*) (e.g., a user input that corresponds to a selection) (e.g., a tap input, a swipe input, a press input, and/or a mouse click) of the graphical element that corresponds to multiple watch faces (e.g., 1230*a*1 as illustrated in FIG. 12F). In some embodiments, the selection of the graphical element that corresponds to multiple watch faces is a tap input (e.g., 1250*e*) on the graphical element that corresponds to multiple watch faces or a press input (e.g., 1270*c*). In some embodiments, the selection of the graphical element that corresponds to multiple watch faces is a press input on the rotatable input mechanism (e.g., in a direction that includes a component that is parallel to the axis of rotation) while the graphical element that corresponds to multiple watch faces (e.g., 1230*a*1) has selection focus. In some embodiments, in response to receiving the selection of the graphical element that corresponds to multiple watch faces, the computer system displays a plurality (e.g., a list or grid or stack) of watch faces (e.g., 1230*b*1, 1230*b*2, and 1230*b*3 as illustrated in FIG. 12G) that can be separately selected to add to a watch face gallery for the computer system (e.g., as illustrated in FIG. 12G). Displaying a plurality of selectable watch faces in response to receiving a selection of the graphical element that corresponds to multiple watch faces enables a user to quickly and easily view selectable watch faces without having to parse through multiple entries in a watch face gallery user interface for viewing selectable watch faces, thereby reducing the number of inputs required to view multiple related watch faces. Reducing the number of inputs needed to perform an operation enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1200) receives, via the one or more input devices, a selection of a watch user interface (e.g., a watch face; a user interface for a watch that includes an indication of a time and/or date). In some embodiments, the selection of the watch user interface is a tap input (e.g., 1250*f*) or a press input (e.g., 1270*d*) on a representation of the watch user interface. In some embodiments, the selection of the watch user interface is a press input on the rotatable input mechanism (e.g., in a direction that includes a component that is parallel to the axis of rotation) while the representation of the watch user interface (e.g., 1230*b*1) has selection focus. In some embodiments, in response to receiving the selection of the watch user interface (e.g., 1270*d*, 1270*e*, 1250*h*), the computer system displays, via the display generation component, a watch face editing user interface (e.g., 1266*a*). In some embodiments, the watch face editing user interface includes a representation of a layout of the watch user interface including a time region for displaying a current time (e.g., a current time of day; the time in the current time zone, a time coordinated with and/or intended to reflect the coordinated universal time with an offset based on a currently selected time zone) and one or more complication regions for displaying complications on the watch user interface. In some embodiments, a complication refers to any clock face feature other than those used to indicate the hours and minutes of a time (e.g., clock hands and/or hour/minute indications). In some embodiments, complications provide data obtained from an application. In some embodiments, a complication includes an affordance that when selected launches a corresponding application. In some embodiments, a complication is displayed at a fixed, predefined location on the display. In some embodiments, complications occupy respective locations at particular regions of a watch face (e.g., lower-right, lower-left, upper-right, and/or upper-left). In some embodiments, while displaying the watch face editing user interface, detecting, via the one or more input devices, a sequence of one or more inputs (e.g., a tap input, a press input on the rotatable input mechanism (e.g., in a direction that includes a component that is parallel to the axis of rotation)) including a seventh user input directed to a complication region of the one or more complication regions (e.g., as illustrated in FIGS. 12Q-12T) (e.g., a corner region (e.g., top-left, top-right, bottom-left, bottom-right); a bezel region). In some embodiments, in response to detecting the sequence of one or more inputs including the seventh user input directed to the complication region of the one or more complication regions, the computer system changes which complication is assigned to the complication region of the watch user interface. In some embodiments, in response to detecting the seventh user input directed to the complication region of the one or more complication regions, the computer system displays, via the display generation component, a complication selection user interface (e.g., 1266*c*), wherein displaying the complication selection user interface includes concurrently displaying an indication of (e.g., the name of; a graphical indication of, an icon corresponding to; a category of) a first application (e.g., an application that is installed on, can be launched on, and/or is accessible from the computer system), a first complication preview (e.g., 1282*a* as illustrated in FIG. 12R) (e.g., a graphical preview of how the first complication would be displayed in the watch user interface) corresponding to a first complication that is configured to display, on the watch user interface, a first set of information obtained from the first application (e.g., information based on a feature, operation, and/or characteristic of the first application), wherein the first complication preview includes a graphical representation of the first complication displaying the first set of information (e.g., an exemplary representation of the first complication with an example of the first set of information), and a second complication preview (e.g., 1282*b* as illustrated in FIG. 12R) (e.g., a graphical preview of how the second complication would be displayed in the watch user interface) corresponding to a second complication that is configured to display, on the watch user interface, a second set of information different from the first set of information, obtained from the first application (e.g., information based on a feature, operation, and/or characteristic of the first application), wherein the second complication preview includes a graphical representation of the second complication displaying the second set of information (e.g., an exemplary representation of the second complication with an example of the second set of information). In some embodiments, while displaying the complication selection user interface, the computer system detects, via one or more input devices (e.g., via rotational input device; via a touch-sensitive surface), a user input directed to selecting a respective complication preview; and in response to detecting the user input directed to selecting the respective complication preview, displays, via the display generation component, a representation of the watch user interface with a representation of a selected complication corresponding to the respective complication preview displayed at the first complication region of the watch user interface, wherein, in accordance with a determination that the respective complication preview is the first complication preview, the first complication is displayed in the first complication region of the watch user interface; and, in accordance with a determination that the respective complication preview is the second complication preview, the second complication is displayed in the first complication region of the watch user interface. Entering an edit mode for editing features of a selected watch face in response to receiving a selection of the watch face enables a user to quickly edit the watch face without further user inputs, allowing a user to quickly and efficiently edit a selected face to match their preferences after selecting it without having to specifically select an option to edit it, thereby reducing the number of inputs required to transition from selecting the watch face and editing it to match a user's preferences. Reducing the number of inputs needed to perform an operation enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, the computer system (e.g., 1200) displays a notification (e.g., 1288) corresponding to an availability of a watch face (e.g., a notification that is displayed in accordance with a determination that a new watch face is available to be downloaded). In some embodiments, the computer system receives, via the one or more input devices, an eighth user input (e.g., 1250*x*) (e.g., a tap input, a press input on the rotatable input mechanism (e.g., in a direction that includes a component that is parallel to the axis of rotation)) corresponding to the notification corresponding to the availability of a ninth watch face. In some embodiments, in response to receiving the eighth user input, the computer system displays a user interface (e.g., 1290) (e.g., a user interface for downloaded the watch face associated with the notification) for adding a watch face associated with the notification corresponding to the availability of the ninth watch face to the watch face gallery for the computer system. Displaying a user interface for adding a watch face associated with a notification to a watch face gallery for the computer system in response to an input on the notification enables a user to quickly and easily view and/or add a watch face after receiving a notification about the availability of the ninth watch face, thereby reducing the number of inputs required to transition from displaying the notification to viewing information about the watch face and/or downloading the watch face. Reducing the number of inputs needed to perform an operation enhances the operability of the system and makes the computer system more efficient (e.g., by helping the user to provide proper inputs and reducing user mistakes when operating/interacting with the system) which, additionally, reduces power usage and improves battery life of the device by enabling the user to use the system more quickly and efficiently.

In some embodiments, while the computer system (e.g., 1200) is displaying, via the display generation component (e.g., 1202), a tenth watch face, and while the computer system is in an unlocked state the computer system receives a communication from a remote computer (e.g., a remote server, a software update server that provides a cryptographic key for unlocking a watch face that was stored on the computer system but was locked prior to receiving the cryptographic key). In response to receiving the communication from a remote server, the computer system displays the notification (e.g., 1288) corresponding to the availability of the ninth watch face. Displaying the notification related to the availability of the ninth watch face in response to receiving a communication from a remote computer while the device is displaying the tenth watch face, and while the computer is in an unlocked state provides the user with relevant information about the availability of the ninth watch face, based on the availability of the ninth watch face, without requiring the user to provide further inputs when configuring devices at different locations. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

Note that details of the processes described above with respect to method 1300 (e.g., FIG. 13) are also applicable in an analogous manner to the methods described herein. For example, method 1300 optionally includes one or more of the characteristics of the various methods described herein with reference to method 700, method 900, and method 1100. For example, method 700 optionally includes one or more of the characteristics of the various methods described above with reference to method 1300. For example, a watch user interface as described with reference to FIGS. 12A-12W can include and be used to select and/or edit watch user interfaces as described with reference to FIGS. 6A-6U. For another example, method 900 optionally includes one or more of the characteristics of the various methods described above with reference to method 1300. For example, a watch user interface as described with reference to FIGS. 12A-12W can include and be used to select and/or edit watch user interfaces as described with reference to FIGS. 8A-8M. For another example, method 1100 optionally includes one or more of the characteristics of the various methods described above with reference to method 1300. For example, a device can use as a watch user interface either a time user interface as described with reference to FIGS. 12A-12W or a watch user interface as described with reference to FIGS. 10A-10W. For another example, method 1300 optionally includes one or more of the characteristics of the various methods described below with reference to method 1500. For example, a user could add a watch user interface to computer system 1200 via inputs received using a rotatable and depressible input mechanism as described above with reference to FIGS. 12A-12W before editing the added watch user interface via a computer system in communication with computer system 1200 as described below with reference to FIGS. 14A-14R. FIGS. 14A-14R illustrate user interfaces containing user-interactive graphical user interface objects for performing various functions, which are described below as affordances. For brevity, these details are not repeated below.

FIGS. 14A-14R illustrate exemplary user interfaces for editing and displaying user interfaces based on a media item that includes depth data. The user interfaces in these figures are used to illustrate the processes described below, including the process in FIG. 15.

In FIG. 14A, computer system 1400 displays add portrait user interface 1404*a* via display 1402. Add portrait user interface 1404*a* is a user interface for adding a portrait user interface (e.g., a user interface (e.g., a watch user interface) based on a media item that includes depth data) to a computer system (e.g., computer system 1400 and/or computer system 600).

Add portrait user interface 1404*a* includes options for configuring a set of one or more media items that include depth data, and which are selected to be used with the portrait user interface (e.g., based on a determination that the selected media items satisfy criteria (e.g., that include depth data)). Watch user interface 1404*a* includes content header 1422, which indicates that the options displayed below content header 1422 relate to configuring content of the portrait user interface (e.g., by selecting photos to be used with the portrait user interface). Below content header 1422, add portrait user interface 1404*a* includes choose photos affordance 1424 which, when selected, causes computer system 1400 to display options for selecting the media items including depth data to be used for the portrait user interface as illustrated in FIG. 14B, which is described below. Add portrait user interface 1404*a* further includes photo limit indicator 1426, which provides a visual and/or textual indication of a limit on the number of media items that can be selected for use with the portrait user interface (e.g., a maximum number of photos). In FIG. 14A, computer system 1400 receives input 1450*a* on choose photos affordance 1424 and, in response, displays a user interface for selecting media items. In some embodiments, selecting choose photos affordance 424 causes computer system to display photo picker user interface 1424*a*, as illustrated in FIG. 14B. In some embodiments, selecting choose photos affordance 424 causes computer system to display photo picker user interface 1424*b*, as illustrated in FIG. 14C.

Add portrait user interface 1404*a* further includes user interface title 1414, which includes a textual indication of the name of the portrait user interface that is available to be added to a computer system. Add portrait user interface 1404*a* further includes add affordance 1416 which, when selected, causes the portrait user interface to be added to (e.g., downloaded onto) a computer system (e.g., 600 and/or 1400). Add portrait user interface 1404*a* further includes preview image 1412*a*, which includes a representation of the portrait user interface (e.g., the currently selected layout and/or media item selected for use with the portrait user interface) that can be added to a computer system (e.g., 600 and/or 1400) by selecting add affordance 1416. Add portrait user interface further includes description 1418, which includes a textual description of the portrait user interface. Add portrait user interface 1404*a* further includes more affordance 1420 which, when selected, expands description 1418 to include additional text describing the portrait user interface. Add portrait user interface 1404*a* further includes back affordance 1408 which, when selected, causes computer system 1400 to display a previously displayed user interface (e.g., the user interface that was displayed by computer system 1400 immediately before add portrait user interface 1404*a* was displayed). Add portrait user interface 1404*a* further includes time indication 1406*a*, which includes a representation of the current time. Add portrait user interface 1404 further includes share affordance 1410 which, when selected, causes computer system 1400 to display options for transmitting information related to the portrait user interface with a recipient (e.g., a recipient electronic device).

Add portrait user interface 1404*a* further includes my watch affordance 1428 which, when selected, causes computer system 1400 to display a user interface including representations of one or more watch user interfaces that are currently available on (e.g., that have been selected (and optionally configured) by a user to be included in a library of watch faces, or that have been downloaded) a computer system (e.g., a computer system that is in communication with (e.g., paired with) computer system 1400 (e.g., computer system 600)). Add portrait user interface 1404*a* further includes face gallery affordance 1430 which, when selected, causes computer system 1400 to display a user interface including representations of one or more watch user interfaces that can be selected to be downloaded and/or installed on a computer system (e.g., a computer system that is in communication with (e.g., paired with) computer system 1400 (e.g., computer system 600)). Add portrait user interface 1404*a* further includes app store affordance 1432 which, when selected, causes computer system 1400 to display an application store user interface for downloading and/or installing applications (e.g., complications) onto a computer system (e.g., a computer system that is in communication with (e.g., paired with) computer system 1400 (e.g., computer system 600)).

In FIG. 14B, in response to receiving tap input 1450*a* on choose photos affordance 1424, computer system displays photo picker user interface 1434*a*. Photo picker user interface 1434*a* is a user interface for choosing one or more photos that will be selected for use with the portrait user interface. Photo picker user interface 1434*a* includes a plurality of selectable media items that can be selected for use with the portrait user interface via a user input (e.g., a tap input). In some embodiments, the plurality of selectable media items (e.g., photos, videos, GIFs, and/or animations) includes media items based on a determination that the included media items satisfy certain criteria. For example, in some embodiments, the plurality of media items includes photos that include depth data without including media items that do not include depth data. In some embodiments, the plurality of media items includes media items with a particular shape and/or threshold degree of separation between a foreground element (e.g., a human and/or a pet) and a background element. In some embodiments, the plurality of media items includes media items that include a recognized subject (e.g., a human, a pet) without including media items that do not include a recognized subject. Photo picker user interface 1434*a* further includes album selection affordance 1440*a* which includes an indication of the currently selected album (e.g., "All Portrait") and which, when selected, causes computer system 1400 to display representations of albums (e.g., photo albums) from which media items can be selected for use with the portrait user interface.

Photo picker user interface 1434*a* further includes cancel affordance 1438 which, when selected, causes computer system 1400 to stop displaying photo picker user interface 1434*a* and display a previous user interface (e.g., add portrait user interface 1404*a*). Photo picker user interface 1434*a* further includes add affordance 1442 which, when selected, causes computer system 1400 to configure the portrait user interface for use with the media items (e.g., photos) that had been selected at the time that add affordance 1442 was selected. In some embodiments, add affordance 1442 is not selectable when one or more media items are not selected for use with the user interface based on media items that include depth data. In FIG. 14B, computer system 1400 receives input 1450*b* on album selection affordance 1440*a* and, in response, displays photo picker user interface 1434*b* as illustrated in FIG. 14C.

In FIG. 14C, computer system 1400 displays photo picker user interface 1434*b*. Photo picker user interface 1434*b* is a user interface for selecting an album (e.g., a photo album) from which to choose media items for use with the portrait user interface. In some embodiments, photo picker user interface 1434*b* includes options corresponding to the photo albums available on (e.g., locally stored on and/or accessible via cloud storage by) computer system 1400. In some embodiments, photo picker user interface 1434*b* forgoes displaying affordances for selecting photo albums available on computer system 1400 that do not contain media items that include depth data (e.g., empty photo albums and/or photo albums including only media items that do not include depth data).

Photo picker user interface 1434*b* includes several affordances for selecting albums from which media items can be selected for use with the portrait user interface. Photo picker user interface 1434*b* includes album affordance 1448*a*, which corresponds to a recommended album including media items that are recommended for use with the portrait user interface based on a determination that the media items included in the recommended album satisfy criteria (e.g., the included media items contain one or more prominent faces, the included media items include a foreground element and a background element with a threshold distance between the foreground element and the background element contained in the media items). Photo picker user interface 1434*b* further includes album affordance 1448*b*, which corresponds to an album of recent media items (e.g., media items that were recently created, media items that recently became available to computer system 1400 and/or photos taken within a threshold period of time (e.g., 7 days or 30 days)). Photo picker user interface 1434*b* further includes album affordance 1448*c*, which corresponds to photos that have been automatically identified by the device as having the same face and tagged by the user with a name (e.g., a person named "Adam"). In some embodiments, the computer system generates albums and/or album affordances containing media items that include a first person based on a determination that computer system 1400 has access to one or more media items containing the first person and/or based on a determination that computer system 1400 recognizes the face of the first person in multiple media items available to computer system 1400. Similarly, photo picker user interface 1434*b* includes 1448*d*, which corresponds to an album of media items that include a second person different from the first person (e.g., a person named "Athena"). In some embodiments, one or more media items included in the album that corresponds to album affordance 1448*c* is also included in the album that corresponds to album affordance 1448*d* (e.g., a picture of both Adam and Athena). Photo picker user interface 1434*b* further includes album affordance 1448*e*, which corresponds to an album of portrait media items (e.g., the media items that were taken in a portrait mode and/or the media items that include depth data) that are available to computer system 1400. In FIG. 14C, computer system 1400 receives input 1450*c* on album affordance 1448*b* and, in response, displays a user interface for selecting media items from the corresponding album (e.g., a "Recents" photo album).

In FIG. 14D, computer system 1400 displays photo picker user interface 1438*c*, which is a user interface for selecting media items to be used with the portrait user interface from the album (e.g., the photo album) selected in FIG. 14C (e.g., the "Recents" photo album). Photo picker user interface 1438*c* includes a plurality of media items that include depth data, including a first media item represented by preview image 1454*a*, a second media item represented by preview image 1454*b*, and a third media item represented by preview image 1454*c*. Photo picker user interface 1438*c* further includes album selection affordance 1440*b* which includes an indication of the currently selected album (e.g., "Recents") and which, when selected, causes computer system 1400 to display options for selecting photo albums from which media items can be selected for use with the portrait user interface (e.g., return to photo picker user interface 1438*b*).

In FIG. 14D, computer system 1400 receives inputs (e.g., tap inputs) corresponding to selection of three media items to be used with the user interface based on media items that include depth data. In particular, computer system 1400 receives input 1450*d* on preview image 1454*a*, input 1450*e* on preview image 1454*b*, and input 1450*f* on preview image 1454*c*.

At FIG. 14E, computer system 1400 displays photo picker user interface 1434*d*, which is an updated version of photo picker user interface 1434*d* after computer system 1400 has received inputs 1450*d*, 1450*e*, and 1450*f* corresponding to selections of preview image 1454*a*, preview image 1454*b*, and preview image 1454*c*, respectively. In photo picker user interface 1434*d*, the selected preview images 1454*a*, 1454*b*, and 1454*c* are each displayed with a visual indication (e.g., visual indication 1458*a*, visual indication 1458*b*, and visual indication 1458*c*, respectively) (e.g., a checkmark) that they are currently selected for use with the portrait user interface. At photo picker user interface 1434*d*, add affordance 1442 is also displayed without being grayed out, which indicates that it is selectable. In some embodiments, add affordance 1442 is (e.g., becomes) selectable at least partially based on a determination that one or more media items have been selected for use with the portrait user interface. Photo picker user interface 1434*d* includes selection counter 1456, which indicates the number of media items that are currently selected for use with the portrait user interface. In FIG. 14E, computer system 1400 receives input 1450*g* on add affordance 1442 and, in response, adds the selected photos (e.g., preview image 1454*a*, preview image 1454*b*, and preview image 1454*c*) for use with the portrait user interface.

In FIG. 14F, in response to receiving input 1450 on add affordance 1442, computer system 1400 displays layout editing user interface 1462*a*, which illustrates a preview of what the portrait user interface will look like once it is added to a computer system. Layout editing user interface 1462*a* includes preview user interface 1466*a*, which includes a representation of the portrait user interface with one of the media items that was selected for use with the portrait user interface in FIGS. 14D-14E, as described above. In FIG. 14F, preview user interface 1466*a* includes a media item that corresponds to preview image 1454*a*, as described above.

As illustrated in preview user interface 1466*a*, the portrait user interface includes a media item that includes background element 1466*a*1, foreground element 1466*a*2, and system text 1466*a*3. System text 1466*a*3 includes a representation of a representative time (e.g., 10:09) different from the current time 1406*a* (e.g., 2:15). In layout editing user interface 1462*a*, foreground element 1466*a*2 is displayed in a lateral position such that the top of the foreground element is displayed laterally below system text 1466*a*3. Preview user interface 1466*a* further includes layout indicator 1468*a*, which includes an indication of the layer arrangement of system text 1466*a*3 relative to foreground element 1466*a*2 (e.g., "Behind"), as well as to the position of system text 1466*a*3 within preview user interface 1466*a* (e.g., the lateral position of system text 1466*a*3) (e.g., "Top"). In layout editing user interface 1462*a*, layout indicator 1468*a* indicates that system text 1466*a*3 is currently configured to be displayed in a "Top Behind" layout, which corresponds to displaying system text 1466*a*3 in an upper portion of preview user interface 1466*a*, and in a layer arrangement that is behind foreground element 1466*a*2 (e.g., layered behind the foreground element and/or overlaid by the foreground element).

At layout editing user interface 1462*a*, the layout of the watch user interface based on a media that includes depth data can be edited via user inputs received at computer system 1400. For example, the position of the media item can be panned or zoomed, and the layer arrangement of system text 1466*a*3 relative to foreground element 1466*a*2 can be updated. In particular, layout editing user interface 1462*a* includes affordance for changing the layer arrangement of system text 1466*a*3 relative to foreground element 1466*a*2. Layout editing user interface 1462*a* includes top behind affordance 1470*a* which, when selected, causes system text 1466*a*3 to be displayed in an upper portion of preview user interface 1466*a* and in a layer arrangement that is behind foreground element 1466*a*2. Layout editing user interface 1462*a* further includes top front affordance 1470*b* which, when selected, causes system text 1466*a*3 to be displayed in an upper portion of the preview user interface 1466*a* and in a layer arrangement that is in front of (e.g., layered on top of and/or at least partially overlaying) foreground element 1466*a*2. Layout editing user interface 1462*a* includes bottom behind affordance 1470*c* which, when selected, causes system text 1466*a*3 to be displayed in a lower portion of preview user interface 1466*a* and in a layer arrangement that is in front of (e.g., layered on top of and/or at least partially overlaying) foreground element 1466*a*2. Layout editing user interface 1462*a* further includes bottom front affordance 1470*d* which, when selected, causes the system text (e.g., system text 1466*a*3) to be displayed in a lower portion of the preview user interface 1466*a* and in a layer arrangement that is in behind foreground element 1466*a*2.

Layout editing user interface 1462*a* further includes cancel affordance 1472 which, when selected, causes computer system 1400 to cancel the process for configuring and/or editing the portrait user interface (e.g., and return to displaying add portrait user interface 1404*a*). Layout editing user interface 1462*a* further includes trash affordance 1474 which, when selected, causes computer system 1400 to discard one or more of the edits that a user has made to the layout of the portrait user interface. Layout editing user interface 1462*a* further includes done affordance 1476 which, when selected, causes computer system to complete and/or move forward with the portrait user interface with any edits as illustrated in preview user interface 1466*a*. In some embodiments, done affordance 1474 is not selectable if the currently selected layout for the portrait user interface meets certain criteria (e.g., if the currently selected layout would cause the system text to be obscured by at least a threshold amount). In some embodiments, done affordance 1474 is grayed out when it is non-selectable to indicate that is cannot be selected.

In FIG. 14G, computer system 1400 receives input 1450*h*1 on preview user interface 1466*b*. FIGS. 14G-14H illustrate a process by which a user can pan the portion of the media item that will be displayed in the portrait user interface by directly manipulating portion of the media item that is displayed within preview user interface 1466*b* via a touch input (e.g., via a touch and drag input). Layout user editing user interface 1462*b* includes preview user interface 1466*b*, which is based on a media item that includes background element 1466*b*1, foreground element 1466*b*2, and system text 1466*b*3. In response to detecting input 1450*h*1, at FIG. 14G, computer system 1400 displays guide line 1478, which indicates a position below which foreground element 1466*b*2 should be positioned to avoid obscuring system text 1466*b*3 by at least a threshold amount. Thus, guide line 1478 assists a user in positioning the media item so that it does not block too much of system text 1466*b*3 (which would make the system text less readable). Layout editing user interface 1462*b* further includes instruction 1480*a*, which includes an indicator to the user about where to position an aspect of the portrait user interface (e.g., an element of the media item). In particular, instruction 1480*a* indicates that the user should position foreground element 1466*b*2 below the line (e.g., guide line 1478) to provide further clarity to the user about where to drag the media item within the portrait user interface to configure the portrait user interface without blocking too much of system text 1466*b*3. In some embodiments, computer system 600 provides haptic feedback when foreground element 1446*b*2 reaches guide line 1478, when foreground element 1446*b*2 moves over (e.g., above) guide line 1478, and/or when foreground element 1446*b*2 moves from being over guide line 1478 to below guide line 1478.

Notably, input 1450*h*1 represents an initial location at which a touch input is displayed on preview user interface 1466*b*. In response to dragging the input to a second location (e.g., as illustrated by input 1450*h*2 in FIG. 14H below), computer system updates the position of the media item within preview user interface 1466*b* by an amount based on the difference between the initial input location on display 1402 and the end location on display 1402 of the input (e.g., the distance between input 1450*h*1 and input 1450*h*2). In some embodiments, the position of the media item is directly manipulated, such that moving the input by a particular distance on the display (e.g., 0.05 inches, 0.1 inches, and/or 0.5 inches) on display 1402 causes the media item to move within preview user interface 1466*c* by a corresponding amount. In some embodiments, the media item is directly manipulated up until the point when a boundary of the media item (a corner, an edge) is aligned with a boundary of preview user interface 1466*c*, at which point the media item is not moved further in response to additional movement of the user input beyond the boundary of the media item.

In some embodiments, instruction 1480*a* is displayed and/or updated after the user input has been received (e.g., when the touch input corresponding to input 1450*h*1 has been lifted off of display 1402). In some embodiments, displaying instruction 1480*a* after the input has been received as opposed to displaying and/or updating the instruction while the input is being received reduces improves battery life by reducing the processing power required to display and/or update instruction 1480*a*.

In FIG. 14H, user input 1450*h*1 has moved to (e.g., been dragged across display 1402 to) the location indicated by input 1450*h*2 (e.g., a drag input from the first location to the second location). In response to receiving the drag input, preview user interface 1466*c* includes the media item displayed with an updated location. Layout user editing user interface 1462*c* includes preview user interface 1466*c*, which is based on a media item that includes background element 1466*c*1, foreground element 1466*c*2, and system text 1466*c*3. In preview user interface 1466*c*, foreground element 1466*c*2 has crossed guide line 1478, and is obscuring system text 1466*c*3 beyond a threshold amount, thereby reducing the readability of system text 1466*c*3. In addition, in contrast to layout user interface 1462*b*, which included instruction 1480*a*, layout user interface 1462*c* has been updated to include instruction 1480*b*, which includes in indication that system text 1466*c*3 (which includes representative time 10:09) is being obscured (e.g., blocked by foreground element 1466*c*2).

At FIG. 14I, after receiving input 1450*h*2, computer system 1400 displays layout editing user interface 1462*d*, which includes foreground element 1466*d*2 being displayed at an updated location that obscures system text 1466*d*3. Layout user editing user interface 1462*d* includes preview user interface 1466*d*, which is based on a media item that includes background element 1466*d*1, foreground element 1466*d*2, and system text 1466*d*3. Notably, done affordance 1476 is displayed as grayed out, indicating that it is not selectable. In some embodiments, done affordance 1476 is grayed out in accordance with a determination that at least a threshold amount of system text 1466*d*3 is being obscured by foreground element 1466*d*2. At FIG. 14I, computer system 1400 receives input 1450*i* (e.g., a tap input) on top front affordance 1470*b*.

At FIG. 14J, in response to receiving input 1450*i* on top front affordance 1470*b* as illustrated in FIG. 14I, computer system 1400 updates system text 1466*e*3 to be displayed in an upper portion of preview user interface 1466*e* and in a layer arrangement that is in front of (e.g., layered on top of and/or at least partially overlaying) foreground element 1466*e*2. Layout user editing user interface 1462*e* includes preview user interface 1466*e*, which is based on a media item that includes background element 1466*e*1, foreground element 1466*e*2, and system text 1466*e*3. In FIG. 14J, computer system 1400 displays layout editing user interface 1462*e* where, in contrast to FIG. 14I, system text 1466*e*3 is displayed on top of (e.g., layered over) the foreground element 1466*e*2 instead of behind foreground element 1466*e*2. Layout editing user interface 1462*e* further includes layout indicator 1468*b*, which indicates the updated layout selection for the portrait user interface (e.g., "Top Front"). Further, layout editing user interface 1462*e* includes 1480*c*, which provides a visual indication that a face in the media item is being obscured based on a determination that the face of the boy illustrated by foreground element **1466*e*2 is being obscured by system text 1466*e*3. In FIG. 14J, computer system 1400 receives input 1450*j* on bottom front affordance 1470*c***.

In FIG. 14K, in response to receiving input **1450*j* on bottom front affordance 1470*c*, computer system displays layout editing user interface 1462*f*, which includes preview user interface 1466*f* displayed with an updated layout. Layout user editing user interface 1462*f* includes preview user interface 1466*f*, which is based on a media item that includes background element 1466*f*1, foreground element 1466*f*2, and system text 1466*f*3. In preview user interface 1466*f*, in response to bottom front affordance 1470*c* being selected, system text 1466*f*3 has been updated to be displayed in a lower portion of preview user interface 1466*f*, and in a layer arrangement that is in front of the foreground element (e.g., 1466*f*2**).

Layout editing user interface **1462*f* includes layout indicator 1468*c*, which indicates the updated layout (e.g., as opposed to layout indicator 1468*b* included in FIG. 14J) ("Bottom Front"). Further, layout editing user interface 1462*f* does not include an instruction (e.g., instruction 1480*c*, as illustrated in FIG. 14J). In some embodiments, displaying the layout editing user interface without an instruction (e.g., 1480*b* or 1480*c***) indicates that the currently selected layout for portrait user interface meets certain criteria (e.g., the current layout does not cause system text to be obscure beyond a threshold amount).

In FIG. 14L, computer system 1400 displays layout editing user interface **1462*g*, which significantly corresponds to layout editing user interface 1462*f*. Layout user interface 1462*g* includes preview user interface 1466, which corresponds to the updated layout for displaying the portrait user interface, including a media item that includes background element 1466*g*1 and foreground element 1466*g*2. Layout user editing user interface 1462*g* includes preview user interface 1466*g*, which is based on a media item that includes background element 1466*g*1, foreground element 1466*g*2, and system text 1466*g*3. Preview user interface 1466*g* further includes system text 1466*g*3, which is displayed in a lower portion of preview user interface 1466*g* and in front of foreground element 1466*g*2 (e.g., in a "Bottom Front" arrangement, corresponding to layout indicator 1468*c*). At FIG. 14L, computer system 1400 receives input 1460 (e.g., a pinch input) on preview user interface 1466*g***.

At FIG. 14M, in response to receiving input 1460, the media item included in preview user interface **1466*h* is zoomed in (e.g., displayed at a second zoom level different from the zoom level that the media item is displayed with in FIG. 14L). Layout user editing user interface 1462*h* includes preview user interface 1466*h*, which is based on a media item that includes background element 1466*h*1, foreground element 1466*h*2, and system text 1466*h*3. In some embodiments, the difference in the zoom level between the zoom level the media item is displayed with in preview user interface 1466*g* and the zoom level that the media item is displayed with in preview user interface 1466*h* is at least partially based on the length and/or magnitude of input 1460. Notably, zooming in the media item includes zooming the elements of the media item (e.g., foreground element 1466*h*2 and background element 1466*h*1) without zooming in on additional features included in the preview user interface 1466*h*, such as system text 1466*h*3. In other words, the zoom level of system text 1466*h*3 is maintained while the zoom level of the media item included in the portrait user interface is edited. At FIG. 14M, computer system 1400 detects input 1450*k* (e.g., a tap input) on done affordance 1476**.

At FIG. 14N, in response to receiving input **1450*k* on done affordance 1476 in FIG. 14M, computer system 1400 displays add portrait user interface 1404*b*. Add portrait user interface 1404*b* is an updated version of add portrait user interface 1404*a*, where preview image 1412*b* has been updated to include a selected media item and layout for the portrait user interface selected in FIGS. 14B-14M, as discussed above. Preview image 1412*b* represents a portrait user interface that includes a background element, foreground element, and system text, wherein the system text indicates a representative time different from the current time 1406*a*. In particular, preview image 1412*b* corresponds to the media item and/or layout selected for the portrait user interface represented by preview user interface 1466*h*, which was displayed when done affordance 1476** was selected.

In FIG. 14N, computer system is in communication with (e.g., paired with or signed into the same user account as) computer system 600. In FIG. 14N, computer system 600 displays, via display 602, watch user interface **1494*a*, which is a watch interface that is not based on a media item that includes depth data. In FIG. 14N, computer system 1400 detects input 1450*l* on add affordance 1416, which corresponds to a request to add the portrait user interface to computer system 600**.

In FIG. 14O, in response to receiving input **1450*l* on add affordance 1416, computer system 1400 transmits information corresponding to the portrait user interface to computer system 600. In some embodiments, computer system 1400 transmits, to computer system 600, a request to display the portrait user interface, and in response to receiving the input, computer system 600 displays, via display 602, watch user interface 1494*b*, wherein displaying watch user interface 1494*b* includes concurrently displaying: a media item that includes background element 1494*b*1, foreground element 1494*b*2 that is segmented from the background element based on depth information, and system text 1494*b*3. Notably, the media item included in watch user interface 1494*b* and the layout of watch user interface 1494*b* correspond to the media item and layout selected at computer system 1400 (e.g., as described above with reference to FIGS. 14B-14M). Portrait user interface 1494*b* includes system text 1494*b*3 that indicates the current time (e.g., 2:15) as opposed to the representative time indicated by system text 1412*b*3**.

In FIG. 14P, after displaying watch user interface **1494*b*, computer system 600 displays watch user interface 1494*c*, which is an updated version of watch user interface 1494*b* that is based on a different media item than watch user interface 1494*b*. Watch user interface 1494*c* is based on a different media item than watch user interface 1494*c*, and is based on a different media item that was previously selected for use with the portrait user interface at computer system 1400 (e.g., as illustrated in FIGS. 14D-14E, above). In some embodiments, the media item that is included in the portrait user interface is updated (e.g., changed) in response to an input received at computer system 600 (e.g., a tap input). In some embodiments, the media item that is included in the portrait user interface (e.g., 1494*c*) is updated in response to the passage of time (e.g., from 2:15 as indicated by system text 1494*b*3 to 3:12 as indicated by system text 1494*c*3**).

Like watch user interface **1494*b*, watch user interface 1494*c* includes a media item that includes background element 1494*c*1, foreground element 1494*c*2, and system text 1494*c*3. These elements are different from those displayed in watch user interface 1494***b*. Background element 1494*c*1 and foreground element 1494*c*2 are selected from a different media item than was used in watch user interface 1494*b*, and system text 1494*c*3 is updated to reflect an updated current time (e.g., 3:12), but the overall layout of watch user interface 1494*b* and 1494*c* are the same. For example, system text 1494*c*3 is displayed in a "Bottom Front" layout (in a lower portion of watch user interface 1494*c*) and in a layer arrangement in front of foreground element 1494*c*2 just as was the case in watch user interface 1494*b*. Thus, in transitioning from displaying watch user interface 1494*b* to displaying watch user interface 1494*c*, computer system 600 maintains display of the same portrait user interface layout, applies the layout to an updated media time, and updates the watch user interface based on a change in conditions of computer system 600 (e.g., a change in the current time). Meanwhile, computer system 1400 maintains display of the same user interface as described above with reference to FIG. 14O, only updating the current time (e.g., 3:12 as illustrated by current time 1406*b*). Thus, the changes to the portrait user interface illustrated at computer system 600 occur independently of computer system 1400.

FIG. 14Q illustrates computer system 1400 displaying layout editing user interface 1482*a*, which illustrates an initial layout editing screen for editing the layout of a portrait user interface based on a media item with more than one subject (e.g., two or more foreground objects and/or two or more faces). Layout editing user interface 1482*a* includes preview user interface 1484*a*, which is based on a media item that includes depth data with background element 1484*a*1, first foreground element 1484*a*2, second foreground element 1482*a*3, and system text 1482*a*4. In some embodiments, computer system 1400 initially displays layout editing user interface 1482*a* with both foreground element 1482*a*2 and foreground element 1482*a*3 framed within preview user interface 1484*a*. In some embodiments, computer system initially displays layout editing user interface 1482*a* with a media item containing multiple foreground objects with a pan and/or zoom configuration selected such that the one or more foreground objects included in the media item will be framed in preview user interface 1484*a*. As discussed above with reference to FIGS. 14F-14M, a user can edit the layer arrangement of system text 1484*a*4 relative to foreground objects 1482*a*2 and 1482*a*3, pan across the media item to edit the portion of the media item displayed within preview user interface 1484*a*, or change the zoom level that the media item is displayed with via user inputs. In FIG. 14Q, computer system 1400 receives drag input 1485 on preview user interface 1484*a*.

In FIG. 14R, in response to receiving drag input 1485 in FIG. 14Q, computer system 1400 displays layout editing user interface 1482*b*, which is an updated version of layout editing user interface 1482*a* wherein the position of the media item contained within preview user interface 1484*b* has been edited in response to drag input 1485. Thus, in FIG. 14R, the position of the media item is edited such that foreground element 1484*b*2 is framed in preview user interface 1484*b*, but foreground element 1484*b*3 is outside of the portion of the media item that is included in preview user interface 1484*b*. Meanwhile, the layer arrangement of the elements of the media item (background element 1484*b*1, foreground element 1484*b*2, foreground element 1484*b*3, and system text 1484*b*4) remains the same.

Figure 15:
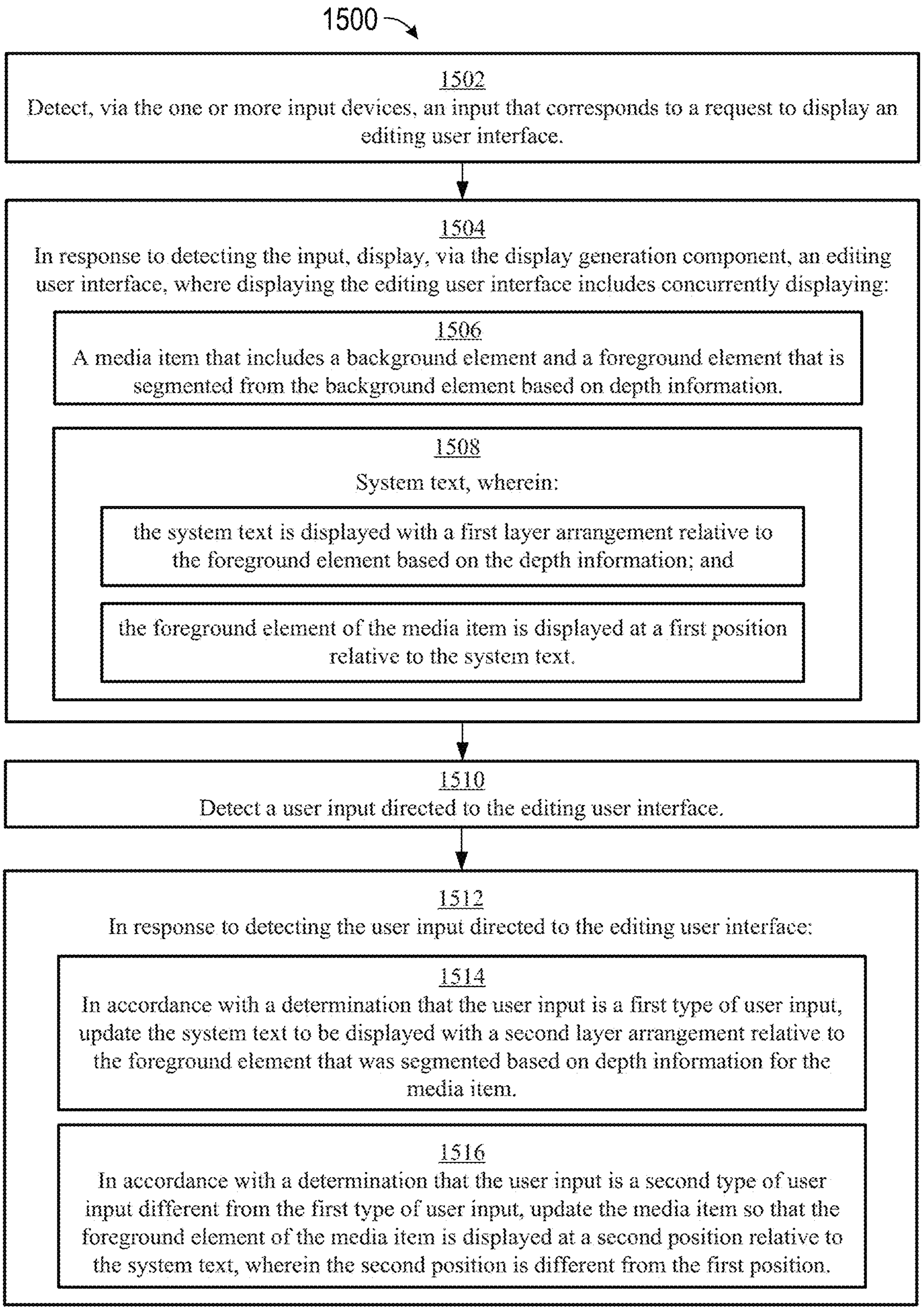
FIG. 15 is a flow diagram illustrating a method related to editing user interfaces based on depth data of a previously captured media item.

FIG. 15 is a flow diagram illustrating a method for editing user interfaces based on depth data of a previously captured media item using a computer system in accordance with some embodiments. Method 1500 is performed at a computer system (e.g., 100, 300, 500, a smartphone, a smartwatch, a wearable electronic device, a desktop computer, a laptop, and/or a tablet) that is in communication with a display generation component and one or more input devices (e.g., a display controller and/or a touch-sensitive display system). Some operations in method 1500 are, optionally, combined, the orders of some operations are, optionally, changed, and some operations are, optionally, omitted.

As described below, method 1500 provides an intuitive way for editing user interfaces based on depth data of a previously captured media item. The method reduces the cognitive burden on a user for editing user interfaces based on depth data of a previously captured media item, thereby creating a more efficient human-machine interface. For battery-operated computing devices, enabling a user to configure user interfaces based on depth data of a previously captured media item faster and more efficiently conserves power and increases the time between battery charges.

In some embodiments, method 1500 is used to edit a user interface that carries out (e.g., is configured to carry out) and/or that embodies method 700 (e.g., FIG. 7) and/or is a watch user interface as described in FIGS. 6A-6U.

In some embodiments, the computer system (e.g., 1400) detects (1502), via the one or more input devices, an input that corresponds to a request to display an editing user interface (e.g., a tap gesture, a long press gesture, or the like). In response to detecting the input, the computer system displays (1504), via the display generation component, an editing user interface (e.g., 1462*a*) (e.g., a cropping user interface, a user interface for configuring a watch face). In some embodiments, displaying the editing user interface includes concurrently displaying a media item (e.g., a photo, a video, a GIF, and/or an animation) and system text (e.g., 1466*a*3) (e.g., a first time and/or a current date). In some embodiments, the computer system displays (1506) a media item (e.g., a photo, a video, a GIF, and/or an animation) that includes a background element (e.g., 1466*a*1) and a foreground element (e.g., 1466*a*2) that is segmented from the background element based on depth information. In some embodiments, the media item includes depth data (e.g., data that can be used to segment a foreground element from one or more background elements such as data indicating that the foreground element was less than a threshold distance away from one or more cameras when the media was captured and a background element was more than the threshold distance away from the one or more cameras when the media was captured or a data set related to the distance between two objects in the media, a data set including the relative distances between a camera sensor and at least a first and second object that were in the field of view of the camera sensor at the time the media was captured and/or a plurality of layers). In some embodiments, the background element and the foreground element are selected (in some embodiments, automatically) based on the depth data (e.g., in accordance with a determination that the background element is positioned behind the foreground element). In some embodiments, the depth data is determined based on sensor information (e.g., image sensor information and/or depth sensor information) collected when the media item was captured.

The computer system displays (1508) system text (e.g., 1466*a*3) wherein, the system text is displayed with a first layer arrangement (e.g., position) relative to the foreground element (e.g., 1466*a*2) based on the depth information (e.g., in front of (e.g., at least partially visually overlaying) the foreground element, behind (e.g., at least partially visually overlaid by) the foreground element), and the foreground element of the media item is displayed at a first position relative to the system text (e.g., the media item is cropped to display a first portion of the media item without displaying a second portion of the media item). In some embodiments, the system text has content that is static (e.g., a fixed time that is not based on a current time). In some embodiments, the system text has content that is dynamically selected based on a context of the computer system.

The computer system (e.g., 1400) detects (1510) a user input (e.g., 1450*i*) (e.g., a tap input, a swipe input, a long press input, and/or a mouse click) directed to the editing user interface (e.g., 1462*d*). In response to detecting (1512) the user input directed to the editing user interface and in accordance with a determination that the user input is a first type of user input (e.g., an input that corresponds to a user-interactive graphical user interface object for updating the layer arrangement of the system text relative to the foreground element), the computer system updates (1514) the system text (e.g., 1466*d*3) to be displayed with a second layer arrangement relative to the foreground element that was segmented based on depth information for the media item. In some embodiments, the computer system updates the system text to be displayed with a second layer arrangement relative to the foreground element that was segmented based on the depth information without changing the lateral position of the foreground element of the media item relative to the system text. In some embodiments, the second layer arrangement relative to the foreground element is different from the first layer arrangement relative to the foreground element.

In response to detecting (1512) the user input (e.g., 1450*h*1) directed to the editing user interface (e.g., 1462*b*) and in accordance with a determination that the user input is a second type of user input different from the first type of user input (e.g., in response to detecting the user input corresponding to a request to change a crop selection of the media item), the computer system (e.g., 1400) updates (1516) the media item so that the foreground element (e.g., 1466*b*2) of the media item is displayed at a second position relative to the system text, wherein the second position is different from the first position. In some embodiments, the computer system updates the media item so that the foreground element of the media item is displayed at a second position relative to the system text without changing the layer arrangement (e.g., the layer order) of the system text relative to the foreground element. In some embodiments, the second crop selection is different from the first crop selection. In some embodiments, updating the media item to be displayed with the second crop selection includes displaying a portion of the media item that was not displayed when the media item was displayed with the first crop selection. In some embodiments, updating the media item to be displayed with the second crop selection include foregoing displaying a portion of the media item that was displayed when the media item was displayed with the first crop selection. Conditionally updating the system text to be displayed with a second layer arrangement relative to the foreground element that was segmented based on depth information for the media item or updating the media item so that the foreground element of the media item is displayed at a second position relative to the system text, wherein the second position is different from the first position in accordance with a determination about whether the user input is a first type or user input or a second type of user input reduces the number of inputs needed to edit the configuration of the system text and/or the media item which, additionally, reduces power usage and improves battery life of the device by enabling the user to use the system more (e.g., customize and edit media items and system text) quickly and efficiently. Reducing the number of inputs needed to perform an operation enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, after detecting the user input (e.g., 1450*i*) directed to the editing user interface (e.g., 1462*d*), the computer system (e.g., 1400) detects a second user input (e.g., 1450*j*) directed to the editing user interface (e.g., 1462*e*). In some embodiments, in response to detecting the second user input directed to the editing user interface and in accordance with a determination that the second user input is the first type of user input (e.g., an input that corresponds to the user-interactive graphical user interface object for updating the layer arrangement of the system text relative to the foreground element), the computer system updates the system text (e.g., 1466*e*3) to be displayed with a third layer arrangement relative to the foreground element (e.g., 1466*e*2) that was segmented based on depth information for the media item. In some embodiments, the computer system updates the system text to be displayed with the third layer arrangement relative to the foreground element without changing the lateral position of the foreground element of the media item relative to the system text. In some embodiments, the third layer arrangement is different from the second layer arrangement. In some embodiments, in response to detecting the second user input directed to the editing user interface and in accordance with a determination that the second user input is the second type of user input different from the first type of user input (e.g., in response to detecting the user input corresponding to a request to change a crop selection of the media item), the computer system updates the media item so that the foreground element of the media item is displayed at a third position relative to the system text, wherein the third position is different from the first position and the second position. In some embodiments, the computer system updates the media item so that the foreground element of the media item is displayed at the third position relative to the system text without changing the layer arrangement (e.g., the layer order) of the system text relative to the foreground element. Editing a first aspect in response to the first user input and a second, different aspect (e.g., the layer arrangement of the system text and/or the position of the foreground element) in response to the second user input reduces the number of inputs needed to edit different aspects of the system text and/or the media item which, additionally, reduces power usage and improves battery life of the device by enabling the user to use the system more quickly and efficiently.

In some embodiments, the editing user interface (e.g., 1462*a*) includes a set of one or more user-interactive graphical user interface objects (e.g., affordances) (e.g., 1470*a*, 1470*b*, 1470*c*, and/or 1470*d*) that, when selected, cause the computer system to update a layer arrangement of the system text (e.g., 1466*a*3) relative to the foreground element (e.g., 1466*a*2). Displaying options for updating the layering arrangement of the system text relative to the media item reduces the number of inputs needed to configure the system text which, additionally, reduces power usage and improves battery life of the device by enabling the user to use the system more quickly and efficiently.

In some embodiments, the set of one or more user-interactive graphical user interface objects (e.g., 1470*a*, 1470*b*, 1470*c*, and/or 1470*d*) includes a first user-interactive graphical user interface object (e.g., 1470*a*) that, when selected, causes the computer system (e.g., 1400) to display the system text (e.g., 1466*a*3) in an upper portion of the media item and behind (e.g., at least partially visually overlaid by) the foreground element (e.g., 1466*a*2) of the media item. In some embodiments, the computer system detects a user input that corresponds to selection (e.g., a tap gesture, a swipe, a press input, and/or a mouse click) of the first user-interactive graphical user interface object. In response to detecting the user input that corresponds to selection of the first user-interactive graphical user interface object, the computer system updates the system text to be displayed in an upper portion of the media item and/or behind the foreground element of the media item (and, optionally in front of one or more background elements of the media item). Displaying the system text in an upper portion of the media item and behind the foreground element of the media item in response to detecting a user input that corresponds to selection of the first user-interactive graphical user interface object reduces the number of inputs needed to configure the system text which, additionally, reduces power usage and improves battery life of the device by enabling the user to use the system more quickly and efficiently.

In some embodiments, the set of one or more user-interactive graphical user interface objects (e.g., 1470*a*, 1470*b*, 1470*c*, and/or 1470*d*) includes a second user-interactive graphical user interface object (e.g., 1470*b*) that, when selected, causes the computer system (e.g., 1400) to display the system text (e.g., 1466*a*3) in an upper portion of the media item and in front of (e.g., at least partially overlaying) the foreground element (e.g., 1466*a*2) of the media item. In some embodiments, the computer system detects a user input (e.g., 1450*i*) that corresponds to selection (e.g., a tap gesture, a swipe, a press input, and/or a mouse click) of the second user-interactive graphical user interface object. In response to detecting the user input that corresponds to selection of the second user-interactive graphical user interface object, the computer system updates the system text to be displayed in an upper portion of the media item and/or in front of the foreground element of the media item. Displaying the system text in an upper portion of the media item and in front of the foreground element of the media item in response to detecting a user input that corresponds to selection of the second user-interactive graphical user interface object reduces the number of inputs needed to configure the system text which, additionally, reduces power usage and improves battery life of the device by enabling the user to use the system more quickly and efficiently.

In some embodiments, the set of one or more user-interactive graphical user interface objects (e.g., 1470*a*, 1470*b*, 1470*c*, and/or 1470*d*) includes a third user-interactive graphical user interface object (e.g., 1470*d*) that, when selected, causes the computer system to display the system text (e.g., 1466*a*3) in a lower portion of the media item and behind (e.g., at least overlaid by) the foreground element (e.g., 1466*a*2) of the media item. In some embodiments, the computer system (e.g., 1400) detects a user input that corresponds to selection (e.g., a tap gesture, a swipe, a press input, and/or a mouse click) of the third user-interactive graphical user interface object. In response to detecting the user input that corresponds to selection of the third user-interactive graphical user interface object, the computer system updates the system text to be displayed in a lower portion of the media item and/or behind the foreground element of the media item (and, optionally in front of one or more background elements of the media item). Displaying the system text in a lower portion of the media item and behind the foreground element of the media item in response to detecting a user input that corresponds to selection of the third user-interactive graphical user interface object reduces the number of inputs needed to configure the system text which, additionally, reduces power usage and improves battery life of the device by enabling the user to use the system more quickly and efficiently.

In some embodiments, the set of one or more user-interactive graphical user interface objects (e.g., 1470*a*, 1470*b*, 1470*c*, and/or 1470*d*) includes a fourth user-interactive graphical user interface object (e.g., 1470*c*) that, when selected, causes the computer system (e.g., 1400) to display the system text (e.g., 1466*a*3) in a lower portion of the media item and in front of (e.g., at least partially overlaying) the foreground element (e.g., 1466*a*2) of the media item. In some embodiments, the computer system detects a user input (e.g., 1450*j*) that corresponds to selection (e.g., a tap gesture, a swipe, a press input, and/or a mouse click) of the fourth user-interactive graphical user interface object. In response to detecting the user input that corresponds to selection of the fourth user-interactive graphical user interface object, the computer system updates the system text to be displayed in a lower portion of the media item and/or in front of the foreground element of the media item. Displaying the system text in a lower portion of the media item and in front of the foreground element of the media item in response to detecting a user input that corresponds to selection of the fourth user-interactive graphical user interface object reduces the number of inputs needed to configure the system text which, additionally, reduces power usage and improves battery life of the device by enabling the user to use the system more quickly and efficiently.

In some embodiments, while displaying the editing user interface (e.g., 1462*c*), and wherein a first portion of the media item is included (e.g., displayed) in the editing user interface, the computer system (e.g., 1400) detects a third user input (e.g., a tap input, a swipe input, a long press input, and/or a mouse click) (e.g., 1450*h*2) directed to the editing user interface. In response to detecting the third user input directed to the editing user interface, the computer system pans and/or zooms the media item (e.g., scrolling the media item such that an updated portion of the media item included in the editing user interface, zooming in on the media item such that a smaller portion of the media item is included in the editing user interface, zooming out on the media item such that a larger portion of the media item is included in the editing user interface). In some embodiments, panning and/or zooming the media item includes causing a second portion of the media item different from the first portion of the media item to be included in the editing user interface. Panning and/or zooming the media item in response to detecting a user input directed to the editing user interface reduces the number of inputs needed to pan and/or zoom the media item which, additionally, reduces power usage and improves battery life of the device by enabling the user to use the system more quickly and efficiently. In addition, panning and/or scrolling the media item in response to detecting the user input provides visual feedback about which portion of the media item is selected to be displayed in a watch user interface. Providing improved visual feedback enhances the operability of the device and makes the user-device interface more efficient (e.g., by helping the user to know which of the selectable objects being displayed has selection focus to reduce the number of user inputs and prevent the user from mistakenly selecting an incorrect selectable object) which, additionally, reduces power usage and improves battery life of the device by enabling the user to use the device more quickly and efficiently.

In some embodiments, while detecting the third user input and in accordance with a determination that a fourth layer arrangement of the system text (e.g., 1466*c*3) relative to the foreground element (e.g., 1466*c*2) and a fourth position of the foreground element relative to the system text satisfy (e.g., in combination, collectively) a first set of criteria (e.g., the system text is being obscured by at least a threshold amount and/or the position of the foreground element is off-center by at least a threshold amount), the computer system (e.g., 1400) displays, via the display generation component (e.g., 1402), an indicator (e.g., 1480*b*) (e.g., a suggestion to edit the position of the second layer arrangement of the system text relative to the system text, a suggestion to edit the position of the foreground element relative to the system text, and/or a guide line). In some embodiments, while detecting the third user input and in accordance with a determination that the fourth layer arrangement of the system text relative to the foreground element and the fourth position of the foreground element relative to the system text do not satisfy the first set of criteria (e.g., the system text is not being obscured by less than a threshold amount and/or the position of the foreground is off-center by less than a threshold amount), the computer system foregoes displaying the indicator. Conditionally displaying an indicator when the layer arrangement of the system text relative to the foreground element and the position of the foreground element relative to the system text satisfy a set of criteria provides visual feedback about whether the criteria have been satisfied (e.g., whether the system text is being obscured by at least a threshold amount and/or whether the position of the foreground element is off-center by at least a threshold amount).

In some embodiments, the determination that the fourth layer arrangement of the system text (e.g., 1466*c*3) relative to the foreground element (e.g., 1466*c*2) and the fourth position of the foreground element relative to the system text satisfy (e.g., in combination, collectively) the first set of criteria is at least partially based on a position at which the system text is displayed (e.g., a position in the editing user interface). In some embodiments, the first set of criteria includes a determination that the system text is displayed above or below a threshold boundary. Conditionally displaying an indicator when the layer arrangement of the system text relative to the foreground element and the position of the foreground element relative to the system text satisfy a set of criteria, wherein the determination is at least partially based on a position at which the system text is displayed, provides visual feedback based on the position at which the system text is displayed.

In some embodiments, the determination that the fourth layer arrangement of the system text (e.g., 1466*c*3) relative to the foreground element (e.g., 1466*c*2) and the fourth position of the foreground element relative to the system text satisfy (e.g., in combination, collectively) the first set of criteria is at least partially based on a fourth position at which the foreground element is displayed (e.g., a position in the editing user interface). In some embodiments, the first set of criteria includes a determination that the foreground element is displayed above or below a threshold boundary. Conditionally displaying an indicator when the layer arrangement of the system text relative to the foreground element and the position of the foreground element relative to the system text satisfy a set of criteria, wherein the determination is at least partially based on a second position at which the foreground element is displayed, provides visual feedback based on the position at which the foreground element is displayed.

In some embodiments, the determination that the fourth layer arrangement of the system text (e.g., 1466*c*3) relative to the foreground element (e.g., 1466*c*2) and the fourth position of the foreground element relative to the system text satisfy (e.g., in combination, collectively) the first set of criteria includes a determination that the system text is being obscured (e.g., overlaid, blocked) by the foreground element by at least a threshold amount (e.g., based on the system text being displayed behind the foreground element of the media item (and, optionally in front of one or more background elements of the media item)). Conditionally displaying an indicator when the layer arrangement of the system text relative to the foreground element and the position of the foreground element relative to the system text satisfy a set of criteria, wherein the determination is at least partially based on a second position at which the foreground element is displayed, provides visual feedback about whether the system text is being obscured by the foreground element by at least the threshold amount.

In some embodiments, the editing user interface (e.g., 1462*h*) includes a done user-interactive graphical user interface object (e.g., 1476). In some embodiments, the computer system (e.g., 1400) detects a user input (e.g., 1450*k*) (e.g., a tap input and/or a mouse click) on the done user-interactive graphical user interface object. In response to detecting the user input on the done user-interactive graphical user interface object and in accordance with a determination that the system text is being obscured (e.g., overlaid and/or blocked) by the foreground element by less than the threshold amount, the computer system ceases to display the editing user interface (e.g., displaying a user interface that is different from the editing user interface). In some embodiments, in response to detecting the user input on the done user-interactive graphical user interface object and in accordance with the determination that the system text is being obscured (e.g., overlaid and/or blocked) by the foreground element by at least the threshold amount, the computer system maintains display of the editing user interface. In some embodiments, the done user-interactive graphical user interface object is not selectable when the system text is being obscured by the foreground element by at least the threshold amount. In some embodiments, when system text is being obscured by the foreground element by at least the threshold amount, the done user-interactive graphical user interface object includes a visual indication that it is not selectable (e.g., a gray color and/or a shadow visual effect). In some embodiments, selecting the done user-interactive graphical user interface object when less than the threshold amount of the system text is being obscured by the foreground element causes the computer system to display a watch face selection user interface or a watch face gallery user interface. Conditionally maintaining display of the editing user interface or foregoing display of the editing user interface (e.g., by displaying a different user interface) in response to detecting an input on the done user-interactive graphical user interface object provides visual feedback about whether additional edits are needed in order to proceed to the be finished with configuring the system text and/or the media item (e.g., to cause a subsequent user interface to be displayed).

In some embodiments, the indicator includes a textual indication (e.g., 1480*a*) corresponding to the editing user interface. In some embodiments, the textual indication includes a suggestion to edit the position of the foreground element. In some embodiments, the textual indication includes a suggestion to edit the position of the system text. In some embodiments, the textual indication includes a suggestion to update a layer arrangement of the system text relative to the foreground element. In some embodiments, the textual indication indicates that the system text is being obscured by at least a threshold amount. Conditionally displaying an indicator that includes a textual indication corresponding to the editing user interface when the layer arrangement of the system text relative to the foreground element and the position of the foreground element relative to the system text satisfy a set of criteria provides visual feedback related to configuring the media item and/or the system text (e.g., the reason why the indicator is displayed).

In some embodiments, the indicator includes a graphical indication (e.g., 1478) of a boundary position. In some embodiments, the graphical indication of the boundary position includes an axis (e.g., a line) below which the foreground element must remain in order for the foreground element to not obscure the system text by at least the threshold amount. Conditionally displaying an indicator that includes a graphical indication of a boundary when the layer arrangement of the system text relative to the foreground element and the position of the foreground element relative to the system text satisfy a set of criteria provides visual feedback related to configuring the media item and/or the system text (e.g., a line below or above which the media item and/or the foreground element should be panned to improve the configuration).

In some embodiments, prior to detecting the third user input (e.g., 1450*h*2) directed to the editing user interface (e.g., 1462*b*), the computer system (e.g., 1400) displays the indicator (e.g., 1480*a*). In some embodiments, at least a first portion of the indicator (a portion that includes a textual indication corresponding to the editing user interface, a portion that includes a graphical indication of a boundary position) is displayed with a first color (e.g., white, or green). In some embodiments, in response to detecting the third user input directed to the editing user interface, the computer system displays the first portion of the indicator with a second color different from the first color (e.g., red, or orange). Changing the color with which a portion of the indicator is displayed in response to detecting a user input directed to the editing user interface provides visual feedback related to configuring the media item and/or the system text (e.g., by providing a visual indication that the current configuration of the media item and/or the system text contains one or more errors (e.g., at least a threshold amount of the system text is being obscured by the foreground element)).

In some embodiments, prior to detecting the third user input (e.g., 1450*h*2), the computer system (e.g., 1400) displays the editing user interface (e.g., 1462*a*) without the indicator. In some embodiments, while the third user input is maintained, the computer system updates the editing user interface to include the indicator. In some embodiments, the computer system updates the editing user interface to include the indicator while detecting the third user input and before the third user input has ended (e.g., before a touch input has been lifted off of the touch-sensitive surface). Updating the editing user interface to include the indicator while the third user input is maintained (e.g., before a corresponding touch input has lifted off of the touch-sensitive surface) provides visual feedback related to configuring the media item and/or the system text (e.g., the indicator is displayed substantially as soon as the edit to the configuration of the system text and/or the media item causes the first set of criteria to be satisfied (e.g., as soon as the edit would cause at least a threshold amount of the system text to be obscured by the foreground element)).

In some embodiments, prior to detecting the third user input (e.g., 1450*h*2), the computer system (e.g., 1400) displays the editing user interface (e.g., 1462*a*) without the indicator. In response to detecting an end of the third user input (e.g., the touch input ends, and/or a finger lifts off of the touch-sensitive surface), the computer system displays the indicator (e.g., 1480*b*). Displaying the indicator in response to the third user input concluding (e.g., when a corresponding touch input lifts off of a touch-sensitive surface) provides visual feedback related to configuring the media item and/or the system text (e.g., after the third input that causes the configuration of the system text and/or the media item to satisfy the first set of criteria).

In some embodiments, in accordance with a determination that the media item includes a single foreground element (e.g., one person and/or one pet), the computer system (e.g., 1400) initially displays the media item in a fifth position that is at least partially based on the single foreground element (e.g., 1466*a*2) (e.g., with the single foreground element centered). In accordance with a determination that the media item includes two or more foreground elements (e.g., 1484*b*2 and 1484*b*3) (e.g., two or more people and/or pets), the computer system initially displays the media item in a sixth position that is at least partially based on the two or more foreground elements. In some embodiments, initially displaying the media item in the fifth media position that is at least partially based on the two or more foreground elements includes positioning the media item on the display so that the two or more foreground elements will all be within a displayed (e.g., selected) portion of the media item. Initially displaying the media item in either a fourth position that is at least partially based on the single foreground element or a fifth position that is at least partially based on the two or more foreground elements reduces the number of inputs needed to edit the position of the media item so that the one or more foreground elements of the media item are selected to be displayed which, additionally, reduces power usage and improves battery life of the device by enabling the user to use the system more quickly and efficiently.

In some embodiments, while displaying the editing user interface (e.g., 1462*g*), wherein the editing user interface includes a third portion of the media item displayed at a first zoom level, the computer system detects a swipe gesture (e.g., 1450*h*2) (e.g., a drag gesture) on the media item and/or detects a pinch gesture (e.g., 1460). In response to detecting the swipe gesture, the computer system updates the editing user interface by panning from the third portion of the media item to a fourth portion of the media item based on the swipe gesture (e.g., based on the magnitude of the swipe gesture and/or based on the direction of the swipe gesture). In response to detecting the pinch gesture, the computer system updates the editing user interface by displaying the media item at a second zoom level different from the first zoom level based on the pinch gesture (e.g., the magnitude of the change in zoom level is based on the pinch gesture and/or the direction of the zoom change (e.g., zoom out, zoom in)

is based on the pinch gesture). Updating the editing user interface by panning the media item in response to a swipe gesture and displaying the media item at a different zoom level in response to a pinch gesture reduces the number of inputs needed to configure the displayed portion of the media item and/or the zoom level at which the media item is displays which, additionally, reduces power usage and improves battery life of the device by enabling the user to use the system more quickly and efficiently.

In some embodiments, the computer system (e.g., 1400) maintains display of the system text (e.g., 1466*d*3) while updating the editing user interface (e.g., 1462*d*) by panning from the third portion of the media item to the fourth portion of the media item, and the computer system maintains display of the system text while updating the editing user interface by displaying the media item at the second zoom level different from the first zoom level. In some embodiments, the position and/or zoom level of the system text remain constant while the computer system updates the editing user interface by panning from the third portion of the media item to a fourth portion of the media item and updates the editing user interface by displaying the media item at a second zoom level different from the first zoom level. Maintaining display of the system text while panning from a third portion of the media item to a fourth portion of the media item and while updating the editing user interface by displaying the media item at a different zoom level provides visual feedback that the position and/or zoom level are not edited when the pan portion or zoom level of the media item is edited, and further provides visual feedback about how the updated configuration of the media item will look with the system text.

In some embodiments, prior to displaying the editing user interface (e.g., 1462*a*), the computer system (e.g., 1400) displays, via the display generation component (e.g., 1402), a media selection user interface (e.g., 1434*c*) that includes a first set of media items (e.g., 1454*a*, 1454*b*, and/or 1454*c*) (e.g., from a media library of the computer system). The computer system receives, via the one or more input devices, a sequence of one or more user inputs (e.g., 1450*d*, 1450*e*, and/or 1450*f*) (e.g., touch inputs, rotational inputs, and/or press inputs) corresponding to a selection of a subset of the first set of media items including the media item. In response to receiving the sequence of one or more user inputs (e.g., touch inputs, rotational inputs, and/or press inputs) corresponding to the selection of the subset of the first set of media items including the media item, the computer system displays the editing user interface, wherein the editing user interface includes the media item. In some embodiments, the computer system generates a set of eligible media items based at least partially on the characteristics of media items (e.g., availability of depth information, a shape of the depth information, and/or a presence of a particular type of point of interest (e.g., a face, a pet, and/or a favorite person)), a location of a point of interest (e.g., a face, a pet, and/or a significant foreground element) in the media item. In some embodiments, the set of media items is a subset of a larger set of media items accessible from (e.g., stored on) the computer system (e.g., a photos album). Displaying the editing user including the third media item in response to a sequence of one or more user inputs corresponding to a selection of the subset of the first set of media items including the media item reduces the number of inputs required to select one or media items to be included in an editing user interface and subsequently display an editing user interface including one or more of the selected media items.

In some embodiments, the first set of media items is selected so as to exclude media items that do not contain depth information. In some embodiments, the first set of media items is selected to as to exclude media items that do not contain depth data with a particular shape and/or threshold degree of separation between a foreground element and a background element. In some embodiments, in accordance with a determination that the plurality of media items does not contain at least one media item that includes depth data, the computer system forgoes adding media items to the subset of media items selected for use with the user interface. In some embodiments, the computer system determines whether the plurality of media items contains at least one media item that includes depth data by evaluating the plurality of media items available to (e.g., accessible by) the computer system to determine whether media items in the plurality of media items include depth information. Displaying a first set of media items, wherein the first set of media items is selected so as to exclude media items that do not contain depth information, provides the user with a first set of media items that include depth data, without requiring the user to manually select media items that include depth data to be added to the first set of media items. Performing an operation when a set of conditions has been met without requiring further user input enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first set of media items is selected so as to exclude media items that do not include one or more subjects that meet a first set of predetermined criteria (e.g., a presence of a particular type of point of interest (e.g., a face, a pet, and/or a favorite person), a degree of separation between a foreground element of the media item and a background element of the media item, and/or a location of a point of interest (e.g., a face, a pet, and/or a significant foreground element) in the media). In some embodiments, in accordance with a determination that the plurality of media items does not contain at least one media item that meets the first set of predetermined criteria, the computer system forgoes adding media items to the first set of media items. In some embodiments, the computer system determines whether a second plurality of media items contains at least one media item that meets the first set of criteria by evaluating the second plurality of media items available to (e.g., accessible by) the computer system to determine whether media items in the second plurality of media items include one or more subjects that meet the first set of predetermined criteria. Displaying a first set of media items, wherein the first set of media items is selected so as to exclude media items that do not include one or more subjects that meet a first set of predetermined criteria, provides the user with a first set of media items that satisfy the predetermined criteria, without requiring the user to manually select the media items that satisfy the first set of predetermined criteria to be added to the first set of media items.

In some embodiments, prior to displaying the media selection user interface (e.g., 1434*c*), the computer system (e.g., 1400) displays, via the display generation component (e.g., 1402), an album selection user interface (e.g., 1434*b*) (e.g., a user interface including options for selecting one or more albums that include photos that include depth data). In some embodiments, displaying the album selection user interface includes concurrently displaying: a first album user-interactive graphical user interface object (e.g., 1448*c*) corresponding to a second set of media items that correspond to a first identified subject (e.g., a first person or a first pet) and a second album user-interactive graphical user interface object (e.g., 1448*d*) corresponding to a third set of media items that correspond to a second identified subject different from the first subject (e.g., a second person or a second pet). While displaying the first album user-interactive graphical user interface object and the second album user-interactive graphical user interface object, the computer system detects a fourth user input (e.g., a tap input, a swipe input, a long press input, and/or a mouse click). In response to detecting the fourth user input and in accordance with a determination that the fourth user input corresponds to a selection of the first album user-interactive graphical user interface object, the computer system displays the media selection user interface that includes the first set of media items, wherein the first set of media items includes the second set of media items (e.g., wherein the media selection user interface includes options for selecting one or more of the second set of media items that correspond to the first identified subject). In response to detecting the fourth user input and in accordance with a determination that the fourth user input corresponds to a selection of the second album user-interactive graphical user interface object, the computer system displays the media selection user interface that includes the first set of media items, wherein the first set of media items includes the third set of media items (e.g., wherein the media selection user interface includes options for selecting one or more of the third set of media items that correspond to the second identified subject). Displaying a first option for selecting photos that include depth data of a first user, and a second option for selecting photos that include depth data of a second (e.g., different) user provides the user with options to select photos that include depth data of a particular user, without having to manually select the media items that include depth data of that particular user.

In some embodiments, the media selection user interface (e.g., 1434*c*) includes an add selected user-interactive graphical user interface object (e.g., 1442) (e.g., an add affordance). In some embodiments, while displaying the media selection user interface, the computer system (e.g., 1400) receives a second sequence of one or more user inputs (e.g., 1450*d*, 1450*e*, and/or 1450*f*) (e.g., touch inputs, rotational inputs, and/or press inputs) corresponding to selection of one or more media items (e.g., 1454*a*, 1454*b*, and/or 1454*c*) included in the first set of media items. After receiving the second sequence of one or more user inputs, the computer system detects a fifth user input (e.g., 1450*g*) (e.g., a tap input, a swipe input, a long press input, and/or a mouse click) on the add selected user-interactive graphical user interface object (e.g., 1442). In response to detecting the fifth user input, the computer system adds the selected one or more media items to a second subset of media items that are selected for use with a watch user interface. In some embodiments, the second sequence of one or more user inputs corresponding to selection of one or more media items corresponds to one or more taps on one or more media items, wherein a tap on a media item changes the selection status of the tapped media item (e.g., from selected to non-selected, or vice versa). Adding the selected media items to a second subset of media items that are selected for use with a watch user interface in response to detecting a user input on the add selected user-interactive graphical user interface object reduces the number of inputs needed to add selected media items to a subset of media items that are selected for use with a watch user interface which, additionally, reduces power usage and improves battery life of the device by enabling the user to use the system more quickly and efficiently.

In some embodiments, after detecting the user input (e.g., 1450*h*1) directed to the editing user interface (e.g., 1462*b*), the computer system (e.g., 1400) causes a user interface based on the media item (e.g., 1494*b*) (e.g., a watch face) to be added for display as a wake screen user interface for a respective electronic device (e.g., 600) (e.g., a user interface that is displayed when the device wakes or becomes active after being in an off and/or low power state, such as a watch face for a watch that is paired to the computer system or a watch face for the computer system or a lock screen user interface for the computer system). In some embodiments, displaying the user interface as the wake screen user interface includes concurrently displaying the media item (e.g., a photo, a video, a GIF, and/or an animation) that includes the background element (e.g., 1494*b*1) and the foreground element (e.g., 1494*b*2) that is segmented from the background element based on depth information and system text (e.g., 1494*b*3). In some embodiments, the media item includes depth data (e.g., data that can be used to segment a foreground element from one or more background elements such as data indicating that the foreground element was less than a threshold distance away from one or more cameras when the media was captured and a background element was more than the threshold distance away from the one or more cameras when the media was captured or a data set related to the distance between two objects in the media, a data set including the relative distances between a camera sensor and at least a first and second object that were in the field of view of the camera sensor at the time the media was captured, and/or a plurality of layers). In some embodiments, the background element and the foreground element are selected (in some embodiments, automatically) based on the depth data (e.g., in accordance with a determination that the background element is positioned behind the foreground element). In some embodiments, the system text is displayed with a fifth layer arrangement (e.g., position) relative to the foreground element based on the depth information (e.g., in front of (e.g., at least partially visually overlaying) the foreground element, or behind (e.g., at least partially visually overlaid by) the foreground element). In some embodiments, the system text is updated to include content that is dynamically selected based on a context of the computer system (e.g., a first time and/or a current date). Automatically creating a user interface, wherein displaying the user interface includes concurrently displaying a media item that includes a background element, a foreground element that is segmented from the background element based on depth information, and system text, wherein the system text is displayed with a layer arrangement relative to the foreground element and has content that is dynamically selected based on a context of the computer system, enables the user interface to be displayed without requiring the user to provide multiple inputs to manually divide the media item into segmented elements, and/or by selecting which element of the media should be the foreground element and which element of the media item should be the background element. Performing an operation when a set of conditions has been met without requiring further user input enhances the operability of the device and makes the user-device interface more efficient (e.g., by helping the user interface to be displayed by determining that the media item includes a background element and a foreground element segmented from the background element based on depth information) which, additionally, reduces power usage and improves battery life of the device by enabling the user to use the device more quickly and efficiently.

In some embodiments, while the user interface (e.g., 1494*b*) is displayed, the computer system (e.g., 600 and/or 1400) determines that a second set of predetermined criteria has been met (e.g., the time has changed, the date has changed, the time zone has changed, and/or an input has been received). In response to determining that the second set of predetermined criteria has been met, the user interface is updated to include updated system text (e.g., 1494*c*3) (e.g., an updated time and/or date) and/or an updated media item (e.g., a second media item (e.g., a photo, a video, a GIF, and/or an animation) that includes a background element and a foreground element that is segmented from the background element based on depth information). In some embodiments, updating the system text includes revising the system text to include different content. In some embodiments, updating the user interface to include updated system text includes displaying the updated system text with an updated (e.g., different) layer arrangement relative to the foreground element that was segmented based on depth information for the media item. In some embodiments, updating the user interface to include updated system text includes displaying the updated media item so that the foreground element of the updated media item is displayed at an updated (e.g., different) position relative to the system text. Updating the system text and/or media item included in the user interface in response to determining that a set of predetermined criteria has been met enables the user interface to be updated based on new inputs and/or context (e.g., of the computer system) without requiring the user to provide multiple inputs at the computer system to cause the user interface to be updated (e.g., by configuring the user interface to include an updated time and/or date, or to include an updated media item).

Note that details of the processes described above with respect to method 1500 (e.g., FIG. 15) are also applicable in an analogous manner to the methods described herein. For example, method 1500 optionally includes one or more of the characteristics of the various methods described herein with reference to method 700, method 900, method 1100, and method 1300. For example, method 700 optionally includes one or more of the characteristics of the various methods described above with reference to method 1500. For example, the user interface based on a media item that includes depth data as described with reference to FIGS. 14A-14R can include be the same as the watch user interfaces described above with reference to FIGS. 6A-6U. For another example, method 900 optionally includes one or more of the characteristics of the various methods described above with reference to method 1500. For example, a layout editing user interface as described with reference to FIGS. 14A-14R can include and be used to edit watch user interfaces as described with reference to FIGS. 8A-8M. For another example, method 1100 optionally includes one or more of the characteristics of the various methods described above with reference to method 1500. For example, a watch user interface as illustrated with reference to FIGS. 10A-10W can be added to a computer system via a different computer system as illustrated described with reference to FIGS. 14A-14R. For another example, method 1300 optionally includes one or more of the characteristics of the various methods described above with reference to method 1500. For example, the user interface based on an media item with depth data as described above with reference to FIGS. 14A-14R added to a computer system in response to a press input on a rotatable and depressible input mechanism as described above with reference to FIGS. 12A-12W. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of watch user interfaces or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, and/or exercise information), date of birth, or any other identifying or personal information.

The present disclosure recognizes that the use of such personal information data, in the present technology, can be used to the benefit of users. For example, the personal information data can be used to deliver targeted watch user interfaces that are of greater interest to the user. Accordingly, use of such personal information data enables users to have calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of suggested watch user interface options, the present technology can be configured to allow users to select to "opt in" or "opt out" of participation in the collection of personal information data during registration for services or anytime thereafter. In another example, users can select not to provide mood-associated data for suggested watch user interface options. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user interfaces can be suggested to users by inferring preferences based on non-personal information data or a bare minimum amount of personal information, such as the content being requested by the device associated with a user, other non-personal information available to the computer system, or publicly available information.

What is claimed is:

1. A computer system, comprising:
- one or more processors, wherein the computer system is in communication with a display generation component and one or more input devices including a rotatable input mechanism; and
- memory storing one or more programs configured to be executed by the one or more processors, the one or more programs including instructions for:
  - displaying, via the display generation component, a selection user interface;
  - while displaying the selection user interface, detecting a rotation of the rotatable input mechanism about an axis of rotation;
  - in response to detecting the rotation of the rotatable input mechanism, displaying a graphical indication of selection focus changing as selection focus is moved between a plurality of selectable objects;
  - after changing selection focus through the plurality of selectable objects and while concurrently displaying a representation of one or more other selectable objects from the plurality of selectable objects, detecting a press input on the rotatable input mechanism; and
    - in response to detecting the press input, selecting one of the plurality of selectable objects, including:
      - in accordance with a determination that a first selectable object of the plurality of selectable objects had selection focus when the press input was detected:
      - selecting the first selectable object that was concurrently displayed with a first representation of the one or more other selectable objects from the plurality of selectable objects when the press input was detected; and
      - ceasing displaying the first representation of the one or more other selectable objects from the plurality of selectable objects; and
      - in accordance with a determination that a second selectable object, different from the first selectable object, of the plurality of selectable objects had selection focus when the press input was detected:
      - selecting the second selectable object that was concurrently displayed with a second representation of the one or more other selectable objects from the plurality of selectable objects when the press input was detected; and
      - ceasing displaying the second representation of the one or more other selectable objects from the plurality of selectable objects.

2. The computer system of claim 1, wherein selection focus is indicated by a location of selectable objects in the selection user interface.

3. The computer system of claim 1, wherein the one or more programs further include instructions for:
- displaying, via the display generation component, a visual indication corresponding to the selectable object that has selection focus.

4. The computer system of claim 1, wherein the one or more programs further include instructions for:
- while displaying the selection user interface, detecting a swipe input; and
- in response to detecting the swipe input, changing selection focus from a third selectable object to a fourth selectable object.

5. The computer system of claim 1, wherein the one or more programs further include instructions for:
detecting a tap input; and
in response to detecting the tap input, selecting one of the plurality of selectable objects, including:
in accordance with a determination that the tap input was on a respective portion of a third selectable object, performing a first operation that includes selecting the third selectable object.

6. The computer system of claim 1, wherein the one or more programs further include instructions for:
displaying a first watch face;
while displaying the first watch face, detecting a first user input corresponding to a user request to select a watch face, and in response to detecting the first user input:
displaying the selection user interface, wherein the selection user interface is a watch face selection user interface; and
visually distinguishing the first watch face to indicate the watch face selection user interface;
while displaying the watch face selection user interface:
detecting a second user input, and in response to detecting the second user input, visually distinguish a second watch face different from the first watch face; and
while displaying the second watch face, detecting a second press input on the rotatable input mechanism; and
in response to detecting the second press input, selecting the second watch face as a currently selected watch face for the computer system.

7. The computer system of claim 1, wherein the one or more programs further include instructions for:
displaying a third watch face;
while displaying the third watch face, receiving, via the one or more input devices, a first sequence of one or more user inputs that corresponds to a request to edit the third watch face;
in response to receiving the first sequence of one or more user inputs:
entering a watch face edit mode of the computer system; and
visually distinguishing an element of the third watch face for editing, wherein the visually distinguished element is a first selectable option for the visually distinguished element of the third watch face;
while the computer system is in the watch face edit mode:
receiving, via the one or more input devices, a second sequence of one or more user inputs, and in response to receiving the second sequence of one or more user inputs, displaying a second selectable option for the visually distinguished element of the third watch face; and
while displaying the second selectable option for the visually distinguished element of the third watch face, detecting a third press input on the rotatable input mechanism; and
in response to detecting the third press input, selecting the second selectable option for the visually distinguished element of the third watch face.

8. The computer system of claim 1, wherein the one or more programs further include instructions for:
displaying a fourth watch face;
while displaying the fourth watch face, receiving, via the one or more input devices, a third sequence of one or more user inputs that corresponds to a request to edit the fourth watch face;
in response to receiving the third sequence of one or more user inputs:
entering a watch face edit mode of the computer system; and
visually distinguish a complication of the fourth watch face for editing;
while the computer system is in the watch face edit mode:
displaying a first complication option for the complication;
receiving, via the one or more input devices, a fourth sequence of one or more user inputs, and in response to receiving the fourth sequence of one or more user inputs, displaying a second complication option; and
while displaying the second complication option, detecting a fourth press input on the rotatable input mechanism; and
in response to detecting the fourth press input, selecting the second complication option.

9. The computer system of claim 1, wherein the one or more programs further include instructions for:
displaying a fifth watch face;
while displaying the fifth watch face, receiving, via the one or more input devices, a fifth sequence of one or more user inputs that corresponds to a request to send the fifth watch face to a recipient;
in response to receiving the fifth sequence of one or more user inputs, displaying a recipient selection user interface;
while the recipient selection user interface is displayed:
displaying a name of a recipient, wherein the name of the recipient has selection focus; and
detecting a sixth press input on the rotatable input mechanism; and
in response to detecting the sixth press input, transmitting information associated with the fifth watch face to the recipient.

10. The computer system of claim 1, wherein the one or more programs further include instructions for:
displaying, via the display generation component, a watch face gallery user interface for viewing selectable watch faces that are included in a watch face gallery for the computer system.

11. The computer system of claim 1, wherein the one or more programs further include instructions for:
receiving, via the one or more input devices, a selection of a watch user interface in response to receiving the selection of the watch user interface, displaying, via the display generation component, a watch face editing user interface, wherein the watch face editing user interface includes a representation of a layout of the watch user interface including a time region for displaying a current time and one or more complication regions for displaying complications on the watch user interface;
while displaying the watch face editing user interface, detecting, via the one or more input devices, a sequence of one or more inputs including a seventh user input directed to a complication region of the one or more complication regions; and
in response to detecting the sequence of one or more inputs including the seventh user input directed to the complication region of the one or more complication regions, changing which complication is assigned to the complication region of the watch user interface.

12. The computer system of claim 1, wherein the one or more programs further include instructions for:

displaying a notification corresponding to an availability of a watch face;

receiving, via the one or more input devices, an eighth user input corresponding to the notification corresponding to the availability of a ninth watch face; and in response to receiving the eighth user input, displaying a user interface for adding a watch face associated with the notification corresponding to the availability of the ninth watch face to a watch face gallery for the computer system.

13. A non-transitory computer-readable storage medium storing one or more programs configured to be executed by one or more processors of a computer system, wherein the computer system is in communication with a display generation component and one or more input devices including a rotatable input mechanism, the one or more programs including instructions for:

displaying, via the display generation component, a selection user interface;

while displaying the selection user interface, detecting a rotation of the rotatable input mechanism about an axis of rotation;

in response to detecting the rotation of the rotatable input mechanism, displaying a graphical indication of selection focus changing as selection focus is moved between a plurality of selectable objects;

after changing selection focus through the plurality of selectable objects and while concurrently displaying a representation of one or more other selectable objects from the plurality of selectable objects, detecting a press input on the rotatable input mechanism; and in response to detecting the press input, selecting one of the plurality of selectable objects, including:

in accordance with a determination that a first selectable object of the plurality of selectable objects had selection focus when the press input was detected:

selecting the first selectable object that was concurrently displayed with a first representation of the one or more other selectable objects from the plurality of selectable objects when the press input was detected; and ceasing displaying the first representation of the one or more other selectable objects from the plurality of selectable objects; and in accordance with a determination that a second selectable object, different from the first selectable object, of the plurality of selectable objects had selection focus when the press input was detected:

selecting the second selectable object that was concurrently displayed with a second representation of the one or more other selectable objects from the plurality of selectable objects when the press input was detected; and ceasing displaying the second representation of the one or more other selectable objects from the plurality of selectable objects.

14. The non-transitory computer-readable storage medium of claim 13, wherein selection focus is indicated by a location of selectable objects in the selection user interface.

15. The non-transitory computer-readable storage medium of claim 13, wherein the one or more programs further include instructions for:

displaying, via the display generation component, a visual indication corresponding to the selectable object that has selection focus.

16. The non-transitory computer-readable storage medium of claim 13, wherein the one or more programs further include instructions for:

while displaying the selection user interface, detecting a swipe input; and in response to detecting the swipe input, changing selection focus from a third selectable object to a fourth selectable object.

17. The non-transitory computer-readable storage medium of claim 13, wherein the one or more programs further include instructions for:

detecting a tap input; and in response to detecting the tap input, selecting one of the plurality of selectable objects, including:

in accordance with a determination that the tap input was on a respective portion of a third selectable object, performing a first operation that includes selecting the third selectable object.

18. The non-transitory computer-readable storage medium of claim 13, wherein the one or more programs further include instructions for:

displaying a first watch face;

while displaying the first watch face, detecting a first user input corresponding to a user request to select a watch face, and in response to detecting the first user input:

displaying the selection user interface, wherein the selection user interface is a watch face selection user interface; and visually distinguishing the first watch face to indicate the watch face selection user interface;

while displaying the watch face selection user interface:

detecting a second user input, and in response to detecting the second user input, visually distinguish a second watch face different from the first watch face; and while displaying the second watch face, detecting a second press input on the rotatable input mechanism; and in response to detecting the second press input, selecting the second watch face as a currently selected watch face for the computer system.

19. The non-transitory computer-readable storage medium of claim 13, wherein the one or more programs further include instructions for:

displaying a third watch face;

while displaying the third watch face, receiving, via the one or more input devices, a first sequence of one or more user inputs that corresponds to a request to edit the third watch face;

in response to receiving the first sequence of one or more user inputs:

entering a watch face edit mode of the computer system; and visually distinguishing an element of the third watch face for editing, wherein the visually distinguished element is a first selectable option for the visually distinguished element of the third watch face;

while the computer system is in the watch face edit mode:

receiving, via the one or more input devices, a second sequence of one or more user inputs, and in response to receiving the second sequence of one or more user inputs, displaying a second selectable option for the visually distinguished element of the third watch face; and while displaying the second selectable option for the visually distinguished element of the third watch face, detecting a third press input on the rotatable input mechanism; and in response to detecting the third press input, selecting the second selectable option for the visually distinguished element of the third watch face.

20. The non-transitory computer-readable storage medium of claim 13, wherein the one or more programs further include instructions for:

displaying a fourth watch face;

while displaying the fourth watch face, receiving, via the one or more input devices, a third sequence of one or more user inputs that corresponds to a request to edit the fourth watch face;

in response to receiving the third sequence of one or more user inputs:

entering a watch face edit mode of the computer system; and visually distinguish a complication of the fourth watch face for editing;

while the computer system is in the watch face edit mode:

displaying a first complication option for the complication;

receiving, via the one or more input devices, a fourth sequence of one or more user inputs, and in response to receiving the fourth sequence of one or more user inputs, displaying a second complication option; and while displaying the second complication option, detecting a fourth press input on the rotatable input mechanism; and in response to detecting the fourth press input, selecting the second complication option.

21. The non-transitory computer-readable storage medium of claim 13, wherein the one or more programs further include instructions for:

displaying a fifth watch face;

while displaying the fifth watch face, receiving, via the one or more input devices, a fifth sequence of one or more user inputs that corresponds to a request to send the fifth watch face to a recipient;

in response to receiving the fifth sequence of one or more user inputs, displaying a recipient selection user interface;

while the recipient selection user interface is displayed:

displaying a name of a recipient, wherein the name of the recipient has selection focus; and detecting a sixth press input on the rotatable input mechanism; and in response to detecting the sixth press input, transmitting information associated with the fifth watch face to the recipient.

22. The non-transitory computer-readable storage medium of claim 13, wherein the one or more programs further include instructions for:

displaying, via the display generation component, a watch face gallery user interface for viewing selectable watch faces that are included in a watch face gallery for the computer system.

23. The non-transitory computer-readable storage medium of claim 13, wherein the one or more programs further include instructions for:

receiving, via the one or more input devices, a selection of a watch user interface in response to receiving the selection of the watch user interface, displaying, via the display generation component, a watch face editing user interface, wherein the watch face editing user interface includes a representation of a layout of the watch user interface including a time region for displaying a current time and one or more complication regions for displaying complications on the watch user interface;

while displaying the watch face editing user interface, detecting, via the one or more input devices, a sequence of one or more inputs including a seventh user input directed to a complication region of the one or more complication regions; and in response to detecting the sequence of one or more inputs including the seventh user input directed to the complication region of the one or more complication regions, changing which complication is assigned to the complication region of the watch user interface.

24. The non-transitory computer-readable storage medium of claim 13, wherein the one or more programs further include instructions for:

displaying a notification corresponding to an availability of a watch face;

receiving, via the one or more input devices, an eighth user input corresponding to the notification corresponding to the availability of a ninth watch face; and in response to receiving the eighth user input, displaying a user interface for adding a watch face associated with the notification corresponding to the availability of the ninth watch face to a watch face gallery for the computer system.

25. A method, comprising:

at a computer system that is in communication with a display generation component and one or more input devices including a rotatable input mechanism:

displaying, via the display generation component, a selection user interface;

while displaying the selection user interface, detecting a rotation of the rotatable input mechanism about an axis of rotation;

in response to detecting the rotation of the rotatable input mechanism, displaying a graphical indication of selection focus changing as selection focus is moved between a plurality of selectable objects;

after changing selection focus through the plurality of selectable objects and while concurrently displaying a representation of one or more other selectable objects from the plurality of selectable objects, detecting a press input on the rotatable input mechanism; and in response to detecting the press input, selecting one of the plurality of selectable objects, including:

in accordance with a determination that a first selectable object of the plurality of selectable objects had selection focus when the press input was detected:

selecting the first selectable object that was concurrently displayed with a first representation of the one or more other selectable objects from the plurality of selectable objects when the press input was detected; and ceasing displaying the first representation of the one or more other selectable objects from the plurality of selectable objects; and in accordance with a determination that a second selectable object, different from the first selectable object, of the plurality of selectable objects had selection focus when the press input was detected:

selecting the second selectable object that was concurrently displayed with a second representation of the one or more other selectable objects from the plurality of selectable objects when the press input was detected; and ceasing displaying the second representation of the one or more other selectable objects from the plurality of selectable objects.

26. The method of claim 25, wherein selection focus is indicated by a location of selectable objects in the selection user interface.

27. The method of claim 25, further comprising:

displaying, via the display generation component, a visual indication corresponding to the selectable object that has selection focus.

28. The method of claim 25, further comprising:

while displaying the selection user interface, detecting a swipe input; and in response to detecting the swipe input, changing selection focus from a third selectable object to a fourth selectable object.

29. The method of claim 25, further comprising:

detecting a tap input; and in response to detecting the tap input, selecting one of the plurality of selectable objects, including:

in accordance with a determination that the tap input was on a respective portion of a third selectable object, performing a first operation that includes selecting the third selectable object.

30. The method of claim 25, further comprising:

displaying a first watch face;

while displaying the first watch face, detecting a first user input corresponding to a user request to select a watch face, and in response to detecting the first user input:

displaying the selection user interface, wherein the selection user interface is a watch face selection user interface; and visually distinguishing the first watch face to indicate the watch face selection user interface;

while displaying the watch face selection user interface:

detecting a second user input, and in response to detecting the second user input, visually distinguish a second watch face different from the first watch face; and while displaying the second watch face, detecting a second press input on the rotatable input mechanism; and in response to detecting the second press input, selecting the second watch face as a currently selected watch face for the computer system.

31. The method of claim 25, further comprising:

displaying a third watch face;

while displaying the third watch face, receiving, via the one or more input devices, a first sequence of one or more user inputs that corresponds to a request to edit the third watch face;

in response to receiving the first sequence of one or more user inputs:

entering a watch face edit mode of the computer system; and visually distinguishing an element of the third watch face for editing, wherein the visually distinguished element is a first selectable option for the visually distinguished element of the third watch face;

while the computer system is in the watch face edit mode:

receiving, via the one or more input devices, a second sequence of one or more user inputs, and in response to receiving the second sequence of one or more user inputs, displaying a second selectable option for the visually distinguished element of the third watch face; and while displaying the second selectable option for the visually distinguished element of the third watch face, detecting a third press input on the rotatable input mechanism; and in response to detecting the third press input, selecting the second selectable option for the visually distinguished element of the third watch face.

32. The method of claim 26, further comprising:

displaying a fourth watch face;

while displaying the fourth watch face, receiving, via the one or more input devices, a third sequence of one or more user inputs that corresponds to a request to edit the fourth watch face;

in response to receiving the third sequence of one or more user inputs:

entering a watch face edit mode of the computer system; and visually distinguish a complication of the fourth watch face for editing;

while the computer system is in the watch face edit mode:

displaying a first complication option for the complication;

receiving, via the one or more input devices, a fourth sequence of one or more user inputs, and in response to receiving the fourth sequence of one or more user inputs, displaying a second complication option; and while displaying the second complication option, detecting a fourth press input on the rotatable input mechanism; and in response to detecting the fourth press input, selecting the second complication option.

33. The method of claim 25, further comprising:

displaying a fifth watch face;

while displaying the fifth watch face, receiving, via the one or more input devices, a fifth sequence of one or more user inputs that corresponds to a request to send the fifth watch face to a recipient;

in response to receiving the fifth sequence of one or more user inputs, displaying a recipient selection user interface;

while the recipient selection user interface is displayed:

displaying a name of a recipient, wherein the name of the recipient has selection focus; and detecting a sixth press input on the rotatable input mechanism; and in response to detecting the sixth press input, transmitting information associated with the fifth watch face to the recipient.

34. The method of claim 25, further comprising:

displaying, via the display generation component, a watch face gallery user interface for viewing selectable watch faces that are included in a watch face gallery for the computer system.

35. The method of claim 25, further comprising:

receiving, via the one or more input devices, a selection of a watch user interface in response to receiving the selection of the watch user interface, displaying, via the display generation component, a watch face editing user interface, wherein the watch face editing user interface includes a representation of a layout of the watch user interface including a time region for displaying a current time and one or more complication regions for displaying complications on the watch user interface;

while displaying the watch face editing user interface, detecting, via the one or more input devices, a sequence of one or more inputs including a seventh user input directed to a complication region of the one or more complication regions; and in response to detecting the sequence of one or more inputs including the seventh user input directed to the complication region of the one or more complication regions, changing which complication is assigned to the complication region of the watch user interface.

36. The method of claim 25, further comprising:

displaying a notification corresponding to an availability of a watch face;

receiving, via the one or more input devices, an eighth user input corresponding to the notification corresponding to the availability of a ninth watch face; and in response to receiving the eighth user input, displaying a user interface for adding a watch face associated with the notification corresponding to the availability of the ninth watch face to a watch face gallery for the computer system.

* * * * *